US009934546B1

(12) United States Patent
Deshpande et al.

(10) Patent No.: US 9,934,546 B1
(45) **Date of Patent: *Apr. 3, 2018**

(54) METHOD AND APPARATUS FOR PROVIDING INTEGRATED MULTI-ENTITY MANAGEMENT OF A WORKFLOW FOR QUOTES IN THE MOVING INDUSTRY

(71) Applicant: Unigroup, Inc., Fenton, MO (US)

(72) Inventors: Rahul Arun Deshpande, Chesterfield, MO (US); Casey Patrick Ellis, Waterloo, IL (US); Paul Holway, Webster Groves, MO (US); Randall Clay Poppell, Chesterfield, MO (US)

(73) Assignee: UNIGROUP, INC., Fenton, MO (US)

( * ) Notice: Subject to any disclaimer, the term of this patent is extended or adjusted under 35 U.S.C. 154(b) by 857 days.

This patent is subject to a terminal disclaimer.

(21) Appl. No.: 14/252,626

(22) Filed: Apr. 14, 2014

Related U.S. Application Data

(63) Continuation of application No. 13/029,920, filed on Feb. 17, 2011, now Pat. No. 8,700,537.

(51) Int. Cl.
*G06Q 50/30* (2012.01)
*G06Q 10/06* (2012.01)

(52) U.S. Cl.
CPC ....... *G06Q 50/30* (2013.01); *G06Q 10/06311* (2013.01)

(58) Field of Classification Search
USPC .......................................... 705/1.1, 300, 301
See application file for complete search history.

(56) References Cited

U.S. PATENT DOCUMENTS

| | | | | |
|---|---|---|---|---|
| 7,487,111 | B2 * | 2/2009 | Shoen | G06Q 10/02 705/26.81 |
| 2005/0119926 | A1 * | 6/2005 | Turetsky | G06Q 10/0831 705/331 |
| 2014/0074582 | A1 * | 3/2014 | Ben-Harosh | G06Q 10/083 705/14.35 |

* cited by examiner

*Primary Examiner* — Lynda Jasmin
*Assistant Examiner* — Andrew Whitaker
(74) *Attorney, Agent, or Firm* — Amardeep S. Grewal; Reed Smith LLP

(57) ABSTRACT

Methods and apparatuses are disclosed for providing integrated management of a workflow for moving industry quotes. A processor can be configured to execute workflow management software to manage a plurality of moving industry quote workflows. Each moving industry quote workflow may correspond to a move transaction. The moving industry quote workflows may correspond to a plurality of workflow types, and each workflow type may comprise an associated plurality of interrelated tasks for different aspects of managing a moving industry quote workflow. Users can interact with a plurality of graphical user interfaces (GUIs) to perform the interrelated tasks.

14 Claims, 248 Drawing Sheets

Task Tree for Group of Tasks (414) re [Interstate Move/No OA] or [Intrastate/Local Move, HO-Generated, No OA] (412)

Task Tree for Group of Tasks (418) re [Interstate Move/OA Involved] or [Intrastate/Local Move, HO-Generated, OA Involved] (416)

Task Tree for Group of Tasks (422) re Intrastate/Local Move, Agency-Generated, No OA (420)

112

| User ID (500) | User Name (502) | Company ID (504) | Company Type (506) | User Role (508) | Authorizations (510) | Others (512) |
|---|---|---|---|---|---|---|
| 12345 | John Smith | ABC Moving | Agency | Agency Administrator | … | … |
| 23456 | Jane Doe | XYZ Moving | Home Office | Home Office Administrator | … | … |
| 34567 | Sally Jones | QRS Hauling | Agency | Estimator | … | … |

| Transaction ID (600) | Workflow Type ID (602) | Agency ID (604) | OA ID (606) | Transaction State (608) | Task List (610) | Others (612) |
|---|---|---|---|---|---|---|
| X349686 | x | ABC Moving | N/A | Complete - Quote Accepted | … | … |
| X398564 | y | QRS Hauling | ABC Moving | Pending – Survey Completed | … | … |
| X348976 | x | QRS Hauling | N/A | Complete – Quote Declined | … | … |

| Task ID (622) | Task Master (624) | Assigned User (626) | Task Status (628) | Others (630) |
|---|---|---|---|---|
| X349686 | User ID x | User ID q | Complete | … |
| X398564 | User ID y | User ID k | Pending | … |
| X348976 | User ID z | User ID i | Future | … |

Quotes To-Go — Opportunities By Source

| Category | Source | Opportunities | Non Opportunities | In Progress At Home Office | In Progress At Agent | Booked Surveys | % Booked Survey | Orders | % Orders of Opps | % Orders of Surveys |
|---|---|---|---|---|---|---|---|---|---|---|
| **Summary** | | **12** | **1** | **2** | **9** | **6** | **50%** | **0** | **0%** | **0%** |
| | | **12** | **1** | **2** | **9** | **6** | **50%** | **0** | **0%** | **0%** |
| | 1-800 Interstate United | 1 | 0 | 0 | 1 | 1 | 100% | 0 | 0% | 0% |
| | 1-800 unitedvanlines.com Local | 5 | 1 | 0 | 4 | 4 | 80% | 0 | 0% | 0% |
| | UnitedVanLines.com | 2 | 0 | 1 | 1 | 1 | 50% | 0 | 0% | 0% |
| | Print | 1 | 0 | 0 | 1 | 0 | 0% | 0 | 0% | 0% |
| | Agent Website | 2 | 0 | 0 | 2 | 0 | 0% | 0 | 0% | 0% |
| | Affinity | 1 | 0 | 1 | 0 | 0 | 0% | 0 | 0% | 0% |

1012

1014

Report Criteria Created Between: 2010-01-06 and 2011-01-13 January 13, 2011 9:43:34 AM

Figure 10(b)

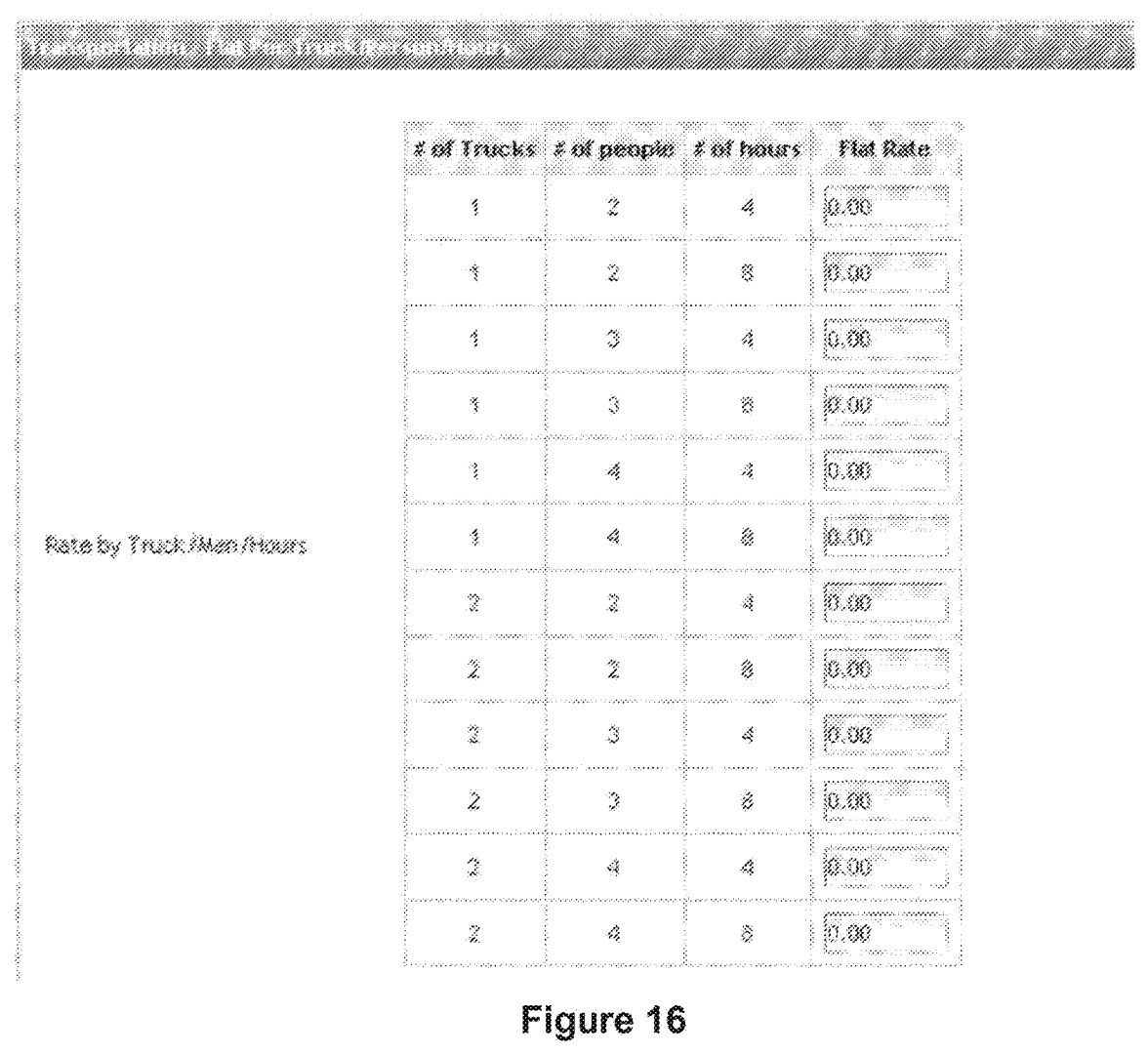

Rate by Truck/Man/Hours

| # of Trucks | # of people | # of hours | Flat Rate |
|---|---|---|---|
| 1 | 2 | 4 | 0.00 |
| 1 | 2 | 8 | 0.00 |
| 1 | 3 | 4 | 0.00 |
| 1 | 3 | 8 | 0.00 |
| 1 | 4 | 4 | 0.00 |
| 1 | 4 | 8 | 0.00 |
| 2 | 2 | 4 | 0.00 |
| 2 | 2 | 8 | 0.00 |
| 2 | 3 | 4 | 0.00 |
| 2 | 3 | 8 | 0.00 |
| 2 | 4 | 4 | 0.00 |
| 2 | 4 | 8 | 0.00 |

Figure 16

Figure 20
Transportation - Hourly Per Truck/Person/Hour
Rate by Truck/Men/Hours
of Trucks
of Men
Minimum # of Hours
Regular Rate Per Hour
Overtime Rate Per Hour
1 1 4 40.00 65.00
1 2 4 50.00 75.00
1 3 4 60.00 85.00
1 4 4 70.00 95.00
1 5 4 80.00 100.00
Regular Rate Per Hour
Overtime Rate Per Hour
Additional Man: 30.00 40.00
Additional Truck: 25.00 25.00
Additional Driver: 40.00 50.00
Supervisor: 50.00 55.00

| Miles | | | Pounds | Break Point | Pounds | Break Point | Pounds | Break Point | Pounds | Break Point | Pounds | Break Point | Pounds |
|---|---|---|---|---|---|---|---|---|---|---|---|---|---|
| | | | 500-999 | | 1000-1999 | | 2000-3999 | | 4000-7999 | | 8000-11999 | | 12000 plus |
| 31 | - | 40 | $46.57 | 703 | $34.18 | 1601 | $29.39 | 3483 | $24.60 | 6711 | $19.81 | 11158 | $15.02 |
| 41 | - | 50 | $48.46 | 709 | $35.75 | 1556 | $30.96 | 3626 | $26.17 | 6503 | $21.38 | 10950 | $16.59 |
| 51 | ~ | 60 | $50.03 | 692 | $36.12 | 1116 | $31.33 | 3502 | $26.54 | 6464 | $21.75 | 10911 | $16.96 |

Figure 21

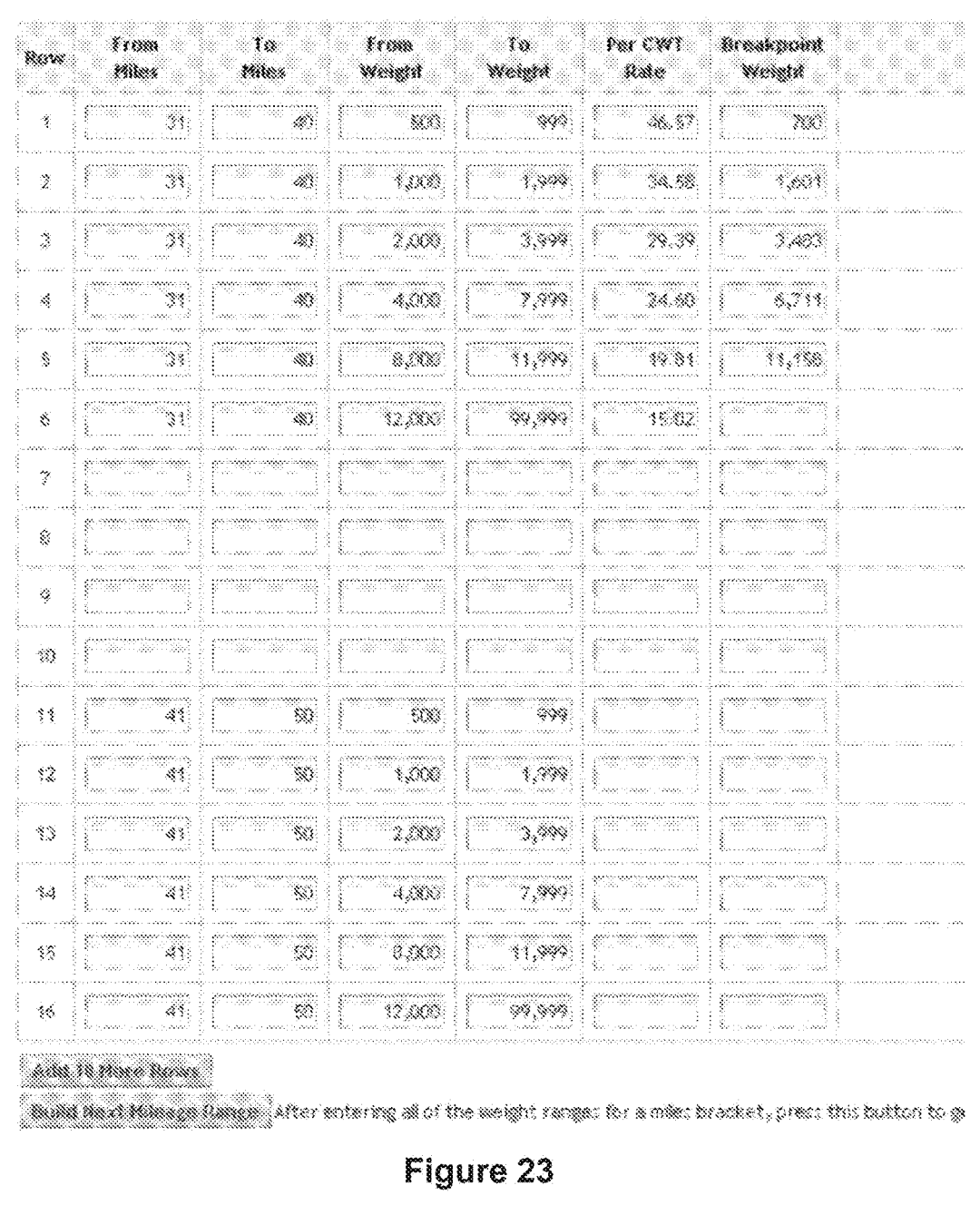

| Row | From Miles | To Miles | From Weight | To Weight | Per CWT Rate | Breakpoint Weight |
|---|---|---|---|---|---|---|
| 1 | 31 | 40 | 500 | 999 | 46.57 | 700 |
| 2 | 31 | 40 | 1,000 | 1,999 | 34.58 | 1,601 |
| 3 | 31 | 40 | 2,000 | 3,999 | 29.39 | 3,403 |
| 4 | 31 | 40 | 4,000 | 7,999 | 24.60 | 6,711 |
| 5 | 31 | 40 | 8,000 | 11,999 | 19.81 | 11,158 |
| 6 | 31 | 40 | 12,000 | 99,999 | 15.82 | |
| 7 | | | | | | |
| 8 | | | | | | |
| 9 | | | | | | |
| 10 | | | | | | |
| 11 | 41 | 50 | 500 | 999 | | |
| 12 | 41 | 50 | 1,000 | 1,999 | | |
| 13 | 41 | 50 | 2,000 | 3,999 | | |
| 14 | 41 | 50 | 4,000 | 7,999 | | |
| 15 | 41 | 50 | 8,000 | 11,999 | | |
| 16 | 41 | 50 | 12,000 | 99,999 | | |

Add 10 More Rows

Build Next Mileage Range After entering all of the weight ranges for a miles bracket, press this button to g

Figure 23

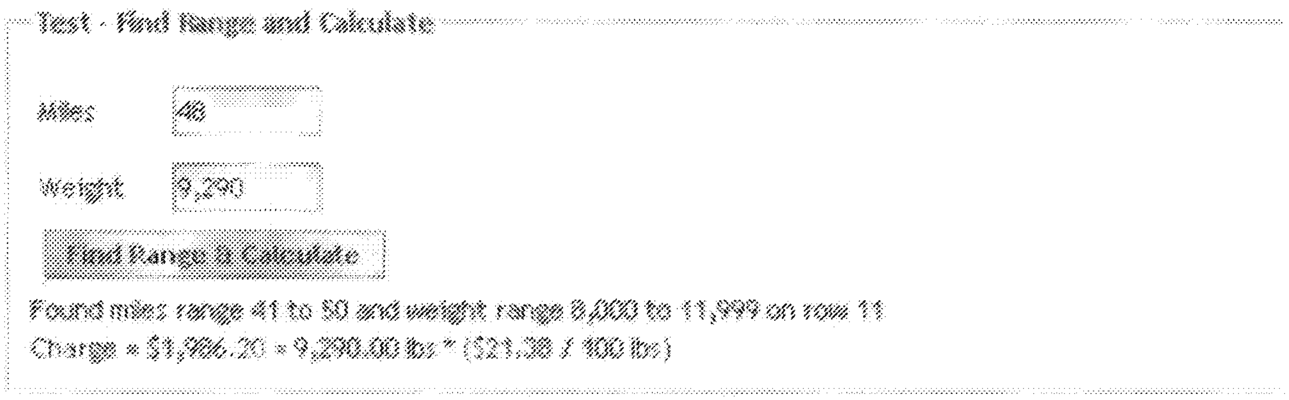

Figure 24

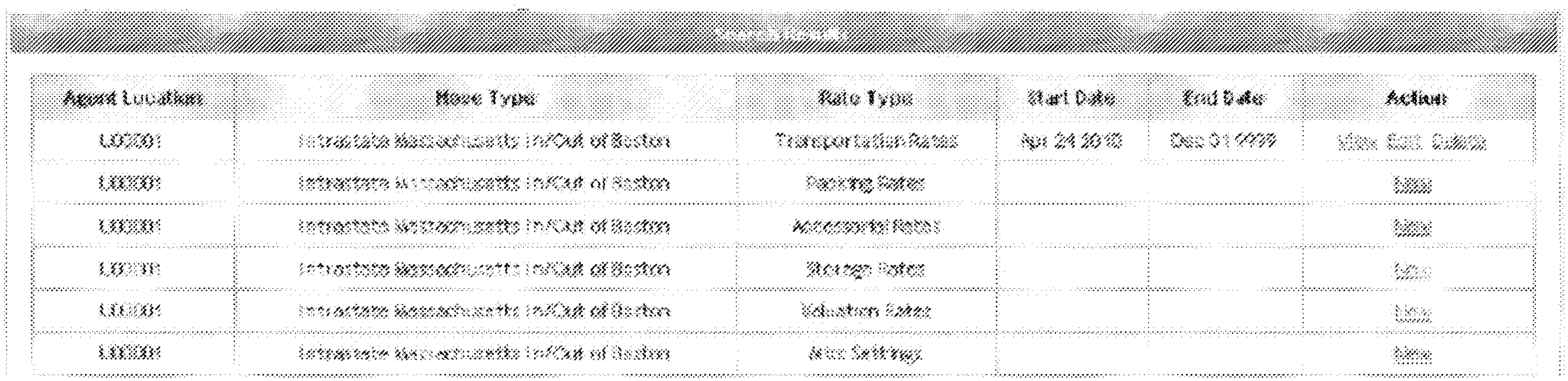

| Agent Location | Move Type | Rate Type | Start Date | End Date | Action |
|---|---|---|---|---|---|
| L00001 | Intrastate Massachusetts In/Out of Boston | Transportation Rates | Apr 24 2010 | Dec 31 9999 | View Edit Delete |
| L00001 | Intrastate Massachusetts In/Out of Boston | Packing Rates | | | New |
| L00001 | Intrastate Massachusetts In/Out of Boston | Accessorial Rates | | | New |
| L00001 | Intrastate Massachusetts In/Out of Boston | Storage Rates | | | New |
| L00001 | Intrastate Massachusetts In/Out of Boston | Valuation Rates | | | New |
| L00001 | Intrastate Massachusetts In/Out of Boston | Misc Settings | | | New |

Figure 25

Agent Location: U30344

Move Type: Local

Rate Type: Packing Rates

Date Range: 09/29/2010 To 12/31/9999

Packing Rates For Container

| Packing Type | Rate Basis | Packing Rate | | Unpacking Rate | | Carton Only Rate |
|---|---|---|---|---|---|---|
| | | Regular | Overtime | Regular | Overtime | |
| 1.5 cu Feet Carton | Per Container | 5.00 | | 4.00 | | 1.00 |
| 3.0 cu Feet Carton | Per Container | 5.50 | | 4.50 | | 1.00 |
| 4.5 cu Feet Carton | Per Container | 5.50 | | 4.50 | | 1.00 |
| 6 cu Feet Carton | Per Container | 6.00 | | 5.00 | | 1.00 |
| 6.5 cu Feet Carton | Per Container | 6.00 | | 5.00 | | 1.00 |
| Cartons 2 CU.FT | Per Container | 5.50 | | 5.50 | | 1.00 |
| Cartons 4 CU.FT | Per Container | 5.50 | | 5.50 | | 1.00 |

Figure 27

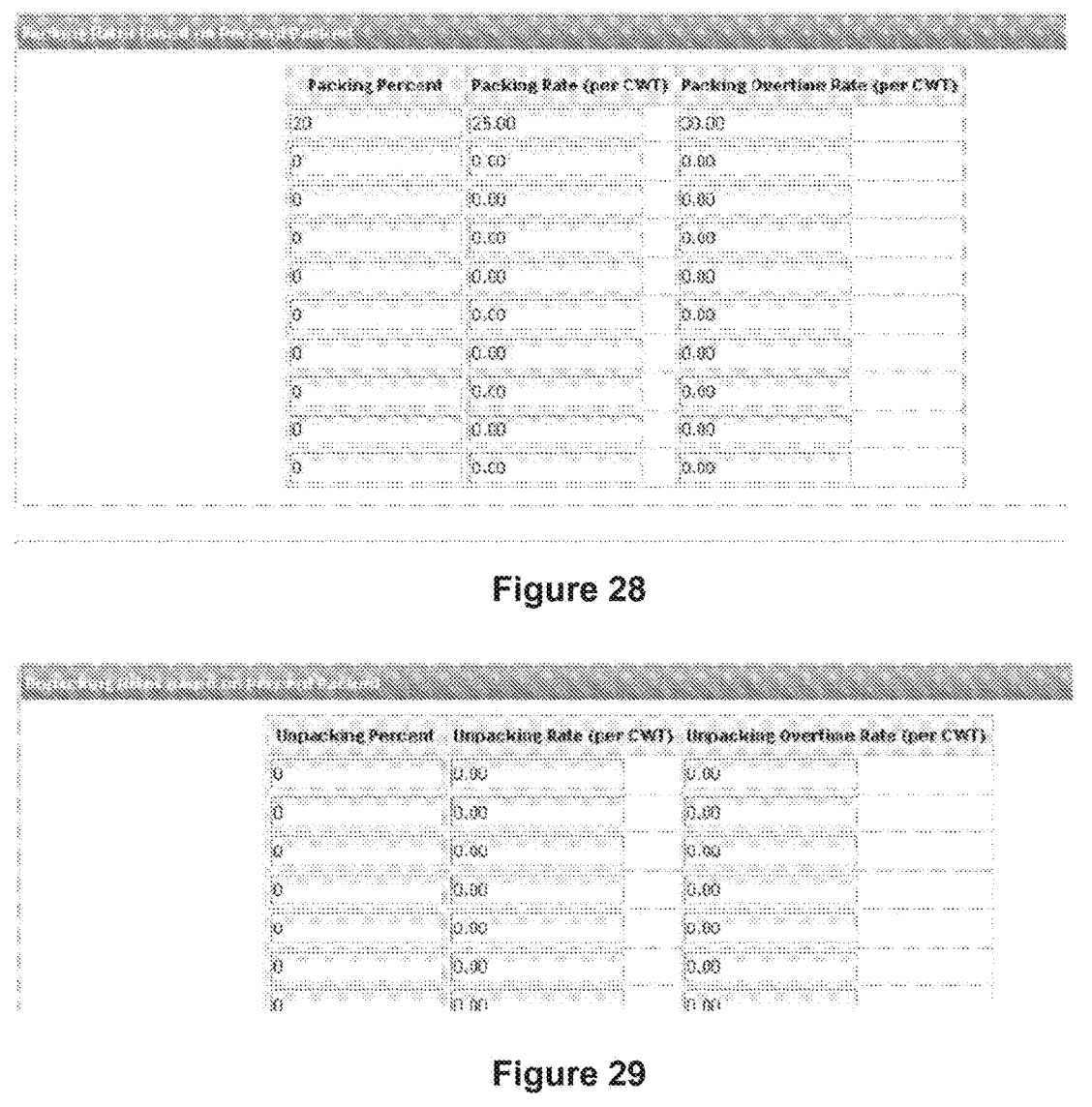

| Packing Percent | Packing Rate (per CWT) | Packing Overtime Rate (per CWT) |
|---|---|---|
| 20 | 25.00 | 30.00 |
| 0 | 0.00 | 0.00 |
| 0 | 0.00 | 0.00 |
| 0 | 0.00 | 0.00 |
| 0 | 0.00 | 0.00 |
| 0 | 0.00 | 0.00 |
| 0 | 0.00 | 0.00 |
| 0 | 0.00 | 0.00 |
| 0 | 0.00 | 0.00 |
| 0 | 0.00 | 0.00 |

Figure 28

| Unpacking Percent | Unpacking Rate (per CWT) | Unpacking Overtime Rate (per CWT) |
|---|---|---|
| 0 | 0.00 | 0.00 |
| 0 | 0.00 | 0.00 |
| 0 | 0.00 | 0.00 |
| 0 | 0.00 | 0.00 |
| 0 | 0.00 | 0.00 |
| 0 | 0.00 | 0.00 |
| 0 | 0.00 | 0.00 |

Figure 29

Figure 34
Rates Admin
Agent Location:
Date Range:
To
Enter what you would like to have print on Quotes
Enter what you would like to have print on Quotes

Andy Bower <abower@moving.com>
04/07/2018 02:27 PM

To: mbecker@aol.com
cc: peggy_thacker@unigroupinc.com
Subject: Your United VanLines eAcceptance Document To review your documents, please click on the link below. From the eAcceptance page, you will also be able to accept the documents and book your move. If you have not booked your move using the link below prior to its expiration, please contact your sales representative eAcceptance Document Thank you, Andy Bower
Bower Moving & Storage
3701 Park Crest
St. Louis, MO 63125
abower@moving.com
Phone: 636-349-8513
Fax: 800-555-1212
Large enough to handle, small enough to care!

Figure 123

Figure 151
HOUSEHOLD GOODS LIABILITY %
Rating:
$50,000 MINIMUM LINEHAUL - ROLLING 12 MONTHS
NON HOUSEHOLD LIABILITY %
Rating:
$25,000 MINIMUM LINEHAUL - ROLLING 12 MONTHS
PACKING LIABILITY %
Rating:
$15,000 MINIMUM REVENUE - ROLLING 12 MONTHS
WAREHOUSE LIABILITY %
Rating:
$25,000 MINIMUM REVENUE - ROLLING 12 MONTHS
SAFETY PERFORMANCE RATING
Rating:
8,000 MINIMUM MILEAGE - ROLLING 12 MONTHS
QUALITY LABOR RATING
Rating:
UVL MINIMUM RATING (*) - AS OF 05/01/10
OVERALL RATING OF MOVE CONSULTATION & EST.
Q1L - COD CSS
Rating: (ABOVE)
OVERALL RATING OF PACKING SERVICES
Q4H
Rating: (ABOVE)
OVERALL RATING OF MOVE COORDINATION
Q2F - COD CSS
Rating: (ABOVE)
OVERALL RATING OF DRIVER / LOADING CREW
Q5J
Rating: (EXCEEDS)
OVERALL RATING OF MOVE CONSULTATION & COR.
Q1L - NATL ACCT CSS
Rating: (MEETS)
OVERALL RATING OF DRIVER / DELIVERY CREW
Q6R
Rating: (ABOVE)
OVERALL RATING OF ESTIMATING SERVICES
Q2F - NATL ACCT CSS
Rating: (EXCEEDS)
OVERALL PERFORMANCE OF THE MOVE
Q8
Rating: (ABOVE)
ACCURATELY ESTIMATING TOTAL MOVING CHARGES
Q1I COD /Q2E NAT ACCT
Rating: (EXCEEDS)
WILLINGNESS TO RECOMMEND
Q9
Rating: (ABOVE)

Figure 185
Itemized Customer Survey
United
Customer
Estimator
Move Coordinator
Bedroom
Kitchen
Living Room
Quote Not Finalized
Carrier Packing & Crating Summary
United
Pack by Owner
Carrier Pack
Packing

Figure 246
Valuation
Customer Name:
Load Date:
Estimate Number:
Quote Status: Draft
Weight (lbs.): 4,221
Weight Additives: 0
Full-Value Protection
Requested Amount 2000
Deductible Amount 500.00
Charge 49.00
Declared Value
Requested Amount
Deductible Amount -- Select --
Charge
Released Value
$0.30 per pound per article

METHOD AND APPARATUS FOR PROVIDING INTEGRATED MULTI-ENTITY MANAGEMENT OF A WORKFLOW FOR QUOTES IN THE MOVING INDUSTRY

PRIORITY CLAIM

This application is a continuation of U.S. patent application Ser. No. 13/029,920, filed Feb. 17, 2011 (now pending), the disclosures of which are hereby incorporated herein by reference in their entirety.

BACKGROUND AND SUMMARY OF THE INVENTION

A moving company, also commonly known as a van line, is a business entity that provides services to people and businesses in connection with moving their goods from one location to another. In this marketplace, a variety of different types of moving companies exist. For example, one type of moving company is a "national moving company" (also commonly known as a "national van line"). A national moving company typically provides service across multiple states (or even nationwide across the U.S.), particularly in connection with interstate moves. It should be understood that a national moving company need not provide moving services in all U.S. states or even a majority of U.S. states. Another type of moving company is an "agent moving company". An agent moving company typically has an authorized agent relationship with a national moving company. Within this relationship, the agency moving company will often provide moving services to customers as an agent of the national moving company for certain types of move transactions, typically interstate moves. However, it should be understood that an agent moving company may also provide moving services, often locally and intrastate, to customers outside the scope of its agency relationship with a national moving company.

An important aspect of business for moving companies is providing customers with quotes for move transactions. However, as indicated above in the general description of the moving industry landscape, the creation and management of quotes in the moving industry may involve various participants, including national moving companies and numerous agent moving companies.

National moving companies may have a "home office" from which moves are managed. It should be understood that the term "home office" does not refer to a single office location but rather to an administrative office role which me be realized by parties physically situated in one or more office locations. This home office may encompass a call center and/or Internet website for fielding sales leads from potential customers. The home office may further encompass administrative personnel for managing these leads as the leads mature in the quote process.

Depending on the nature of the sales lead, the home office of the national moving company may assign the sales lead or some aspect thereof to an agent moving company with which it has an agency relationship. However, for other sales leads, the national moving company may refer the lead exclusively to an agent moving company for services outside the agency relationship. Additionally, sales leads may originate at the office of an agent moving company irrespective of whether the lead is for service by the agent moving company or the national moving company with whom it has an agency relationship.

A single "move" typically comprises one origin and at least one destination, and the goods to be moved are generally initially located at the origin (although in some cases, additional goods may be located elsewhere). There are three major categories of moves: (1) interstate moves that cross state lines, (2) intrastate moves from one metropolitan area to another that do not cross state lines, and (3) local moves within a particular metropolitan area that do not cross state lines. However, subsumed within any of these three categories (or optionally standing on their own as separate categories) may be additional types of moves, such as national account moves, container moves, and international moves. A national account move typically involves a move whereby an employee of a business is transferred from one location to another, and the business is paying for the employee's move. Such a business may have an account with a national moving company to facilitate these transactions. A container move is a type of move transaction where the moving company provides the customer with a storage container to be filled with the customer's goods that are to be moved. In some circumstances, the customer may choose to take on the responsibility of filling the container with goods, and the moving company's job is to pick up the container on a scheduled date and transport that container to the destination. It should be understood that national account moves and container moves may also be categorized as interstate, intrastate, or local moves depending upon the origins and destinations for such moves. An international move is a type of move where the moving company provides traditional interstate, intrastate or local service, which may also involve national account or container moves, followed by shipment of at least a portion of the customer's goods to a foreign country.

A moving industry quote, or move quote, is an offer from a moving company pertaining to a move transaction whereby the goods of a customer are to be moved from an origin to a destination. The move quote typically will include a price estimate for the move transaction based on the moving service to be provided (e.g., the dates for the pickup and delivery of the move, an estimate as to the amount of goods to be moved, whether movers are to pack any of the goods, an identification of the origin and destination, etc.) Upon acceptance of a move quote by the customer, a move contract is formed. Once a move contract has been formed, a moving company can perform the defined move for the customer on the scheduled date.

The move quote is generally based on a survey of the goods to be moved in combination with the applicable rates. Rates are typically set by administrators and are used to determine a cost for a specific move, based on, for example, cubic feet and weight of goods to be moved.

As indicated above, multiple entities are typically involved in managing move quotes. For example, different people may perform tasks with respect to managing move quotes such as assigning sales leads to appropriate personnel, conducting surveys at customer sites, creating appropriate move quotes, and performing follow-up actions in connection with any of the same. Many of these entities may be engaged by different companies, even in some instances in connection with a single move quote. Additionally, a single move quote may involve multiple types of moves to accommodate the customer's needs, such as an intrastate container move and an international move. Different entities may also manage the various rates for these different types of move services comprising a single move quote as necessary.

In order to better and more efficiently serve the needs of participants in the moving industry quote management process, the inventors disclose the methods and apparatuses of the present invention.

In accordance with one exemplary aspect of a disclosed embodiment, the inventors disclose a processor configured to execute workflow management software to manage a plurality of moving industry quote workflows. Each moving industry quote workflow may correspond to a move transaction or a portion thereof, and the moving industry quote workflows may also correspond to a plurality of workflow types. Each workflow type may comprise an associated plurality of interrelated tasks for different aspects of managing a moving industry quote workflow, wherein at least one of the workflow types comprises interrelated tasks that are to be performed by a plurality of entities that are geographically remote relative to each other. The processor can be configured to create data for a plurality of different graphical user interfaces (GUIs), each of the GUIs for interaction with at least one of the entities to manage the interrelated tasks applicable to that at least one entity, and wherein the workflow management software is further configured to populate each the GUIs with data applicable to the interrelated tasks for that at least one entity.

The different entities may be associated with different roles in the workflows. Examples of roles include an estimator role, a home office (HO) administrator role, and an agency administrator (AA) role (which can also be referred to as a "booker" role, "AOR" role, or "agency lead coordinator" (ALC) role). A person serving in the HO administrator role may work for a national moving company or some other administrator entity in connection with the system. A person serving in the AA role may work for an agent moving company. A person serving in the estimator role may work for an agent moving company. Moreover, it should be noted that some agency administrators (or even estimators) may be origin agents (OAs). An OA is an entity engaged by a first moving company who is performing a task at the request of either the national moving company or an agent moving company. Thus, depending upon a move scenario, another entity in the workflow may be a person in an OA role.

The workflow management software can associate the different entities with corresponding roles to determine the tasks that are to be performed by each entity in connection with the move transactions with which they are involved. As previously noted, the different entities who access the workflow management software in connection with a given move transaction may be engaged by different companies. However, it should also be understood that for some move transactions, the different entities who perform tasks therefor may be engaged by the same company. An exemplary embodiment disclosed herein is preferably configured to support both move scenarios.

A memory for communication with the processor can store a plurality of data structures for administering the workflows. Examples of data structures that can be stored in the memory include authorized user data structures, workflow data structures, transaction data structures, and rate data structures.

These and other features and advantages of the exemplary embodiments disclosed herein will be understood by those having ordinary skill in the art upon review of the description and figures hereinafter.

BRIEF DESCRIPTION OF THE DRAWINGS

FIG. 1(*b*) depicts an exemplary database of data structures that can be employed in the system of FIG. 1(*a*);

FIG. 3(*c*) shows an example of how the quote workflow management software can be configured to interface with multiple move management systems;

FIG. 4(*b*) depicts exemplary workflow types for various move scenarios and their corresponding groups of tasks;

FIGS. 4(*c*)-(*f*) depict exemplary task trees for the workflow types shown in FIG. 4(*b*);

FIG. 5 depicts exemplary authorized user data structures that can be stored in the exemplary database of FIG. 1(*b*);

FIGS. 6(*a*) and (*b*) depict exemplary transaction data structures that can be stored in the exemplary database of FIG. 1(*b*);

FIG. 10(*b*) shows an exemplary "Opportunities by Source" report.

FIGS. 11-37 show exemplary screenshots for a system as described in Appendix A.

DETAILED DESCRIPTION OF THE PREFERRED EMBODIMENTS

Figure 1A:
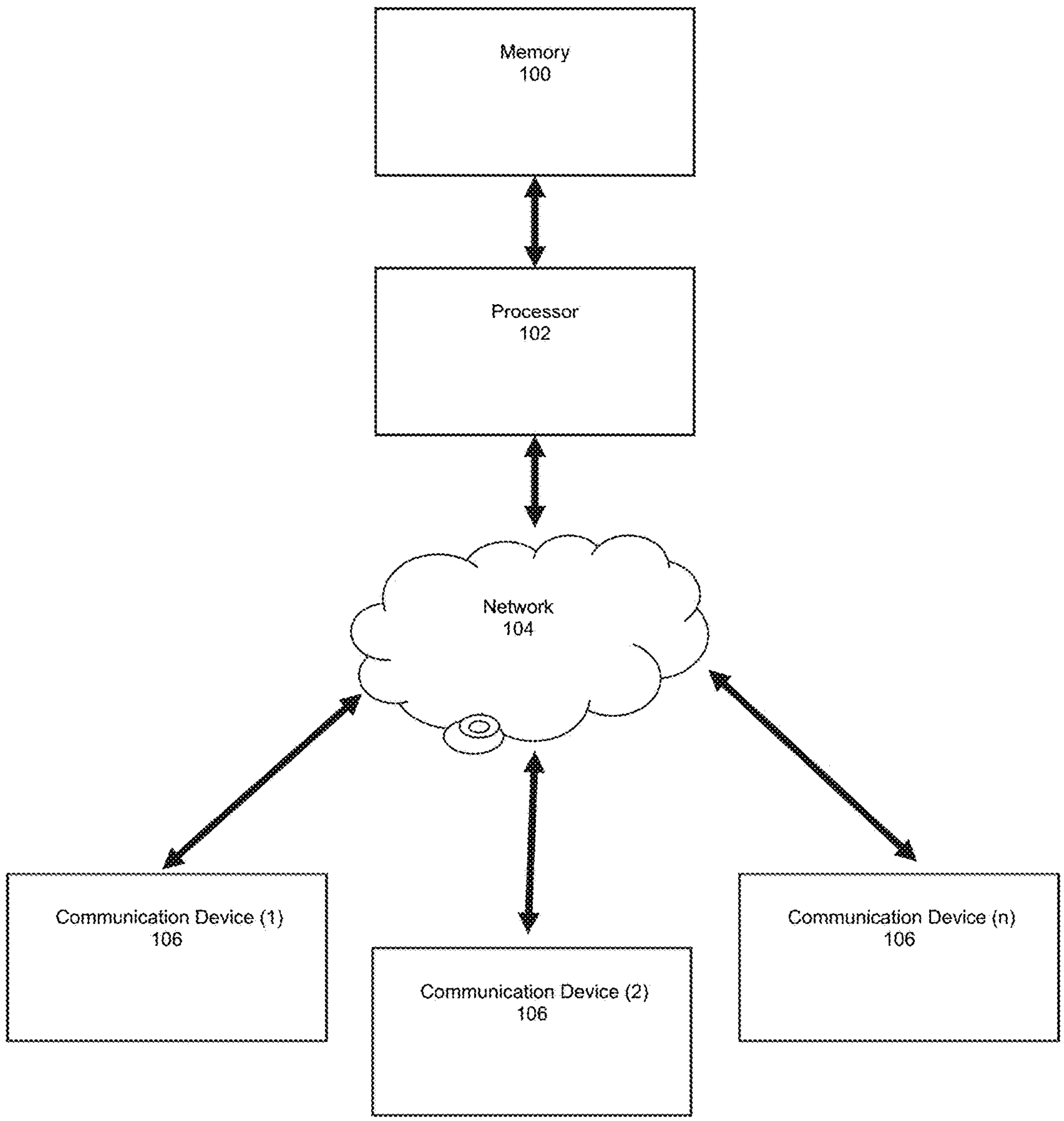
FIG. 1(*a*) depicts an exemplary system architecture for providing integrated management of a workflow for moving industry quotes.
Figure 1B:
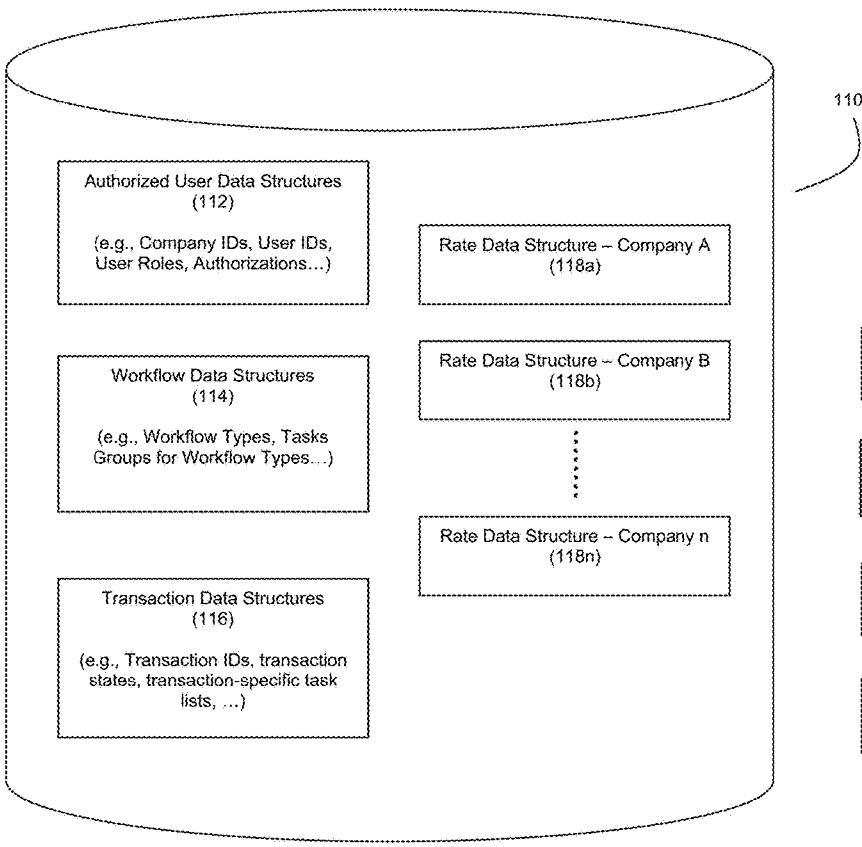

FIG. 1(*a*) depicts an exemplary system architecture for providing integrated management of a workflow for moving industry quotes. The exemplary computer system may comprise a memory 100 in communication with a processor 102. A plurality of communication devices 106 may access the processor 102 via a network 104 such as the Internet to execute workflow management software as described herein.

The processor 102 and memory 100 may take the form of a server. However, it should be noted that the memory 100 and processor 102 may be installed on the same hardware device (e.g., a common server housing both the processor 102 and memory 100) or on separate hardware devices (e.g., processor 102 on a web server and memory 100 on a database server) depending on the desires of a practitioner.

Furthermore, multiple processors 102 may be provided should the system be expected to experience heavy loads.

The processor 102 can be configured to provide a plurality of Graphical User Interfaces (GUIs) to the communication devices 106 via network 104 for display thereon. Users of the communication devices 106 can then interact with workflow management software executed by the processor 102 via the displayed GUIs to perform a variety of tasks in connection with a workflow for managing moving industry quotes.

Memory 100 may host a database 110 such as that shown in the example of FIG. 1(*b*). Such a database 110 may be a relational database, although this need not be the case. The database 110 preferably comprises a plurality of data structures used and maintained by workflow management software executed by the processor 102. These data structures may take the form of tables of associated data, although other arrangements can be used if desired by a practitioner. Exemplary data structures for storage in the database 110 may include authorized user data structures 112, workflow data structures 114, transaction data structures 116, and various company-specific rate data structures 118. The rate data structures 118 can be used to govern the pricing rates that are applied to quotes generated through the system for a particular company or for a particular company's provision of services as part of a moving quote provided to the customer by a different company. Any of a number of pricing mechanisms can be implemented through the rate data structures. The table below is generally indicative of how rates can be applied to move transactions. However, it should be understood that other arrangements can be employed subject to agreements by the various parties to the process.

| Move Characteristics | Whose Rates Govern |
|---|---|
| Interstate | National Moving Company |
| Intrastate | Agent Moving Company* |
| Local | Agent Moving Company* |
| National Account | National Moving Company |
| Container | National Moving Company |
| International | National Moving Company or Affiliate |

*It should be noted that in some instances, the rates for intrastate and/or local moves may potentially be governed by the rates of a national moving company.

Preferably, the system is configured to permit authorized users for the different companies to define their respective company's pricing mechanisms through the company-specific rate data structures. Further still, the database 110 is preferably configured to limit the visibility of pricing information for each company such that each company's rate data structure 118 cannot be accessed by unauthorized users (e.g., users within the subject company for the rate data structure 118 who are not authorized to view rates and users who are not within the subject company), although outside users may be able to include the subject company's services and respective rates in a move quote. Such an arrangement may include blocking visibility into the pricing present in the rate data structures for personnel of a company that maintain the physical hardware housing the database 110. To achieve such goals, cryptography may be employed to protect the rate data structures within database 110. Exemplary GUIs for the administration of rates are shown in Appendix A included herewith. In this manner, the exemplary quote workflow management system provides centralized storage of the rate structures for the participants in the system with decentralized management of those rate structures, thereby permitting numerous moving companies to share the same quoting system while still enjoying the flexibility to closely manage pricing in connection with the numerous types of quotes generated by the system.

The communication devices 106 may take any of a number of forms depending upon the needs of a practitioner. For example, exemplary communication devices include personal computers (PCs) (e.g., desktop workstations), laptop/notebook computers, tablet computers, and smartphone devices having network connection capabilities sufficient for accessing the processor 102 over network 104 to execute the workflow management software described herein. The communication devices 106 may access the processor 102 via wired networks, wireless networks or combinations thereof. Conventional browser software may be executed from the communication devices to access the processor 102 for these purposes. However, it should be noted that the communication devices can also run local specialized software applications to access the processor 102 for these purposes (where such specialized software applications can be downloaded to the communication device 106 for local execution thereon without needing to open a browser). With such an embodiment, one or more communications devices (for example, a portable communications device) may execute at least a portion of the workflow management software.

Figure 2:
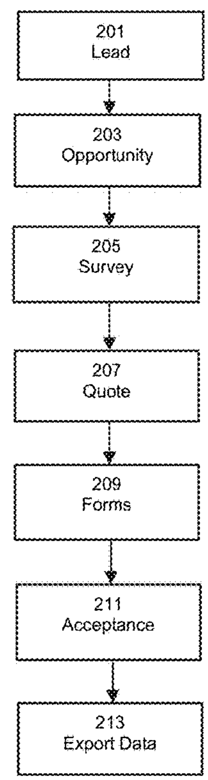
FIG. 2 depicts a flow chart for the progression of a move transaction from a "lead" to customer through acceptance of a quote and culminating in an export of data relating to the accepted quote.

FIG. 2 depicts a flow chart for an exemplary progression of a "move" transaction. The "move" transaction begins with a sales lead (step 201). Such a lead may arrive at the system via any of a number of means. For example, a national moving company or an agent moving company may field sales leads via a website and/or a call center through which potential customers submit inquiries about a move. Moreover, repeat customers such as corporate customers who have a recurring need to transfer personnel from one location to another may contact account executives with national or agent moving companies to inquire about a potential move transaction.

At step 203, the system converts a sales lead into a move opportunity. In an exemplary embodiment, this step can trigger the creation of a move transaction workflow in the workflow management software executed by processor 102. The move transaction at this stage preferably includes sufficient data for identifying the customer (e.g., name, telephone number, etc.), where this data is stored in a unique transaction data structure 116 in database 110. This data can be imported into the transaction data structure 116 automatically from data received via a company website or via input from an employee (e.g., call center employee or account executive). Exemplary GUIs for creating new opportunities can be found in Appendix C. Exemplary GUIs for creating and managing source type options for leads are also shown in Appendix C.

The next major phase of a transaction is for an estimator to perform a customer survey in connection with the move opportunity (step 205). This survey may involve an estimator visiting the customer at the move origin (e.g., the customer's home) to identify and estimate the move needs (e.g., estimate how much property needs to be moved). Such surveys typically involve the estimator using a communication device 106 such as a tablet computer to enter data relating to these items for the purposes of the survey. It should be noted, however, that a visual estimate may not always be a necessary part of a workflow for a particular type of move transaction (such as in the case of a do-it-yourself container move, in which case a practitioner may wish to configure a workflow that omits a visual estimating task).

Upon completion of a survey, a moving quote is prepared for the customer (step 207) and the forms that document the moving quote are also created (step 209). This documented quote serves as a proposal for review and acceptance by the customer with respect to the move. The quote specifies the nature of the move (e.g., the origin and destination for the move, how much property is to be moved, when the move is to take place, etc.) and the price for the move.

If the customer chooses to accept the quote (step 211), a moving contract is formed. After acceptance, the system preferably exports data corresponding to this move to a move management system for processing during the moving phase of the transaction (step 213).

Figure 3A:
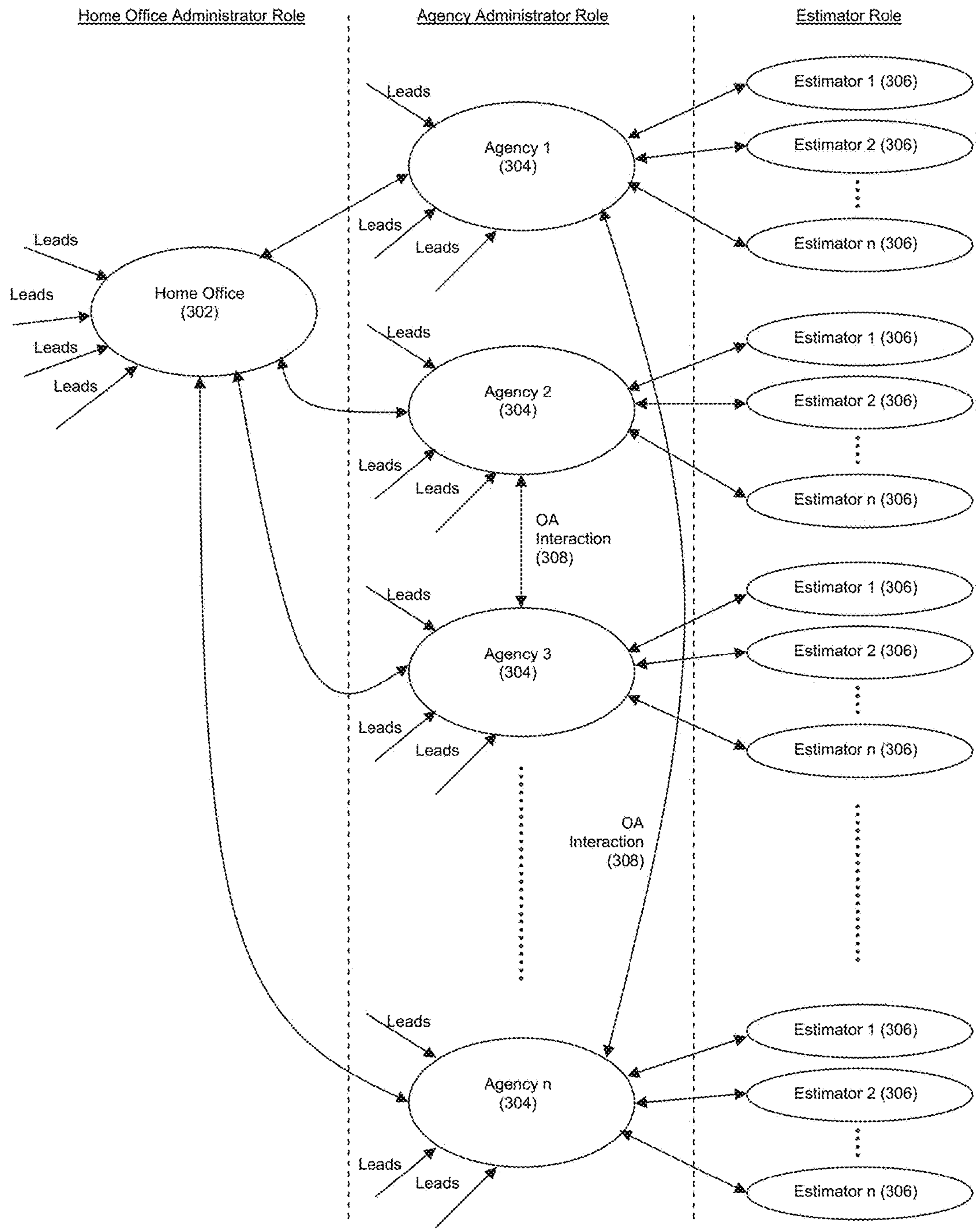
FIGS. 3(*a*) and (*b*) depict exemplary overviews of the interrelationships among various parties and systems in managing moving industry quotes.
Figure 3B:
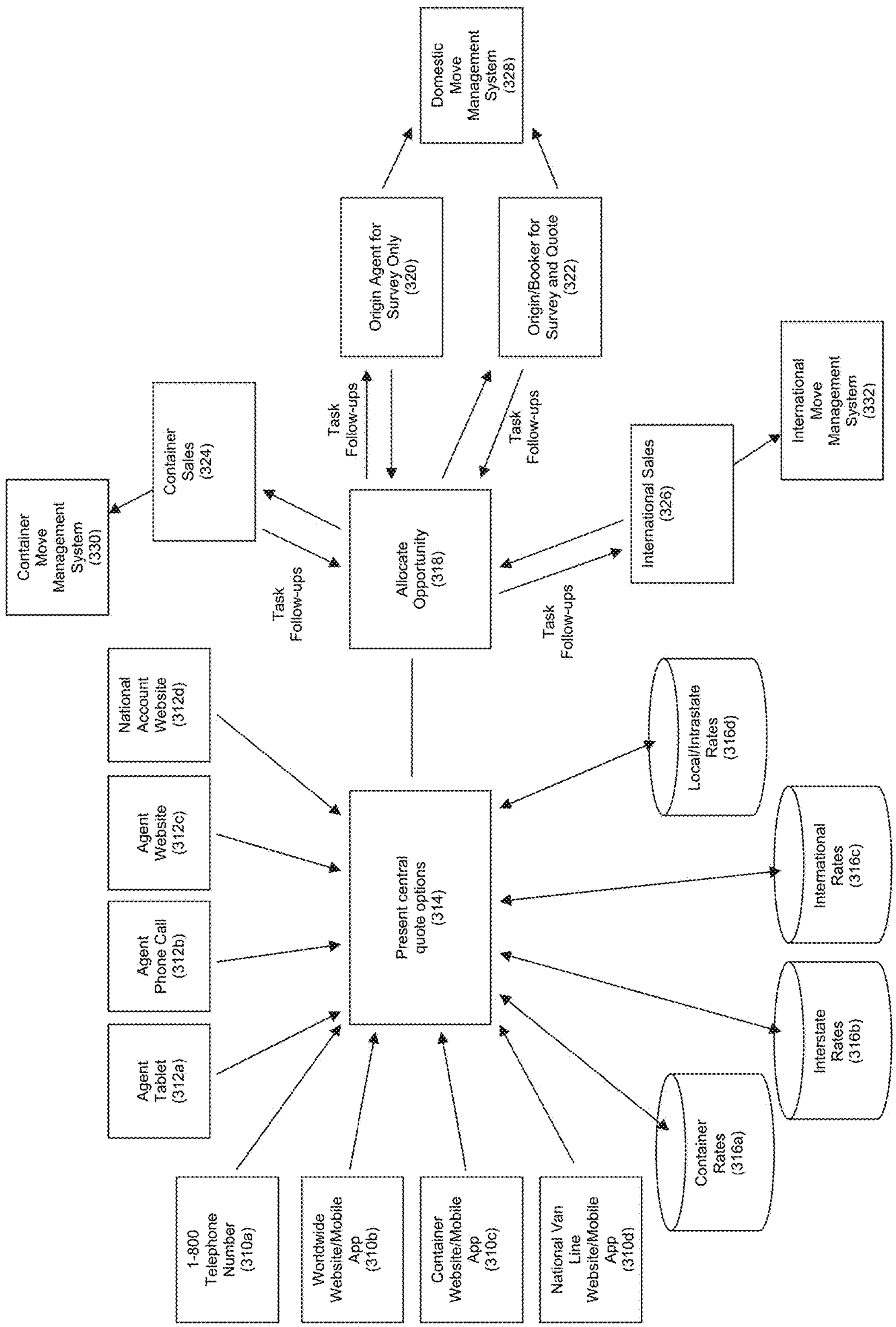
Figure 3C:
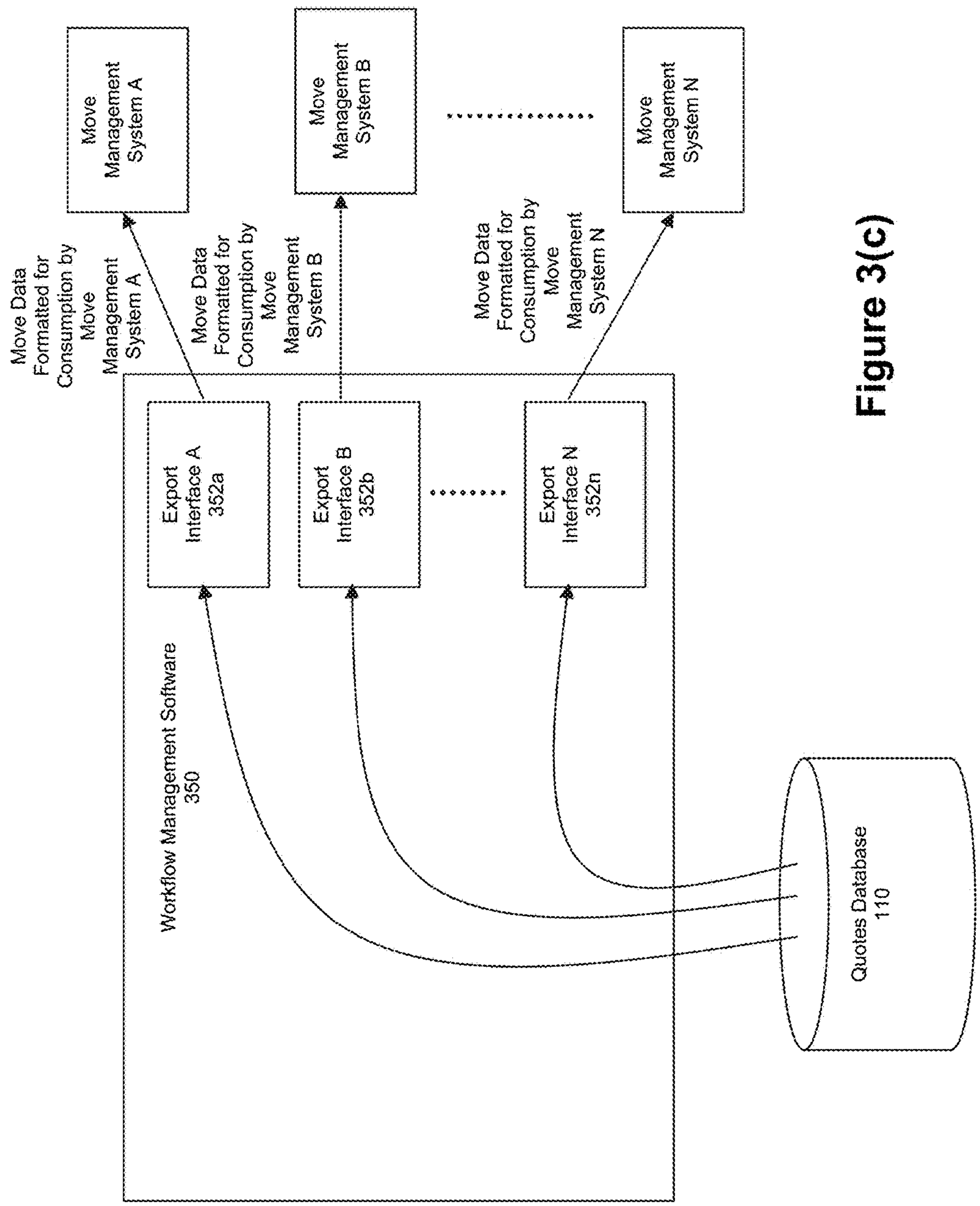
Figure 4A:
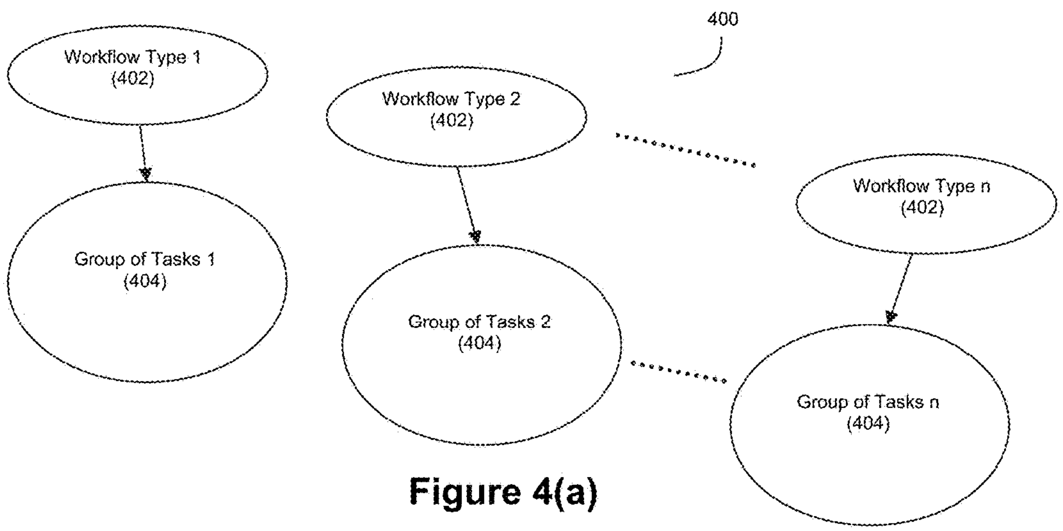
FIG. 4(*a*) depicts exemplary workflow types and their corresponding groups of tasks.
Figure 4B:
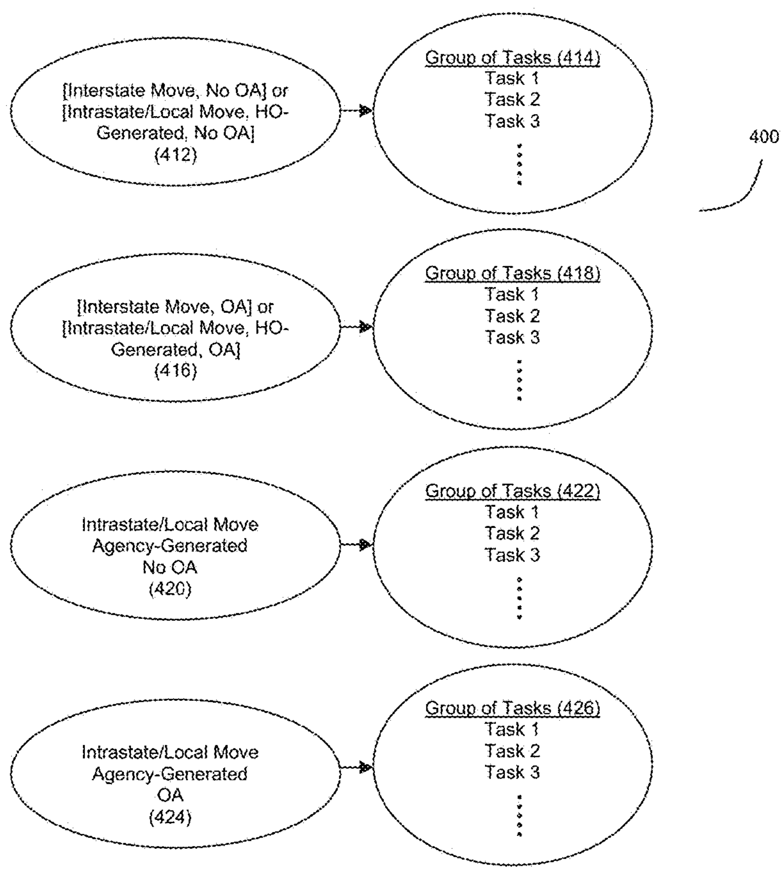
Figure 4C:
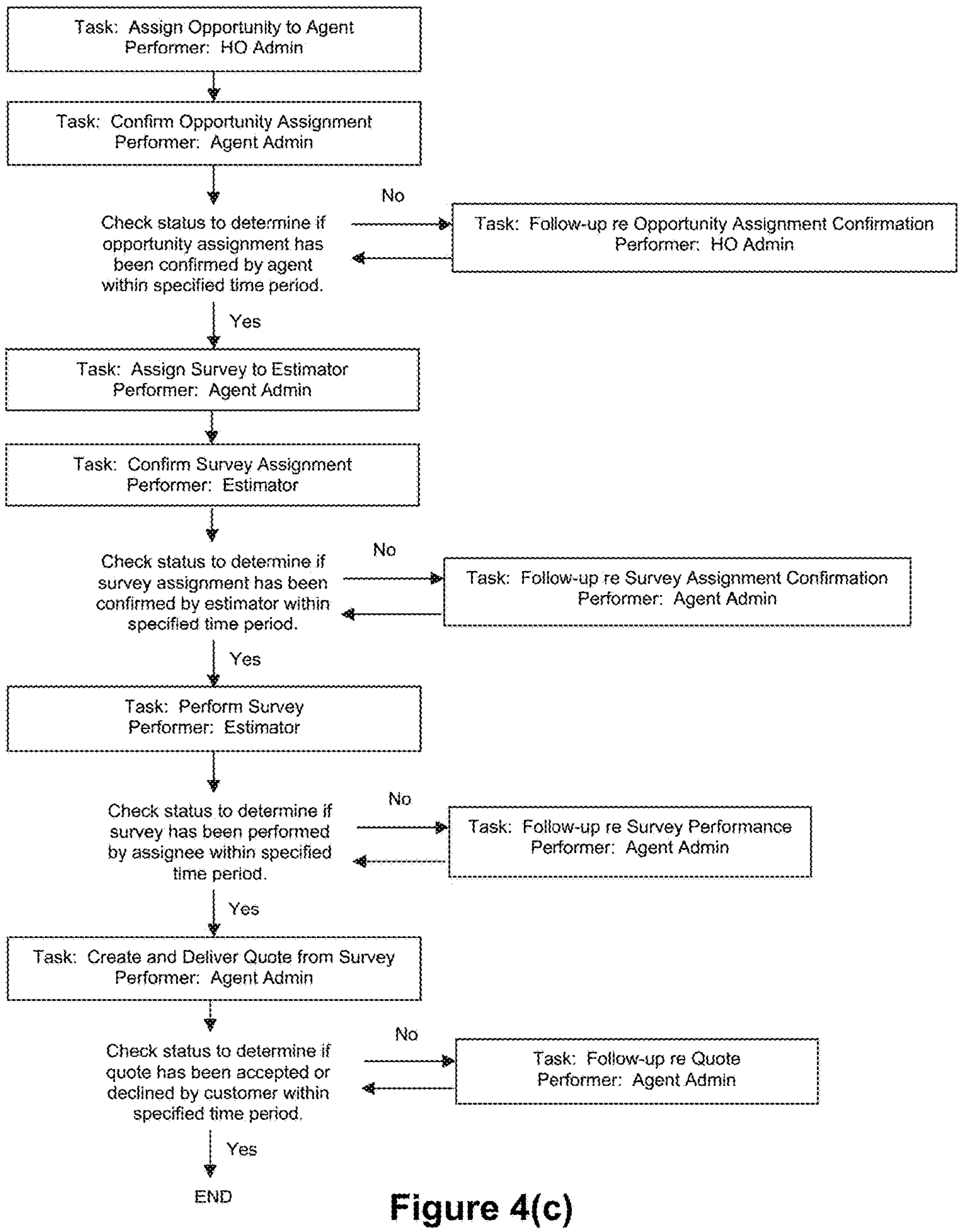
Figure 4D:
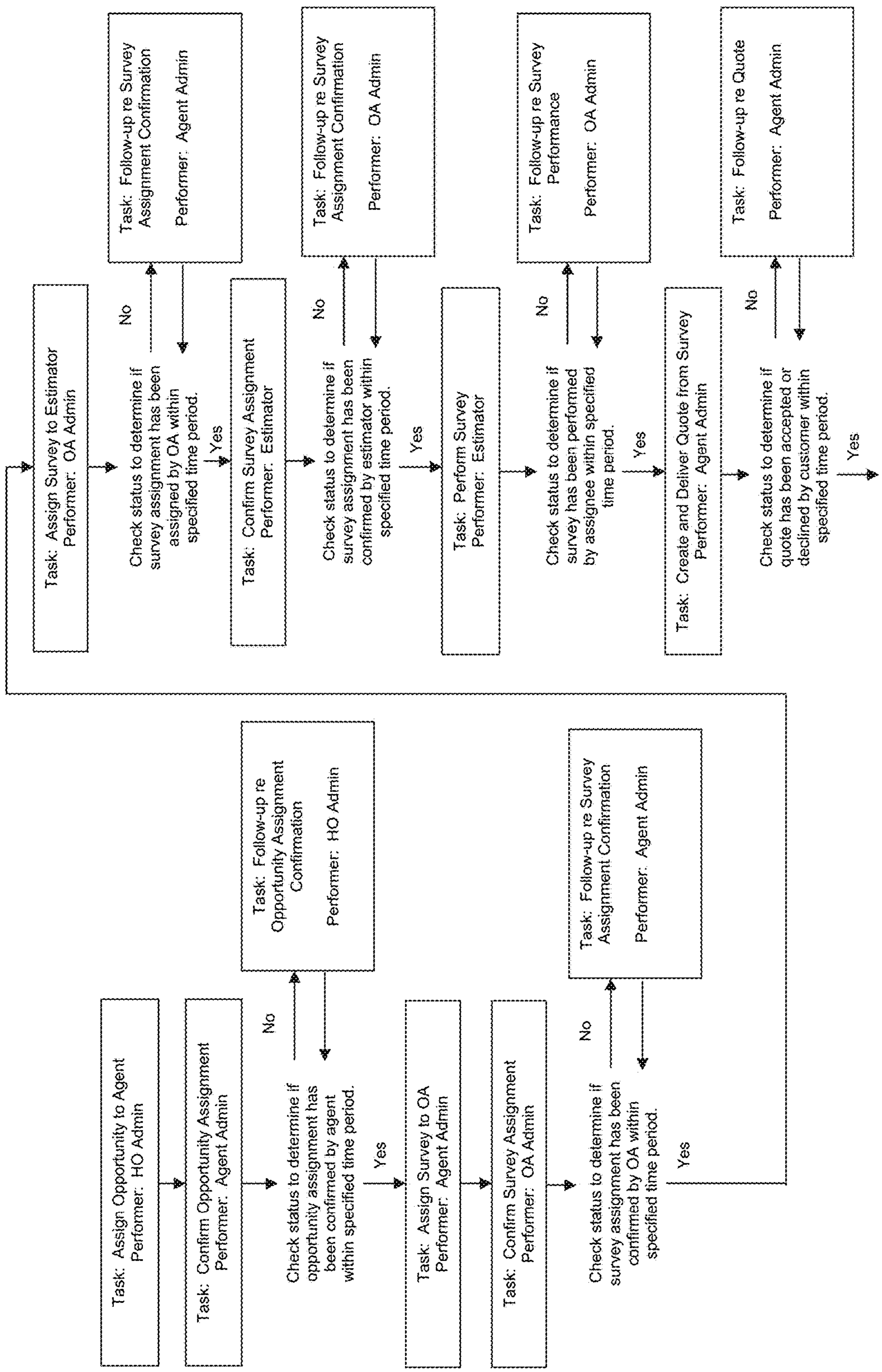
Figure 4E:
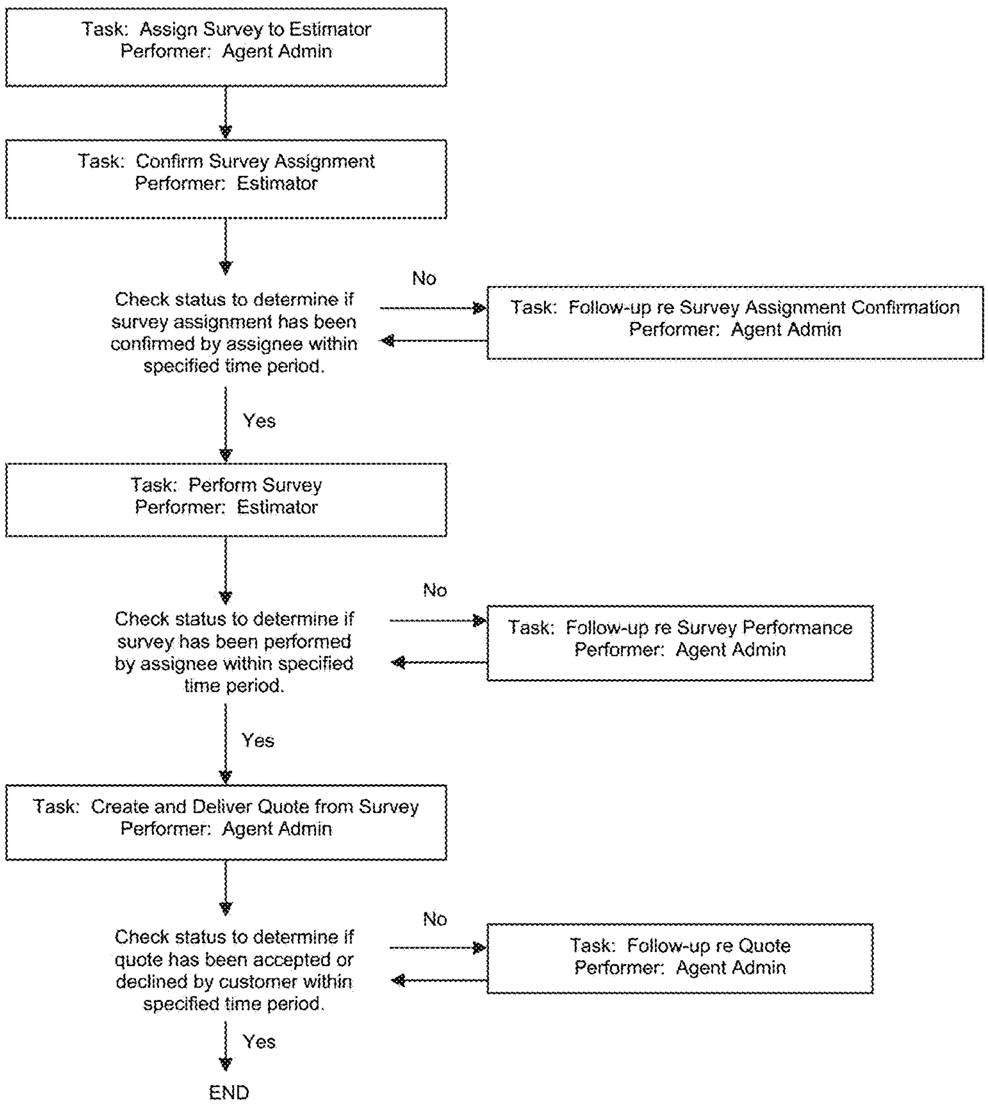
Figure 4F:
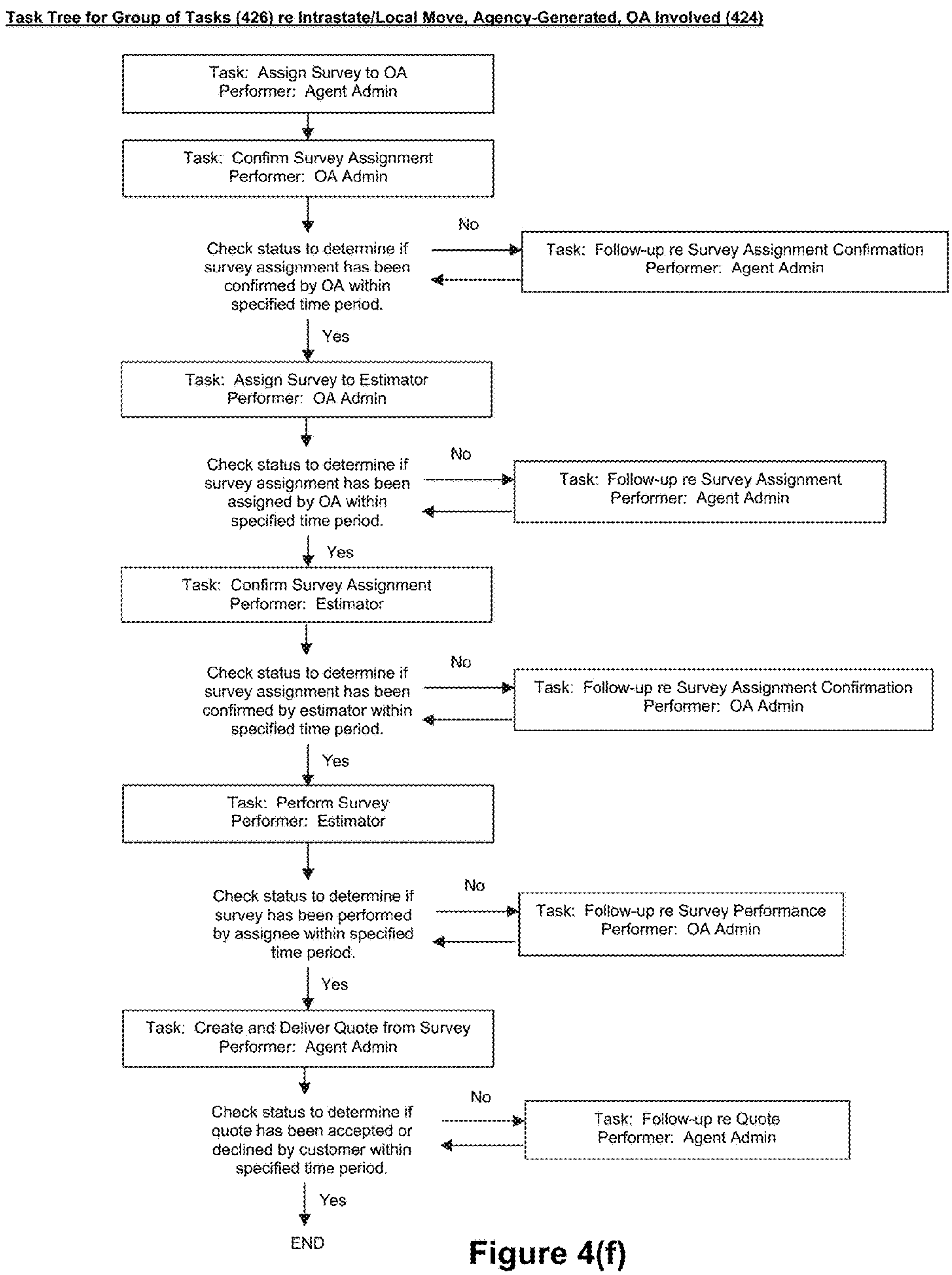

FIG. 3(*a*) depicts an exemplary overview of the interrelationships among various entities when managing moving industry quotes corresponding to the general process flow of FIG. 2. As shown in FIG. 3(*a*), a home office (HO) 302 receives leads from various sources (e.g., a website, call center, etc. as noted above). The HO 302 assigns the opportunities corresponding to these leads to various agent moving companies 304. As noted, these agencies are typically moving companies that perform interstate moves for customers on behalf of a national moving company. The HO 302 can use any of a number of techniques for determining the agency to which to assign any given opportunity. For example, if the HO has relationships with multiple agencies in a given area, it can employ a round robin technique or the like to decide which agency is to receive a given opportunity or some other equitable distribution of opportunities. Moreover, if desired the HO can employ more complex algorithms based on performance metrics associated with the agencies. After receiving an assigned opportunity, an agency 304 can send an estimator 306 to the customer site to perform the survey.

It should also be noted that each agency 304 may also solicit and/or receive its own sales leads, in which case the agency can assign move opportunities for those leads to estimators 306 as needed.

Another relationship that may exist is where an agency has a move opportunity for a customer who does not live in an area that the agency services (for example, a moving company that operates in St. Louis but not in Kansas City has a move opportunity for a customer currently living in Kansas City who plans to move to St. Louis). In such a situation, the agency 304 may hire another agency that does operate in the area of the move origin to perform the survey. As noted above, the hired agency at the move origin can be referred to as the origin agent (OA). After an OA receives a move opportunity from a referring agency (see exemplary OA interactions 308 shown in FIG. 3(*a*)), the OA can send an estimator 306 to the customer site for the survey. Such OA relationships may also potentially arise in situations where a referring agency has a heavy workload.

FIG. 3(*a*) also shows the three primary roles that users of the workflow management system occupy in an exemplary embodiment—an HO administrator role, an agency administrator role (which may include OA administration duties), and an estimator role. Users in these roles perform a plurality of tasks during the quote management process, and as noted above, the aggregation of these tasks can be referred to as a workflow.

FIG. 3(*b*) illustrates a high level framework in which the workflow management system implementing the concepts of FIG. 3(*a*) can interconnect with other business systems. As shown in FIG. 3(*b*), a central quoting process 314 can be fed with leads from a variety of sources, both home office sources 310 (e.g., a worldwide website/mobile application 310*a*, a container website/mobile application 310*b*, a national van line website/mobile application 310*c*, and a toll-free telephone number 310*d*) and agency sources 312 (e.g., an agent tablet 312*a*, and agent telephone call 312*b*, an agent website 312*c*, and a national account website 312*d*). The sales opportunity corresponding to an incoming lead is allocated via process 318 to appropriate personnel for handling various tasks with respect to the move transactions corresponding to the leads. For example, leads corresponding to container moves can be allocated to container salespeople 324 who interact with the customer to facilitate the delivery of a quote for a container move to the customer. Leads corresponding to interstate or intrastate/local moves can be allocated to an OA for customer surveying (process 320) or to an OA or booker for customer surveying and quoting (process 322) as appropriate. Leads corresponding to international moves can be allocated to international move salespeople 326 who interact with the customer to facilitate the delivery of a quote for an international move to the customer.

Different rate data structures 316 (e.g., container rates 316*a*, interstate rates 316*b*, international rates 316*c*, and local/intrastate rates 316*d*) are accessed as needed by the quoting process 314 to apply appropriate pricing to the subject move transactions.

In the exemplary embodiment of FIG. 3(*b*), in response to customer acceptance of a quote for a container move, the workflow management system preferably sends the data for the accepted quote to a separate container move management system 330. A container move management system 330 is a software application for use by a moving company that facilitates a moving company's performance of a container move in accordance with a move contract on behalf of the customer. In response to customer acceptance of a quote for an interstate or intrastate/local move, the workflow management system preferably sends the data for the accepted quote to a separate domestic move management system 328. A domestic move management system 328 is a software application for use by a moving company that facilitates a moving company's performance of an interstate or intrastate/local move in accordance with a move contract on behalf of the customer. In response to customer acceptance of a quote for an interstate move, the workflow management system preferably sends the data for the accepted quote to a separate international move management system 332. An international move management system 332 is a software application for use by a moving company that facilitates a moving company's performance of an international move in accordance with a move contract on behalf of the customer.

A noteworthy feature of exemplary embodiments that can be seen in FIGS. 3(*a*) and (*b*) is that an integrated workflow management system for managing moving industry quotes can allow national moving companies and agency moving companies to manage their quotes while sharing the same integrated system. That is, the same integrated system can be used by (1) a national moving company to manage quotes for moves that will involve one or more agent moving companies, (2) agent moving companies to manage quotes in situations where they are acting as agents (including origin agents) of a national moving company, and (3) agent moving companies to manage quotes in situations where they are not acting as agents of a national moving company but instead are acting on their own behalf. To achieve such a capability, an exemplary embodiment of the workflow management system supports flexible workflows for a number of different types of move transactions.

Another noteworthy feature of exemplary embodiments that can be seen in FIG. 3(*b*) is that different move management systems can receive move data from the same centralized quoting system. As part of this, it should be understood that each moving company may employ its own move management systems, in which case the centralized quoting system can be configured to communicate with each of the subject move management systems. For example, Moving Company A may employ Domestic Move Management System X while Moving Company B may employ Domestic Move Management System Y. As part of step 213 shown in FIG. 2, the workflow management system can employ multiple interfaces with the different move management systems through which to communicate the data for a move contract in a format that can be interpreted by each move management system. Such programming interfaces can be configured to translate the data for the move transaction corresponding to the move contract to a format expected by the move management system associated with each programming interface. FIG. 3(*c*) illustrates an exemplary embodiment for such an arrangement, wherein quote workflow management software 350 includes export interfaces 352*a*, 352*b*, . . . 352*n* for communicating move data from quote database 110 to Move Management Systems A, B, . . . , N in formats for consumption by those move management systems.

Furthermore, the quote management process comprises multiple types of workflows, as indicated in FIG. 4(*a*). Each workflow type 402 has an associated group of tasks 404. The group of tasks 404 corresponding to a particular workflow type 402 may be different than the group of tasks for another workflow type. Which workflow type is applicable to a given move transaction will depend upon the specific details of a particular move opportunity. Moreover, the group of tasks 404 associated with a given workflow type 402 can be characterized as a task tree where various tasks within the group may have conditional dependencies as to when and whether they arise during a given move transaction. For example, a task whereby a user is to follow-up with another party in the move transaction about the another party's performance of a task may be conditional on whether the another party performs its task by a particular date or whether some other threshold condition is met. If the another party timely performs its task, the follow-up task within the group of tasks 404 will not come to fruition, but if the another party does not timely perform its task, then the follow-up task will become active (and it will appear on the task list of the user who has responsibility for managing the another party).

The exemplary grouping 400 of workflow types 402 and task groups 404 shown in FIG. 4(*a*) can be represented in the database 110 by a plurality of workflow data structures 114 as noted in connection with FIG. 1(*b*). Each workflow data structure 114 can identify the tasks with the corresponding task group 404 (e.g. via a tasks data structure that identifies the tasks within the task group) and the conditions governing which tasks in the corresponding task group 404 will be active based on a state of a move transaction.

FIG. 4(*b*) depicts exemplary workflow types that may be employed in connection with an exemplary embodiment of the workflow management system. One exemplary workflow type can be a workflow type 412 which has its corresponding group of tasks 414. Workflow type 412 can be applicable to move transactions for customers who plan to move across state lines and for which a national moving company will utilize an agency moving company to handle aspects of the quoting process without employing an OA. Workflow type 412 can also be applicable to move transactions for customers who plan to move intrastate or locally and for which the sales lead was received by the HO of a national moving company and for which an OA is not needed. FIG. 4(*c*) depicts an exemplary task tree for the group of tasks 414 corresponding to this workflow type. Each task shown in FIG. 4(*c*) is identified by a description of the task and the party who is to perform that task. Also, as shown in FIG. 4(*c*), various follow-up tasks can be created depending on the transaction status, as shown. For example, the workflow management software can check the subject move transaction to see if the party assigned to perform a particular task has performed that task within a specified time period (e.g., within 24 hours). If not, a follow-up task can be created for the party upstream from the non-performing party within the workflow to reduce instances of delayed task performance. Also, while in this example a move that can be characterized as an "Interstate Move, No OA" is subject to the same workflow as an "Intrastate/Local Move, HO-Generated, No OA", it should be understood that if desired by a practitioner, these two types of move transactions could be associated with different workflows having their own task trees.

Another exemplary workflow type can be a workflow type 416, which has its corresponding group of tasks 418. Workflow type 416 can be applicable to move transactions for customers who plan to move across state lines and for which a national moving company will utilize an agency moving company that will select an OA to perform at least some of the tasks 418. Workflow type 416 can also be applicable to move transactions for customers who plan to move intrastate or locally and for which the sales lead was received by the HO of a national moving company and for which an OA will be utilized to perform at least some of the tasks. FIG. 4(*d*) depicts an exemplary task tree for the group of tasks 418 corresponding to this workflow type. Thus, relative to the group of tasks 414 for workflow type 412, the group of tasks 418 for workflow type 416 can include tasks to be performed by both an agent administrator user and an OA administrator user. Furthermore, while in this example a move that can be characterized as an "Interstate Move, OA Involved" is subject to the same workflow as an "Intrastate/Local Move, HO-Generated, OA Involved", it should be understood that if desired by a practitioner, these two types of move transactions could be associated with different workflows having their own task trees.

Another exemplary workflow type can be workflow type 420, which has its corresponding group of tasks 422. Workflow type 430 can be applicable to move transactions for customers who plan to move intrastate or locally and for which the sales lead was received by the agency and for which an OA is not needed. FIG. 4(*e*) depicts an exemplary task tree for the group of tasks 422 corresponding to this workflow type.

Another exemplary workflow type can be an workflow type 424, which has its corresponding group of tasks 426. Workflow type 424 can be applicable to move transactions for customers who plan to move intrastate or locally and for which the sales lead was received by the agency and for which an OA will be utilized to perform at least some of the tasks. FIG. 4(*f*) depicts an exemplary task tree for the group of tasks 426 corresponding to this workflow type.

While FIG. 4(*b*) identifies various exemplary workflow types, it should be understood that more or fewer workflow types can be employed depending upon the needs and desires of a practitioner. Further still, it should be understood that the task trees of FIGS. 4(*c*)-(*f*) are also exemplary only, and that other task trees could be employed if desired by a practitioner. For example, more, fewer, and/or different follow-up tasks could be employed. As an example, a second layer of follow-up tasking can be added to the workflows of FIGS. 4(*c*) and (*d*) that involve the HO administrator following up with an agency administrator to ensure a timely assignment of a surveying task to an estimator. Moreover, some practitioners may choose to empower estimators to perform the task(s) relating to quote creation/delivery.

Also, separate task workflows could be defined for the business process of creating quotes for container moves. In such a scenario, a practitioner may want to omit tasks involving an on-site survey from an estimator and instead rely on inputs from a customer as to the type of container needed. Furthermore, separate task workflows could be defined for the business process of creating quotes for national account moves. Further still, separate task workflows could be defined for the business process of creating quotes for international moves.

As another example, different roles could be employed with one or more of the workflow types. In some instances, a practitioner may want to provide customers with an option to perform self-surveys in which case the estimator role would be played by the customer rather than by someone engaged by a moving company. In such an arrangement, the customer could access various web pages supported by the quote workflow management system where the web pages would provide the customer with access to GUIs similar to those accessed by estimators through their tablet computers. These GUIs would guide the customer through the process of providing the system with the information needed to prepare a quote.

Further still, some move transactions may involve multiple components, each of which may have its own workflow. If desired by a practitioner, international moves could fall into such a category. For example, in its most complex form, a single customer may be moving internationally, placing some of his goods in container storage, moving some goods to a local relative, moving other goods to an interstate relative, and moving the remainder of the goods internationally. In such a case, the overall move transaction would comprise 4 different types of moves. It is noteworthy that the same quoting system can leveraged to generate a quote that accounts for all of these move components, with a quoting task workflow that supports the generation of that quote. Each subcomponent of the quote can be characterized as a subquote with the centralized software able to efficiently manage the generation of accurate subquotes performed by appropriate parties and drawing from appropriate rate data structures for ultimate aggregation into a single overall quote that fulfills the customer's needs.

As another example, additional party-specific workflow types could be employed. For example, Agency A may desire a different workflow for a certain type of move transaction than Agency B. To accommodate this, separate workflow data structures could be maintained for Agency A and Agency B that permits each of Agencies A and B to realize its desired sequence of tasks in connection with a particular move transaction. As another example, Agency C may want to implement a different workflow in situations where Agency C refers work to an OA, but wants to further customize the workflow by OA. By way of example, Agency C may have had extensive experience with Agency D as an OA but only rare experiences with other OAs. In such a situation, Agency C may want to implement a workflow with less onerous management oversight by Agency C personnel over task performance by Agency D in the role of an OA while implementing a different workflow with more extensive management oversights when other agencies serve as the OA. However, it should also be recognized that rather than maintaining separate workflow data structures for such OA-differentiated workflows, a single workflow data structure could be maintained but where the conditional instructions within the workflow data structure accommodates the differentiated treatment of OAs. In either event, by appropriately configuring a workflow data structure for each desired workflow type that may arise, the system can provide tremendous flexibility to agencies with respect to customizing their management of move transactions.

FIG. 5 depicts exemplary authorized user data structures 112 that can be stored in the database 110. These structures 112 can store data representative of a unique identifier for an authorized user (see field 500), a name for the authorized user (see field 502), an identifier for the company associated with the authorized user (see field 504), a type for the company (such as identifying whether the company is the HO or an agency) (see field 506), a role for the user within the system (such as identifying whether the user is an agency administrator, an HO administrator or a estimator), and any necessary authorizations that may govern the level of access the authorized user will have in the system or other appropriate data (see fields 510 and 512).

FIG. 6(*a*) depicts exemplary transaction data structures 116 that can be stored in the database 110. Each move opportunity opened by the system preferably results in a transaction data structure 116 being created therefor. To uniquely identify each move transaction, each transaction data structure 116 can store a unique identifier for the subject move transaction (see field 600). Also, the transaction data structure 116 may store an identifier for the workflow type applicable to the subject move transaction. The system software can determine an appropriate workflow type for the move transaction based on the known characteristics of the move transaction. For example, with reference to FIG. 4(*b*), the system can readily ascertain whether a given move transaction corresponds to an interstate move or an intrastate/local move, whether a given move transaction originates as a lead received by the HO or by an agency, and whether an OA will need to be assigned. Such aspects of a move transaction can be stored in the transaction data structure 116 corresponding to that move transaction when the move transaction is created from a sales lead (or when an agency assigns an OA to that move transaction).

Additional information that can be stored in a transaction data structure 116 include data representative of an identifier for the agency that is managing the transaction (if applicable) (see field 604 which can link the move transaction to a company ID 504 in the authorized users data structure (and by virtue of this linkage link the move transaction to one or more authorized users)), an identifier for an OA that has been assigned to the transaction (if applicable) (see field 606 which can link the move transaction to a company ID 504 in the authorized users data structure (and by virtue of this linkage link the move transaction to one or more authorized users)), a transaction state that identifies the current state of the subject move transaction (see field 608), a list of the tasks for the subject move transaction (see field 610) and any other pertinent information for the subject move transaction (see field 612). Examples of such other information can include customer identifying information, survey data generated by the estimator during a survey relating to the subject move transaction, data representative of a quote given to the customer, and data representative of a move contract agreed to by the customer.

The task list field 610 may be populated with a tasks data structure 620 such as that shown in FIG. 6(*b*). The tasks data structure 620 can be populated with the tasks of the task group corresponding to the applicable workflow type defined at field 602. Each task in the tasks data structure 620 is preferably represented by a unique identifier (field 622). Each task in the tasks data structure may also be associated with an identification of the authorized user who serves as the master for the subject task (see field 624 which can link the subject task to a particular user in an authorized user data structure 112). The task master serves as the person who has immediate management oversight over the subject task (e.g., the person who may need to follow up with the person who is supposed to perform the task should the task not be performed in a timely manner). Each task in the tasks data structure may also be associated with an identification of the authorized user who has been assigned the duty to perform the subject task (see field 626 which can link the subject task to a particular user in an authorized user data structure 112). Another field of the tasks data structure (field 628) can identify a status for the subject task (e.g., complete, pending or future (to indicate a task that may arise in the future if its conditions are met for arising)). Any other pertinent information for the tasks can also be stored in the tasks data structure 620 as desired (see field 630).

Figure 7:
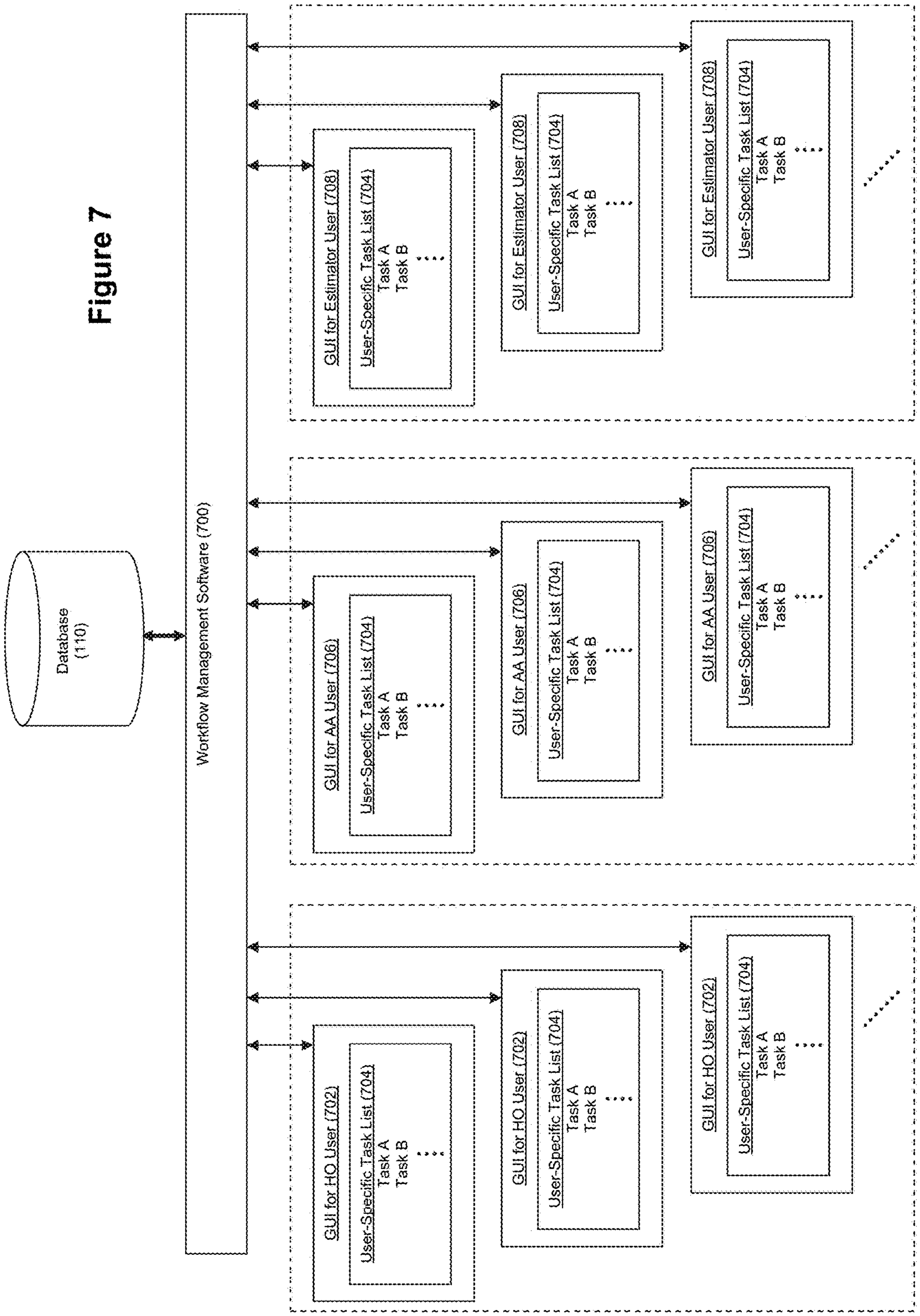
FIG. 7 provides an exemplary overview of different role-specific GUIs with user-specific task lists that provided by the workflow management software to communication devices that access the system.

FIG. 7 depicts how workflow management software 350 executed on processor 102 can manage the workflow for the moving industry quote process in the multi-entity environment shown in connection with FIG. 3(*a*). The workflow management software 350 can be configured to interact with database 110 to provide customized GUIs to the communication devices 106 of authorized users for display thereon, where these GUIs are populated with user-specific list of role-specific tasks for each user. In an exemplary embodiment, the GUIs can be role-specific GUIs such that users having a role as an HO administrator will access different GUIs (and task lists) than users having a role as an agency administrator (AA) or an estimator. This arrangement is illustrated in FIG. 7 where different users having an HO administrator role interact with HO administrator-specific GUIs 702 that are populated with user-specific lists of role-specific tasks 704, where different users having an AA role interact with AA-specific GUIs 706 that are populated with user-specific lists of role-specific tasks 704, and where different users having an estimator role interact with estimator-specific GUIs 708 that are populated with user-specific lists of role-specific tasks 704.

The workflow management software 350 can populate each user's task list 704 by querying the database 110 for all tasks assigned to the subject user that are not yet completed (see the transaction data structures 116 of FIGS. 6(*a*) and (*b*) in combination with the workflow data structures 112 and authorized user data structures 114). As user's perform their various assigned tasks, the workflow management software 350 updates the data structures in the database 110 (particularly the transaction data structures 116). Thus, as conditions change over time (e.g., various tasks or milestones are reached in connection with move transactions), the workflow management software can update and refresh the users' task lists 704.

The workflow management software 350 can also provide task-specific GUIs to communication devices 106 for display thereon that assist users in the performance of their assigned tasks. Such task-specific GUIs are preferably accessed by users in response to selecting a task on the user-specific task list 704 of a GUI such as the GUIs 702, 704 and 706 shown in FIG. 7. Appendices B-D included herewith provide examples of such task-specific GUIs for HO administrators (Appendix B), agency administrators (Appendix C) and estimators (Appendix D) (see also Appendix E which provides additional information about an exemplary embodiment). For example, as shown in Appendix D, estimators can access GUIs that permit them to enter data relating to a survey of the customer's home (e.g., entering data indicative of the items that need to moved from the customer's home), and as shown in Appendix C, agency administrators can access GUIs that permit them to send reminders to estimators about tasks that still need to be performed. Exemplary GUIs for allowing a user to create a quote are shown in Appendices C and D. A user such as an estimator can also use the system to generate multiple quotes for a given move transaction (where these quotes would be based on different move characteristics such as whether packing is included in the move, etc.). The GUIs and forms created by the system can present these multiple quotes in a convenient summarized tabular or side-by-side comparison manner that permits customers to quickly identify the important distinctions between the different quotes and make an intelligent selection from among those quotes. For example, an estimator using a tablet PC to perform a survey at the customer's location may prepare multiple quotes for display in the side-by-side comparison as shown in page 47 of Appendix D, and let the customer view the side-by-side comparison on the tablet PC. This may accelerate the process by allowing the customer to select a quote option on the spot. Moreover, through such comparative displays on the estimator's user interface, estimators can also generate comparative displays for different types of move transactions for a customer (such as a comparative display of a quote where the customer choose a container move to fill his needs and a quote where the customer chooses a conventional interstate or local/intrastate move to fill his needs). With such comparative displays, the software can access the appropriate rate data structures to determine the pricing for each quote. Additionally, as noted above, a single move quote may include multiple services each drawing from unique rate structures, such as services for an intrastate container move, interstate move, and international move all within the same move transaction. Quotes may be sent via email for example, and may be accompanied by various forms, as shown in Appendices C and D. Furthermore, a quote may be sent to the customer via email for "eAcceptance" as described in Appendices C and D.

Moreover, by integrating the tasks of the different entities involved in the moving industry quote process, users are provided with more efficient and systematic views into move transactions than were previously available. This centralization of the quoting process that flexibly supports a multitude of unique quoting workflows provides a consistent and centralized approach to quote generation that is expected to improve customer service for adopters of the system. Through a group of tasks for a particular workflow type that comprises follow-up tasks being created for task masters when an assigned user for a task fails to perform his/her task by a defined time, where the task master may well be an employee of a different company than the assigned user for the subject tardy task (e.g., the task master is an HO administrator for a national moving company while the assigned user is an agent administrator for an agency moving company), administrators are provided with unprecedented visibility into the overall moving industry quote process and will better be able to manage and supervise the performance of various parties in the task chain, thereby resulting in enhanced customer service and improved efficiency. Such visibility also permits administrators to review the schedule calendars of estimators to better allocate workloads among available estimators.

Further still, the workflow management software 350 can promptly notify upstream administrators when move quotes are accepted and become move contracts. This improved visibility into quote conversion (i.e., the conversion of quotes into moving contracts) can provide administrators with better real-time data that can be leveraged for capacity management and dynamic pricing mechanisms (e.g., raising rates when move volume is high and available service capacity is low or lowering rates in opposite conditions). That is the quoting software can be configured to dynamically adjust the rates in the rate data structures as a function of move transaction data stored by the system. For example, the system database 110 can be leveraged to generate a historical view of booked moves (BM) as a function of quotes outstanding (QO) and quotes lost (QL) over time. One or more algorithms could be employed to modulate rates as function of such data values. As an example, the formula below could be employed by the software application to determine an adjusted price as:

$$\text{Adjusted Price} = \text{Base Price} \times \alpha BM \times \beta / (\lambda - t) QO$$

where the variables α, β, and (λ−t) are chosen such that a desired multiplier (less than 1) is applied to the base price in situations where the time is deemed short between the present time and the anticipated move date and where booked moves (BM) are low in relation to capacity (QO) and a desired multiplier (greater than 1) is applied to the base price in situations where the time is deemed short between the present time and the anticipated move data and where BM is high in relation to QO. Such an arrangement would have the effect of lowering prices in times where a moving company has excess capacity and raising prices in times where a moving company has little excess capacity. Moreover, because some moves such as interstate moves tend not to move from QO status to BM status until very close to the move dates, using historical ratios of QO as a function of time can guide a practitioner to devising an appropriate multiplier that can be continually be adjusted over time based on new data.

It should be understood that the algorithm identified above is exemplary only, and other algorithms could be employed by practitioners if desired. Further still, the software application can associate each moving company's rate data structures with its own dynamic pricing algorithm to more flexibly permit companies to control their pricing and capacity realization. Moreover, the software application can further apply different dynamic pricing algorithms to the rates for particular types of moves if desired. That is, if desired by a practitioner, dynamic pricing algorithm X can be applied to the interstate moves of Moving Company A while dynamic pricing algorithm Y could be applied to Moving Company A's container moves.

Figure 10A:
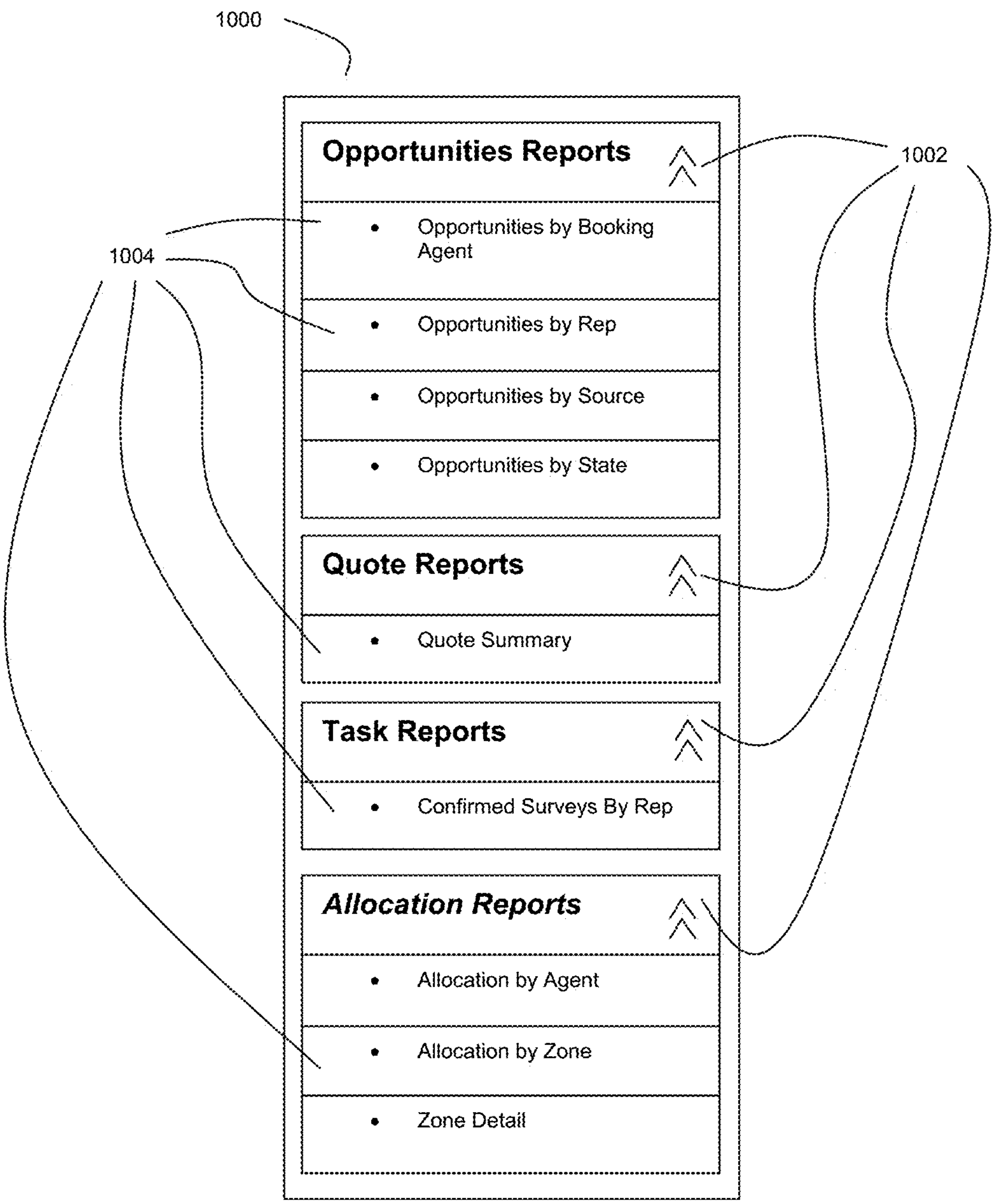
FIG. 10(*a*) shows an exemplary report generation interface.

Another noteworthy feature that can optionally be employed in an exemplary embodiment of the disclosed workflow management system is a robust reporting feature. The data stored in the database 110 about the different move transactions can be processed to generate any of a number of desirable reports (see FIGS. 10(*a*) and (*b*); see also Appendix C). For example, a useful report that can be generated is a closing ratio report that provides statistics about the number of sales leads versus the number of delivered quotes (where this information can be further broken down by additional constraints such as sales leads by source type, closing ratios by agency, etc.). FIG. 10(*a*) shows an exemplary GUI display 1000 through which a user can select from among various reporting options. In this example, buttons 1002 can be selected by a user to view reporting options with respect to different categories of reports. Buttons 1004 can be selected by a user to generate and view a particular report. FIG. 10(*b*) shows an exemplary "Opportunities By Source" report 1010 that provides statistics regarding opportunities over a specified time period that are broken down by different sources (see rows 1012). For each source (e.g., various 1-800 numbers, websites, etc.), the report can further provide data about how opportunities have been handled (see columns 1014), such as closing ratio summaries (e.g., the percentage of opportunities converted into orders, the percentage of opportunities converted into booked surveys) and views regarding quote workflows that are in progress at the HO or agent. It should be understood that the reports of FIG. 10(*b*) and Appendix C are exemplary only, and a practitioner could choose to deploy a reporting feature that generates more, fewer, or different types of reports from the system data if desired.

EXAMPLES

Figure 8A:
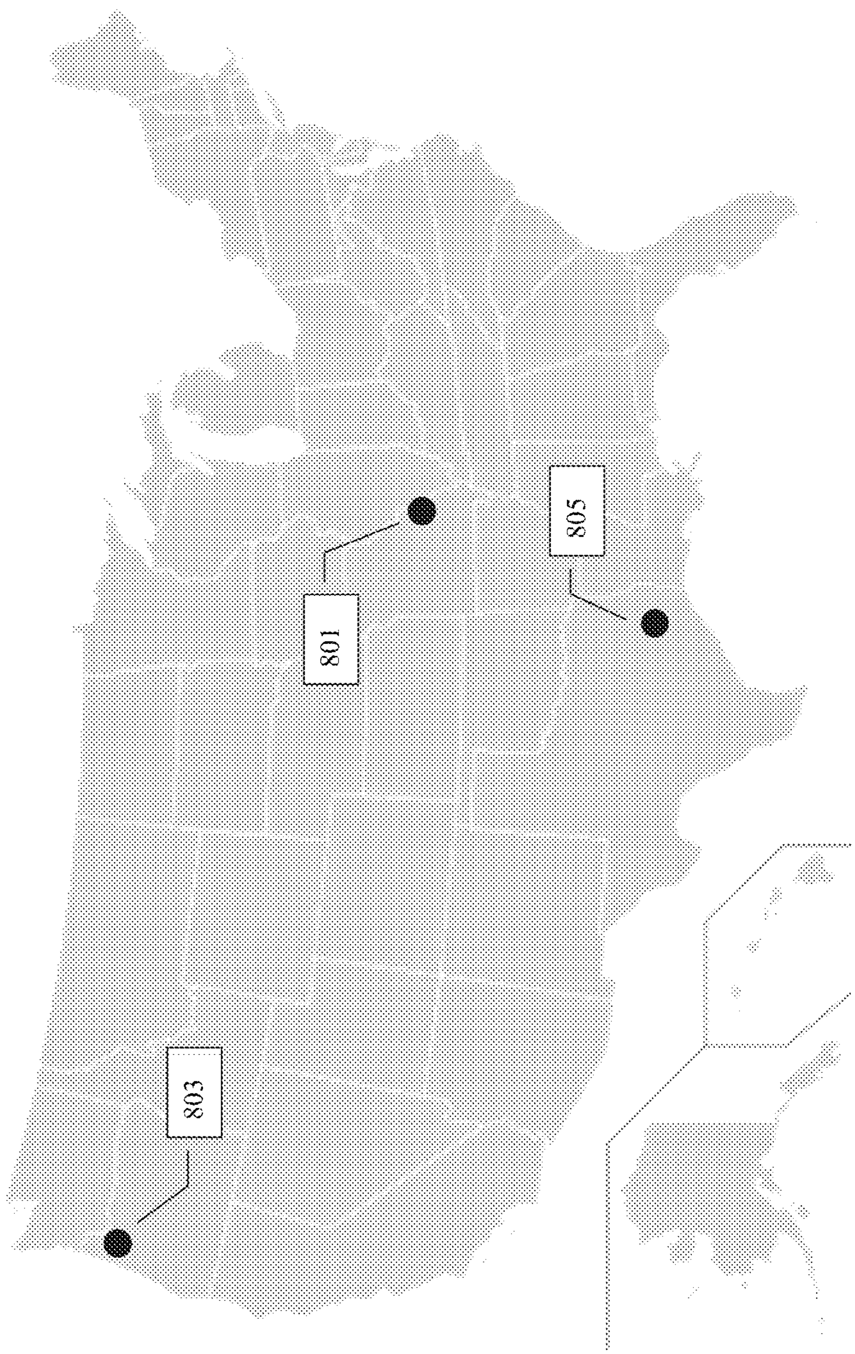
FIGS. 8(*a*) and (*b*) depict the relationships and flow of tasks that may exist between entities for an interstate move in an exemplary embodiment.
Figure 8B:
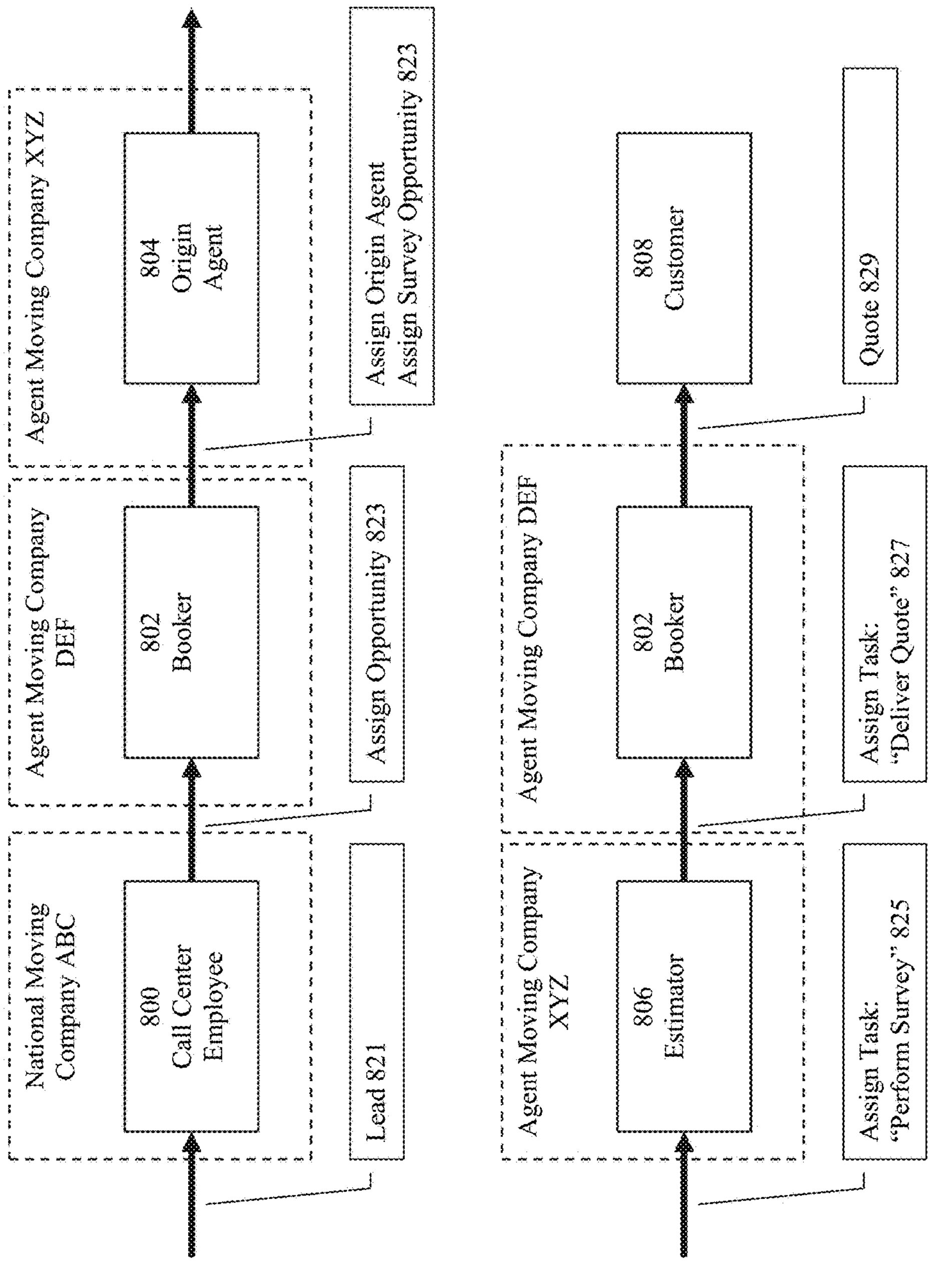

FIGS. 8(*a*) and (*b*) depict the relationships and flow of tasks that may exist between entities in a hypothetical example according to an exemplary embodiment. In this example, it should be understood that the different roles (HO administrator, booker administrator (analogous to the agent administrator), and estimator) need not all be employed by different companies although they are in this example. FIG. 8(*a*) depicts the geographic locations of several hypothetical entities. National moving company ABC has its home office located in Saint Louis, Mo. at location 801. A customer is planning a move from origin 803 in Portland, Oreg., to destination 805 in Houston, Tex. The customer calls the call center at home office 801. FIG. 8(*b*) shows an exemplary flow of tasks between the entities involved in creating a quote. A call center employee 800 answers the call (receives the lead 821) and enters the customer's information into the system (e.g. at step 201) and creates an opportunity. This call center employee 800 may optionally play the role of the HO administrator in the system. The system selects a booker 802, agent moving company DEF, from a plurality of bookers listed in database 110 and assigns the opportunity 823 to the selected booker 802. This assignment could be an automated assignment according to some form of algorithm as noted above, or it could potentially be a manual assignment by the HO administrator. Since this example is an interstate move, in this example, the booker 802 is responsible for managing quoting process for the subject move on behalf of national moving company. Selected booker 802 is then able to view the opportunity in the booker's "My Opportunities" page. (See Appendix C). In this example, the booker does not have personnel available at the move origin to conduct the survey. Thus, booker 802 assigns the survey opportunity 823 to an OA 804 at agent moving company XYZ having an office located near origin 803. (See Appendix C). The survey opportunity 823 then becomes visible to OA 804 in the "My Opportunities" page. The OA then creates a task entitled "Perform Survey" and assigns the task to an estimator 806. The booker 802 and OA 804 are both able to check the status of the "Perform Survey" task, and may follow-up with the estimator 806 to ensure that the survey is completed within an acceptable time frame. The system may also send automated follow-up emails to the booker 802, OA 804, and/or estimator 806. As the estimator 806 conducts the survey, the estimator preferably enters the survey data into the system via a wireless communication device 106. When the survey is complete, the estimator may or may not have authority to prepare a quote for the customer on the spot. In this example the booker has indicated that the booker retains authority to prepare quotes for the customer (e.g., via a data field in one of the stored data structures). The estimator marks the estimate complete, which causes the system to create a new task 827 entitled "Deliver Quote" assigned to the booker 802. The booker 802 creates a new quote 829 based on the survey data and sends the quote to the customer 808. (See Appendix C). The rates used to generate the quote are the interstate rates specific to national moving company ABC that are stored in database 110. Throughout the process, the booker 802 can view the status of the various tasks associated with the opportunity. When the booker 802 delivers the quote 829 to the customer, the booker marks the "Deliver Quote" task 827 complete. If the customer accepts the quote (creates a contract), the system stores the acceptance data in the database 110.

Figure 9A:
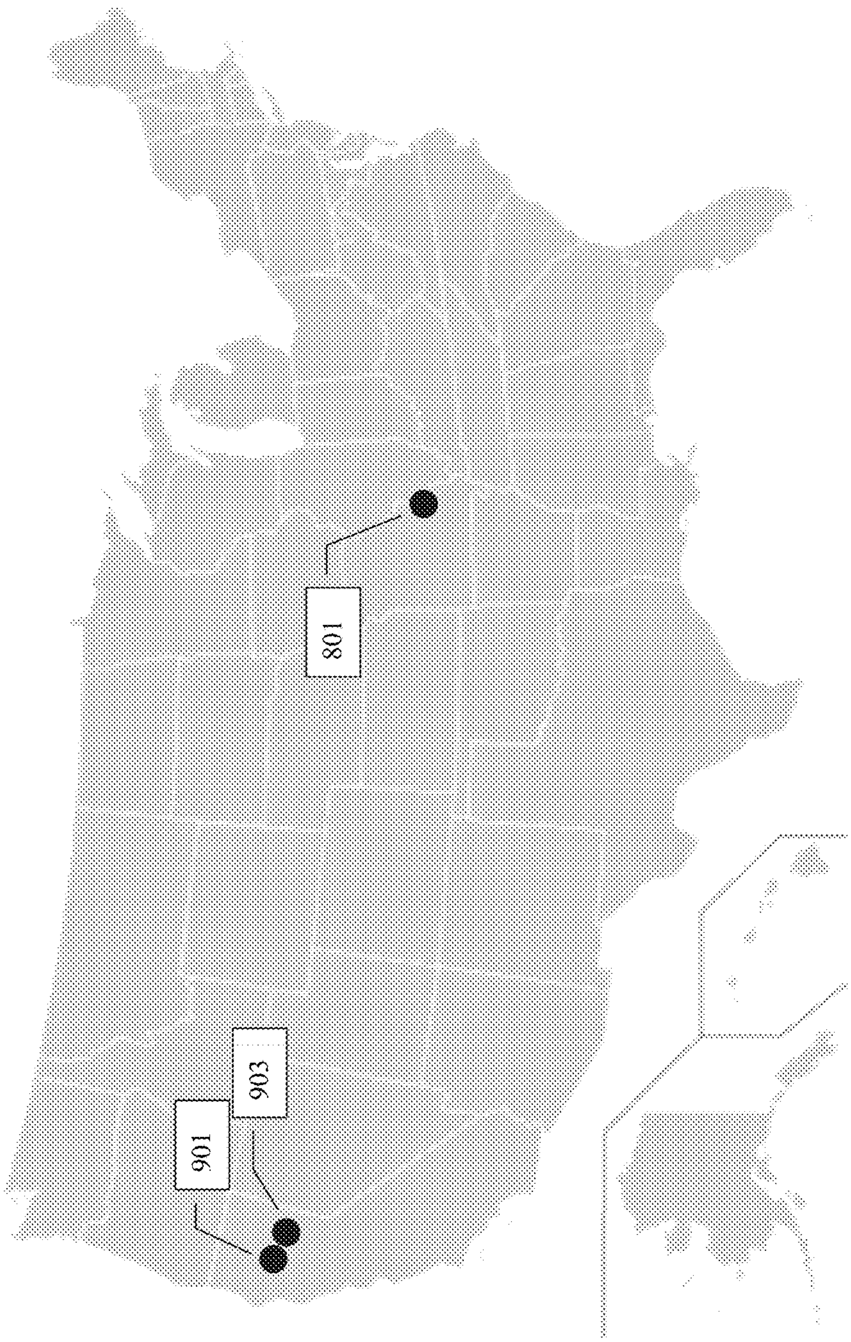
FIGS. 9(*a*) and (*b*) depict the relationships and flow of tasks that may exist between entities for a local move in an exemplary embodiment.
Figure 9B:
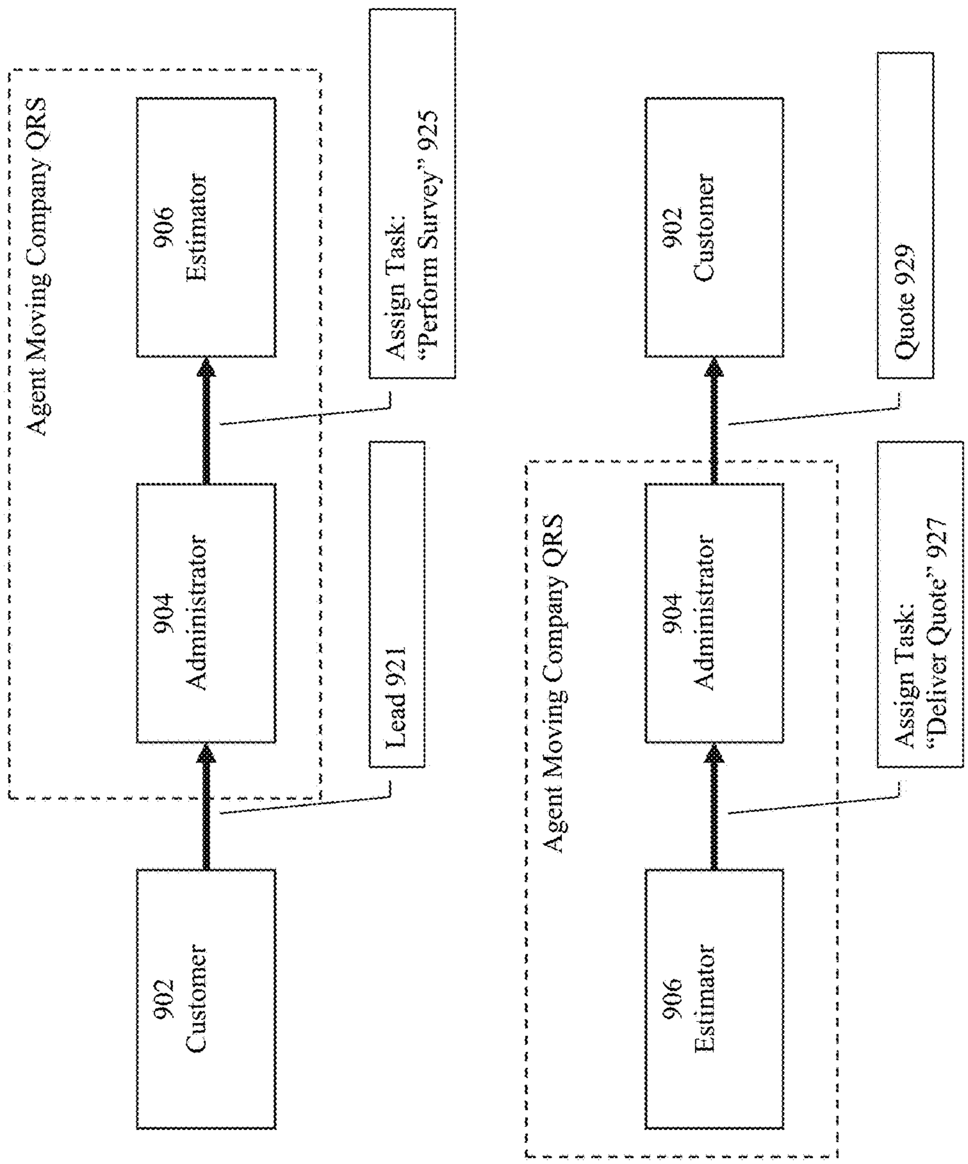

FIGS. 9(*a*) and (*b*) depict the relationships and flow of tasks that may exist between entities in a hypothetical example according to another exemplary embodiment. FIG. 9(*a*) depicts the geographic locations of several hypothetical entities. National moving company ABC has its home office located in Saint Louis, Mo. at location 801. The national moving company in this example hosts the workflow management system but is not otherwise involved in the move transaction. A customer is planning a local move from an origin 901 near Sacramento to a nearby destination 903. FIG. 9(*b*) shows an exemplary flow of tasks between the entities involved in creating a quote. The customer 902 calls the agent moving company QRS to request a quote for the move. An administrator 904 for the agent moving company QRS takes the call and enters the lead information 921 into the system. The administrator 904 creates a new "Perform Survey" task 925 and assigns it to an estimator 906. After the estimator has completed the survey and marked this task complete, the system creates a "Deliver Quote" task 927 assigned to administrator 904. The administrator creates a new quote 929 based on the rates applicable to the agent moving company QRS as determined from database 110, and sends the quote 929 to the customer 902. In an exemplary embodiment, the system does not allow electronic acceptance for local moves, although this need not be the case.

While the present invention has been described above in relation to various exemplary embodiments, various modifications may be made thereto that still fall within the invention's scope as will be recognizable upon review of the teachings herein. As such, the full scope of the present invention is to be defined solely by the appended claims and their legal equivalents.

APPENDIX A

Rates Administration User Guide

Outline

- Setting up local and intrastate rates
- Move Type: Local vs. Intrastate
- Rate Sections
  - Transportation
    - Linehaul Base Rates
      - TIP: Using the Rate Matrix Sections
    - Other Transportation Rates
  - Accessorial Rates
  - Packing Rates
  - Storage Rates
  - Valuation Rates
    - Flat Rate Valuation
    - Per Hundred Dollars Valuation
    - Released valuation
  - Misc Settings
- Regional Rates Setting Up Local and Intrastate Rates Local rates and intrastate are set up at an agency location level. To be authorized to set up agency rates, you must have received the security role EstimateAgentRatesAdmin from your Agency Security Administrator.

Figure 11:
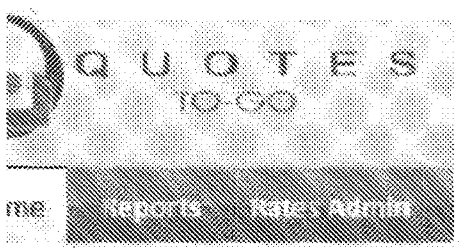

Once you have been assigned that role, the Rates Admin link appears at the top of your screen (see FIG. 11). Only Agent Rate Administrators can see the rates for that agency. They are protected from viewing by other users through levels of security such as those used to store credit card and other sensitive information.

Move Type: Local Vs. Intrastate

Figure 12:
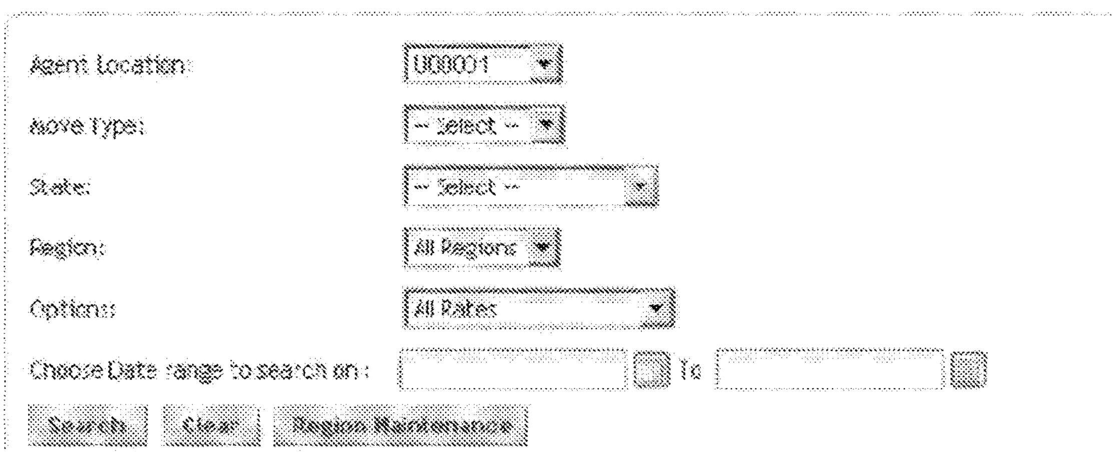

While setting up rates, select the Move Type (see FIG. 12).

Local Move Types do not require a state. Intrastate Move Types require a state drop down. You can enter different rates for more than one state.

Figure 13:
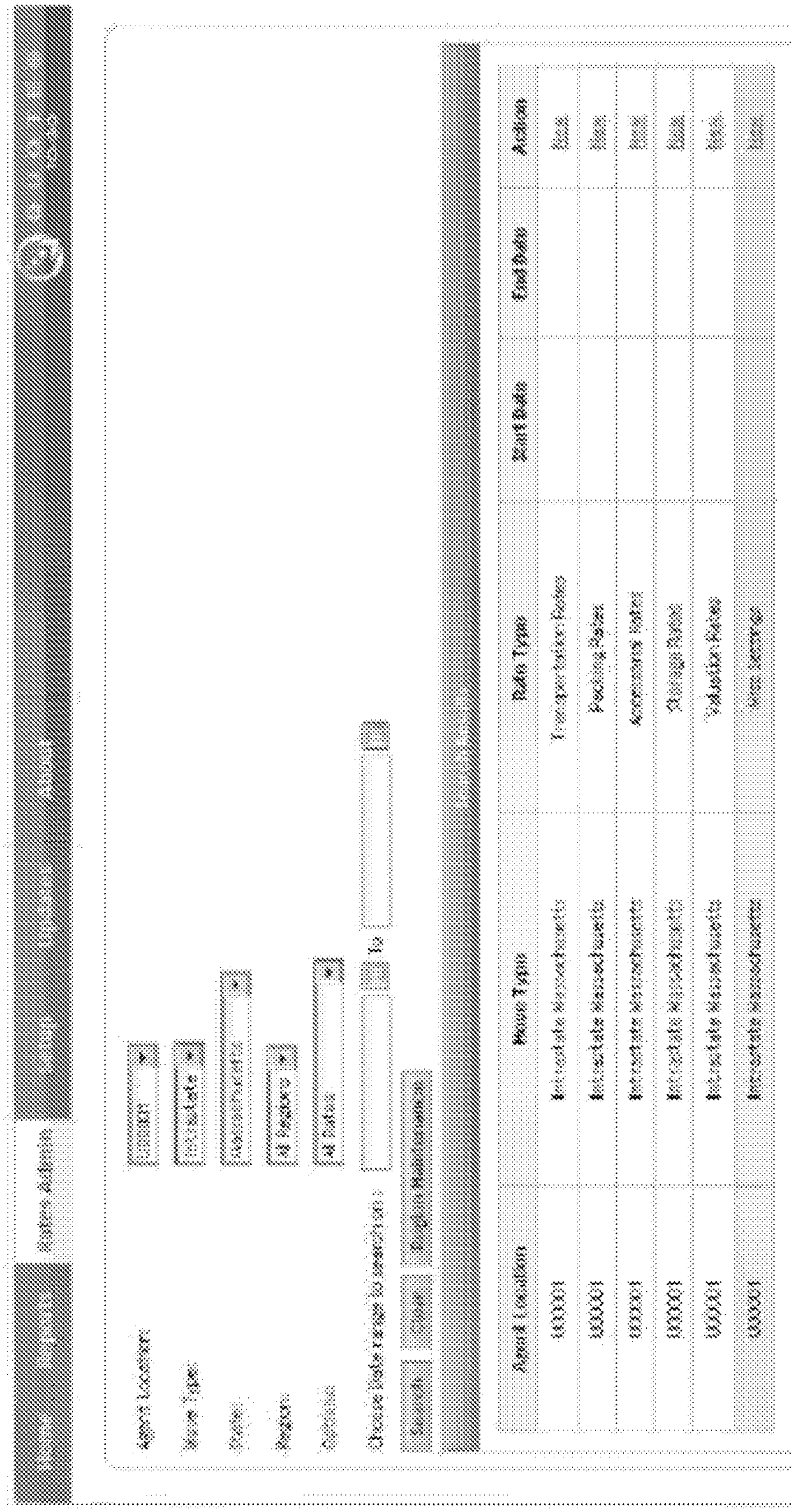

If no rates exist, a list of each of the Rate Type sections is returned (see FIG. 13).

If your state is broken into Regions, see the section entitled Regional Rates.

Rate Sections

Figure 14:
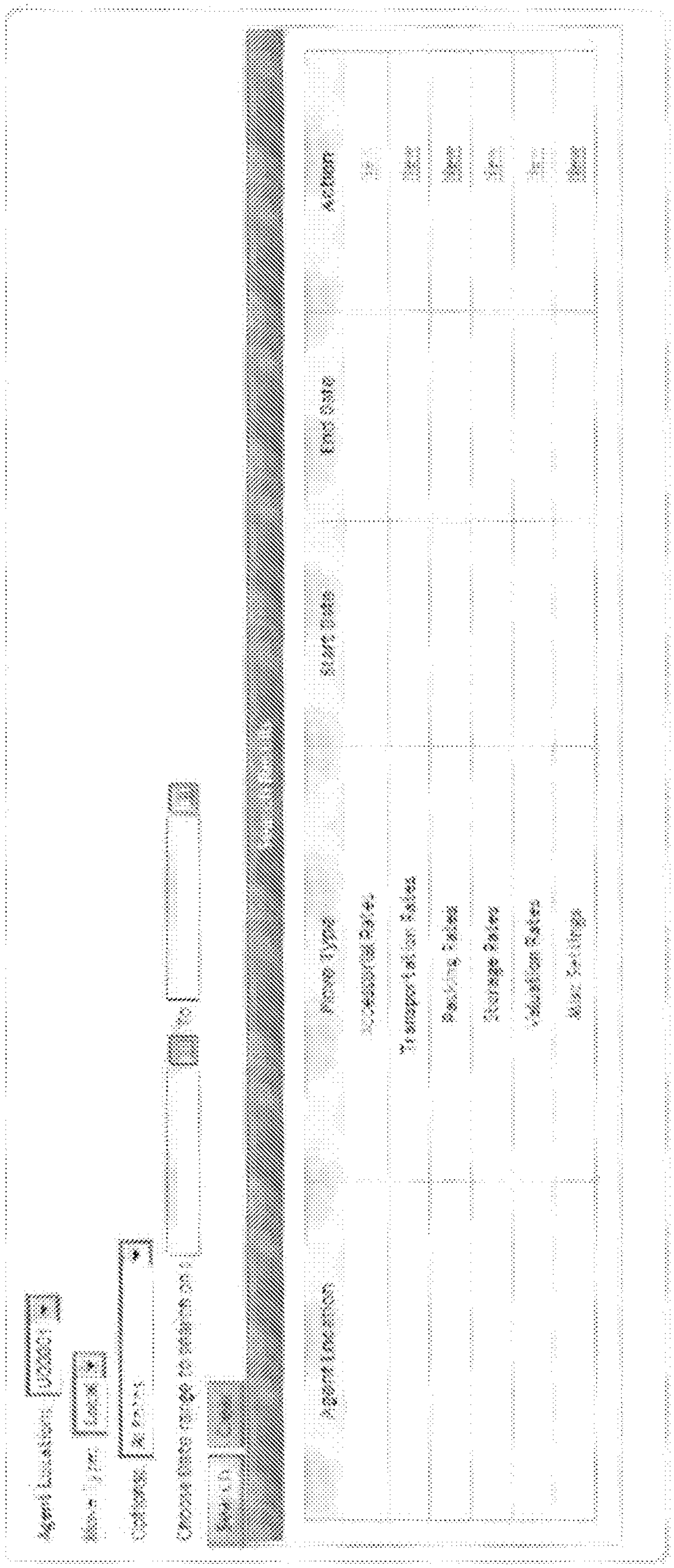

Each section of rates has an effective and end date for the applicable rate period. The system default is that rates are effective immediately without expiration. However, you can use date management to plan for future rate changes. Upon first accessing the screen, no rates are provided, and the screen displays all blank rates as shown in FIG. 14. Select the New link on the Transportation Rates row to begin setting up rates.

Transportation

Select Transportation Rates to begin setting up rates. The selections made here during setup are presented and used by the estimator when creating the estimate. All transportation rate types allow the optional entry of an hourly rate for drive time.

Linehaul Base Rates

There are multiple ways to calculate transportation for local and intrastate rates. Click the blue bar to open each or the transportation rate types.

Figure 15:
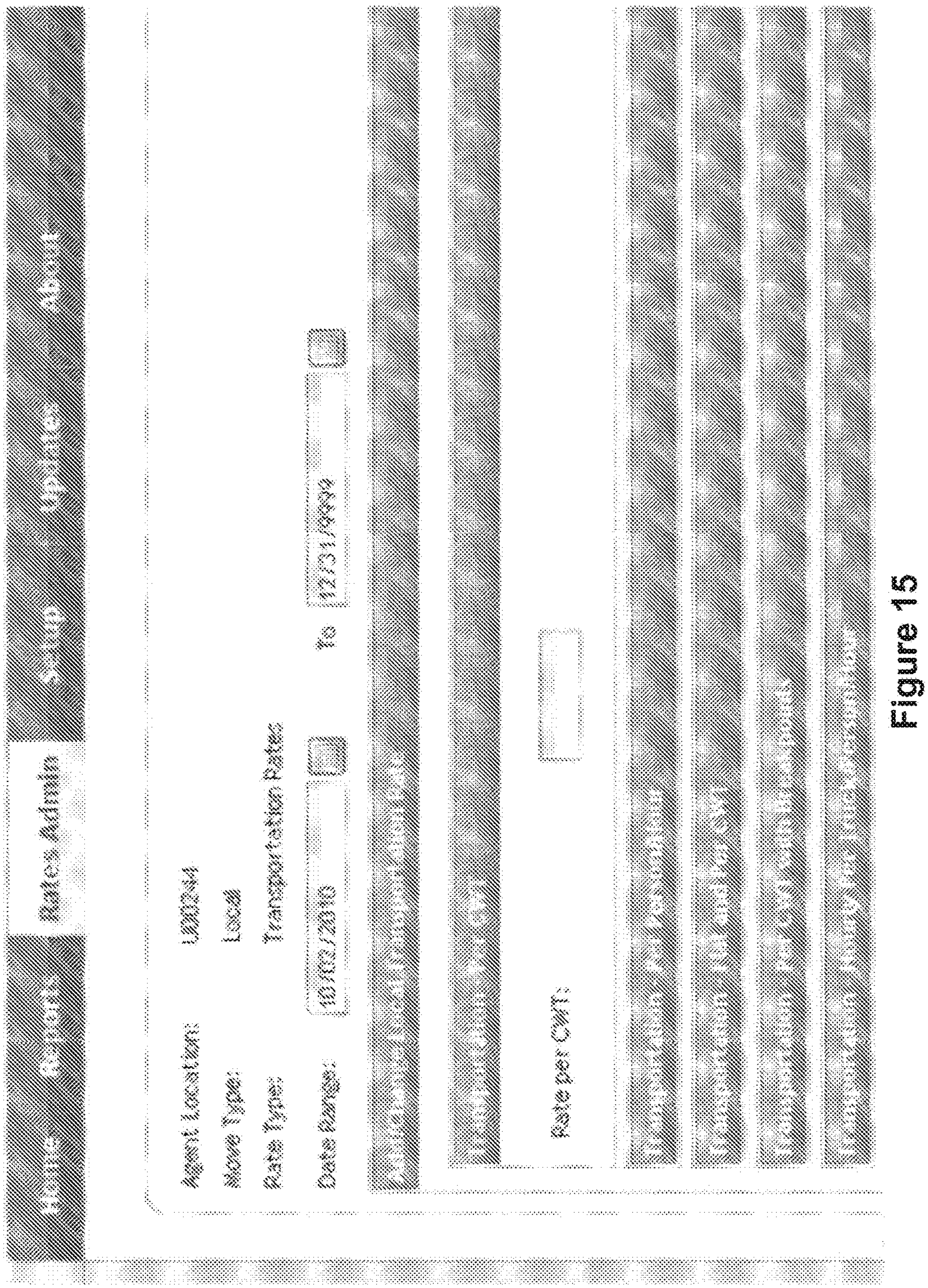

Per CWT: Per CWT (Hundred Weight) allows a rate to be computed per 100 lbs of the shipment (see FIG. 15).

Flat Fees Per Men and Truck: Flat allows a base dollar amount to be charged determined by the crew size assigned to the job (see FIG. 16).

Figure 17:
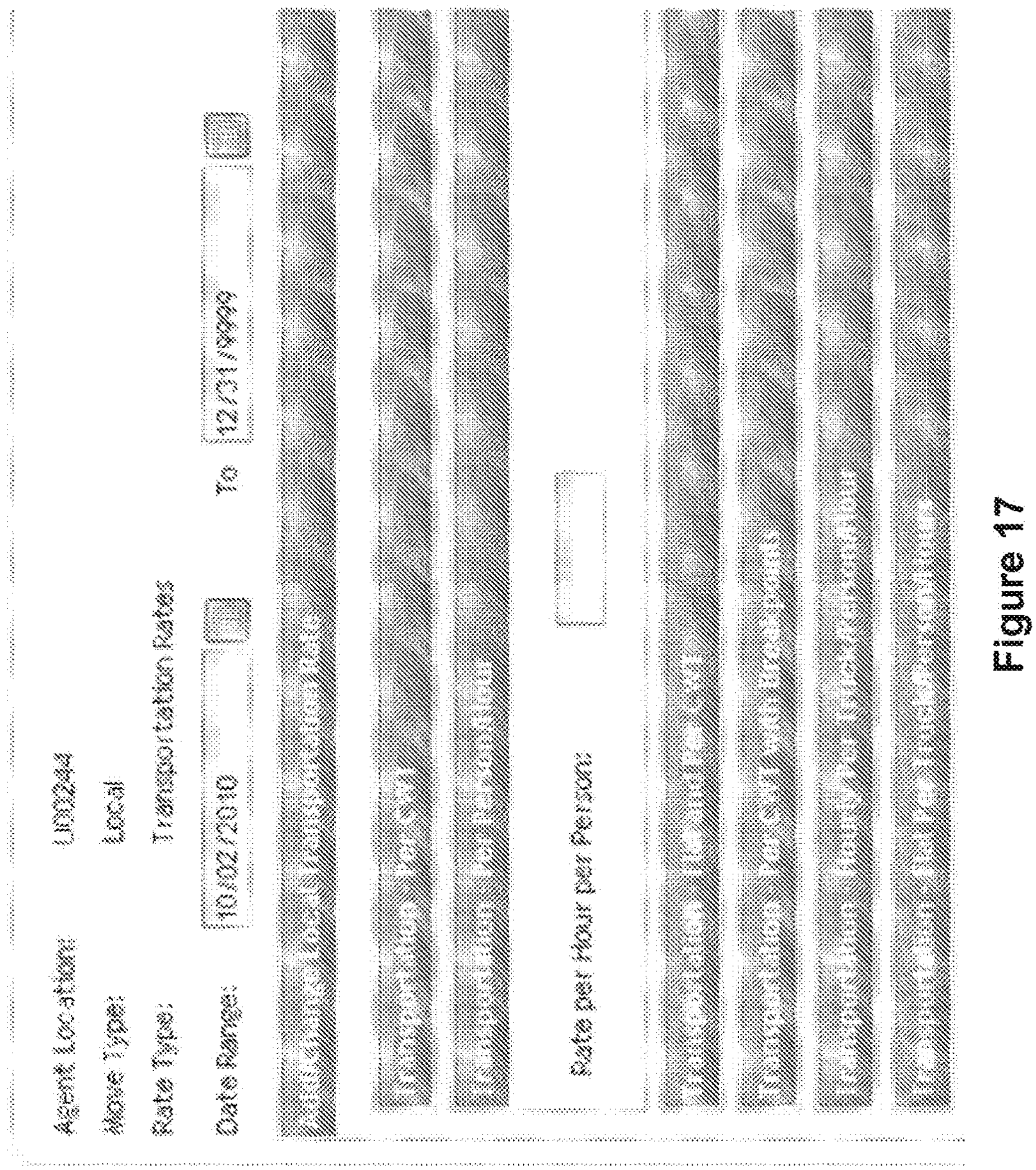

Per Person Per Hour: Allows an hourly rate to be added (see FIG. 17).

Figure 18:
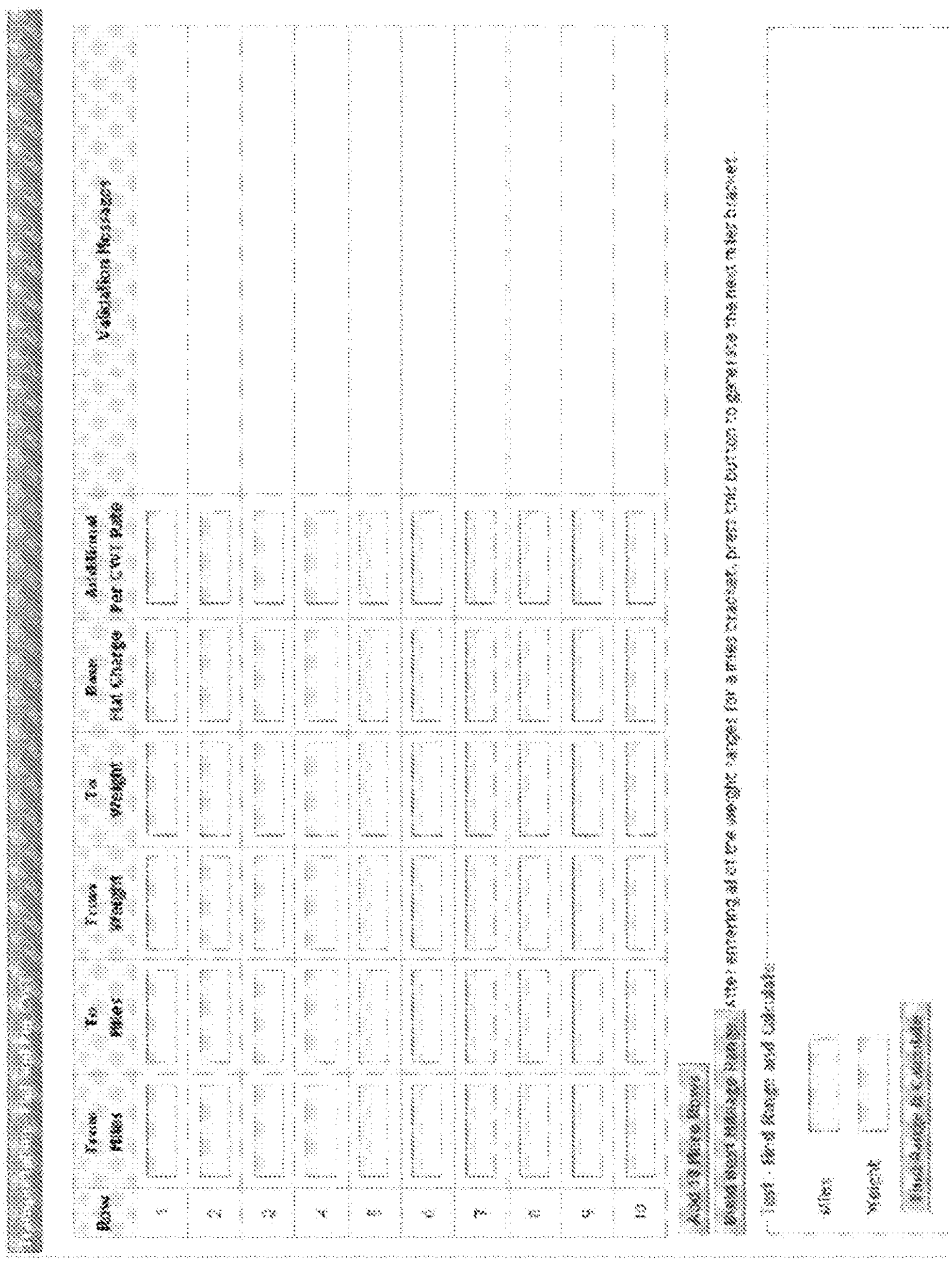

Flat and Per CWT: Allows a table to be created for both mileage and weight to charge a flat charge plus a per CWT charge (see FIG. 18).

Figure 19:
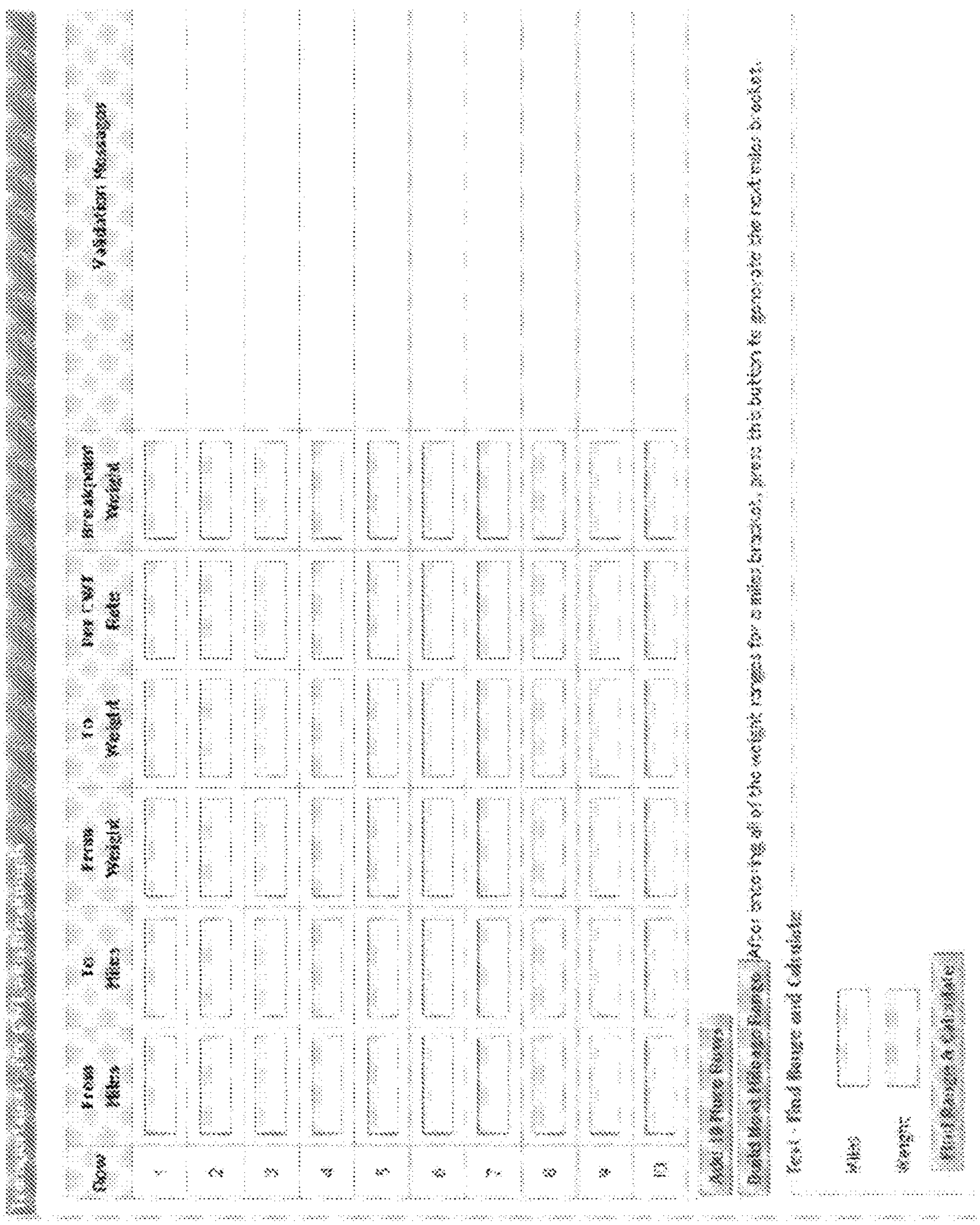

Per CWT with Breakpoints: Allows a table of weight and miles to create a Per CWT with Breakpoint rates (see FIG. 19).

Figure 20:

Per Truck Per Man Hour: Allows more flexibility than the Flat Rate basis by allowing the estimator to enter any number of hours, and specify an hourly rate for either regular or overtime time, as well as additional men, additional truck, additional driver and supervisor rates (see FIG. 20).

TIP: Using the Rate Matrix Sections

"Flat and Per CWT" as well as "Per CWT with Breakpoint" rates use a matrix of rates (which for some intrastate rates can be quite large). To most effectively use this matrix, start with your desired rate matrix published in your local or intrastate tariff.

For example, the tariff may look like FIG. 21.

Figure 22:
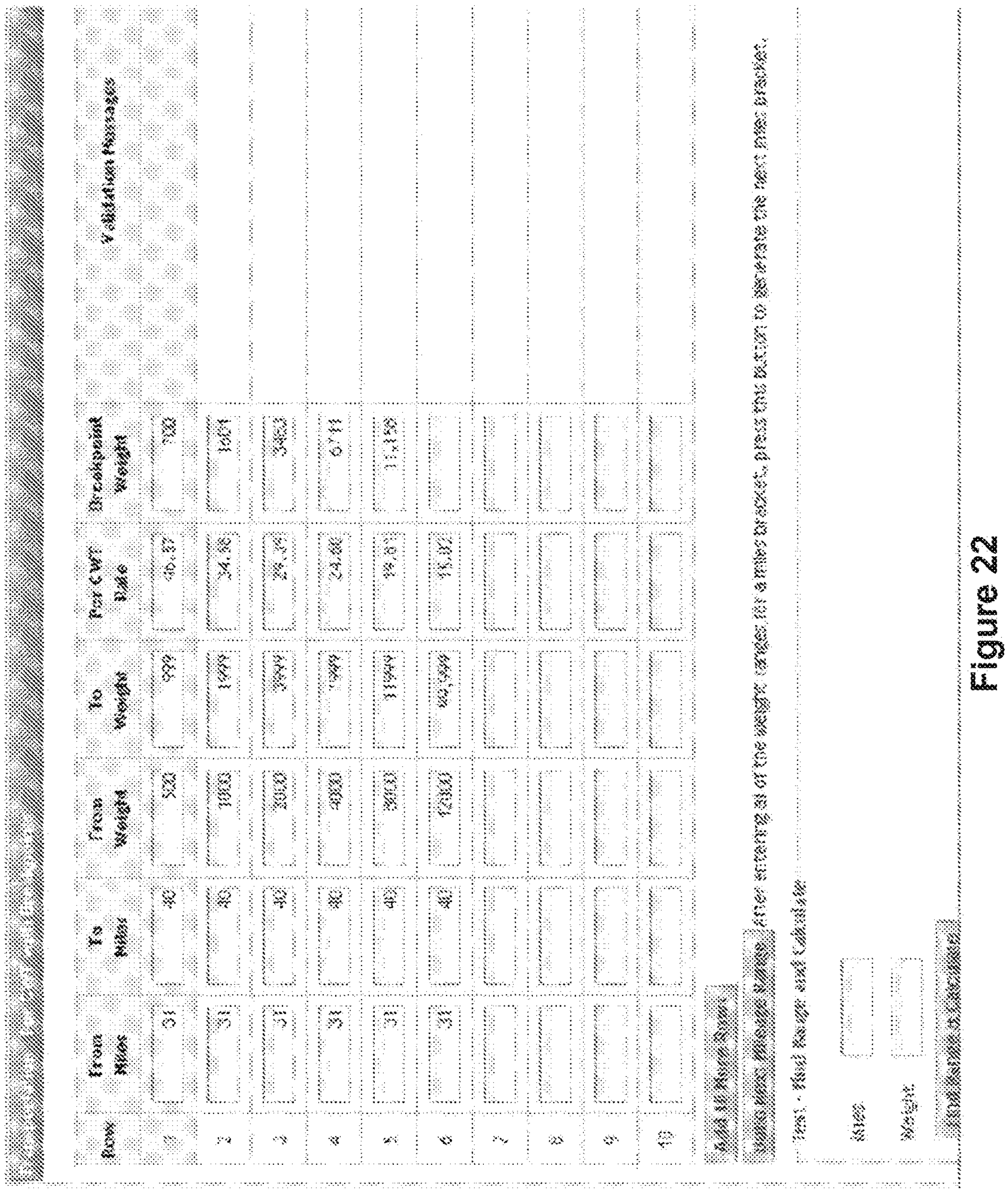

To enter this into Quotes-To-Go, choose Per CWT with Breakpoints as the basis and begin with the first mileage range (see FIG. 22).

In this example, 6 weight brackets were needed to enter the charges for moves between 31 and 40 miles. If there are more than ten weight brackets, click Add 10 More Rows to add weight brackets.

Continue adding the information from the tariff until all the potential weight ranges, rates and breakpoints for the first mileage range have been added.

Then select the Build Next Mileage Range button. This automatically copies the weight brackets for quicker rate entry of the next row.

The blank rows can be ignored, as they disappear when you click Save. Continue by entering the Per CWT and Breakpoint Weight for the mileage range.

Continue this process until all of the mileage ranges have been entered (see FIG. 23).

You can test out the rates to ensure they behave as expected by using the "Test" section of the page (see FIG. 24).

Other Transportation Rates

When calculated, the following transportation rate types should be considered the base charge. These types allow the ability to enter rates for the following charges:

Minimum Weight Charges

Minimum Transportation Charge

Mileage surcharges (i.e., $50 for orders in excess of 50 miles away)

Fuel Surcharges (either Per mile, Per % of Transportation or Per CWT)

Overtime Load/Unload (either Per Hour or Per CWT)

Shuttles (two types: under 25 miles and over 25 miles. Flat rate, Per CWT, or Per men per truck per hour.)

Bulky Articles

Each of these charges is considered optional. However, if entered, they are presented to the estimator when creating estimates.

Once rates have been entered, they display on the original screen with the Start and End Dates listed (see FIG. 25). The Action items indicate that rates exist. Use the links to View, Edit, or Delete existing rates.

Accessorial Rates

Figure 26:
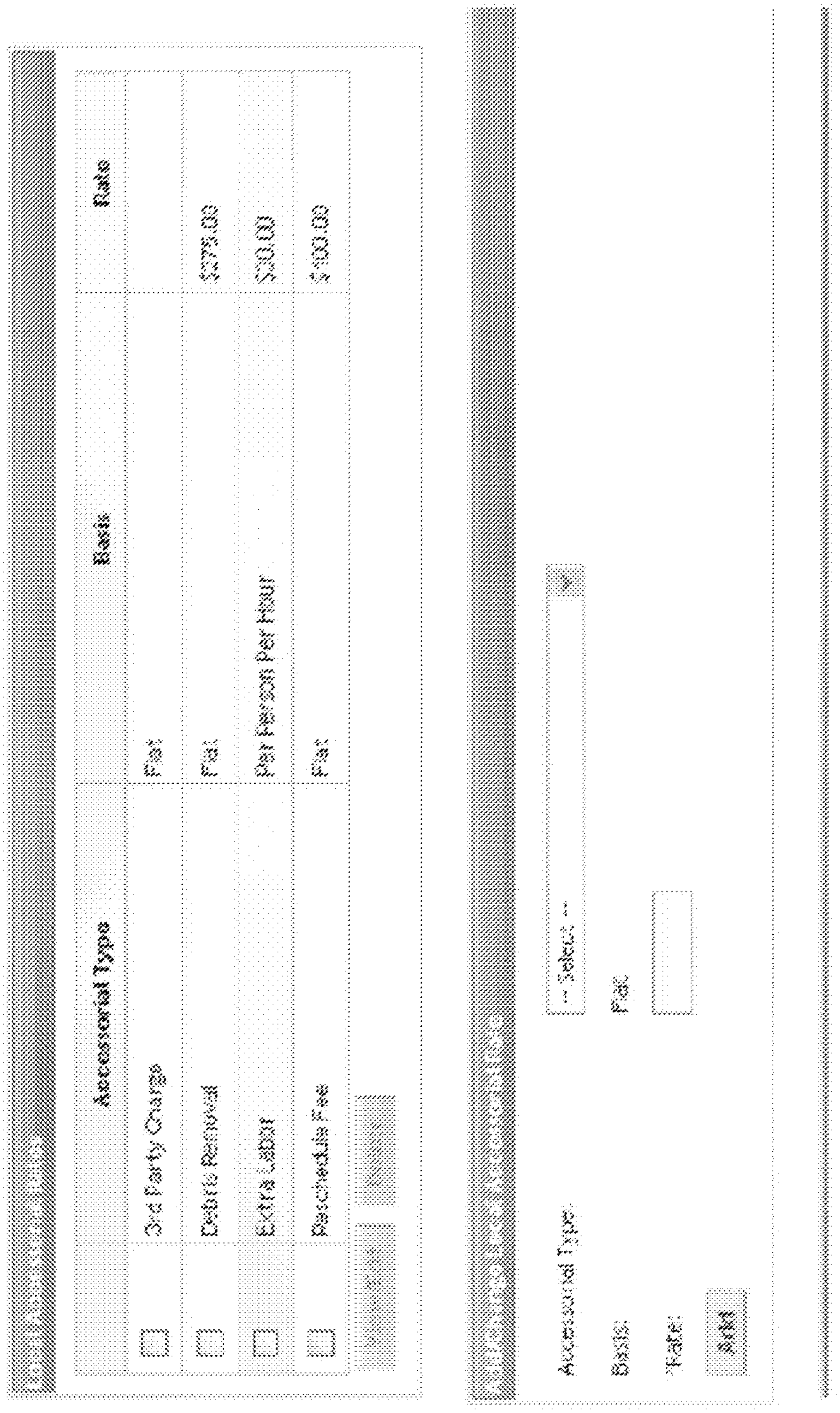

There are multiple accessorial rates available by selecting the New link for the Accessorial Rates move type. These rates include:

3rd Party Charge
Appliance Service—Each Additional Item
Appliance Service—First Item
Bridge/Ferry/Toll
Debris Removal
Distance Carry
Diversion Charge at Destination
Diversion Charge at Origin
Elevator
Extra Labor
Extra Labor Overtime
Extra Stop
Flights of Stairs Inside
Flights of Stairs Outside
Miscellaneous Charge
Organ
Piano
Piano Carry Inside Each Additional Flight
Piano Carry Inside First Flight
Reschedule Fee
Service Charge
Shuttle—over 25 miles
Shuttle—under 25 miles Selecting an accessorial rate type automatically adds the rate to the estimators section for entry (see FIG. 26).

Packing Rates

Selecting the New link for Packing Rates allows you to enter rates (see FIG. 27):

on a per carton basis by entering Packing, or Unpacking rates as an hourly rate as a % Packed based on CWT Carton Only pricing is entered on the Packing Rates screen.

If you have one rate that includes both the packing and the carton, enter the rate in the Packing Rate field and NOT the Carton Only field.

You can add Full Pack and/or Full Unpack rates based on percent packed with regular and overtime rates (see FIGS. 28 and 29).

Storage Rates

Storage allows for a:

Minimum Weight

Drayage rate per CWT

Drayage Rate per CWT By Rate Ranges

Drayage Out Rate Per Mile Per CWT

Drayage Out Rates Per CWT by Weight Ranges

Drayage Fuel Surcharge (flat, per mile, percentage)

Storage based on a daily range (i.e. a first day rate, and subsequent days)

Storage based on a monthly rate

Warehouse Handling Fees

Climate Controlled Storage rates

Valuation: Full-Value, Depreciated Value, Release Value levels

Sales Tax rate on Perm storage

Figure 30:
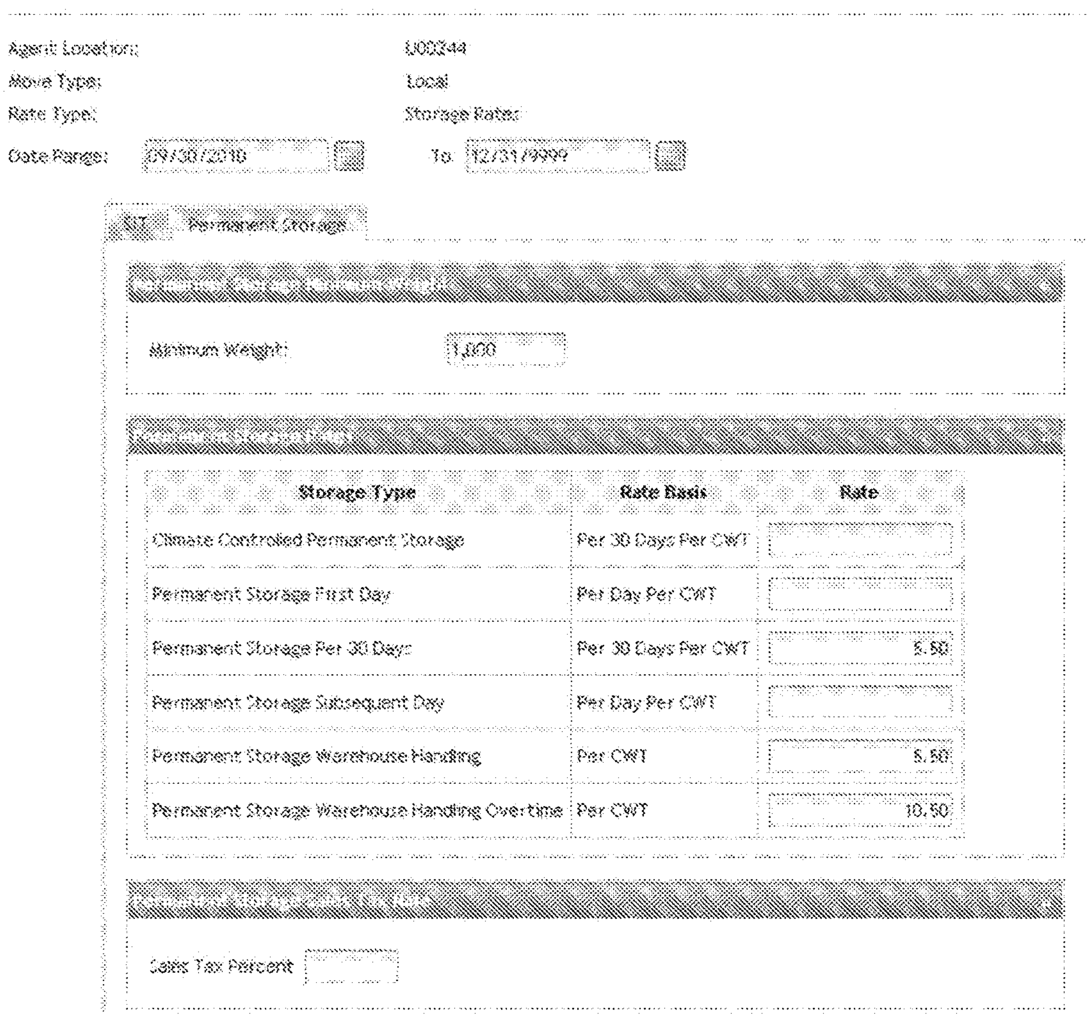

Separate Permanent Storage rates (see FIG. 30).

Valuation Rates

Selecting the New link for Valuation Rates allows for a valuation matrix of coverage to be entered.

There are three types of Valuation that can be entered:

Full Value Protection

Depreciated (Declared) Value

Released Value

Figure 31:
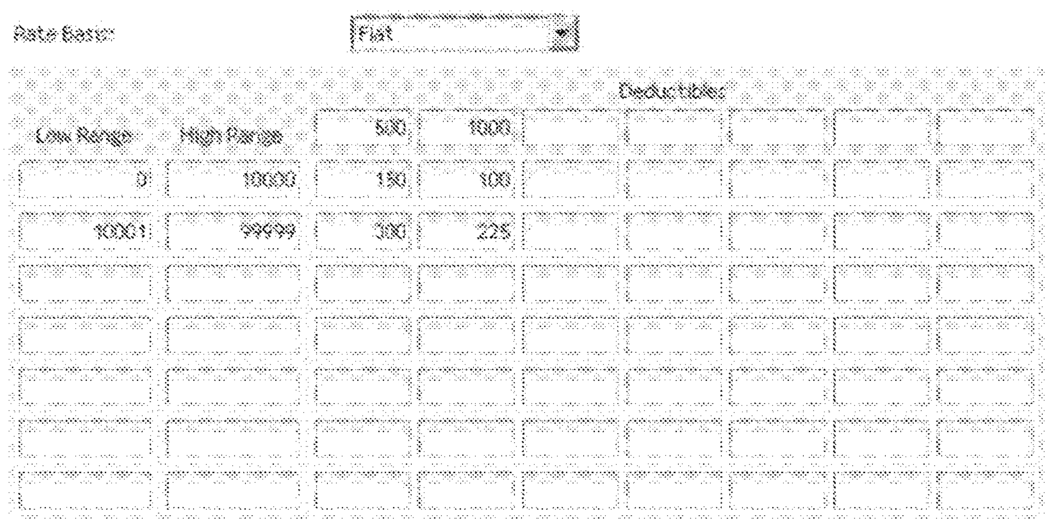

For Full-Value and Depreciated Value, there are two types of entry:

Flat Rate Valuation (See FIG. 31)

The Low Range and High Range represents the covered amount of the shipment. The deductible represents the deductible the customer is responsible for, and the interior of the matrix represents the charge to the customer.

Figure 32:
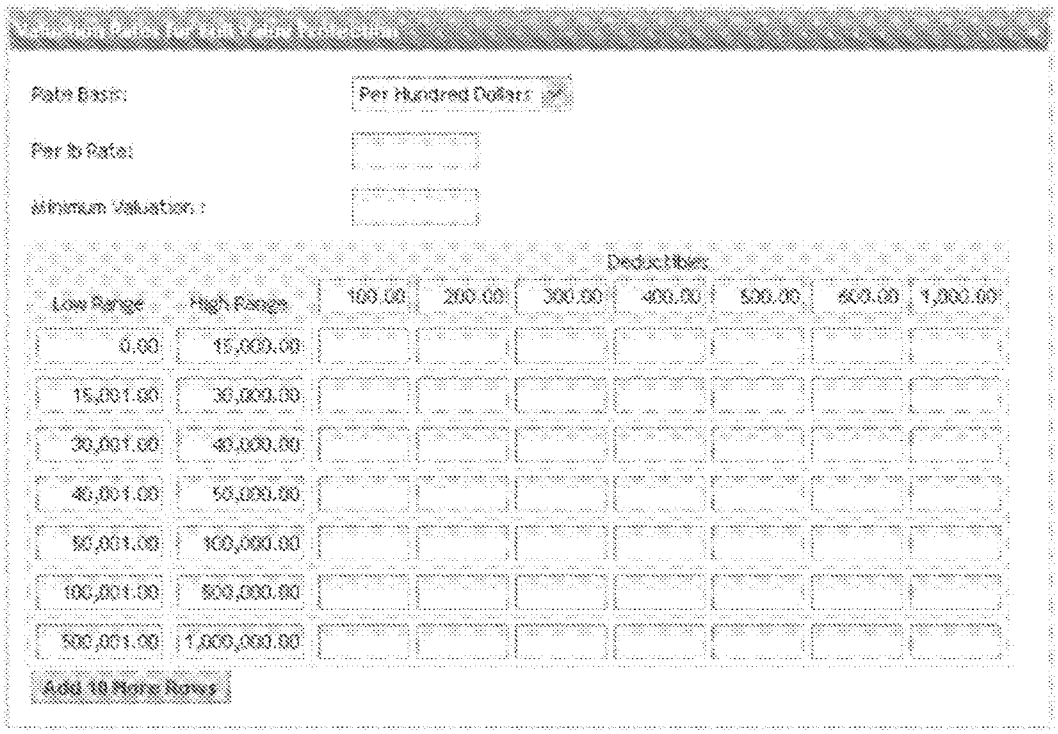

Per Hundred Dollars Valuation (see FIG. 32)

In this case, a per lb rate, as well as a minimum valuation on the shipment are required.

Use the Add 10 More Rows button to add multiple weight range rows.

Released Valuation

Figure 33:
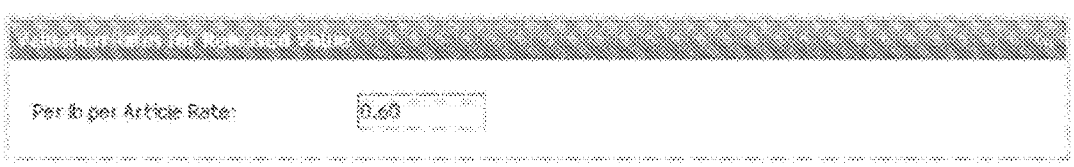

For example, enter the minimum coverage provided per pound per article (see FIG. 33).

Misc Settings

Figure 34:

Miscellaneous settings allow for the input of text that prints out on the estimate for local quotes (see FIG. 34). This section can be used to add information about how long the estimate is valid, or to customize the local estimate form in other ways. You have the option to enter different language for binding, non-binding and general quotes. The estimator can select the appropriate setting within the quote, which controls what prints on the estimate.

Regional Rates

The default behavior for both local and intrastate is to have one set of rates across the area. However, some states may require a distinct set of rates for a region. For example, orders originating from a particular portion of the state (i.e. county, or city) may require different rates.

Figure 35:
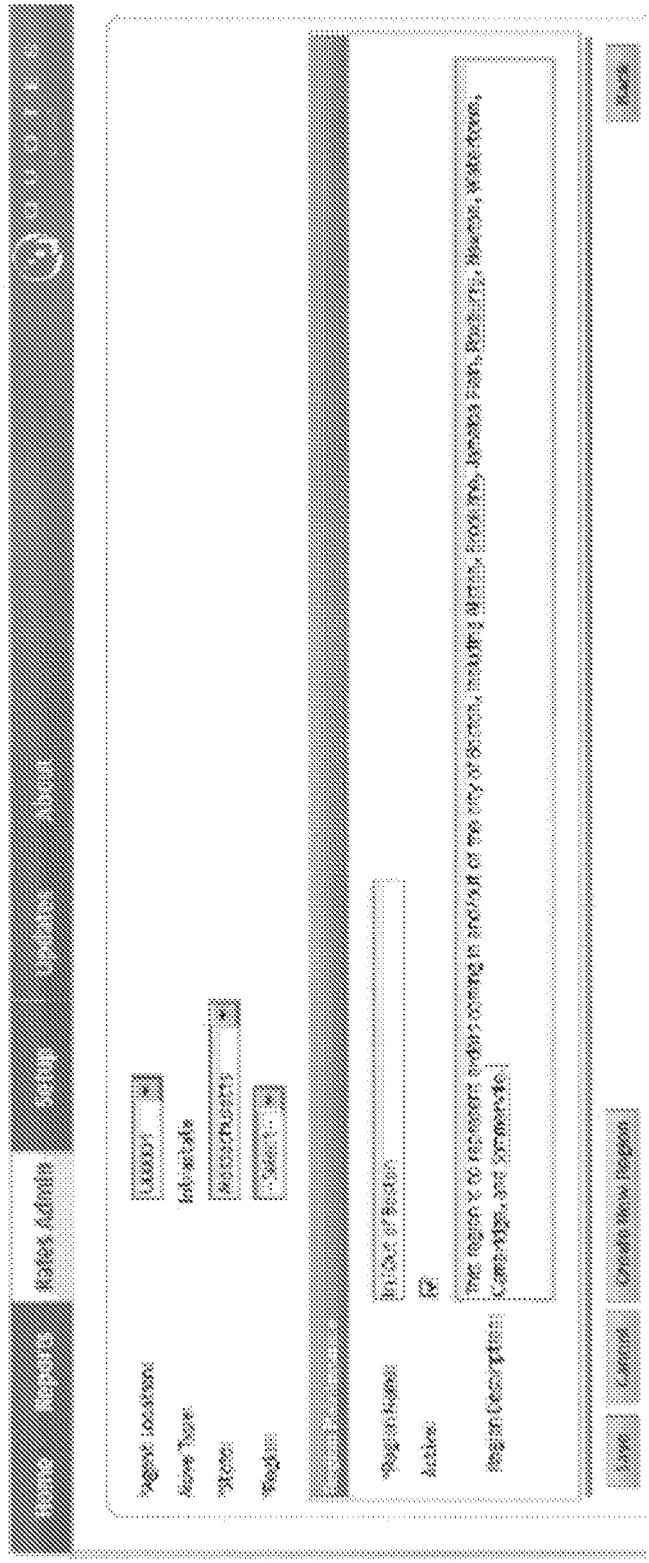

The Region Maintenance allows regions to be set up that are selectable by the user at the time of estimation (see FIG. 35). To setup a region, Region Maintenance, then enter the information about the region, and click the Save button.

Figure 36:
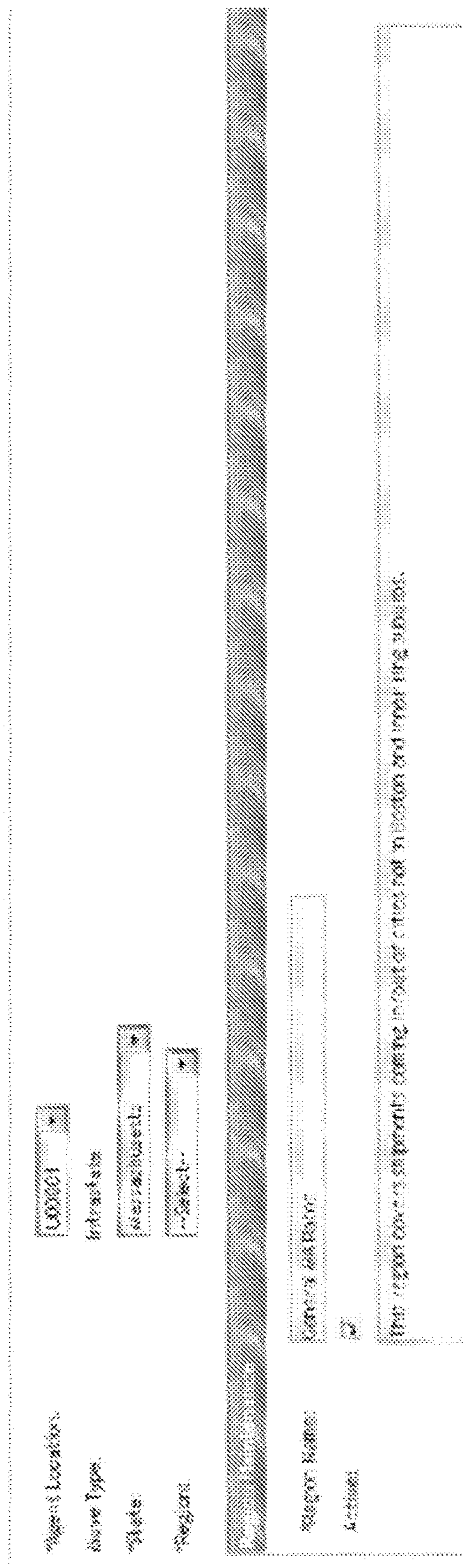

Select Create New Region to create a second region (see FIG. 36), then click Save.

The Use of Regions is Optional Based on Your Local and Intrastate Rating Requirements.

After regions are entered, rates can be created independently for each region. At the time of the estimate, the estimator must select the appropriate region to rate the estimate.

Figure 37:
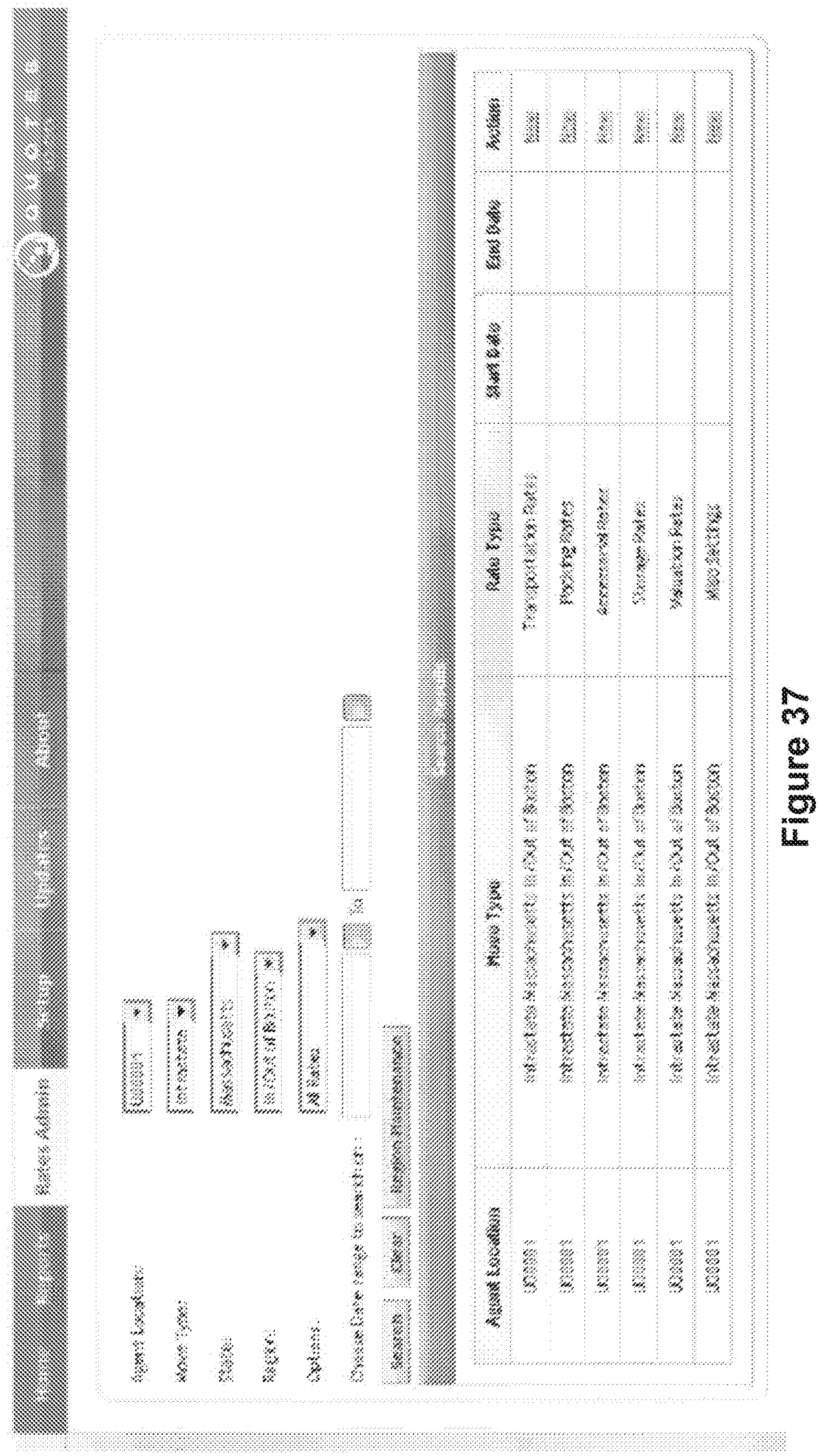

Follow the normal procedure as explained for each rate type needed (see FIG. 37).

APPENDIX B

Figure 38:
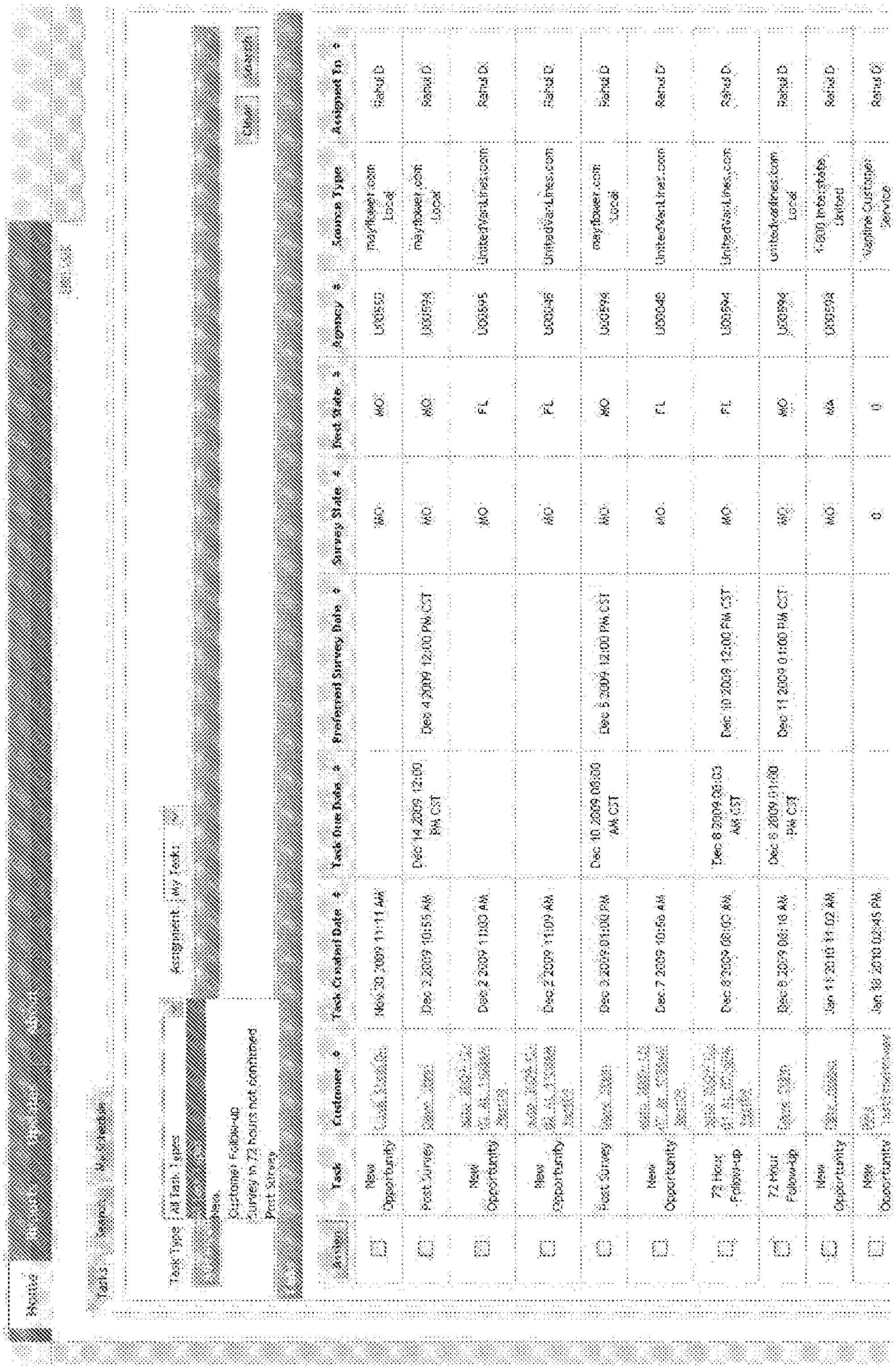
FIGS. 38-41 show exemplary screenshots for a system as described in Appendix B.

FIG. 38 depicts a screenshot that provides a home office view of Tasks.

Figure 39:
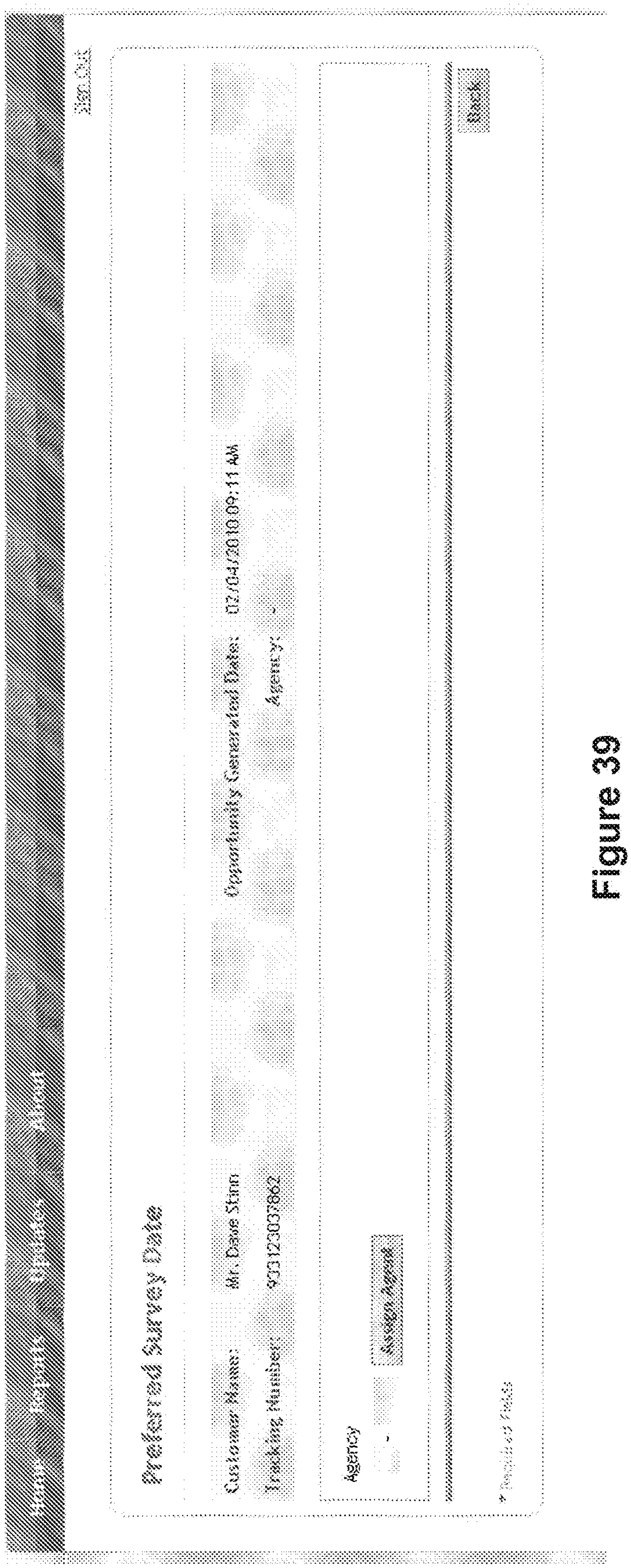

FIG. 39 depicts a screenshot for a task to assign a booker Agent.

Figure 40:
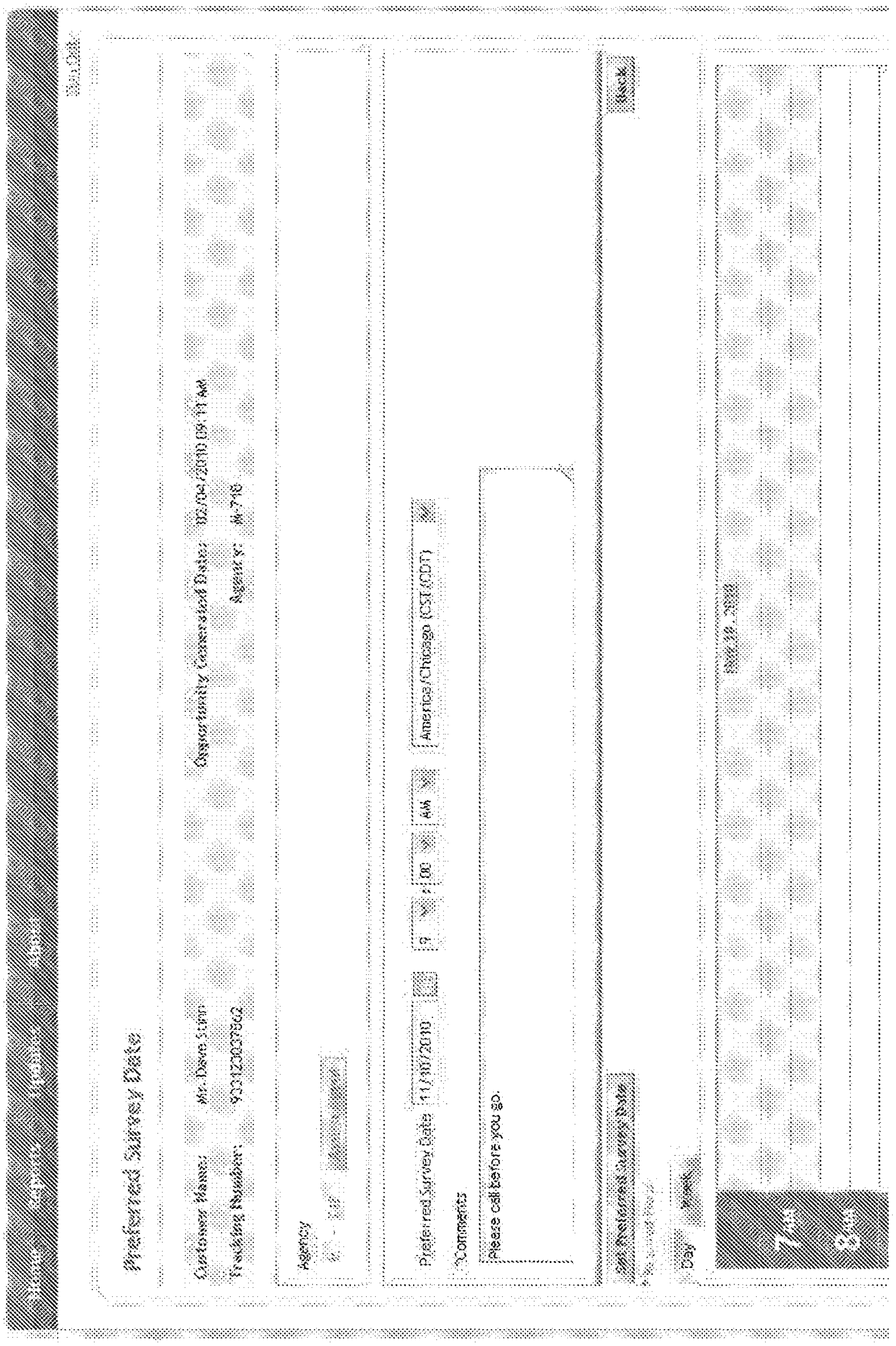

FIG. 40 depicts a screenshot for a task to set a Survey Appointment.

Figure 41:
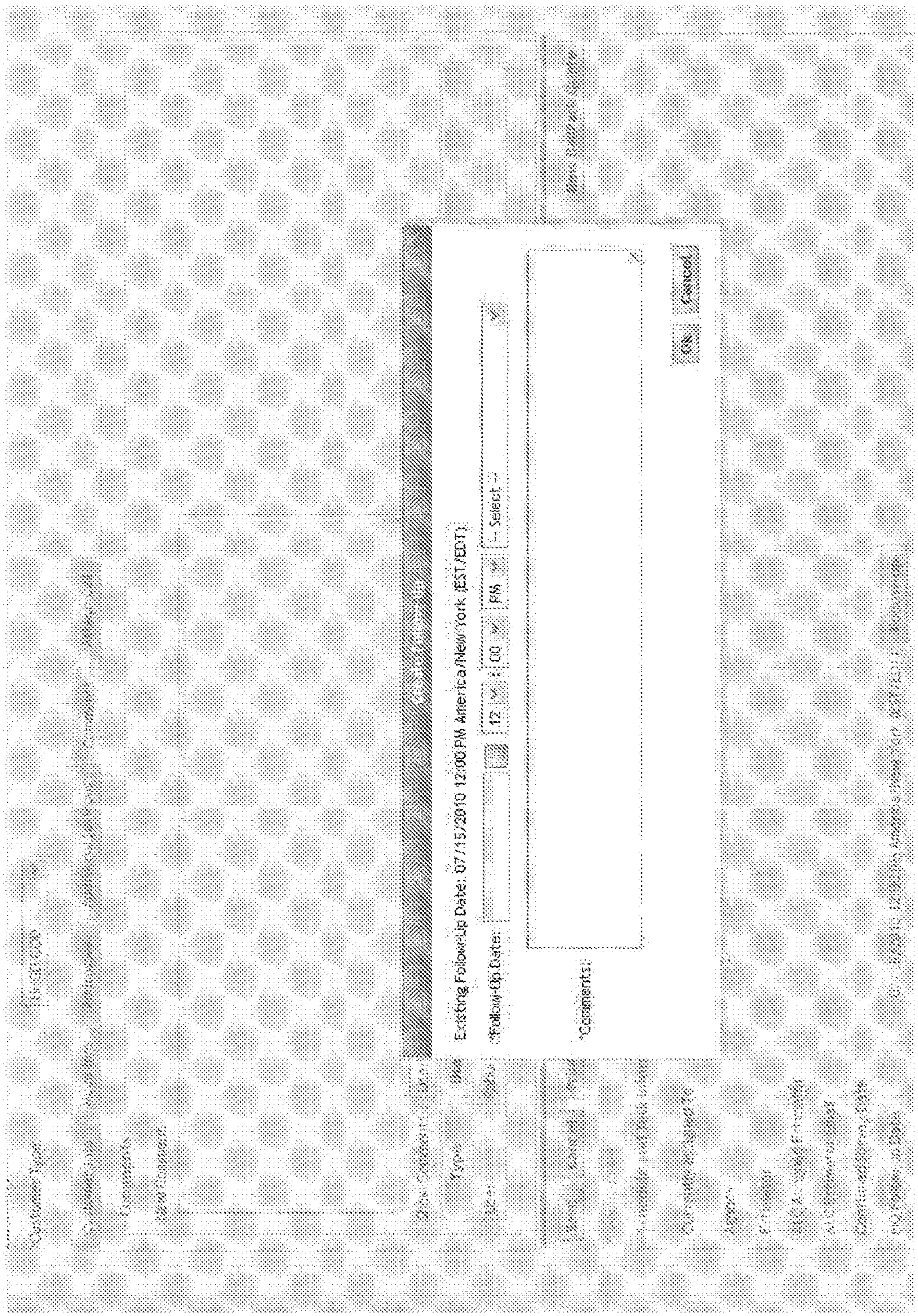

FIG. 41 depicts a screenshot for a task to set a Followup.

APPENDIX C

Agency Lead Coordinator Guide

Outline

Overview
  How to use this Manual
  What is covered in this manual
General Use and Tips
  Saving
  Cancel
iLead Information (Process Agencies)
iLead Zones (Process Zones)
Customizing Lead Sources
  Creating Custom Sub-sources
  How to use on new opportunities
  Reporting on SubSources
Managing E-mail Addresses for iLead Notifications
  Edit iLead Notification E-mail Addresses
Upload an Agency Logo for Local and Intrastate Quotes
Managing Opportunities
  Receiving Leads from the Home Office
  Marking a Non-Opportunity
  Re-Opening a Closed Opportunity
Managing the Calendar
  ALC Calendar View: My Schedule
  Using My Schedule to Set Busy Time
  Agency and Estimator Calendar Views
Creating New Opportunities
  Address Tab
  Find Zip
  Find City/State
Ball Park Quotes
My Quotes Screen
OA Surveys
  Process Steps to follow when the Booker and OA both use Quotes-To-Go
  Booker—Assign Origin Agent within the Opportunity
  Booker—e-Mail the Origin Agent
  Origin Agent—View Perform Survey Tasks
  Origin Agent—Create Survey without a quote
  Booker—Receive OA surveys and attach to quotes.
  Process Steps to follow when just the OA uses Quotes-To-Go
Finding Opportunities
  My Opportunities
  Searching for an Opportunity or Quote
Forms
  Getting to the Forms Page
  Forms Available
  Printing Forms
  e-Mailing Forms
Finalizing the Quote
Download the Estimate to Agency Software
Change a Finalized Quote
eAcceptance
  Sending the eAcceptance Documents
  Tracking eAcceptance documents that have been sent to the customer
  eAcceptance—What the customer sees
Registering an Interstate Order
Feedback—Vote and Track Enhancements
System Reports
  Opportunities by Source Summary and Detail
  Sales Forecast
  Sales Lost Business Sales Revenue Report
Appointment Report Overview How to Use this Manual This manual covers Quotes-To-Go tasks performed by the Agency Lead Coordinator. If there is something missing or confusing in this guide, please contact the IT Support Center at 1-800-825-9585. We welcome feedback and consider every suggestion.

To directly access documents on The U from links within this manual, click the link, sign on to The U and then click the link again.

What is Covered in this Manual

Figure 42:
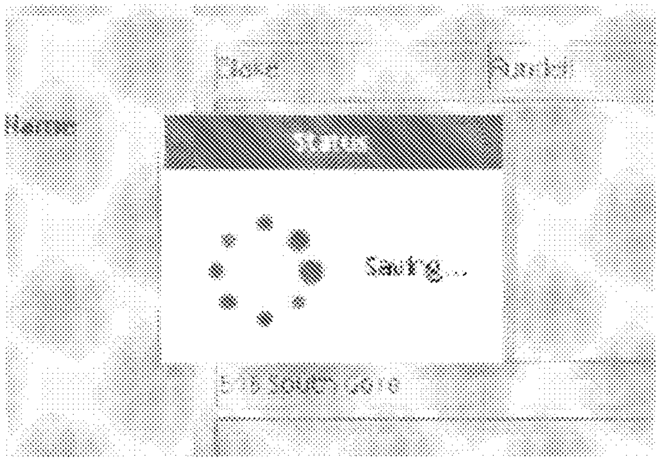
FIGS. 42-133 show exemplary screenshots for a system as described in Appendix C.

This manual provides information about working with leads, including:

Receiving leads from the Home Office
Creating new agency leads
Managing opportunities This manual also covers:

Sending and receiving surveys for origin surveys
eAcceptance
Managing customized lead sources
Process Agencies—view ilead closing ratios
Process Zones—view ilead zip zones
Managing the Calendar General Use and Tips Saving You should 'Save' each screen in order not to lose your work. While the system is saving, a dialog box appears (see FIG. 42).

Cancel

The Cancel button allows you to exit a screen without saving your work.

iLead Information (Process Agencies)

Use the Process Agencies button (see FIG. 43) to view the following information for your common owner agency locations:

Closing Ratios
Agent Revenue
Percentage of Revenue Share
Share of Closing Ratios
Share of Opportunities
Associated Zips in the Zone To view, select Setup then Process Agencies.

Figure 43:
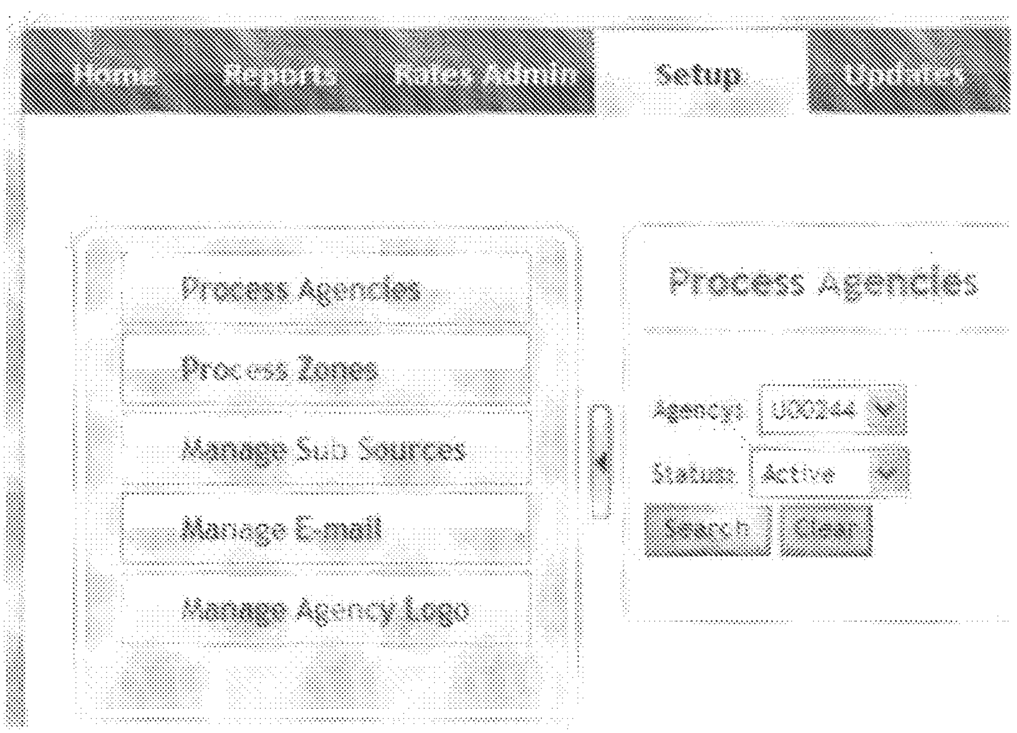

Select the agency number you'd like to view from the Agency drop down and the click Search (see FIG. 43).

Figure 44:
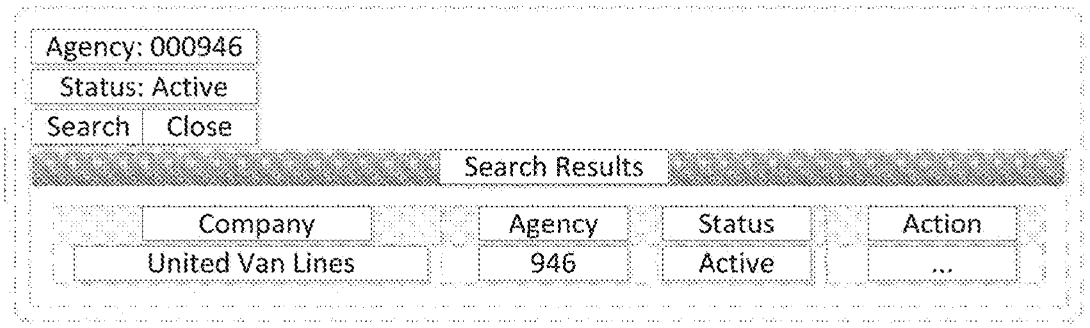

Click the View link (see FIG. 44).

Figure 45:
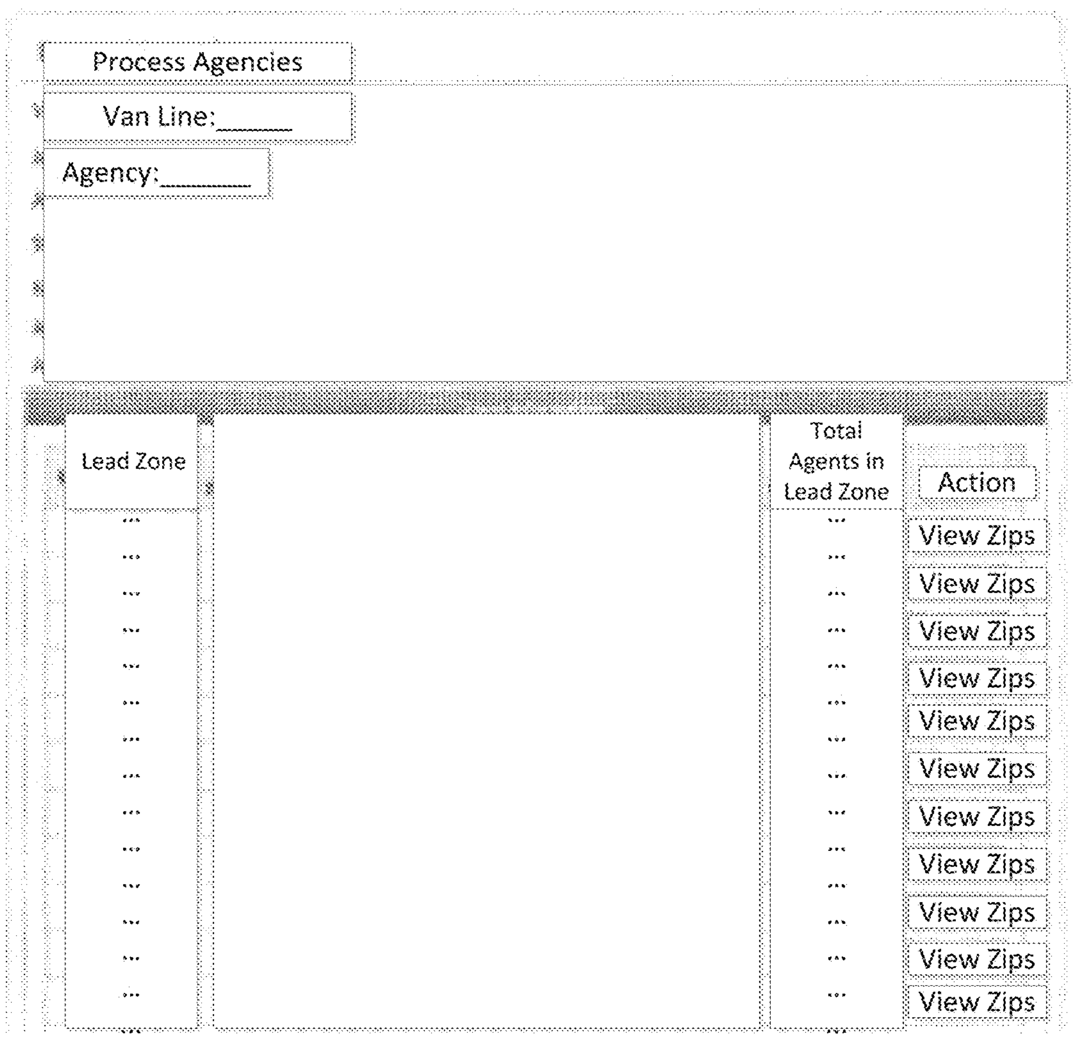
Figure 46:
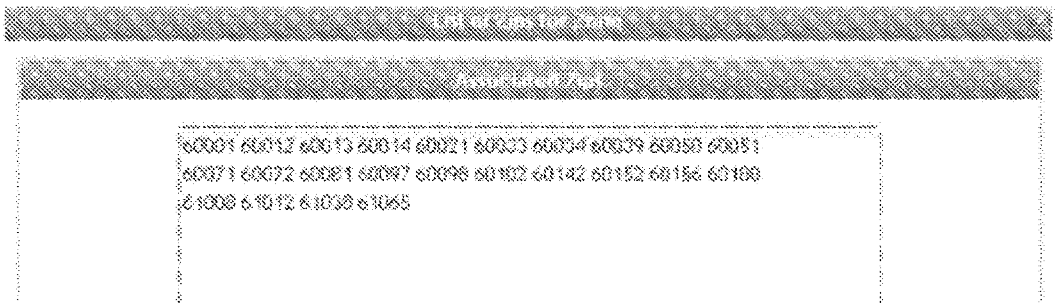

View all information. To see the Zip codes affiliated with a specific zone (see FIG. 46), click the View Zips button on that Zone's row (see FIG. 45). Roll your mouse over an information icon for definitions and/or calculations related to the close ratios. This close ratio is based on ileads (opportunities) generated from Van line Web sites. Any leads from other sources are not used in this calculation.

iLead Zones (Process Zones)

Use the Process Zones button to view all the zip zones for any selected state.

Figure 47:
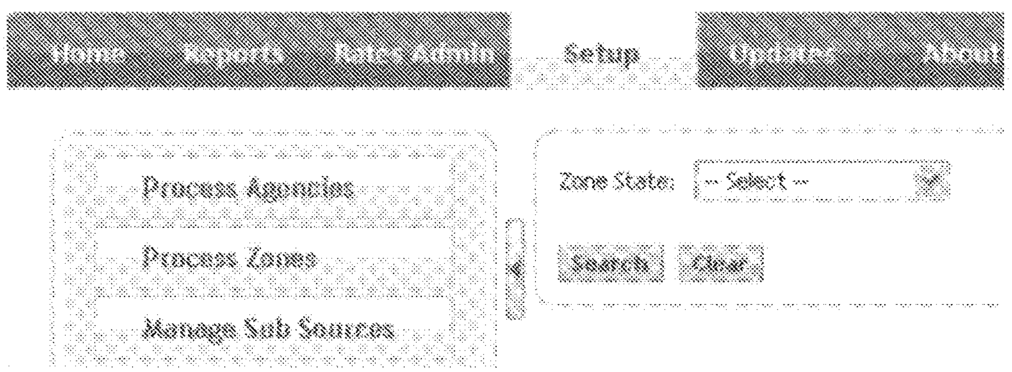

To view, select Setup then Process Zones. Select the state you'd like to view from the Zone State drop down and then click Search (see FIG. 47).

Figure 48:
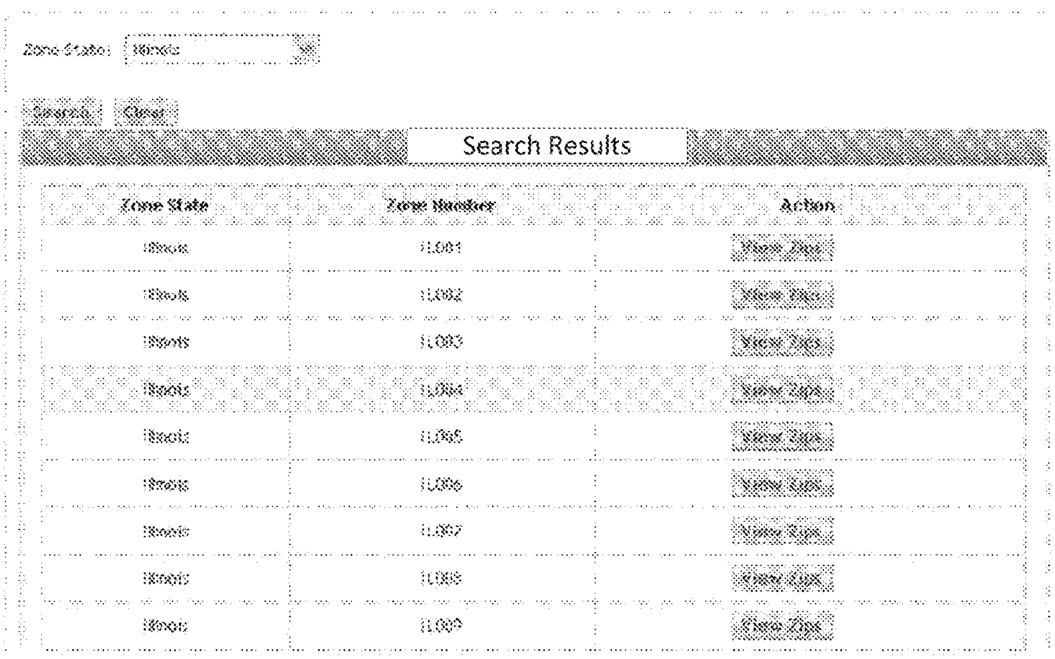
Figure 49:
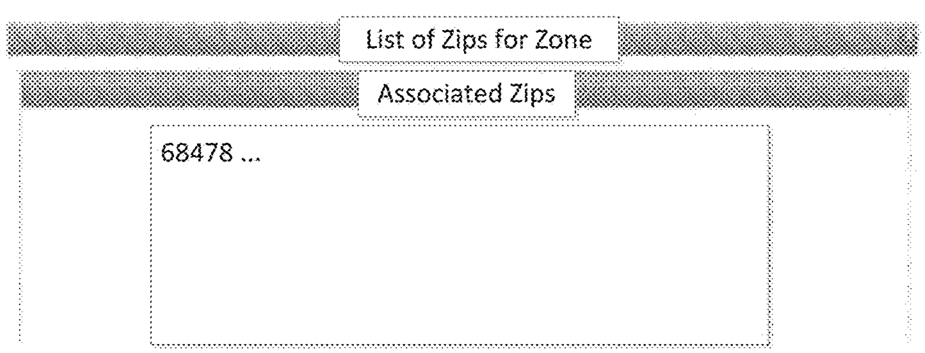

To see the Zip codes affiliated with a specific zone (see FIG. 49), click the View Zips button on that Zone's row (see FIG. 48).

Customizing Lead Sources

Quotes-To-Go provides the ability to customize lead sources for more detailed reporting and tracking purposes.

By default, agency users can enter the following generic lead sources:

News
Print
Agent Website
Direct Mail
Referral
National Account
Campaign
Saw a Truck These main sources are not editable. This allows the potential for consolidated enterprise reporting in the future. However, you can add Sub-Sources for your agency to track this at a more detailed level. These sub-sources are viewable only by your agency.

Creating Custom Sub-Sources

Figure 50:
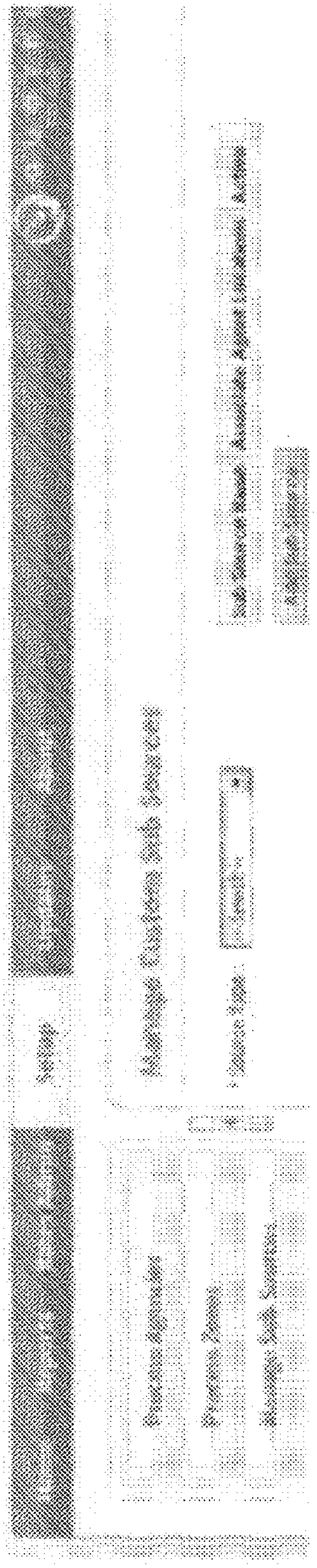

To create, select the Setup tab, and then Manage Sub Sources (see FIG. 50).

Figure 51:
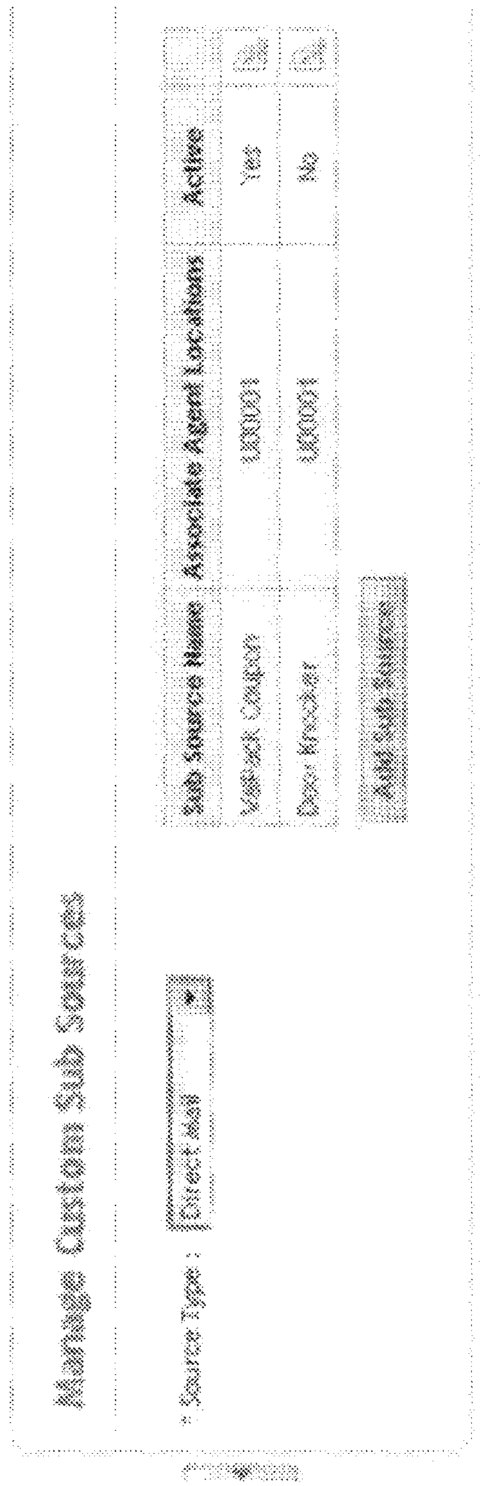

Select the Source Type for which to add a sub source (see FIG. 51).

Click Add Sub Source (see FIG. 51).

Figure 52:
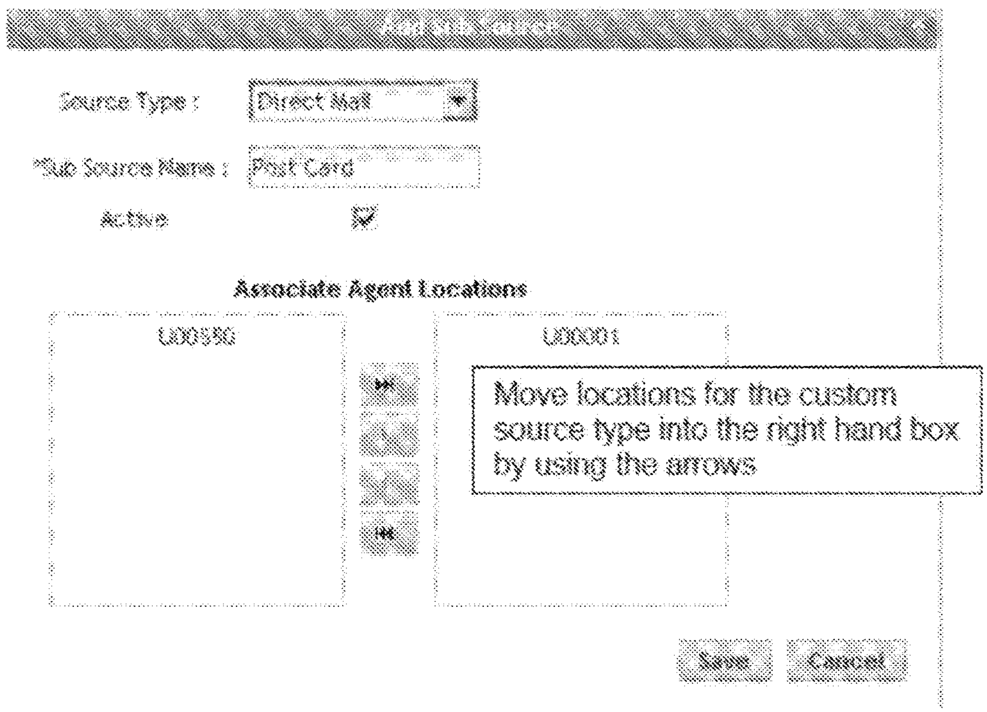

Enter a unique Source Name (see FIG. 52).

Check the Active check box if you want the selection available for use within estimates.

Select the Agent Location(s) that this sub-source applies and click the arrow key to move your selections from the box on the left to the box on the right. Hold down your Control key to make multiple selections.

Click Save (see FIG. 52).

Figure 53:
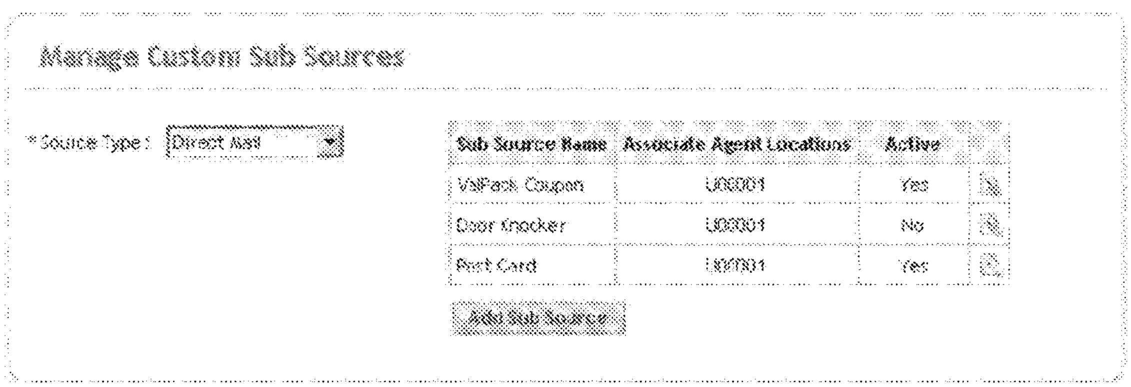

This adds to your list of Custom Sub Sources (see FIG. 53).

How to Use on New Opportunities

Figure 54:
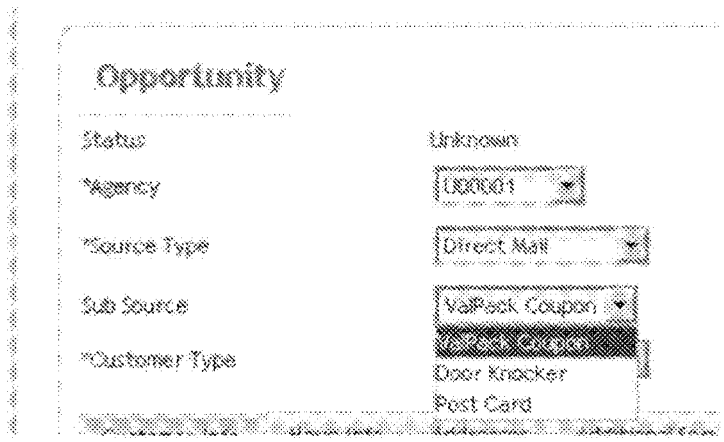

When creating an opportunity, if there are sub-sources entered and active, they appear on the list as items for the estimator to select (see FIG. 54).

Reporting on SubSources

Sub source reports, as well as several other reports are available from the Reports tab.

Managing E-Mail Addresses for iLead Notifications

As an Agency Lead Coordinator, you can set up e-mail addresses to receive notification each time the Home Office Customer Care Center assigns an opportunity to your agency.

Figure 55:
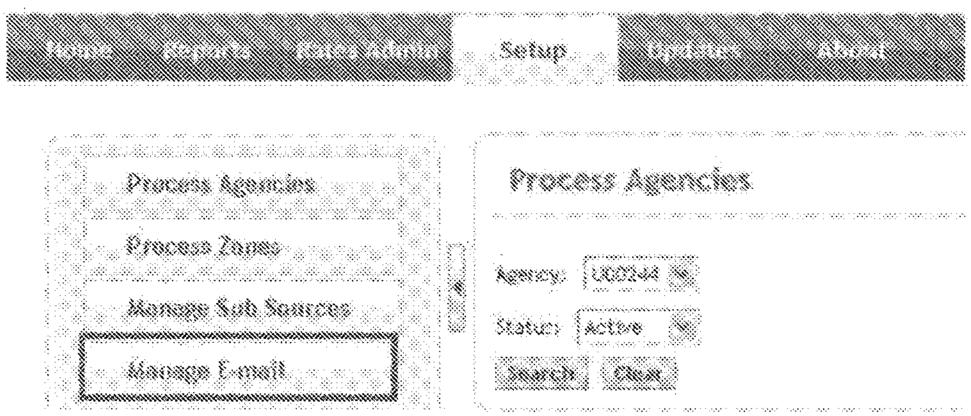

From the Setup tab, click Manage E-mail (see FIG. 55).

Figure 56:
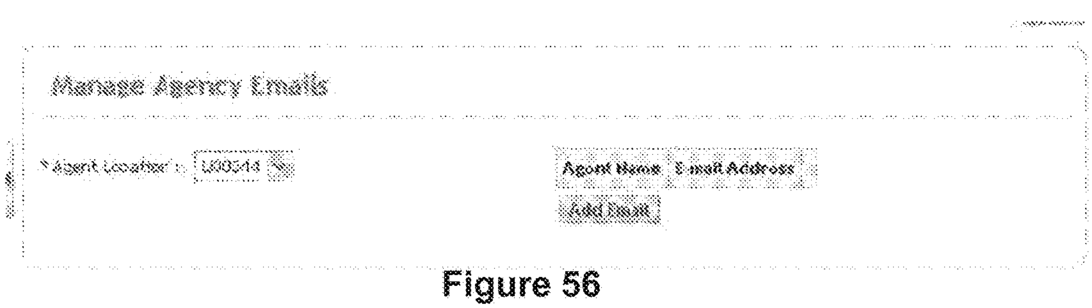

If you are assigned to more than one agency location, select a location and click the Add Email button (see FIG. 56).

Figure 57:
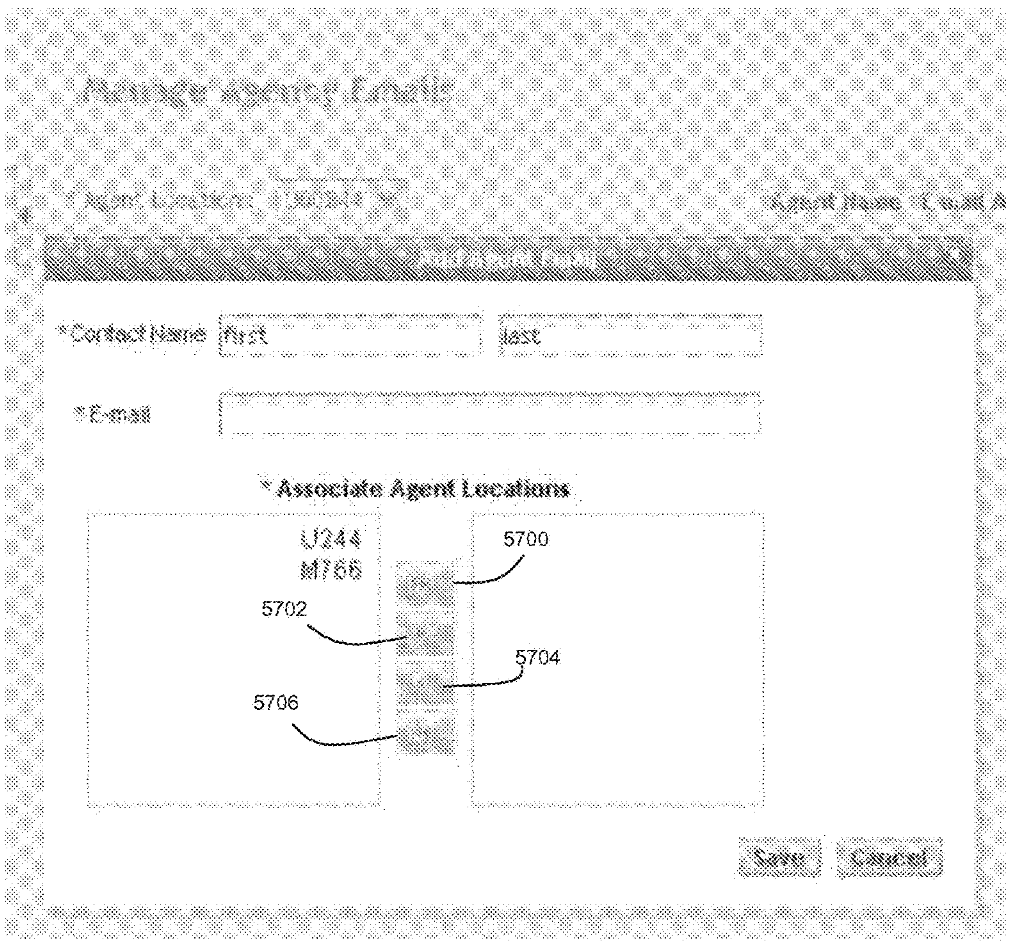

Enter the first and last name and the e-mail address of the person who is to receive the e-mail notification when your agency is assigned an iLead (see FIG. 57).

Select the associate agency locations.

Click button 5700 to move all locations into the selection box.

Select a location, or hold down your Ctrl key and select multiple locations, and then click button 5702 to move highlighted locations into the selection box.

Select a location, or hold down your Ctrl key and select multiple locations, and then click button 5704 to remove highlight locations from the selection box.

Click button 5706 to remove all locations from the selection box.

Once the selection box contains all the appropriate agency locations, click Save (see FIG. 57).

Figure 58:
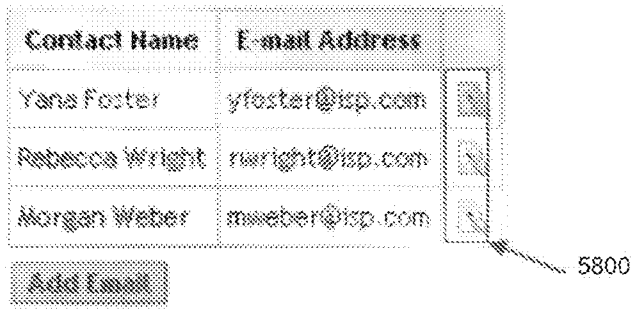

You can enter as many notification e-mail addresses as you need. Just click Add Email and follow the steps described above for each person to be notified (see FIG. 58).

Edit iLead Notification E-Mail Addresses

Figure 59:
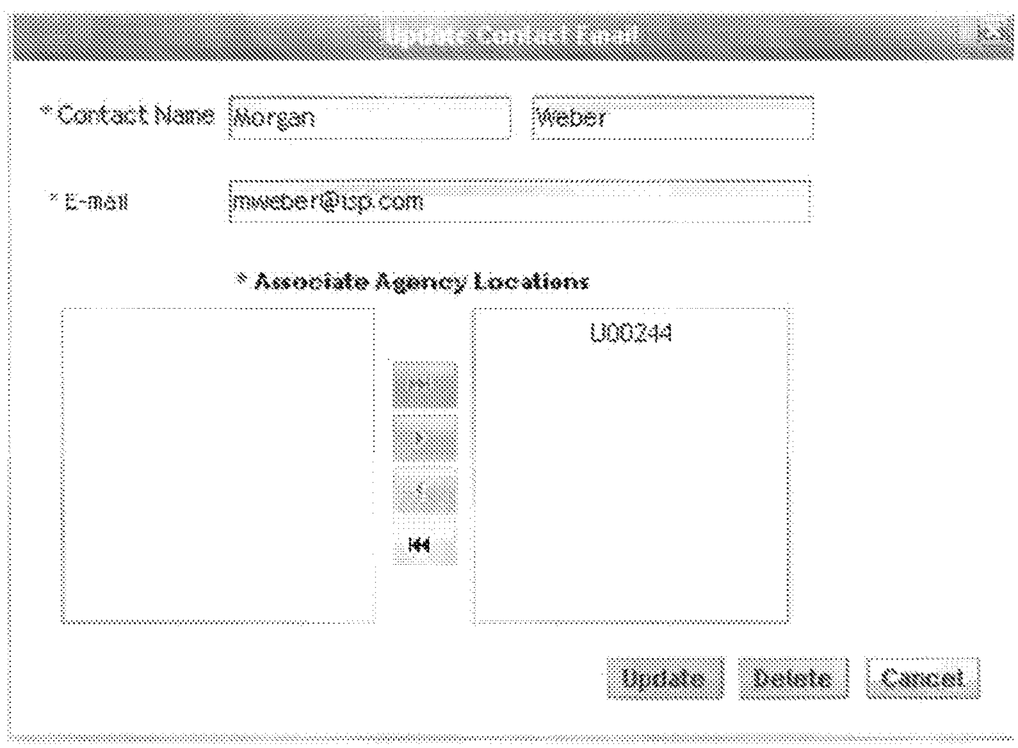

To update or delete an e-mail contact, click its edit icon 5800 to proceed to the Update Contact Email screen (see FIG. 59).

Make the necessary change and click Update. Or click delete to remove the person from the notification subscription.

Upload an Agency Logo for Local and Intrastate Quotes

As an Agency Lead Coordinator, you can upload your agency logo so that it will print on local and intrastate quotes.

Figure 60:
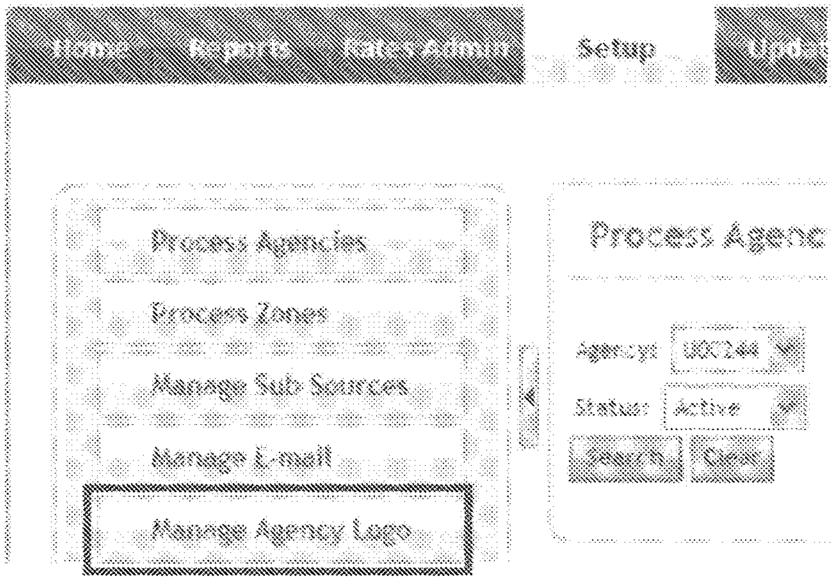

From the Setup tab, select Manage Agency Logo (see FIG. 60).

Figure 61:
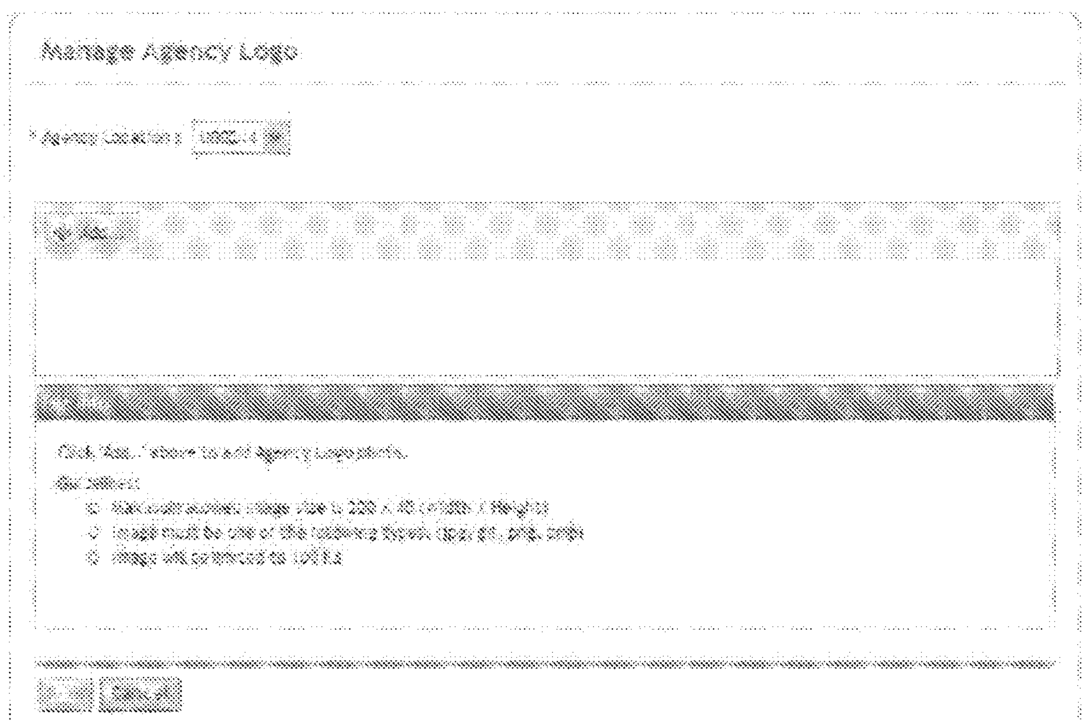

If you are affiliated with more than one agency location, select the location affiliated with the logo you are uploading (see FIG. 61).

Make sure your logo meets the specifications displayed on the screen:

Maximum image size is 200×40 (width×height)

Image format must be either jpg, gif, png or bmp

Image must be 100 KB or less.

Click the Add icon.

Figure 62:
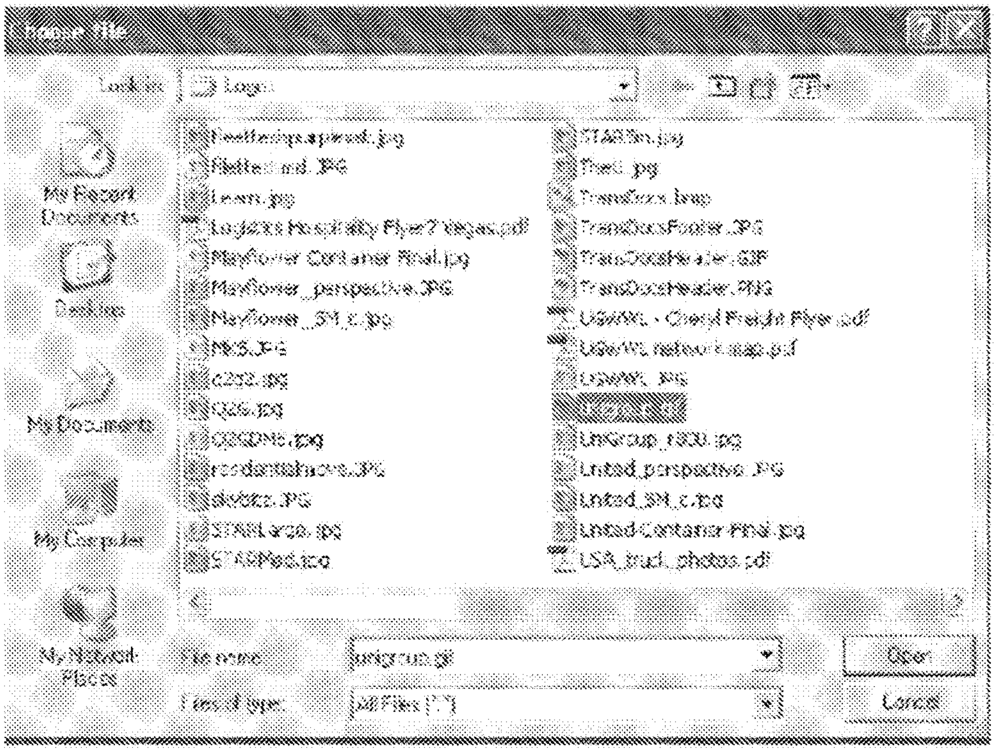

Browse on your PC to find the image file (see FIG. 62). Select it and click Open to proceed to the File Info screen (see FIG. 63).

Figure 63:

Click Save (see FIG. 63).

Figure 64:
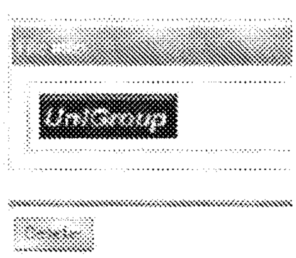

To update a logo, click the Delete button (see FIG. 64) and follow the Add process to upload a new logo.

Managing Opportunities

Receiving Leads from the Home Office

Figure 65:
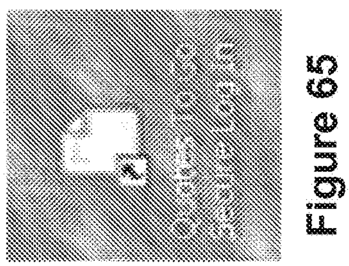

Access Quotes-To-Go at https://quotes.unigroupinc.com from the desktop shortcut (see FIG. 65) you created when following the instructions in the Setup Guide.

Figure 66:
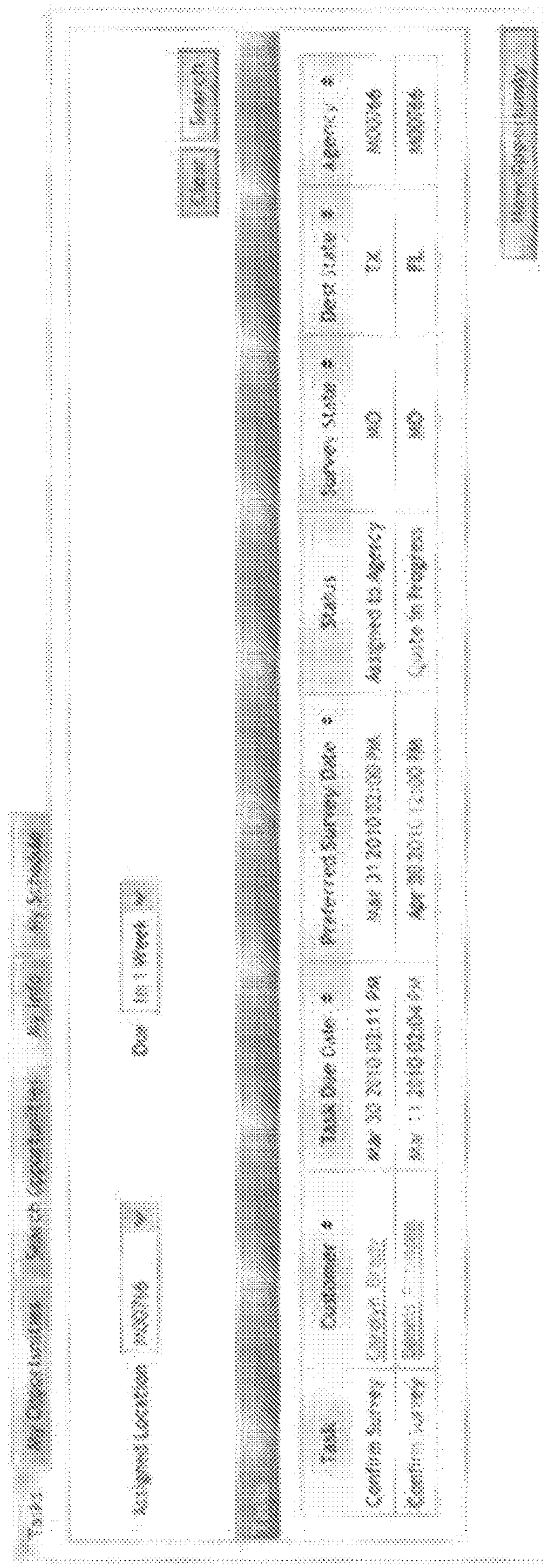

View the Tasks list to work with leads assigned to your agency by the Home Office Customer Care Center (see FIG. 66).

The Customer Care Center has spoken with the customer and set a Preferred Survey date. Click the customer's name to review the opportunity detail (see FIG. 67).

Call the customer to confirm or reschedule the appointment date and time.

Figure 67:
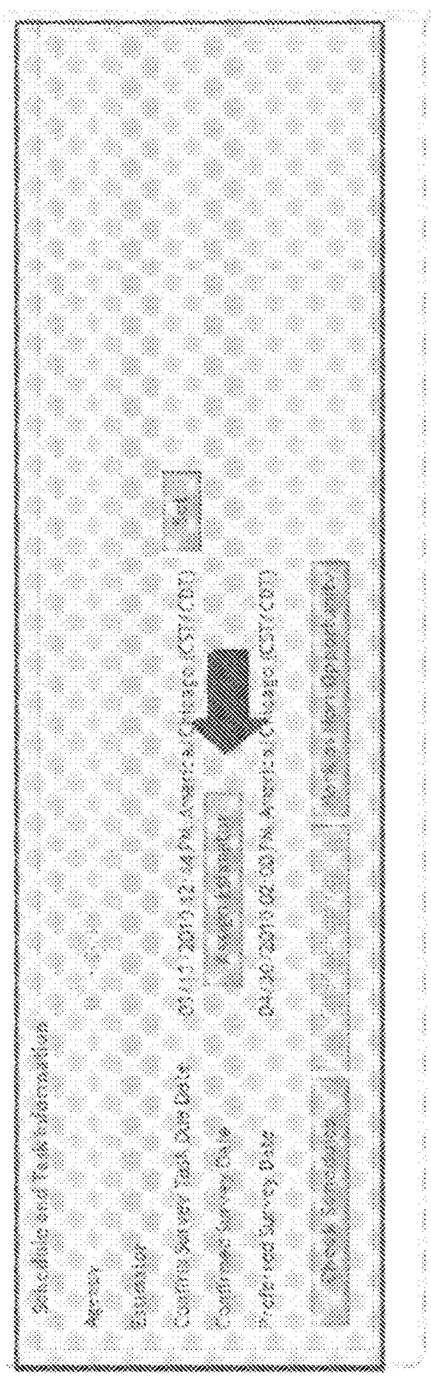
Figure 68:
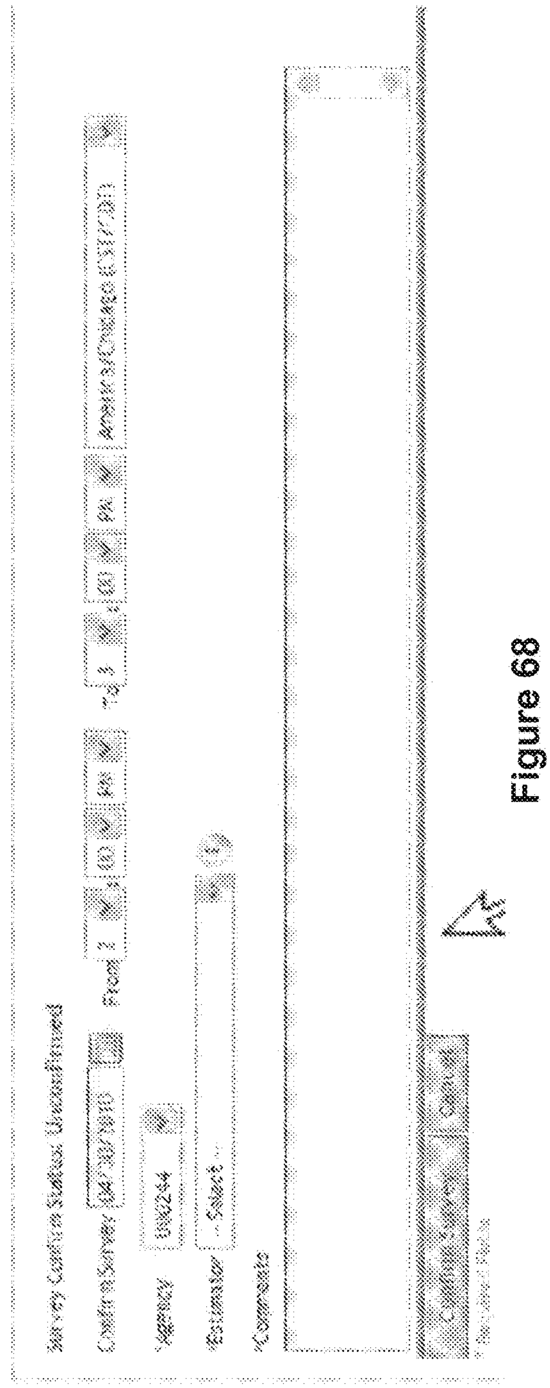

Assign an estimator (see FIGS. 67 and 68).

Figure 69:
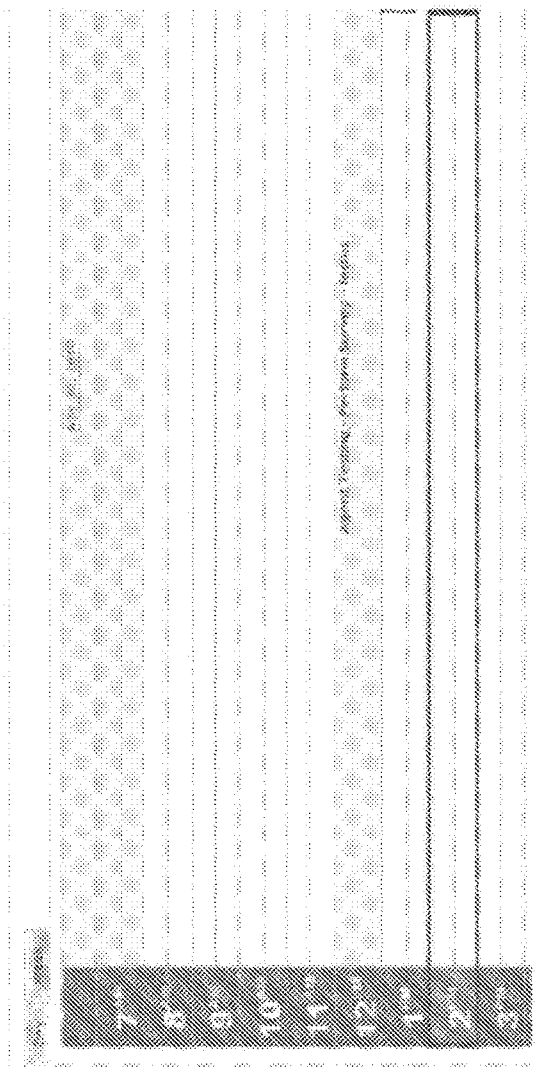

Scroll down to view the Agency Quotes-To-Go calendar (see FIG. 69).

Figure 70:
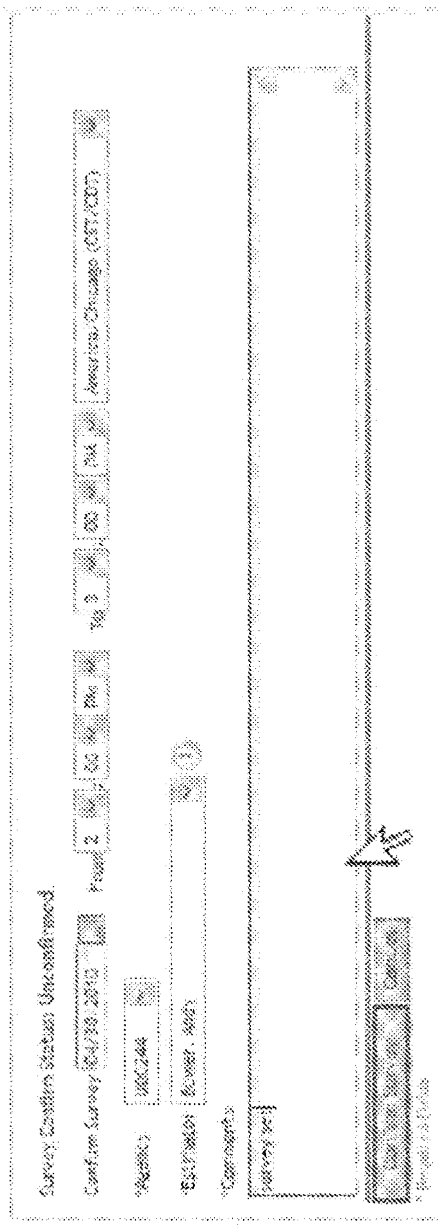

Once the appointment and estimator information has been entered, add a comment then click the Confirm Survey button (see FIG. 70).

Figure 71:
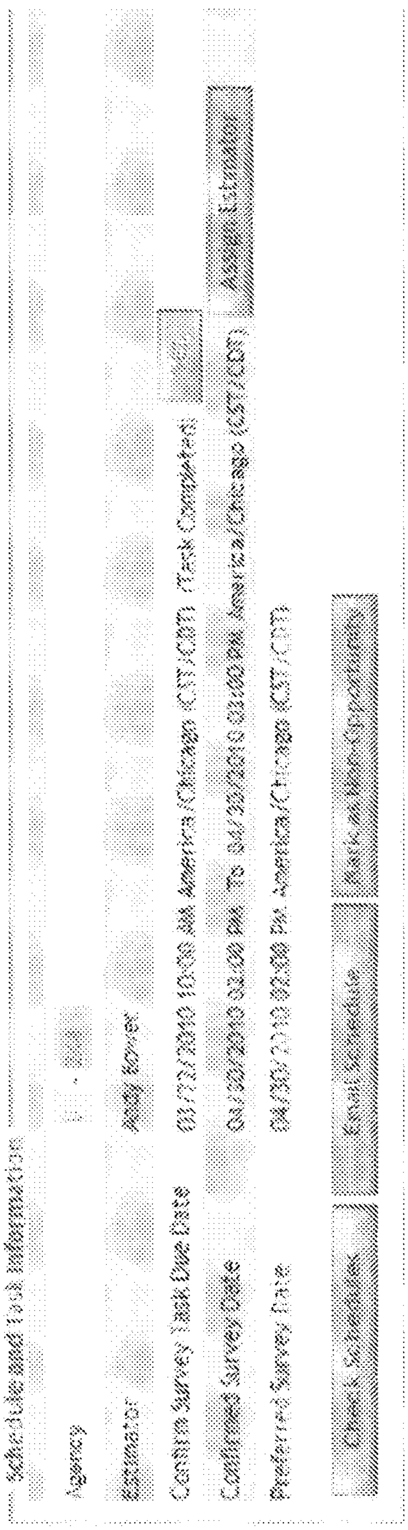

With reference to FIG. 71, you can use the Check Schedules button to review the appointment on the Estimator view of the Quotes-To-Go calendar. Click the Email Schedule button to send the appointment detail to the Estimator. The Estimator can use that notice to add the appointment to their personal calendar.

Marking a Non-Opportunity

Figure 72:
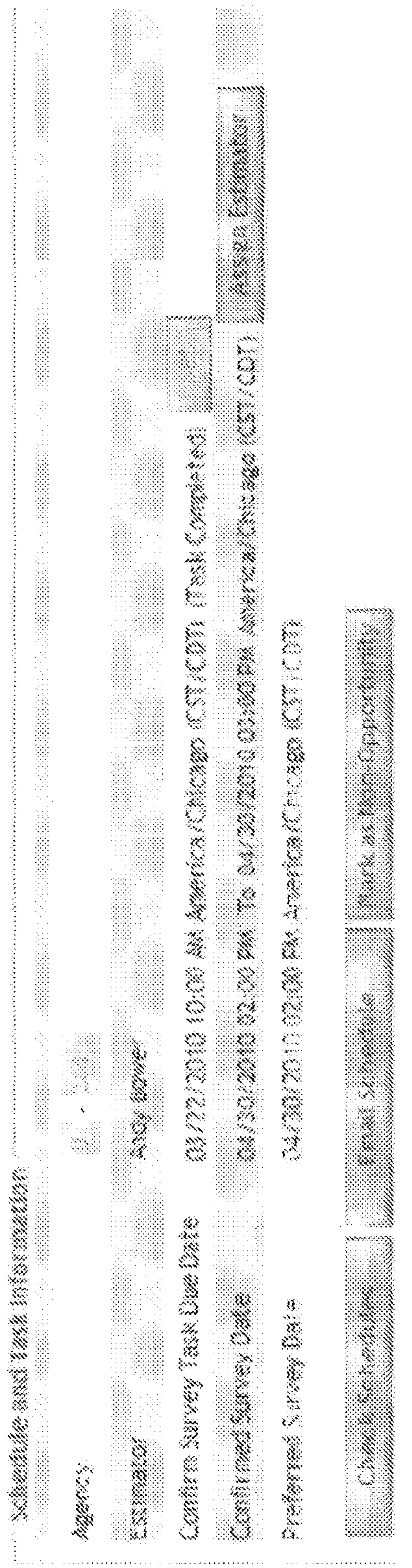
Figure 73:
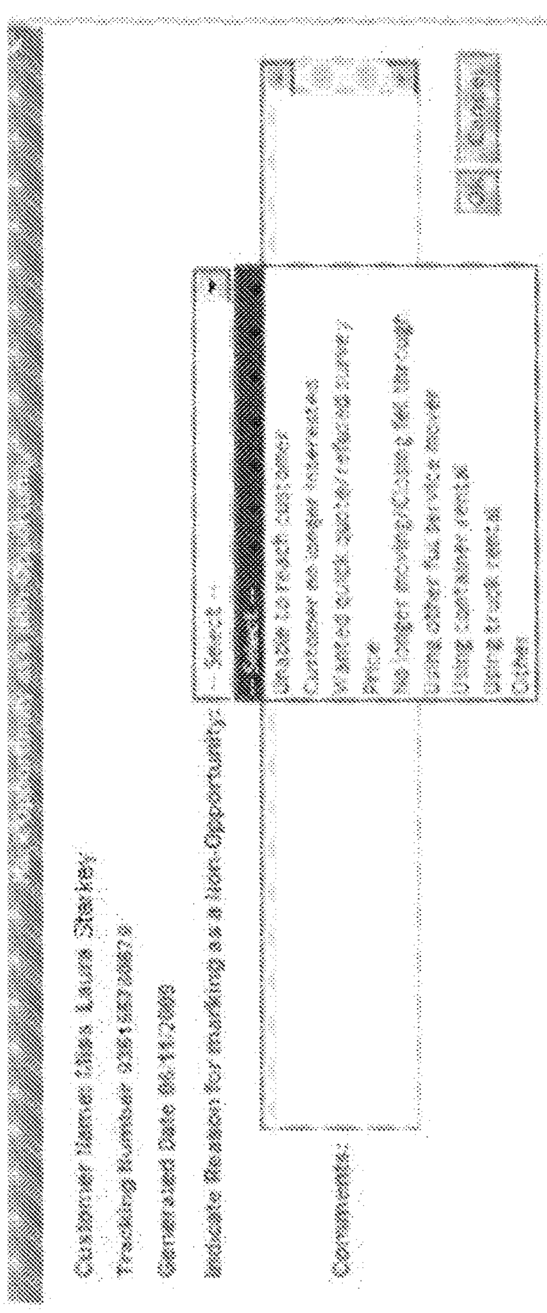

If an opportunity is no longer valid (customer decided not to move, competition, non-response), select the Mark as Non-Opportunity button on the bottom of the Opportunity form to remove the Opportunity from the daily My Opportunities list (see FIG. 72). You are then prompted to select an explanation from a list of displayed reason codes (see FIG. 73). In addition, when marking a Non-Opportunity, all associated follow-up tasks are closed.

Re-Opening a Closed Opportunity

Figure 74:
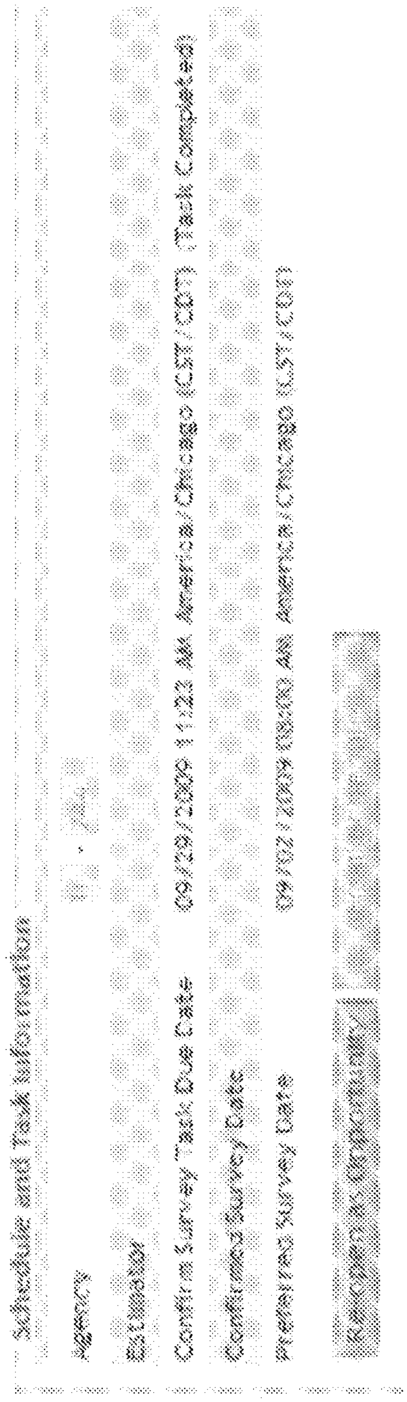

To re-open an Opportunity, use the Search Opportunity screen to access the closed opportunity, and then click the Re-open as Opportunity button at the bottom of the screen (see FIG. 74).

Managing the Calendar

There are three calendar views:

1. The Agency Lead Coordinator view
   Displays the Tasks list and ALC personal busy time in a calendar format
2. The Agency View (View All Estimators)
   Displays Agency busy time and all Estimator appointments. Is accessible from within an opportunity.
3. The Estimator View
   Displays the entries for a selected Estimator and Agency busy time.

ALC Calendar View: My Schedule

An alternate way to work tasks is to use the My Schedule calendar view instead of the task list.

Figure 75:
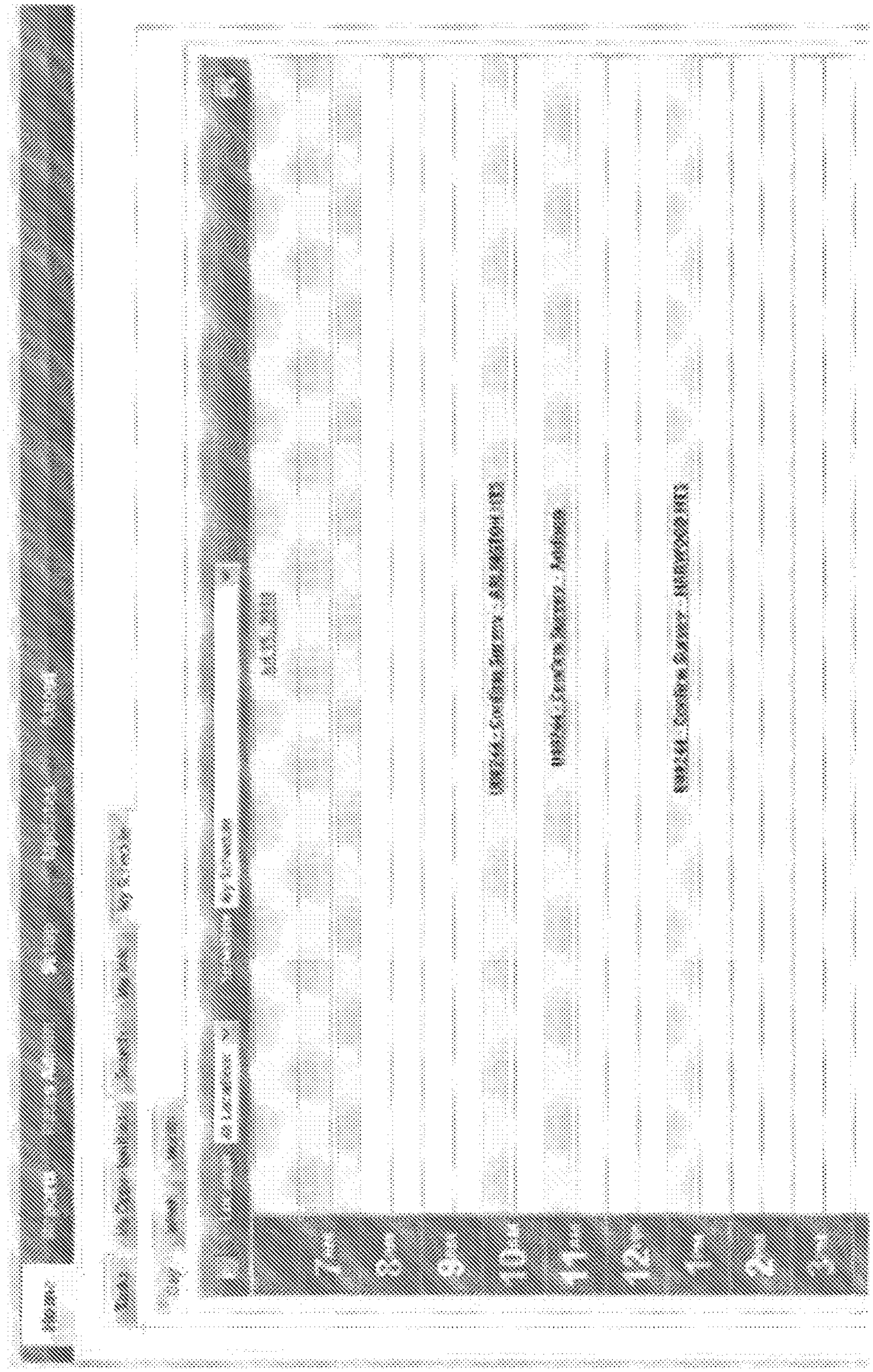

The My Schedule tab shows a list of all follow-ups and tasks due by date in a visual format (see FIG. 75). You can view the task due dates for survey confirmation, and access opportunities by clicking the link on the calendar.

Using My Schedule to Set Busy Time

Figure 76:
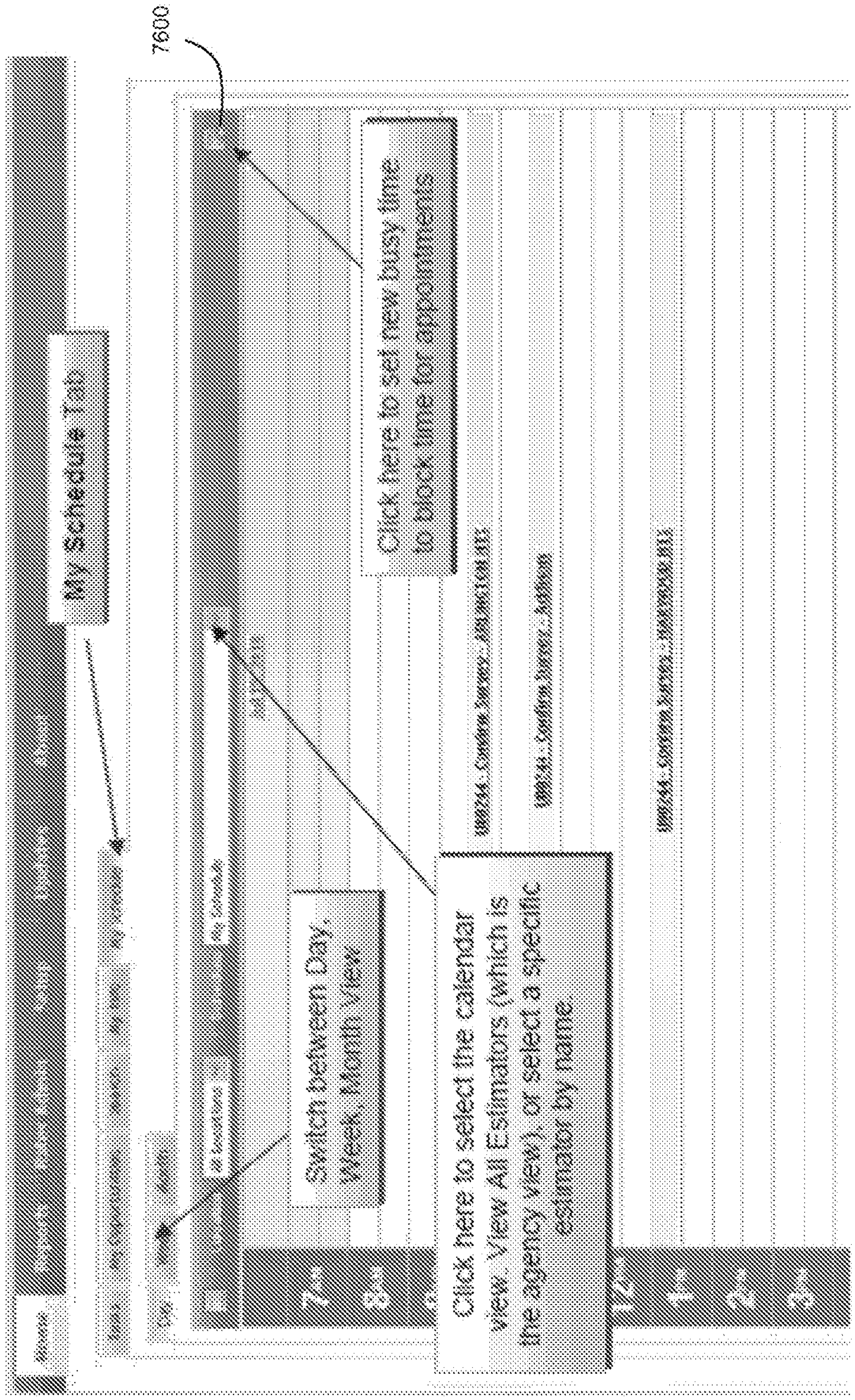

The My Schedule tab on the home page allows you to set busy time for yourself, for your agency, and for your estimators (see FIG. 76). Agency busy time and lead appointments scheduled in the system are viewable to the Home Office Customer Care Center so that they can avoid overloading a particular timeslot.

To set busy time, click on the My Schedule tab.

Click the New Event icon 7600.

Figure 77:
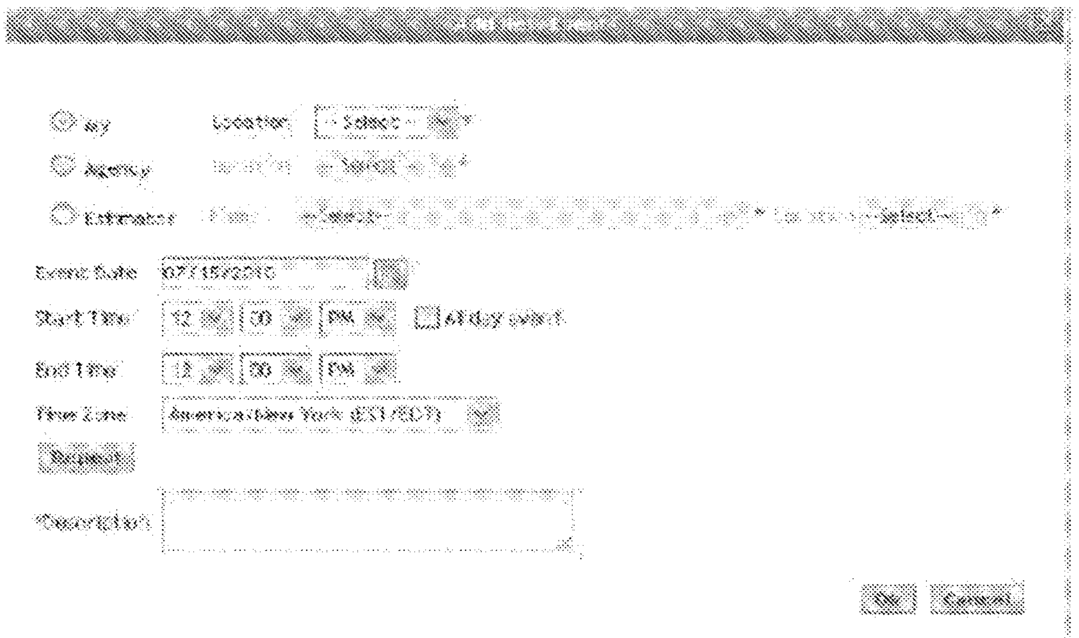

Complete the Add New Event information to block off the time (see FIG. 77).

You can choose to set this time for your personal My Schedule calendar view, for the Agency view or for a specific Estimator.

If the event recurs, click the Repeat button.

Figure 78:
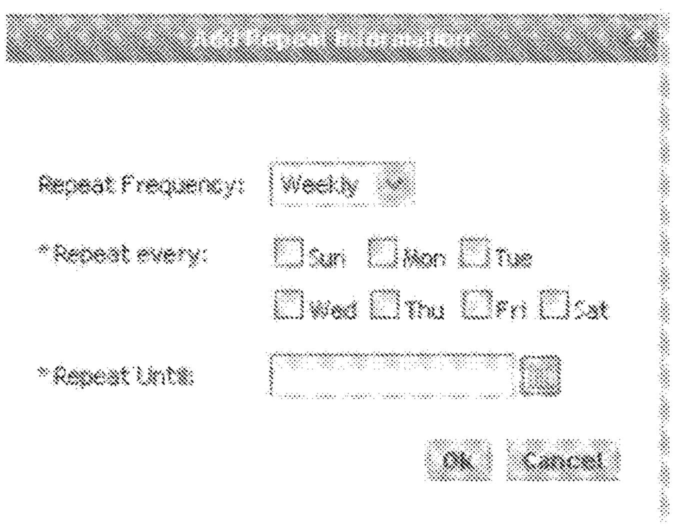

Enter the frequency and all repeat options (see FIG. 78). The Repeat Until date must be more than one year into the future. Click OK, and then click OK again on the Add New Event screen.

Agency and Estimator Calendar Views

Figure 79:
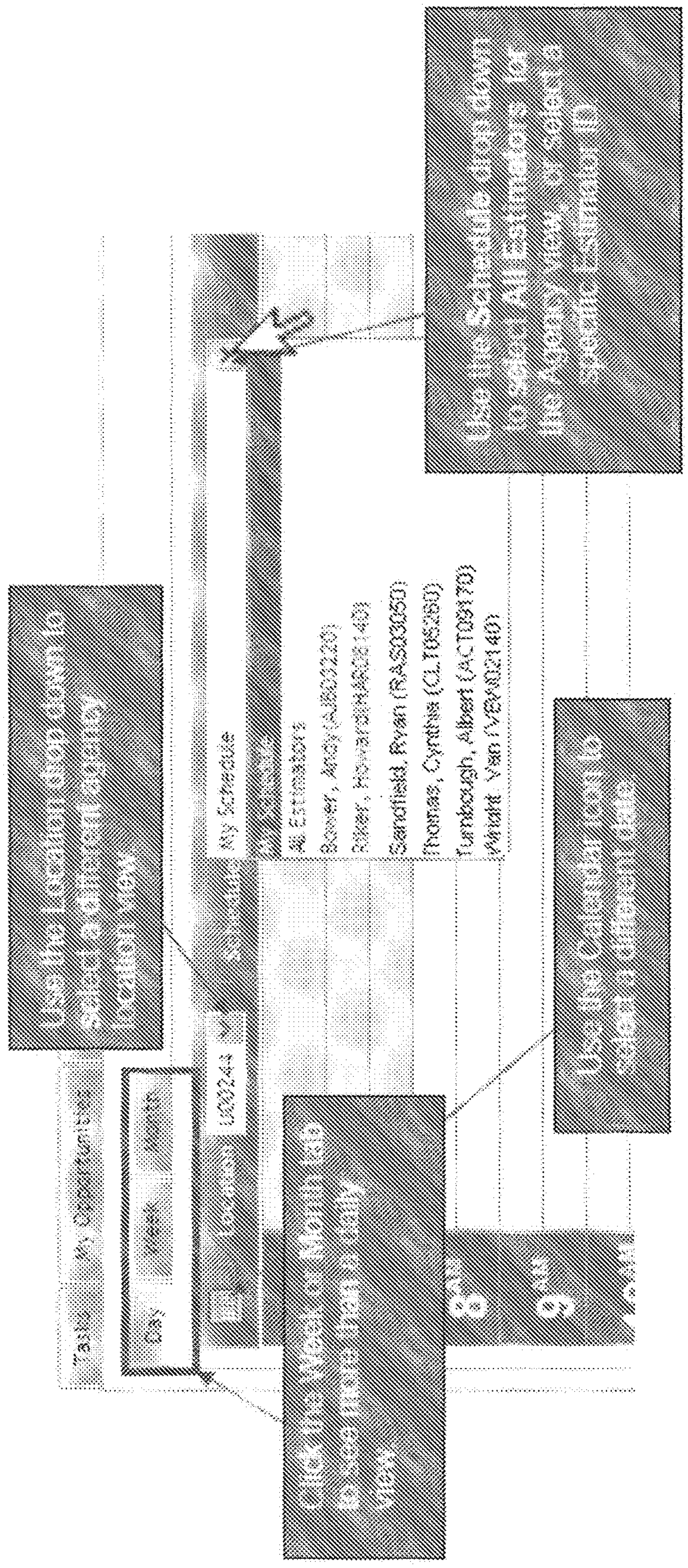

To see the Agency view of the calendar, select All Estimators from the Schedule drop down (see FIG. 79). To see a specific Estimator view, select the Estimator's name.

Creating New Opportunities

The Opportunity is a single page form designed to collect basic information about a potential customer, and serves as a communication tool for the salesperson.

Opportunities can be created from various sources:

The Home Office Customer Care Center creates opportunities and assigns them to an agency (covered in previous section)

Agency Call Centers can create leads and assign them to an individual sales person Booking agencies can create leads and assign them to an Origin agency for National Account moves.

Figure 80:
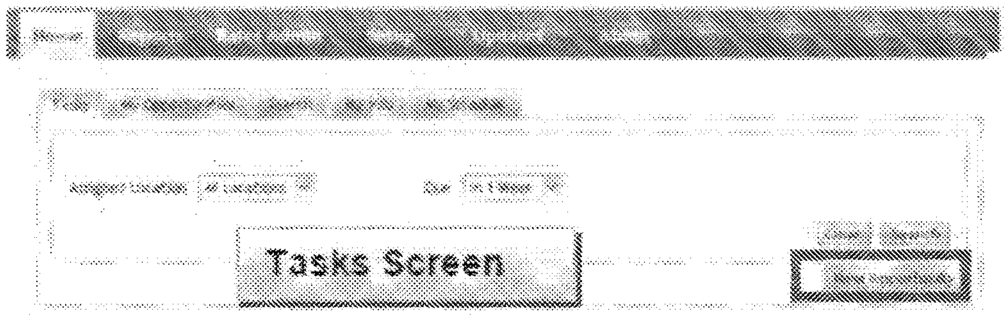
Figure 81:
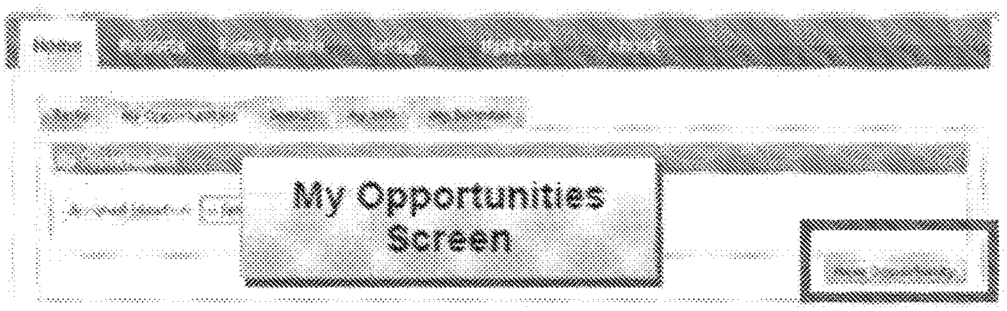
Figure 82:
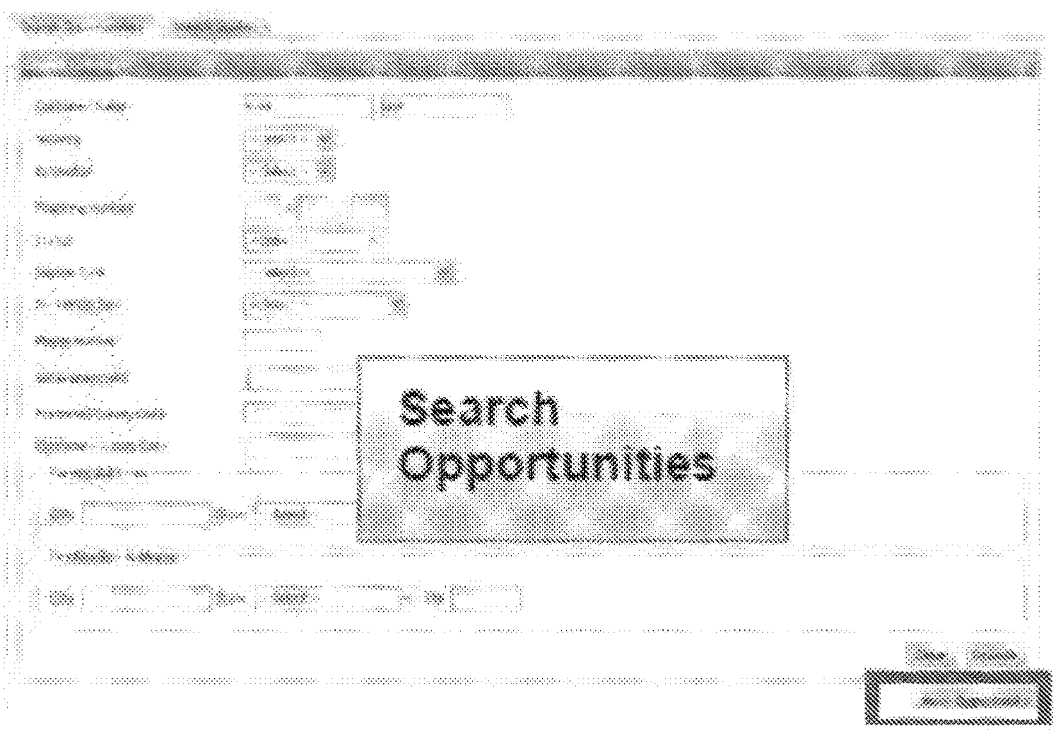

Agency Lead Coordinators and Sales personnel can create opportunities by selecting the New Opportunity button located on the Tasks, My Opportunities and Search tabs (see FIGS. 80, 81, and 82, respectively).

Follow the same process to set the appointment and assign the estimator, as described in the section on receiving leads from the Home Office. This process is the same no matter where the opportunity is initially created. Remember, all your leads should be entered in Quotes-To-Go. This includes Local, Intrastate, Military, and OA leads.

Minimum required information for creating an opportunity:

Agency Number
Source Type
Customer Type
Customer Name

Address Tab

When entering address information in the opportunity, there are two helpful address options:

Find Zip

Figure 83:
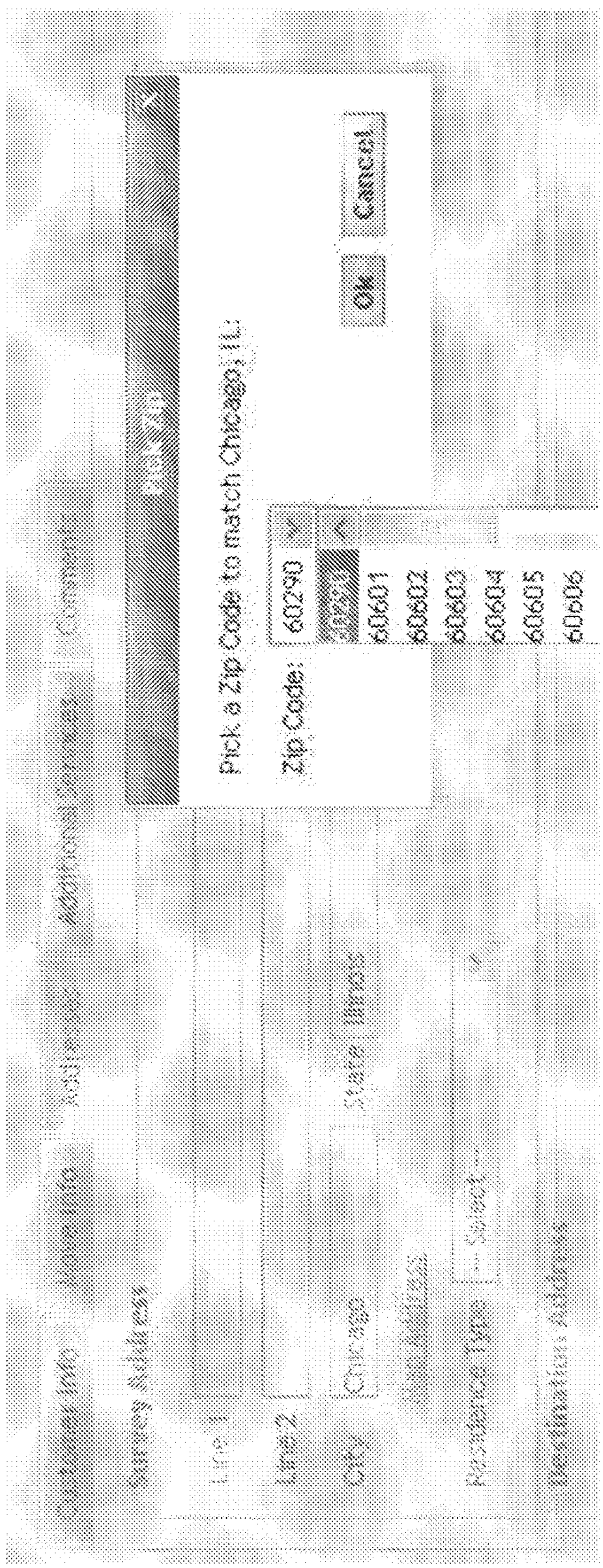

If you type in the City and State, you can leave the Zip field blank and click the Find Zip button to look up and pick an appropriate zip code (see FIG. 83).

Find City/State

Figure 84:
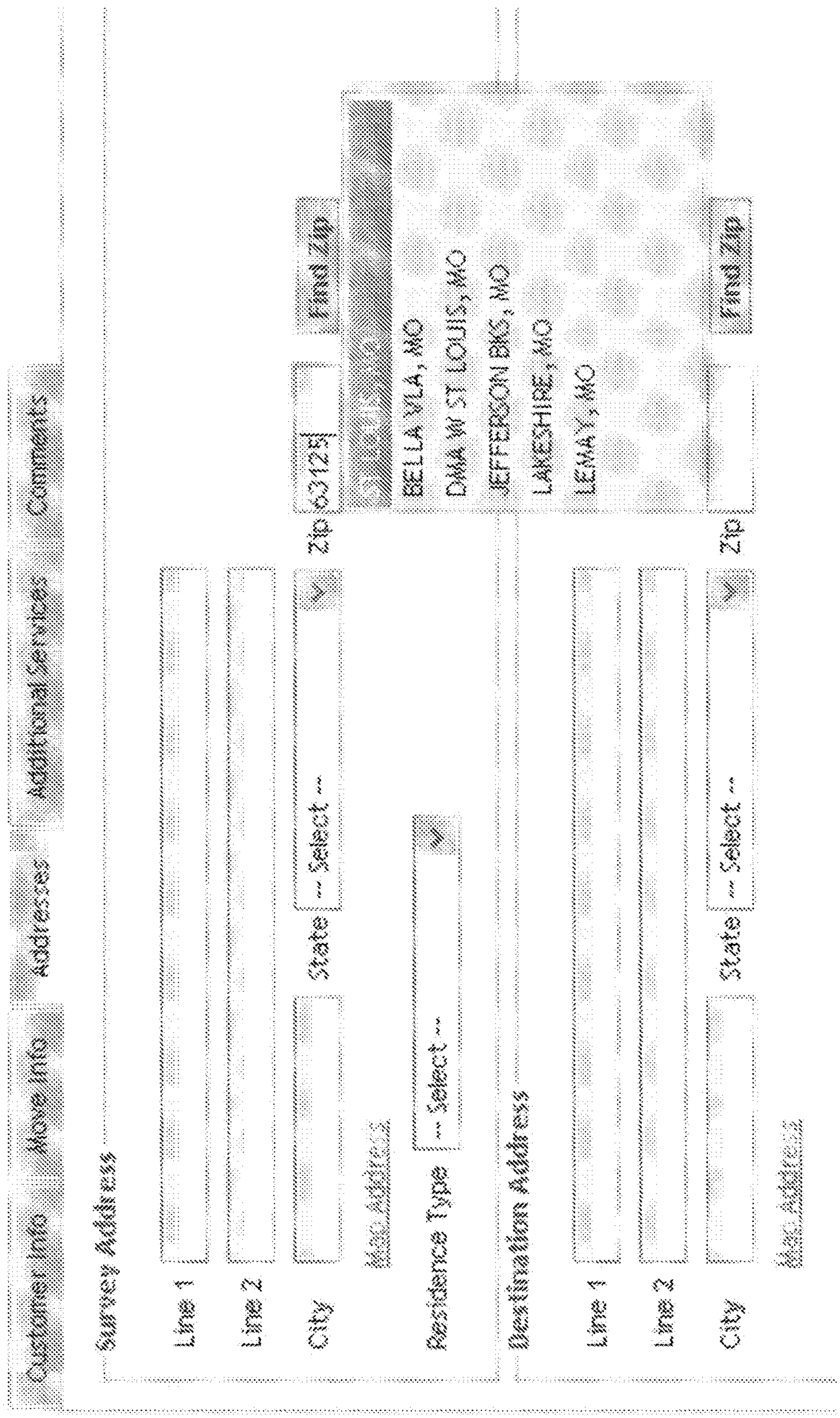

If you know the zip code, leave the City and State fields blanks and type in the Zip and press Enter. You can select the appropriate city and state, or if only one applies, the city and state is automatically entered (see FIG. 84).

Ball Park Quotes

Figure 85:
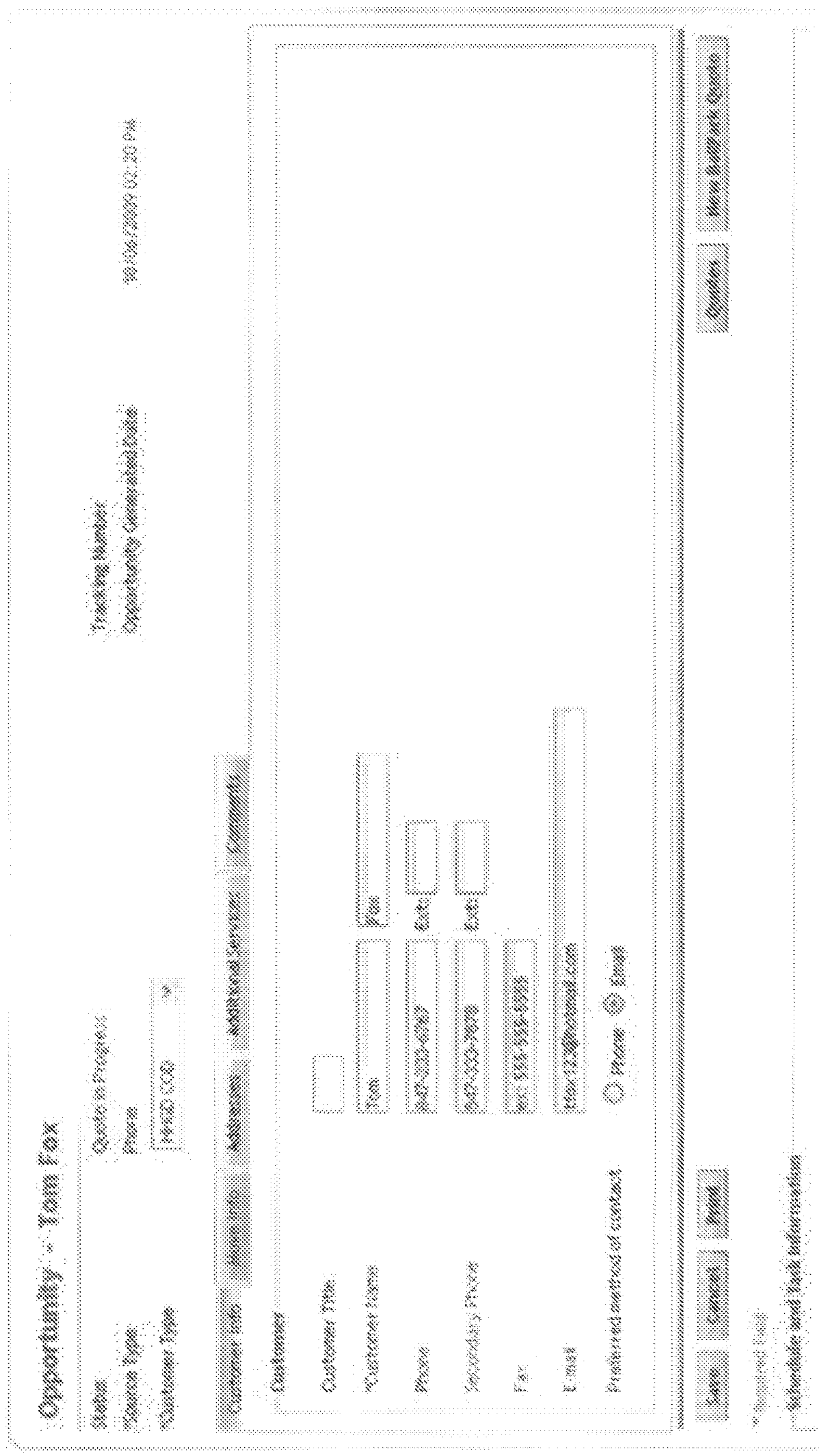

You can create ballpark quotes directly from the Opportunity screen (see FIG. 85).

Or, you can clock the Quotes button in the bottom right-hand corner of the Opportunity screen, and then click the New BallPark Quote button from the MyQuotes screen.

Figure 86:
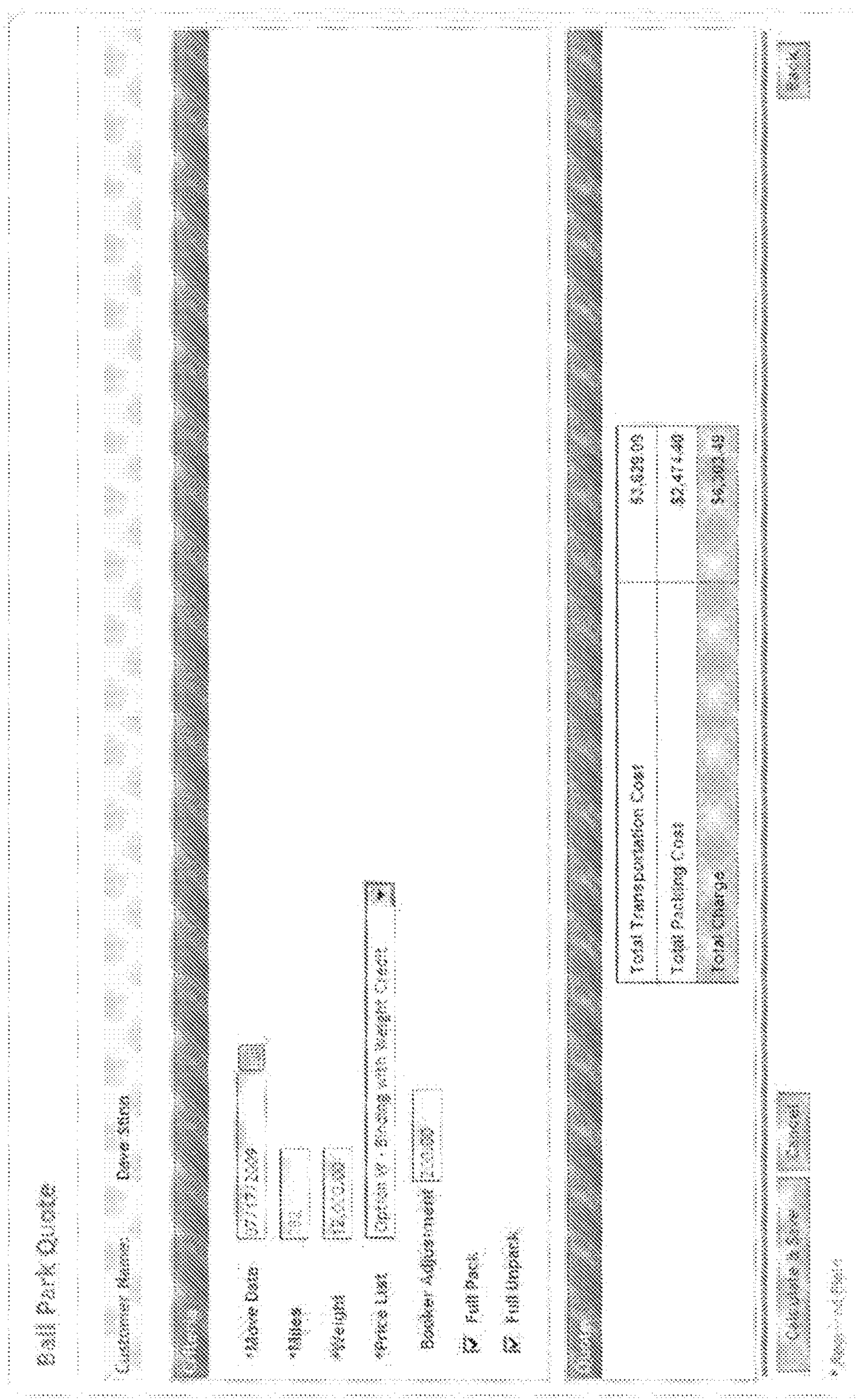

Enter the move date, the estimated weight, and the desired price list and discount/booker adjustment (see FIG. 86). Indicate whether to include full-pack rates and click Calculate & Save. When two ZIP codes have been entered on the Opportunity, the mileage is calculated from MileMaker.

Figure 87:
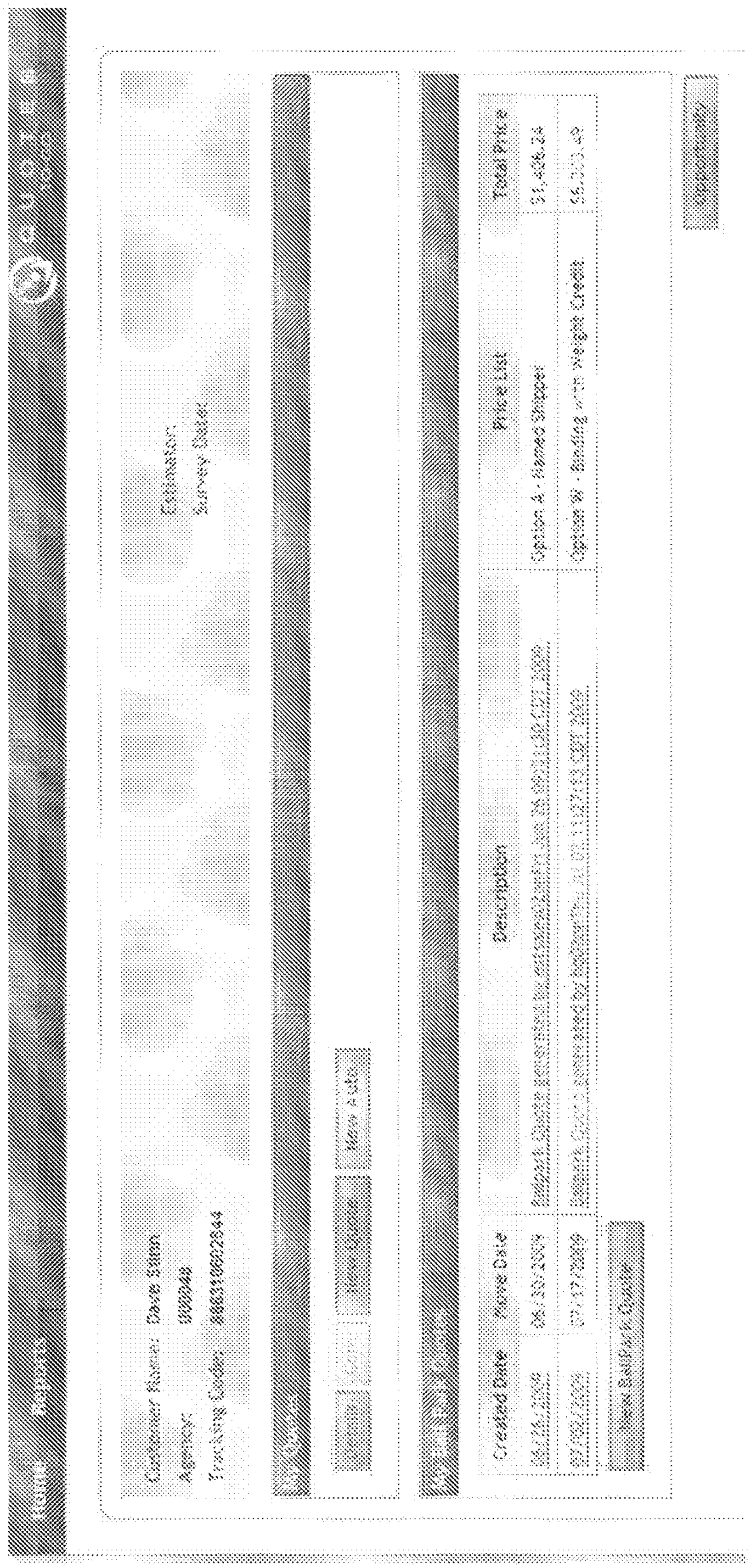

Click the Back button to return My Quotes (see FIG. 87).

My Quotes Screen

Figure 88:
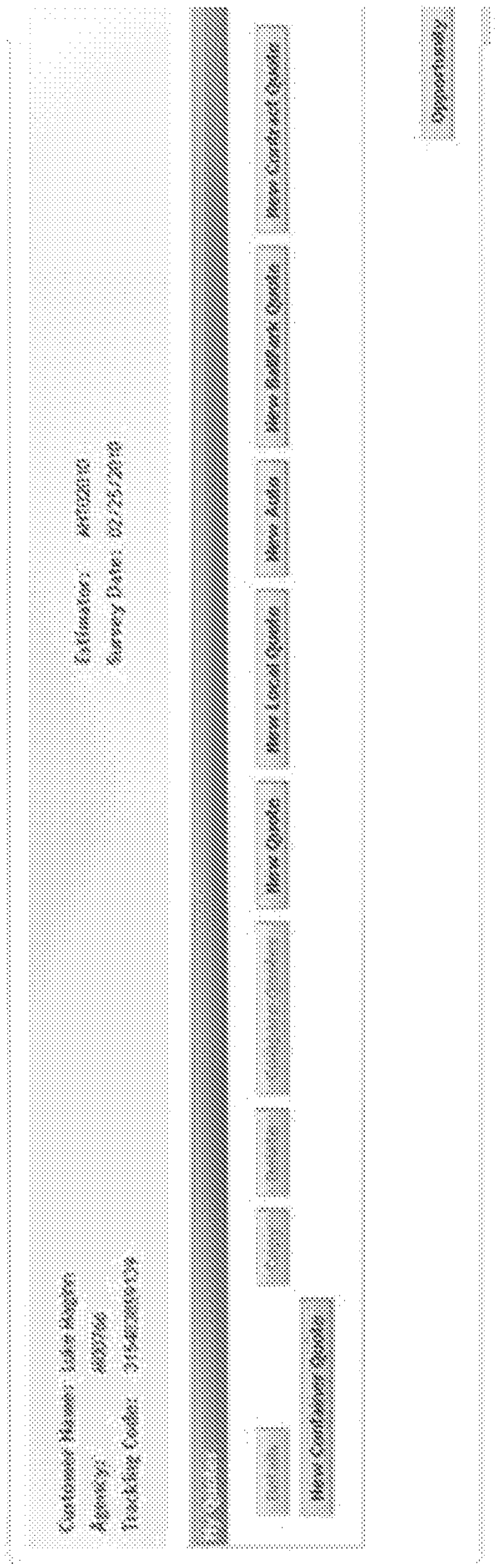

The My Quotes screen displays all of the quotes currently associated with the Opportunity (see FIG. 88). When you access the screen by clicking the Quote button from the Opportunity details screen before a quote is created, no quotes are listed. Simply select the appropriate new quote button to begin the quote process.

The Opportunity button located on the bottom right-hand corner of the screen returns to the Opportunity details.

After a quote has been created, My Quotes is the default screen when you access the opportunity.

Figure 89:
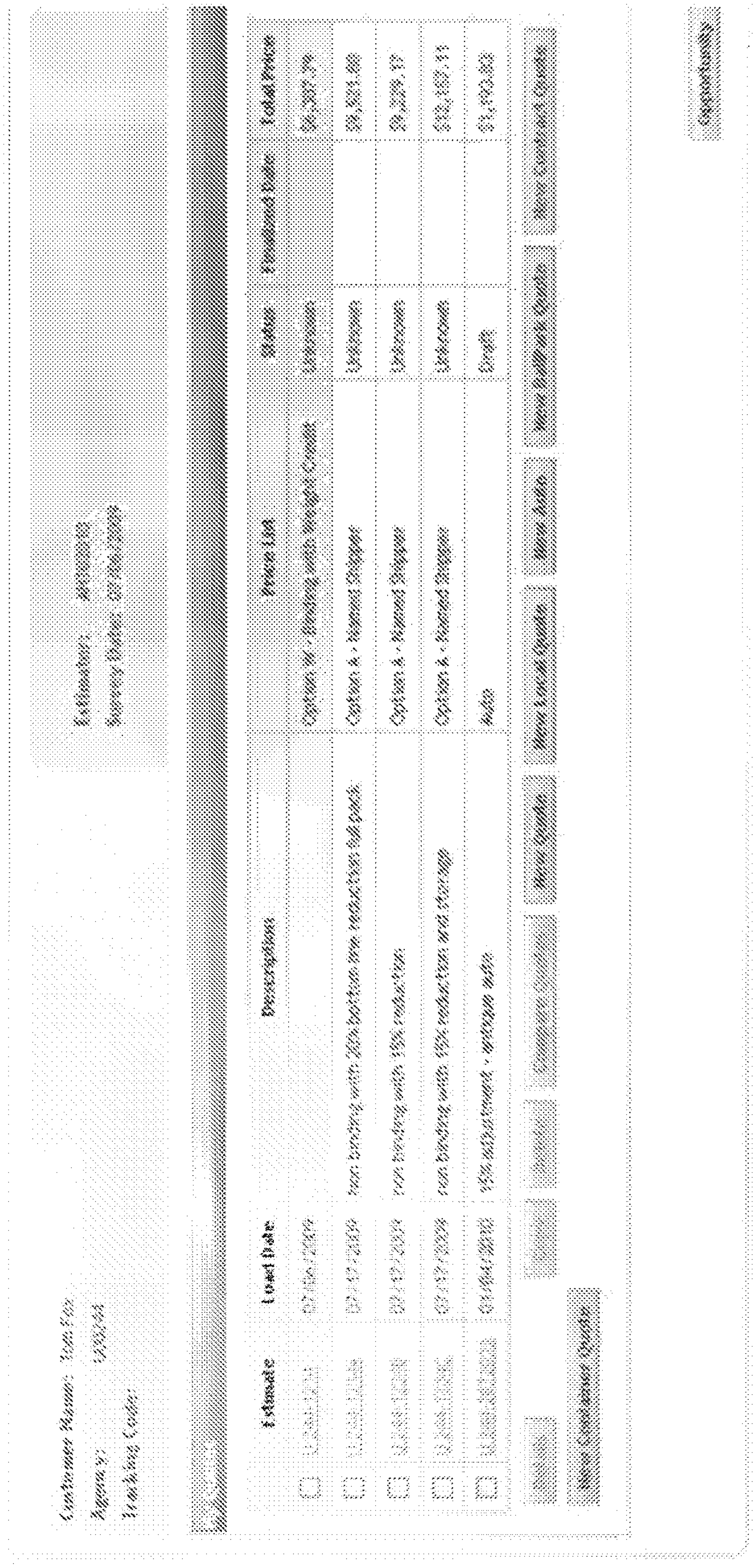
Figure 90:
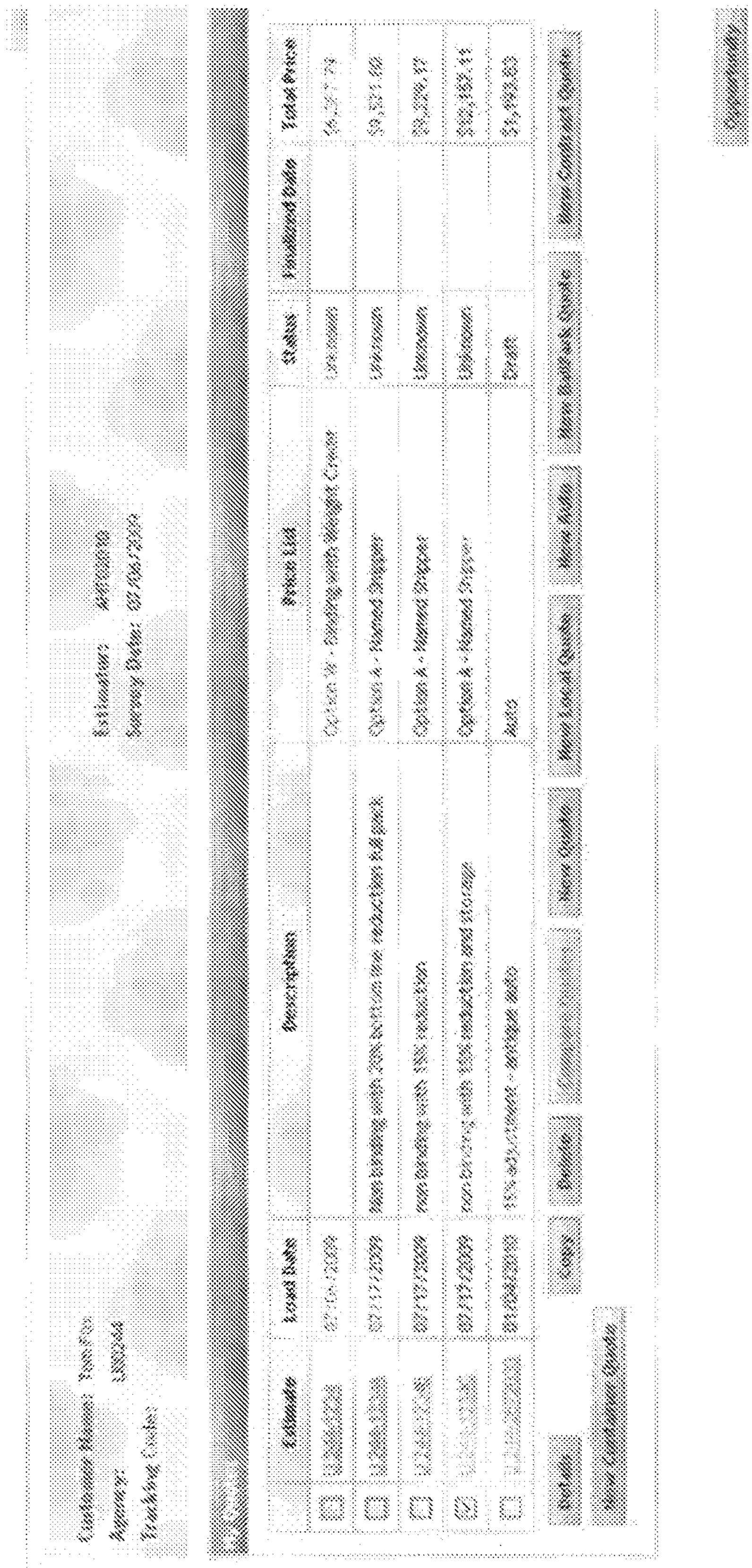

Click on the Estimate Number (see FIG. 89) or, select the check box to the left of an estimate (see FIG. 90) and click the Details button to go to the Move Information screen.

OA Surveys

If the customer's origin address is in location different from your own area, you can assign an origin agent and schedule a preferred survey. Check to make sure the origin agent uses Quotes-To-Go before assigning a survey through the system.

Once an origin agent has been assigned, the system creates a task for that agency to confirm the survey and perform it.

Process Steps to Follow when the Booker and OA Both Uses Quotes-to-go

Booker—Assign Origin Agent within the Opportunity

Figure 91:
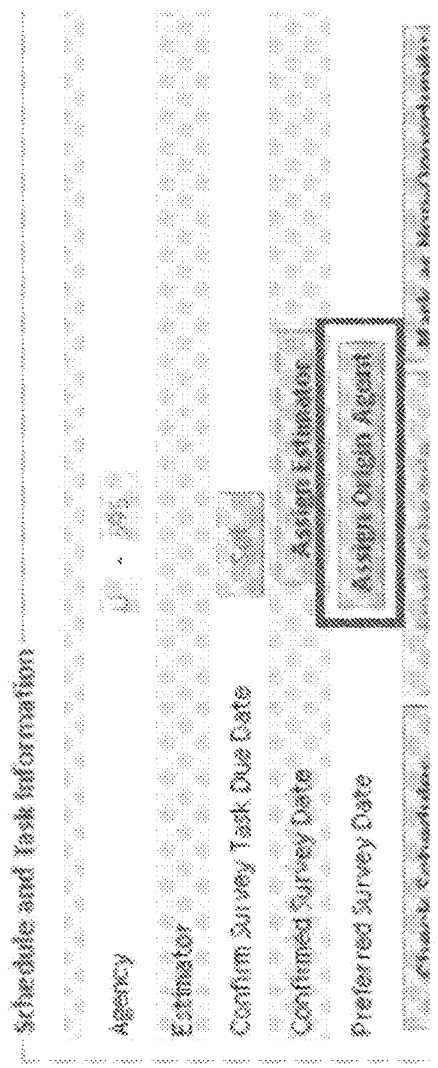

The ability to assign an OA for survey is available for all customer types. To do so, click the "Assign Origin Agent" button within the opportunity (see FIG. 91).

Figure 92:
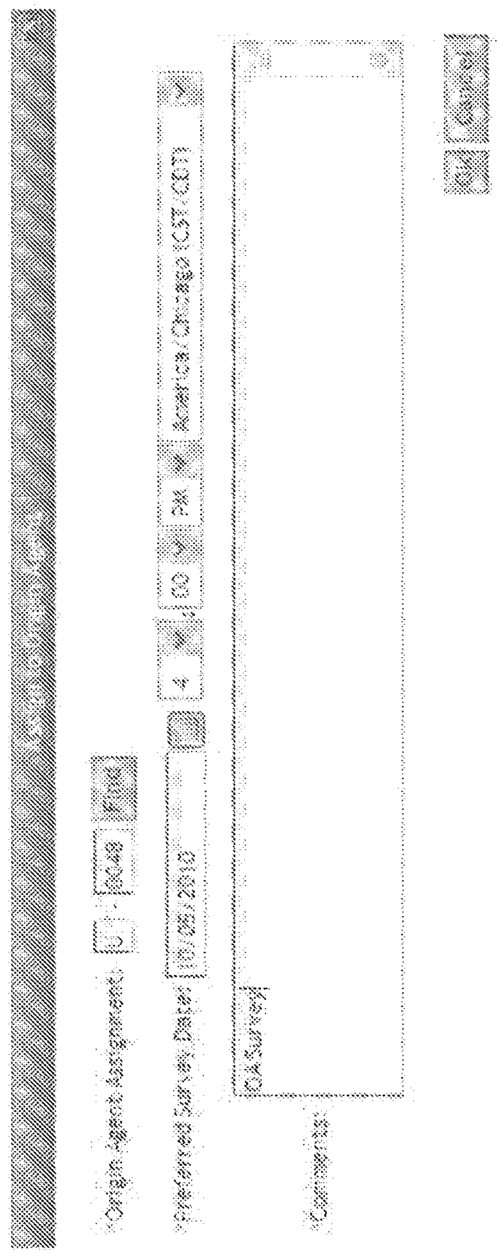

Complete the screen and click OK (see FIG. 92).

Booker—e-Mail the Origin Agent

Figure 93:
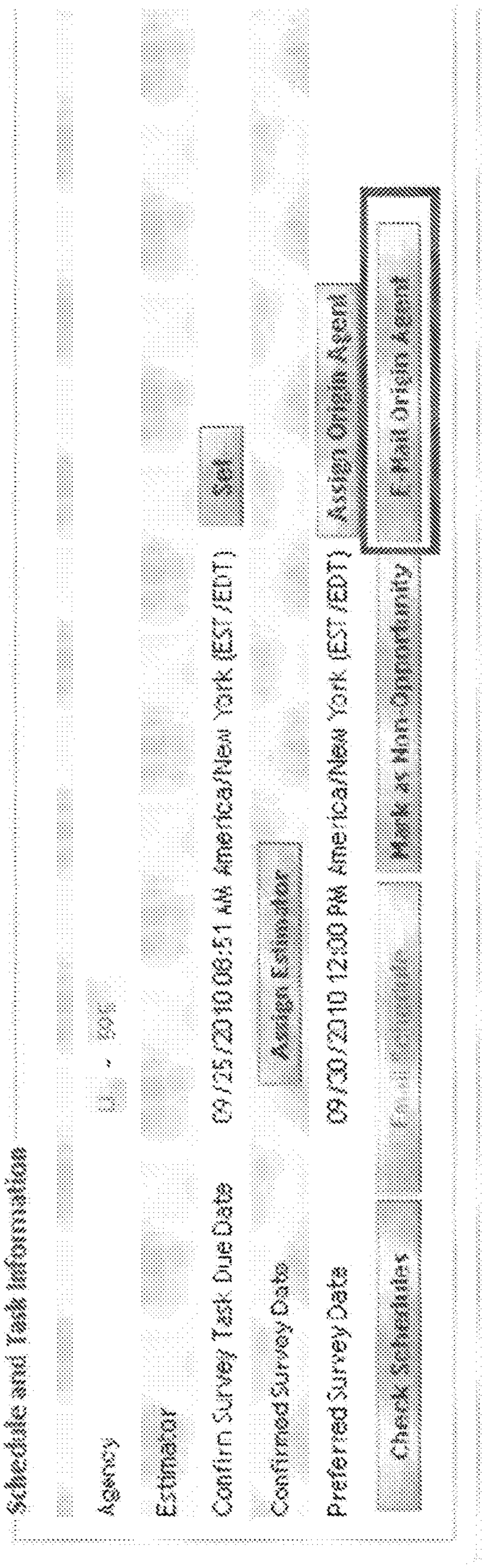

Once an origin agent is assigned, a button appears to allow e-mails to be sent to the Origin Agent (see FIG. 93).

Figure 94:

If the origin agent has notification e-mail addresses setup via the SETUP tab in Quotes-To-Go, then a default e-mail address for the OA appears (see FIG. 94).

Click the Send button at the bottom of the screen.

Origin Agent—View Perform Survey Tasks

Figure 95:
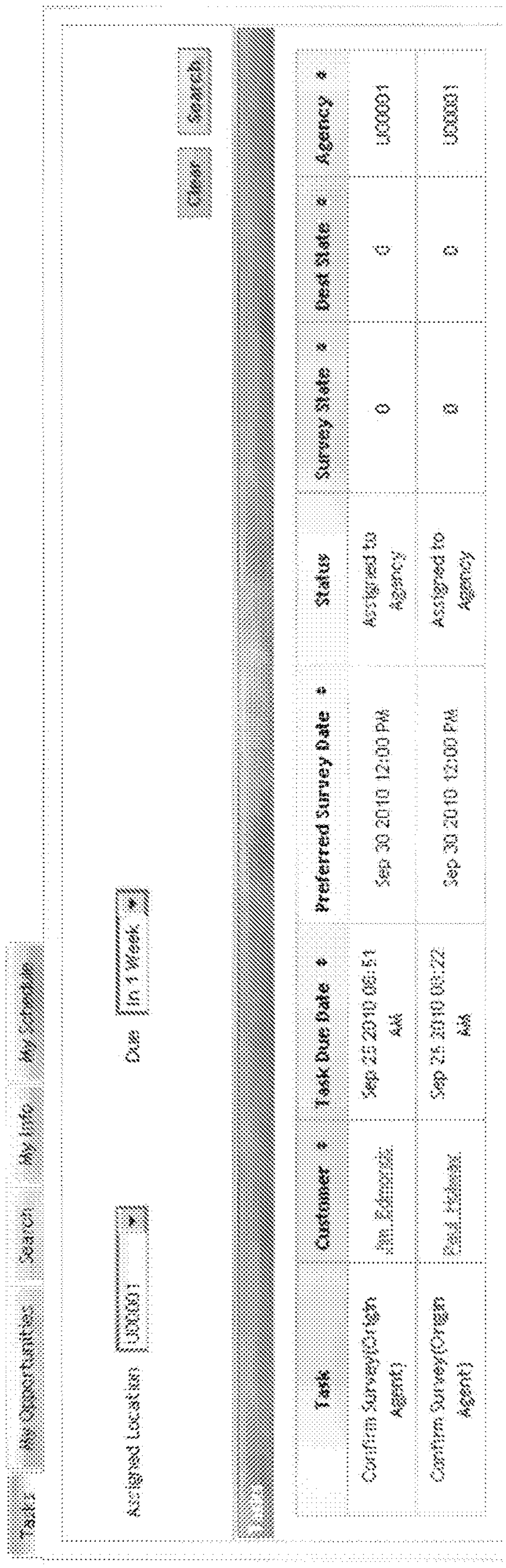

Once assigned as an Origin Agent, the OA sees a task to Confirm the OA Survey in the default task list and My Schedule calendar (see FIG. 95).

Assign the Origin Agent task to a specific salesperson, who receives a Perform Survey Task.

Origin Agent—Create Survey without a Quote

Figure 96:
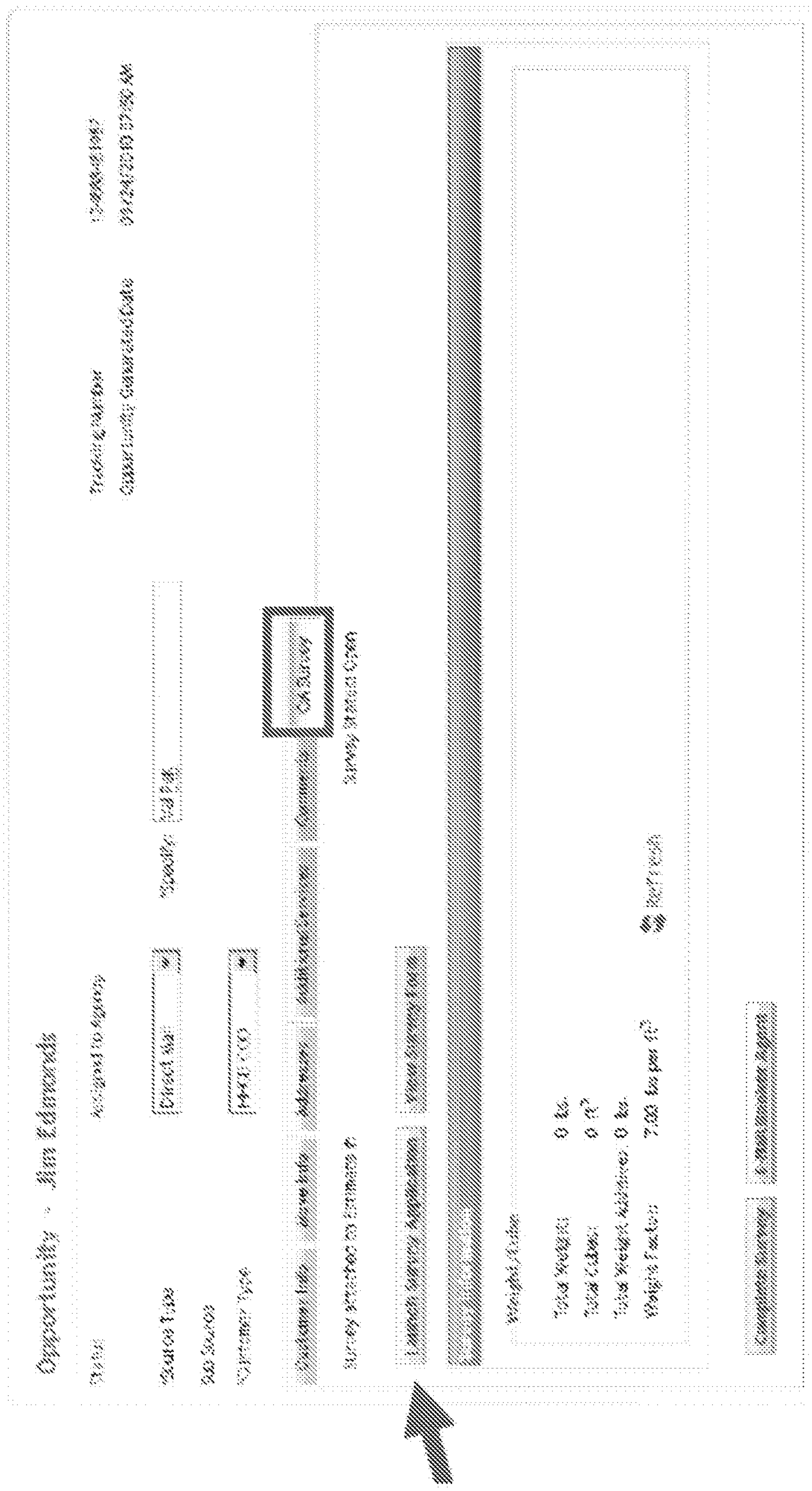

As the Origin Agent, click the OA Survey tab within the opportunity to launch and create an OA survey (see FIG. 96).

Figure 97:
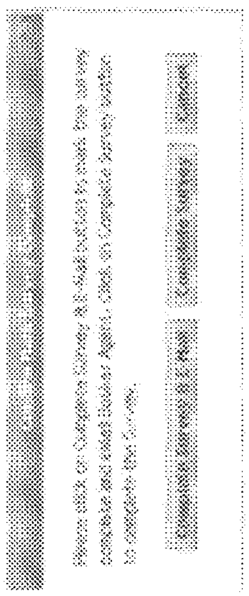

The survey is then performed without the need to create a quote or enter an estimate number. When the survey is complete and has been uploaded, click the [[Complete Survey & E-mail]] button (see FIG. 97). This allows you to mark the survey as complete and inform the Booker via e-mail. You also have the option to complete the survey without e-mailing the Booking Agent.

Booker—Receive OA Surveys and Attach to Quotes.

Figure 98:
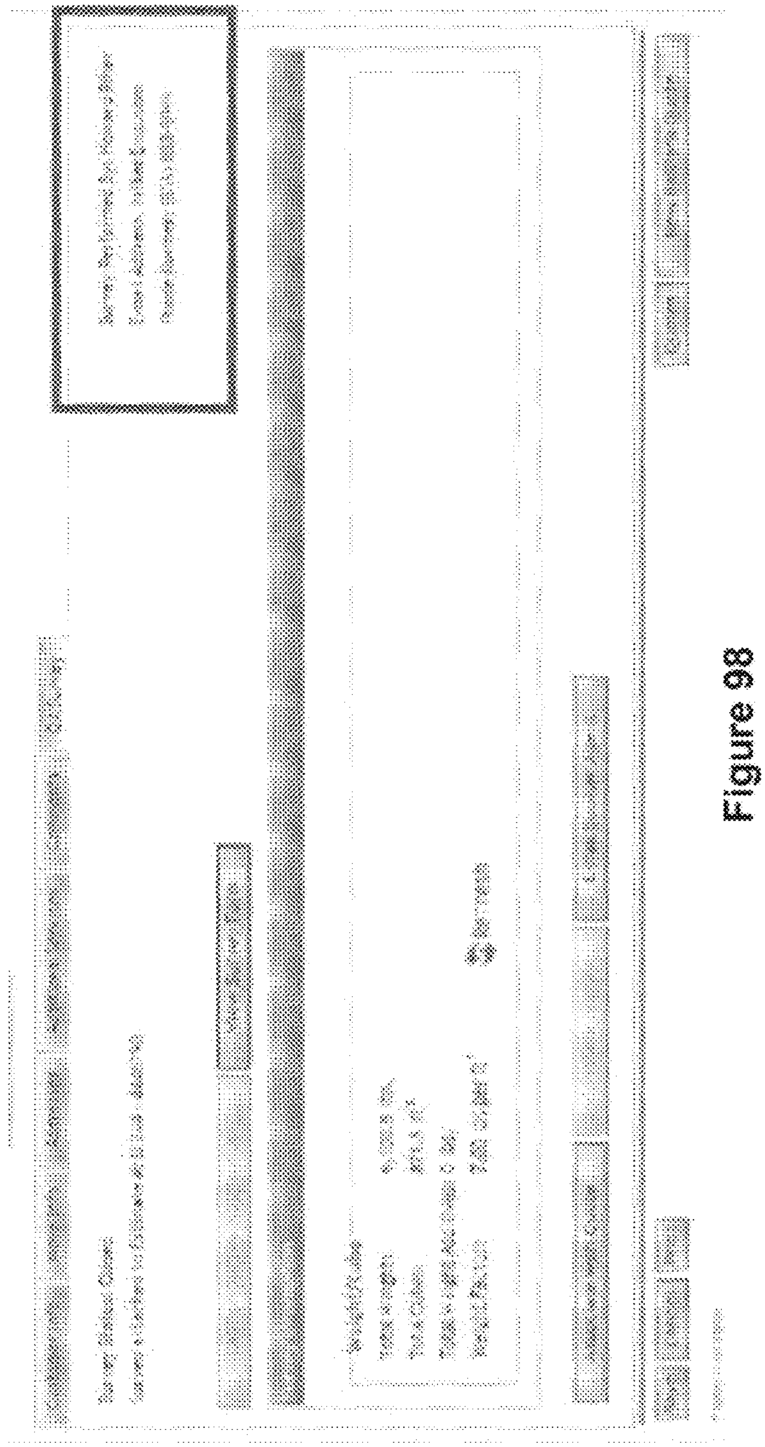

As the booker, once an OA survey has been performed, it can be viewed from the OA Survey Tab within the opportunity (see FIG. 98). The name and contact information of the person who performed the survey is displayed on the screen.

As the booker, you can now create a quote to attach this survey. Create a quote following normal processes.

Figure 99:
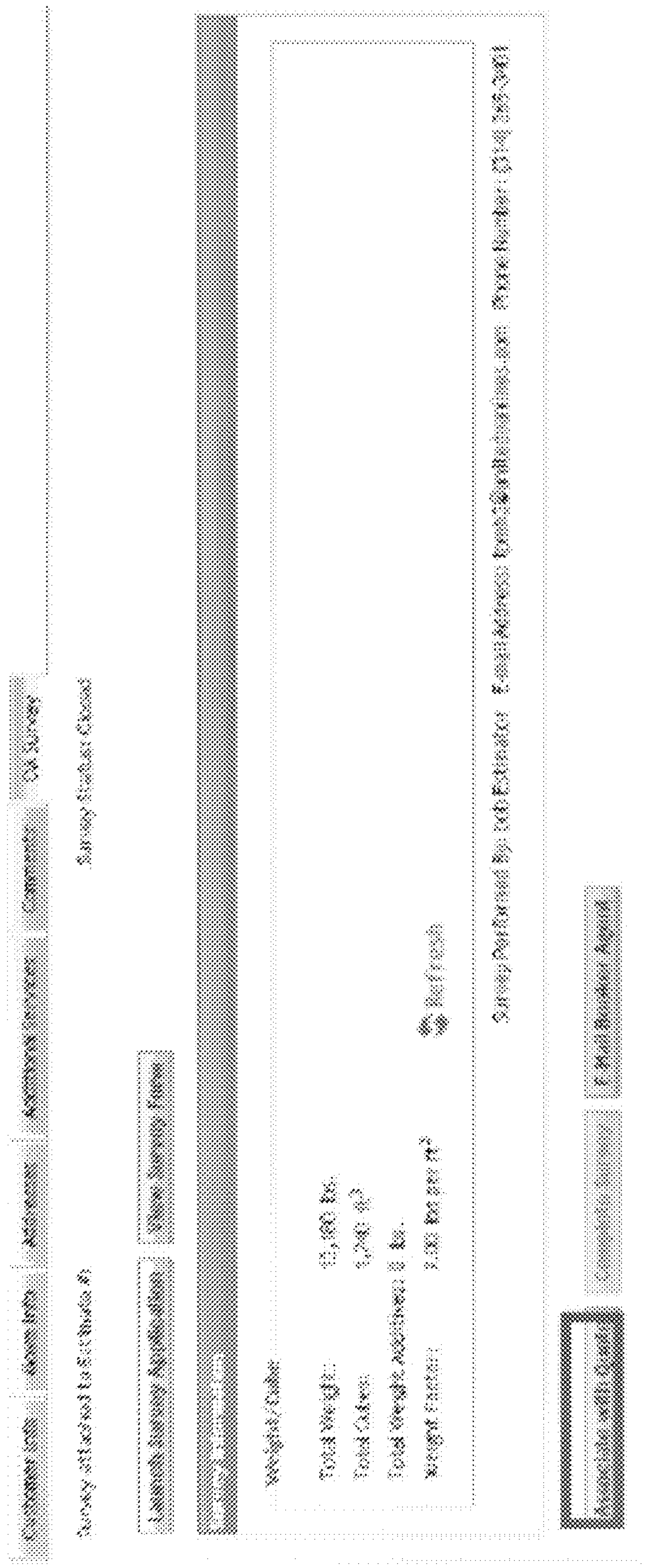

The Associate with Quote button displays on the OA Survey screen (see FIG. 99). Click the Associate with Quote button after you have created a quote and assigned an estimate number on the Move Information screen.

Figure 100:
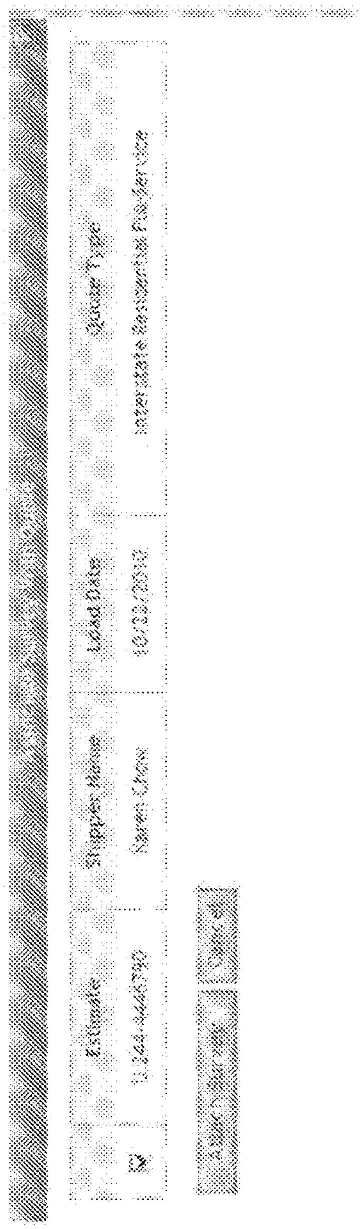

Select the quote that you created. Click the Attach Survey button to copy the survey into the selected quote (see FIG. 100). Continue with the normal rating process, entering accessorials, valuation, etc. When you calculate estimate totals on the Summary screen, the Order for Service and other documents are available for you to provide to the customer.

Process Steps to Follow when Just the OA Uses Quotes-to-be

Figure 101:
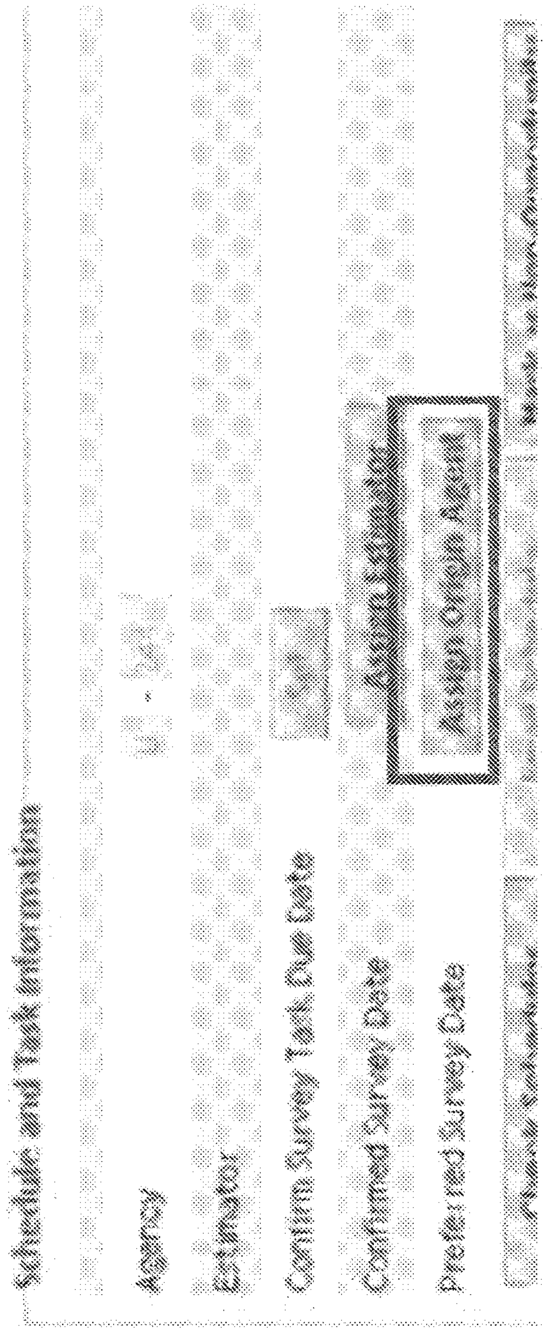

If you, as a Quotes-To-Go Origin Agency, receive an OA request from a Booker that does not use Quotes-To-Go, create the opportunity and assign yourself as the OA (see FIG. 101).

Figure 102:
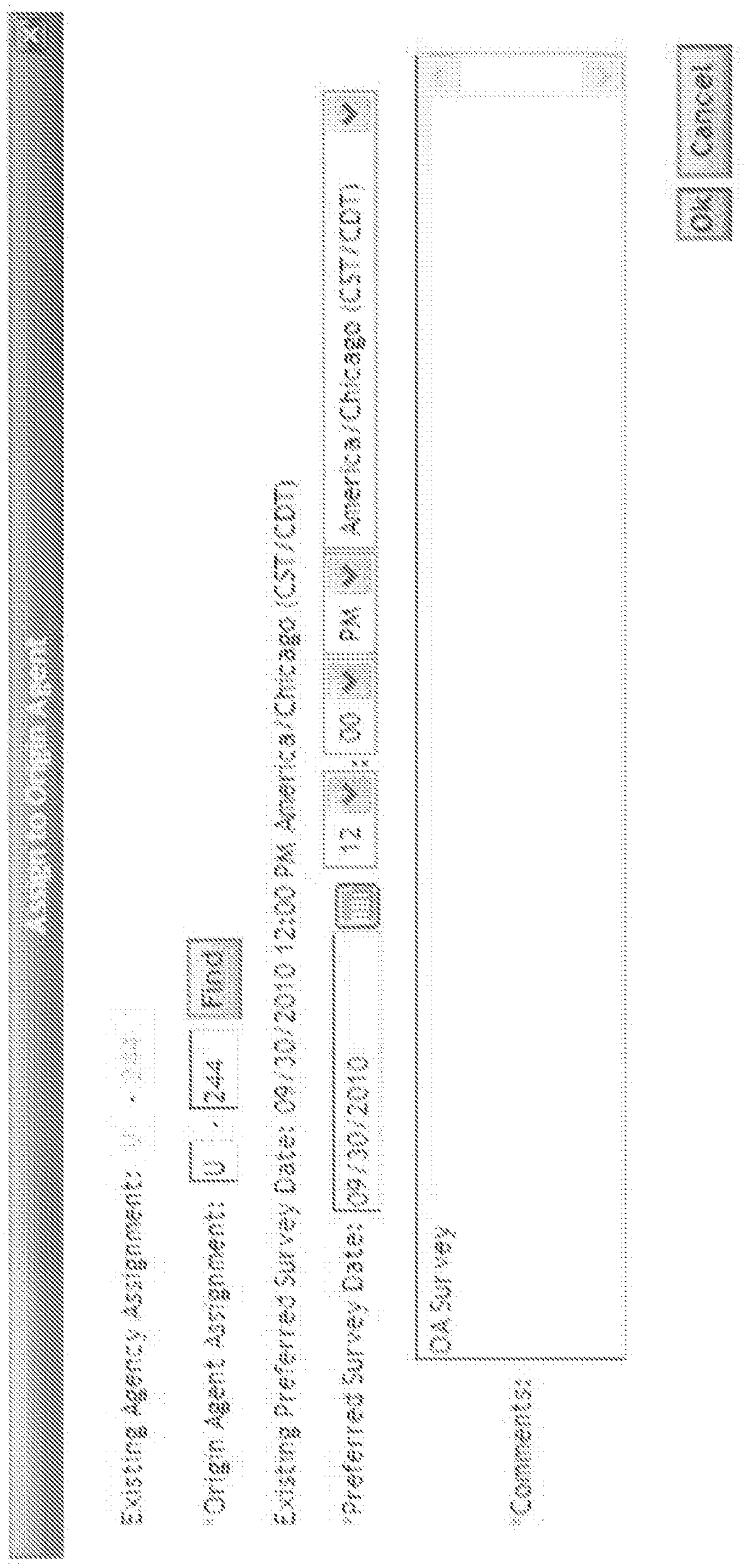

Complete the screen and click OK (see FIG. 102).

Figure 103:
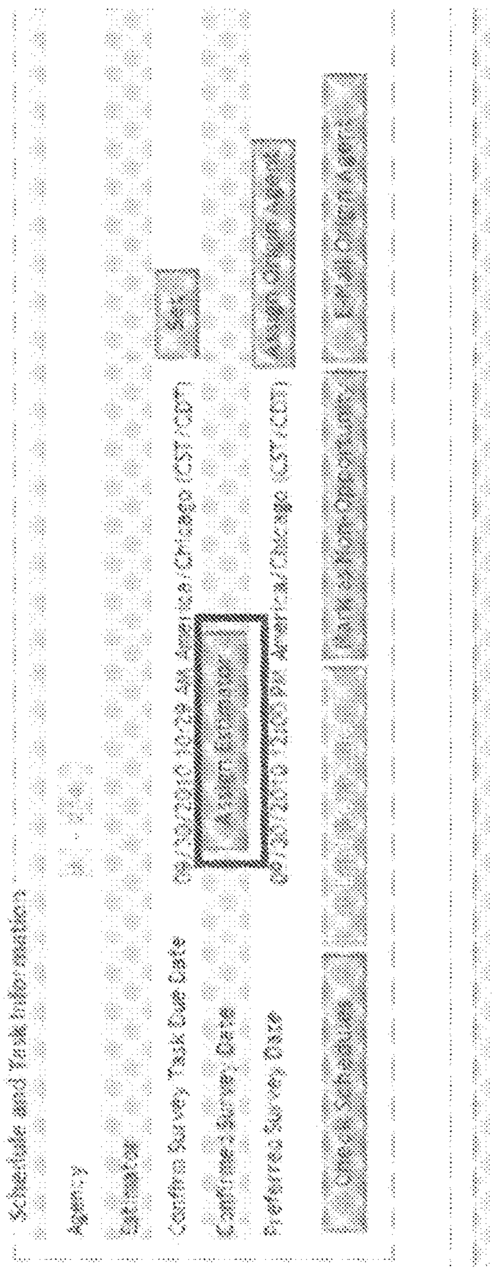
Figure 104:
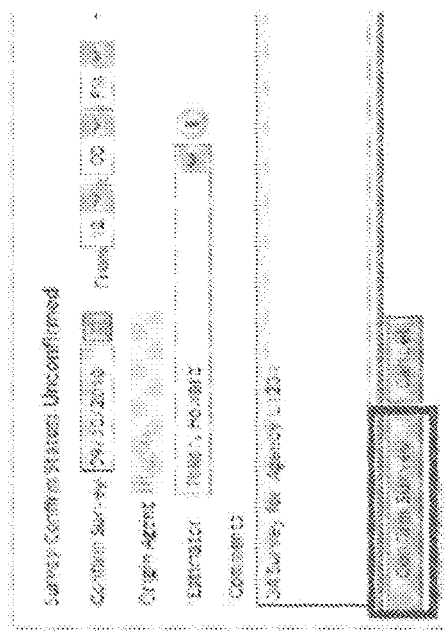

Assign the estimator who will perform the OA survey (see FIGS. 103 and 104).

Figure 105:
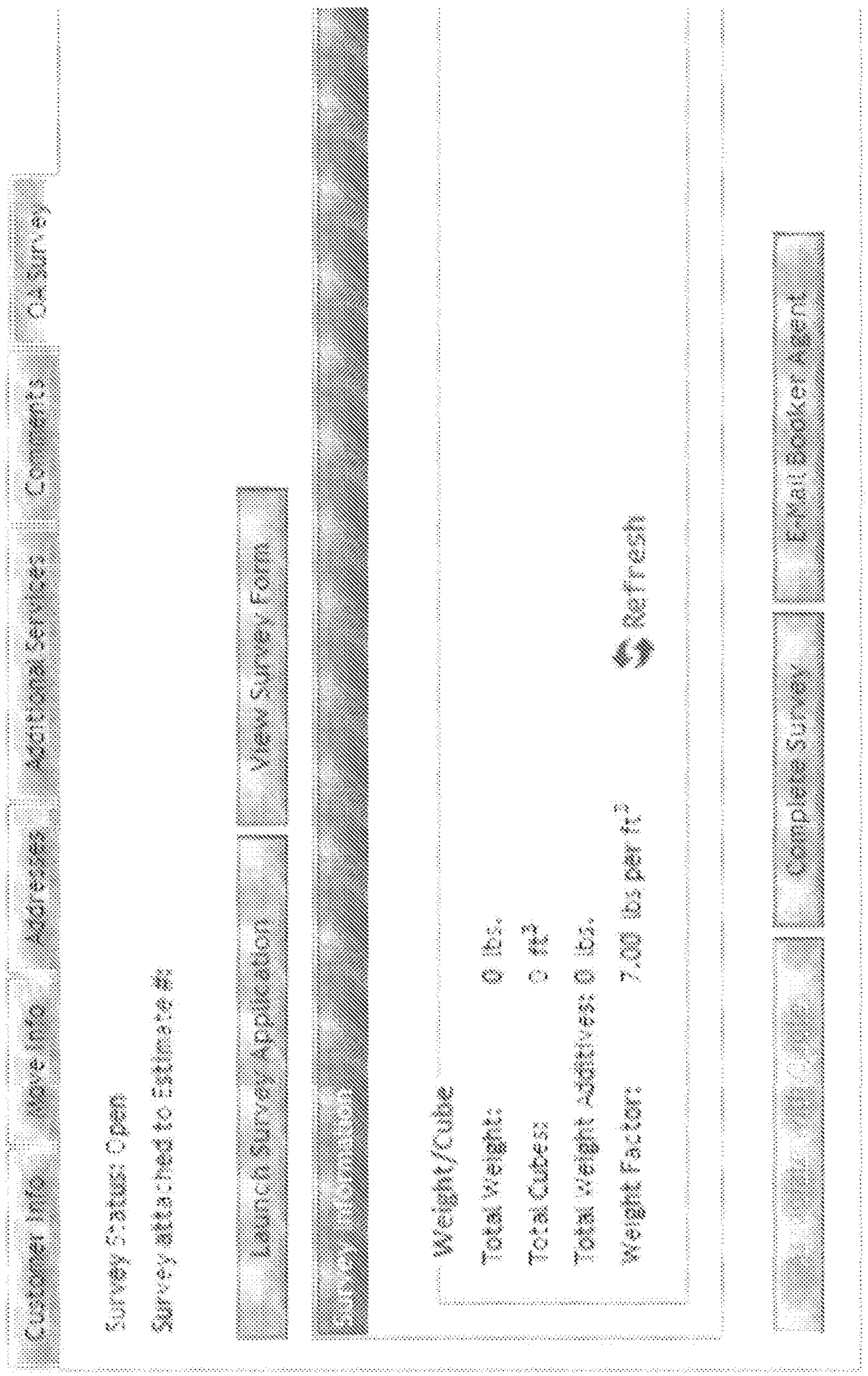

The Estimator accesses the opportunity from the task list or calendar and launches the survey from the OA survey tab (see FIG. 105). This allows the survey to be performed without creating a quote or using an estimate number.

Figure 106:
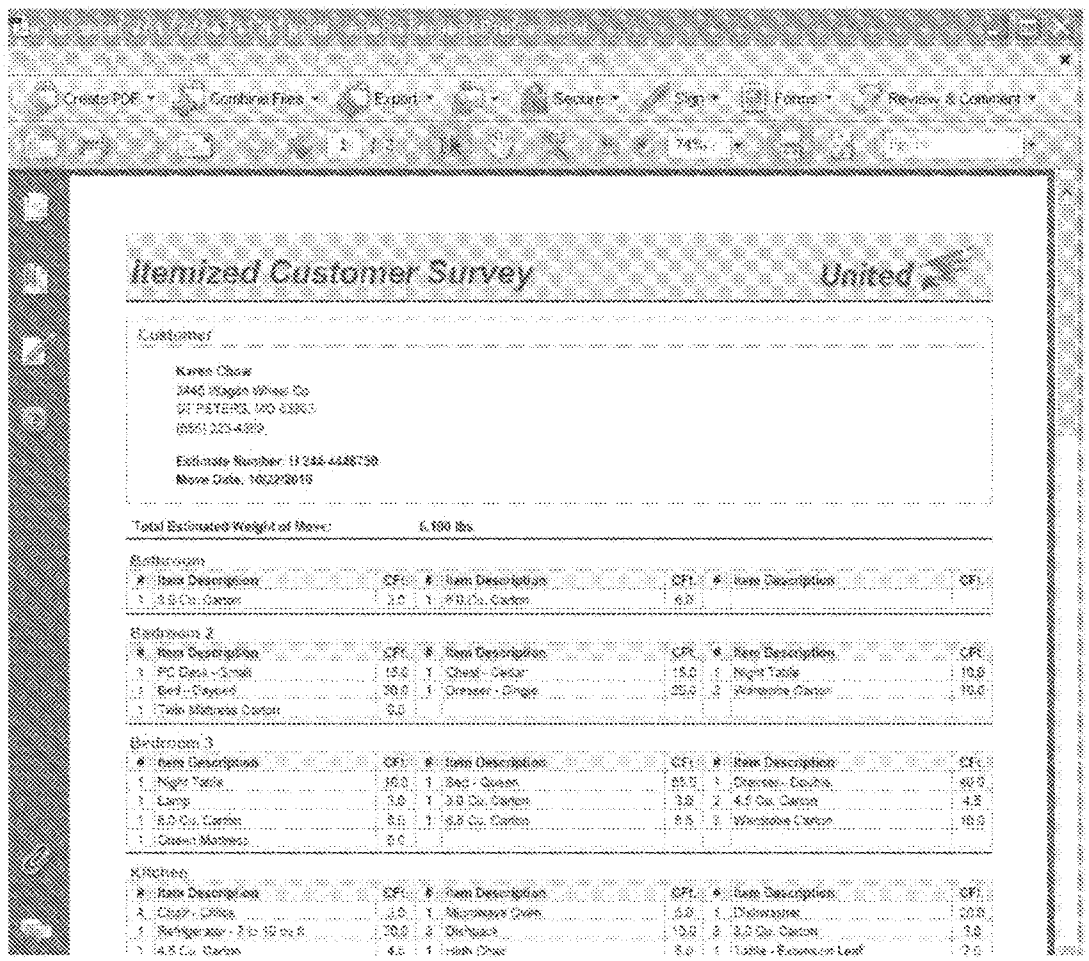

The survey is performed following normal Quotes-To-Go processes. When the survey is complete, go back to the OA survey tab in the opportunity and click the View Survey Form (see FIG. 106).

You can use the File/Save option to save the survey to your PC and e-mail it as an attachment, or you can print and fax the document to the Booker who does not use Quotes-To-Go.

Finding Opportunities

My Opportunities

Figure 107:
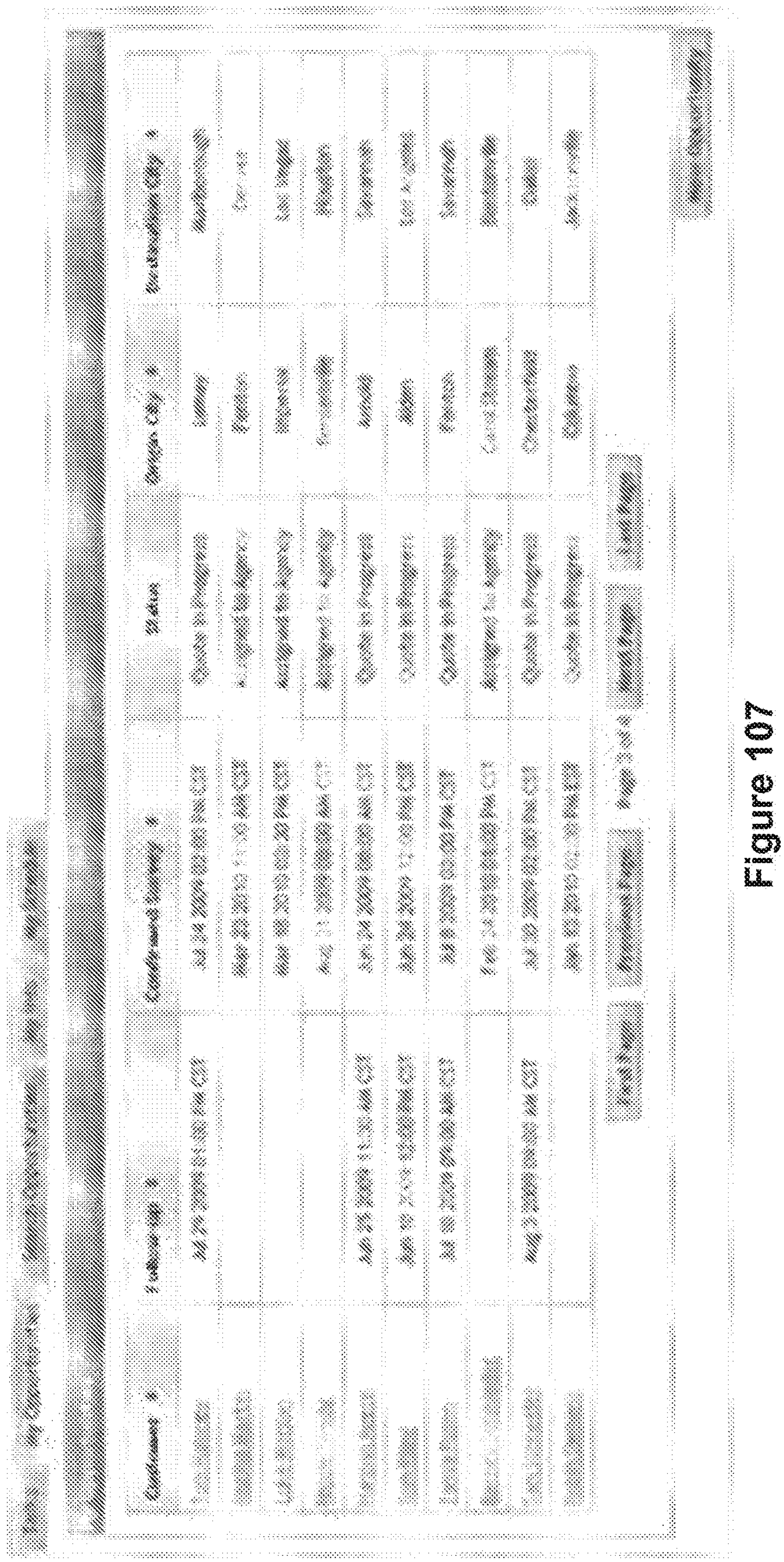

The My Opportunities section of the Quotes-To-Go home page gives an 'at-a-glance' view of all open opportunities, along with the customer status (see FIG. 107). Opportunities with the following status display on the home page by default:

Assigned to Agency—This status displays only for Agency Lead Coordinators. Opportunities have this status until an Estimator has been assigned.

Opportunities can also be in a Non-Opportunity status, or a Registered status. By default, these statuses do not display in the My Opportunities section. You can find an opportunity in any status from the Search Opportunities tab.

Searching for an Opportunity or Quote

Figure 108:
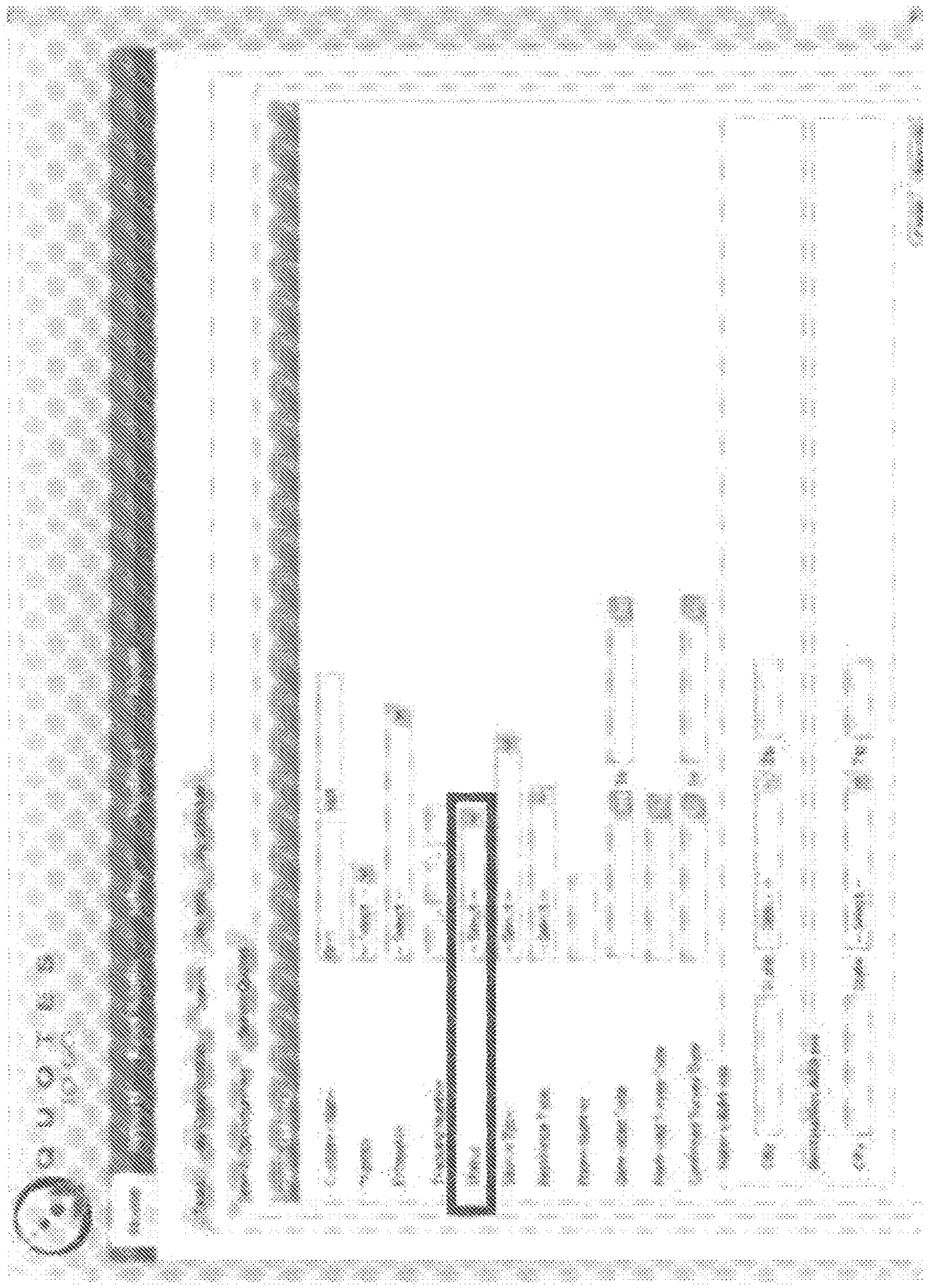

The Search Opportunities tab provides a means to locate opportunities and quotes in the system, including those that have been registered or marked as a Non-Opportunity (see FIG. 108). Once a quote has been created, the opportunity status changes to Quote in Progress.

Search by Status to locate Non-opportunities or Registered orders when you don't recall the customer's name.

Figure 109:
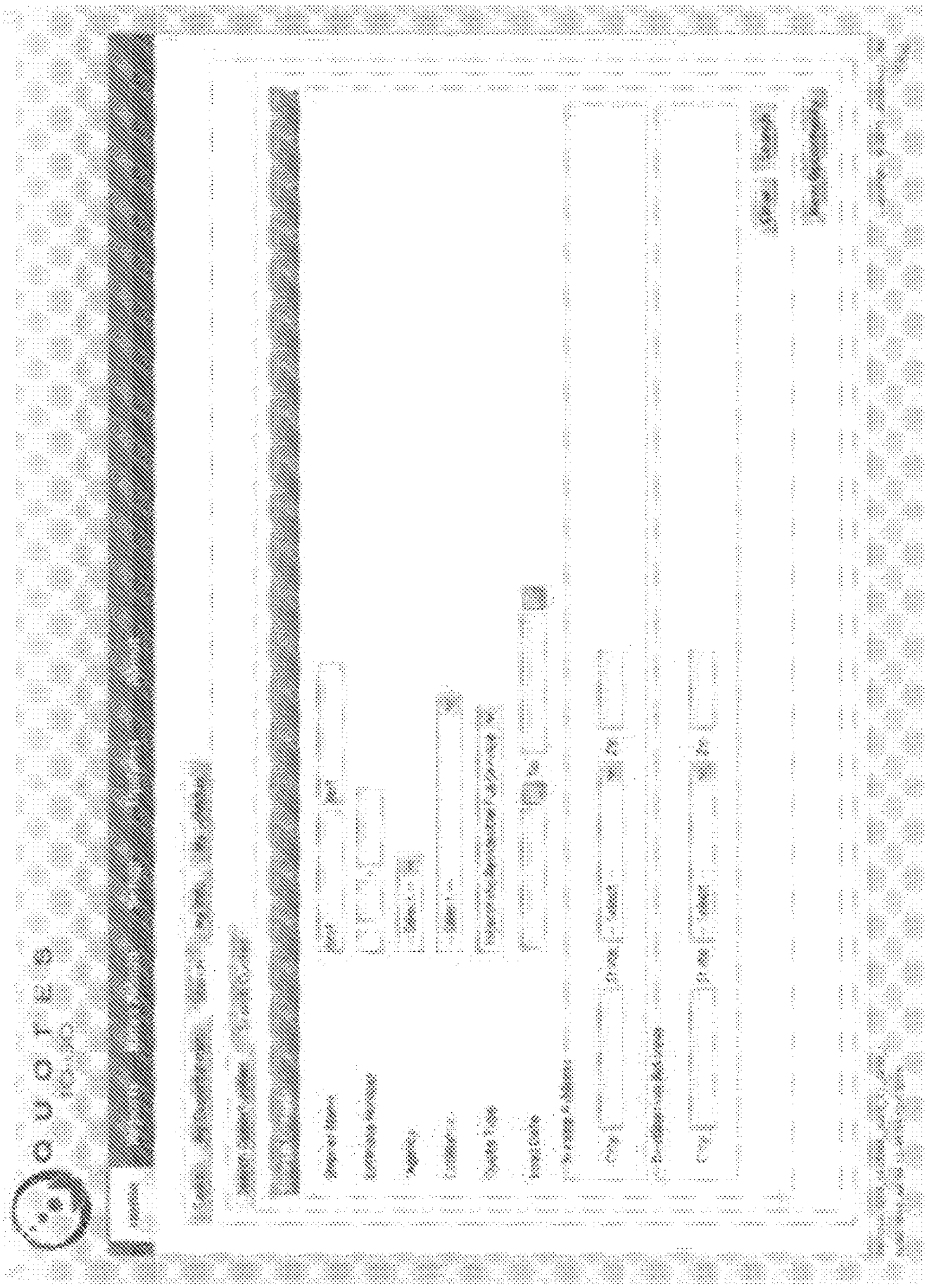

Use the Search Quote tab to search for a quote instead of an opportunity (see FIG. 109).

Forms

Getting to the Forms Page

Figure 110:
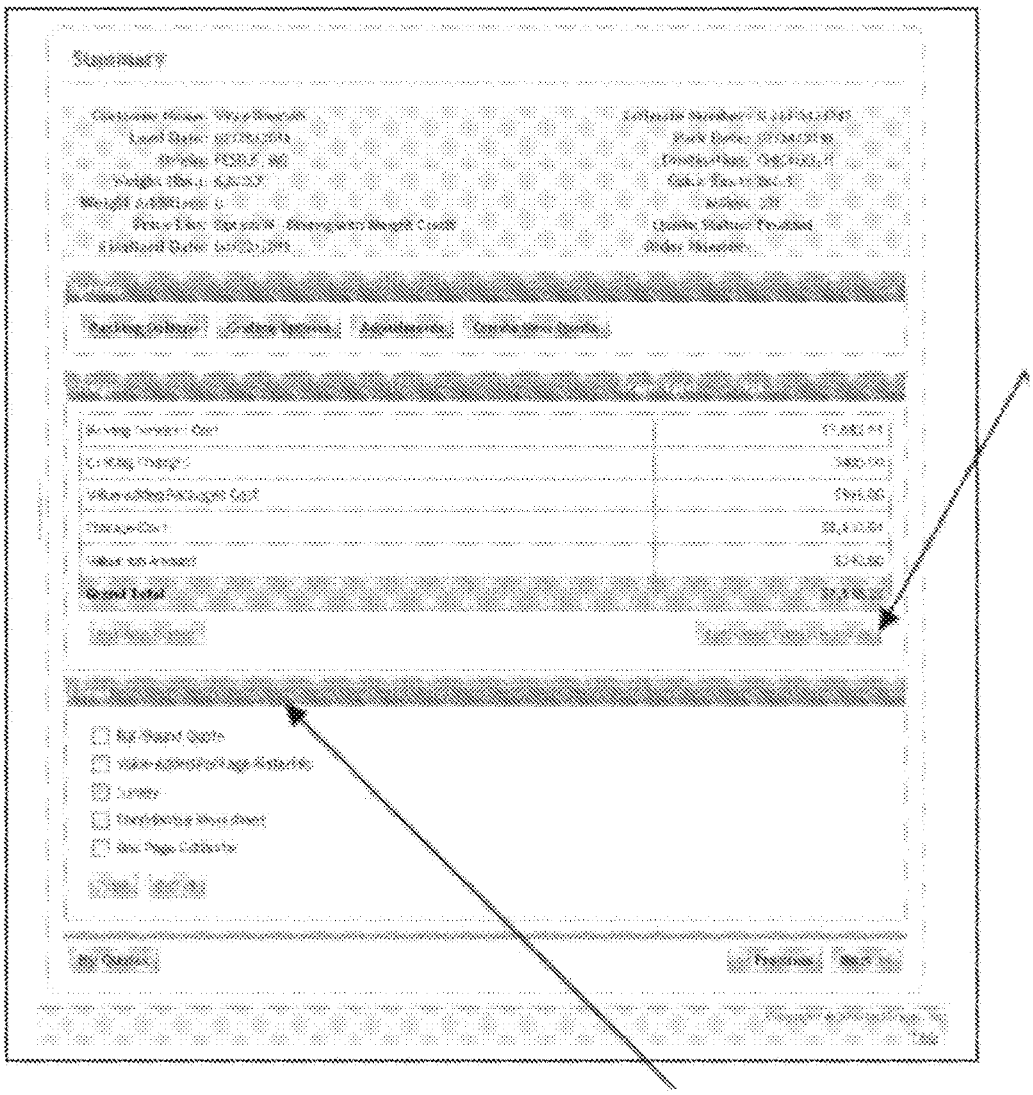

Quotes can be in either a Draft or Finalized Status. While a quote is in Draft status it can be edited. When a quote is in draft state, you must click the Calculated Estimate Totals button on the Summary page after making any changes to the quote (see FIG. 110).

Once estimate totals are calculated, forms are available on the Summary screen and can be printed or e-mailed. If the forms check boxes are not displayed on the screen, click the Forms header to toggle open the Forms area.

Forms Available

These forms are available:

One Page Estimate

Estimate/Order for Service

Value Add Amendments (if Value Add package is selected)

Survey (also known as the Table of Measurements or printed cube sheet)

Confidential Worksheet (Available for Options W and NW)

Work Order (internal form for pack crew and van operator)

These forms can be printed and/or e-mailed to customer, except for the confidential worksheet. PLEASE NOTE THAT THE ONE PAGE ESTIMATE IS ONLY A QUOTE. BOTH THE ONE PAGE ESTIMATE AND THE ESTIMATE ORDER FOR SERVICE MUST BE PRESENTED TO THE CUSTOMER FOR SIGNATURES. THESE FORMS MUST ALSO BE SCEENED INTO TRANSDOCS.

Printing Forms

Figure 111:
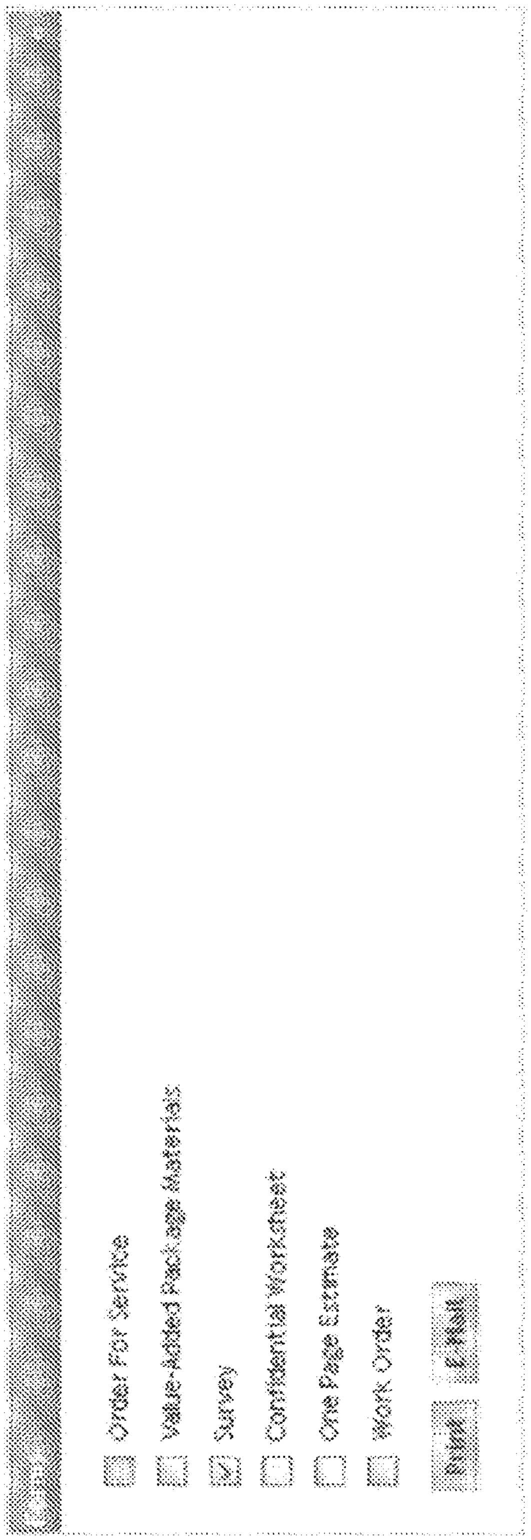
Figure 112:
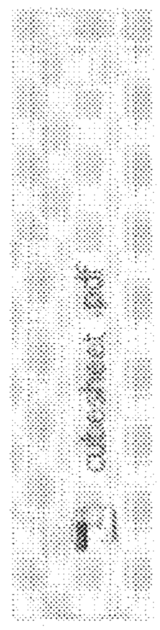

Select the check box to the left of a document, and click the Print button (see FIG. 111). The form displays in Adobe PDF. Click to launch the form (see FIG. 112). Use the printer associated with your device to print the form.

e-Mailing Forms

Select a document (or documents), and click E-Mail button.

Figure 113:
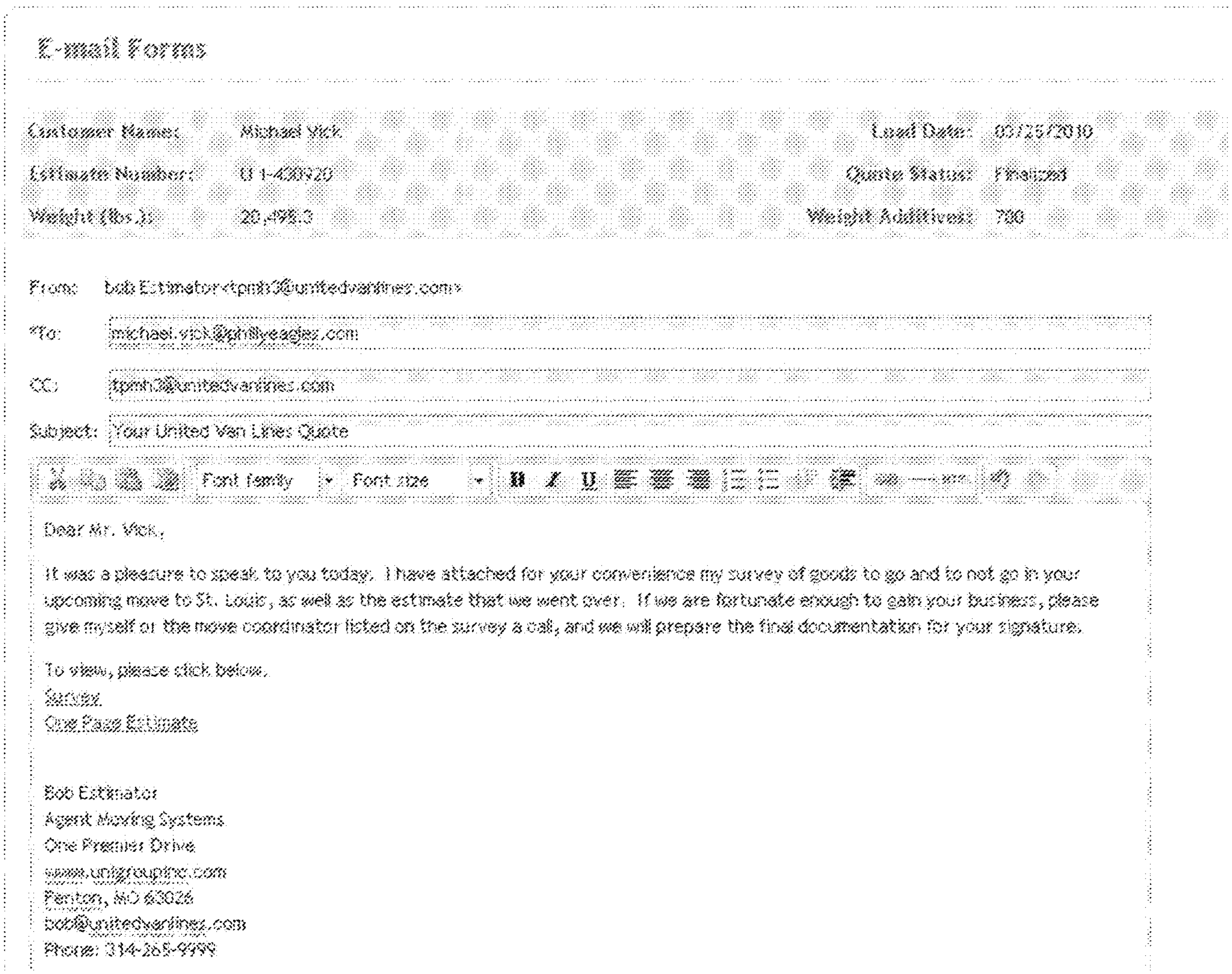

A pre-addressed e-mail to the customer displays containing links to the selected forms (see FIG. 113). You can add an additional message in the body of the e-mail. Any information you set-up in My Info section displays in the signature area. To send to multiple e-mail addresses, use a comma to separate each individual e-mail address.

Finalizing the Quote

A quote must be finalized to activate the eAcceptance button. If you use the traditional white paper forms for customer signatures instead of eAcceptance, the forms are available for printing without finalizing the quote. However, be sure the finalize the quote in Quotes-To-Go before you register the order in RORD.

Interstate Quote Download Button

Figure 114:
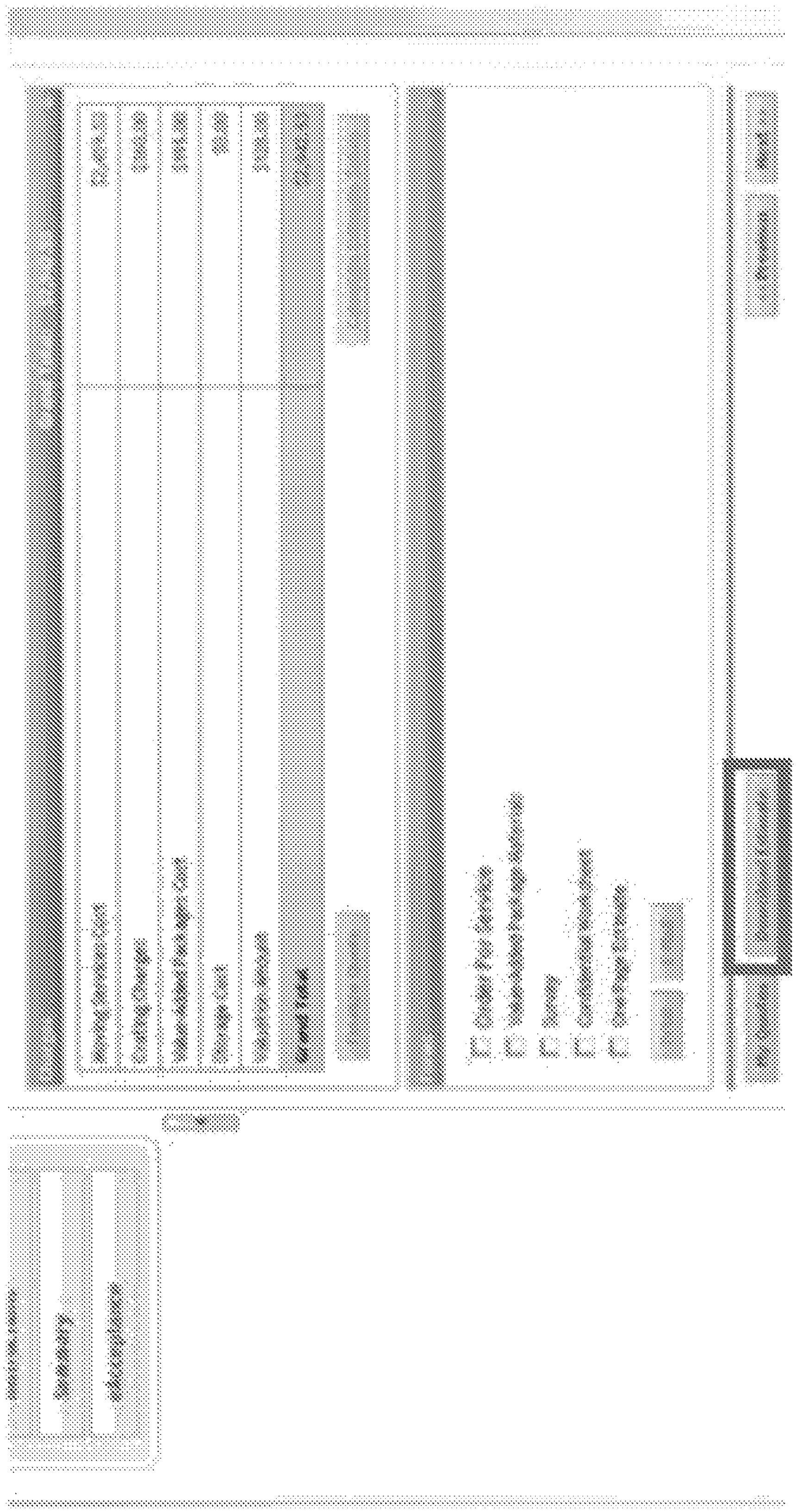

If your agency uses our vendor interface systems, once the survey is uploaded to obtain pricing, a button to download interstate estimates appears on the Summary screen (see FIG. 114).

This button performs the same option that is currently available in the mainframe PRIC system under Option 1 SEND RATING INFO.

Change a Finalized Quote

Figure 115:
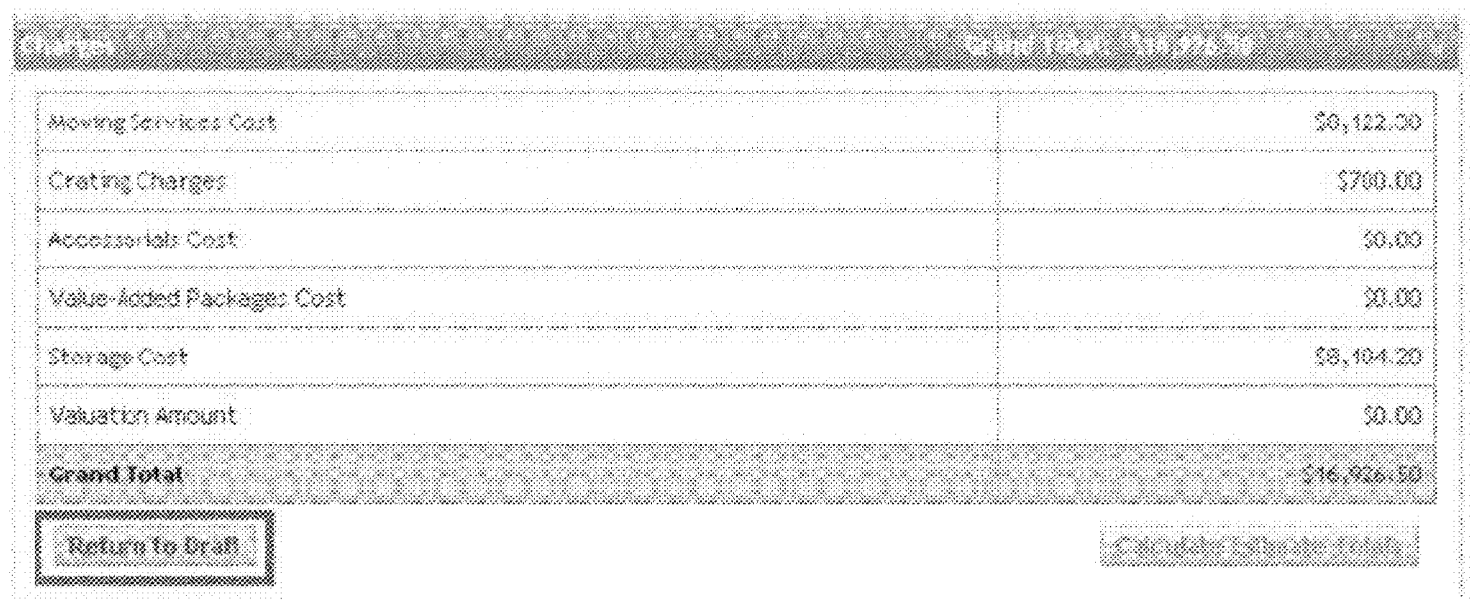

An estimate can be changed after it has been "Finalized", sent for eAcceptance, or Registered. To change the estimate, visit the summary page and click the Return to Draft button (see FIG. 115).

If there is an existing eAcceptance it will be cancelled, whether it has been accepted by the customer, or not.

After making the changes to the estimate, it should be re-finalized. New eAcceptance packets should be sent, or new documents should be printed and delivered to the customer.

If the order has been previously registered, it will need to be changed in the order registration system (RORD), as well. Quotes-To-Go will not automatically update the order. For interstate orders, when the order is updated in RORD, the estimate will be returned to a Registered Status.

Figure 116:
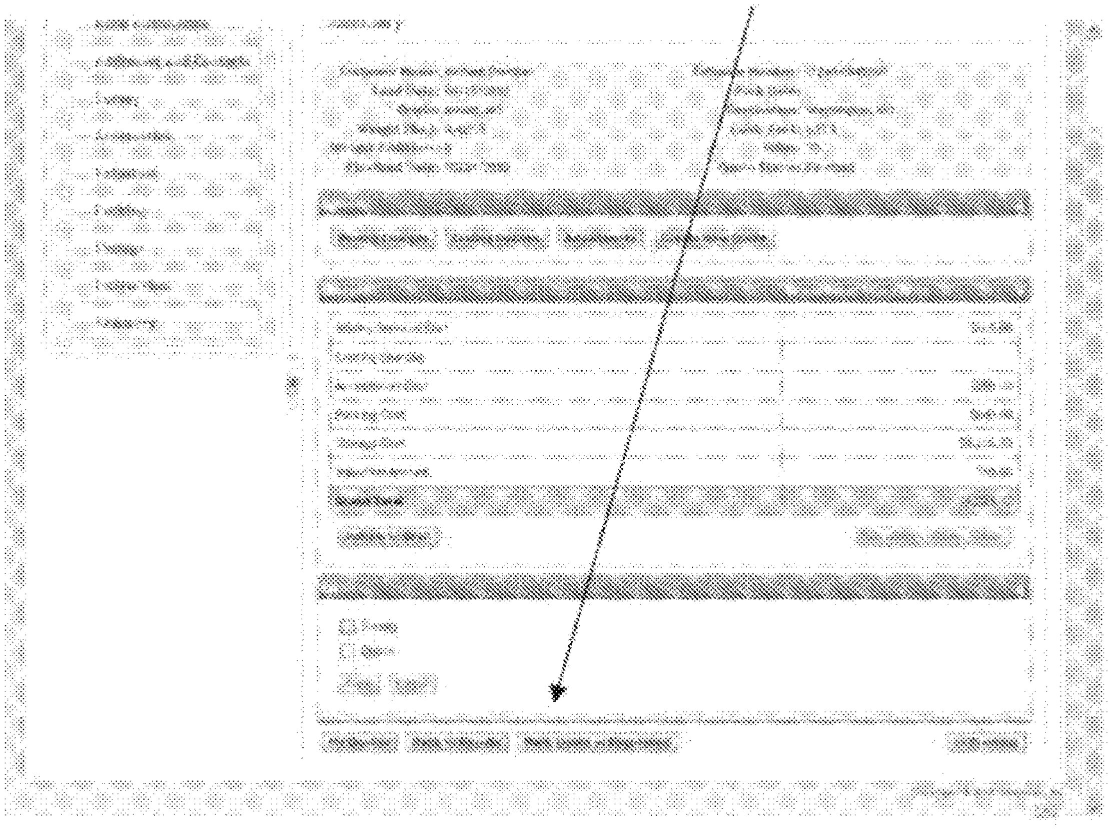

For Local/Intrastate Quotes, click the Mark as Registered button to return the quote to registered status after making changes (see FIG. 116).

eAcceptance

Sending the eAcceptance Documents

After a customer indicates they are ready to move forward with an interstate residential move and the quote is finalized, the combined Order For Service/Bill of Lading, One Page Estimate, and Survey (Cube sheet) can be delivered for eAcceptance.

Figure 117:
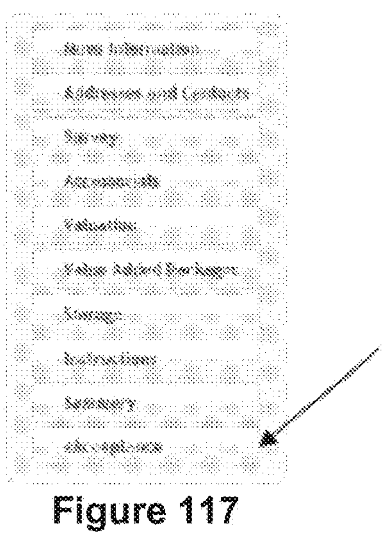

Select the eAcceptance button on the left-hand menu (see FIG. 117).

Figure 118:
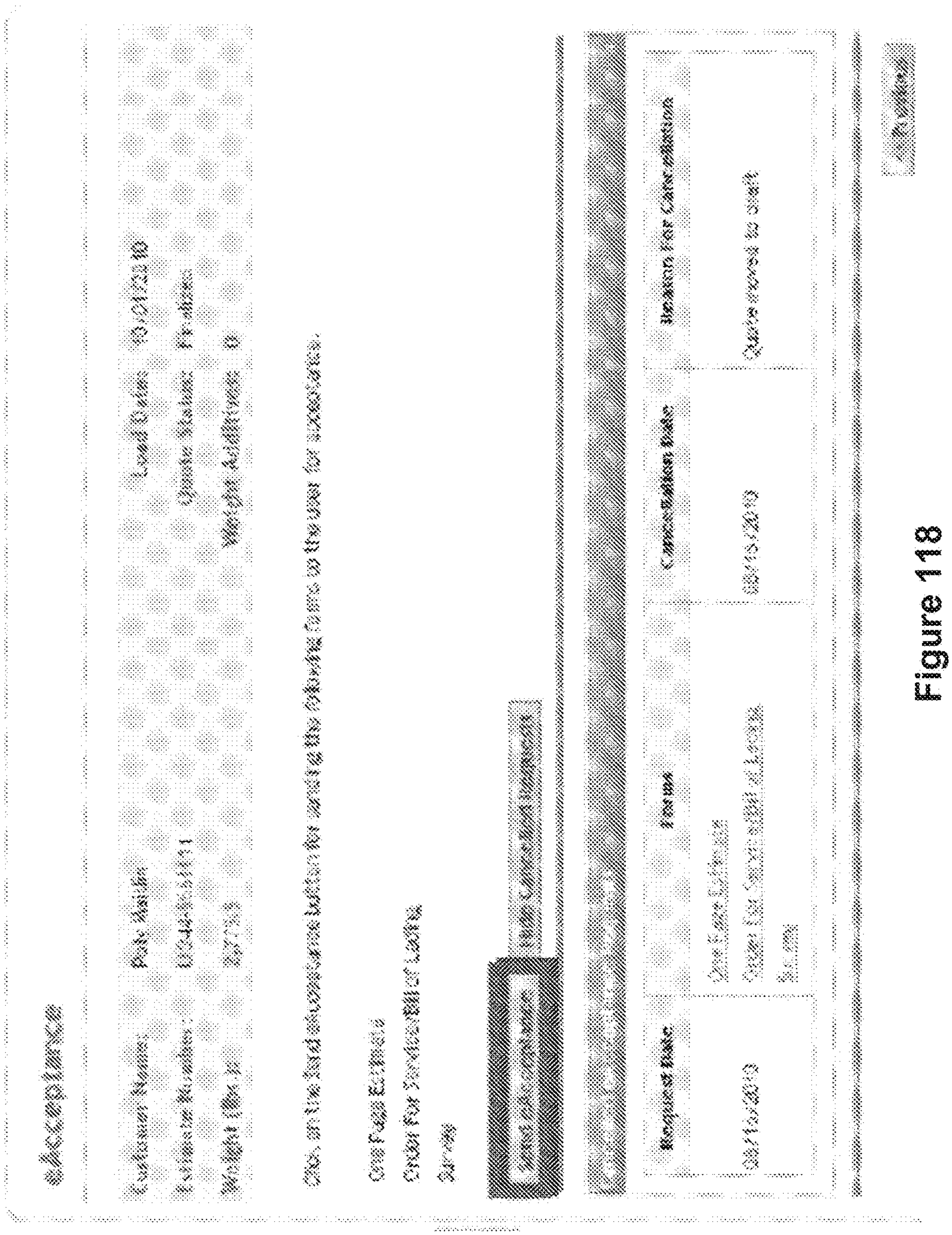

Click the Send eAcceptance button (see FIG. 118).

Figure 119:
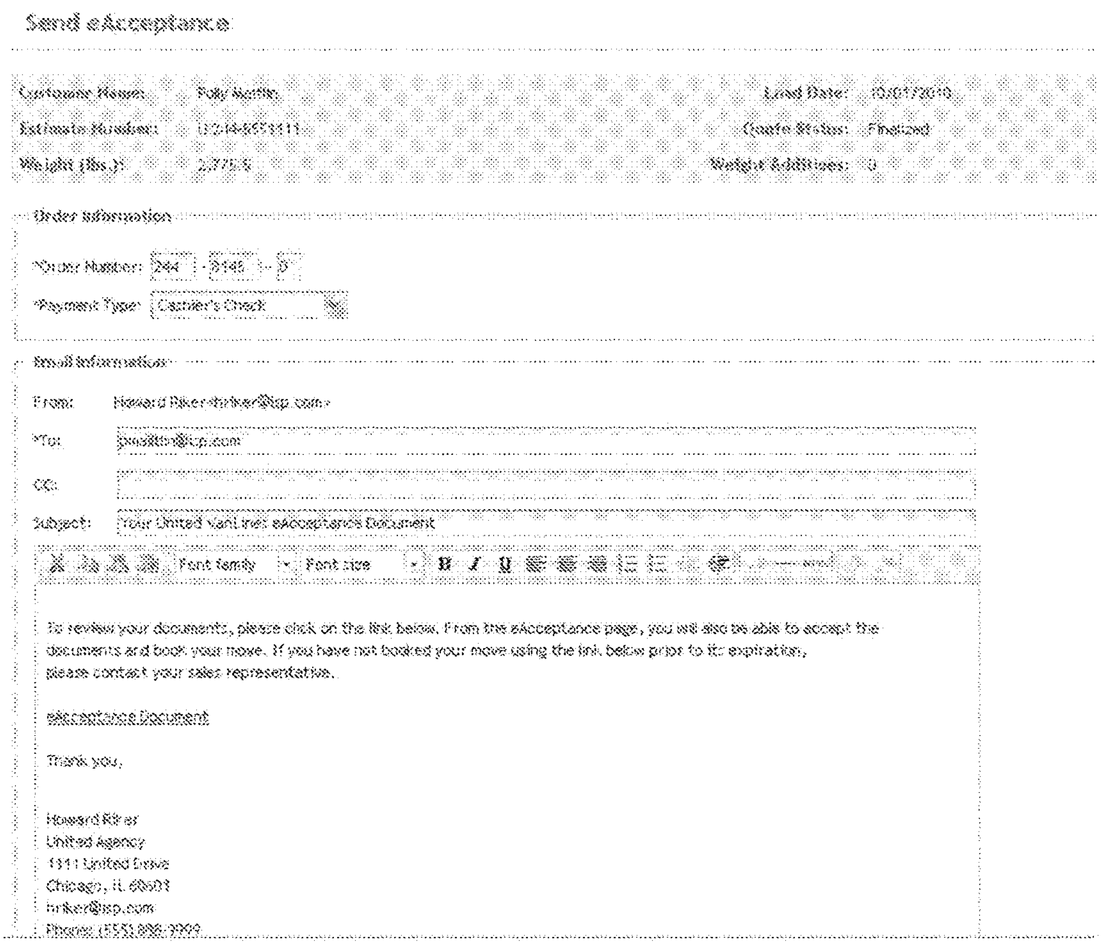

Enter an order number (see FIG. 119). This number is reserved for your use when you register the order in RORD and prints on the combined Order For Service/Bill of Lading Document. Select the appropriate payment type. The customer's e-mail address is pre-populated. Enter e-mail addresses for yourself and the move coordinator in the Carbon Copy (CC:) field. Use a comma to separate each e-mail address when entering multiple addresses in a field.

Figure 120:
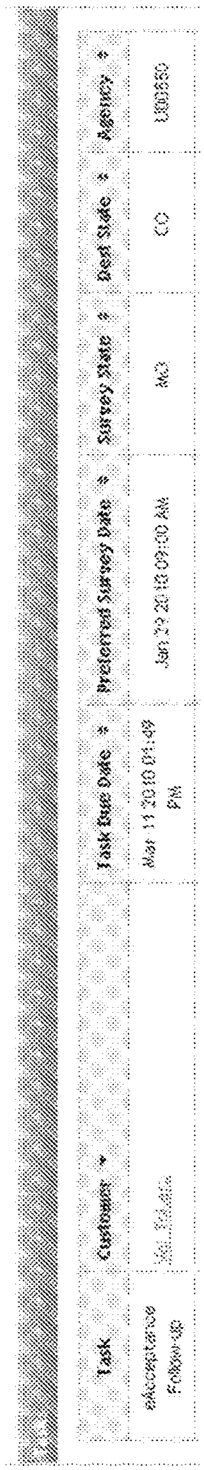
Figure 121:

After you click the Send button, a follow up task is automatically placed on your Tasks list (see FIG. 120) and your Quotes-To-Go My Schedule calendar (see FIG. 121).

Tracking eAcceptance Documents that have been Sent to the Customer

Figure 122:
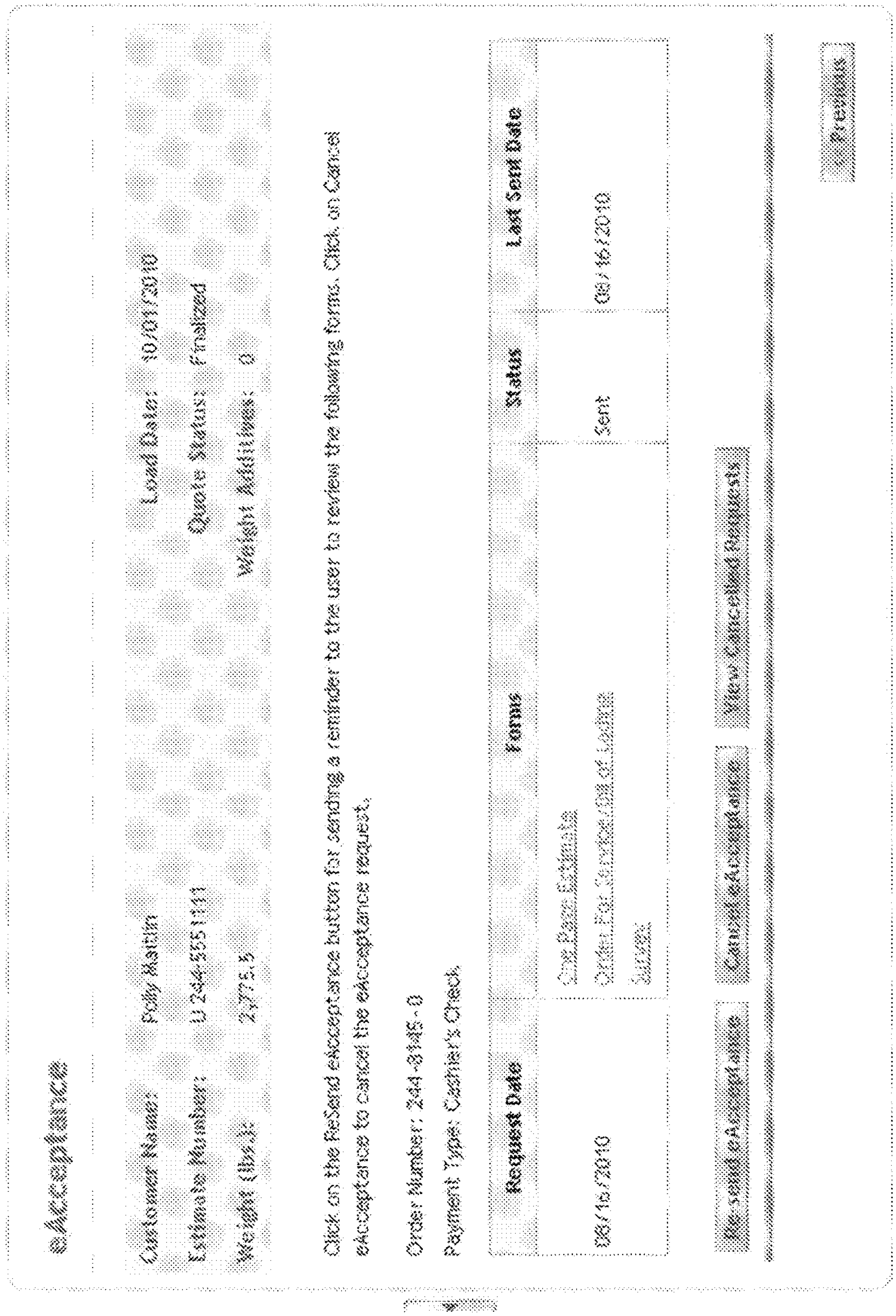

Once the e-Acceptance e-mail is sent, the status on the Forms page of this estimate changes to Sent (see FIG. 122).

If there are problems, you can re-send the e-Acceptance, or cancel it and use the traditional white paper process instead.

e-Acceptance—What the Customer Sees

The customer receives an e-mail with a link to e-Acceptance (see FIG. 123).

Figure 124:
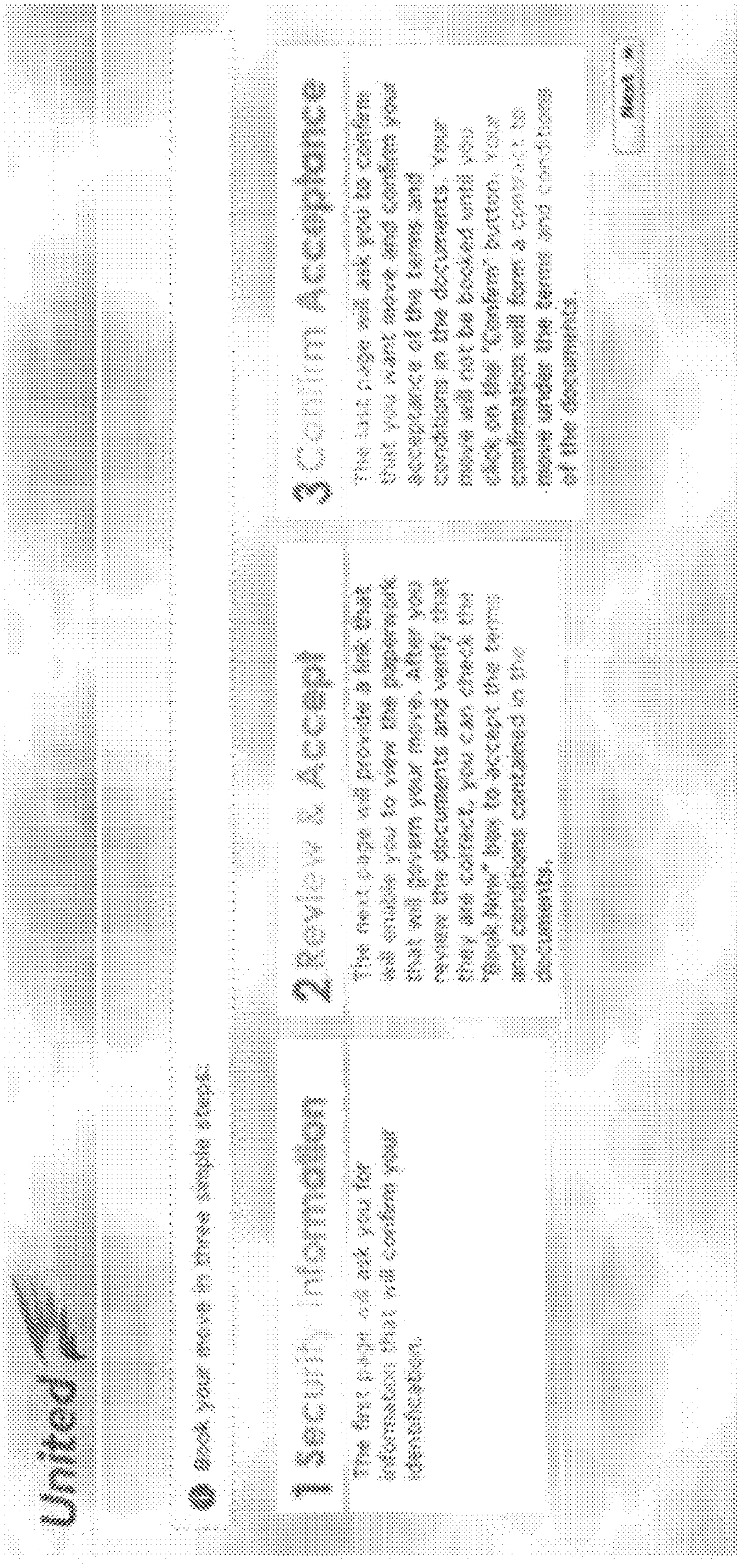

The initial screen explains the process (see FIG. 124).

Figure 125:
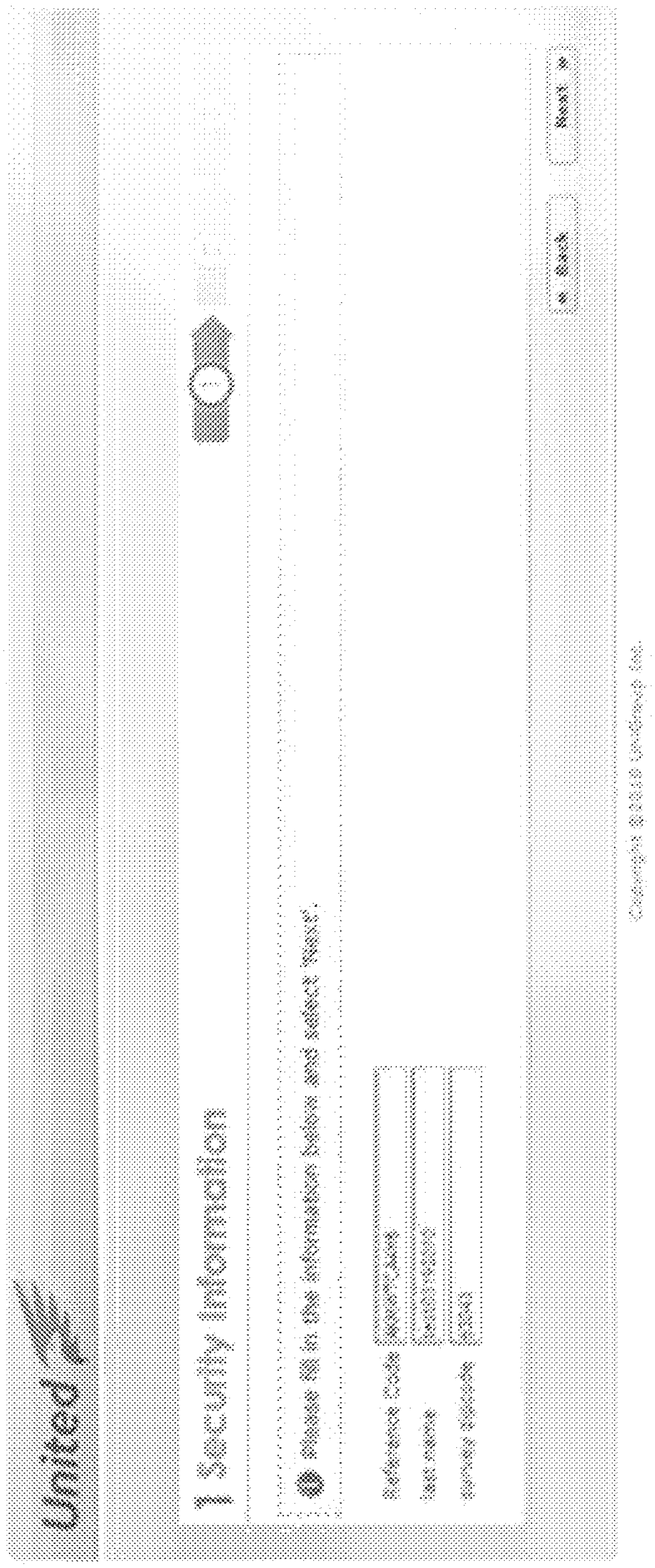

For security purposes, the customer enters their last name and their origin zip code (see FIG. 125). The Reference Code field is pre-populated.

Figure 126:
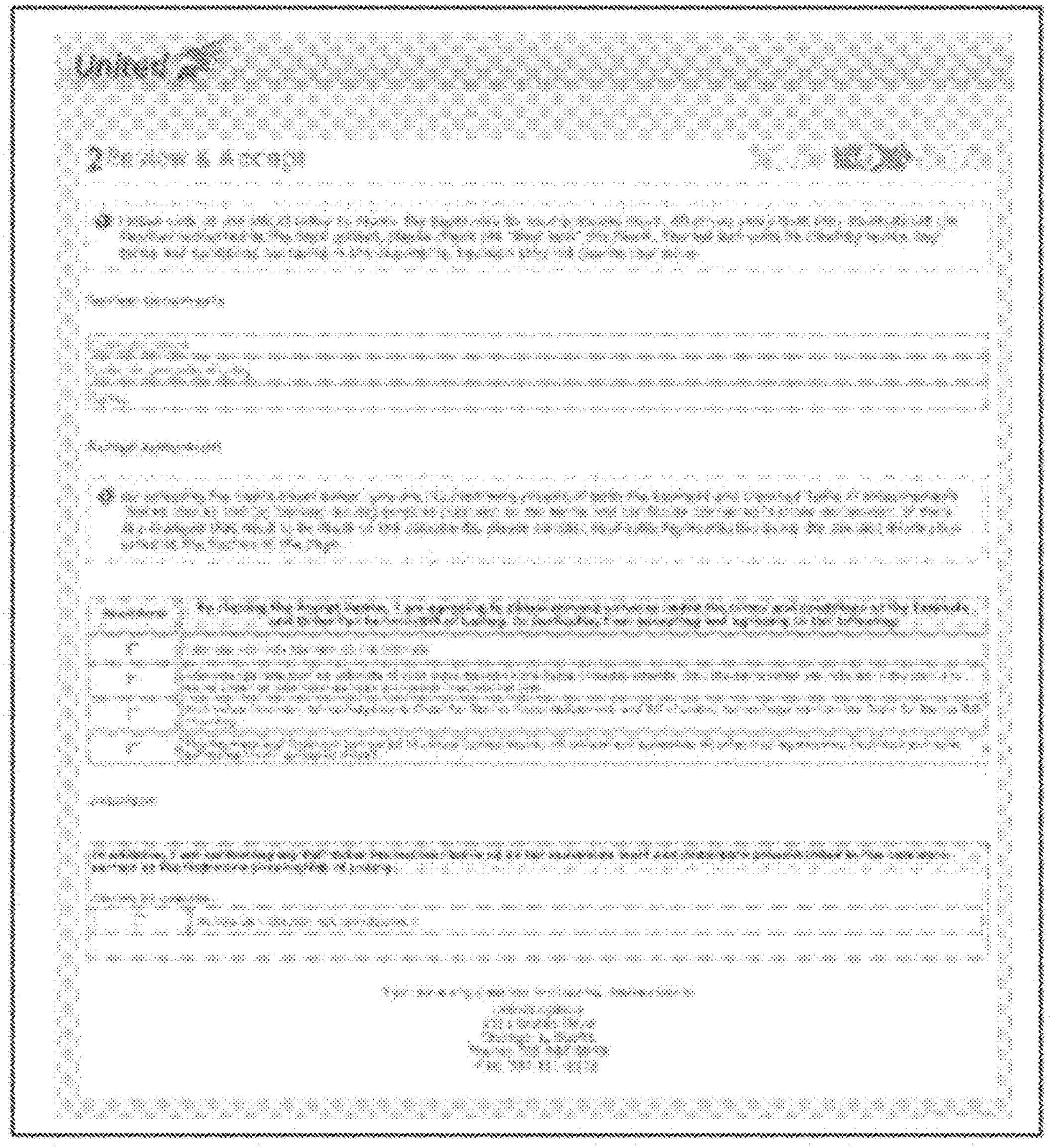
Figure 127:
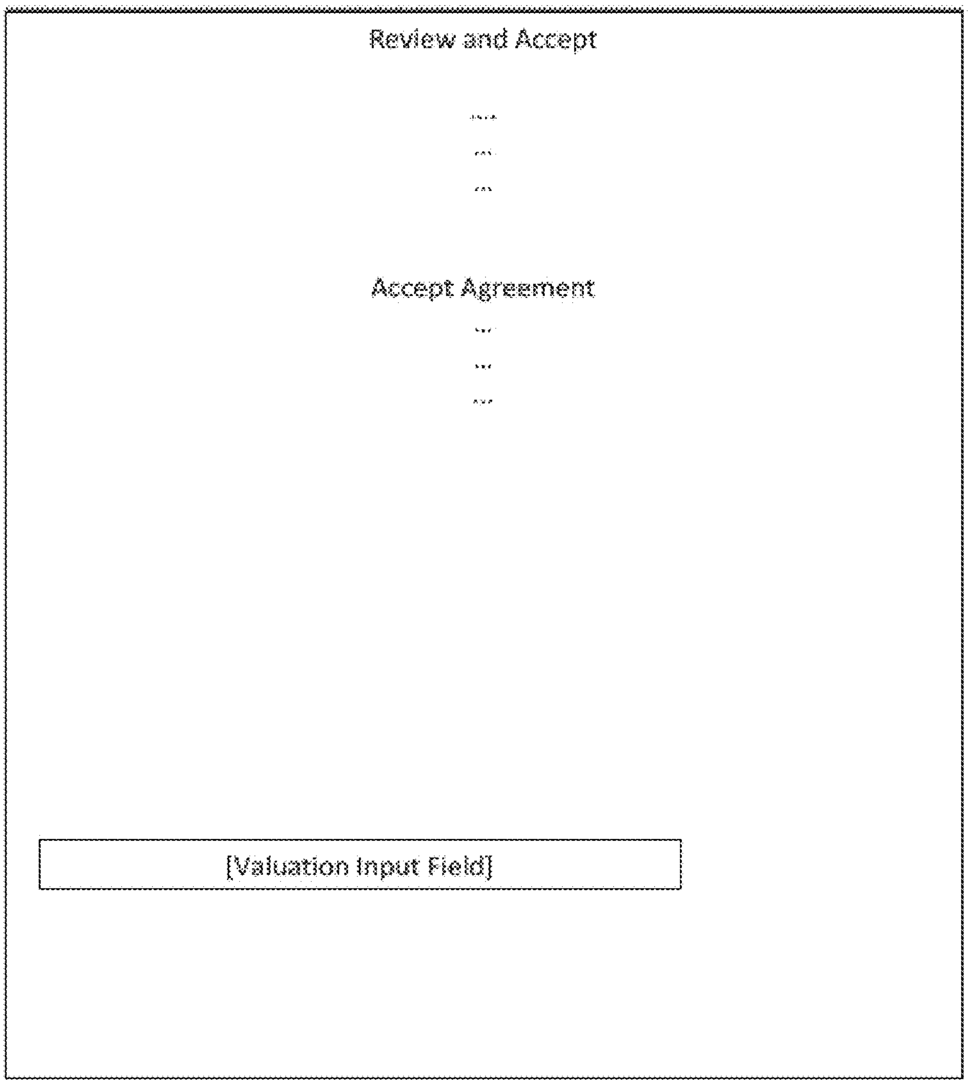

The Review and Accept screen contains links to the order documents for the customer to review (see FIG. 126). If they approve of the documents, they select the Book Now check boxes, then confirm their valuation selection. For Full Value Protection, the customer selects the check box. For $0.60 per pound valuation, the customer MUST TYPE '60 cents per pound' in the field (see FIG. 127).

Once all items are reviewed and selected, click Accept.

Figure 128:
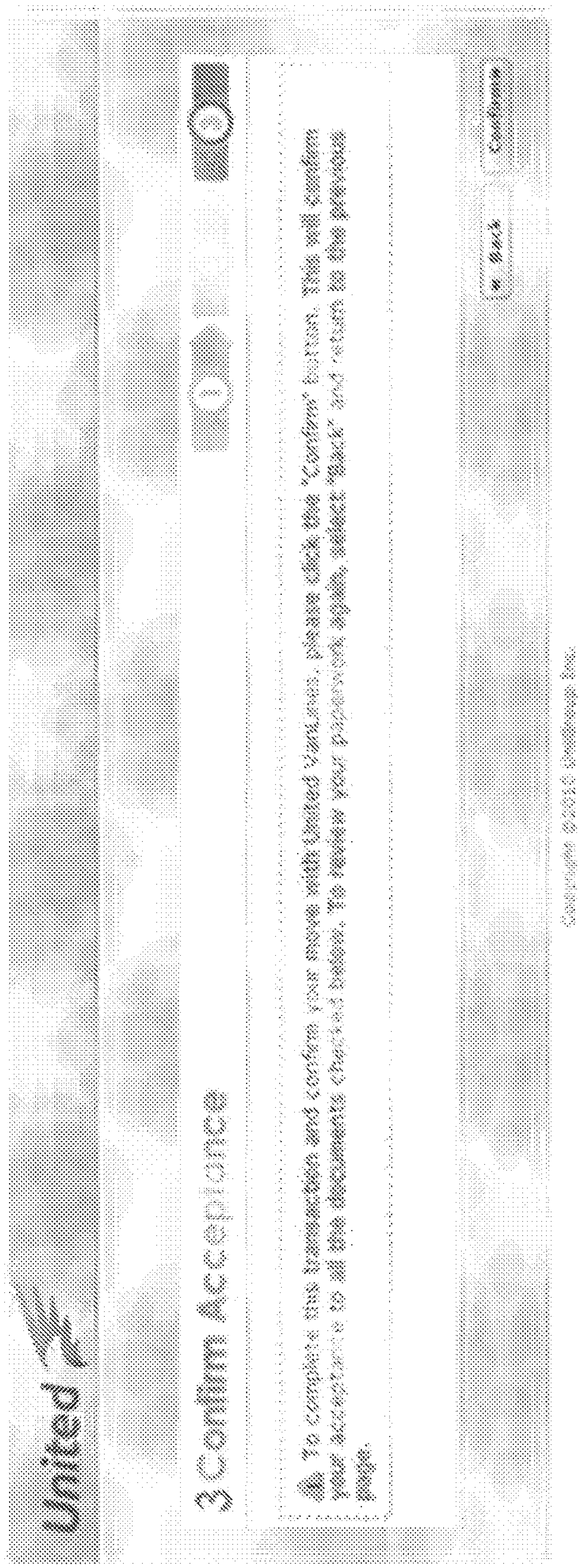

The customer now clicks the Confirm (see FIG. 128).

Figure 129:

A verification screen displays (see FIG. 129).

Figure 130:
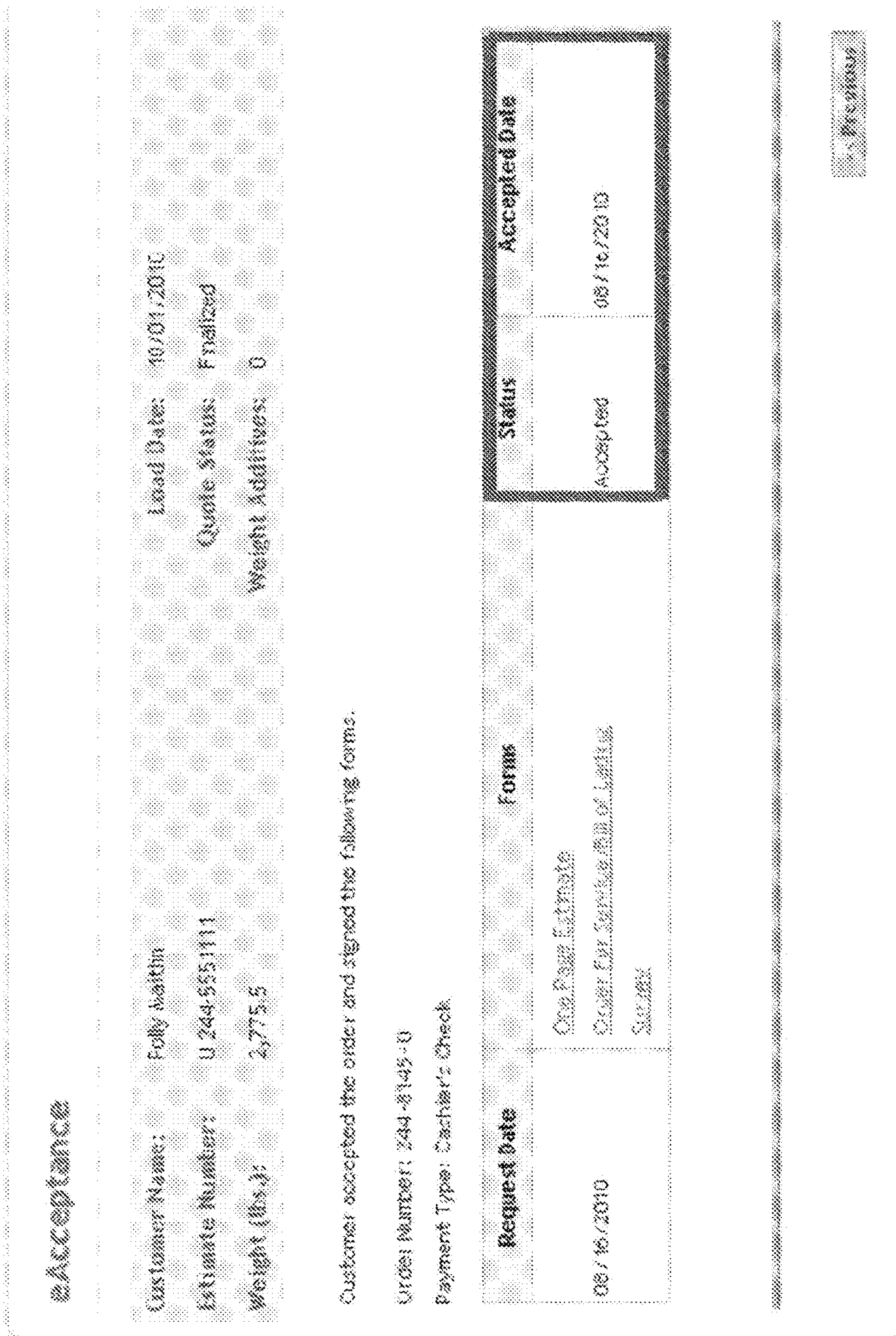

The status of the e-Acceptance on the Forms page changes to Accepted and lists the acceptance date (see FIG. 130). All e-mail addresses that were entered in the original e-Acceptance e-mail are notified that the quote has been accepted. The order is now ready to be registered in RORD following normal processes.

Figure 131:
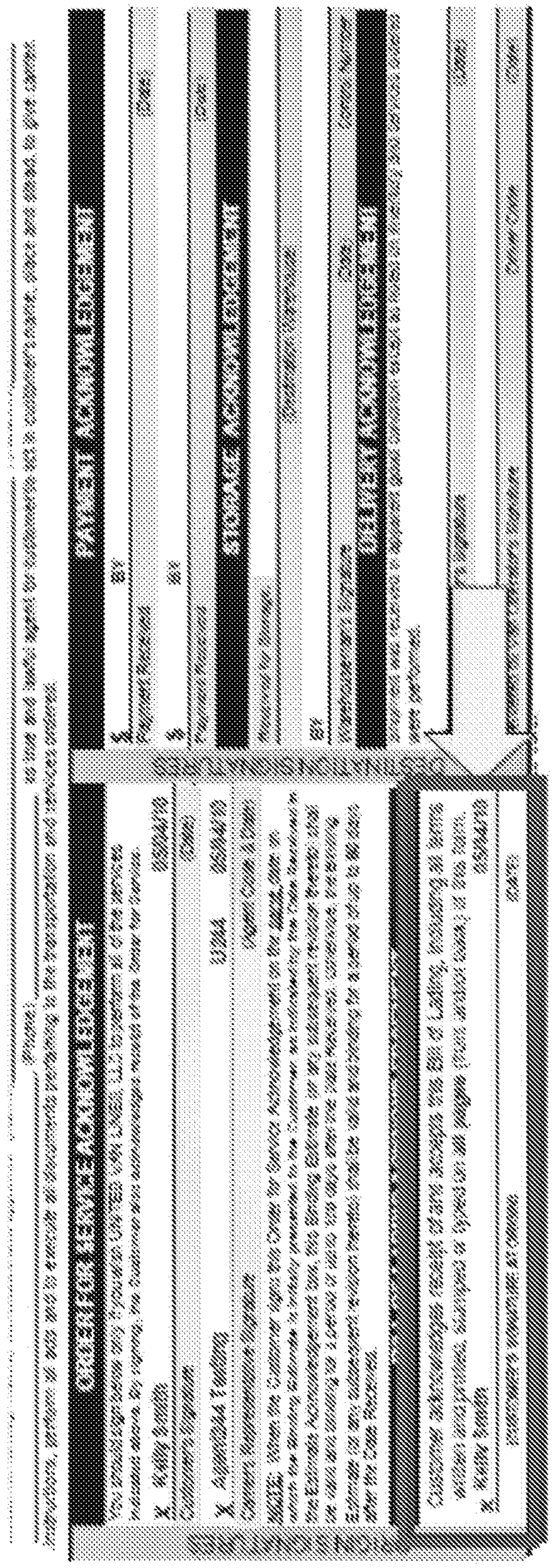

The combined Order for Service/Bill of Lading is signed and dated (see FIG. 131). The Van Operator does not need to collect these signatures when the order loads. The Van Operator still obtains the customer's signature at destination.

Registering an Interstate Order

All Quotes-To-Go orders are saved in PRIC. They may be copied into RORD using the estimate number for registration without re-entry.

Quotes-To-Go has not changed the RORD registration process. All accepted quotes must be registered following normal processes.

When the estimate is registered, the status in Quotes-To-Go automatically changes to Registered. If you need to make changes to the estimate after it has been registered, see the Change a Finalized Quote section to learn about the Return to Draft button.

Feedback—Vote and Track Enhancements

Figure 132:
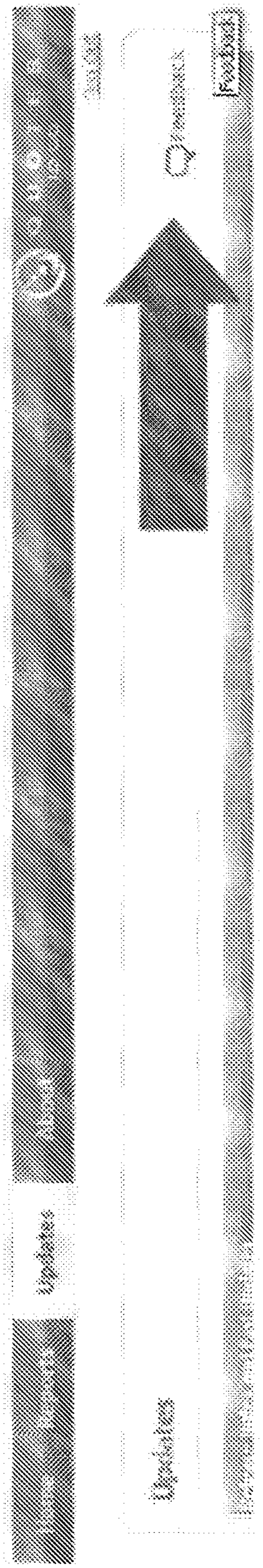

In order to more effectively collect, prioritize, and track the status of feedback, a feedback button is available on the Updates page of Quotes-To-Go (see FIG. 132). This button is available for any agent user and allows you to enter items you would like to see enhanced and/or changed about Quotes-To-Go. Each agency user receives 10 votes to enter their own enhancements and to vote for other agent's enhancements.

In addition, entering feedback in this method allows you to receive responses from the Quotes-To-Go team and update notifications as your enhancement is placed into the release schedule.

To use, click the feedback link on the Updates screen:

Please note: The feedback button should only be used for new enhancements.

System Reports

Available Reports:

Opportunities by Source Summary and Detail

Sales Forecast

Sales Lost Business

Sales Revenue Report

Sales Revenue Report

Appointment Report

All reports are available via Excel, and Comma Separated Values (CSV). PDF versions of the reports will be available in future releases.

Opportunities by Source Summary and Detail

The opportunity report shows a breakdown of leads and their status based on lead source (and any custom sources added through the SubSource functionality).

Figure 133:
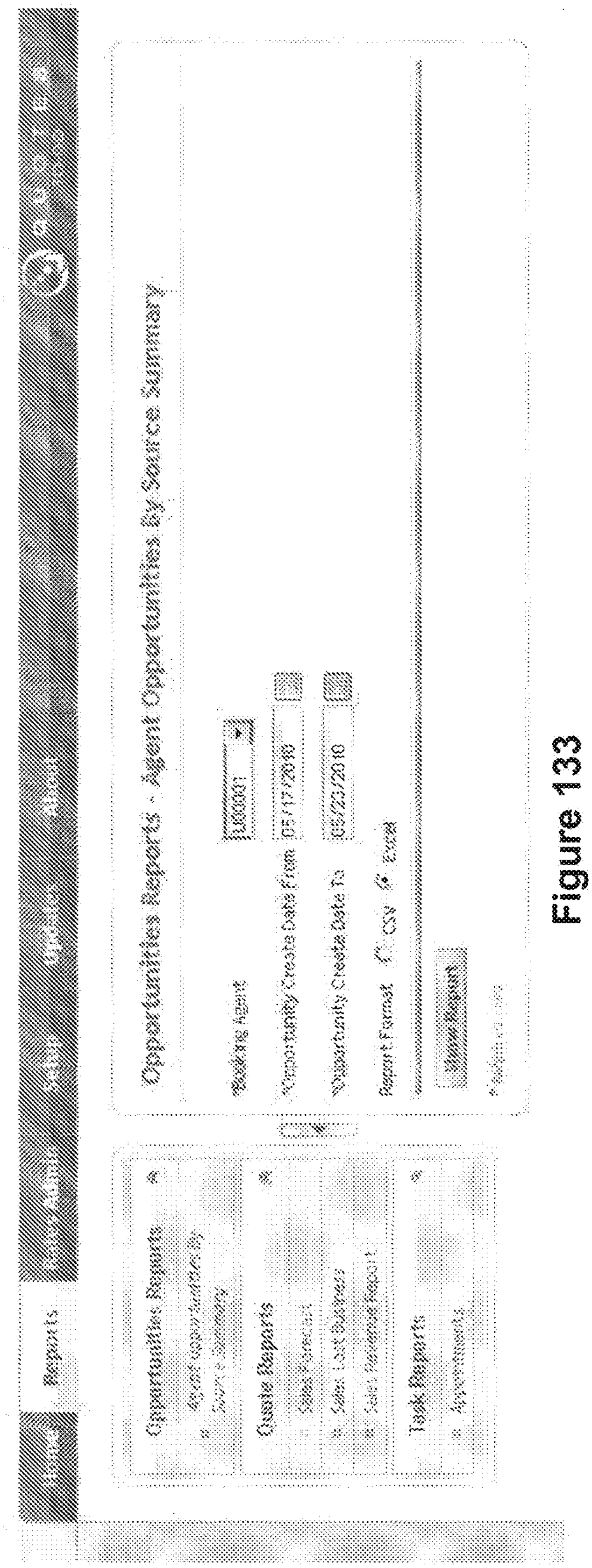

To run the report, select Reports from the top level navigation, and then Opportunity Reports (see FIG. 133).

Select a date range to run the report.

This returns the number of total opportunities by source separated by the type of quote (interstate, intrastate, and local). The report also shows the number of booked orders.

Click on a row of the report to access the Opportunity detail. This presents a list of the detailed opportunities, including the tracking code, the customer name, the average quote amount, and the current status.

Sales Forecast

The sales forecast report projects the revenue that could close in the future based on the current status of outstanding quotes. Create the report for a future date range based on the load date on the estimate.

The report results display by quote type and by estimator. The potential revenue displays, assuming all of the open quotes were to close (become registered orders). Those that have already closed (have been registered) are indicated in the "orders" column.

The results on this report are:

Estimator: The estimator who performed the survey

Estimate Type: Interstate, Local, Intrastate, or Auto

Pipeline Revenue: For a given type of estimate, the total estimated amount (if a customer was given more than one estimate, then those are averaged before being added to the total)

Booked Orders/Booked Revenue: The total of any estimates that have already been registered for the given load date range.

Sales Lost Business

The lost business report displays the breakdown of all opportunities that have been put into a non-opportunity status. The report shows a breakdown based on the reason the opportunity was lost, and the total lost revenue.

For those opportunities that were lost to a competitive situation, a breakdown of which competitor the opportunity was lost to is shown.

Sales Revenue Report

The sales revenue report projects the revenue that was registered for a given load date range vs. the total number of estimates given.

The report results display by quote type and by estimator. The potential revenue displays, assuming all of the open quotes were to close (become registered orders) compared to the actual amount of registered orders.

The results on this report are:

Estimator: The estimator who performed the survey

Estimate Type: Interstate, Local, Intrastate, or Auto

Potential Revenue: For a given type of estimate, the total estimated amount (if a customer was given more than one estimate, then those are averaged before being added to the total)

Booked Orders/Booked Revenue: The total of any estimates that were registered for the given load date range.

Close Ratio—The number of booked orders vs. the number of estimates provided to the customer (if there is more than one estimate, only one counts as it relates to the close ratio)

Appointment Report

The appointment report displays the number of sales appointments given to individual estimators based on the type of appointment (OA surveys vs. Residential opportunity). For a given date range, the report shows the breakdown of appointments by estimator.

APPENDIX D

Sales Person Guide

Outline

Overview
How to use this Manual
Logging In
Creating New Opportunities
Address Tab
Find Zip
Find City/State
Creating the First Quote
My Quotes Screen
Interstate Quotes
Quote Details
Move Information
Addresses and Contacts
Entering/Finding an Origin and Destination Agent
Additional Contacts
Extra Stops
Survey (Cube Sheet, Table of Measurement)
Rooms Summary Screen
Creating a Room
Available Articles/Adding Articles
Modifying Added Items
Customize Your Workspace
Add a New Room
Completing a survey
Survey Main Page
Starting an Interstate Survey Offline
Accessorials
Valuation
Value Add Packages
Storage
Instructions
Summary
Summary
Packing Options
Adjustments
Non Binding Option A
Binding Options W and NW
Crating Options
Copying Quotes
Comparing Quotes
Forms
Getting to the Forms Page
Forms Available
Printing Forms
e-Mailing Forms
Interstate Quote Download Button
Finalizing the Quote
Change a Finalized Quote
eAcceptance
Sending the eAcceptance Documents
Tracking eAcceptance documents that have been sent to the customer
eAcceptance—What the customer sees
Registering an Interstate Order
Ball Park Quotes
Local Quotes/Intrastate Quotes
Packing
Valuation
Contract Quotes
Contract and National Account Number
Contract Accessorials
Valuation
Value-Added Packages
Contract Summary
Contract Forms
Container Quotes
Accessing Existing Quotes
Search Quotes by Quote Number
OA Surveys
Process Steps to follow when the Booker and OA both use Quotes-To-Go
Booker—Assign Origin Agent within the Opportunity
Booker—e-Mail the Origin Agent
Origin Agent—View Perform Survey Tasks
Origin Agent—Create survey without a quote
Booker—Receive OA surveys and attach to quotes
Process Steps to follow when just the OA uses Quotes-To-Go
Feedback—Vote and Track Enhancements
Index Overview How to Use this Manual This manual covers Quotes-To-Go tasks performed by the Estimator.

Logging in

Figure 134:
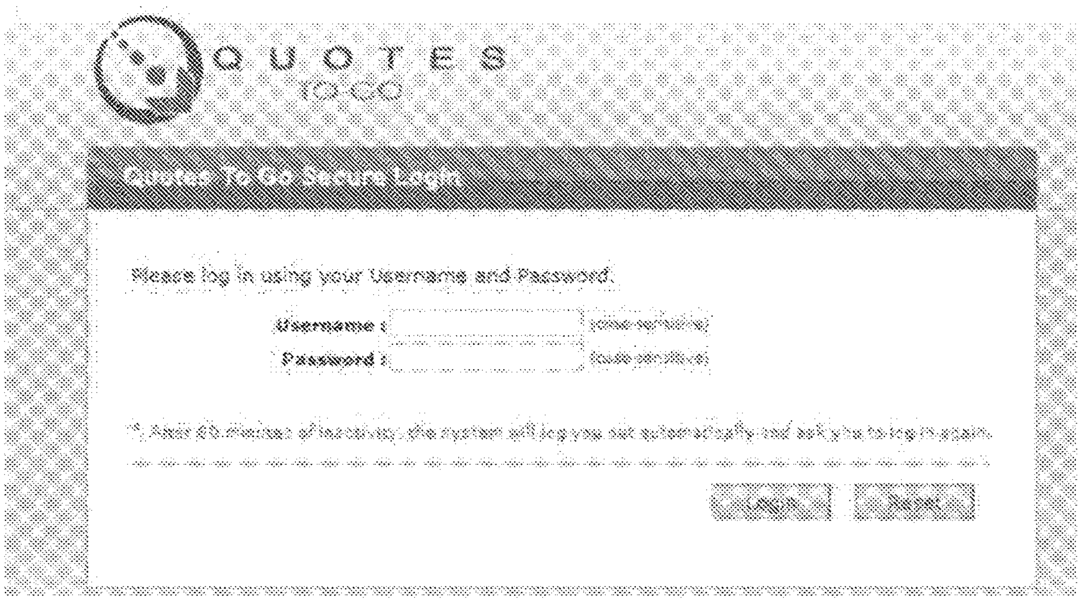
FIGS. 134-281 show exemplary screenshots for a system as described in Appendix D.

If you are connected to the Internet, Quotes-To-Go can be accessed by visiting https://quotes.unigroupinc.com (see FIG. 134).

Use the same individual user id and password assigned to you by your agency security administrator to access "The U" to access Quotes-To-Go.

Figure 135:
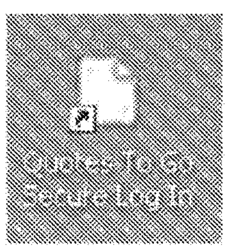

Access Quotes-To-Go from the desktop shortcut you created when following the instructions in the Setup Guide (see FIG. 135).

Creating New Opportunities

The Opportunity is a single page form designed to collect basic information about a potential customer, and serves as a communication tool for the salesperson.

Opportunities can be created from various sources:

The Home Office Customer Care Center creates opportunities and assigns them to an agency (covered in previous section)

Agency Call Centers can create leads and assign them to an individual sales person Booking agencies can create leads and assign them to an Origin agency for National Account moves.

Figure 136:
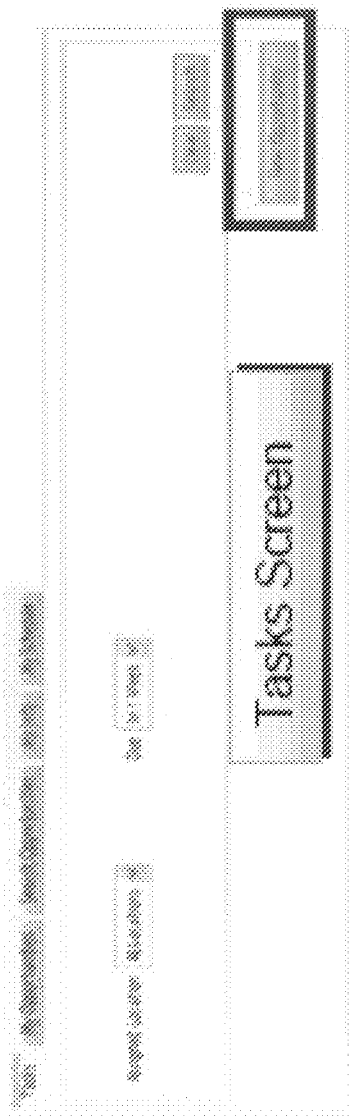
Figure 137:
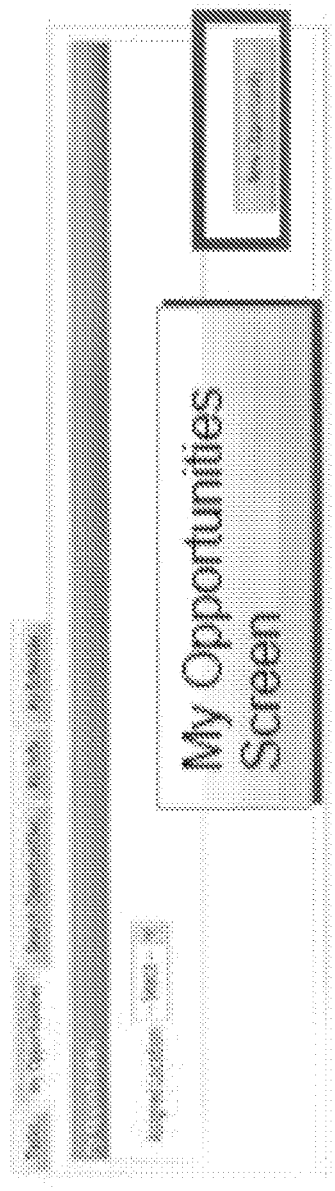
Figure 138:
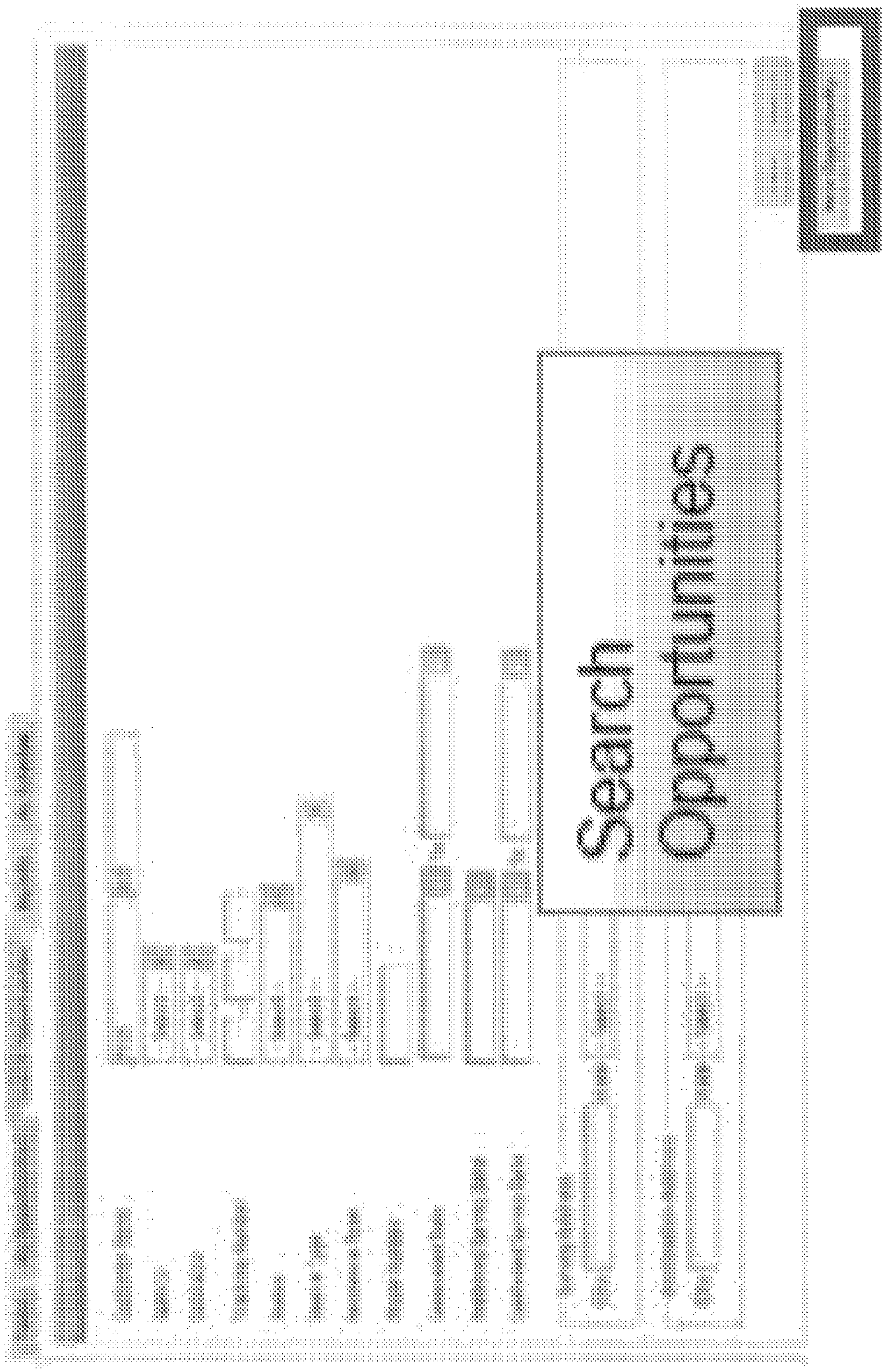

Agency Lead Coordinators and Sales personnel can create opportunities by selecting the New Opportunity button located on the Tasks, My Opportunities and Search Opportunities tabs (see FIGS. 136, 137, and 138, respectively).

Follow the same process to set the appointment and assign the estimator, as described in the section on receiving leads from the Home Office. This process is the same no matter where the opportunity is initially created. Remember, all your leads should be entered in Quotes-To-Go. This includes Local, Intrastate, Military, and OA leads.

Minimum required information for creating an opportunity:

Agency Number
Source Type
Customer Type
Customer Name

Address Tab

When entering address information in the opportunity, there are two helpful address options:

Find Zip

Figure 139:
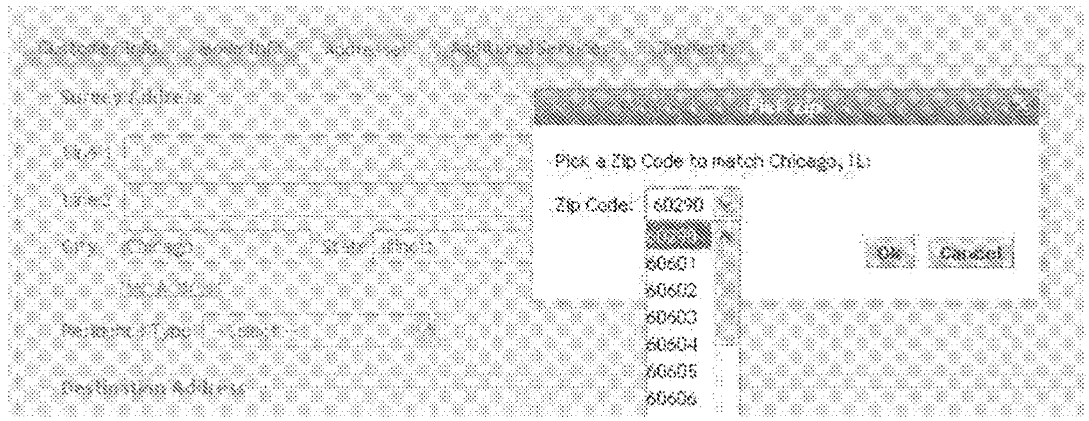

If you type in the City and State, you can leave the Zip field blank and click the Find Zip button to look up and pick an appropriate zip code (see FIG. 139).

Find City/State

Figure 140:
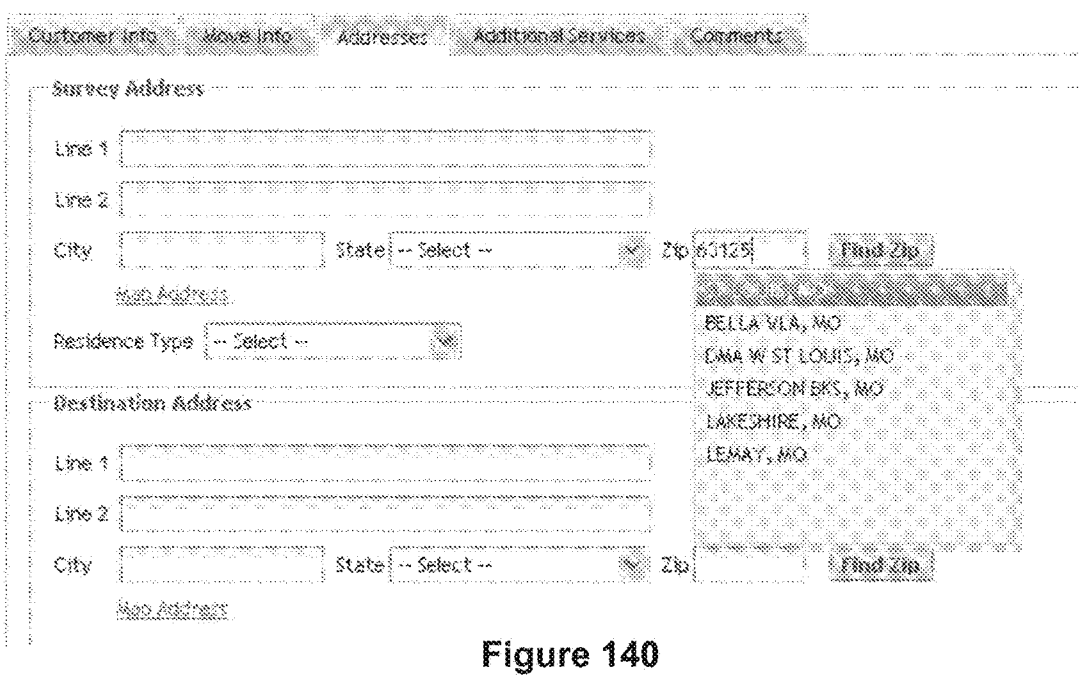

If you know the zip code, leave the City and State fields blank and type in the Zip. A pop-up displays and you can select the appropriate city and state to populate the fields (see FIG. 140).

Creating the First Quote

Figure 141:
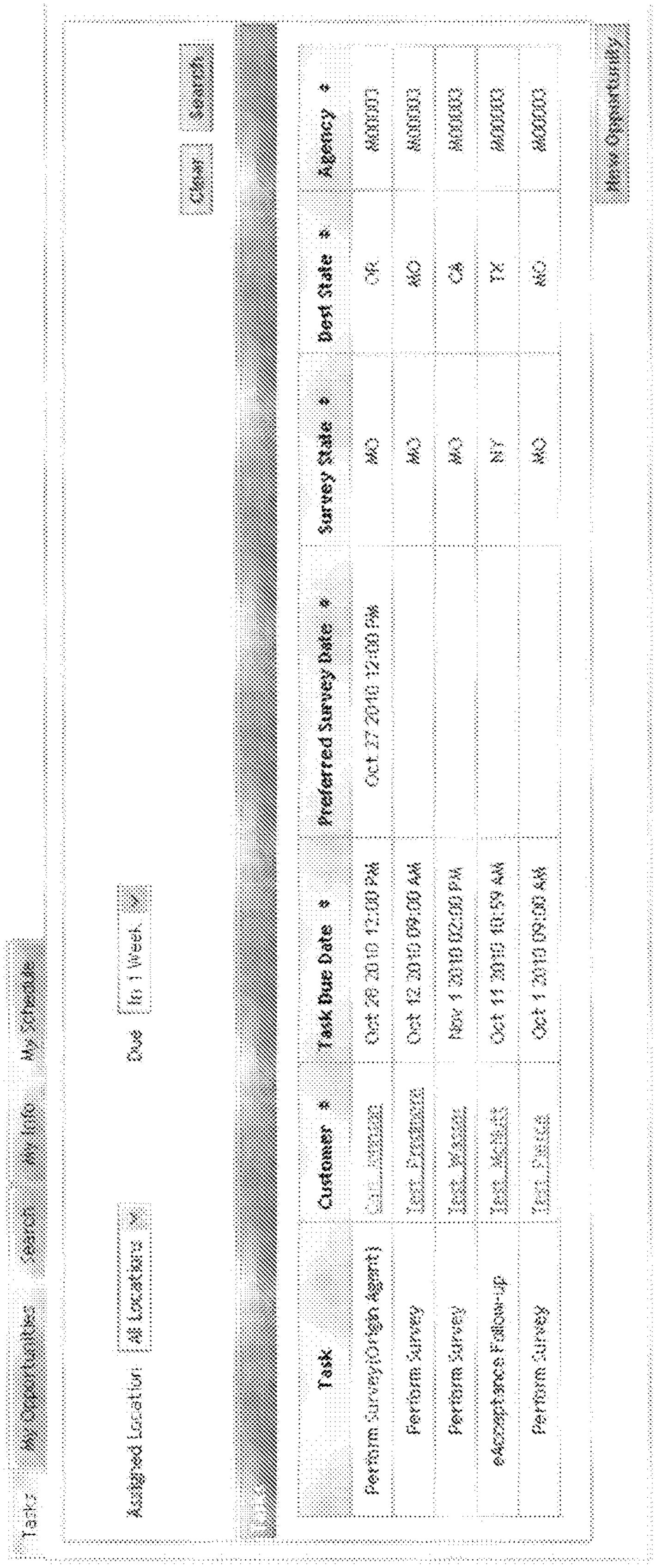

From the Tasks list or the My Schedule calendar, click the Customer's name to access the opportunity (see FIG. 141).

Figure 142:
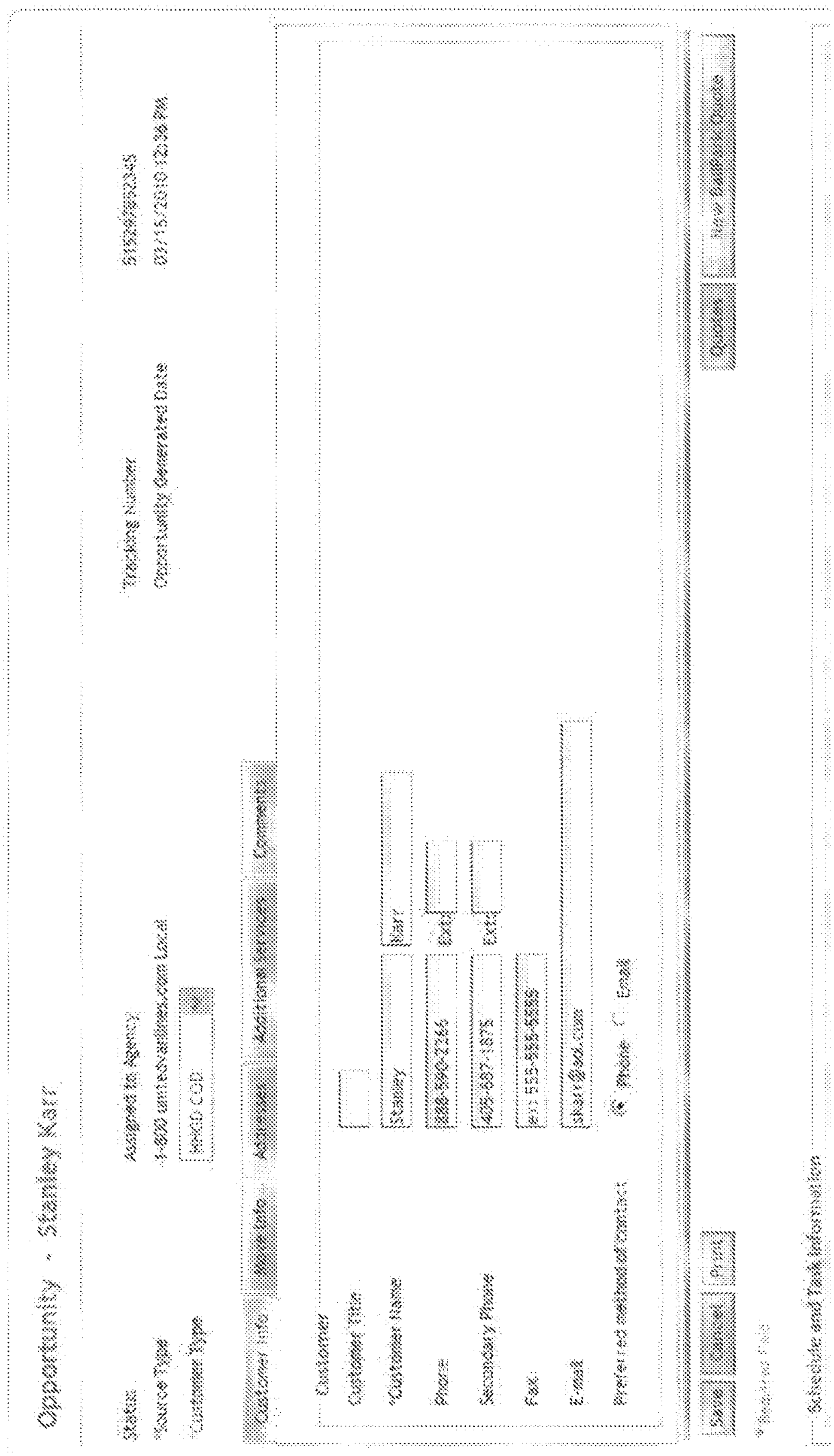

To create the first estimate from an Opportunity, click the Quotes button on the bottom right-hand corner of the screen (see FIG. 142).

Figure 143:
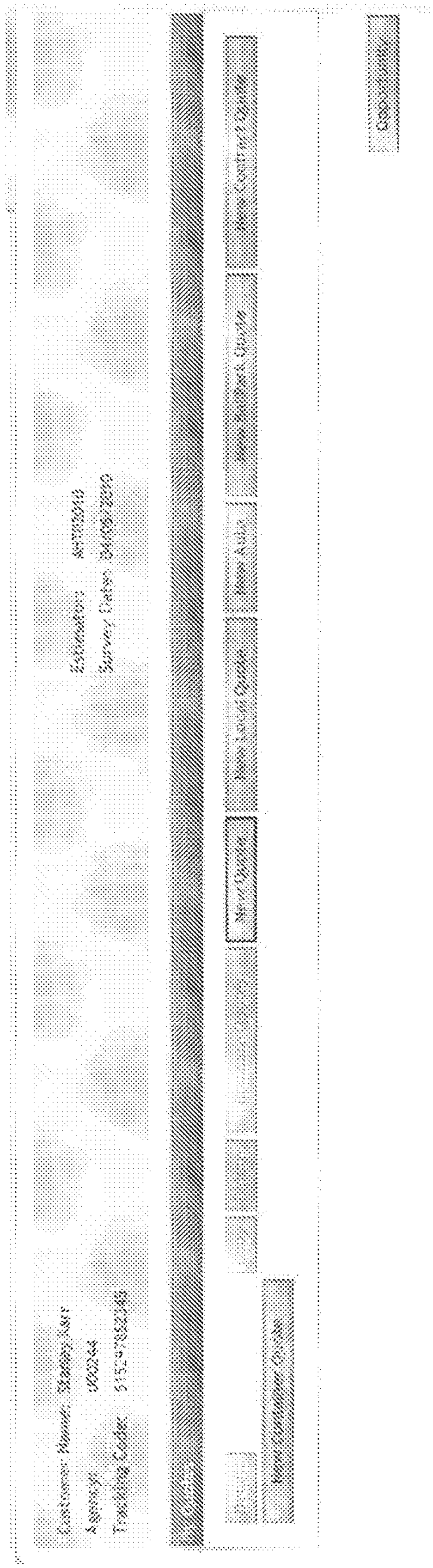

My Quotes Screen (See FIG. 143)

The My Quotes screen displays all of the quotes currently associated with the Opportunity. When you access the screen by clicking the Quote button from the Opportunity details screen before a quote is created, no quotes are listed. Simply select the appropriate new quote button to begin the quote process.

The Opportunity button located on the bottom right-hand corner of the screen returns to the Opportunity details.

Interstate Quotes

Quote Details

Move Information

Figure 144:
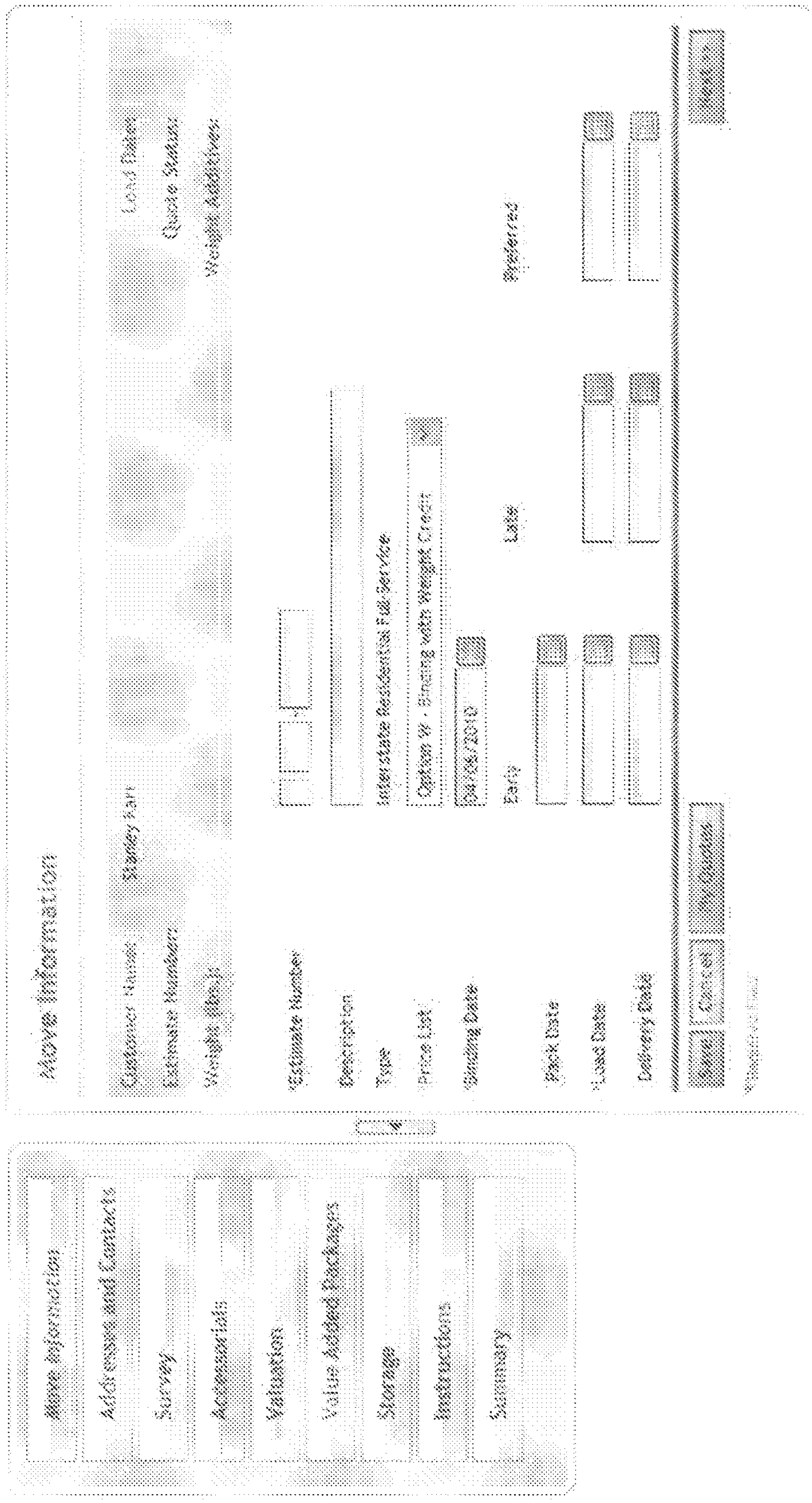

Completing the Move Information screen is the first step in creating a new quote (see FIG. 144). It should be completed before the in-home survey occurs.

The Estimate Number field becomes the unchangeable estimate number of the system.

The Description is meant as a way to distinguish the quote from other quotes on the Quote Summary screen. It is most effectively used to compare multiple quotes and find them quickly (e.g., a full-pack vs. a partial pack vs. a do-it-yourself container quote).

The Price List allows you to select:

Option W—Binding with Weight Credit

Option NW—Binding without Weight Credit

Option A—Named Shipper (Non-Binding Estimate)

Local Rates

Intrastate Rates

Do-It-Yourself Container (United Mayflower Container Services markets, only.)

Do-It-Yourself Plus Container (future release)

Option W and NW require a binding date, which must be the survey date.

Load date is required. This will be used for capacity planning purposes.

Date spreads are entered as Early, Preferred, and Late (not required).

Navigate by clicking the Next>> button, or click Save and make a selection from the left-hand menu.

Addresses and Contacts

Figure 145:
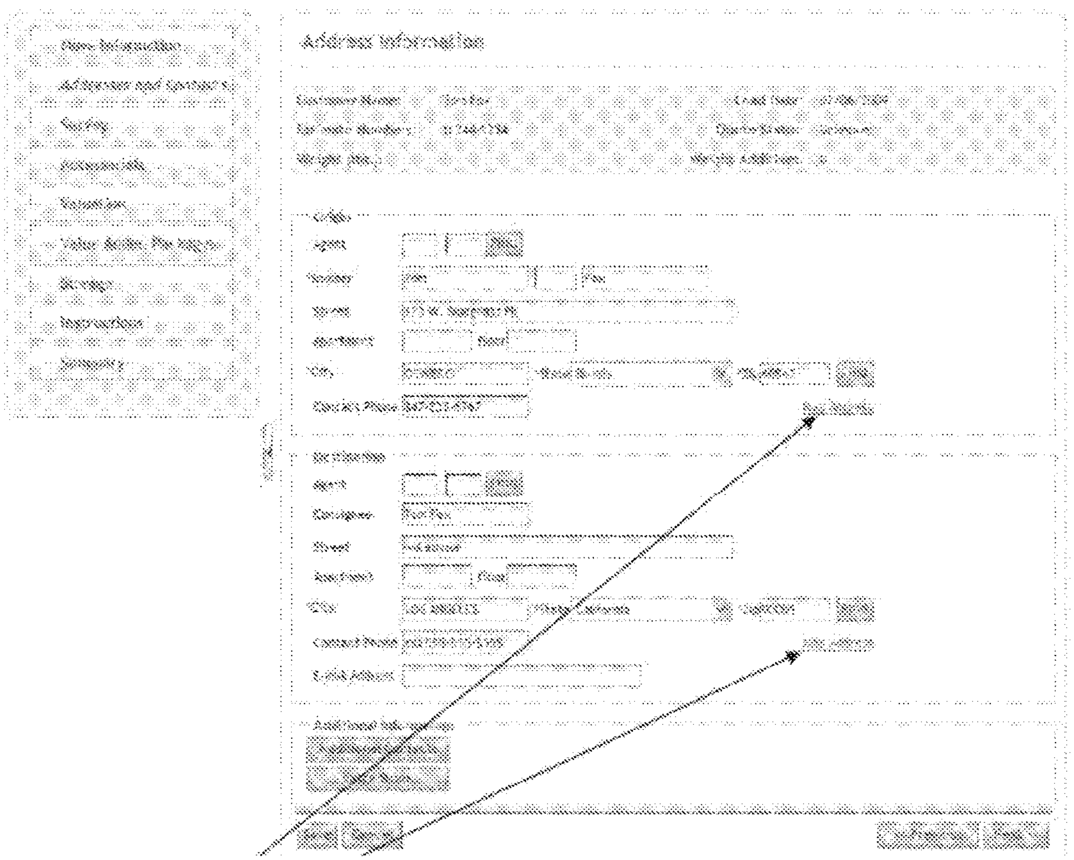

The Addresses and Contacts screen sets the base information for the move (see FIG. 145). The contact information is carried over from the Opportunity. Canadian origin and/or destination address can be used in Quotes-To-Go.

Figure 146:
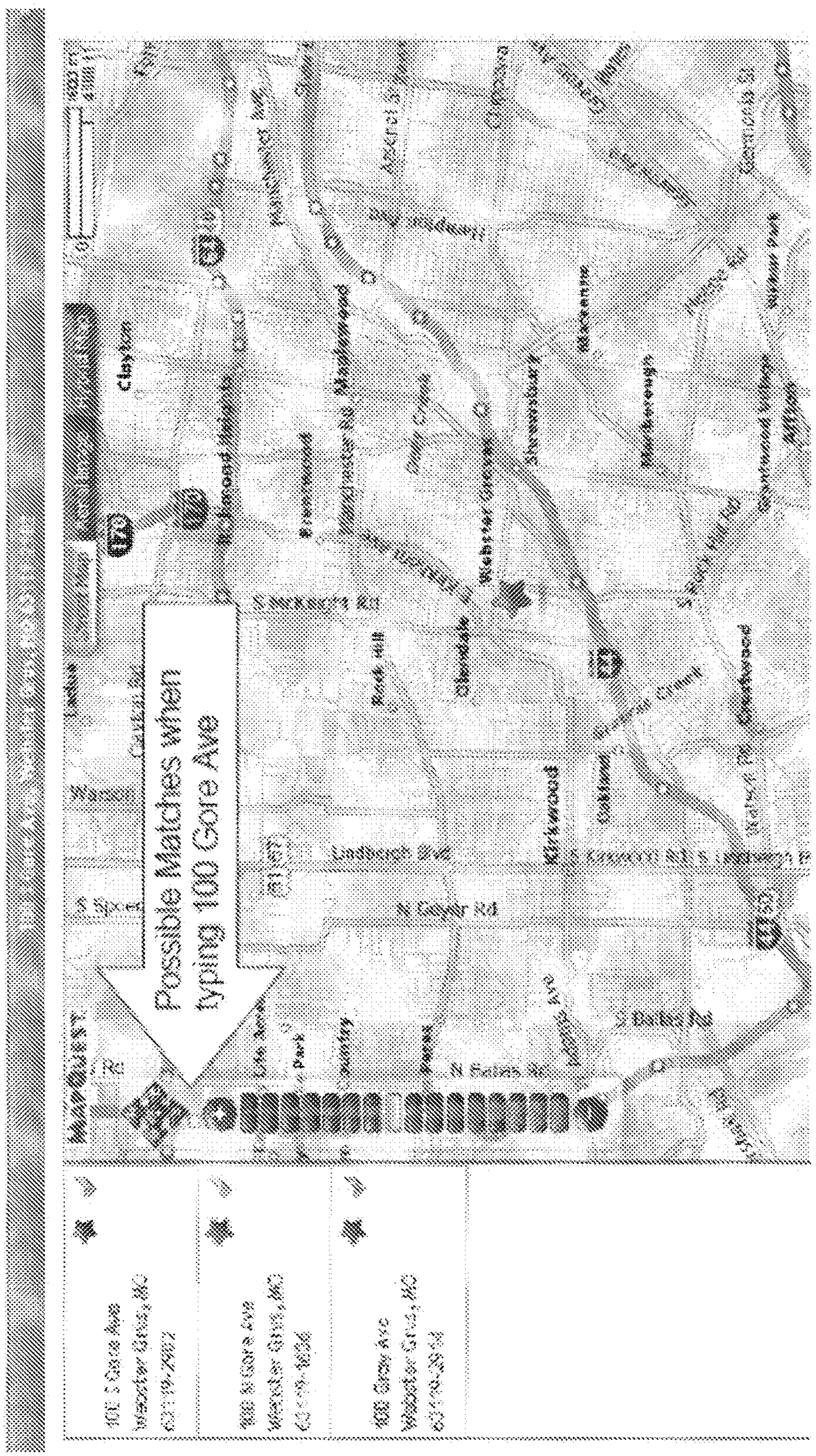

The Map Address link launches a window with a map of the location, provided by MapQuest (see FIG. 146).

If multiple locations are found, a list of possible matches will be shown on the left. Select the checkmark icon to choose the desired address.

Figure 147:
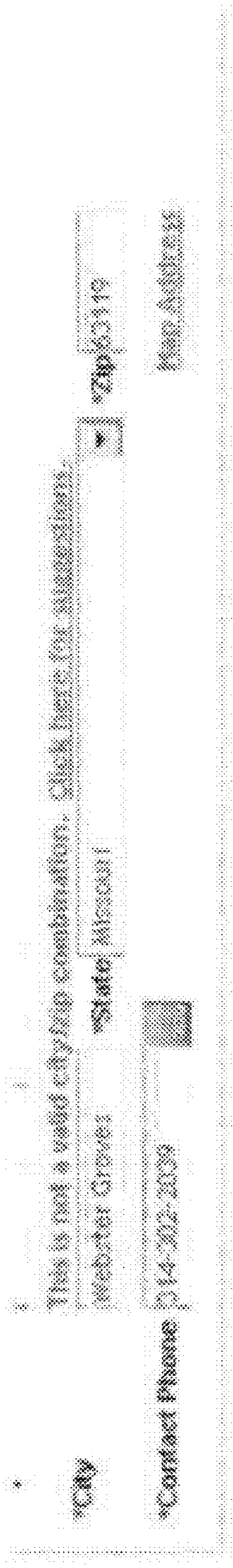
Figure 148:
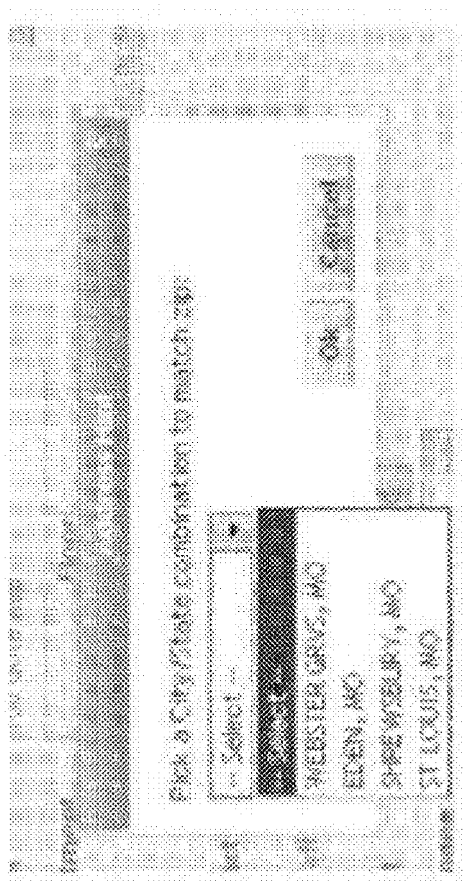

When you click the Save button, an additional validation occurs. The City/State and ZIP Code are validated against MileMaker. If this validation fails, you may receive an error with suggestions (see FIGS. 147 and 148).

Entering/Finding an Origin and Destination Agent

Figure 149:
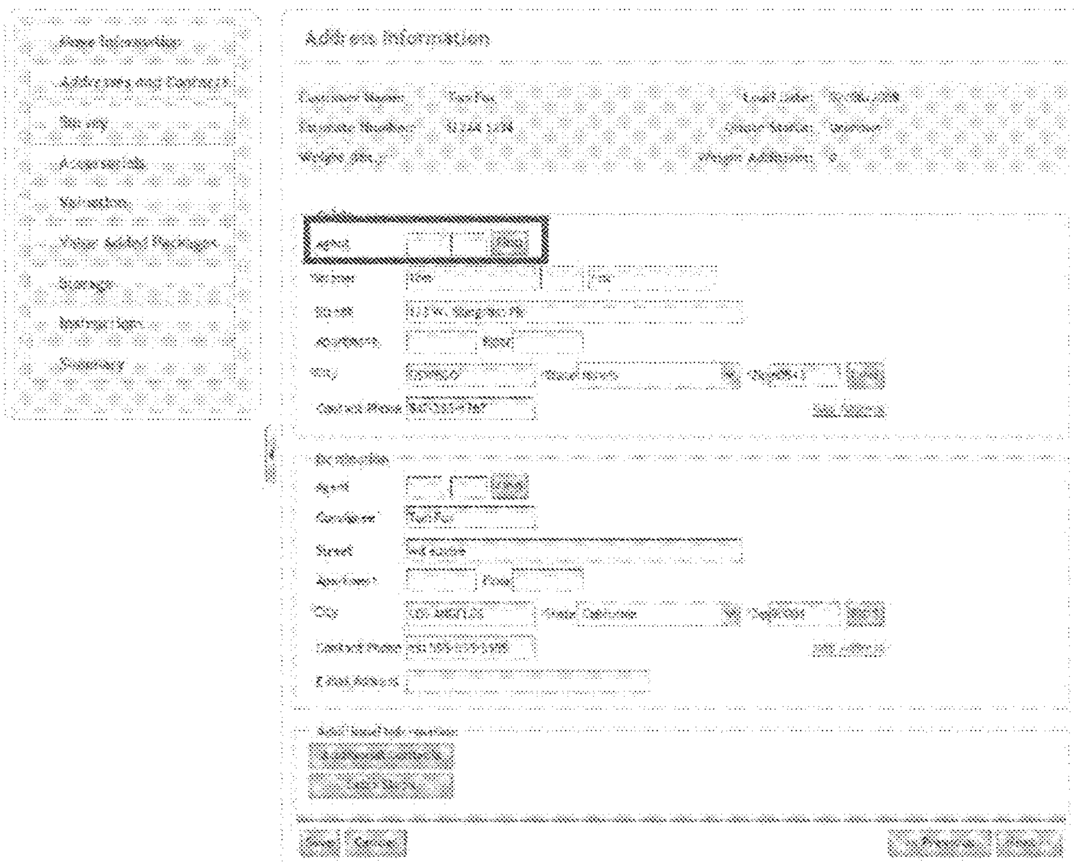

Use the Find button next to the Agent field to lookup the agent number for an origin and destination agent (see FIG. 149). Agents can be searched by name, or by proximity to a city, state, and ZIP code.

Figure 150:
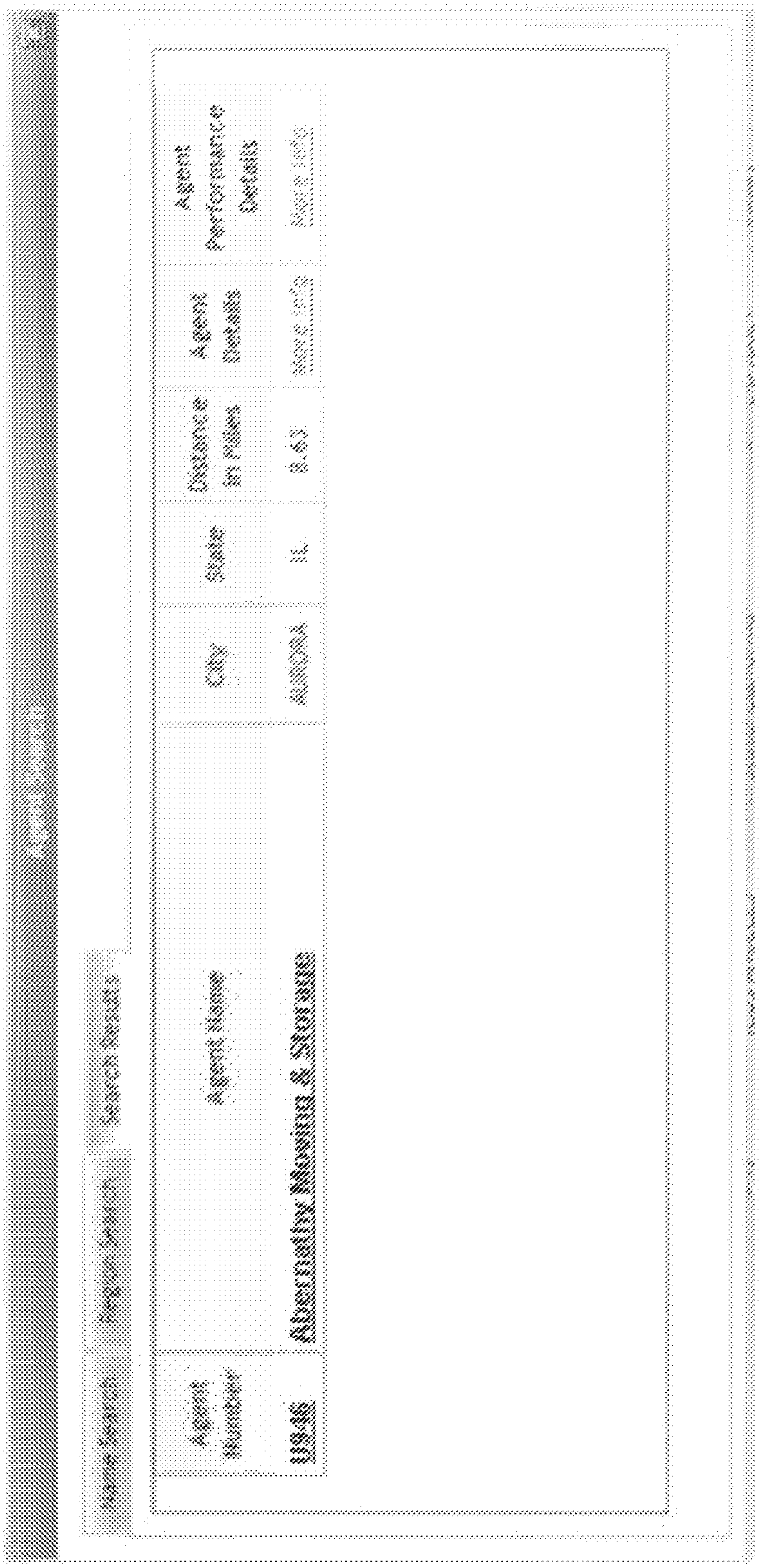
Figure 151:

To select the agency, click its agent number (see FIG. 150). To view additional information, such as agency contact information, hours, and service radius, click the More Info link under Agent Details. To view performance ratings (see FIG. 151), click the More Info link under Agent Performance Details.

Additional Contacts

Figure 152:
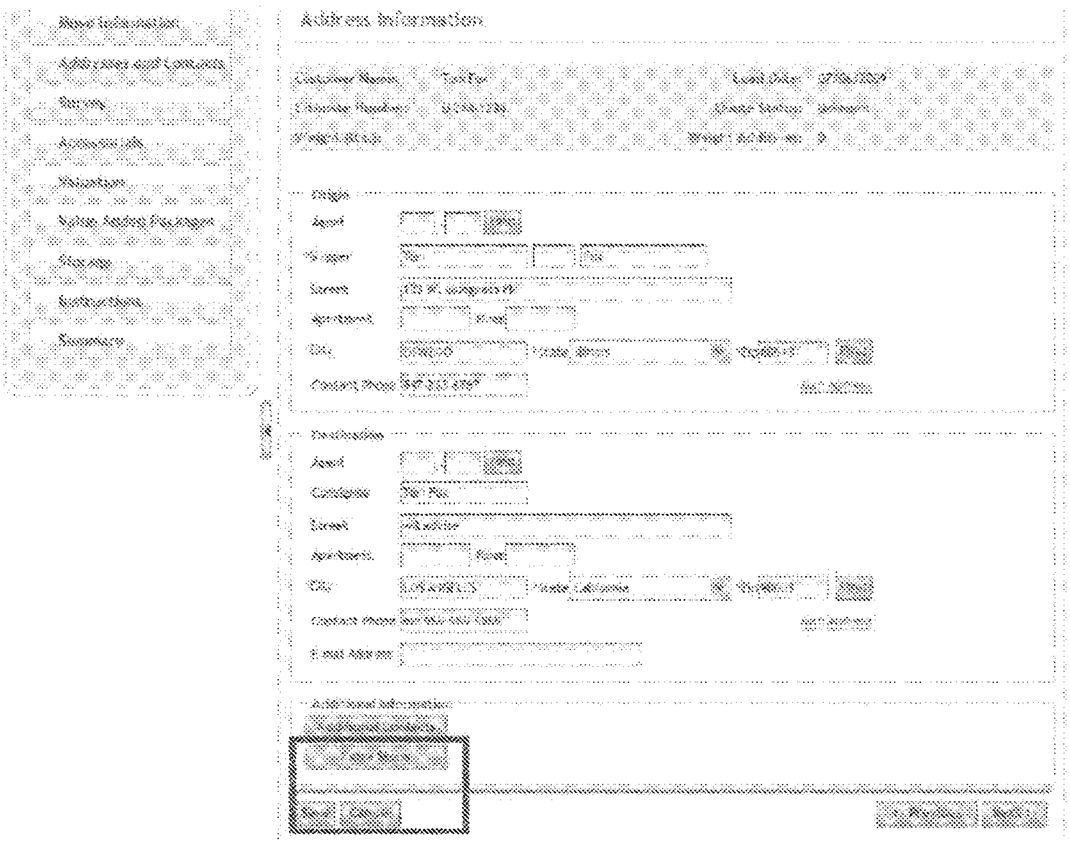

The Additional Contacts button allows you to add additional contact information (see FIG. 152).

Extra Stops

Figure 153:
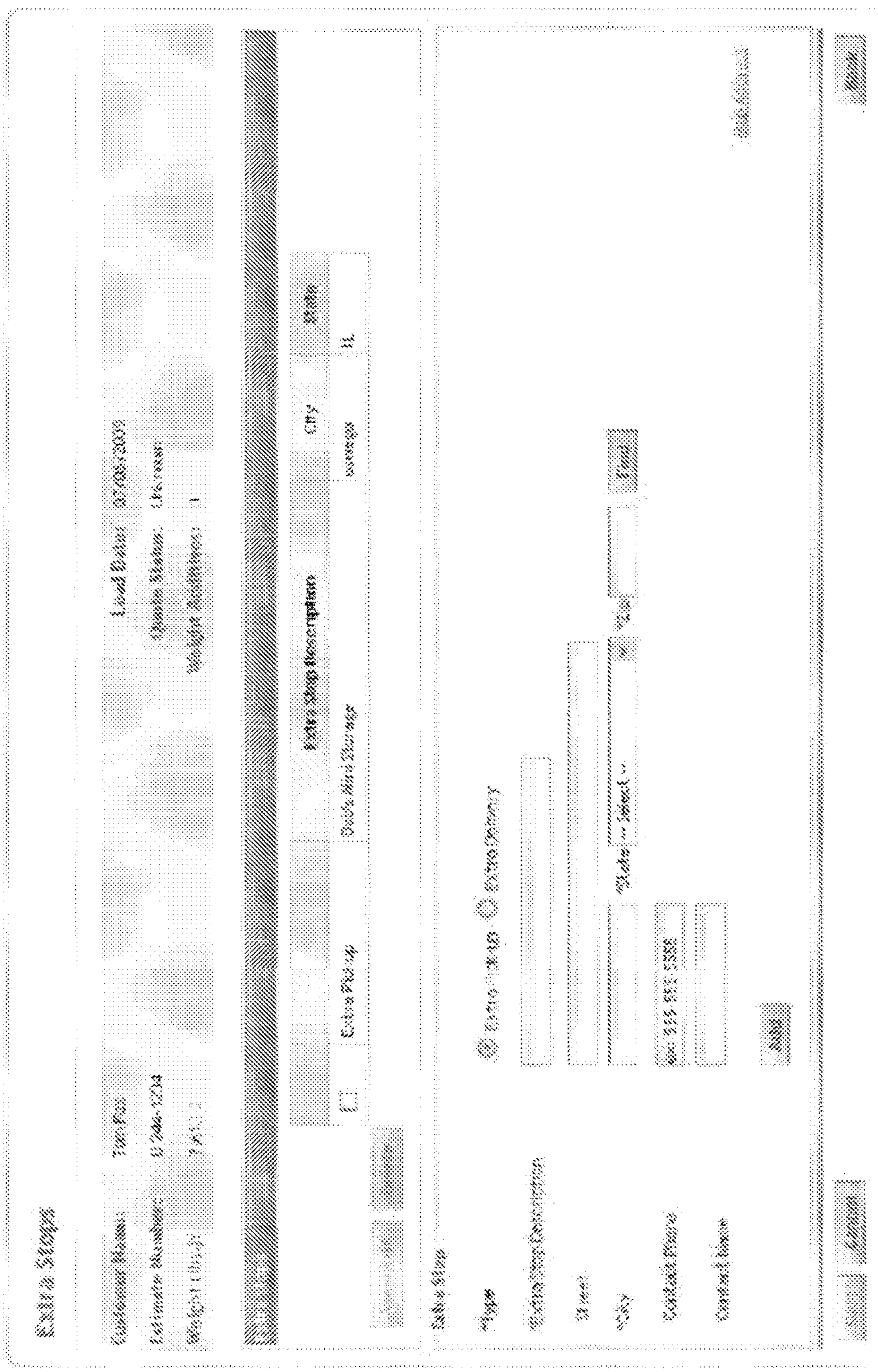

The Extra Stops button allows you to add extra pickups and deliveries (see FIG. 153).

For interstate shipments, this automatically adds both the charges for the accessorial code extra stop and the additional transportation miles.

Enter the extra stop information and click the Add button. When all extra stops are entered, click Save to return to the Addresses and Contacts screen.

Figure 154:
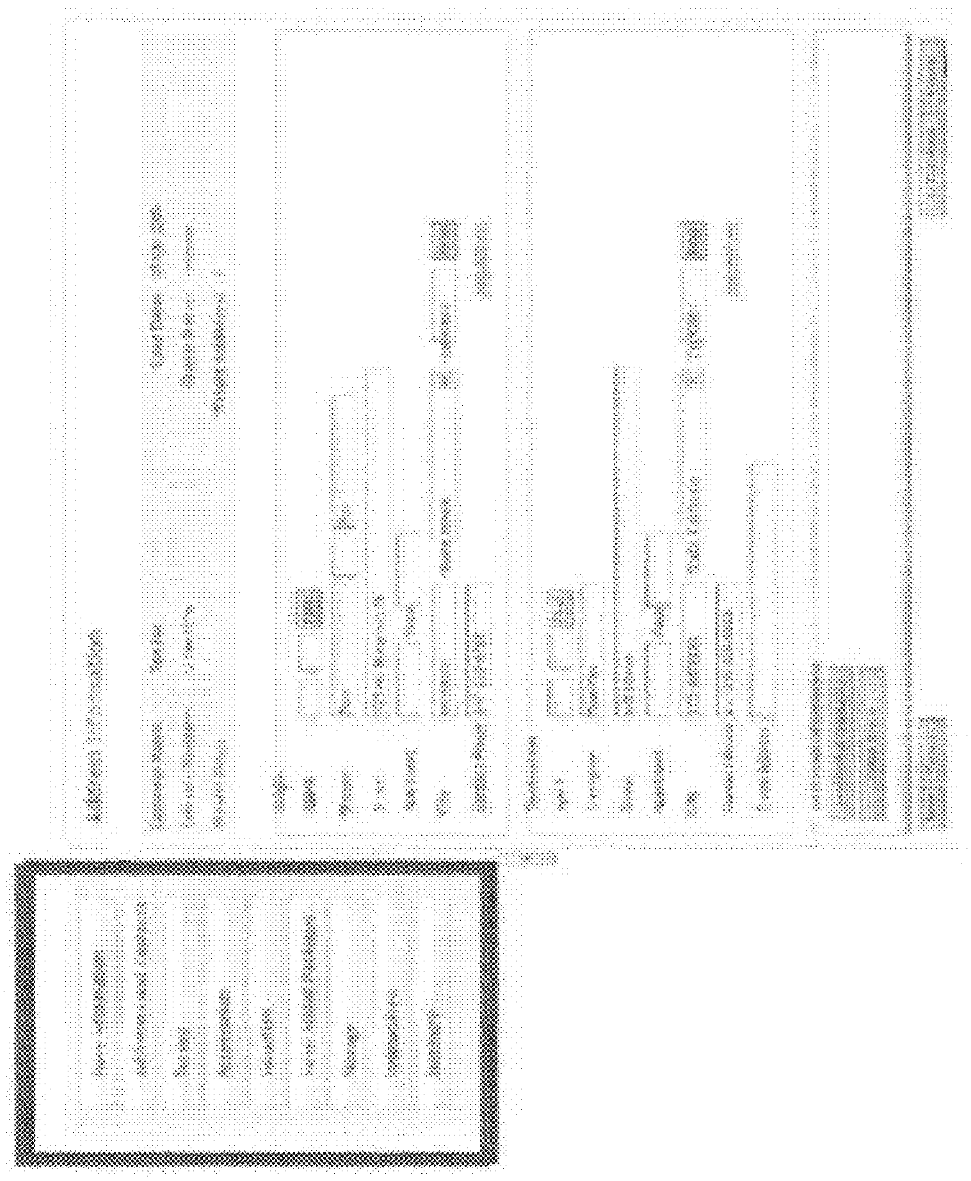

Navigate by clicking the Next>> button, or make a selection from the left-hand menu (see FIG. 154).

Survey (Cube Sheet, Table of Measurement)

When complete, the Survey screen contains the estimated weight of the shipment and is the primary driver of the quote.

Figure 155:
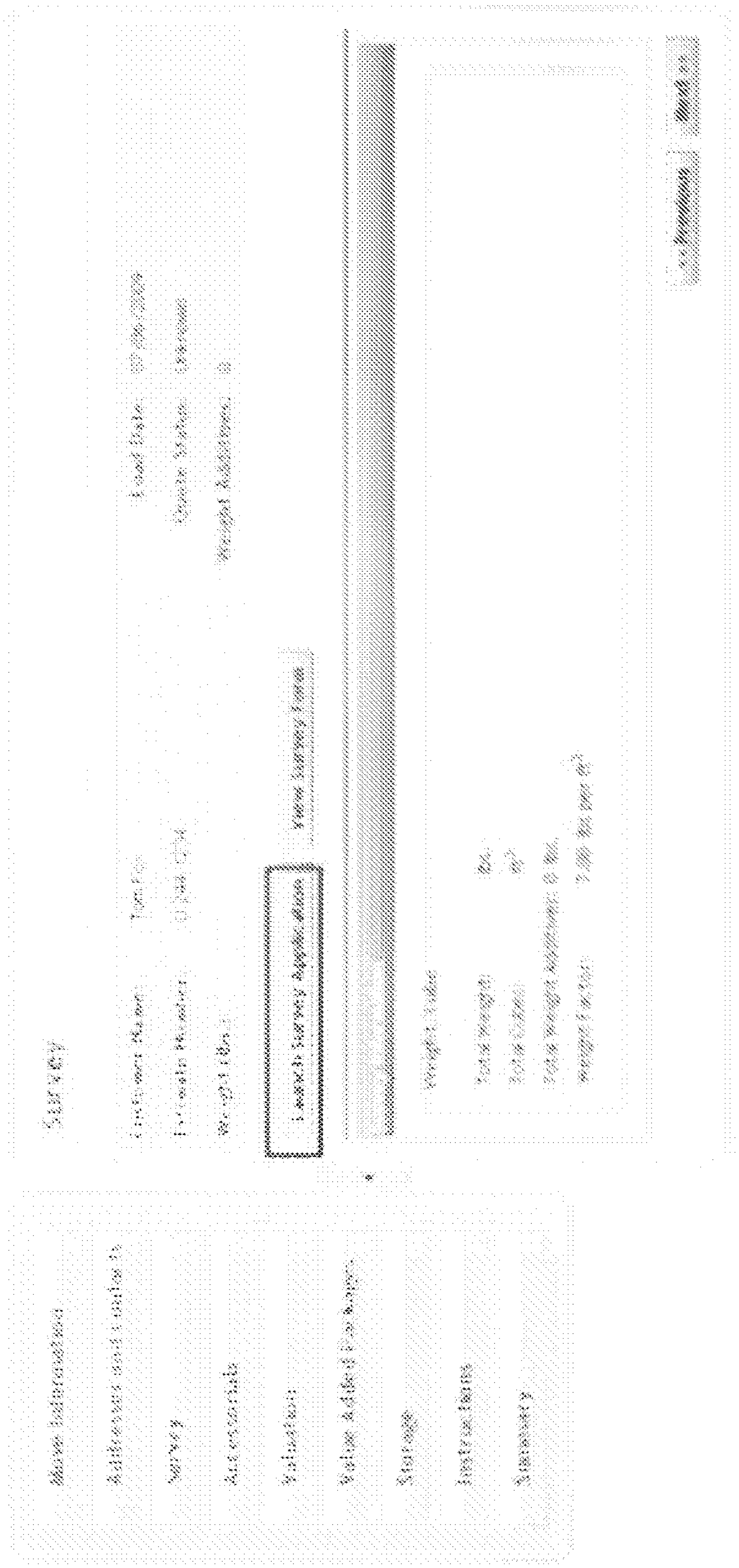

If you have Internet connectivity, use the Launch Survey Application button to begin the survey process (see FIG. 155). If you do not have an Internet connection, see the Offline Survey process described below.

Figure 156:
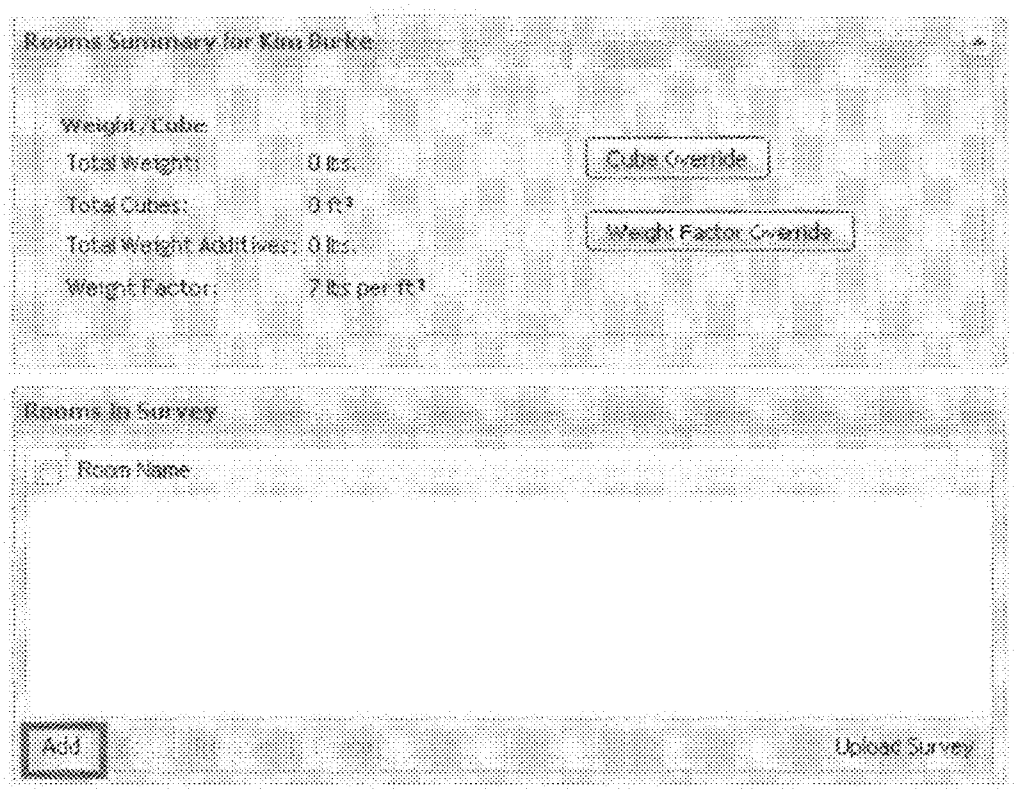

Rooms Summary Screen (See FIG. 156)

The Cube Override button can be used to put a fixed cube into the system for pricing purposes, independent of the survey weight.

Use the Weight Factor Override button to override the standard 7.0 lbs per cubic foot when conducting a survey. This override value is displayed on the Order For Service form.

To begin the survey process, click Add to select a room.

Creating a Room

Figure 157:
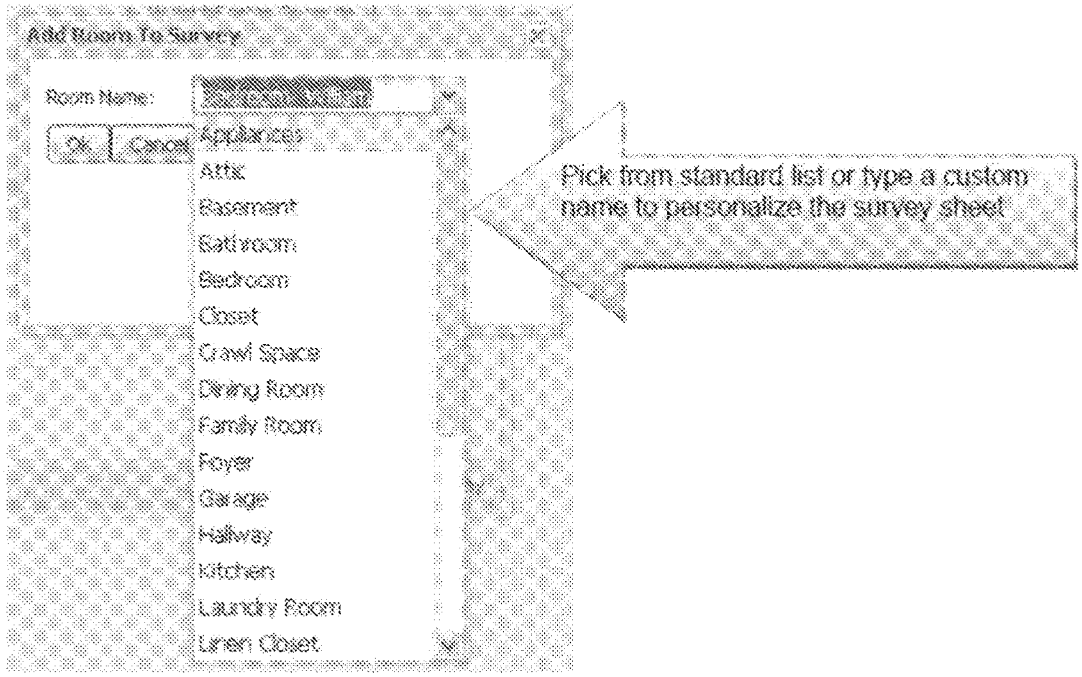
Figure 158:
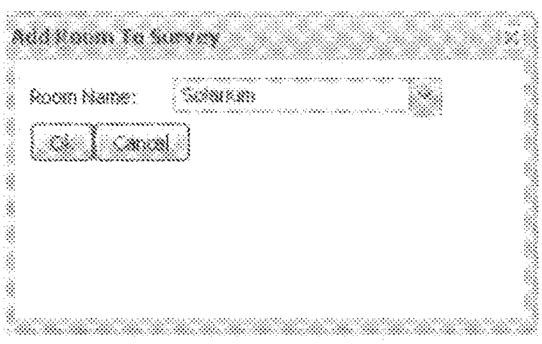

Select a room from the standard room list, or type a customized description into the Room Name field (see FIG. 157). The selected room name (see FIG. 158) prints on the summary.

To create a customized room that is not on the list, select and type over the name of any room. If you select an existing room that typically contains items similar to the articles you see in the custom room, you can use the default article listing by category to add items to your room. Or, use the All tab to add items to your custom room.

Available Articles/Adding Articles

Once a room is created, a list displays on the left-hand side of the screen listing various articles or items to add to the room.

Figure 159:
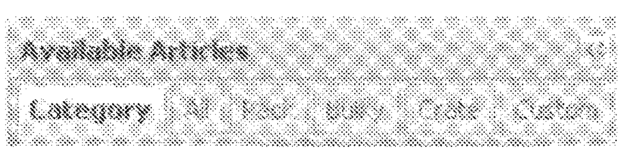

You can access articles using the tabs near the top of the window (see FIG. 159).

Category

The default displays items categorized as commonly found in that room type. To select a category, click the blue bar. If a room does not have a default category associated, all categories display.

Figure 160:
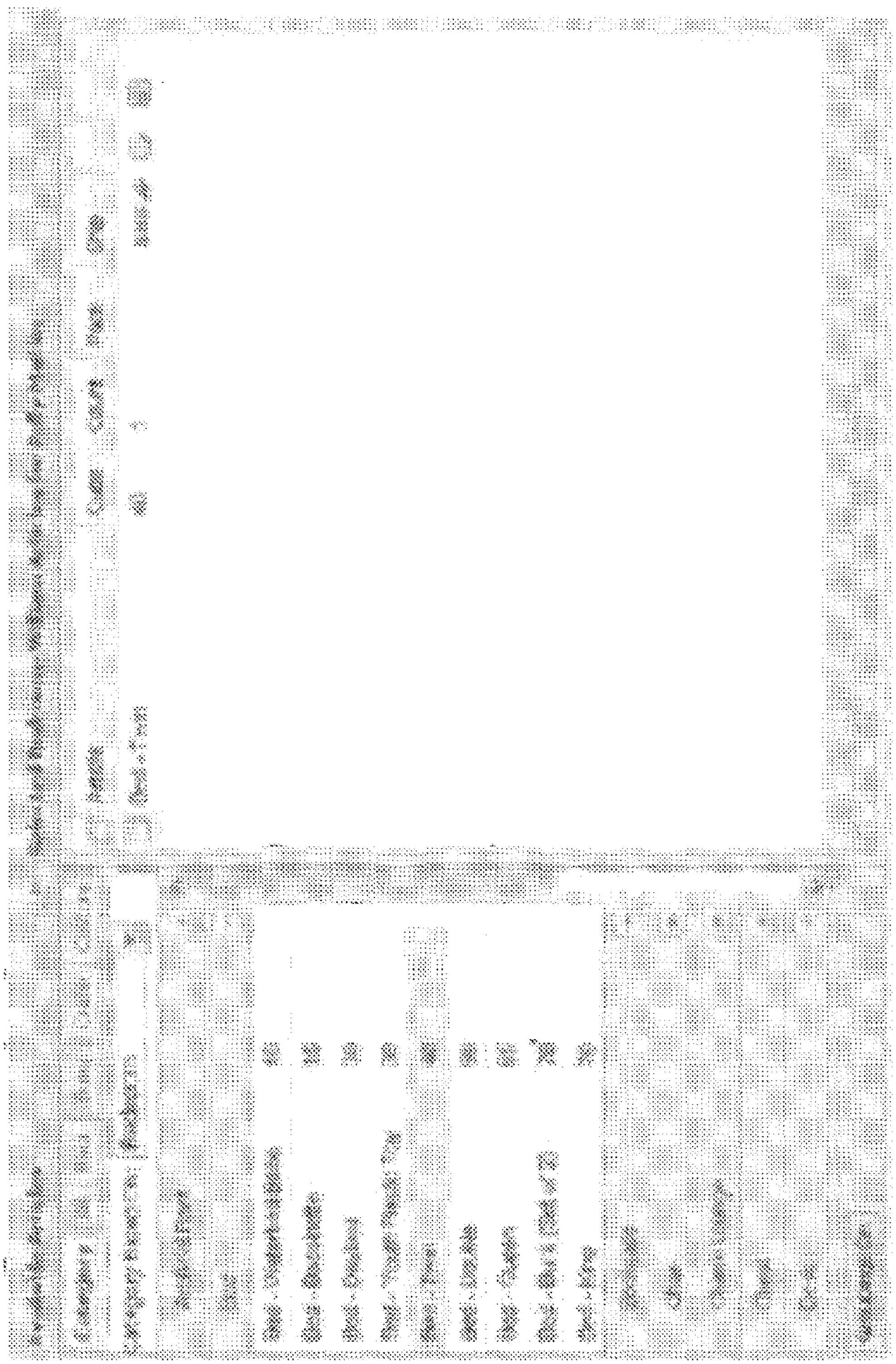

To add an article to the room, click the article (see FIG. 160). It is added to the area at the right of the screen.

All

Figure 161:
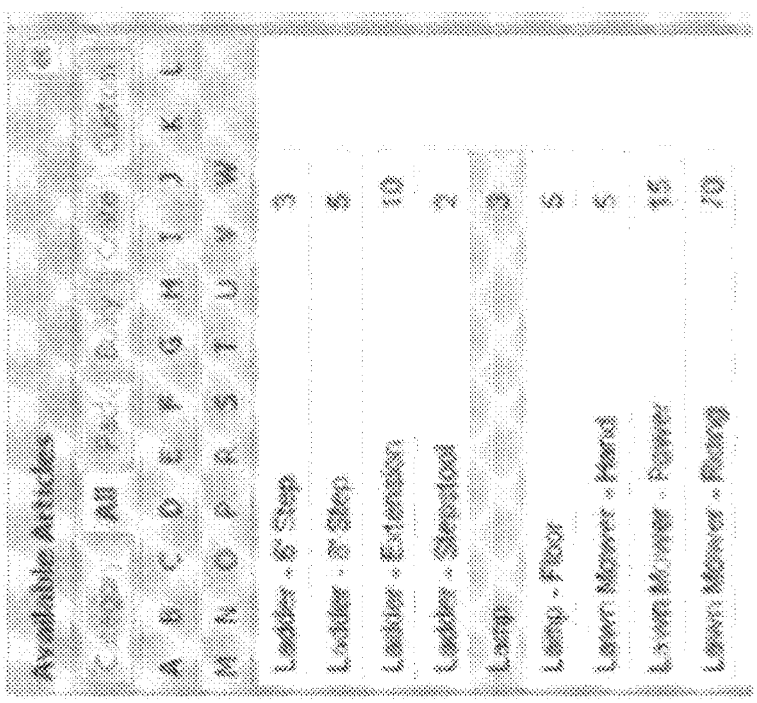

The All option allows all articles to be viewed alphabetically (see FIG. 161). Select a letter of the alphabet to view articles that begin with that letter.

Pack

Figure 162:
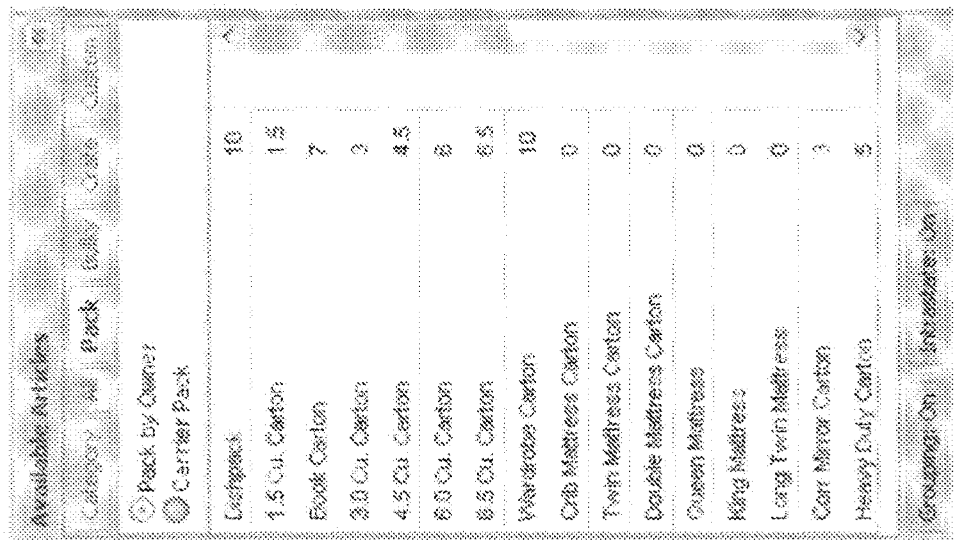

The Pack screen allows you to select cartons and indicate if packing is by owner or by carrier (see FIG. 162). The screen defaults to Pack by Owner.

Note: The book carton item uses a cubic feet of 7. The book carton item displays on the cube sheet as a book carton. However, it uses the pricing of a 1.5 cu carton, and displays on the Order For Service as a 1.5 cu carton.

Bulky

Figure 163:
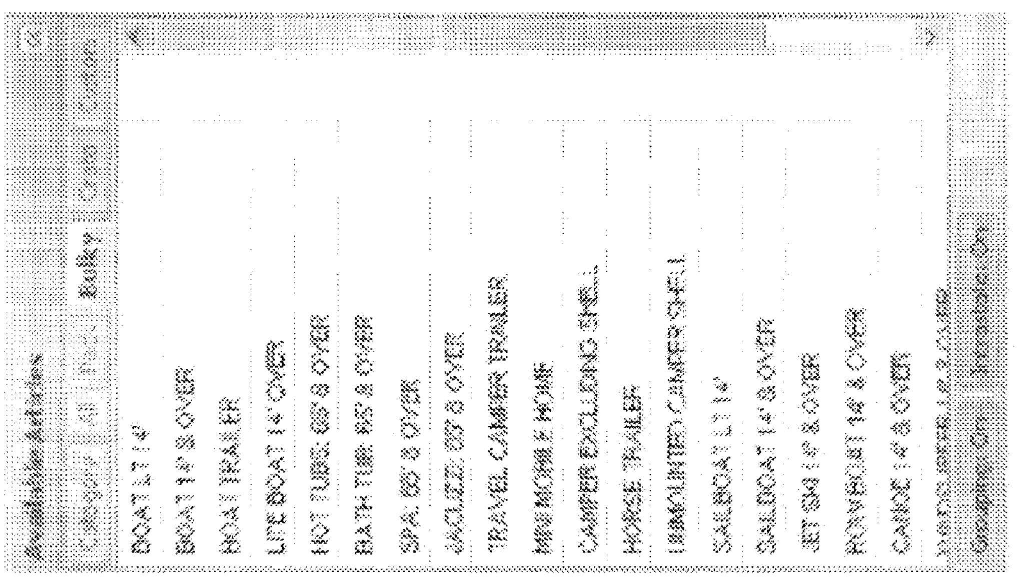

The Bulky tab allows you to select weight additive bulky articles (see FIG. 163).

Crate

Figure 164:
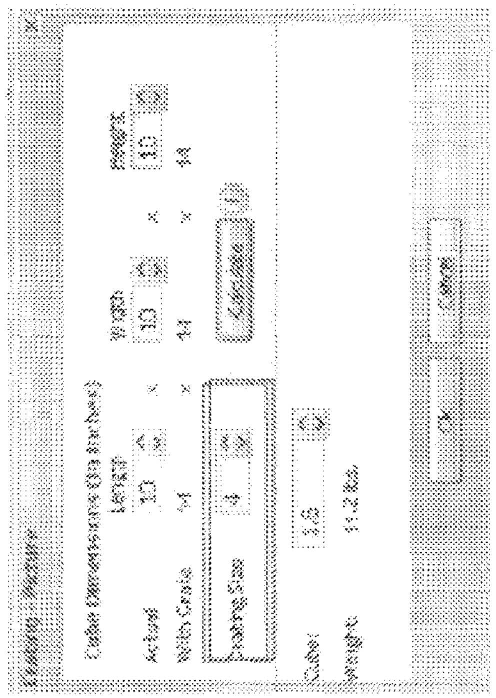

The Crate tab allows the selection of Crating Items (see FIG. 164).

When adding a crating item, a window appears asking for the dimensions of the item. Enter the dimensions and click the Calculate button.

This adds 4" to each dimension and calculates the cubic feet and weight of the crate. Make any adjustments and click Ok to add the item to the survey.

Charges are entered on the Crating Summary Screen found on the Summary screen, explained later on in this document.

Custom

Figure 165:
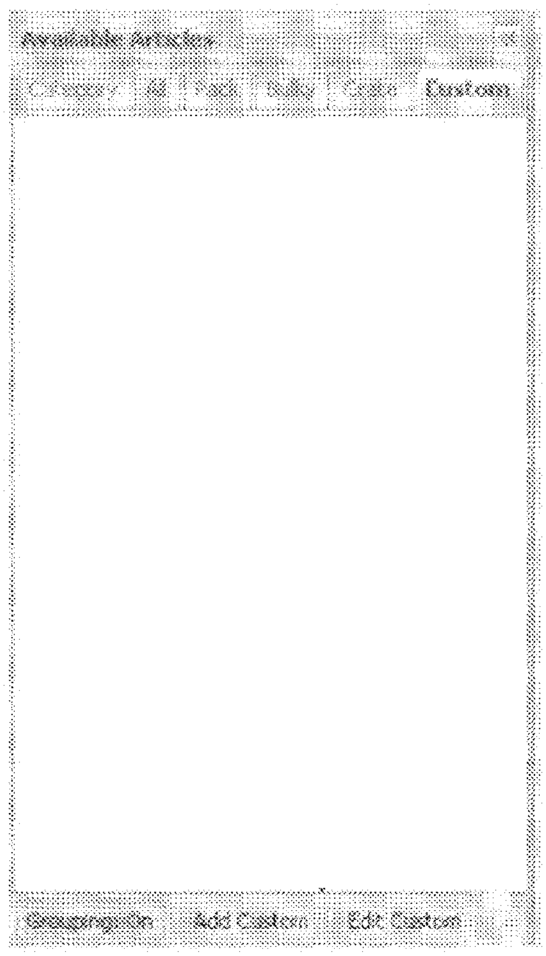
Figure 166:
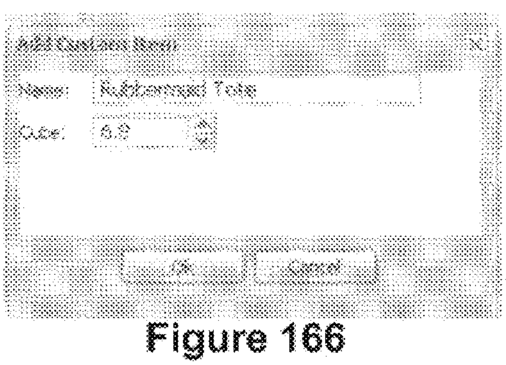

Create your own list of unique items in the Custom tab. You can create as many items as you need. Custom items display on the custom tab and on the All tab. They are visible only to your user ID. To add a new items, click Add Custom Article (see FIG. 165). Add your item description and cube amount (see FIG. 166).

Figure 167:
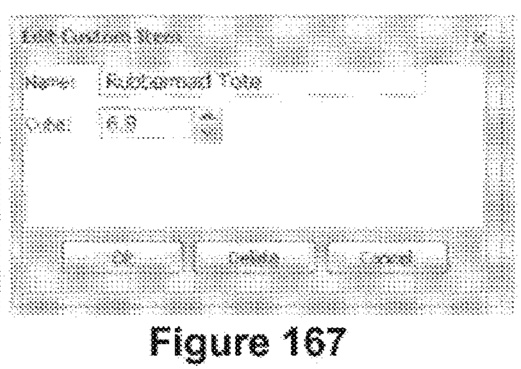

To Edit or Delete a Custom Item, select Edit Custom, and then select the custom item to be changed or deleted. This opens the Edit window (see FIG. 167). Change the name or cube and click OK to update, or click Delete. Then click Edit Custom once again or click any tab in the survey to toggle out of edit mode.

Editing a custom item impacts future uses of that item. Past surveys that used the old items are not changed.

Grouping: On/Off

Figure 168:
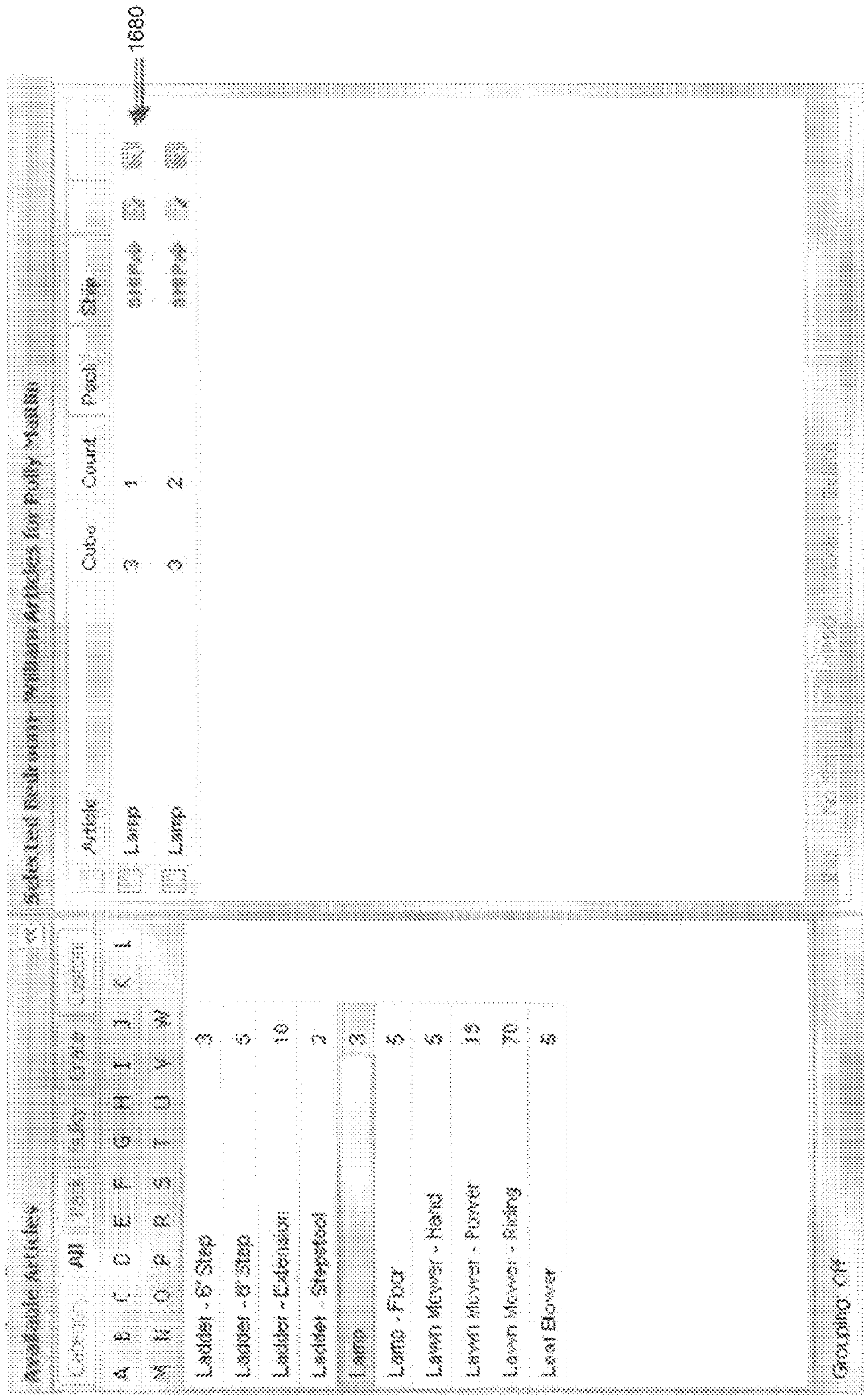

The default setting is for Grouping to be On. This setting allows you to click an item multiple times to increase the quantity in the center panel (see FIG. 168). If you want multiples of the same item to be listed individually, (i.e., to override the cube of one of the rows) click the Grouping button to turn off the setting. This allows you to list the same item more than one time, which is helpful when all items are not to be handled identically.

For example, the room contains three lamps, one of which is a high value Tiffany lamp. You enter the two lamps by clicking the item twice with Grouping On. Then, turn Off grouping by clicking the Grouping button and click on the lamp item again to add it separately from the first two.

You can use the More . . . icon 1680 on the second lamp listing to mark it as High Value or add a comment.

Modifying Added Items

Figure 169:
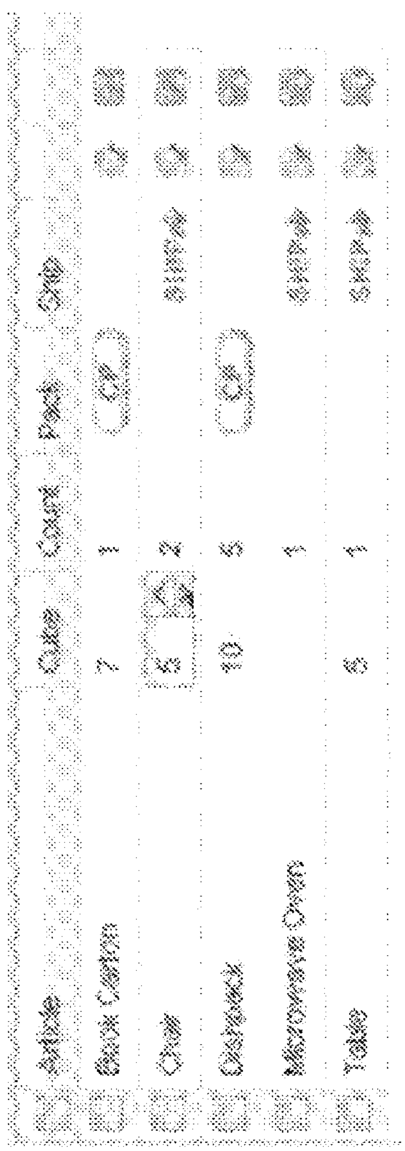

As items are clicked on from the [Available Articles] section, they are added to the room displayed in the middle of the screen. Non-carton based items appear as shown below (see FIG. 169).

The Cube, Count (number of items) can be modified by clicking on the item and editing either with the keyboard or with the up and down arrows.

Figure 170:
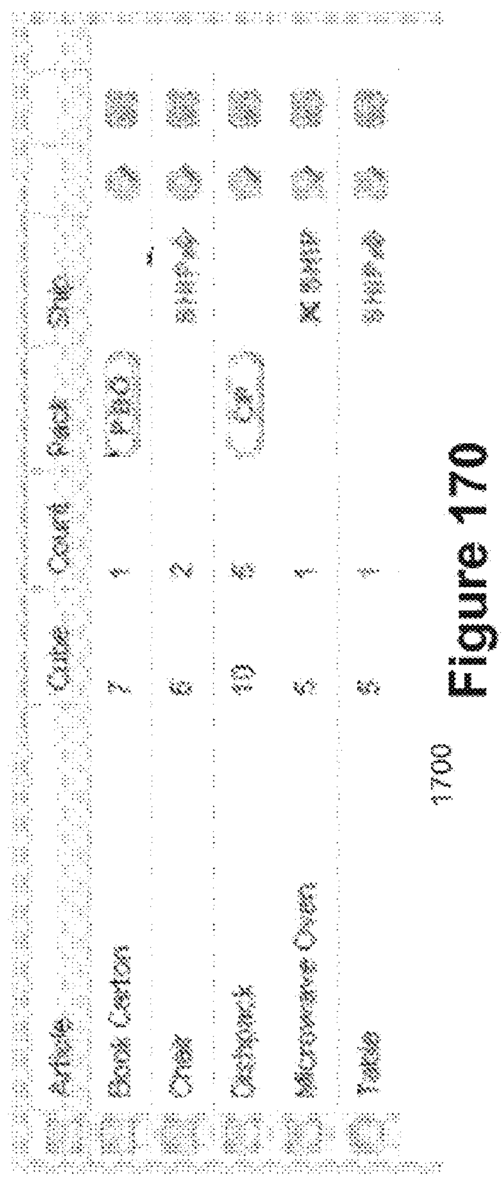

Change from Carrier Pack (CP) to Pack by Owner (PBO) or from Ship to No Ship (or vice versa) by clicking the icon (see FIG. 170).

Figure 172:
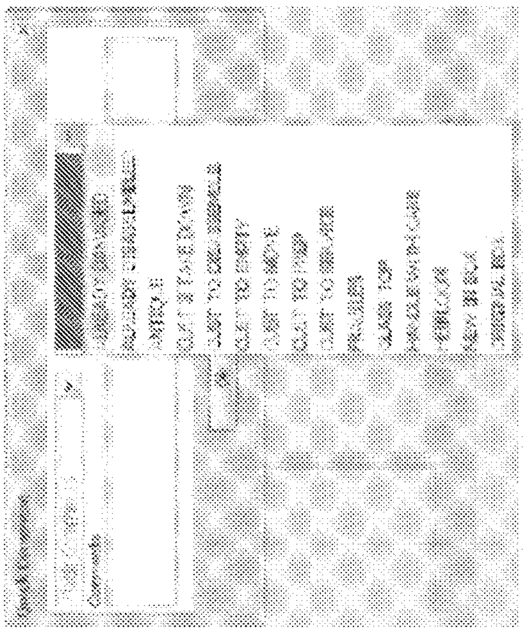
Figure 171:
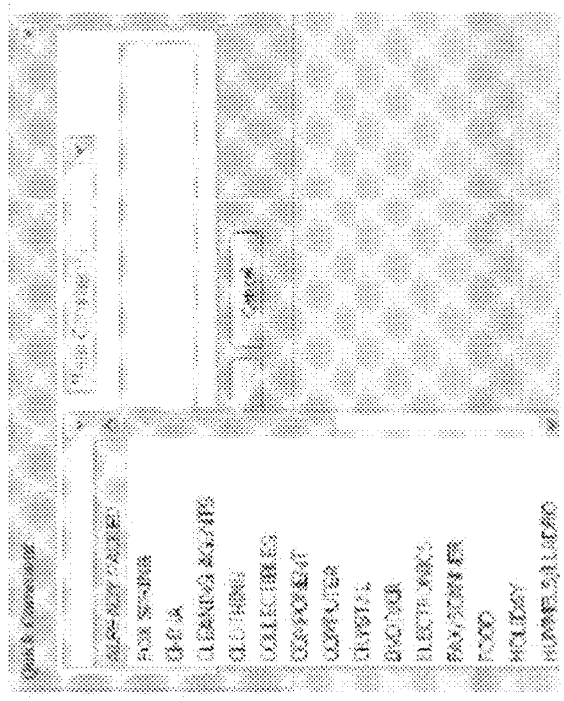
Figure 173:
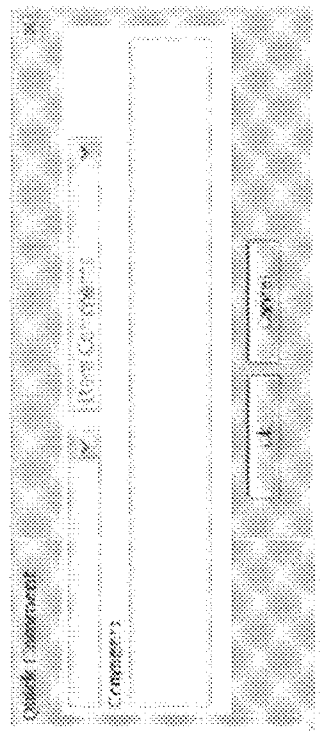

Click the Quick Comments icon 1700 to select from a pre-set list of item and/or packing comments (see FIGS. 171 and 172). Or you can add your own comment to an article (see FIG. 173).

Figure 174:
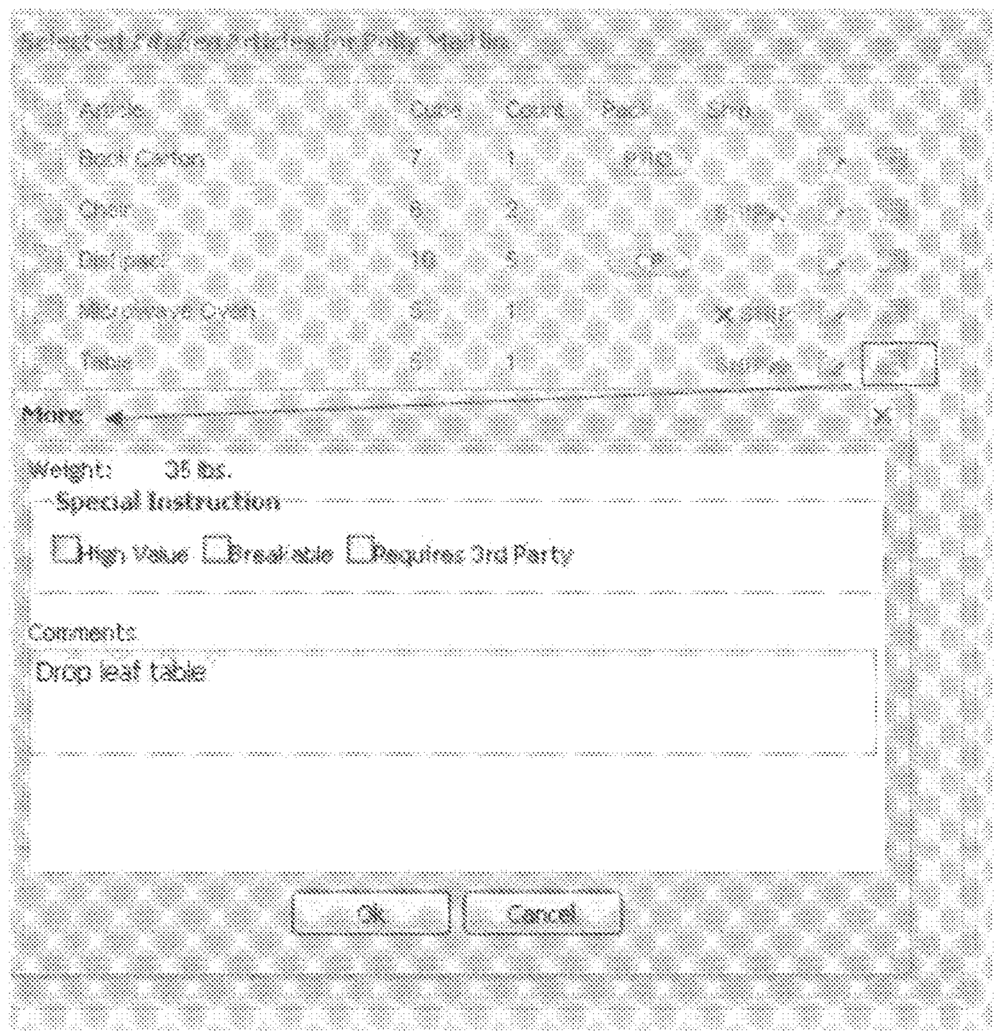

The More icon allows additional information to be entered about the item (see FIG. 174). Comments about an item appear on the printed survey displayed to the customer. Examples of Special Instructions include: high-value, breakable, or third party required.

Figure 175:
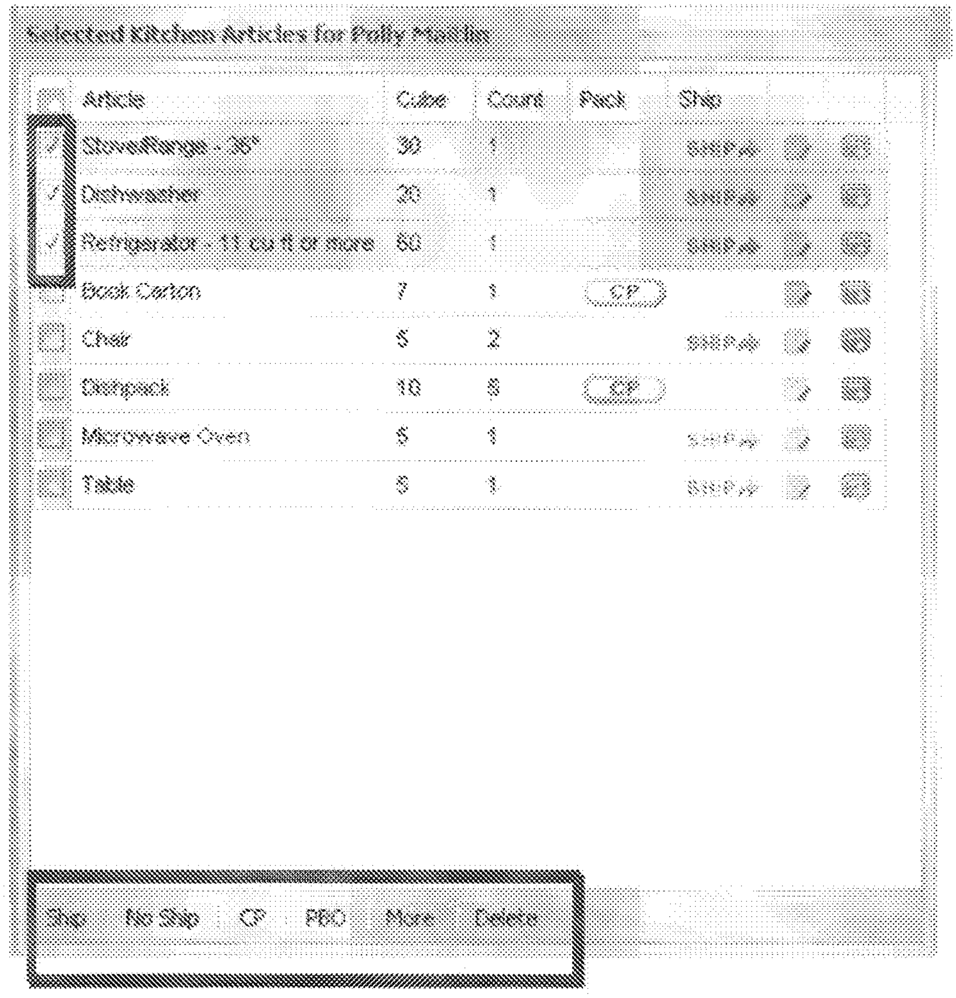

You can make changes to multiple items at once by selecting the check box at the left of the items that require the same change (see FIG. 175). Click any of the options at the bottom of the screen to make the update to all selected articles.

Figure 176:
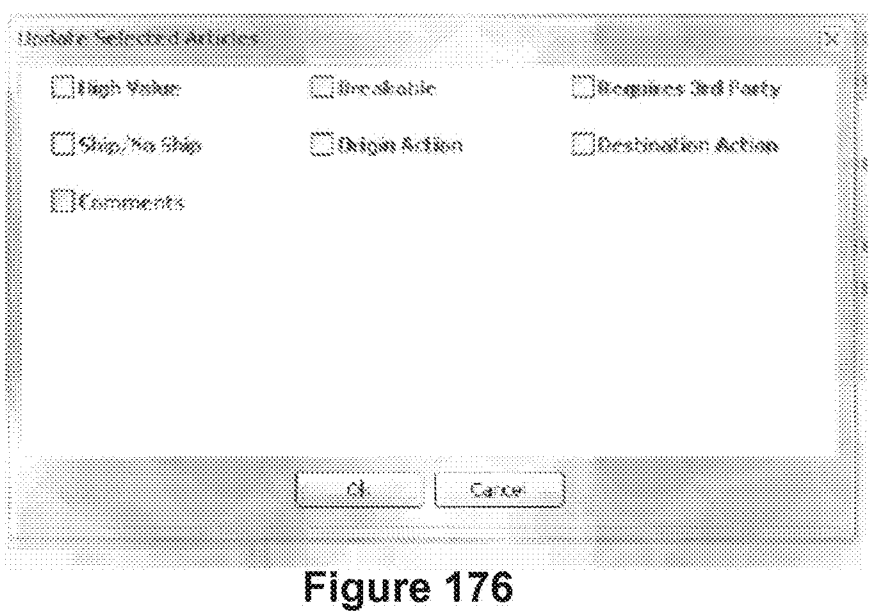

The More button at the bottom of the screen allows you to make updates or add the same comment to all selected articles (see FIG. 176).

Customize Your Workspace

Figure 177:
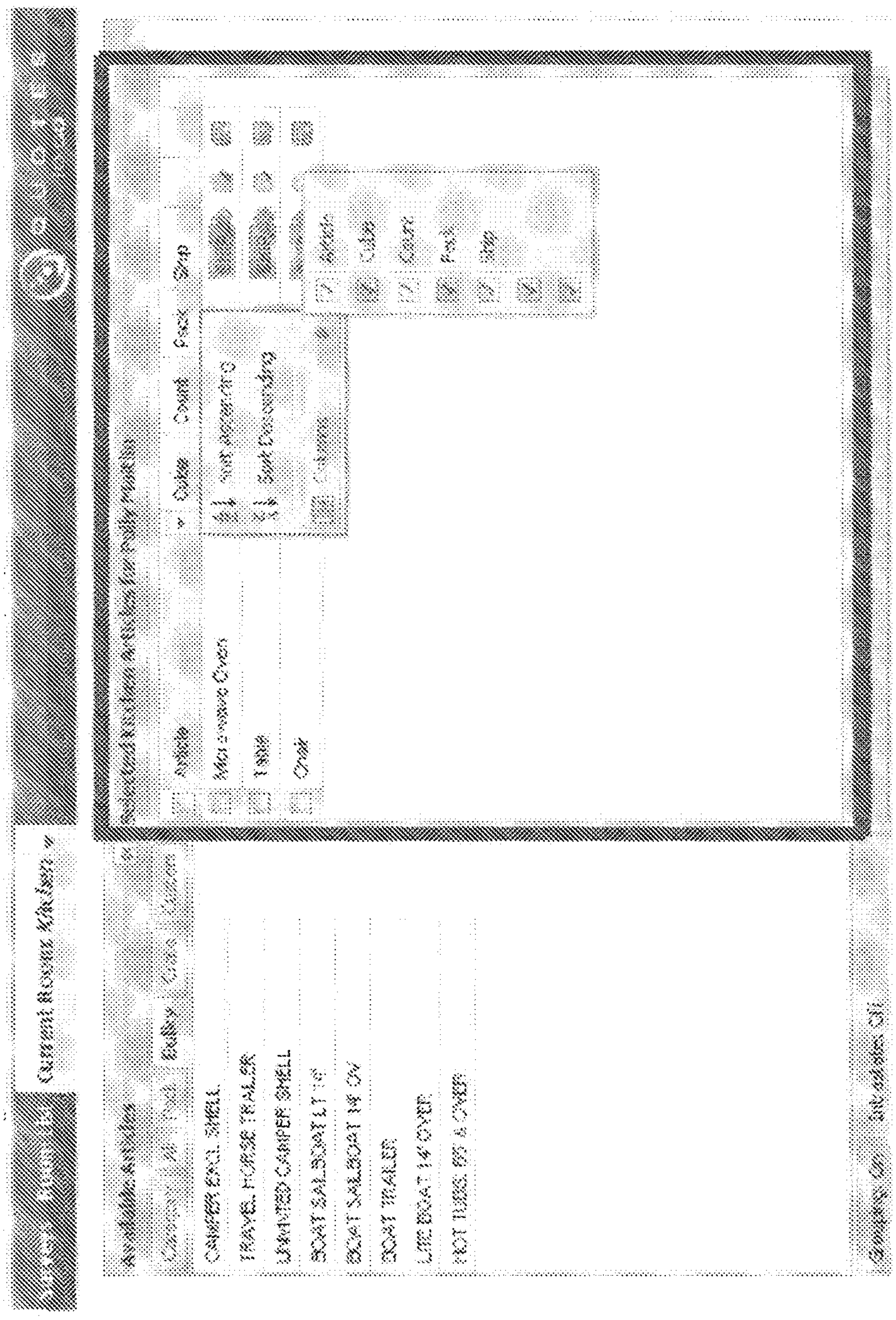

You can customize the columns that display on the select room articles area of the screen (see FIG. 177). You can also change the order in which the columns display.

To hide a column, left click your mouse on the drop down area of any column header.

Figure 178:
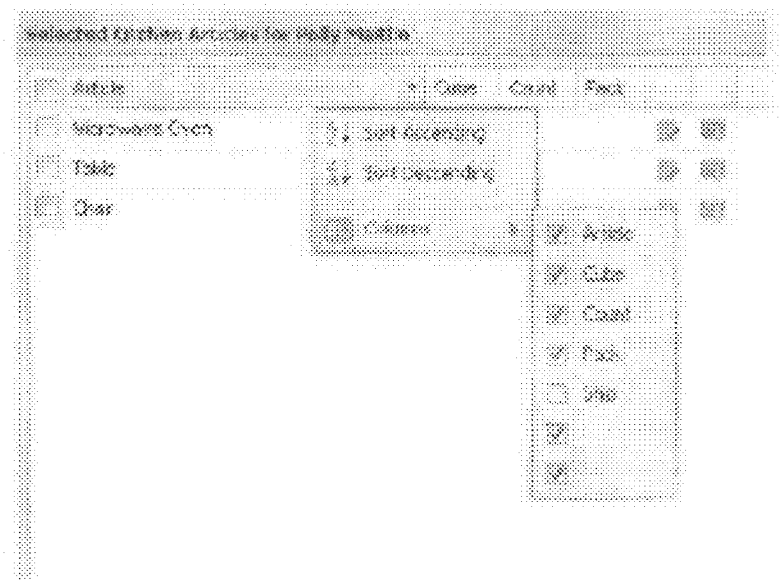

Roll your mouse over the Columns selection and de-select any check box to hide the selected column (see FIG. 178).

To re-display a hidden column, select the check box.

Figure 179:
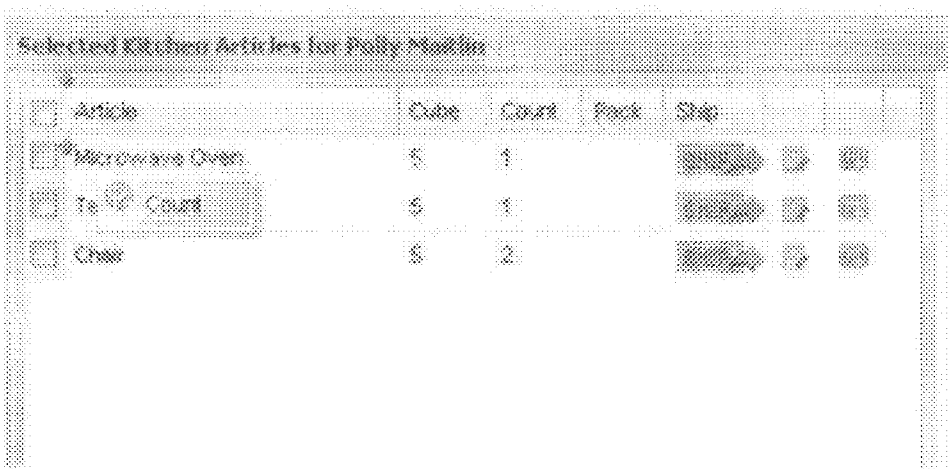

To change the order of the column display, left click on the column header description and hold and drag the column to the new area of display. When you see the double blue arrows near the new display area, release the left mouse button (see FIG. 179).

Figure 180:
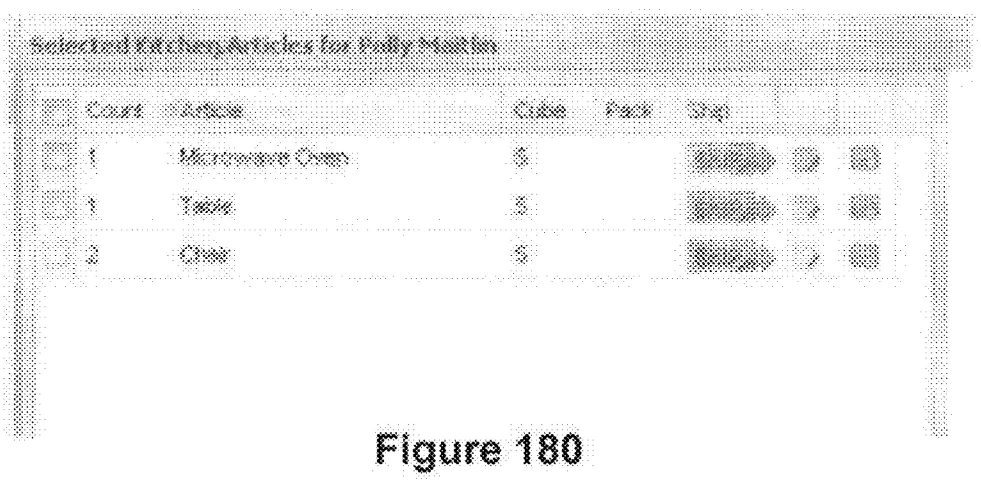

The column order is changed (see FIG. 180).

Add a New Room

Figure 181:
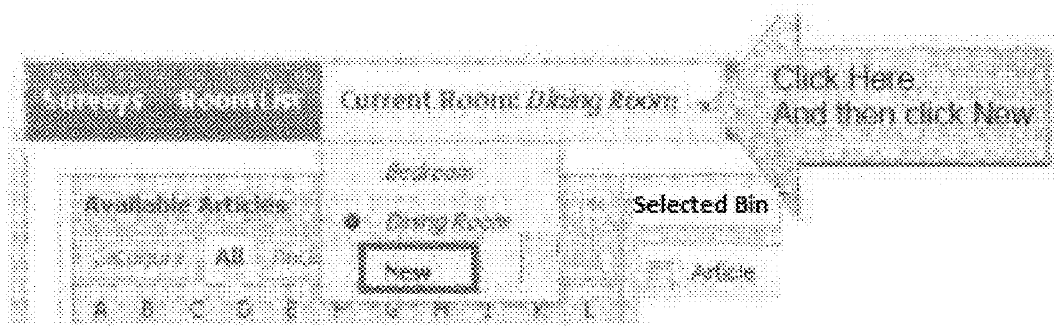

After adding all items to a room, a new room can be added from the current room navigation (see FIG. 181).

Continue to survey the home by adding all the appropriate rooms and articles.

Completing a Survey

Figure 182:
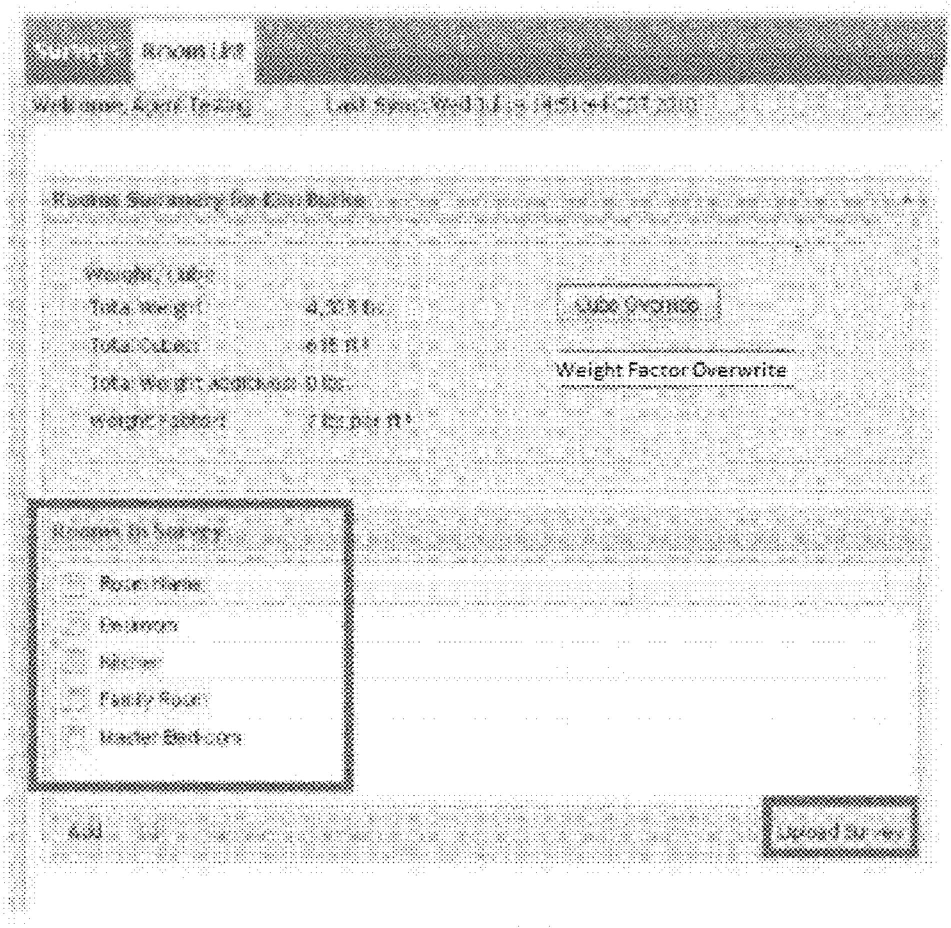

After completing a survey, click the Room List tab (see FIG. 182).

As the survey is completed, the Room Summary screen displays a list of the rooms in the in-home estimate.

Click the Upload Survey button to update your estimate with the total weight.

*You must have online connectivity with the Quotes-To-Go application open before you use the Upload Survey button.*

Survey Main Page

Figure 183:
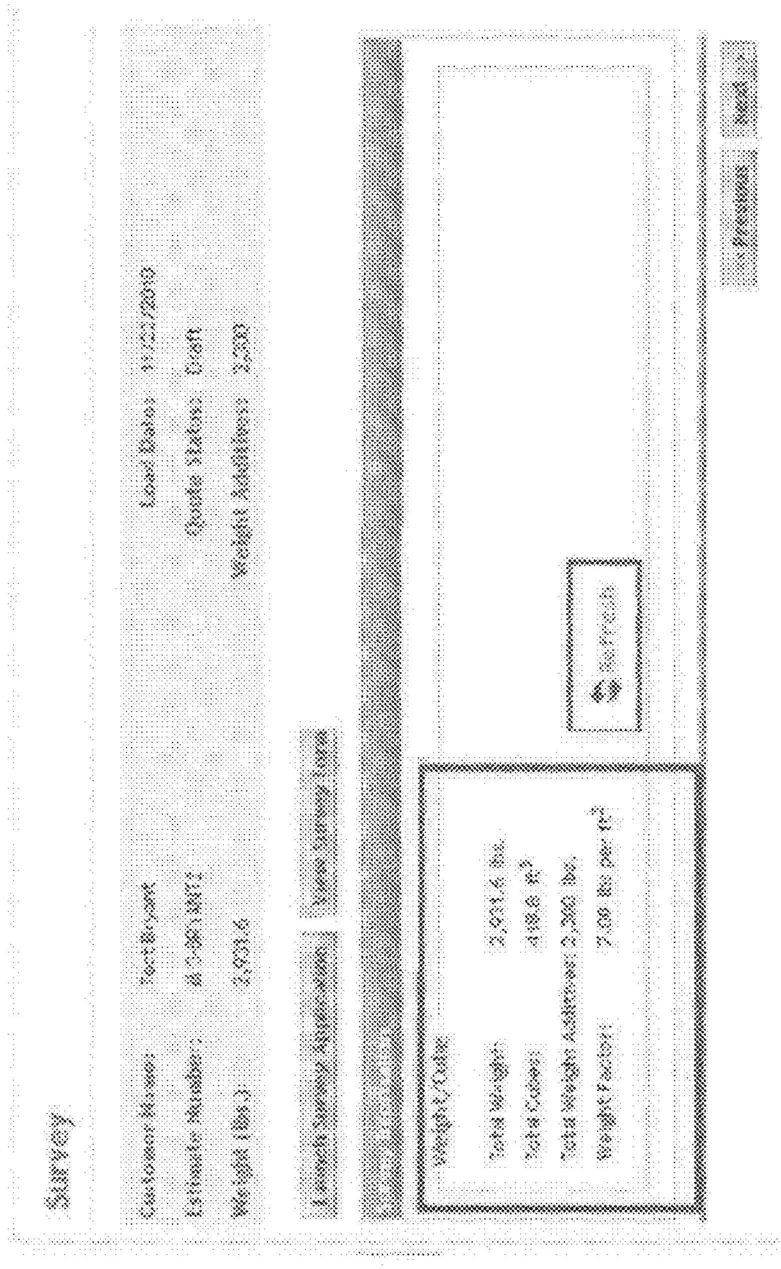

After uploading a survey, click Refresh to view the weight on the Survey page of the main Quotes-To-Go application (see FIG. 183).

Figure 184:
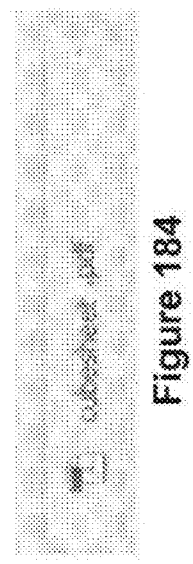

Access the survey form by clicking View Survey Form on this page. A pdf, printable version of the survey displays in the lower left-hand corner (see FIG. 184).

Figure 185:

Click to open. See a sample survey form at FIG. 185.

Starting an Interstate Survey Offline

Figure 186:
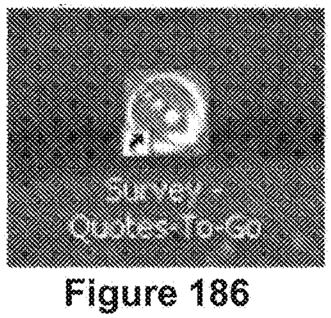

When Internet connectivity is unavailable, launch the offline survey from your desktop. Surveys that have not been uploaded display on the Offline Survey(s) page. You can use this to perform a quick weight survey, and then upload when you can connect to get final pricing. Follow these steps when working offline:

Click the Survey shortcut from your desktop (see FIG. 186).

Figure 187:
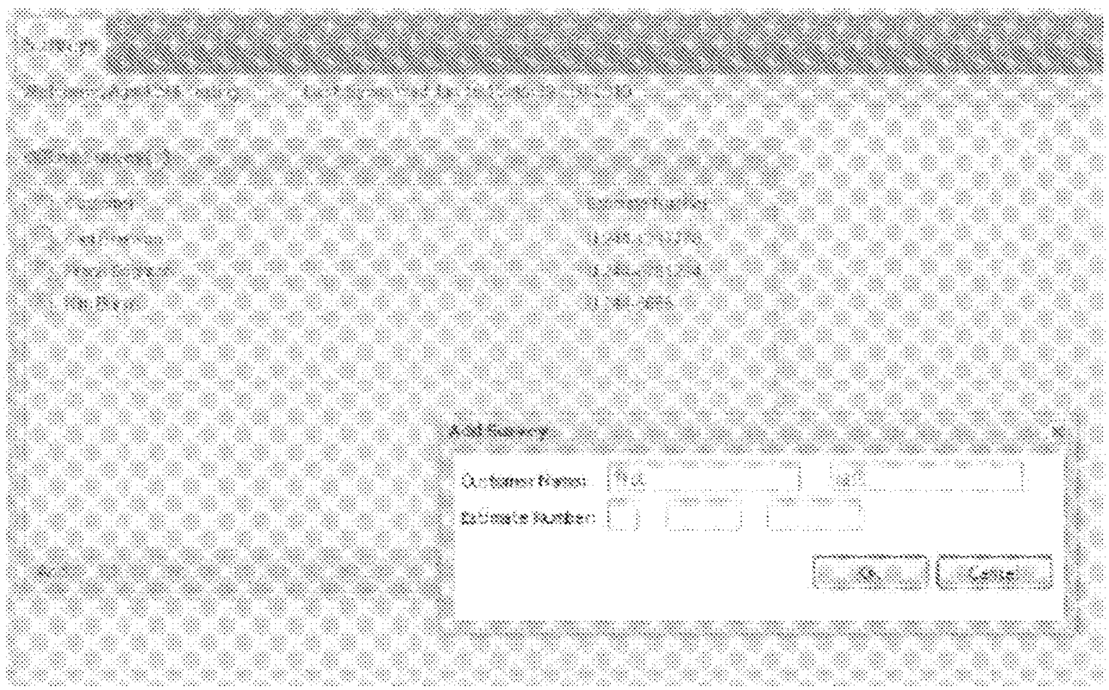

Use the Add button and enter the Customer Name and Estimate Number and click OK (see FIG. 187).

Add Rooms and Items as previously described in this manual.

Once you have Internet access and are ready to upload for rating purposes, open the Opportunity in Quotes-To-Go and begin the quote process in the My Quotes screen, if it was not previously started there. Note: The Estimate number entered on the Move Info screen in the quote MUST EXACTLY match the Estimate number used in the Survey.

Figure 188:
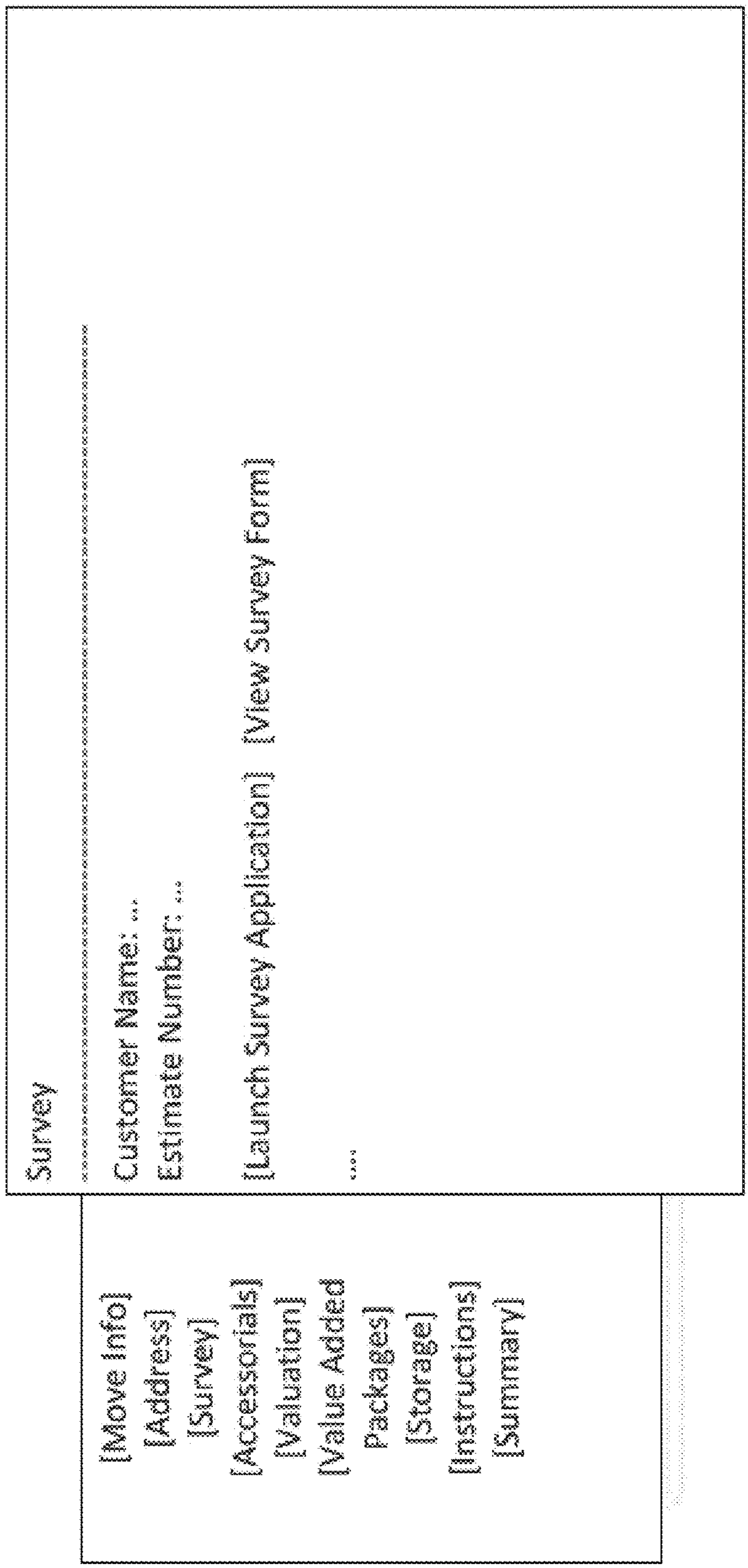
Figure 189:
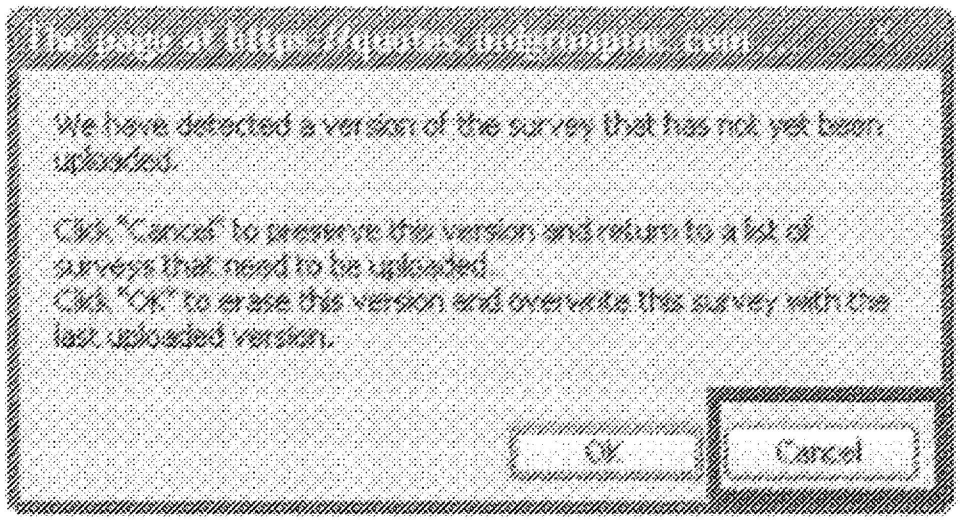

When you launch the survey application from the Survey screen (see FIG. 188), the message shown at FIG. 189 indicates your survey has not yet been uploaded.

*CLICK CANCEL TO PRESERVE YOUR SURVEY SO THAT YOU CAN UPLOAD IT.*

Figure 190:
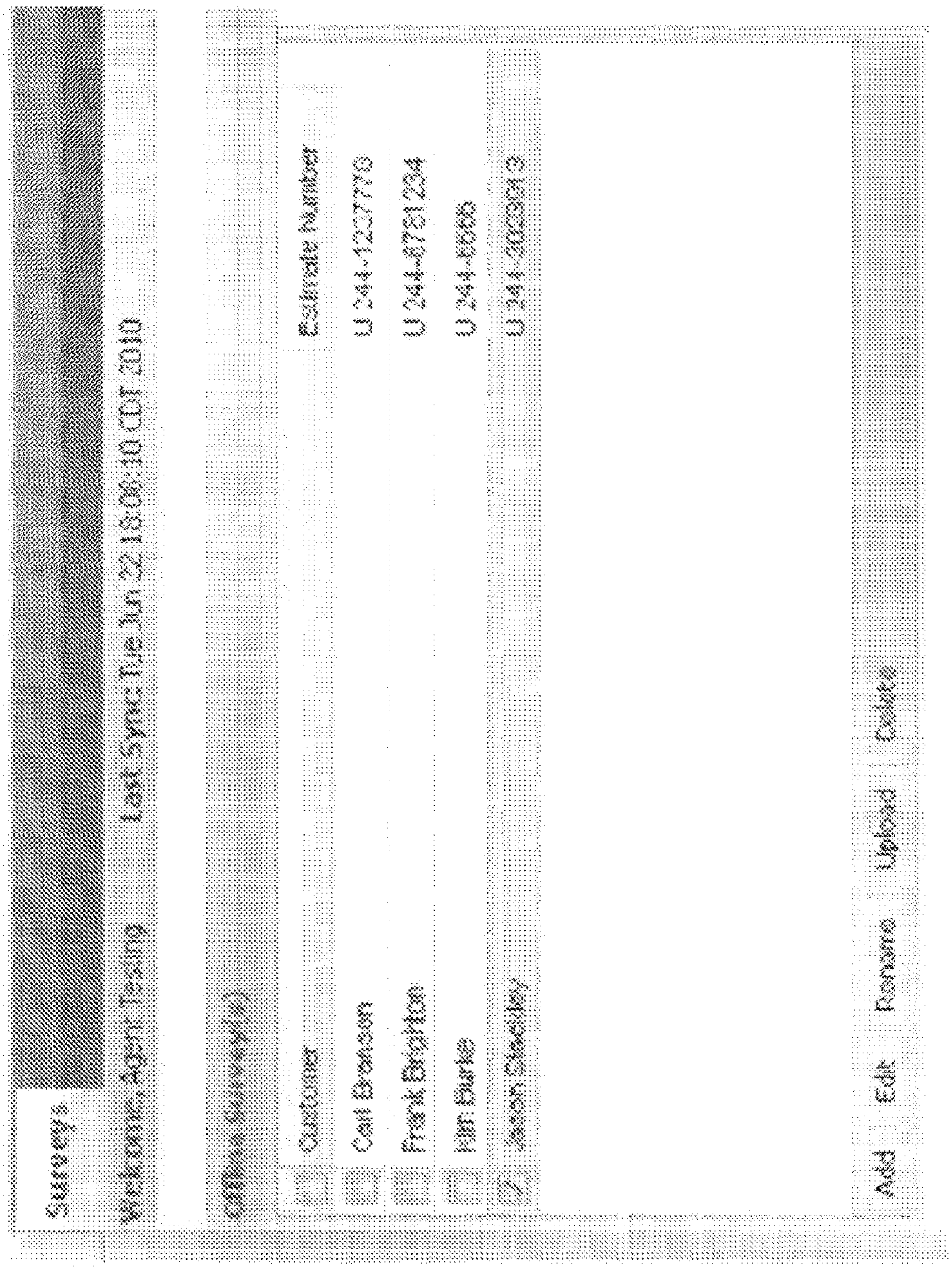

Select the check box of the survey you'd like to upload to obtain pricing (see FIG. 190). Verify that the Estimate Number matches the Quote Number created in step 4.

Click the Edit button.

Figure 191:
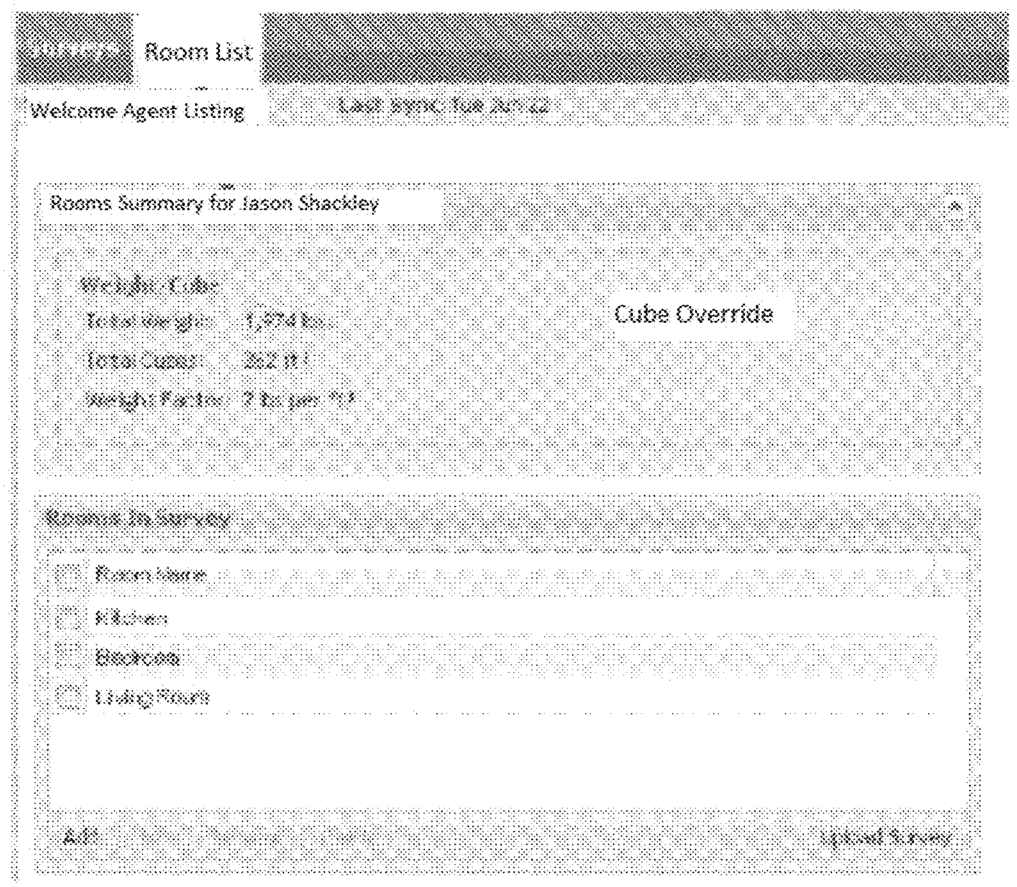

Verify weight, and then click Upload Survey (see FIG. 191).

Figure 192:
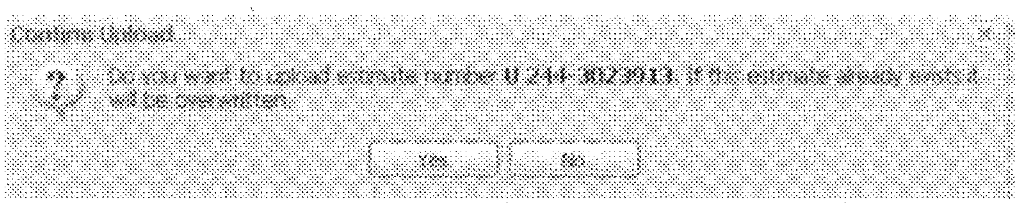

Click Yes to confirm upload (see FIG. 192).

Once you've uploaded the survey information, you may return to the Quotes-To-Go Survey screen and view the survey or continue with the quote and obtain a price.

Use the Launch Survey Application button to re-access the survey any time updates are needed.

Accessorials

Figure 193:
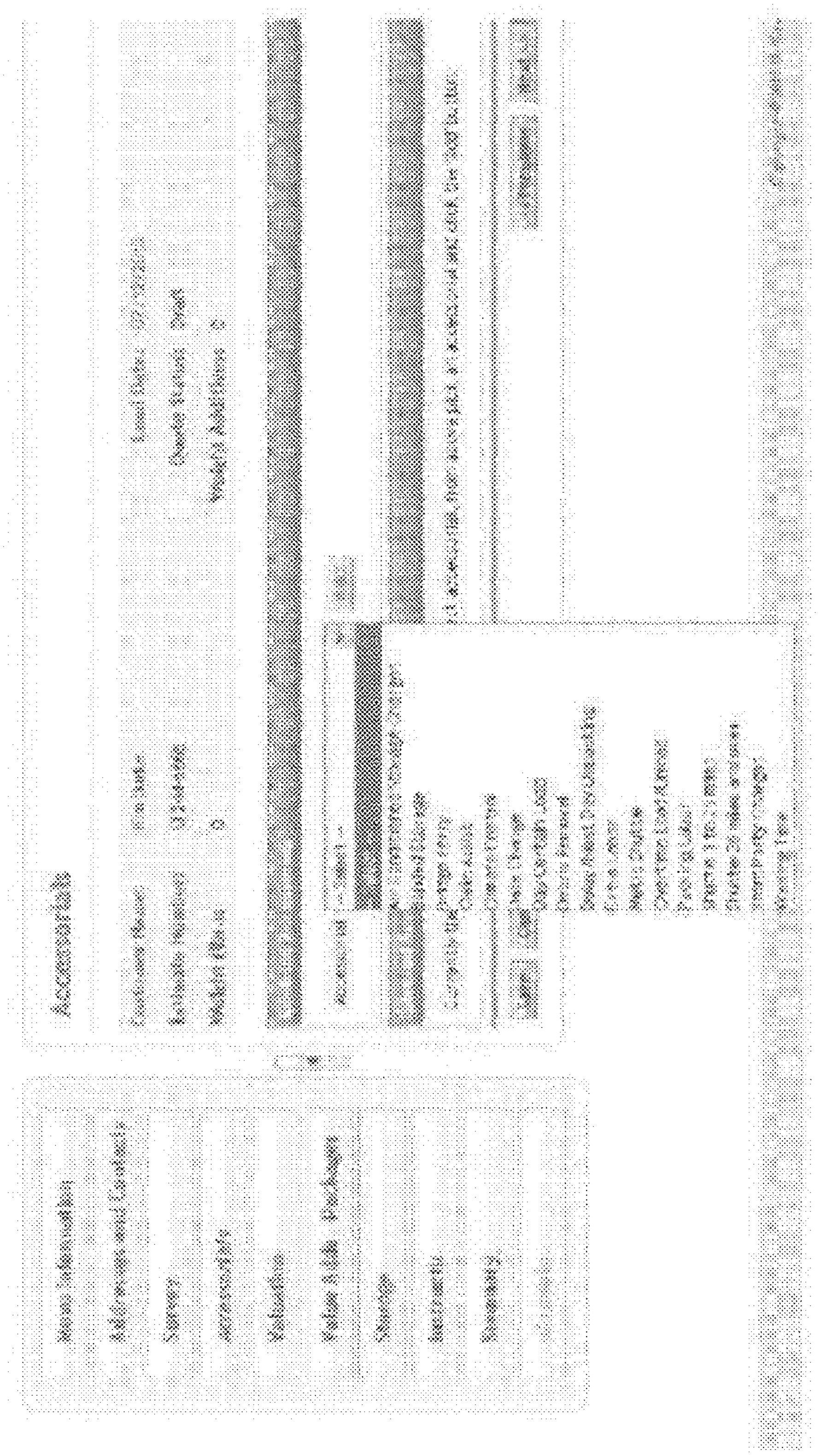

To access accessorials, click the Next button on the Survey screen, or select Accessorials from the menu at the left. The Accessorials screen allows you to select and add extra charge items (see FIG. 193). The most common accessorials include origin shuttles and third-party charges (such as washer/dryer unhook). To add an accessorial, select one from the list, and click Add. Tariff rates display for items other than third party charges.

Third Party Charge

Figure 194:
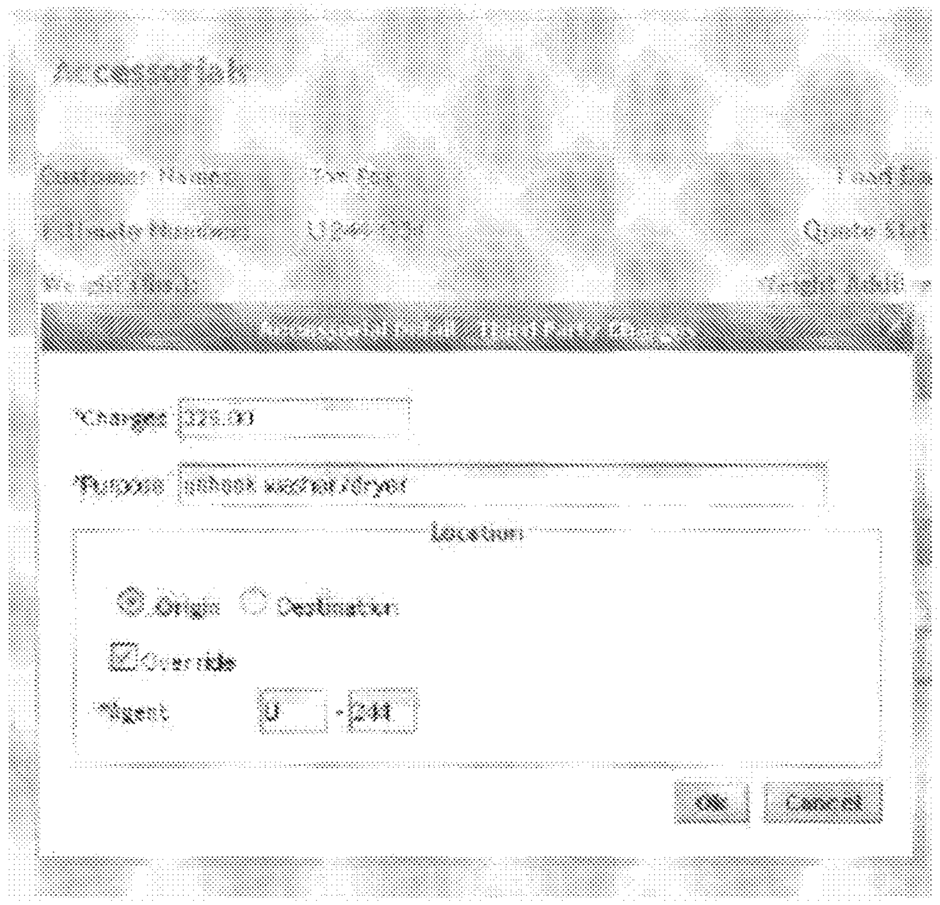

Enter the charge and purpose, then select whether the accessorial is associated with the Origin Agent or Destination Agent (see FIG. 194).

Override Option

When the Booker is also the Origin agent, the charges associated with Shuttle, Day Certain Load, Extra Labor, or Overtime Extra Labor on W and NW shipments can be overridden.

Valuation

Figure 195:

The next screen is valuation (see FIG. 195). You must visit the valuation screen on every quote.

Full-Value Protection

Figure 196:
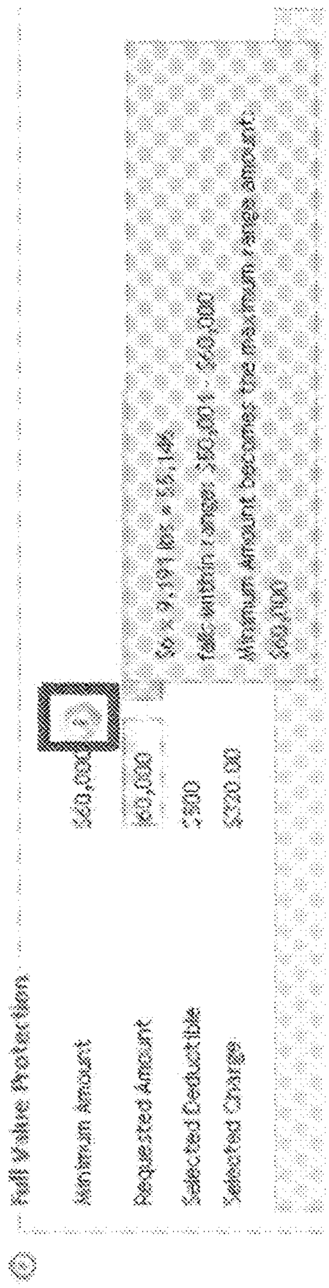

Full-Value Protection minimums are computed automatically from the Total Weight of the shipment shown on the survey page. The Valuation page defaults to show full value protection and a requested valuation amount equal to the minimum of the shipment weight (see FIG. 196).

To view how the minimum was computed, place the mouse pointer over the [i] information icon.

Figure 197:
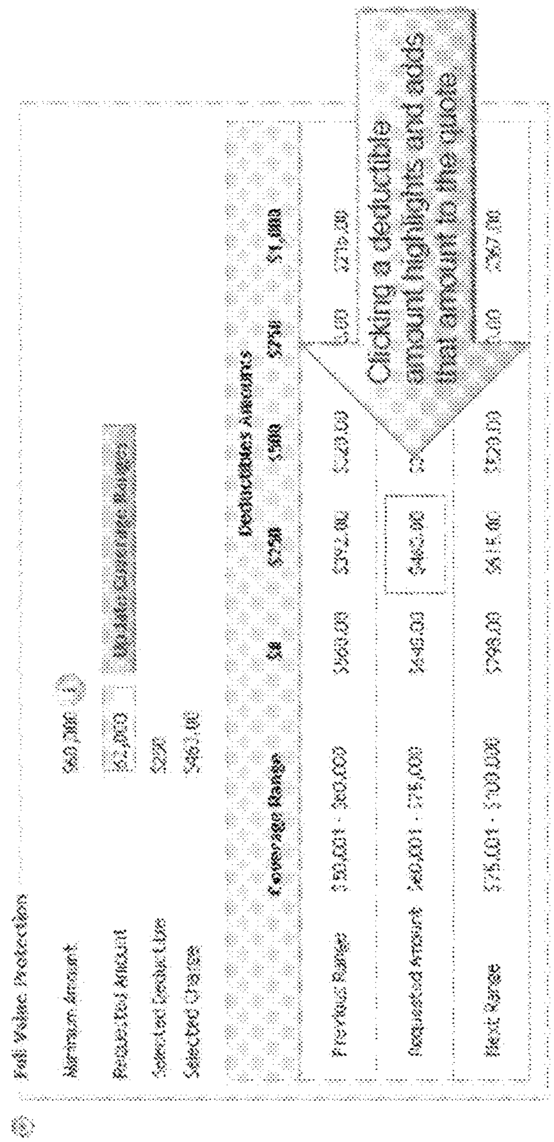

The system displays the cost of full-value protection at different deductible levels within the range, as well as the next range higher from the one requested. To select an amount in the range, use the pointer to click the desired deductible amount (see FIG. 197). The system highlights and updates the screen. Click the Save button to proceed. You can also type a new requested amount that differs from the minimum, and click Update Coverage Ranges to see the new Full-Value Protection charges.

Released Rate Liability

Figure 198:
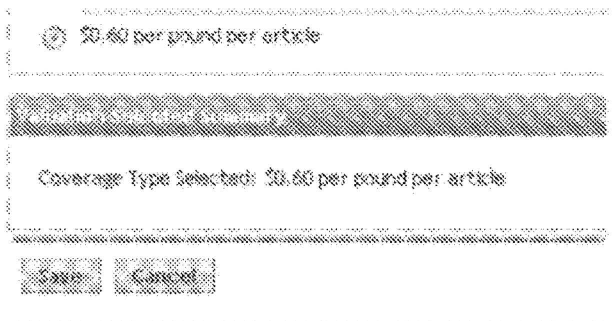

To Select $0.60 per pound per article instead of Full Value Protection, select the radio button (see FIG. 198).

Value Add Packages

Figure 199:
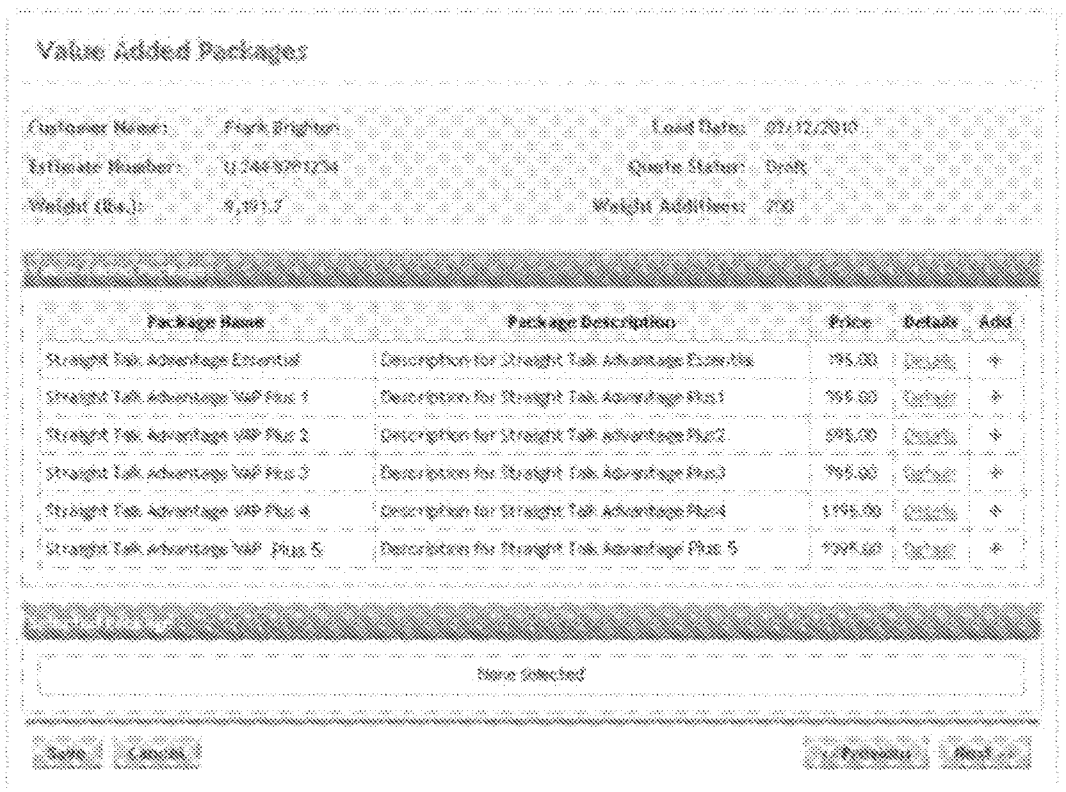

The Value Add Packages screen shows the available options for Straight Talk Advantage or On Point Preferred options (see FIG. 199). Click the Details link to see further information on what the package includes, or click the Add link to add these charges to the quote.

Storage

Figure 200:
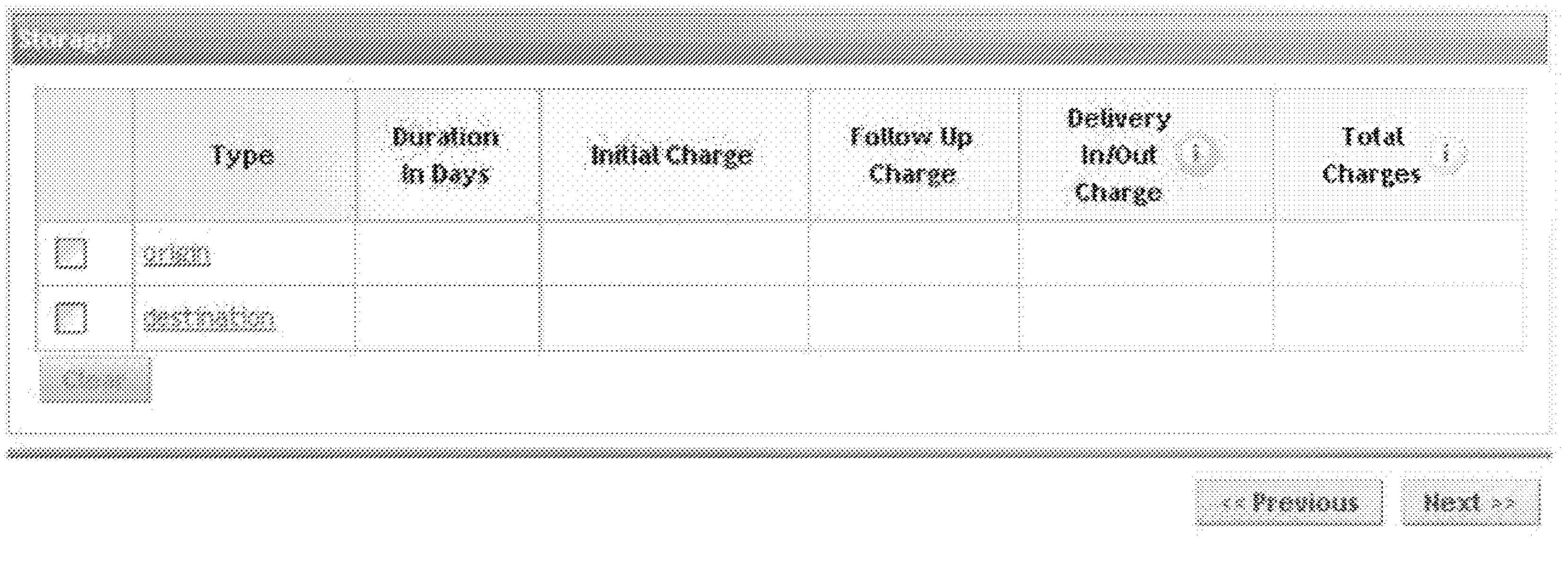

The Storage screen opens with a storage summary screen (see FIG. 200). Click either the origin or destination link to add storage charges.

Figure 201:
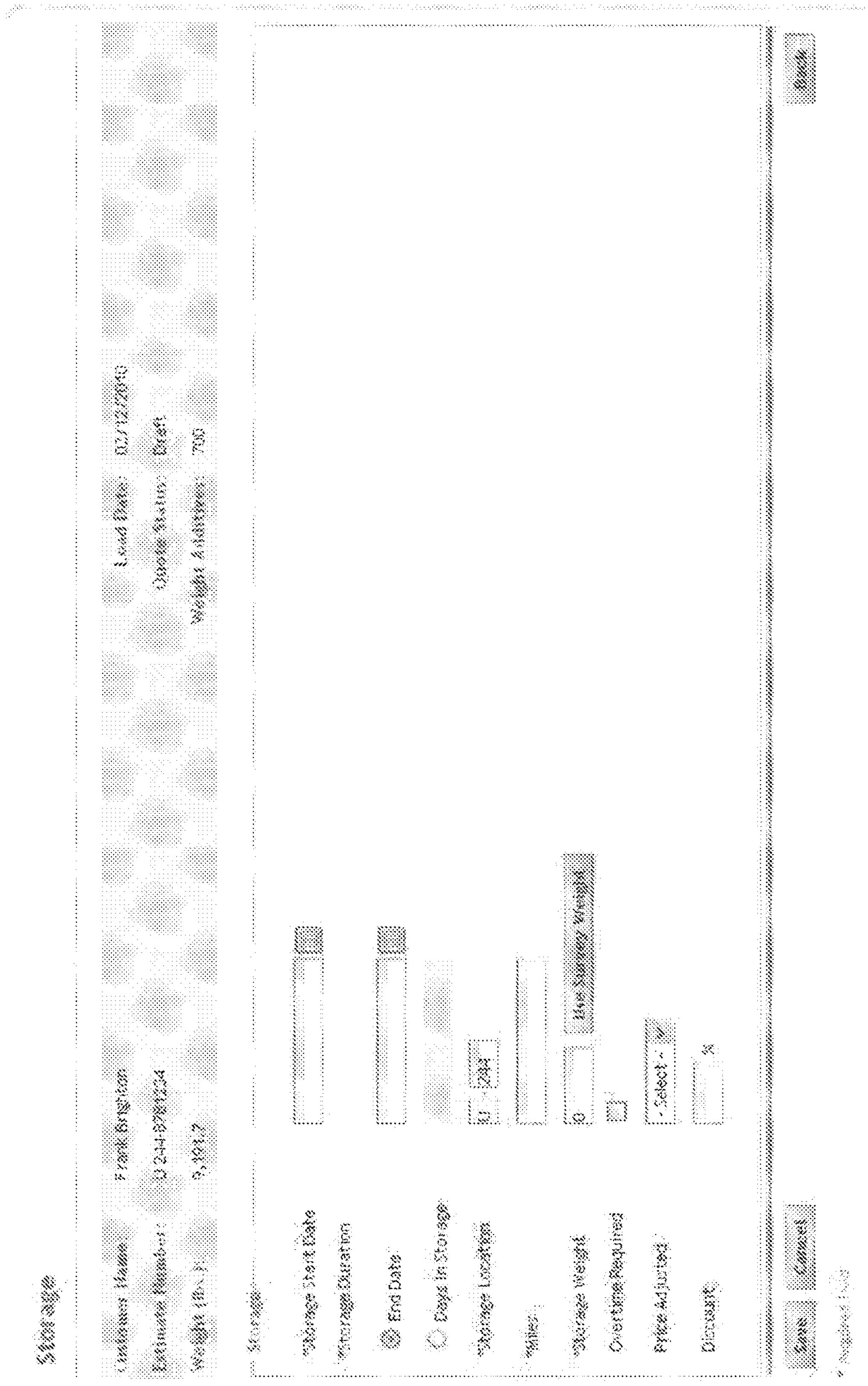

Use the calendar icon to select the storage start date (see FIG. 201).

Enter an End date, or select Days in Storage and enter the number of days.

Enter the agency number affiliated with the storage location, if not your own. Enter the number of drayage miles.

Enter the storage weight, or use the Use Survey Weight button to prompt the system to pull the survey weight for the entry.

Click the check box if overtime applies.

If an adjustment is needed, use the Price Adjusted drop down to indicate if the adjustment is up or down, then enter the adjustment percentage in the Discount field.

Once all information is entered, click Save.

Figure 202:
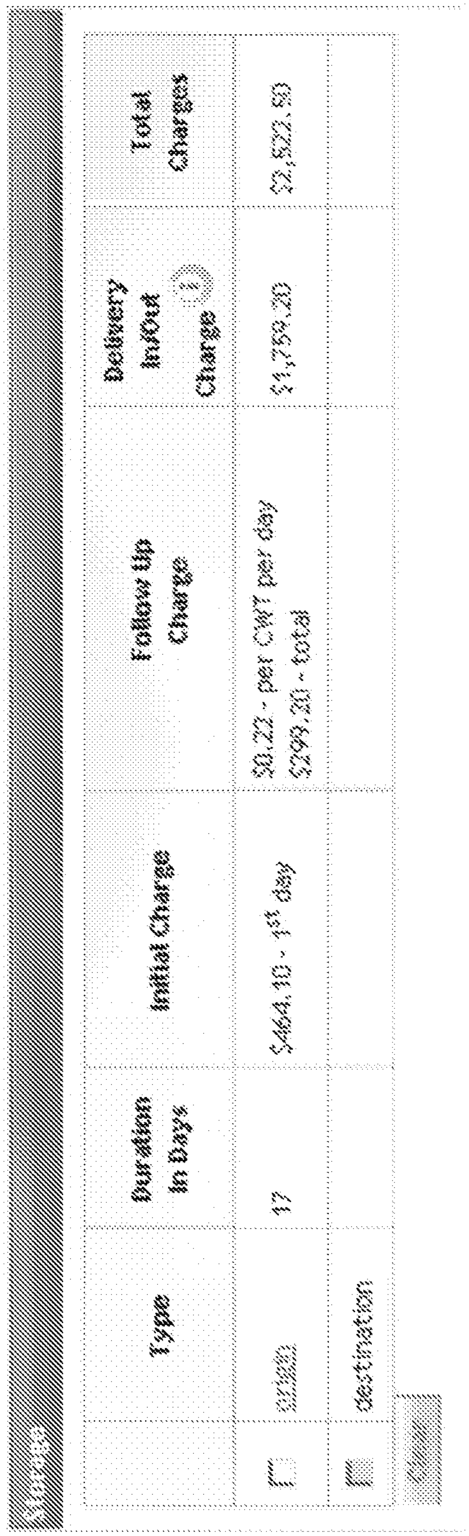

The storage summary displays the calculated rates (see FIG. 202). Changes to Valuation due to storage (Extended Valuation) are automatically included on the Pricing Summary screen.

Instructions

Figure 203:
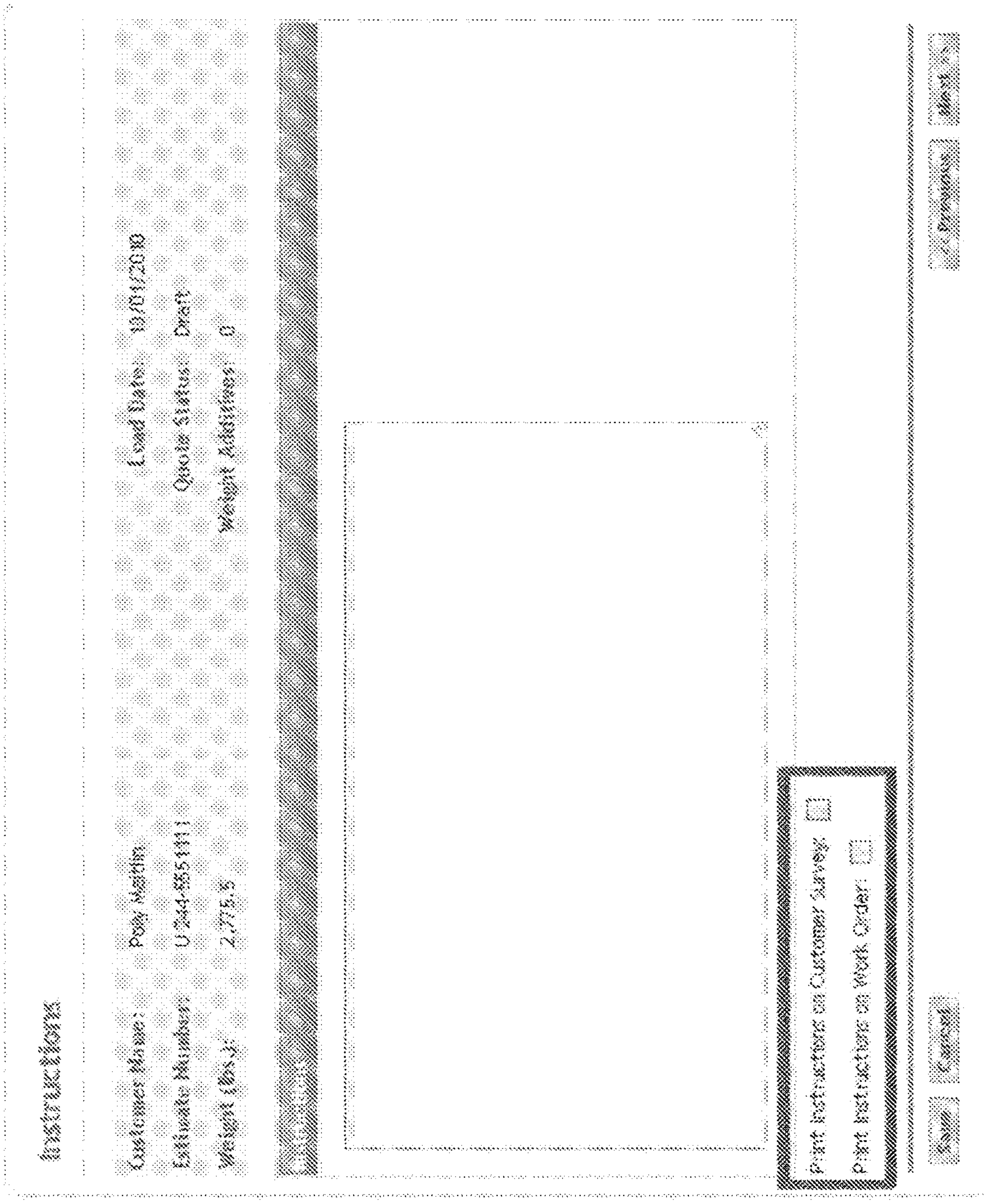

The Instructions screen allows you to enter free-form instructions on the quote (see FIG. 203). You can choose where the instructions print: On the Survey, or on an internal Work Order. The work order document produces a slim version of the estimate that shows the crew all key dates and weights, carton counts, and instructions. To access the document, select Work Order from the Summary screen.

Summary

Figure 204:
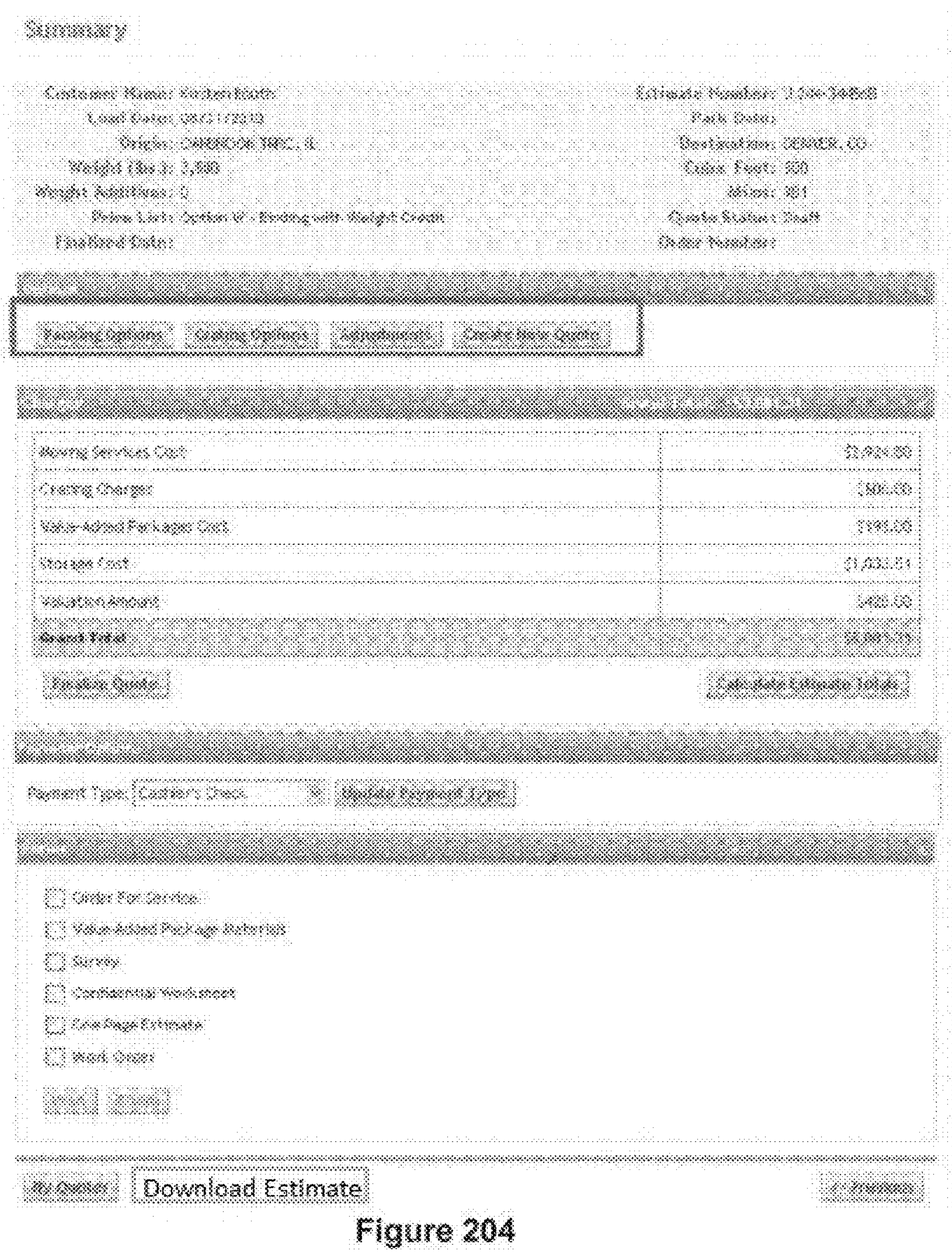

The Summary screen displays the customer price based on the options selected (see FIG. 204). Click Calculate Estimate Total to update the pricing.

Summary

From the pricing summary page, there are also several other options available:

Packing Options

Crating Options

Adjustments

Create a New Quote (or Copy Quote)

Packing Options

Pricing

Figure 205:
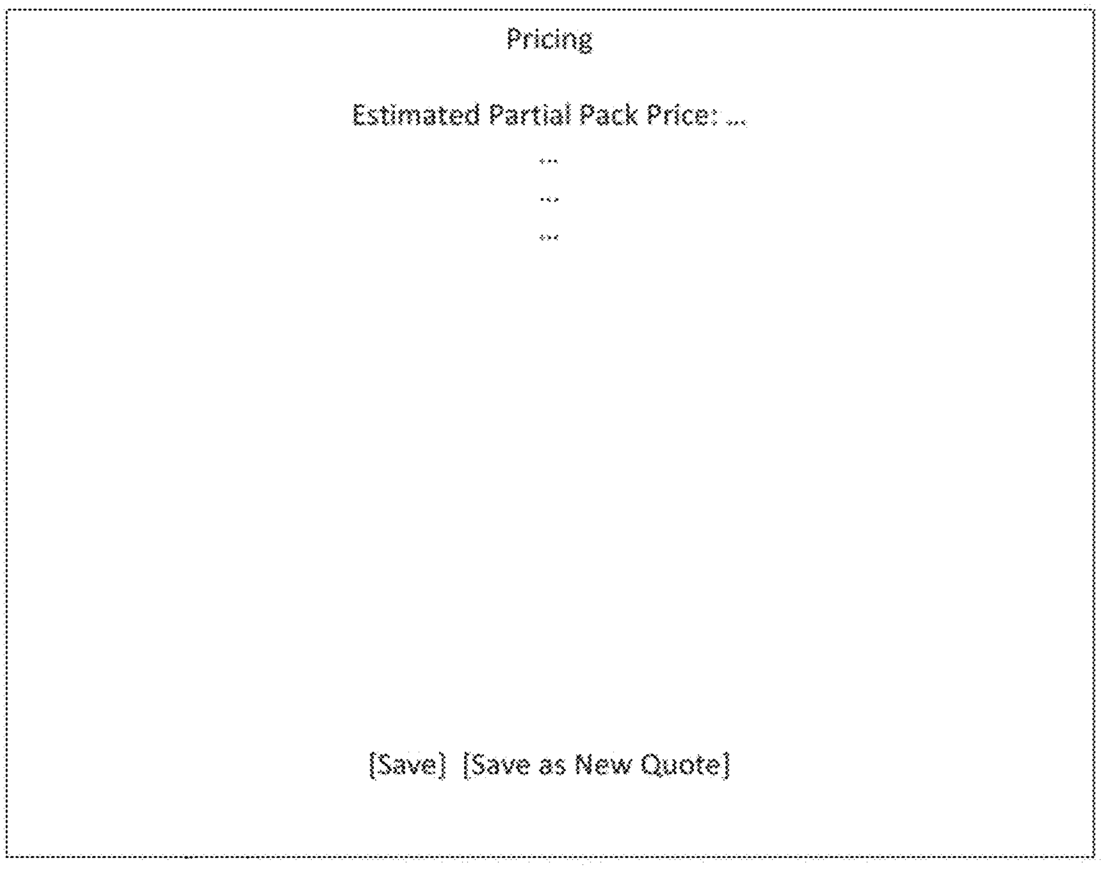

The estimated partial pack price displays at the top of the packing summary screen (see FIG. 205). You can easily create a new quote with different packing options from this screen. To compare your current partial pack quote to a full pack quote, click the check box of the Override option for the full pack rates then click Save as New Quote.

Packing Summary

In the Packing Summary area, you can change the carton options entered in the survey, from carrier pack to pack by owner, or vice versa. Click the blue bar to expand each packing section. Use the drop down boxes to change the number of cartons in the Carrier Pack or Pack By Owner columns. For any PBO item, click the Carton Only Charges check box to allow carton only charges to be applied for that item. You can also easily change the pack/unpack options from the packing summary screen. Click the Save as New Quote button.

Figure 206:
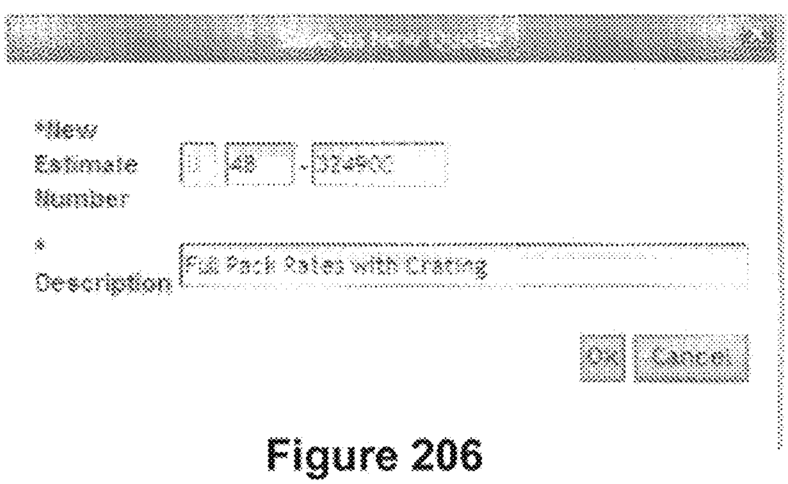

Enter a new estimate number and description and click Ok (see FIG. 206).

Figure 207:
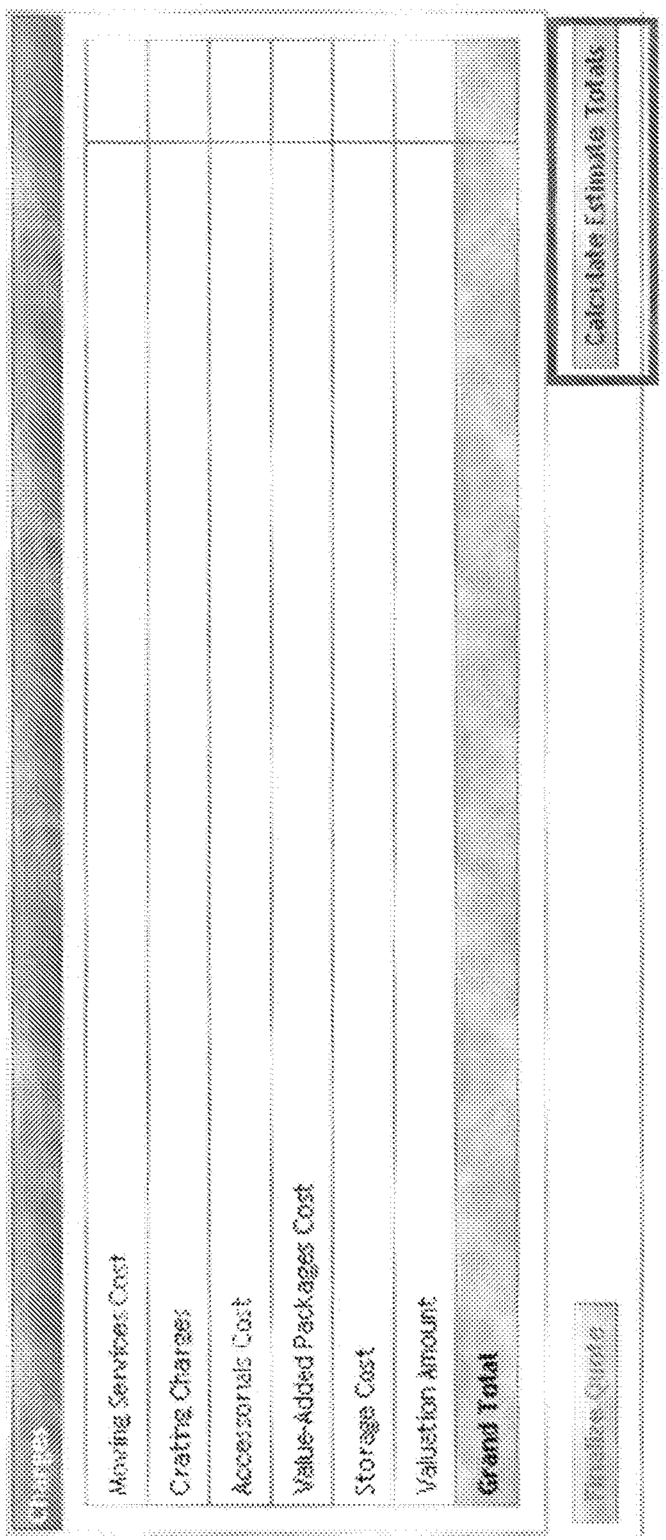
Figure 208:
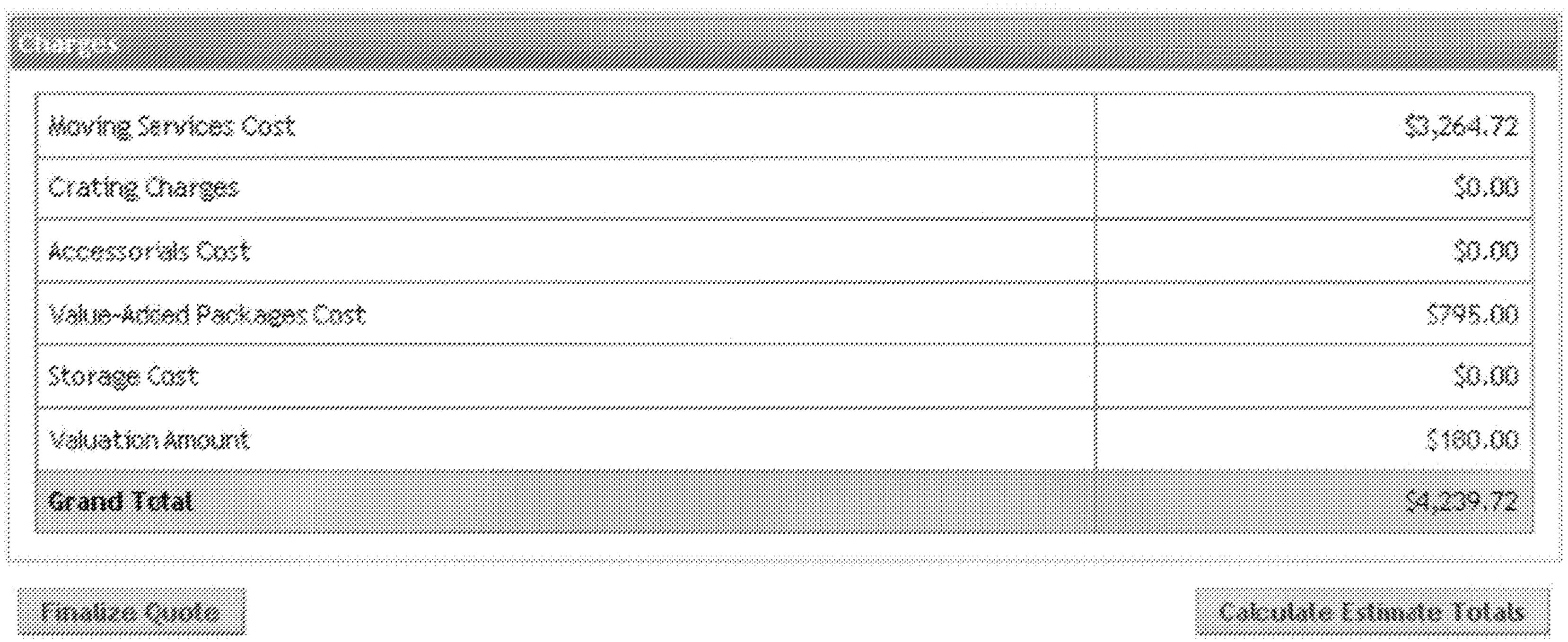

Click Calculate Estimate Totals (see FIG. 207) and your new price displays (see FIG. 208).

Adjustments

Non Binding Option A

Figure 209:
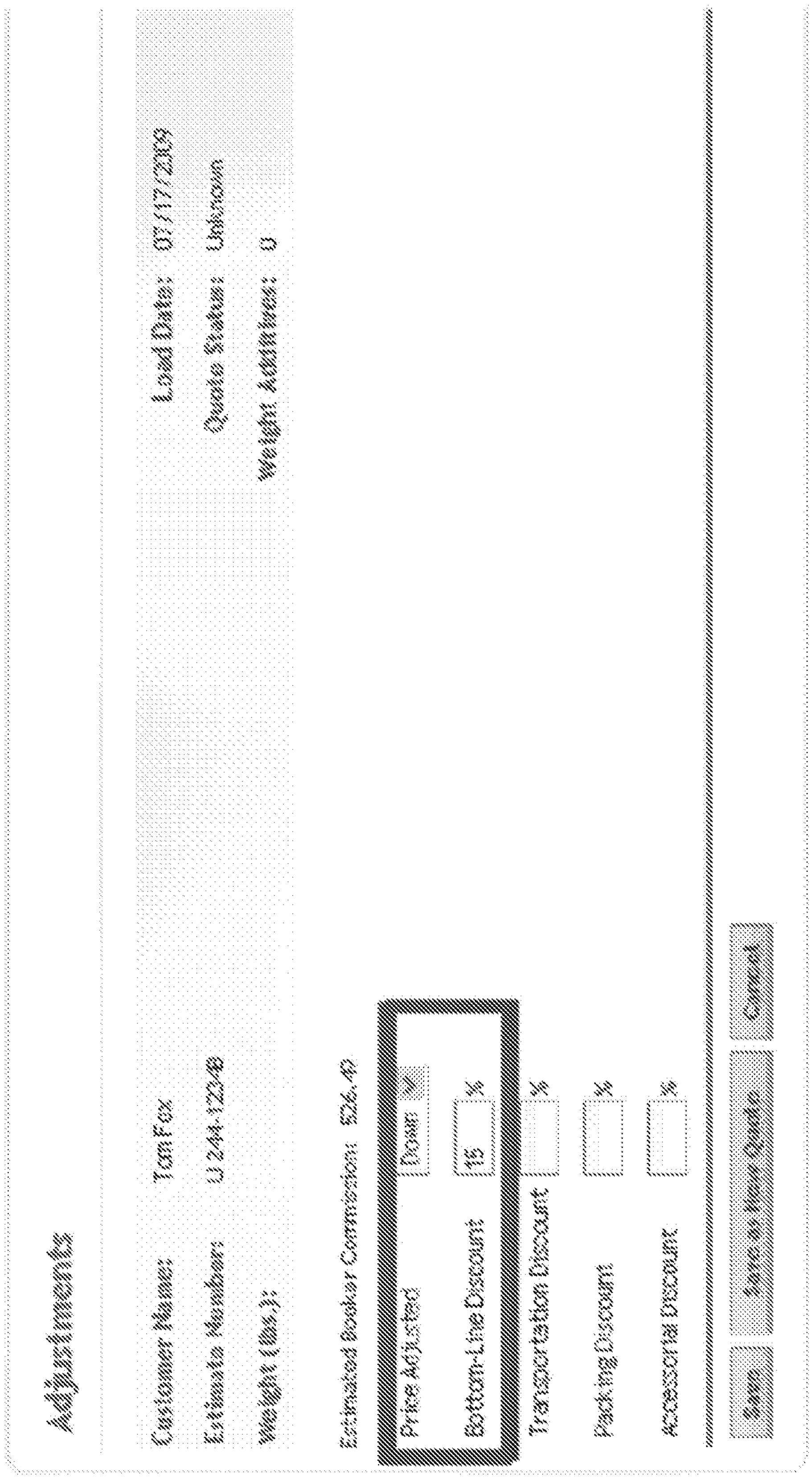

The Adjustments button allows the addition of a section discount for Non Binding Option A (see FIG. 209).

Binding Options W and NW

You can view the estimated booker commission from the Adjustments screen.

Figure 210:
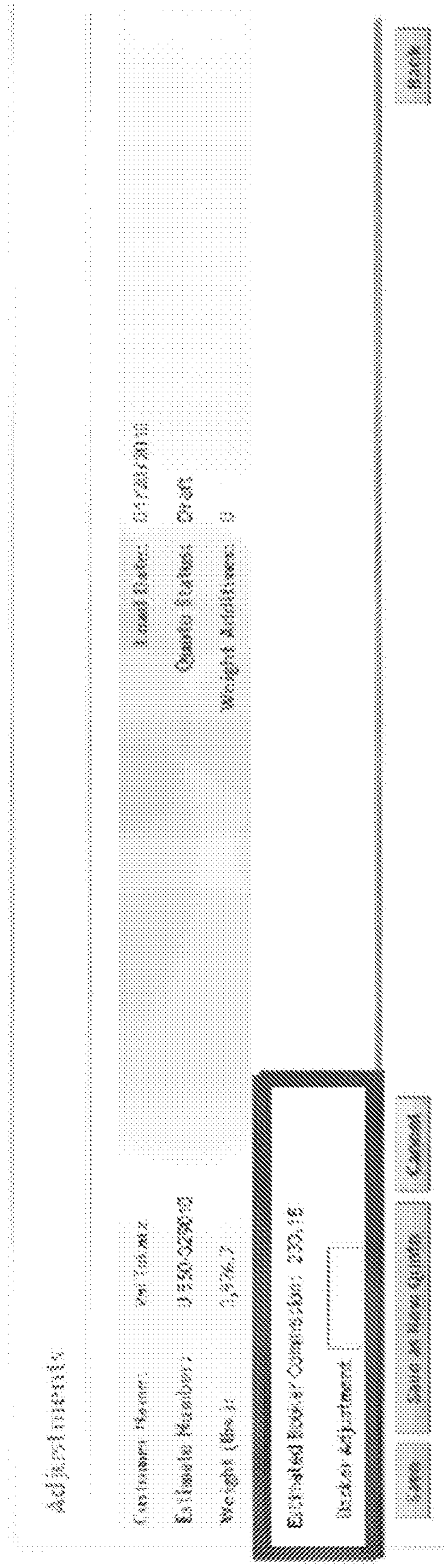

The Adjustments button allows the addition of Booker Adjustment for Binding Options W and NW (see FIG. 210).

Crating Options

Figure 211:
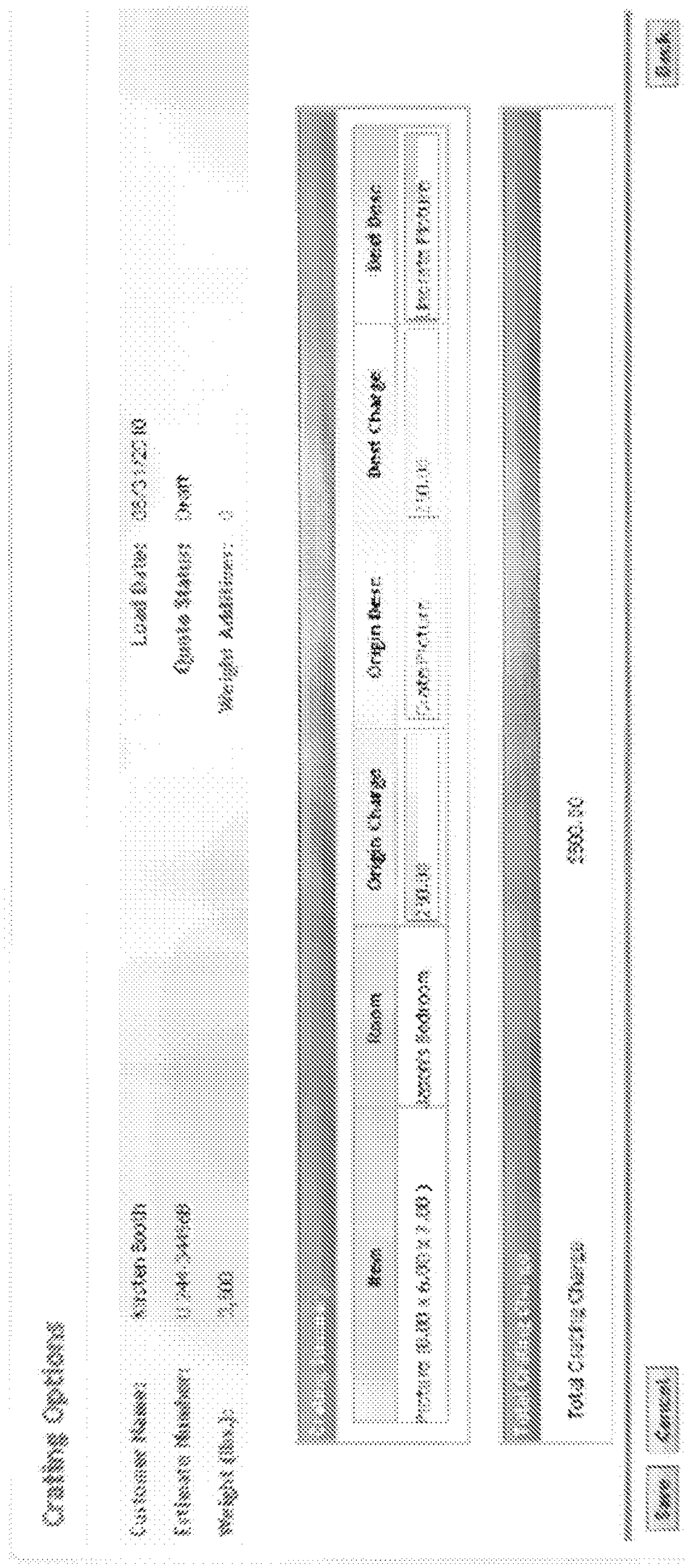

Enter the third party crating charges on the Crating Options screen (see FIG. 211).

Copying Quotes

Figure 212:
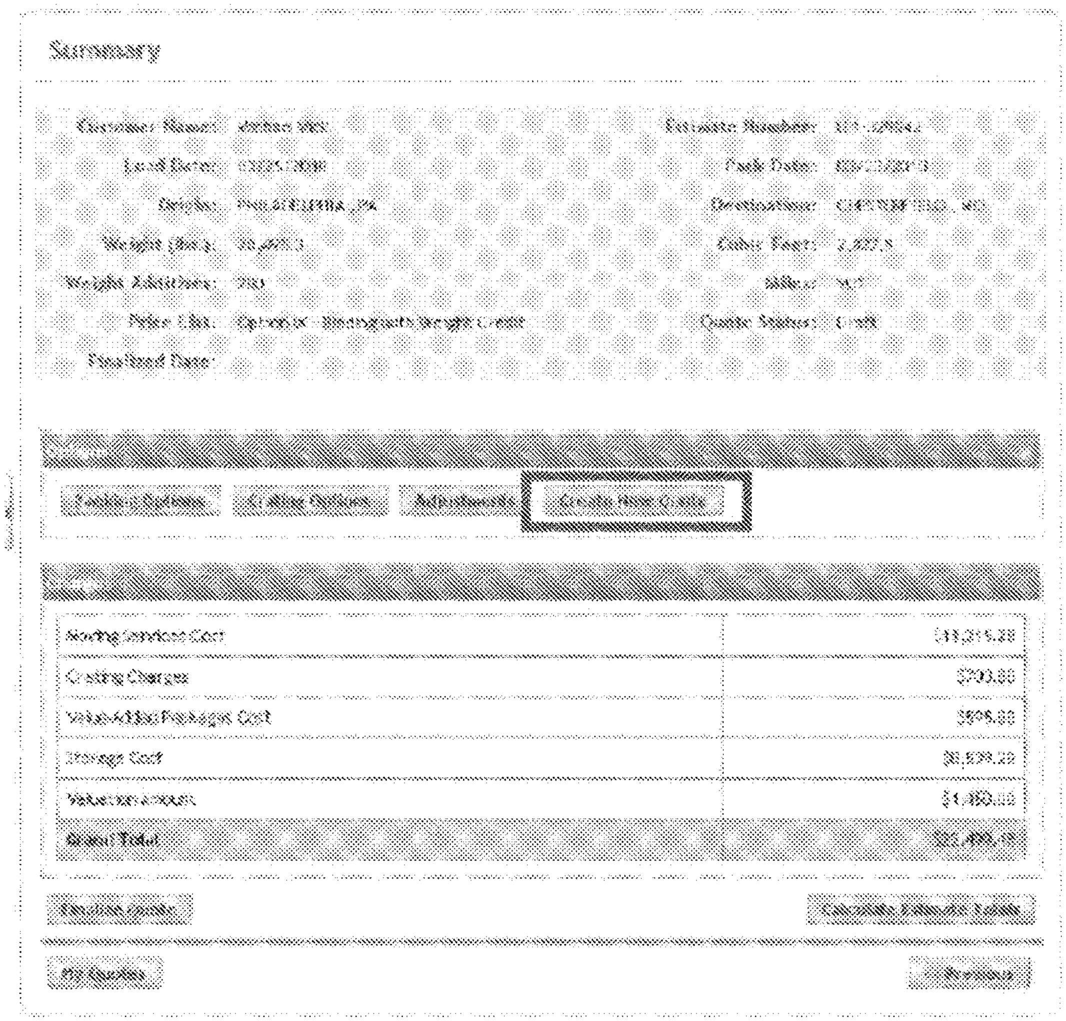
Figure 213:
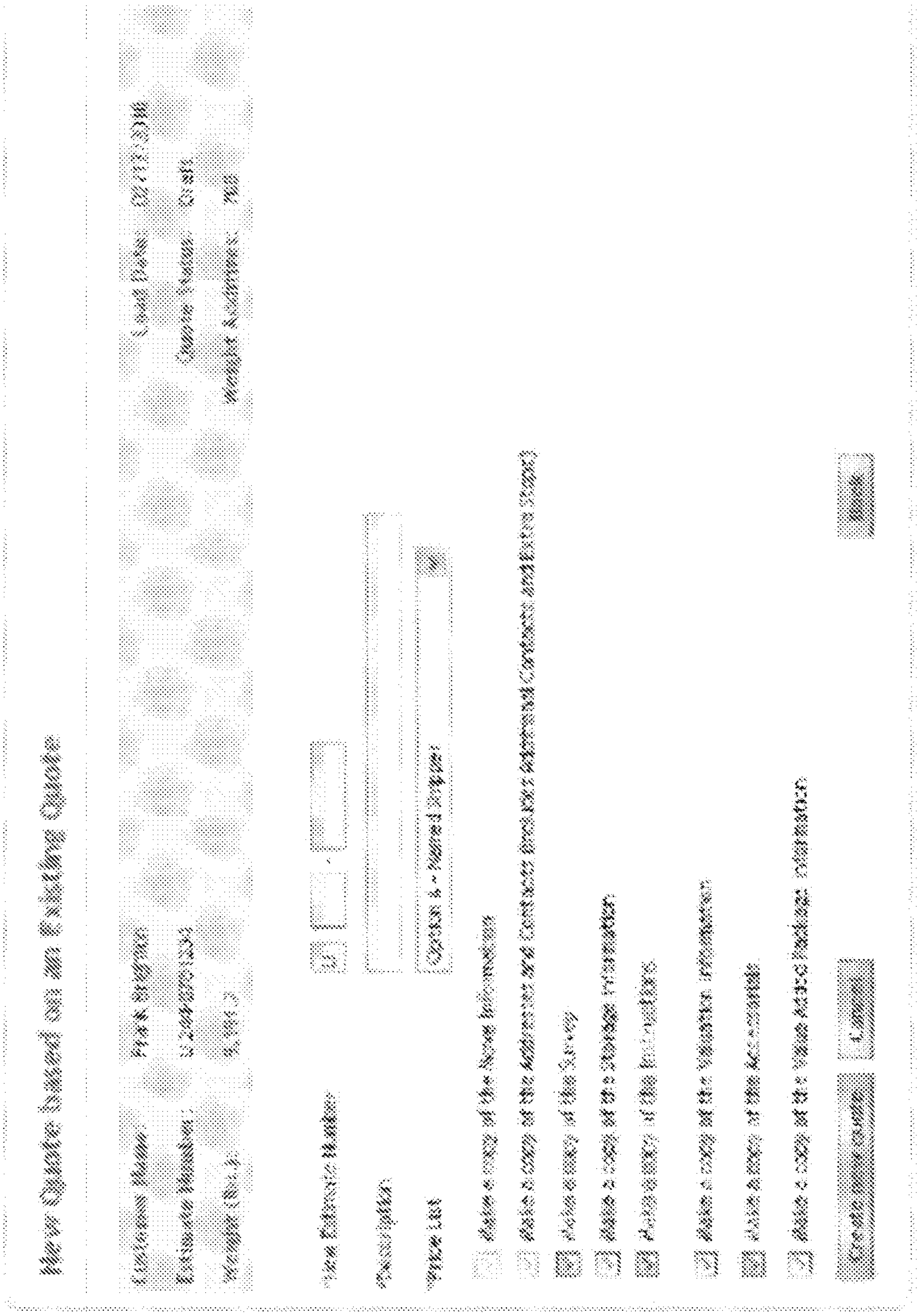

Use the Create New Quote button to copy the existing quote to create a new quote (see FIG. 212). This provides the customer with a variety of estimate options (see FIG. 213).

All items are selected to be copied to the new quote. De-Select any areas you do not want to copy and click the Create new quote button. You can then access and edit the new estimate to provide pricing for a different scenario.

OR

Figure 214:
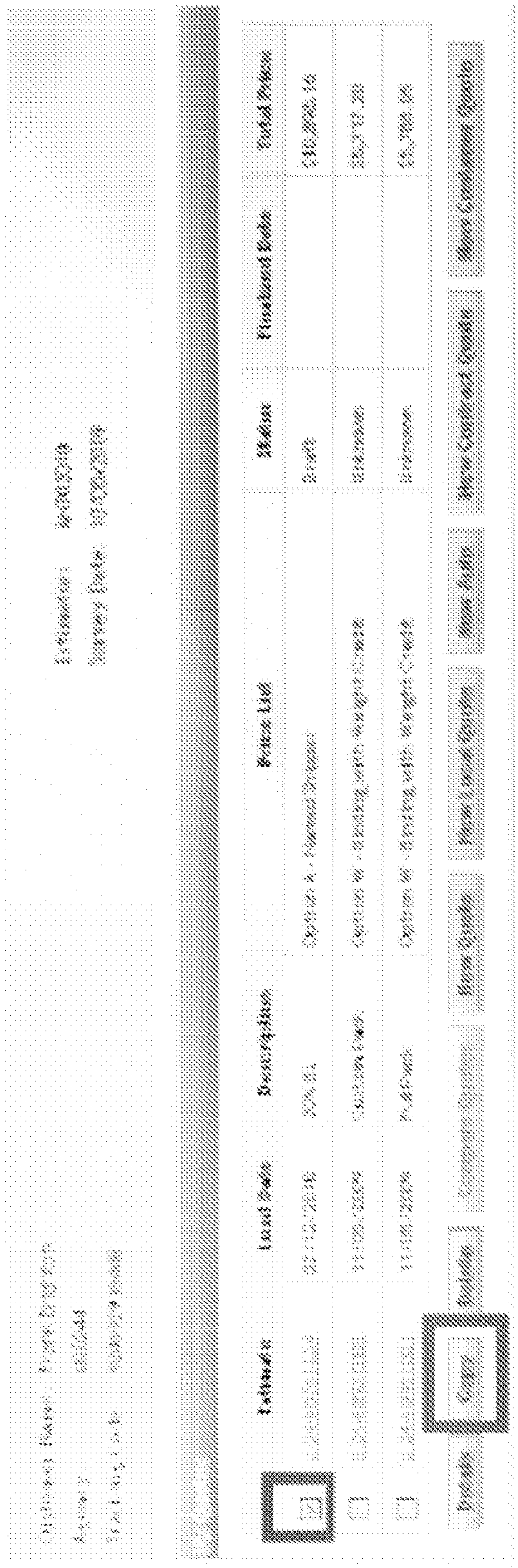

You can also copy an existing quote from the My Quotes screen (see FIG. 214).

A new quote can also be easily created from the Packing Options button on the Summary screen.

Comparing Quotes

Figure 215:
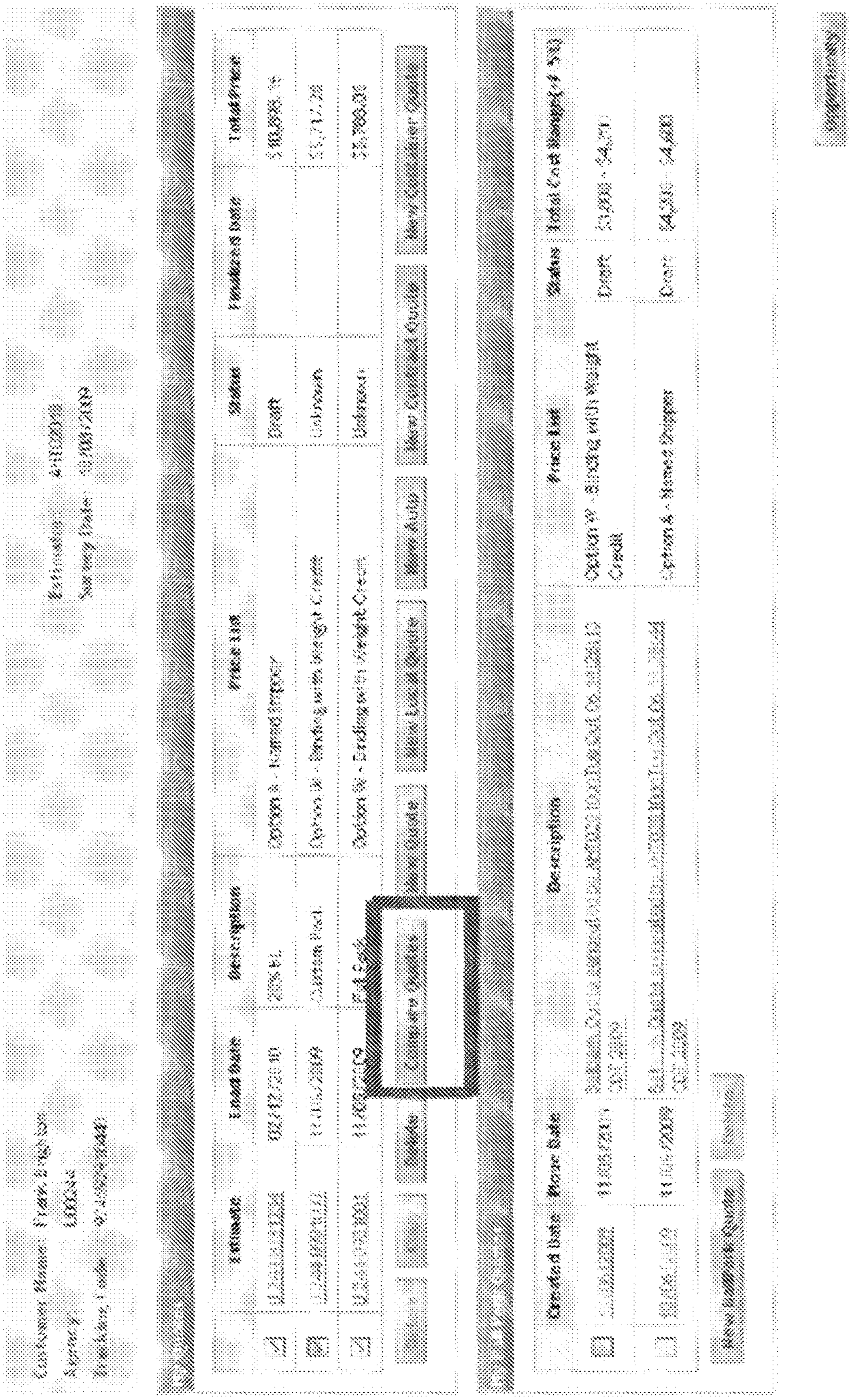

A unique feature available in Quotes-To-Go is the ability to compare quotes. To compare quotes, go to the My Quotes screen and select the check boxes to the left of the quotes to be compared. Click Compare Quotes (see FIG. 215).

Figure 216:
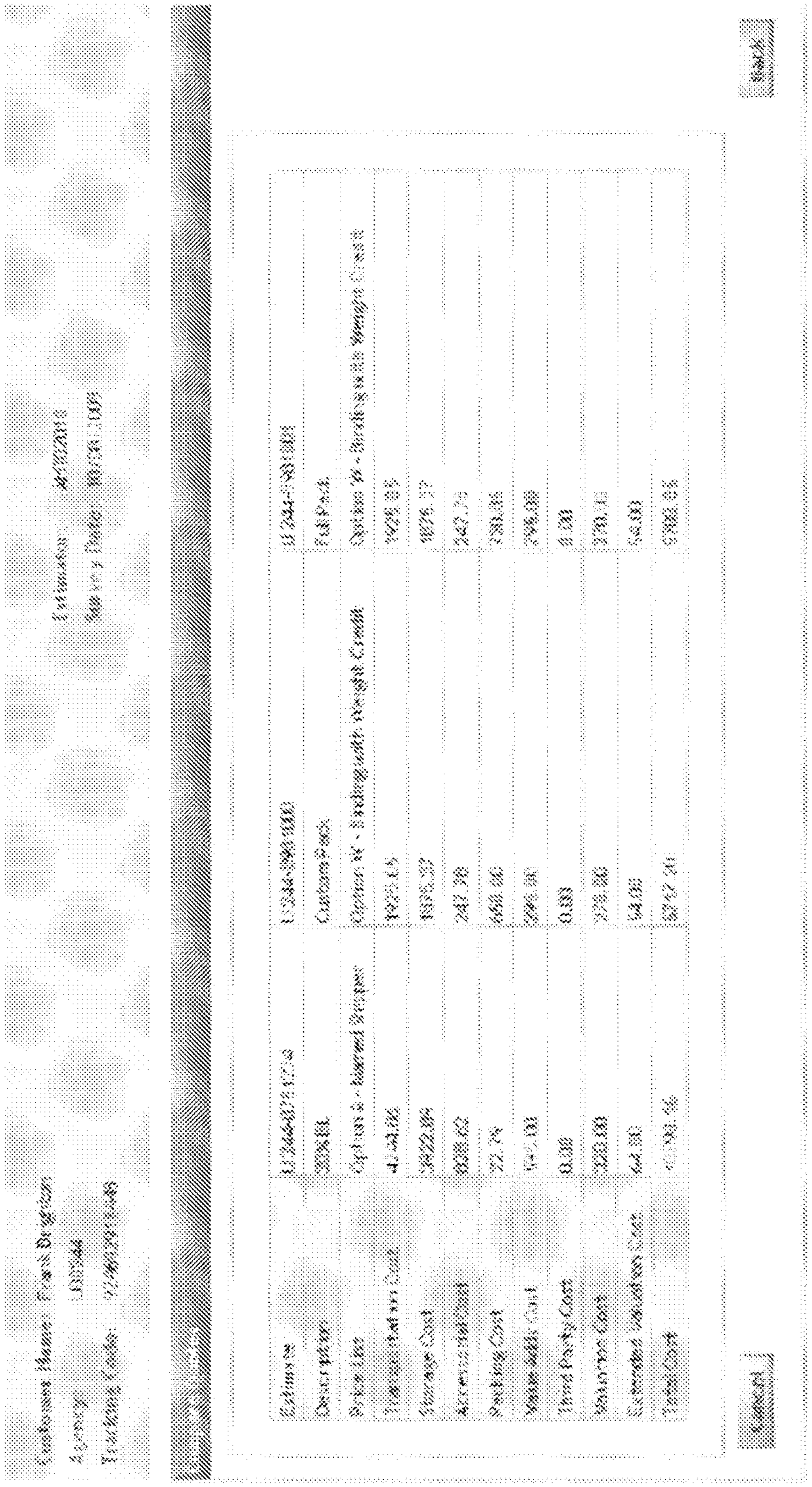

A side-by-side comparison of the selected quotes displays (see FIG. 216). Press Ctrl/P on your keyboard to print the screen. You can turn your tablet PC toward the customer and show the cost differences. This can eliminate excess printing. No other van line offers this functionality.

Forms

Getting to the Forms Page

Figure 217:
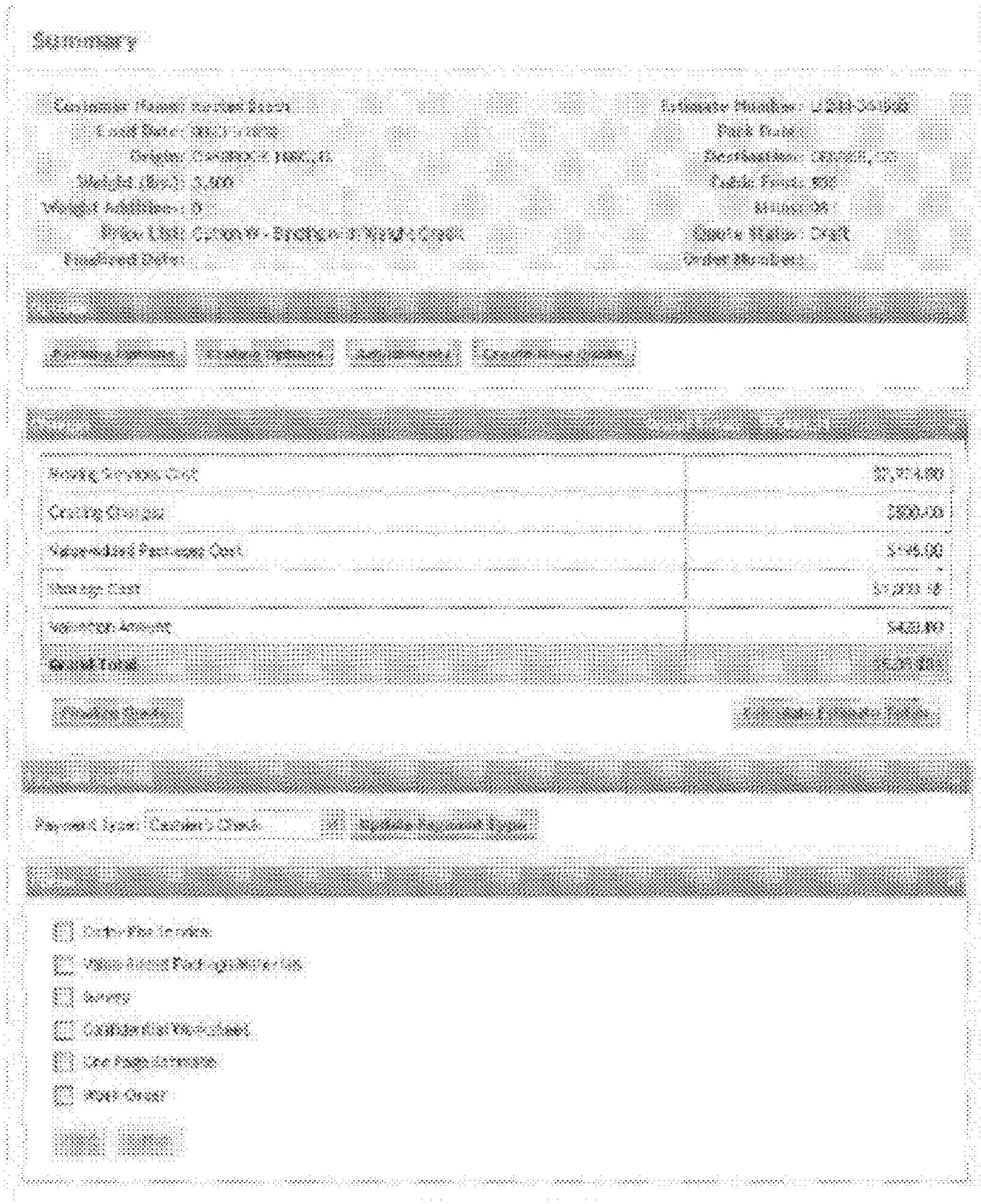

Quotes can be in either a Draft or Finalized Status. While a quote is in Draft status it can be edited. When a quote is in draft state, you must click the Calculate Estimate Totals button on the Summary page after making any changes to the quote (see FIG. 217).

Set the Payment Type option to print the correct payment type on the forms. Select the type from the drop down list and click Update Payment Type. The payment type select here defaults on the Send eAcceptance screen.

Once estimate totals are calculated, forms are available on the Summary screen and can be printed or e-mailed. If the forms check boxes are not displayed on the screen, click the Forms blue header to toggle open the Forms area.

Forms Available

These forms are available:

One Page Estimate

Estimate/Order for Service

Value Add Amendments (if Value Add package is selected)

Survey (also known as the Table of Measurements or printed cube sheet)

Confidential Worksheet (Available for Options W and NW)

Work Order (internal form for pack crew and van operator)

These forms can be printed and/or e-mailed to customer, except for the confidential worksheet.

PLEASE NOTE THAT THE ONE PAGE ESTIMATE IS ONLY A QUOTE. BOTH THE ONE PAGE ESTIMATE AND THE ESTIMATE ORDER FOR SERVICE MUST BE PRESENTED TO THE CUSTOMER FOR SIGNATURES. THESE FORMS MUST ALSO BE SCANNED INTO TRANSDOCS.

Printing Forms

Figure 218:
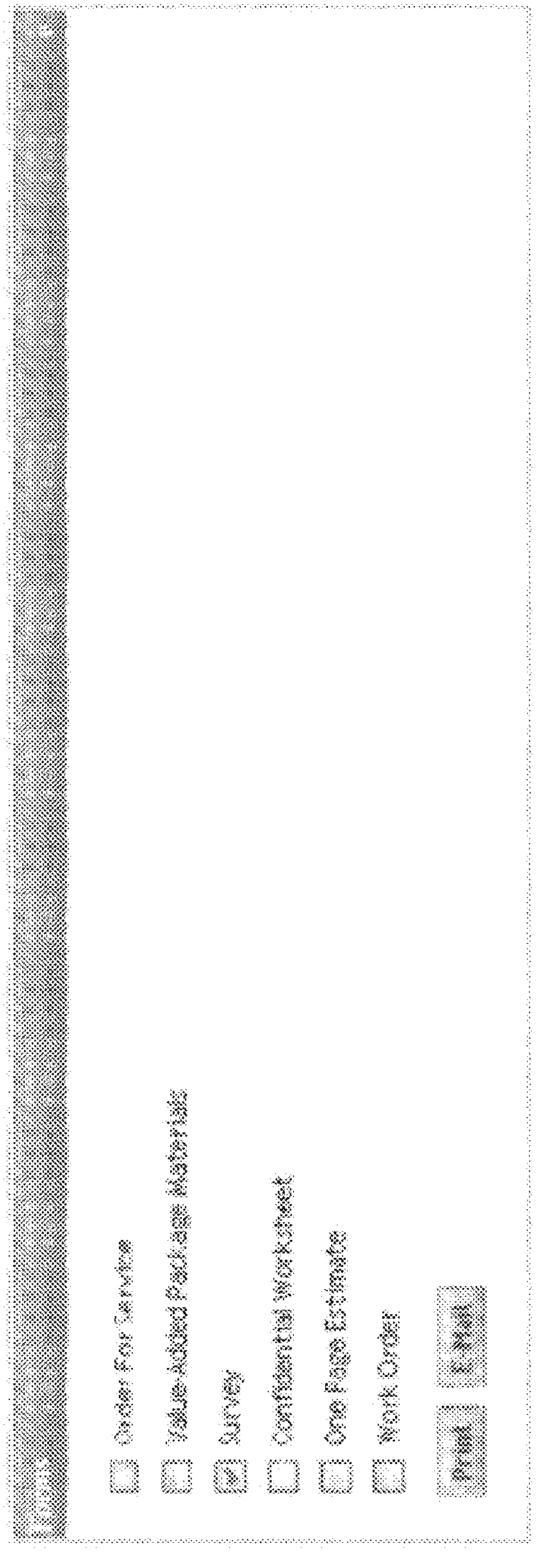
Figure 219:
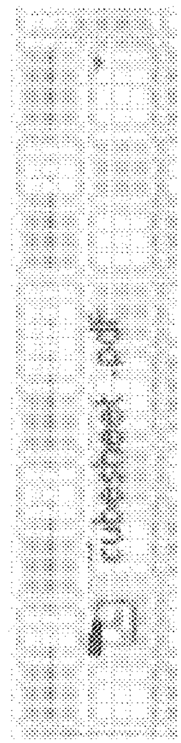

Select the check box to the left of a document, and click the Print button (see FIG. 218). The form displays in Adobe PDF. Click to launch the form (see FIG. 219). Use the printer associated with your device to print the form.

e-Mailing Forms

Select a document (or documents), and click E-Mail button.

Figure 220:
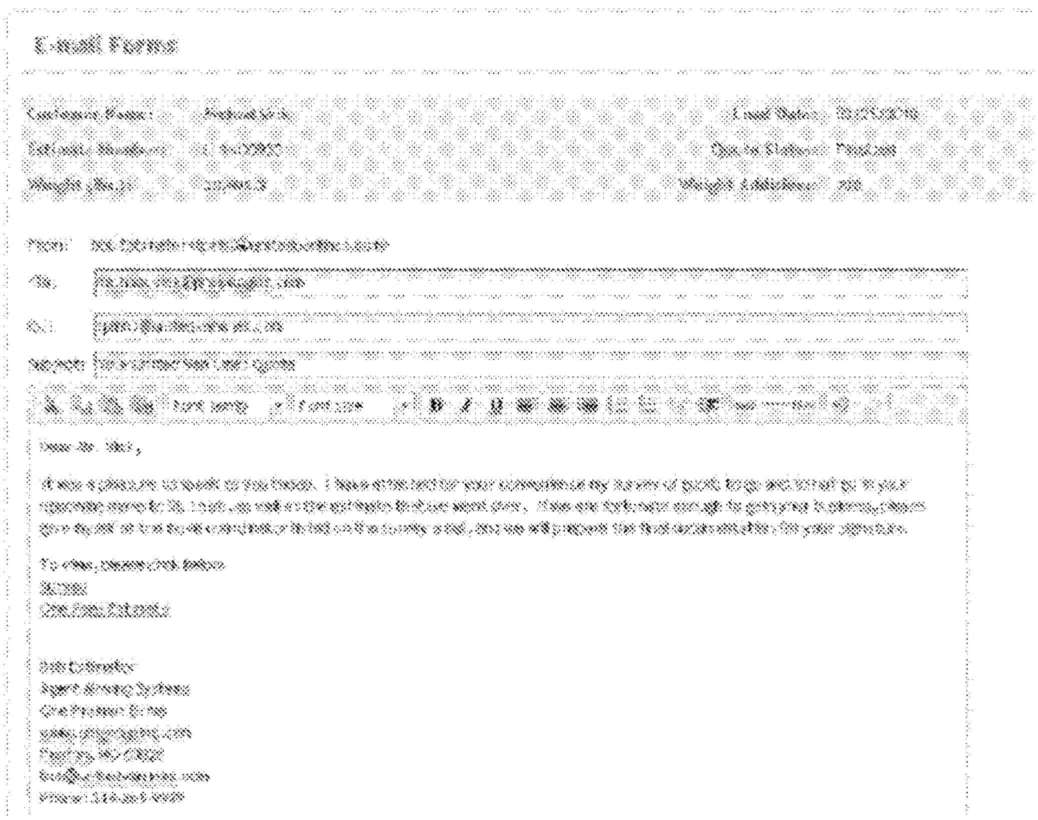

A pre-addressed e-mail to the customer displays containing links to the selected forms (see FIG. 220). You can add an additional message in the body of the e-mail. Any information you set-up in My Info section displays in the signature area. To send to multiple e-mail addresses, use a comma to separate each individual e-mail address.

Interstate Quote Download Button

Figure 221:
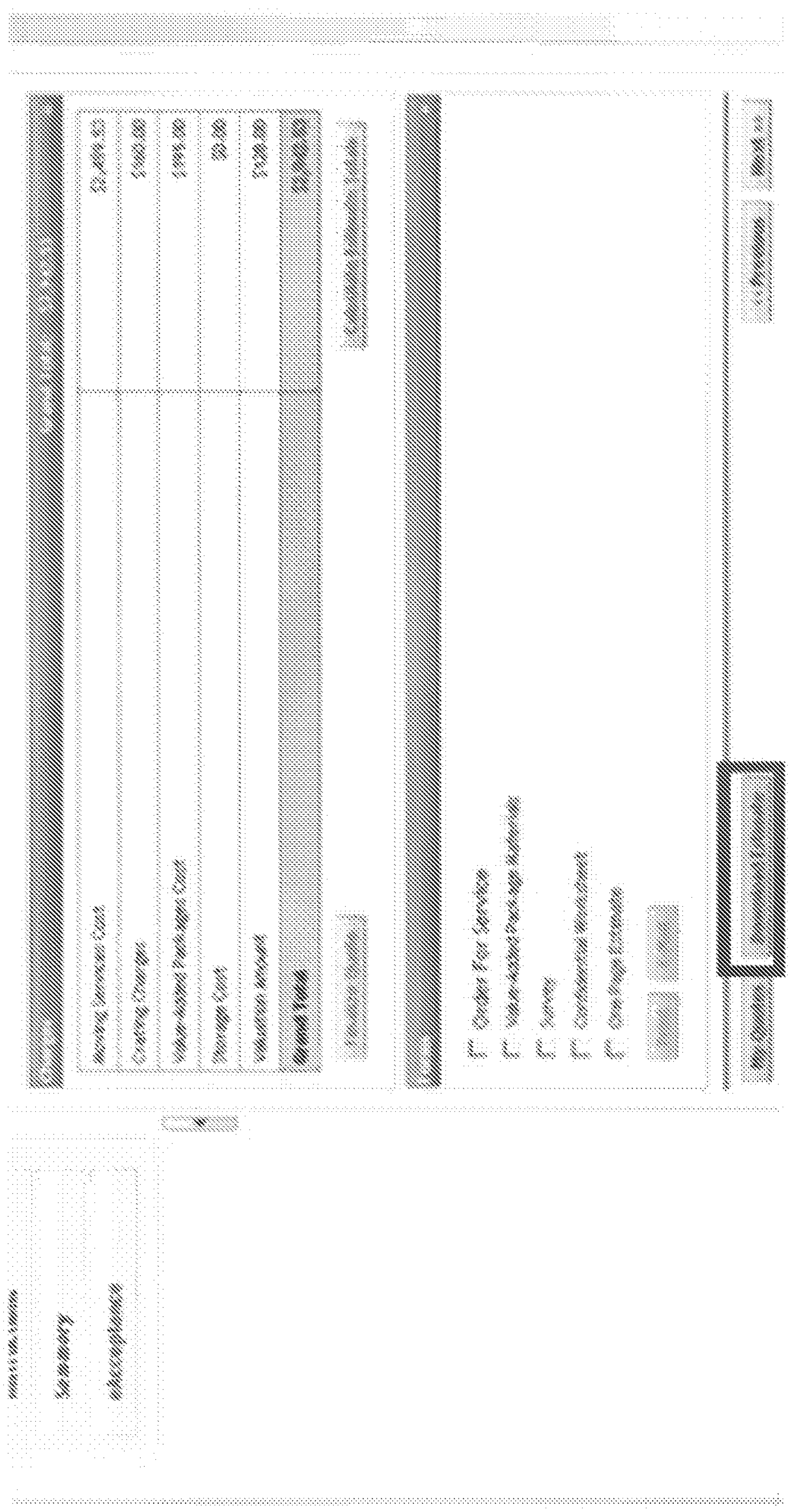

If your agency uses our vendor interface systems, once the survey is uploaded to obtain pricing, a button to download interstate estimates appears on the Summary screen (see FIG. 221).

This button performs the same option that is currently available in the mainframe PRIC system under Option 1 SEND RATING INFO.

Finalizing the Quote

Figure 222:
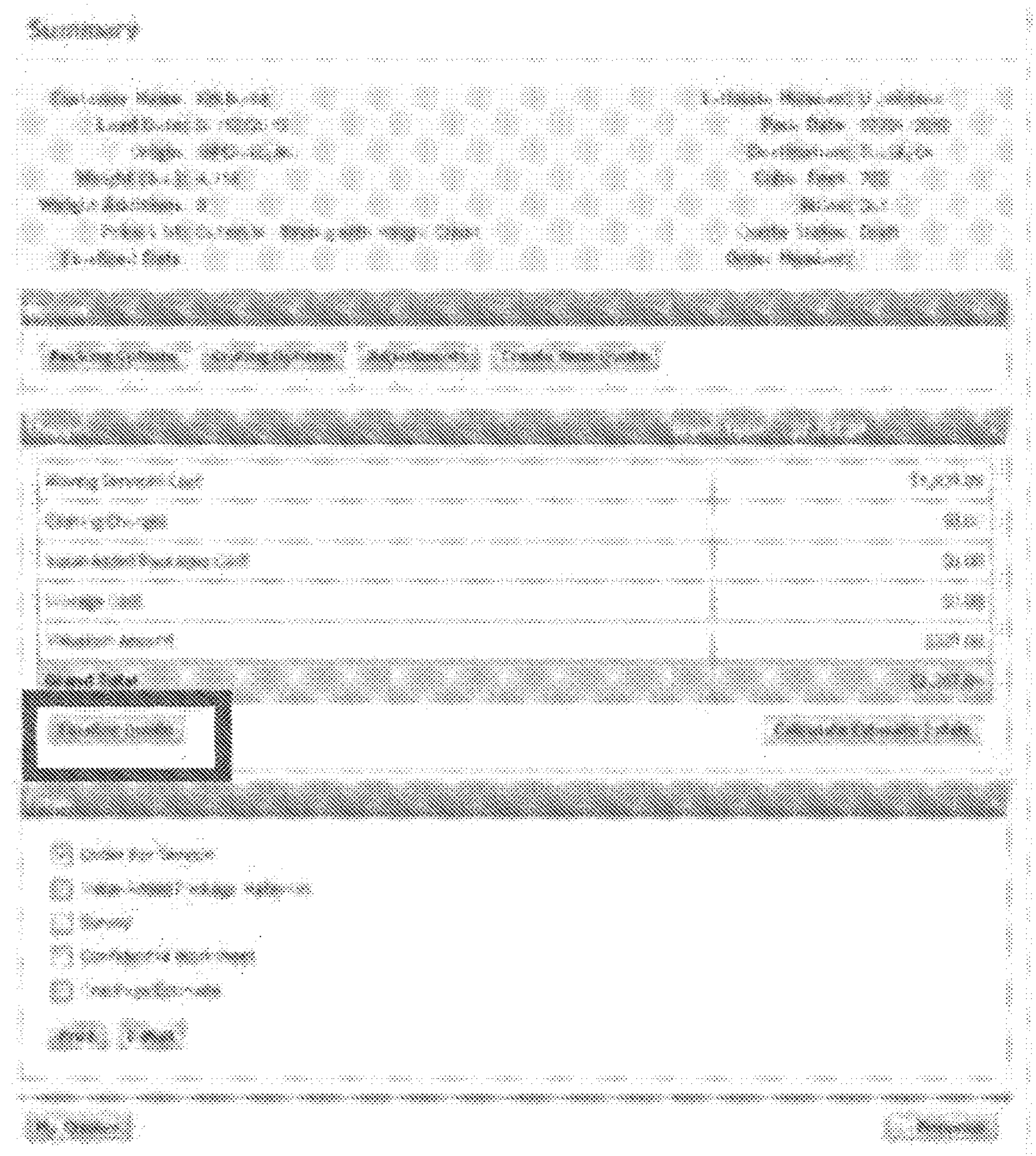

To finalize a quote, click the Finalize Quote button on the Summary page (see FIG. 222). A quote must be finalized to activate the eAcceptance button. If you use the traditional white paper forms for customer signatures instead of eAcceptance, the forms are available for printing without finalizing the quote. However, be sure to finalize the quote in Quotes-To-Go before you register the order in RORD.

Change a Finalized Quote

Figure 223:
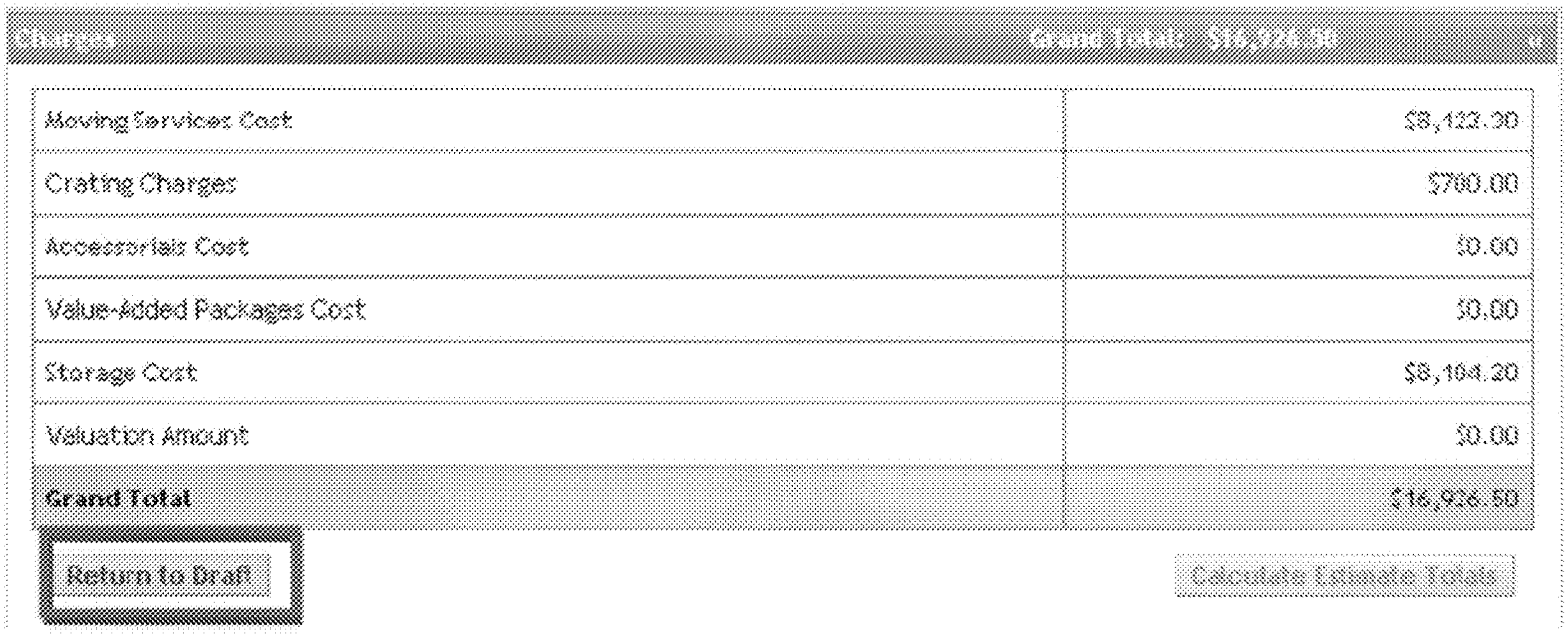

An estimate can be changed after it has been "Finalized," sent for eAcceptance, or Registered. To change the estimate, visit the summary page and click the Return to Draft button (see FIG. 223).

If there is an existing eAcceptance it will be cancelled, whether it has been accepted by the customer, or not.

After making the changes to the estimate, it should be re-finalized. New eAcceptance packets should be sent, or new documents should be printed and delivered to the customer.

Figure 224:
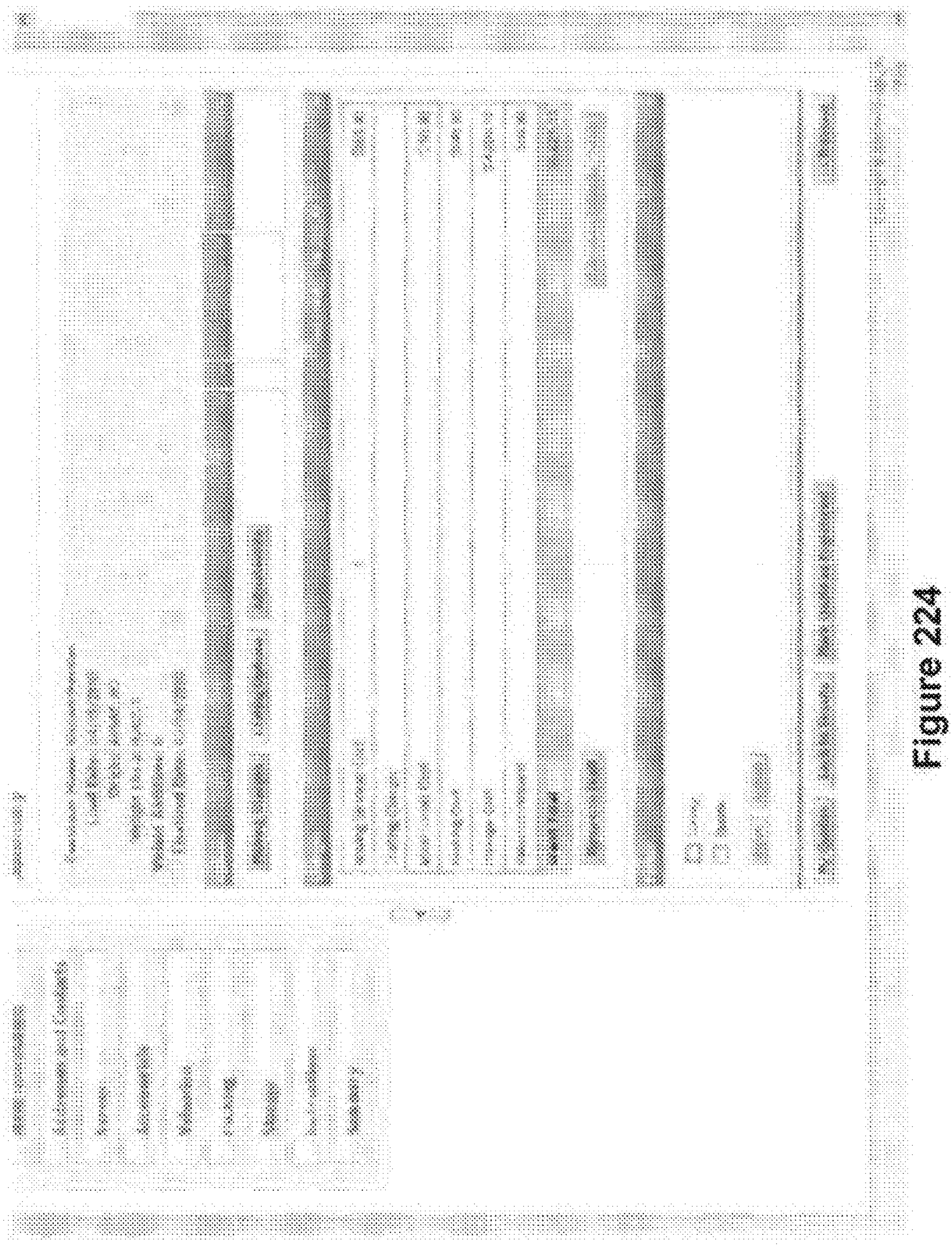

If the order has been previously registered, it will need to be changed in the order registration system (RORD), as well. Quotes-To-Go will not automatically update the order. For interstate orders, when the order is updated in RORD, the estimate will be returned to a Registered Status. For Local/Intrastate Quotes, click the Mark as Registered button to return the quote to registered status after making changes (see FIG. 224).

eAcceptance

Sending the eAcceptance Documents

After a customer indicates they are ready to move forward with an interstate residential move and the quote is finalized, the combined Order For Service/Bill of Lading, One Page Estimate, and Survey (Cube sheet) can be delivered for eAcceptance.

Figure 225:
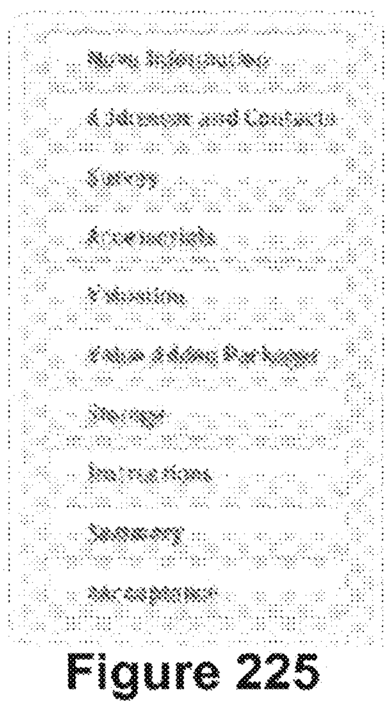

Select the eAcceptance button on the left-hand menu (see FIG. 225).

Figure 226:
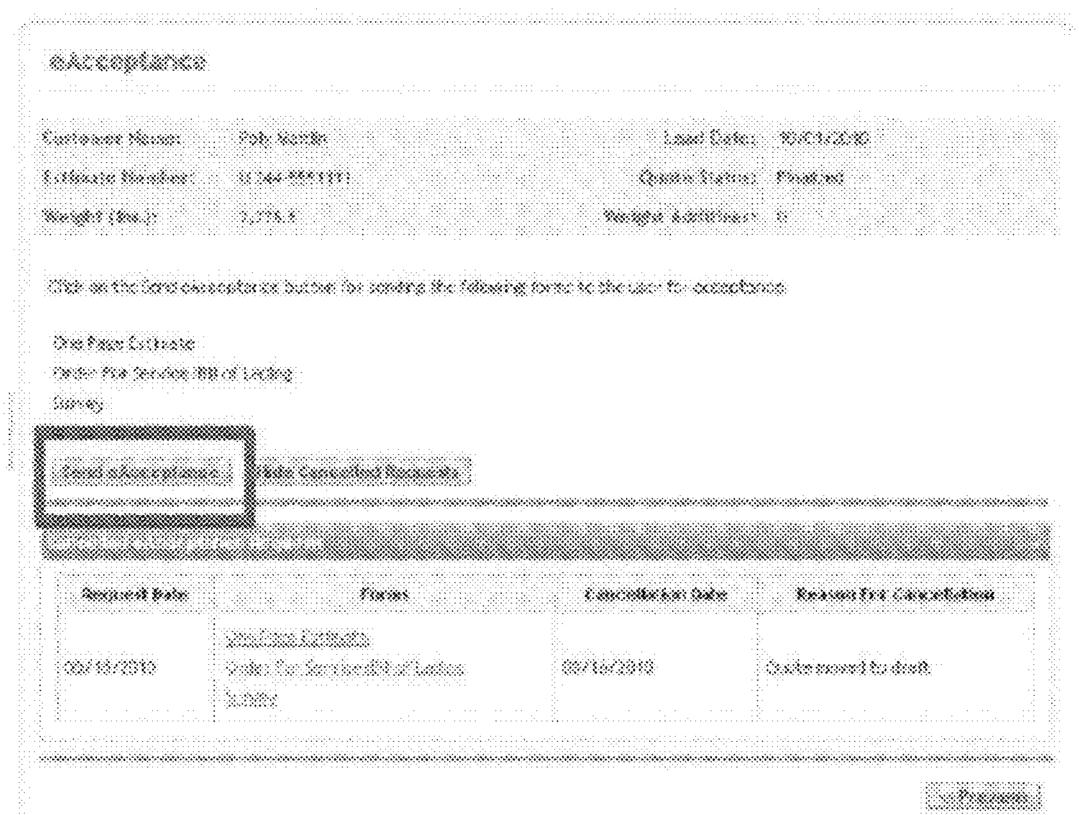

Click the Send eAcceptance button (see FIG. 226).

Figure 227:

Enter an order number (see FIG. 227). This number is reserved for your use when you register the order in RORD and prints on the combined Order For Service/Bill of Lading Document. Select the appropriate payment type. The customer's e-mail address is pre-populated. Enter e-mail addresses for yourself and the move coordinator in the Carbon Copy (CC:) field. Use a comma to separate each e-mail address when entering multiple addresses in a field.

Figure 228:
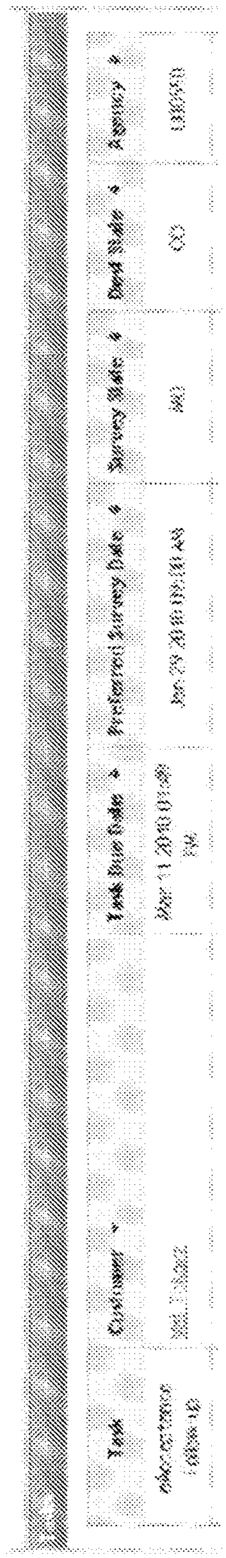
Figure 229:

After you click the Send button, a follow up task for 1 week later is automatically placed on your Tasks list (see FIG. 228) and your Quotes-To-Go My Schedule calendar (see FIG. 229).

Tracking eAcceptance Documents that have been Sent to the Customer

Figure 230:
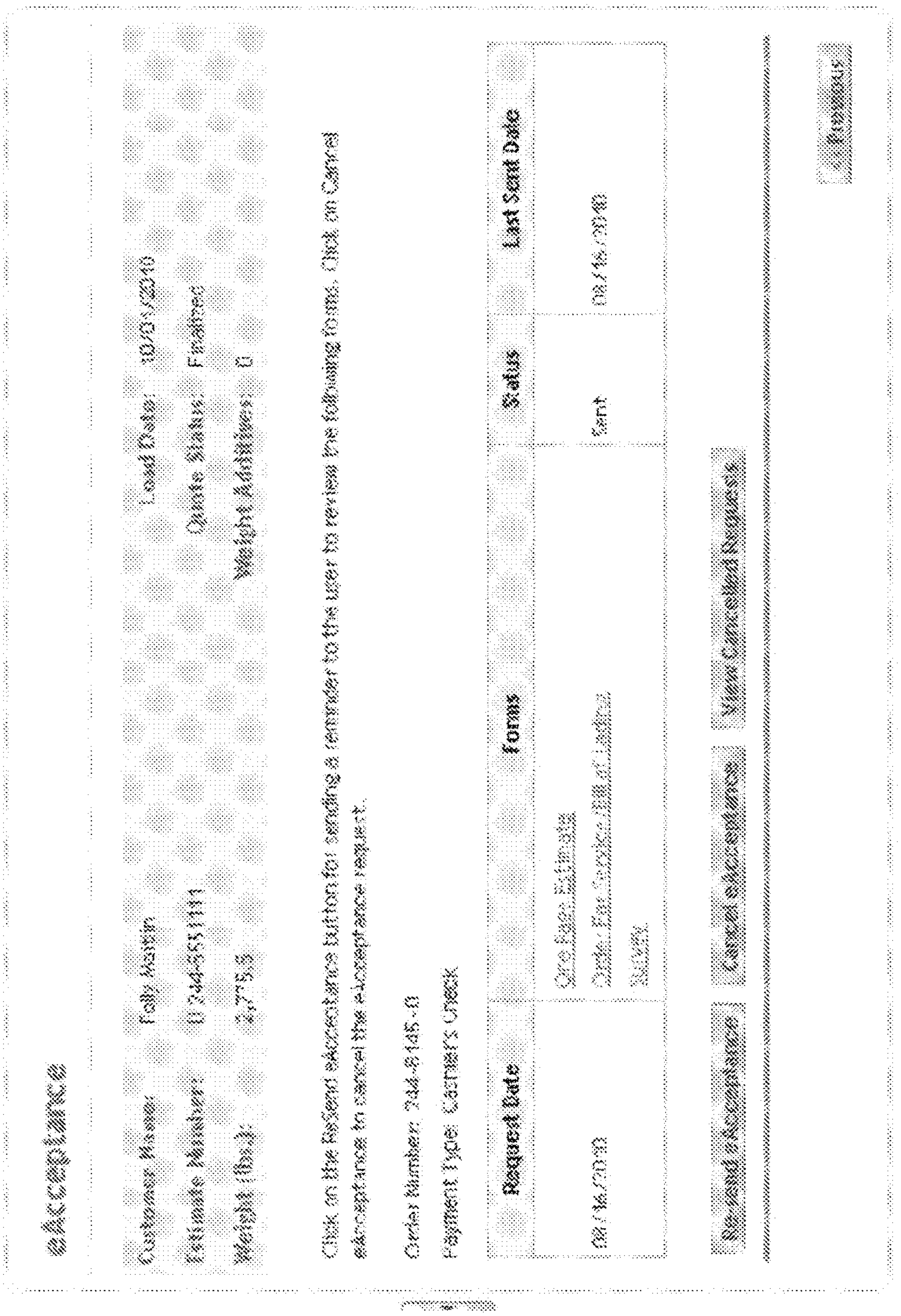

Once the eAcceptance e-mail is sent, the status on the Forms page of this estimate changes to Sent (see FIG. 230).

If there are problems, you can re-send the eAcceptance, or cancel it and use the traditional white paper process instead.

eAcceptance—What the Customer Sees

Figure 231:
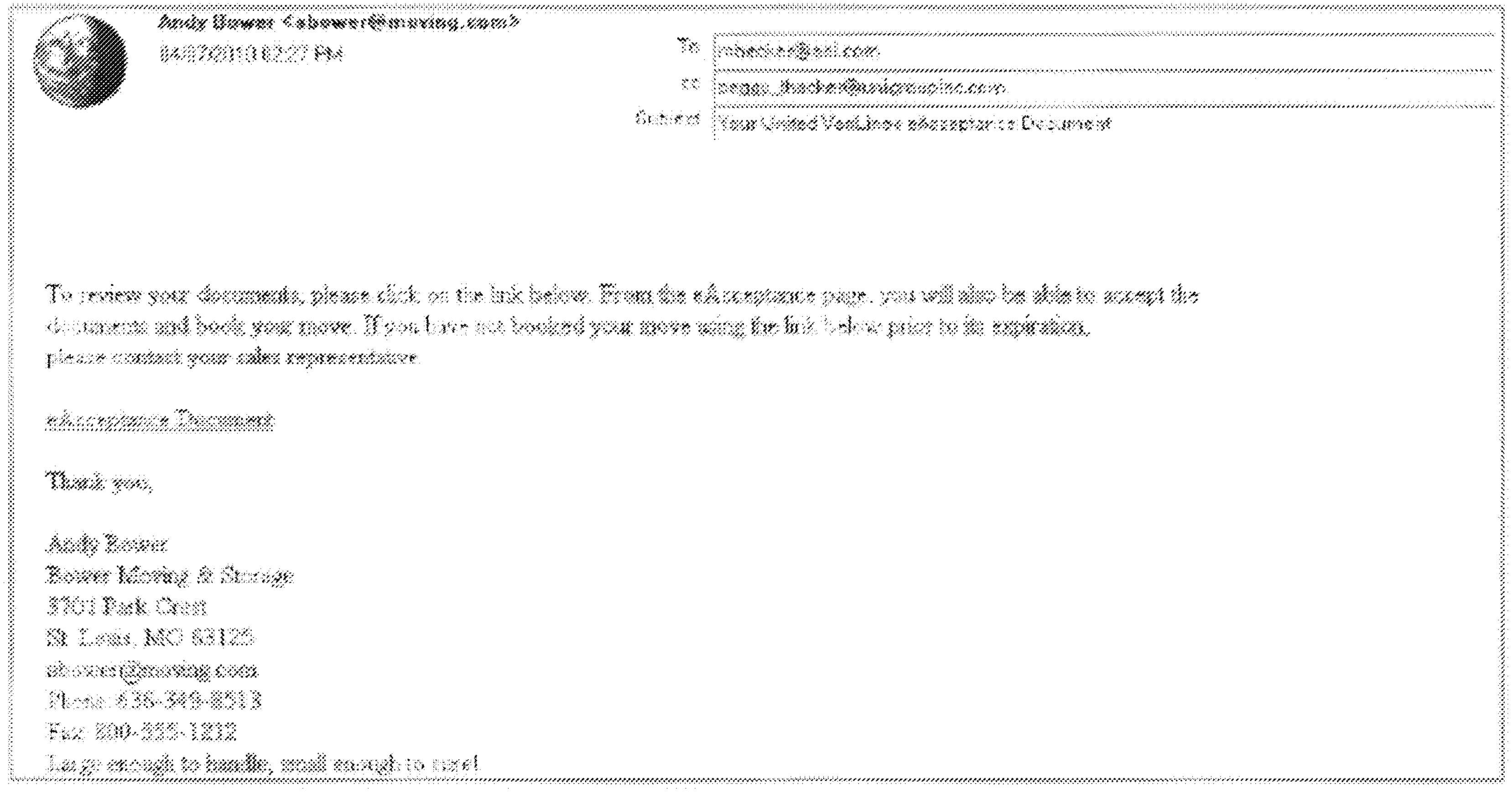

The customer receives an e-mail with a link to eAcceptance (see FIG. 231).

Figure 232:
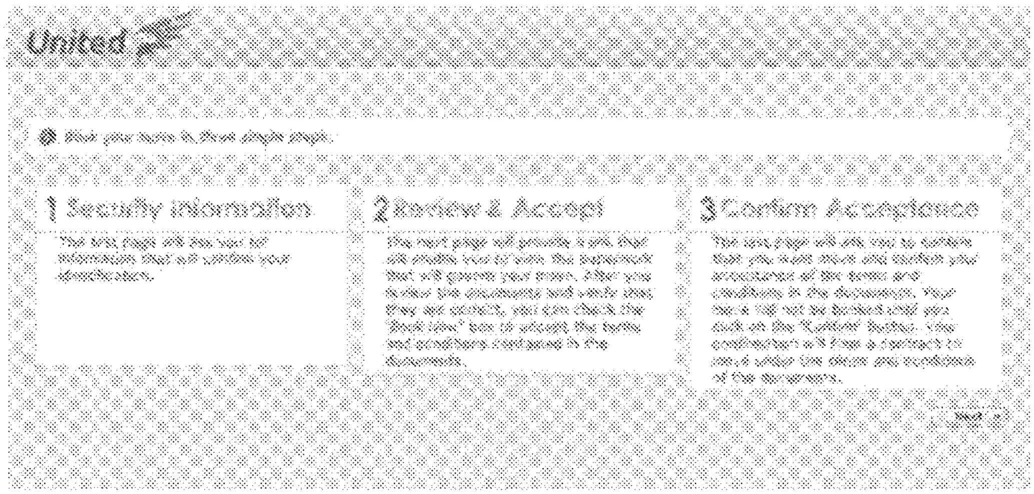

The initial screen explains the process (see FIG. 232).

Figure 233:
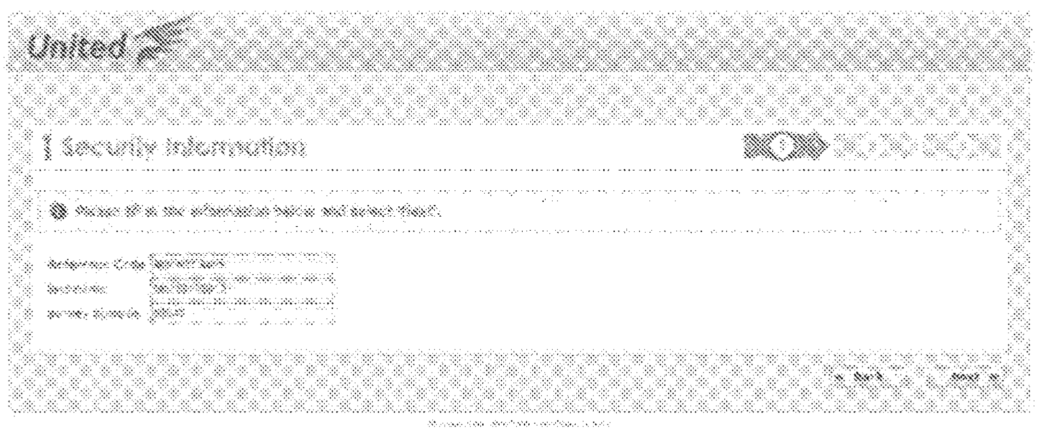

For security purposes, the customer enters their last name and their origin zip code. The Reference Code field is pre-populated (see FIG. 233).

Full Value Protection $0.60 per pound

Figure 234:
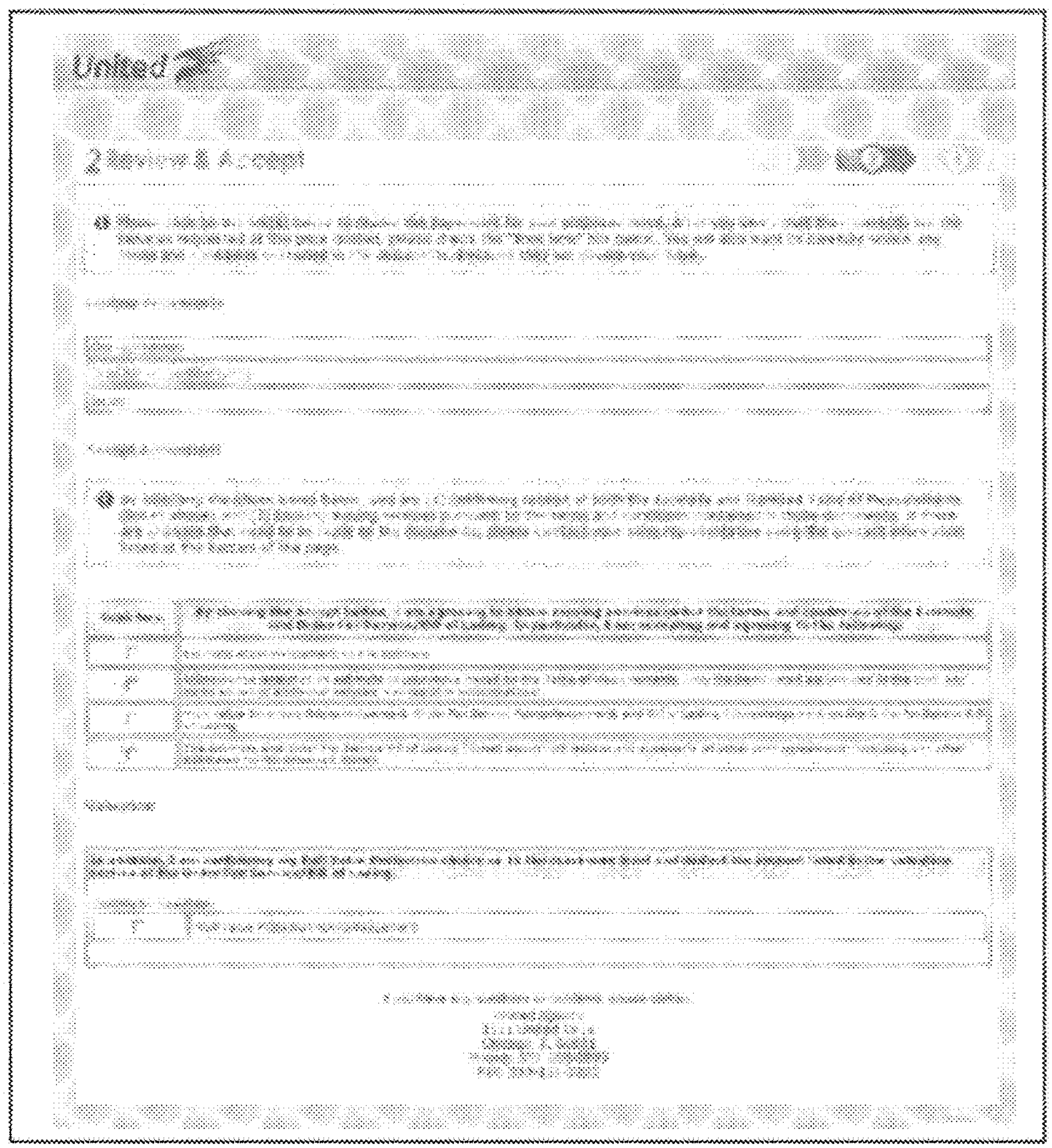
Figure 235:
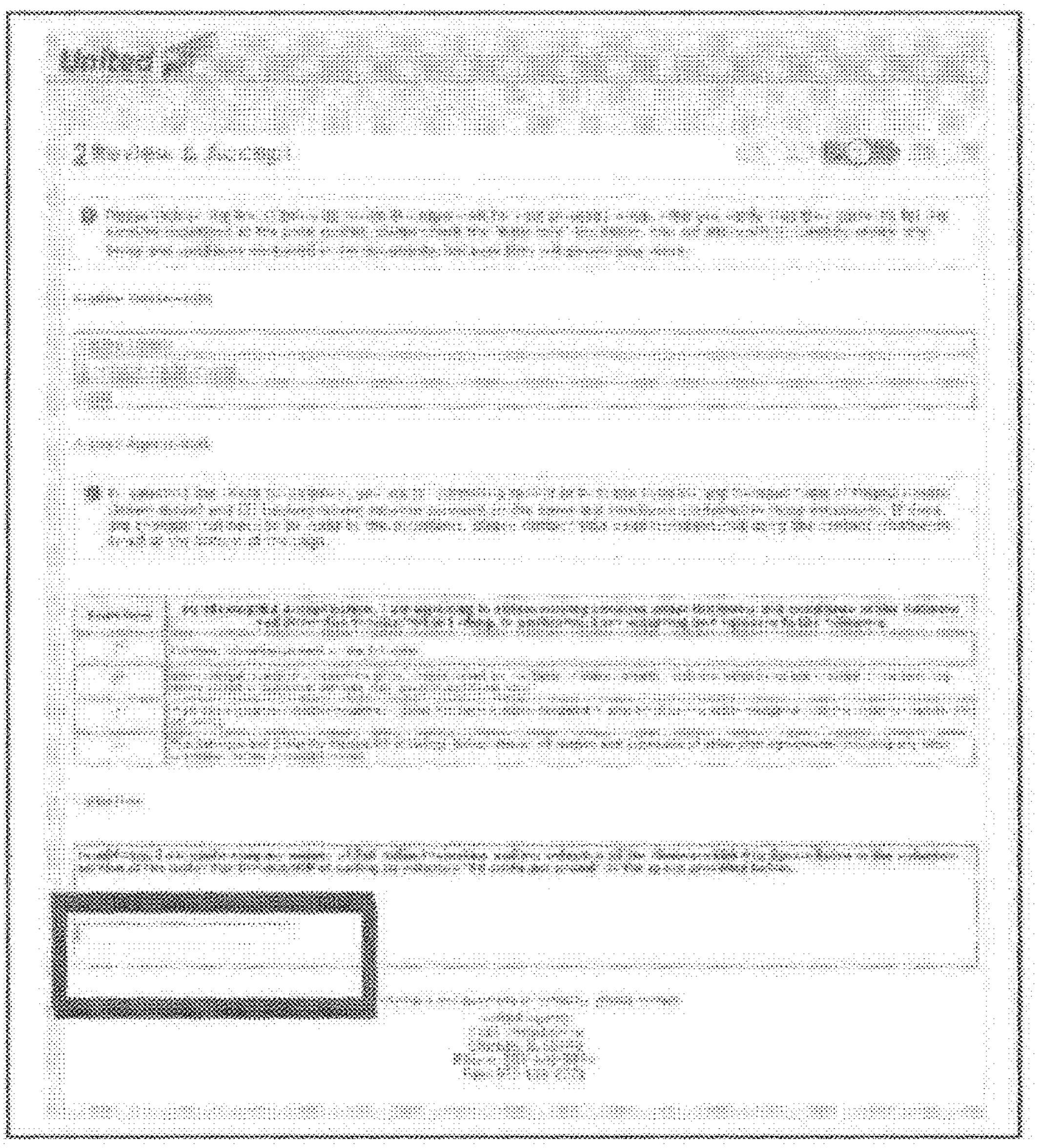

The Review & Accept screen contains links to the order documents for the customer to review. If they approve of the documents, they select the Book Now check boxes, then confirm their valuation selection. For Full Value Protection, the customer selects the check box (see FIG. 234). For $0.60 per pound valuation, the customer MUST TYPE '60 cents per pound' in the field (see FIG. 235).

Once all items are reviewed and selected, click Accept.

Figure 236:
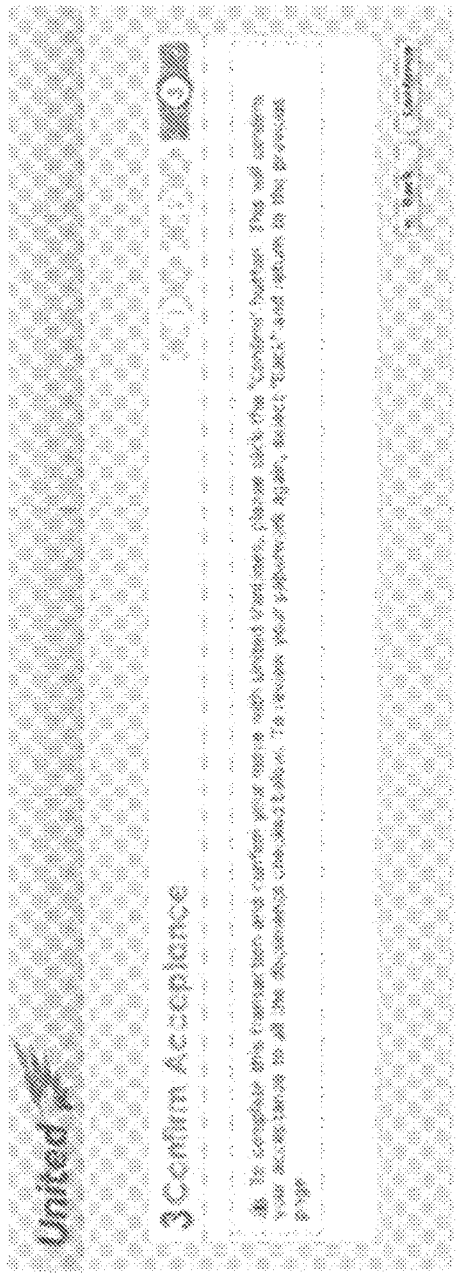

The customer now clicks the Confirm button (see FIG. 236).

Figure 237:
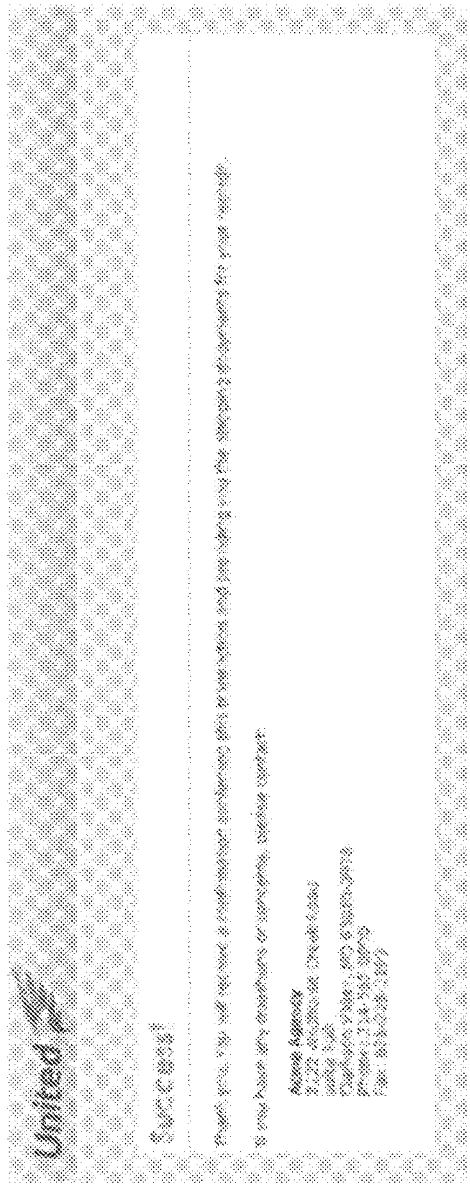

A verification screen displays (see FIG. 237).

Figure 238:
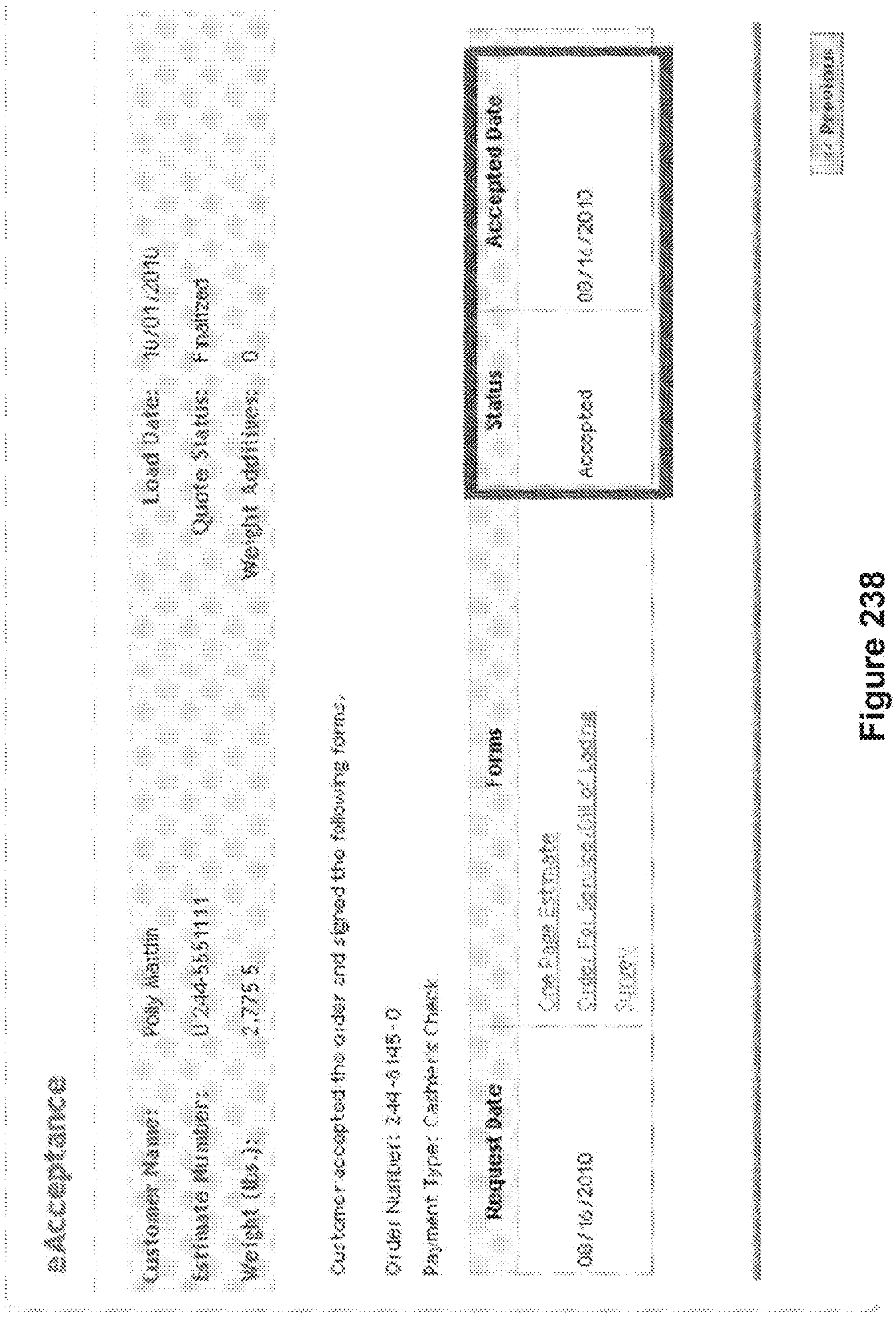

The status on the eAcceptance page changes to Accepted and lists the acceptance date (see FIG. 238). All e-mail addresses that were entered in the original eAcceptance e-mail are notified that the quote has been accepted. The order is now ready to be registered in RORD following normal processes.

Figure 239:
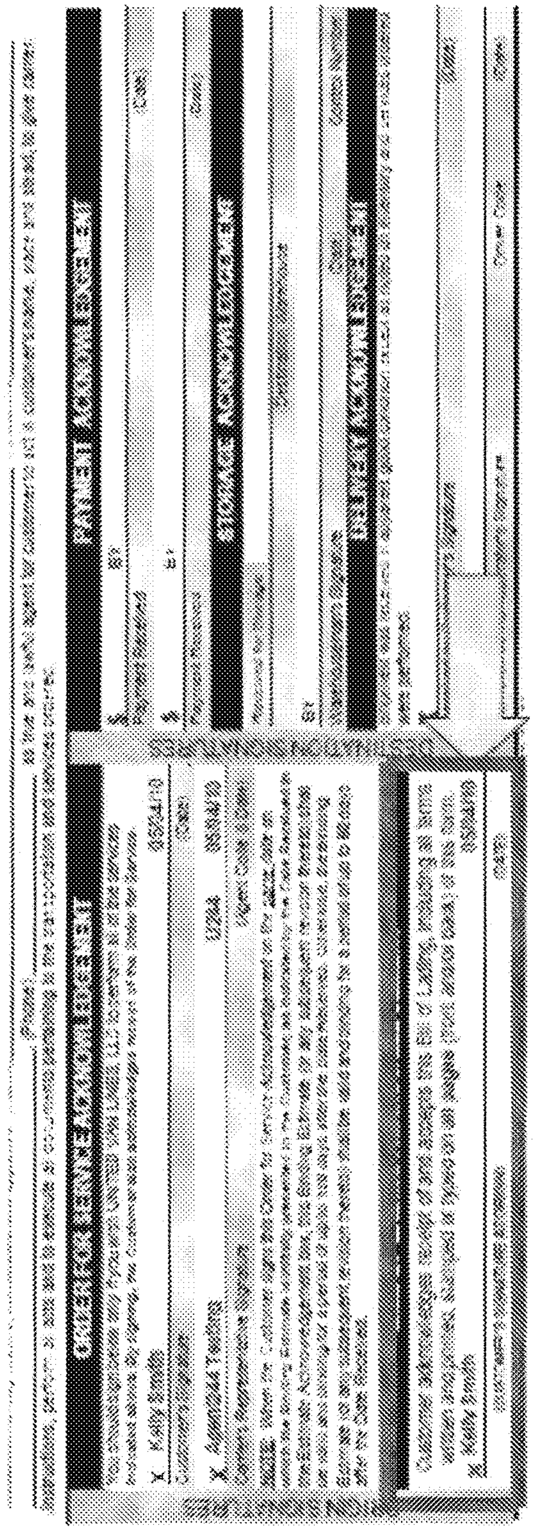

The combined Order for Service/Bill of Lading, One Page Estimate, and Survey (Cube Sheet) are signed and dated (see FIG. 239). The Van Operator does not need to collect these signatures when the order loads. The Van Operator still obtains the customer's signature at destination.

Registering an Interstate Order

All Quotes-To-Go orders are saved in PRIC. They may be copied into RORD using the estimate number for registration without re-entry.

Quotes-To-Go has not changed the RORD registration process. All accepted quotes must be registered following normal processes.

When the estimate is registered, the status in Quotes-To-Go automatically changes to Registered. If you need to make changes to the estimate after it has been registered, see the Change a Finalized Quote section to learn about the Return to Draft button.

Ball Park Quotes

Figure 240:
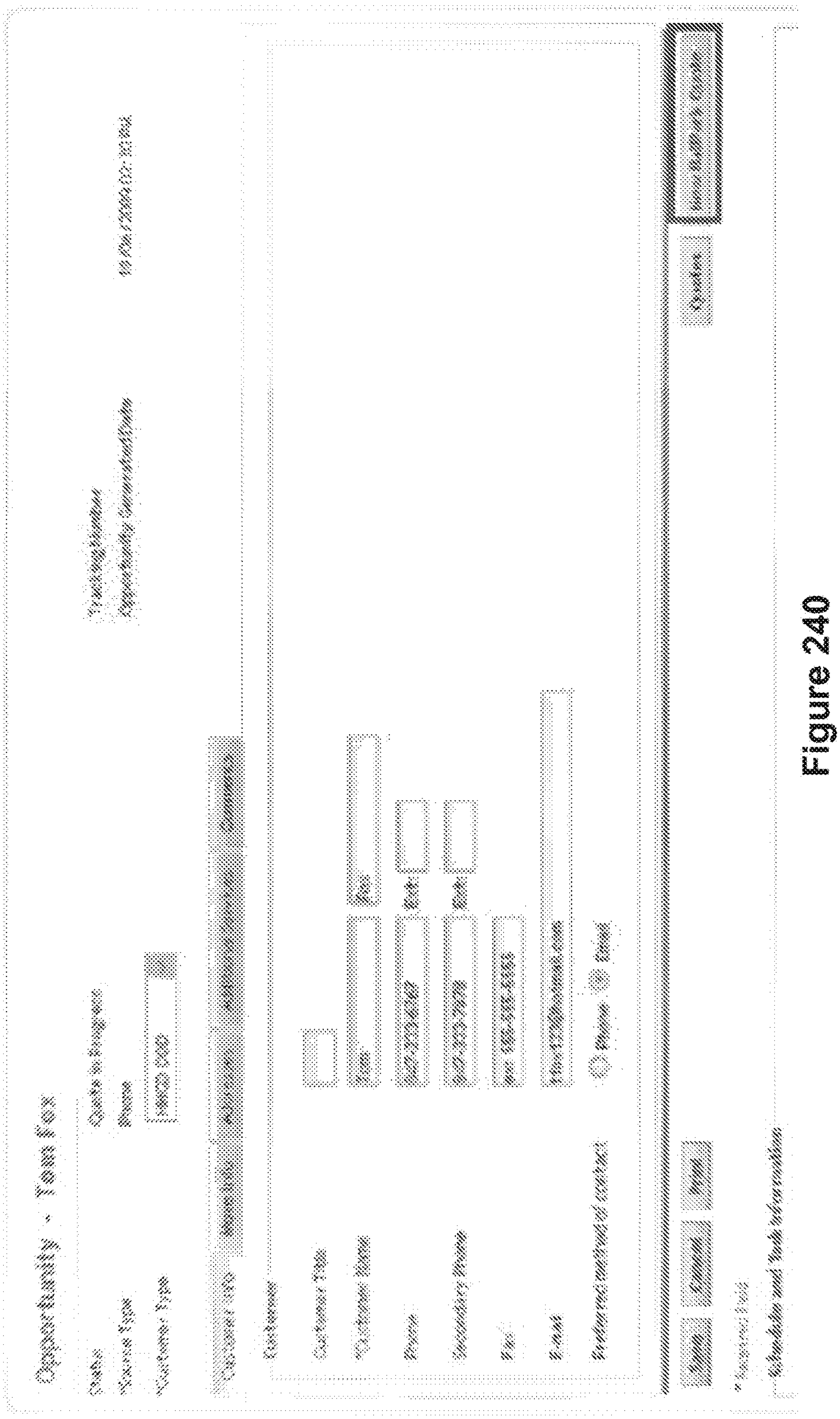

You can create ballpark quotes directly from the Opportunity screen (see FIG. 240).

Or, you can click the Quotes button in the bottom right-hand corner of the Opportunity screen, and then click the New BallPark Quote button from the My Quotes screen.

Figure 241:
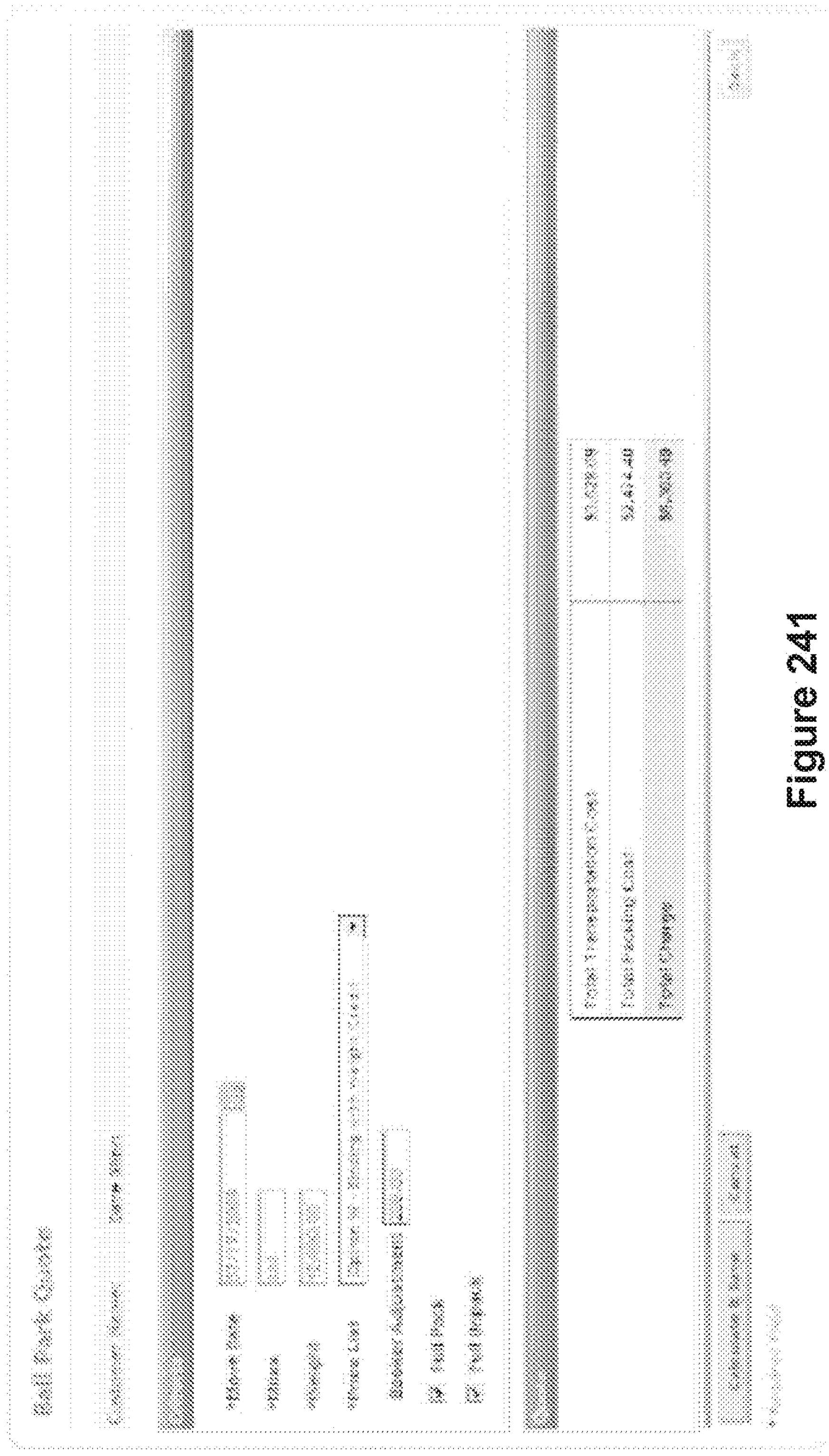

Enter the move date, the estimated weight, and the desired price list and discount/booker adjustment (see FIG. 241). Indicate whether to include full-pack rates and click Calculate & Save. When two ZIP codes have been entered on the Opportunity, the mileage is calculated from MileMaker.

Figure 242:
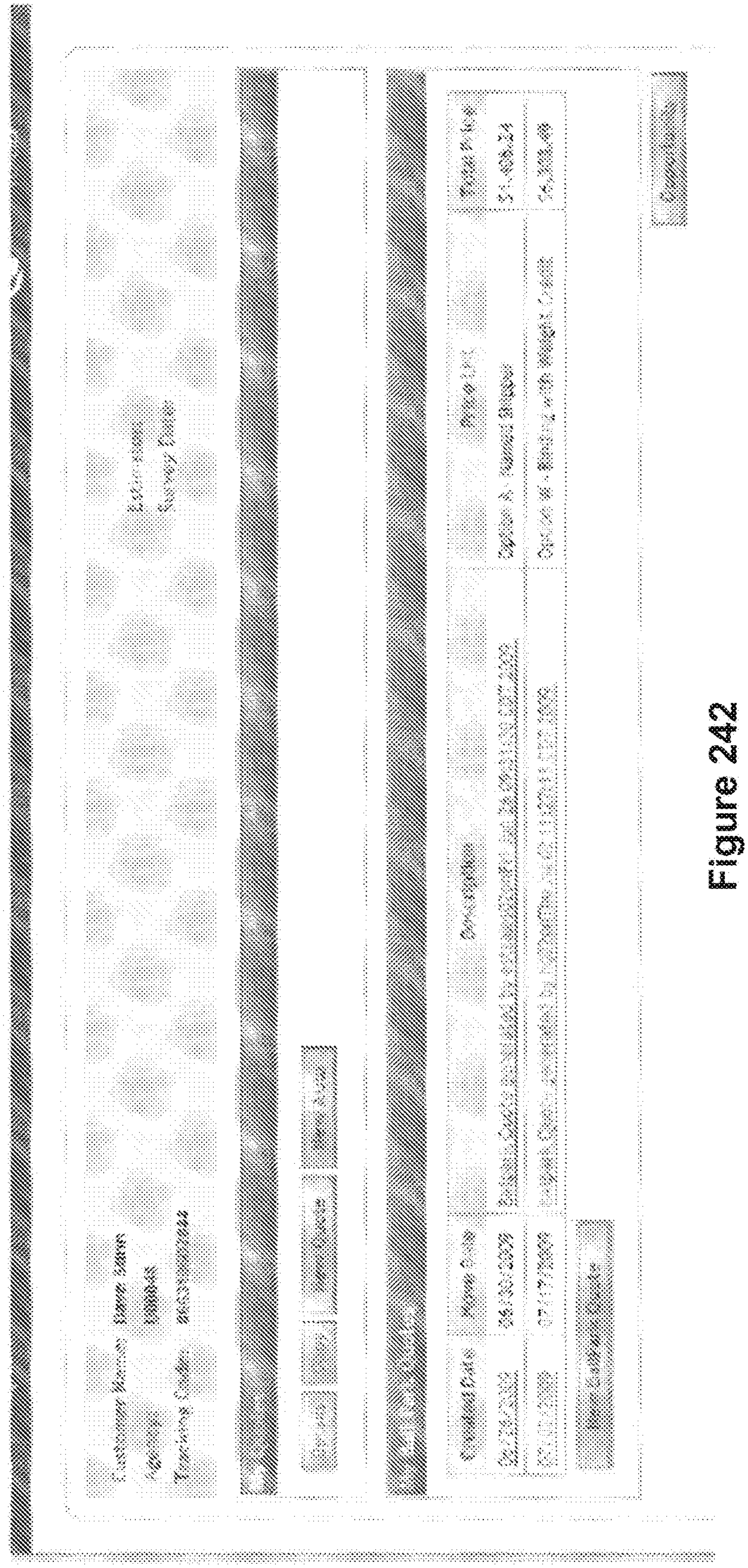

Click the Back button to return to My Quotes (see FIG. 242).

Local Quotes/Intrastate Quotes

Local quotes and Intrastate quotes follow the same general flow as interstate quotes. This section refers to the major differences between the two flows.

Local quotes are governed by the rates entered in by the Agency Rates Administrator. See the User Guide for Rate Administrators for more information.

To create a local quote, click the Local Quotes button on the My Quotes page of the Opportunity. To create Intrastate quote, click the New Intrastate Quote button. Complete the Move Information, Addresses and Contacts, Survey, Storage, Instructions, and Accessorial pages as described in the interstate quote instructions. The destination address is optional for local and intrastate quotes.

If your local or intrastate rating is separated regionally, you may be asked to select a price list on the Move Information screen to set the proper rates.

Figure 243:
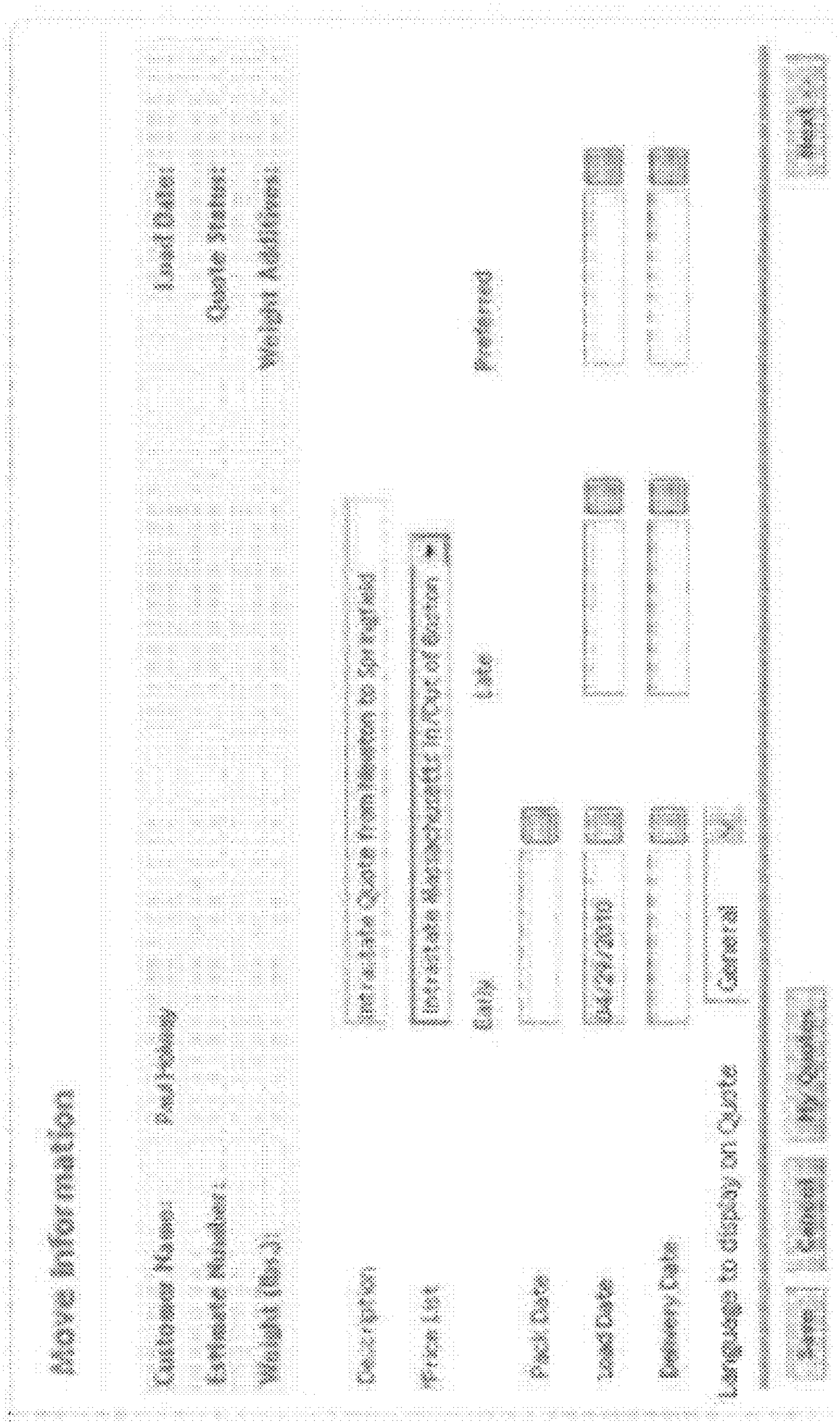

If your Rates Admin has set up different language to be printed on binding, non-binding and general quotes on the Miscellaneous rates screen, you have the option to select the appropriate text to be printed on the quote from the Move Information screen (see FIG. 243).

For Intrastate Quotes

Figure 244:
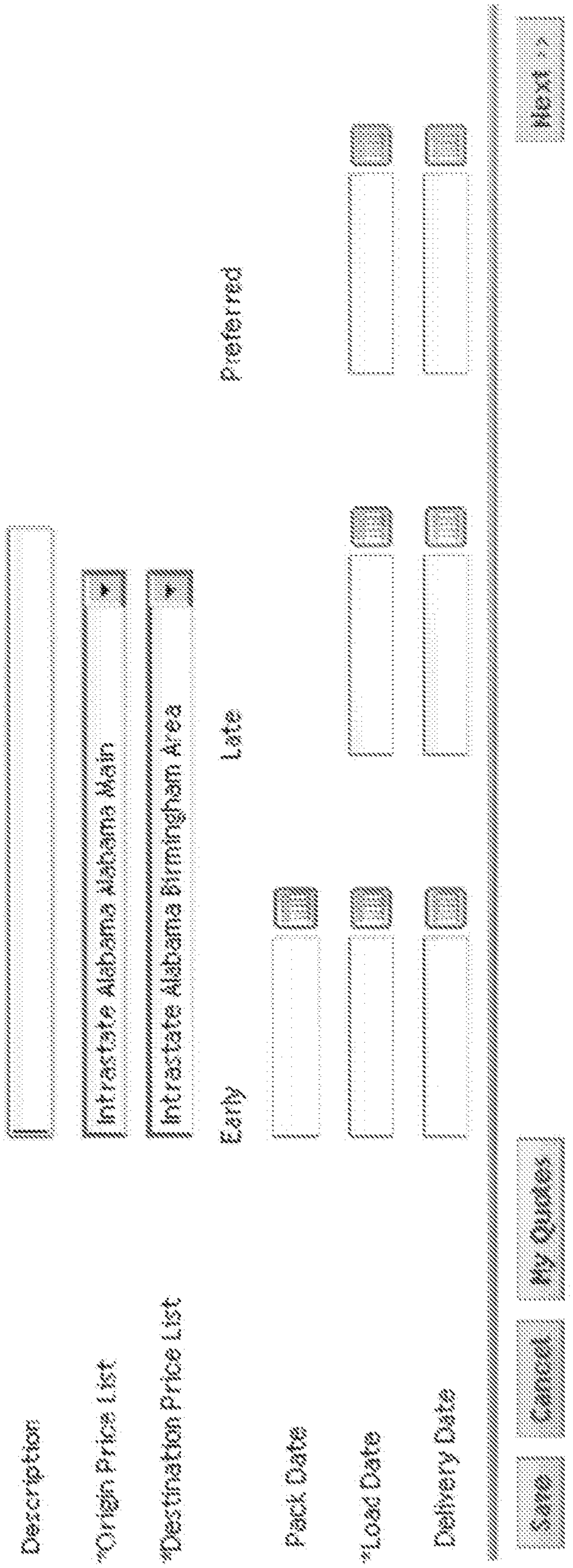

On the Move Information screen, you can select different price lists at Origin and Destination if these multiple region rates have been entered by your Rates Administrator (see FIG. 244).

Packing

Figure 245:
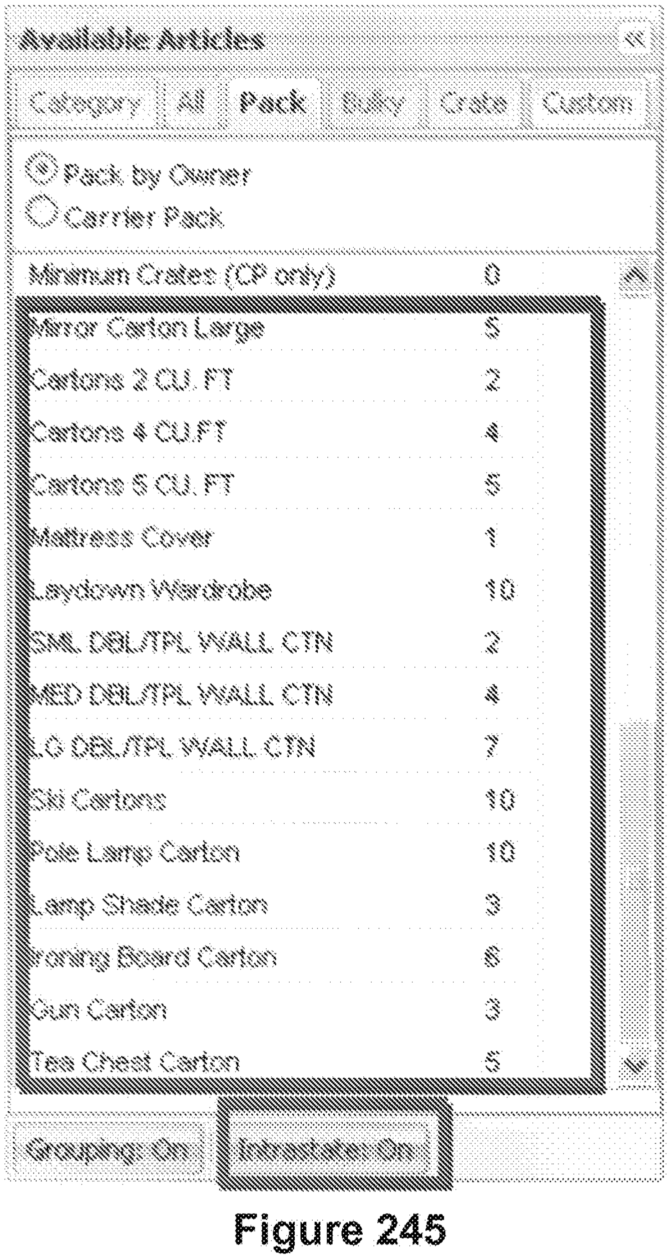

Click the Intrastate:Off button to toggle it on to add additional packing items that are not available in the current interstate tariff, but can be used for Local or Intrastate quotes (see FIG. 245). Your Rates Administrator must enter pricing for these items in your packing tables in Quotes-To-Go.

Valuation

Figure 246:

Local and Intrastate quotes have the potential to display options for full-value, declared value, and released value valuation. Use the selection to enter the type most appropriate for your customer (see FIG. 246).

Figure 247:
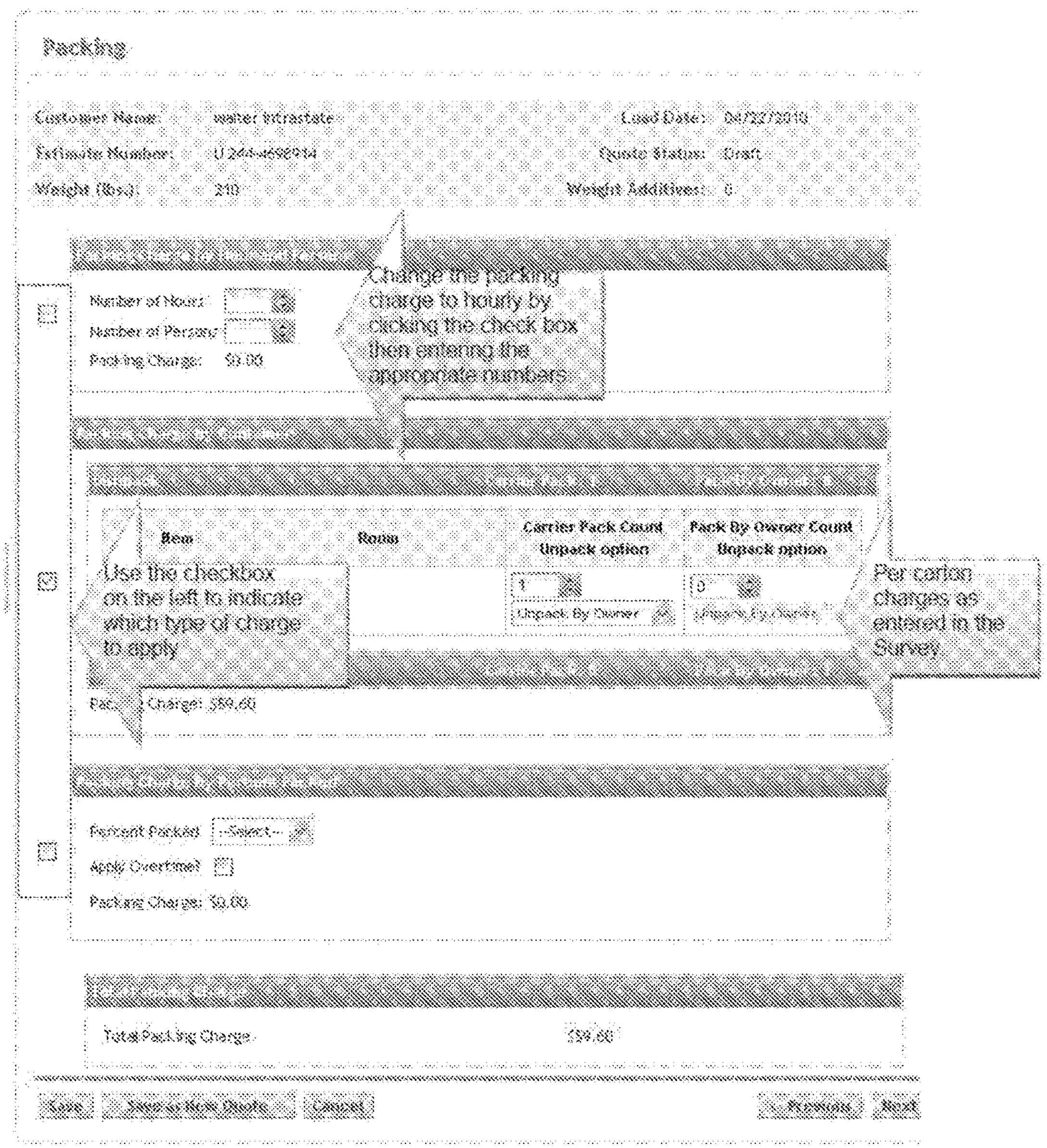

Local and Intrastate quotes have an optional Packing page (see FIG. 247). If you do NOT want to calculate the packing charge by a per carton basis, you can quickly add hourly packing charges to the quote here. You can easily update the number of cartons and indicate who is packing them from this screen. Click the Save button after any updates to re-calculate the packing charge.

Figure 248:
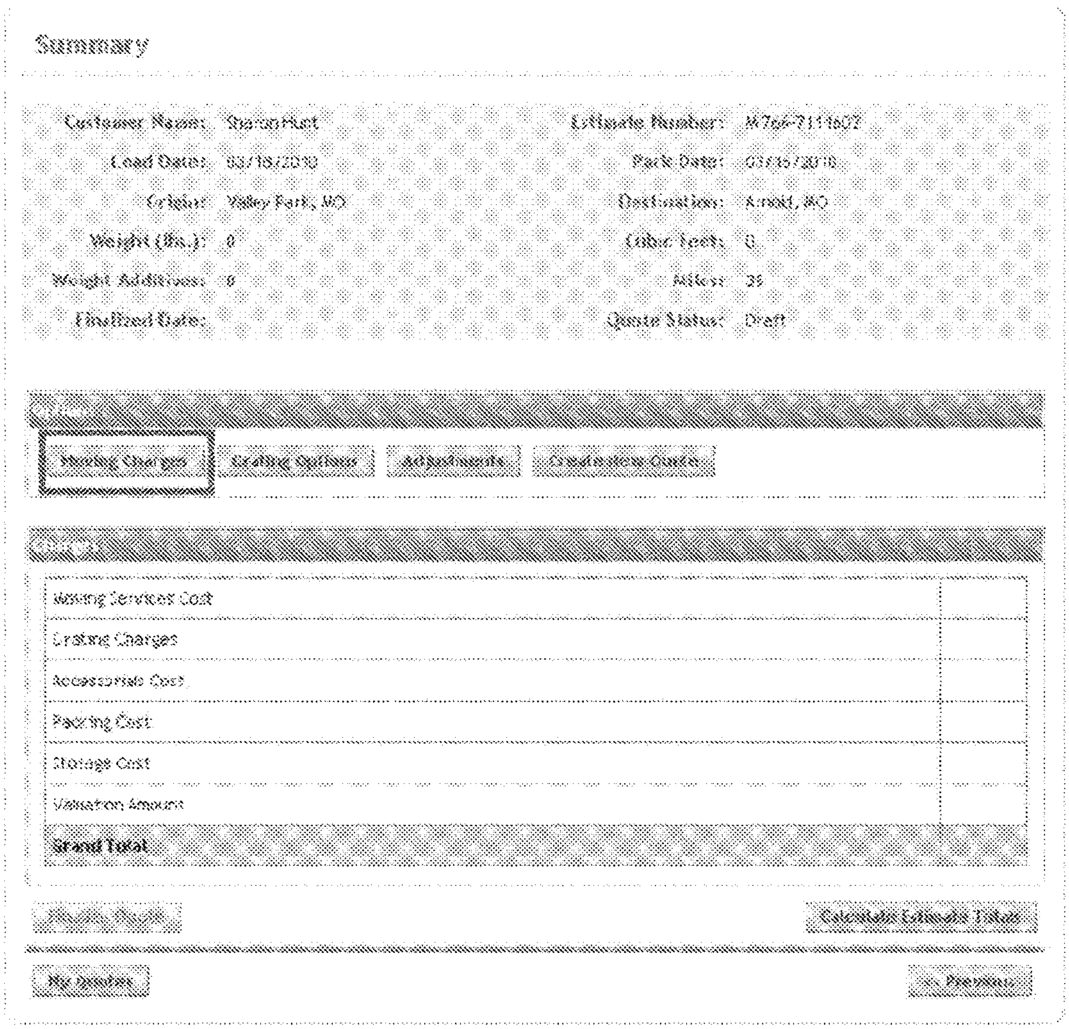

Click the Moving Charges button on the Summary page to enter the transportation related charges for the local move (see FIG. 248).

Figure 249:

Your Moving Charges screen may not look exactly as shown in FIG. 249, as the appearance of this screen varies depending on your agency's rate setup. You have the option to select more than one type of transportation charge. Click the check box to the left of the type of Transportation charge. You can select one, or both. Fuel Surcharge defaults as selected. De-select if it does not apply. Complete this screen entering the appropriate charges and click Save.

Once a local or intrastate quote has been finalized, two forms can be e-mailed and/or printed.

Figure 250:
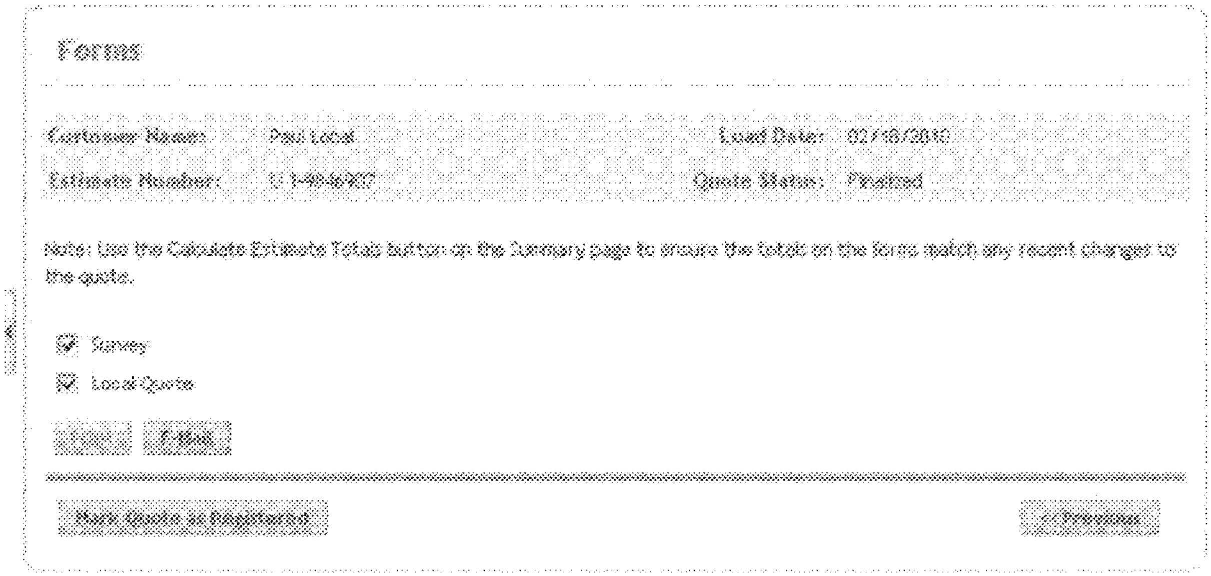

In order to change the status of a local quote, you can select the Mark Quote as Registered button on the Forms screen (see FIG. 250). Once the button is selected, the opportunity no longer appears on the My Opportunities screen.

Contract Quotes

Figure 251:
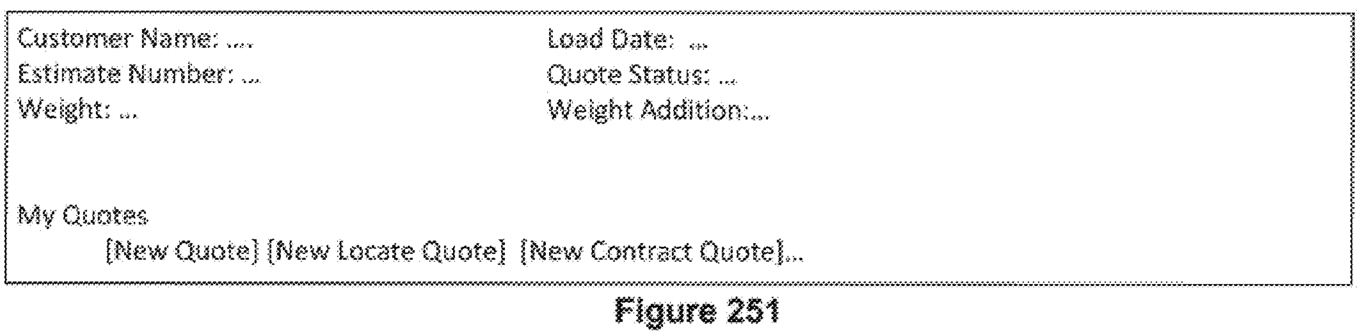

To create a contract quote, select the New Contract Quote button from the My Quotes Page (see FIG. 251). Currently, Contract Quotes can only be entered for bottom line discount contracts using UVL1, MT01 or 400N.

Contract and National Account Number

Figure 252:
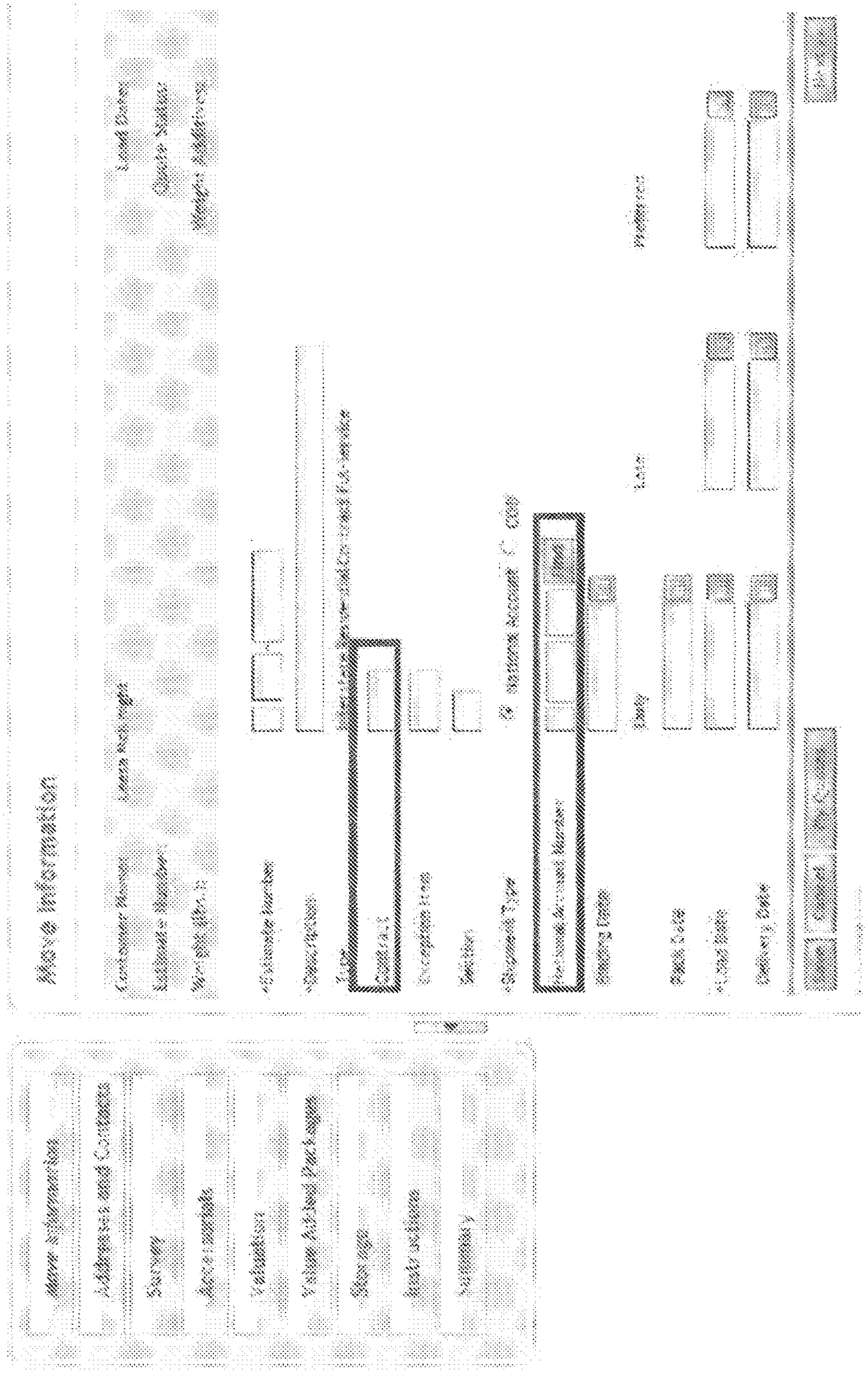
Figure 253:
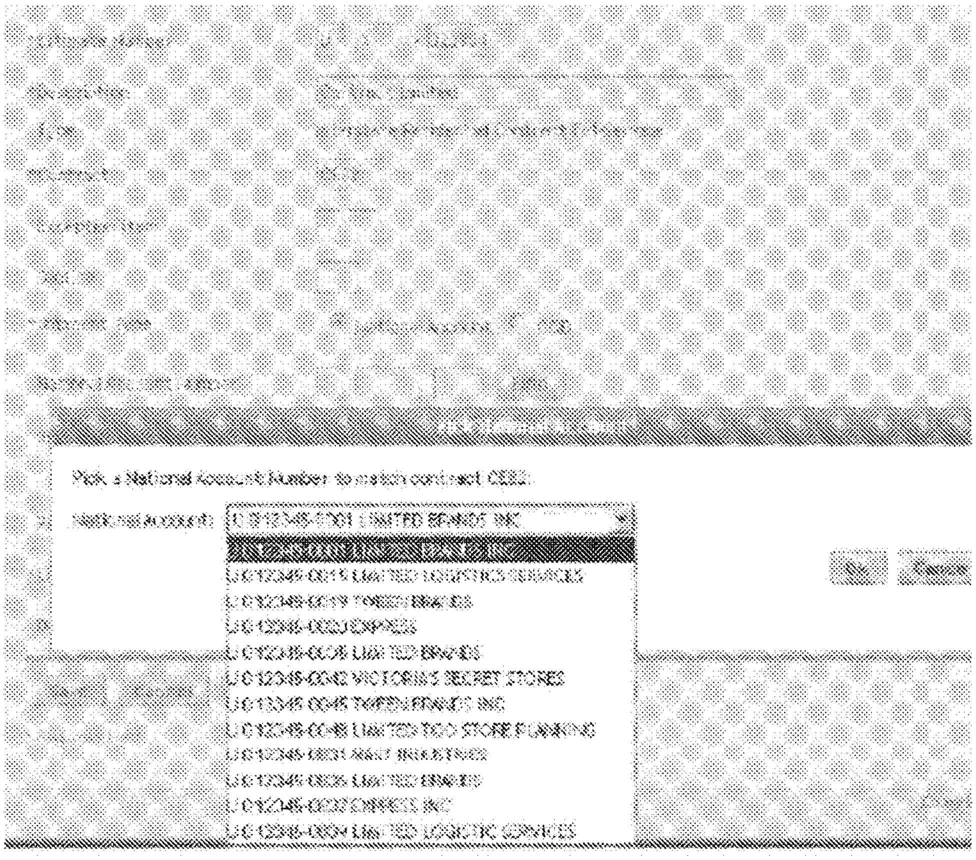

The Booker enters the correct Contract and National Account Number to ensure that the proper terms are used in the quote (see FIG. 252). Use the Find feature to select from a list of valid national accounts for that contract (see FIG. 253).

Depending on the contract terms, a Section and/or a binding date may be required. Quotes-To-Go enforces the proper contract data entry terms that apply.

Once these entries are complete, click Save.

Contract Accessorials

Figure 254:
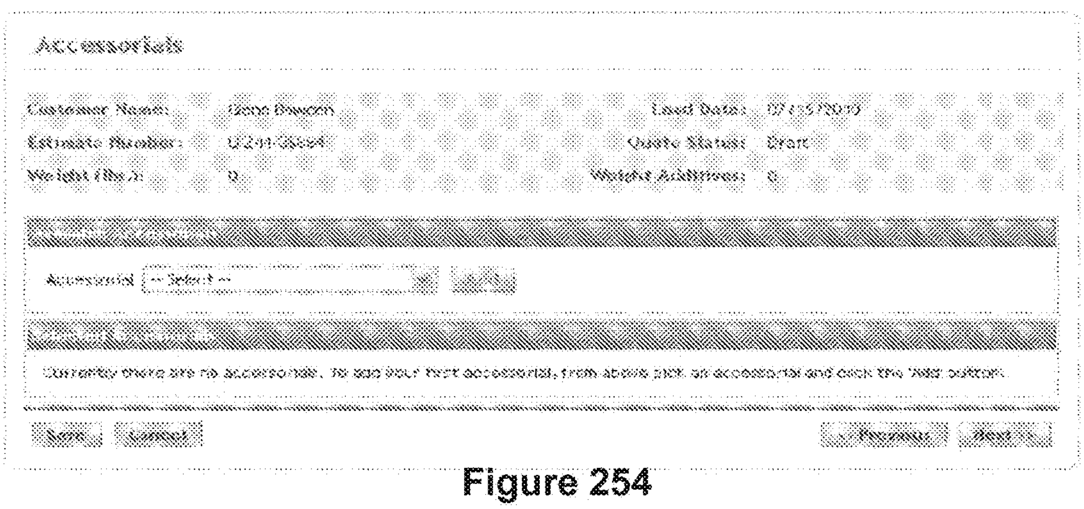

The list of accessorials valid for that contract is available for selection (see FIG. 254).

Valuation

Figure 255:
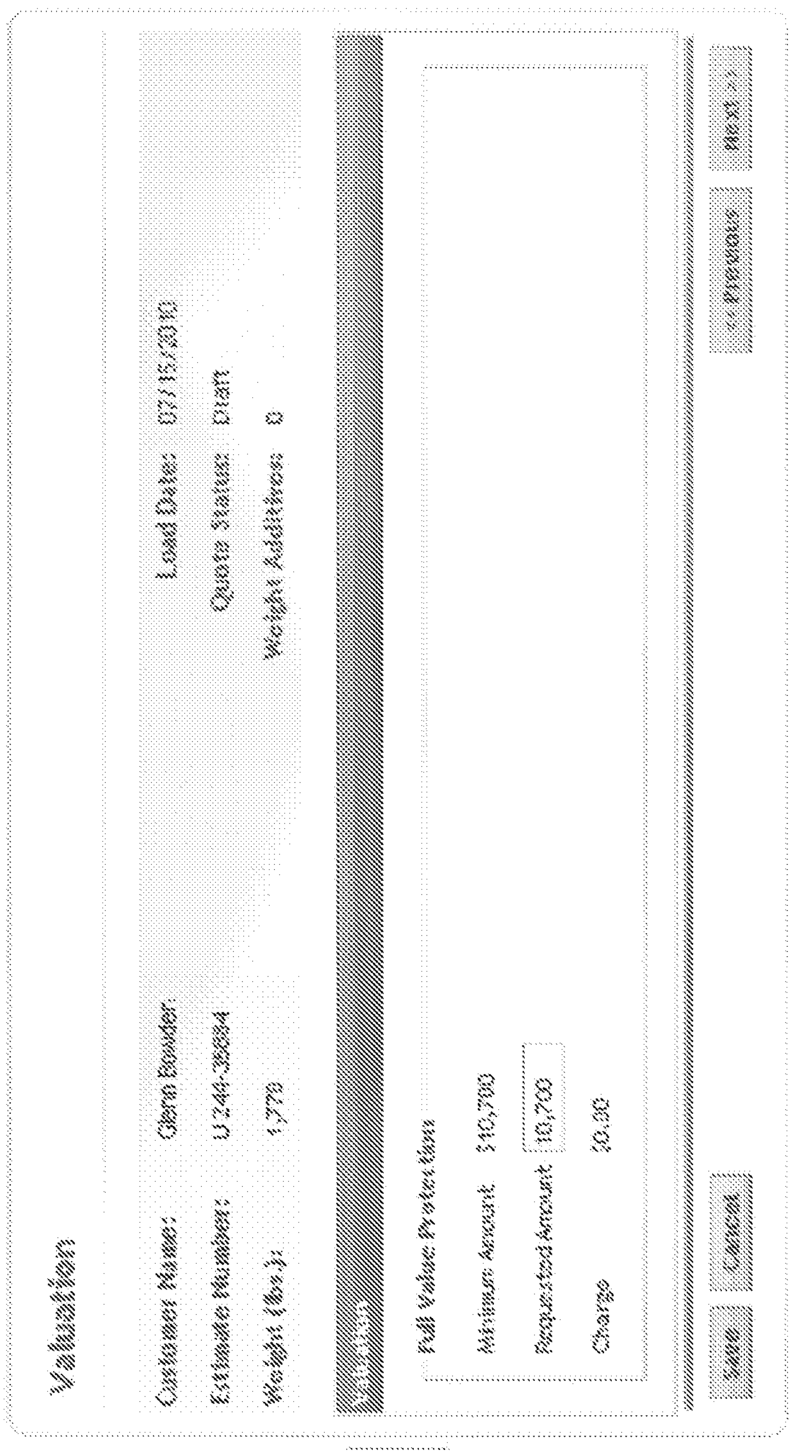

Free full-value amounts that are part of the contract are returned, as well as the proper calculation for additional valuation rates (see FIG. 255).

Value-Added Packages

Figure 256:
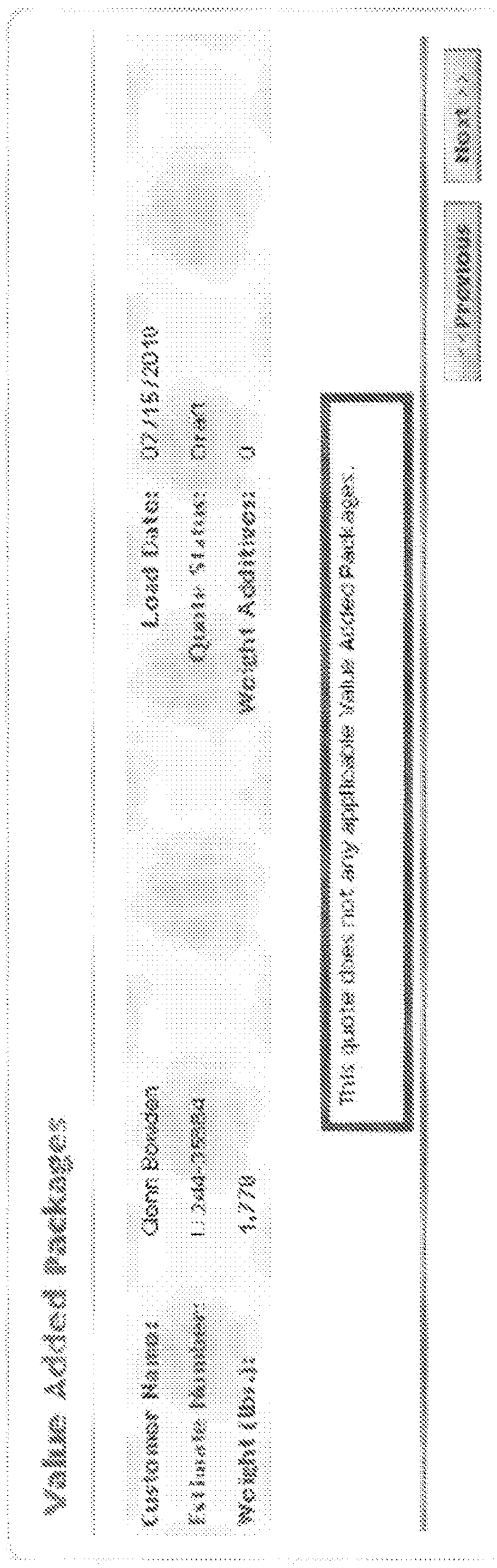

Only contracts that include Value-Added Packages return the option to select them (see FIG. 256).

Contract Summary

Figure 257:
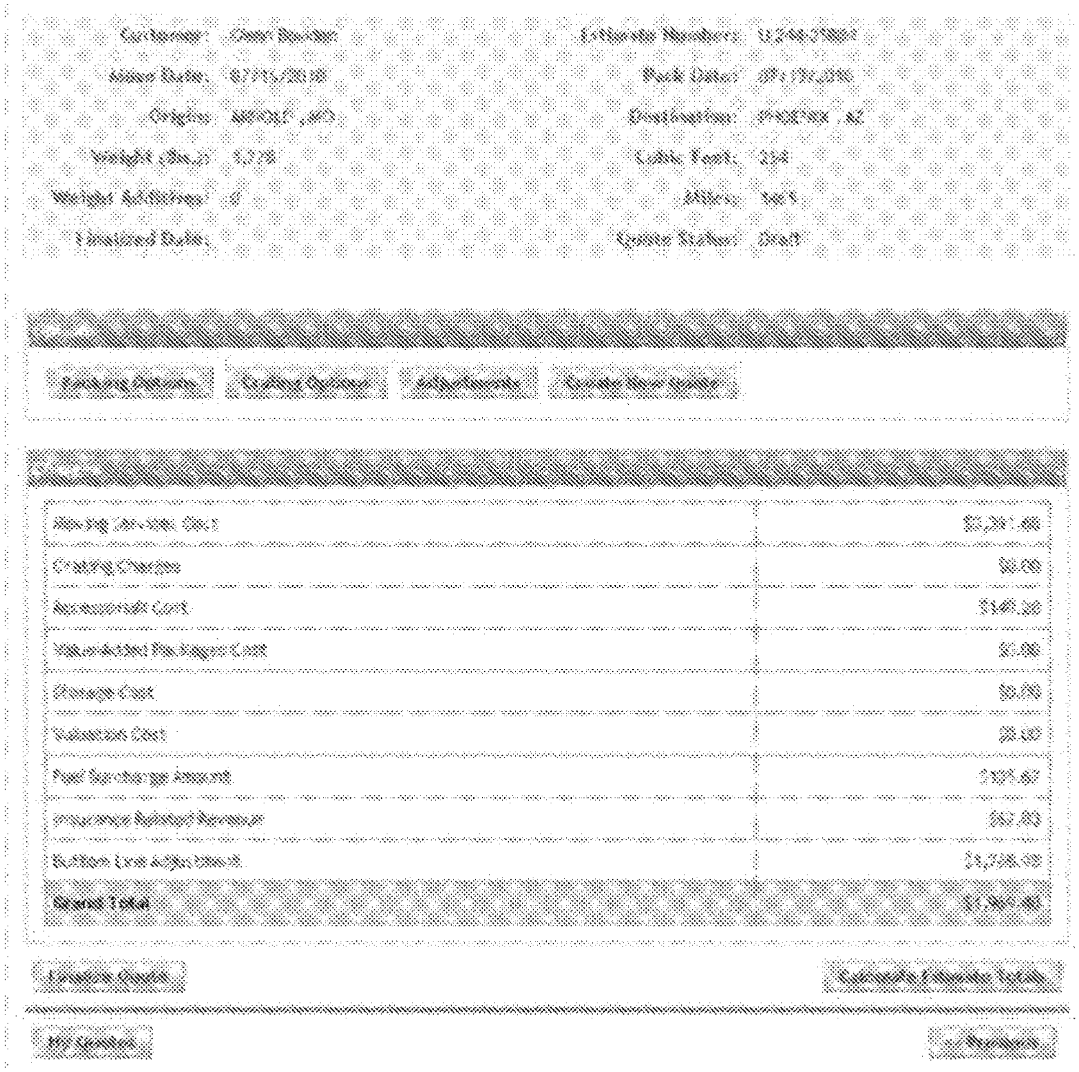

Depending on the contract terms, the summary screen appears slightly differently to present both the fuel-surcharge amount, as well as the bottom line adjustment included in the terms of the contract (see FIG. 257).

Contract Forms

Figure 258:
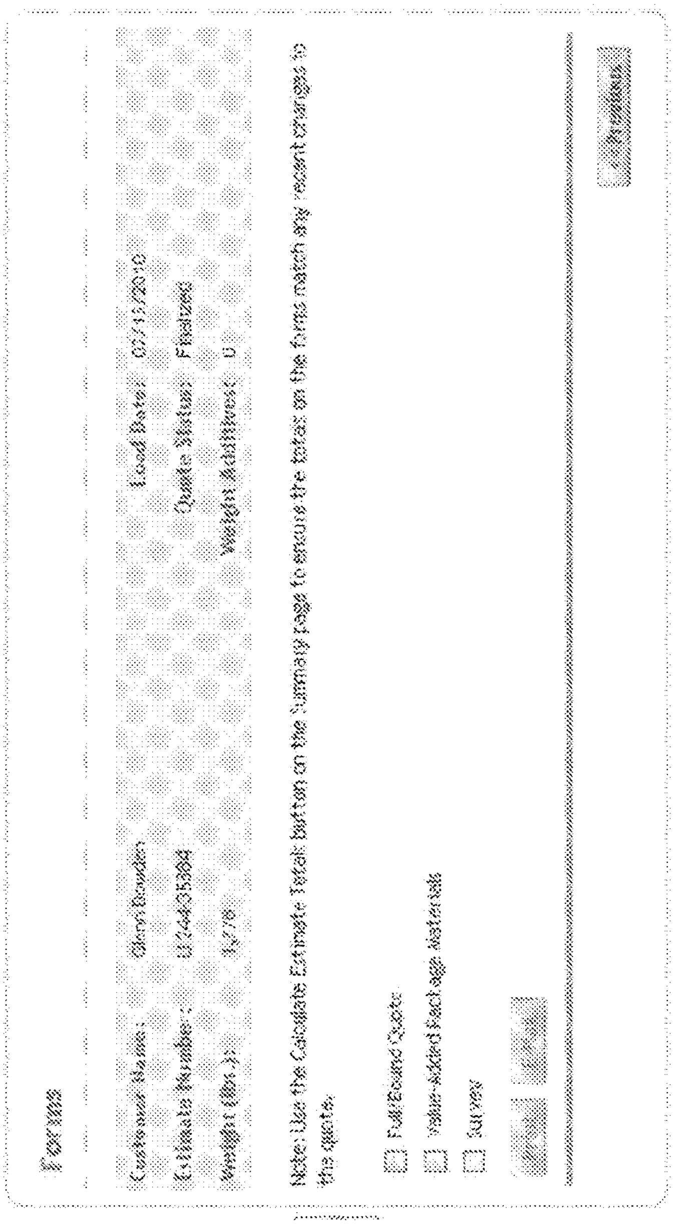

Currently, the one-page estimate and eSignature process are not functional for contract quotes. However, you can print and e-mail the survey as well as the Estimate/Order for Service for Contract quotes (see FIG. 258).

Container Quotes

Figure 259:
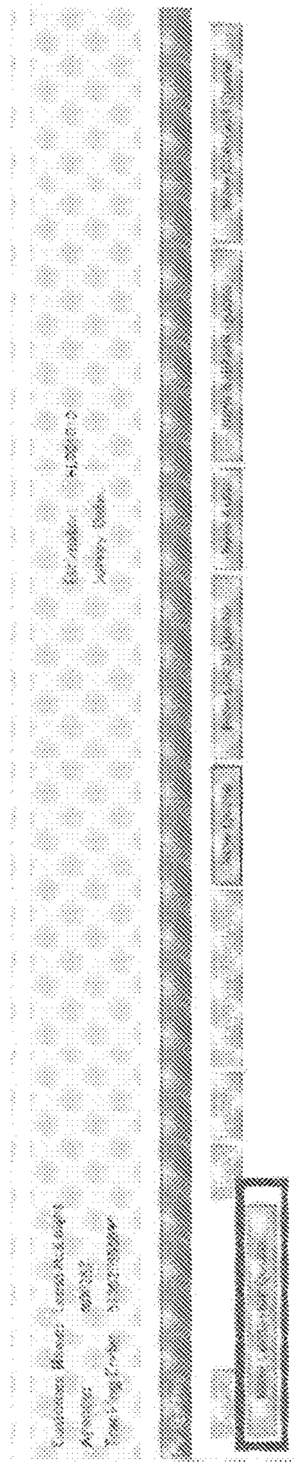

To add a container quote to an opportunity, select the New Container Quote button from the My Opportunities page (see FIG. 259). (Quotes are available for United Mayflower Container Services markets, only.)

Figure 260:
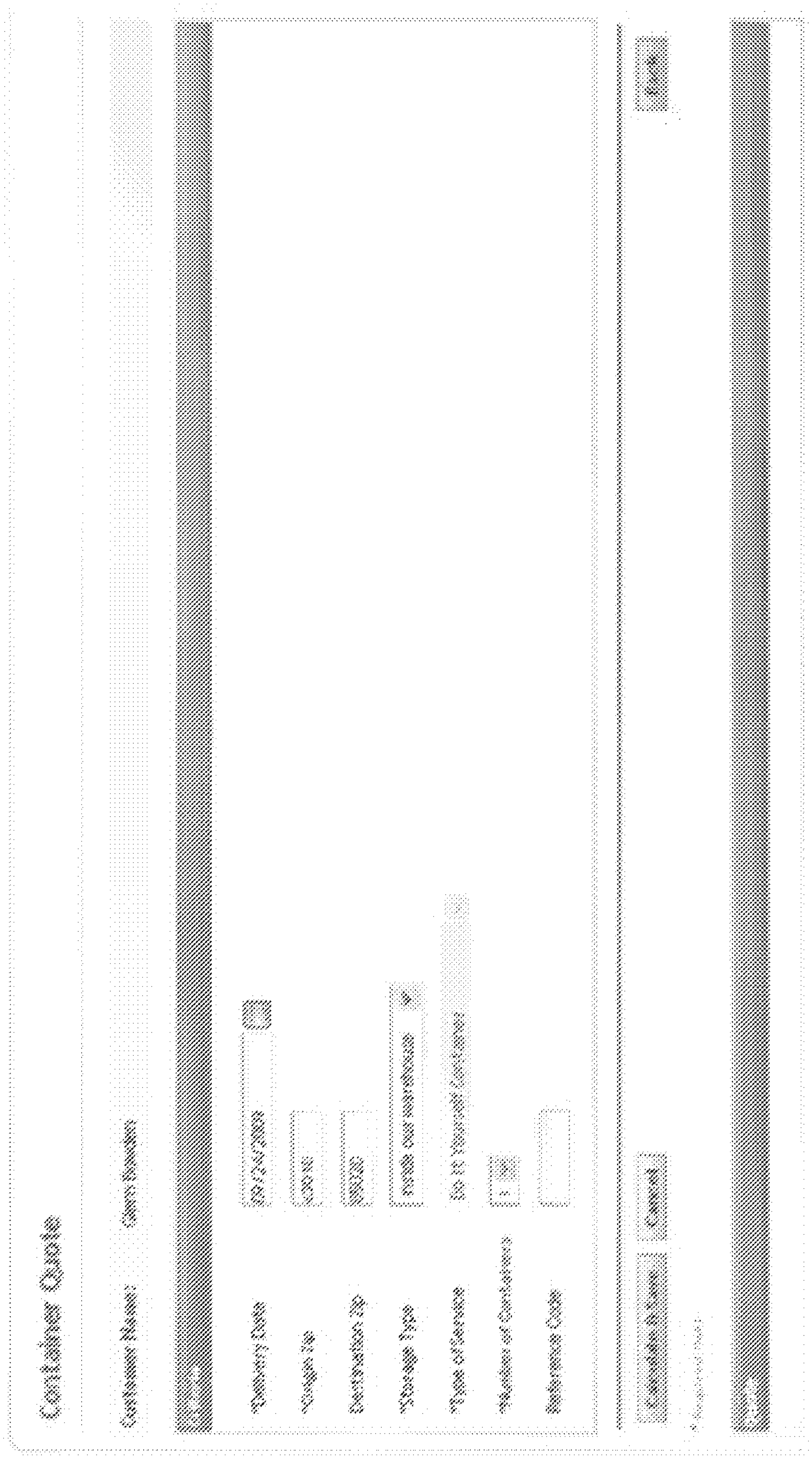

The zip codes and dates populate from the Opportunity (see FIG. 260). Click Calculate and Save to return the appropriate container rates.

Currently, only United Mayflower Container Services 16 foot Do-It-Yourself rates are available. Do-It-Yourself Plus Labor rates (and quote forms) as well as PODS rates are expected to be available soon. Stay tuned for more information and many more enhancements in this area.

Accessing Existing Quotes

Figure 261:
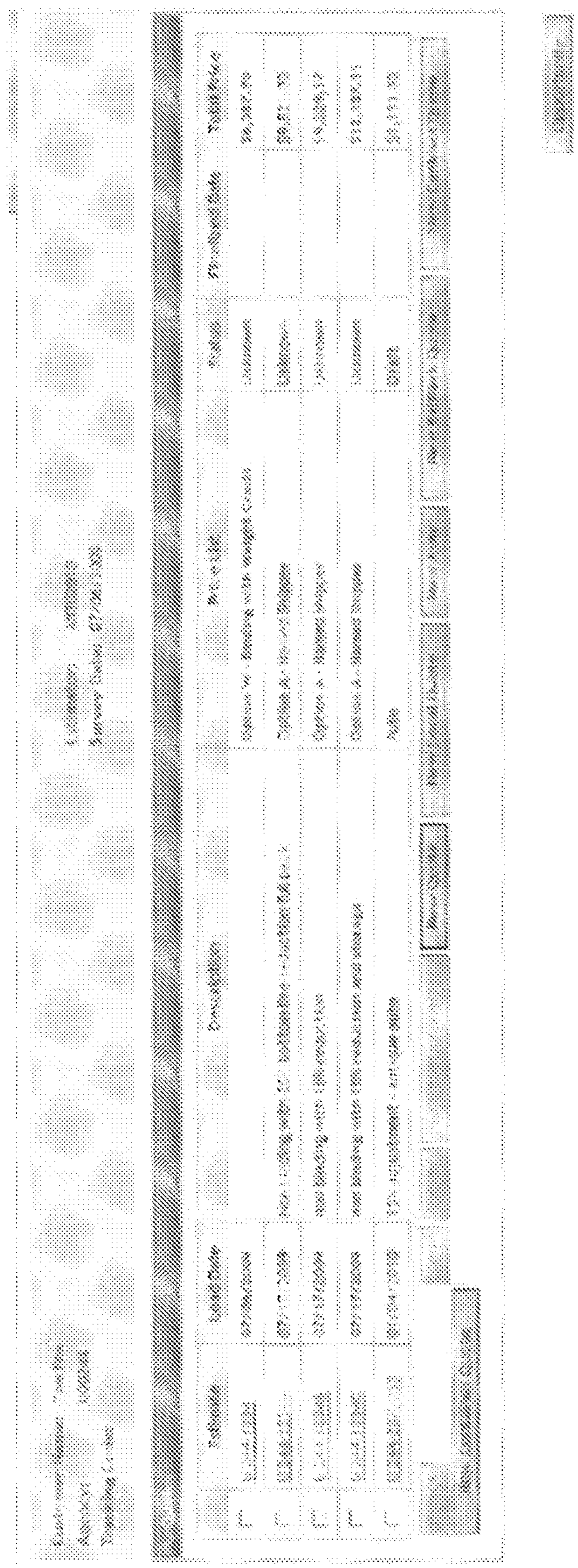

After a quote has been created, My Quotes is the default screen when you access the opportunity (see FIG. 261).

Figure 262:
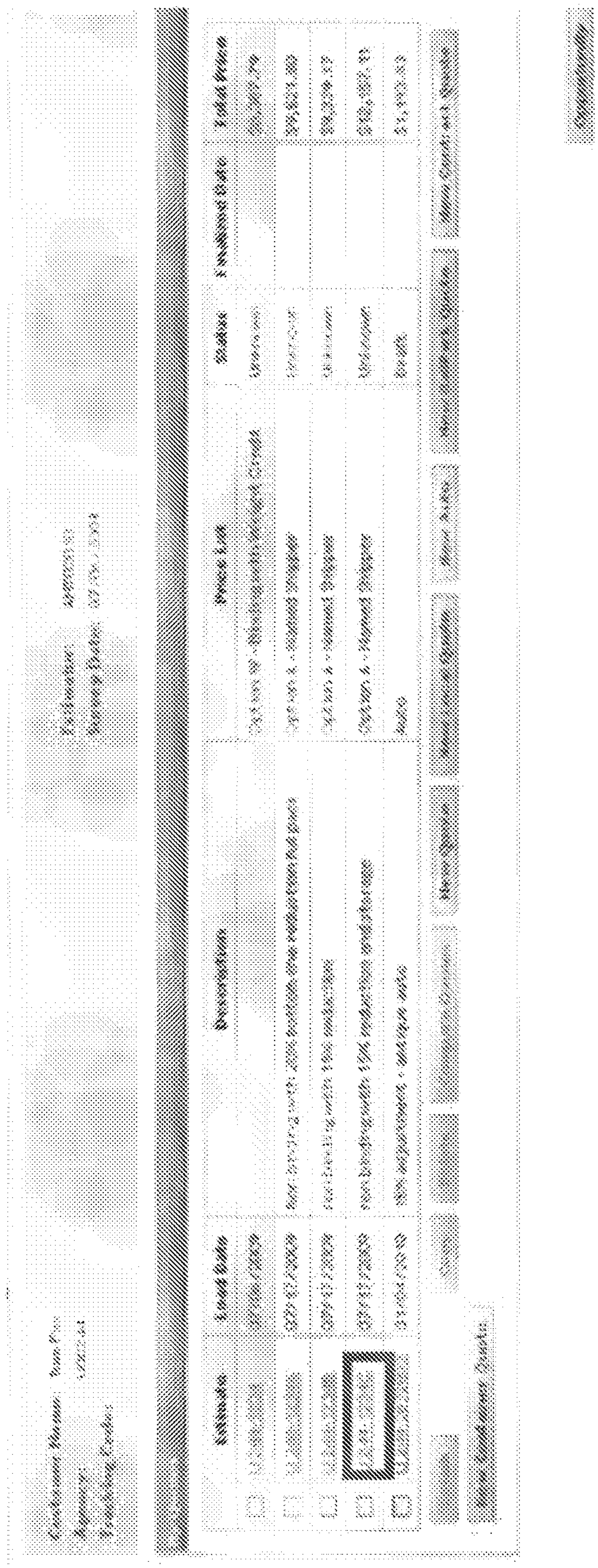
Figure 263:
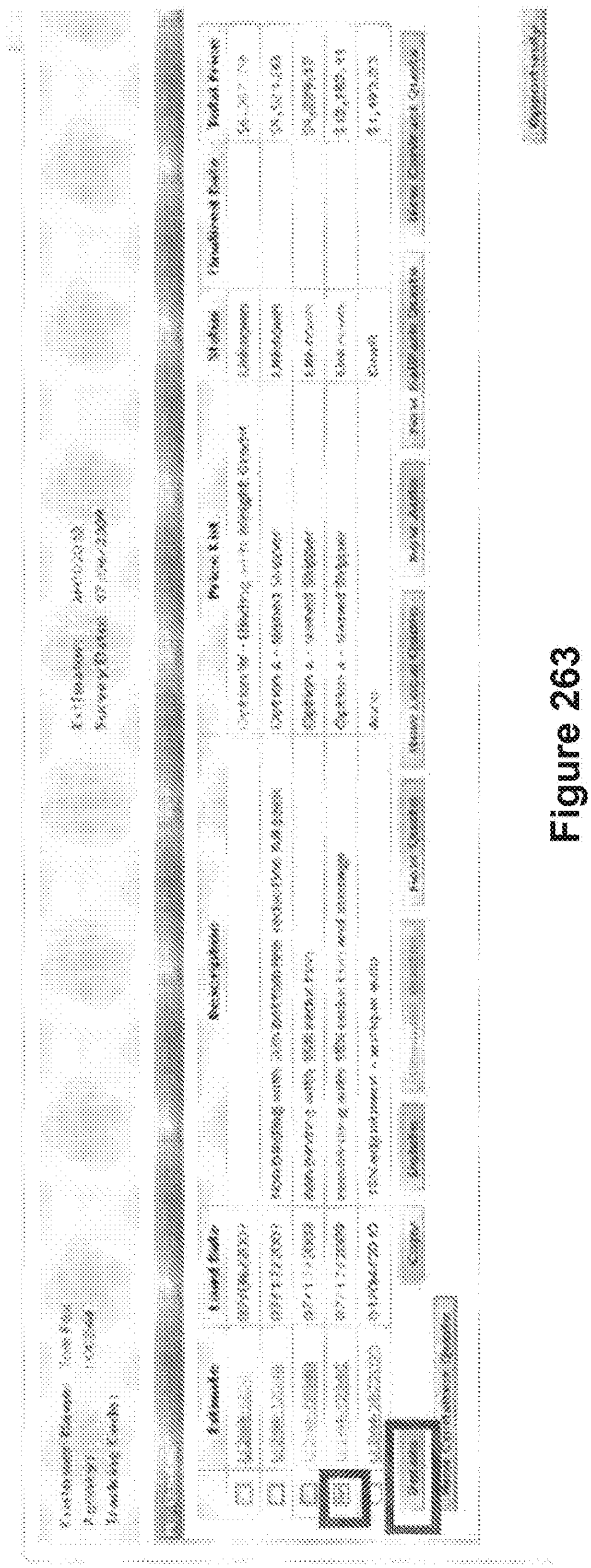

Click on the Quote Number (see FIG. 262) or, select the check box to the left of an estimate and click the Details button (see FIG. 263) to go to the Move Information screen.

Search Quotes by Quote Number

An additional search allows you to search by:

Estimate Number

Load Date

Figure 264:
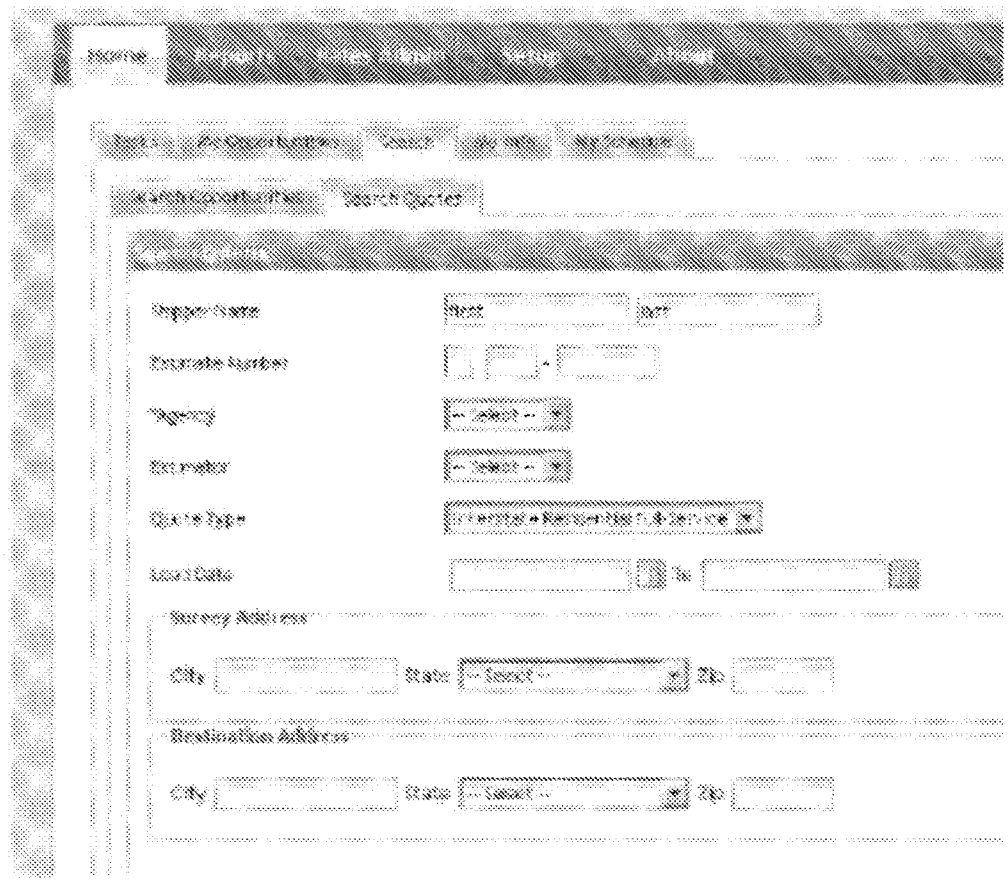

To access the additional search criteria, Select the Search tab, then click the Search Quotes tab underneath the search option (see FIG. 264).

OA Surveys

If the customer's origin address is in location different from your own area, you can assign an origin agent and schedule a preferred survey. Check to make sure the origin agent uses Quotes-To-Go before assigning a survey through the system.

Process Steps to Follow when the Booker and OA Both Use Quotes-to-go

Booker—Assign Origin Agent within the Opportunity

Figure 265:
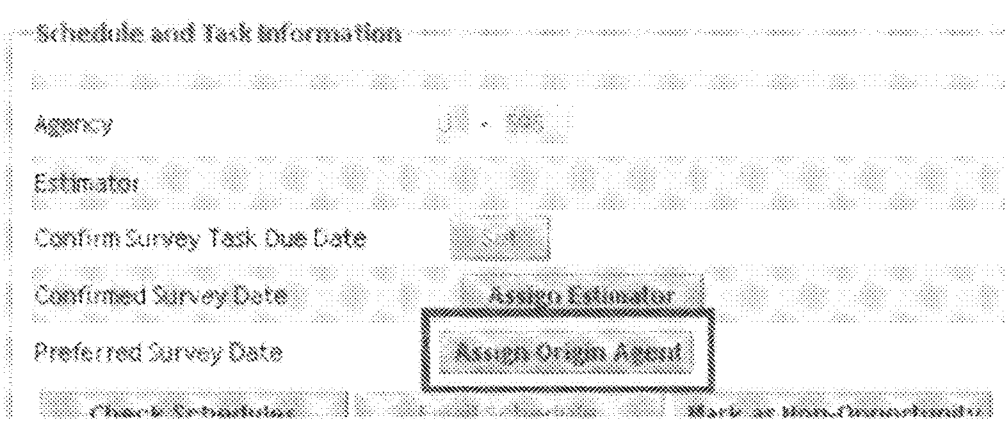

The ability to assign an OA for survey is available for all customer types. To do so, click the "Assign Origin Agent" button within the opportunity (see FIG. 265).

Figure 266:
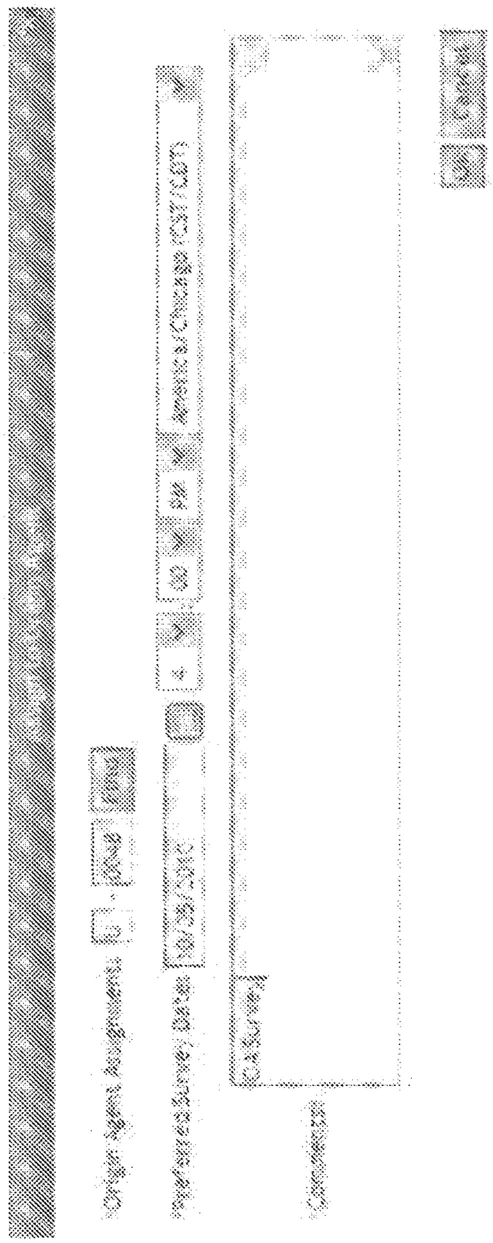

Complete the screen and click OK (see FIG. 266).

Booker—e-Mail the Origin Agent

Figure 267:
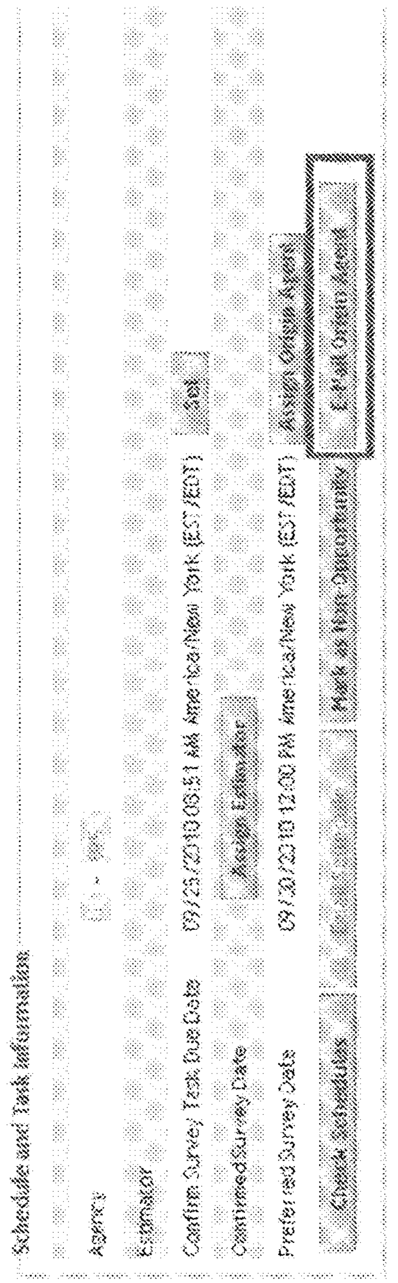

Once an origin agent is assigned, a button appears to allow e-mails to be sent to the Origin Agent (see FIG. 267).

Figure 268:
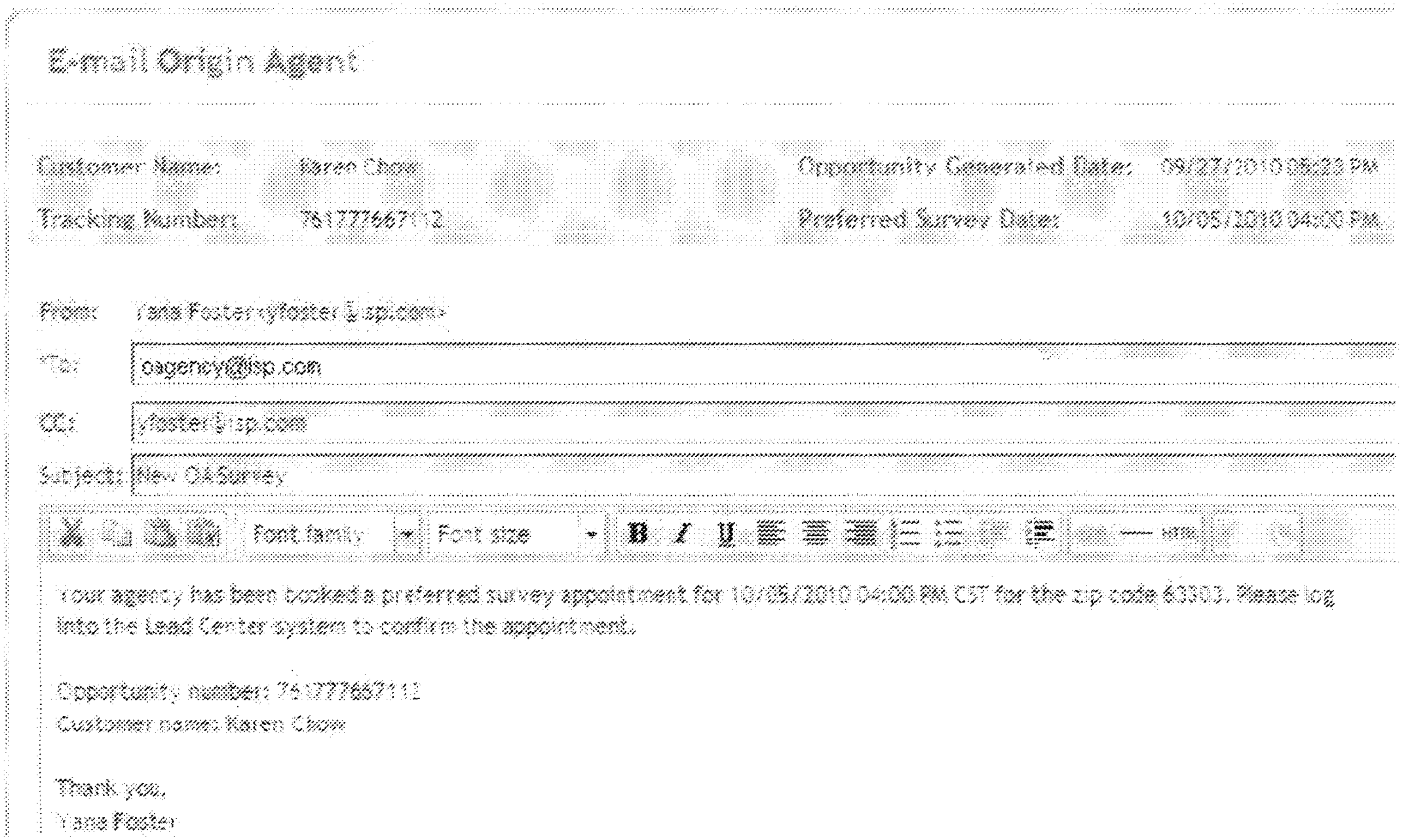

If the origin agent has notification e-mail addresses setup via the SETUP tab in Quotes-To-Go, then a default e-mail address for the OA appears (see FIG. 268).

Click the Send button at the bottom of the screen.

Origin Agent—View Perform Survey Tasks

Figure 269:
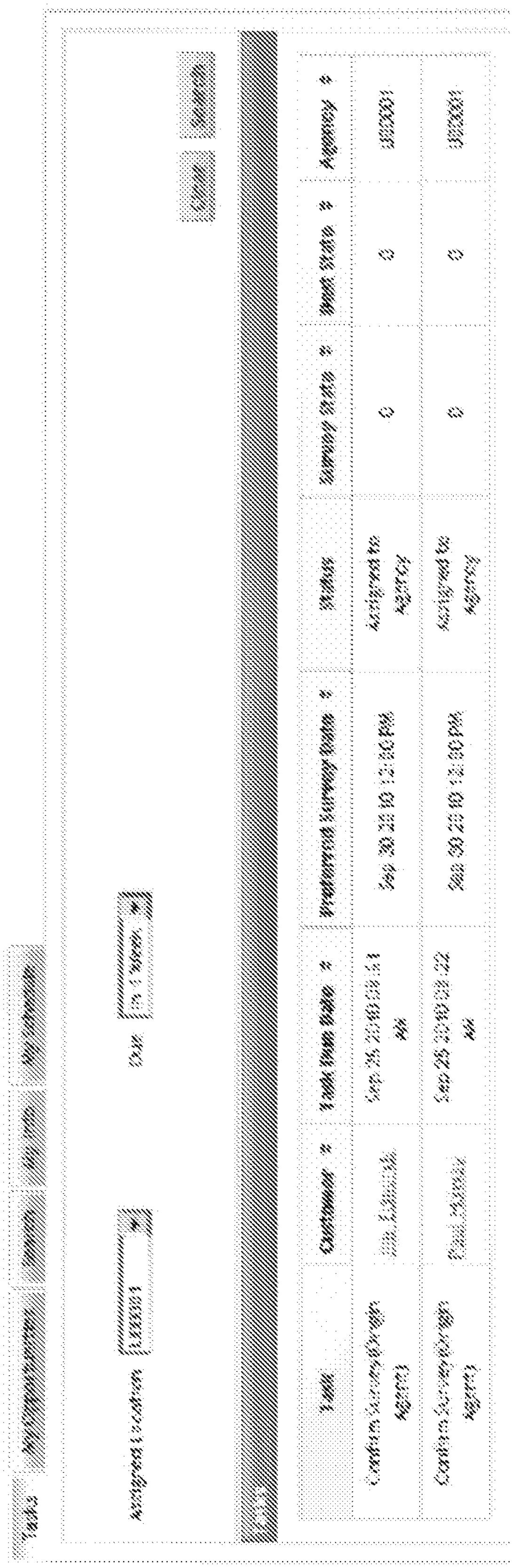

Once assigned as an Origin Agent, the OA sees a task to Confirm the OA Survey in the default task list and My Schedule calendar (see FIG. 269).

Assign this Origin Agent task to a specific salesperson, who receives a Perform Survey Task.

Origin Agent—Create Survey without a Quote

Figure 270:
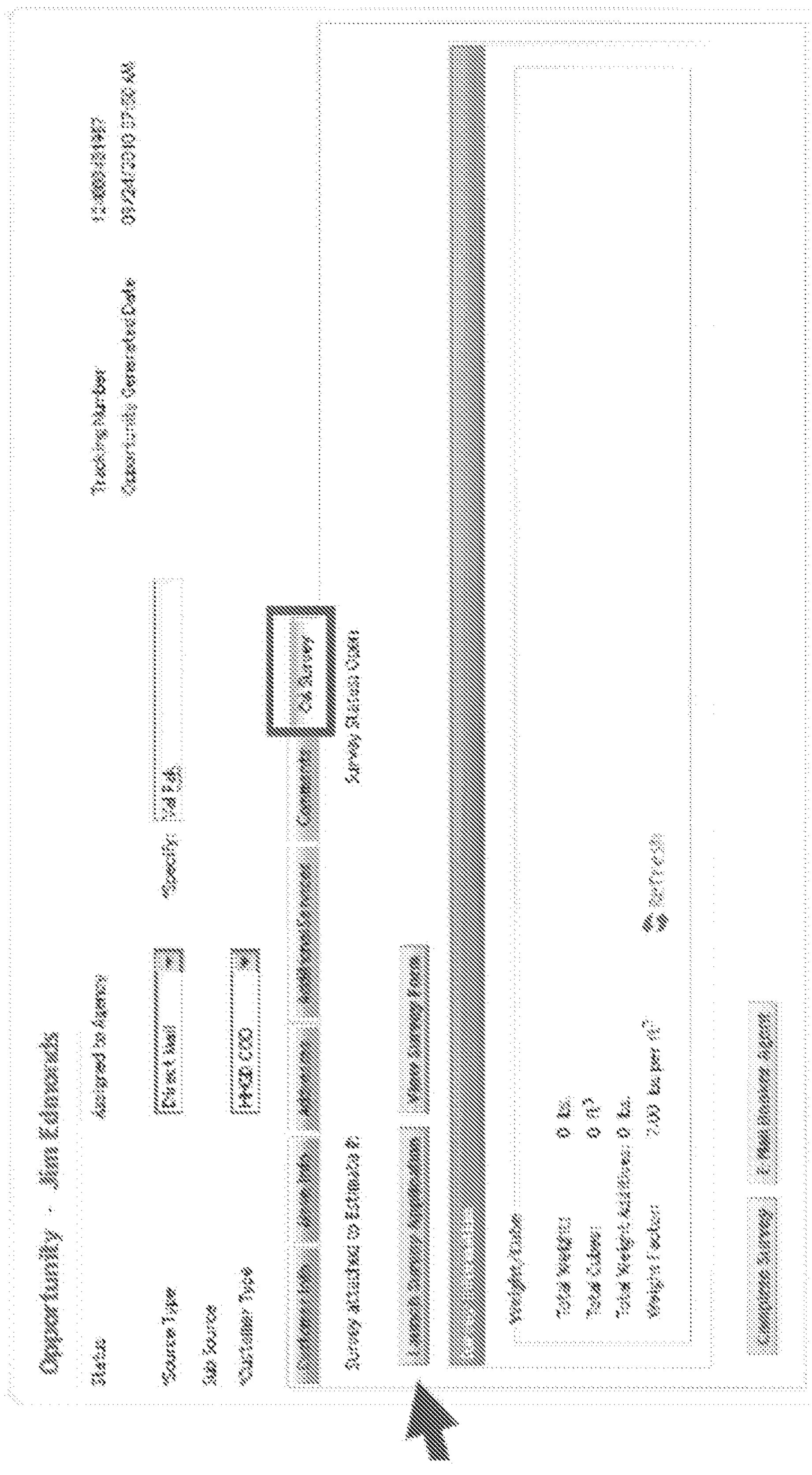

As the Origin Agent, click the OA Survey tab within the opportunity to launch and create an OA survey (see FIG. 270).

Figure 271:
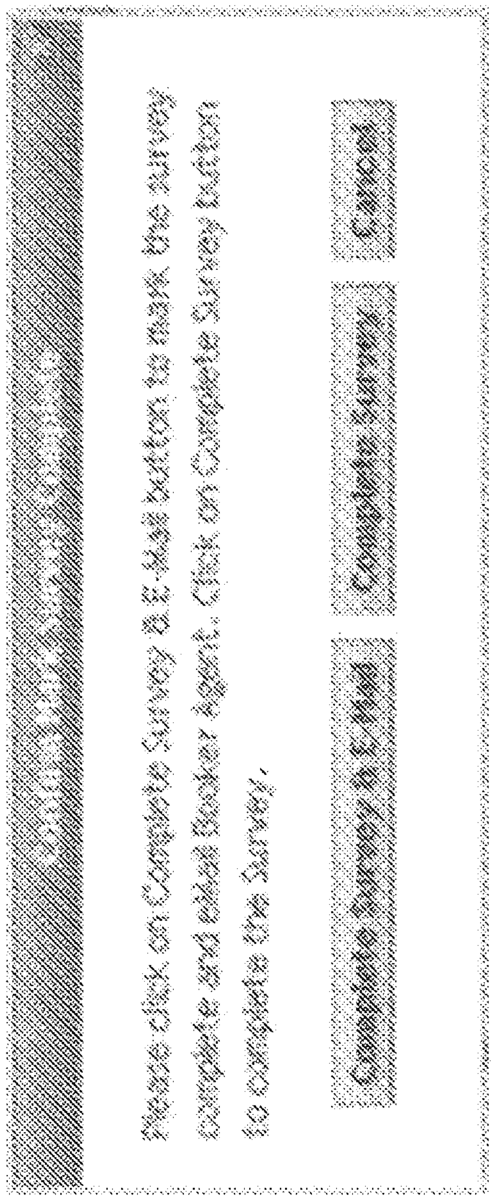

The survey is then performed without the need to create a quote or enter an estimate number. When the survey is complete and has been uploaded, click the [[Complete Surveys & E-mail]] button (see FIG. 271). This allows you to mark the survey as complete and inform the Booker via e-mail. You also have the option to complete the survey without e-mailing the Booking Agent.

Booker—Receive OA Surveys and Attach to Quotes

Figure 272:
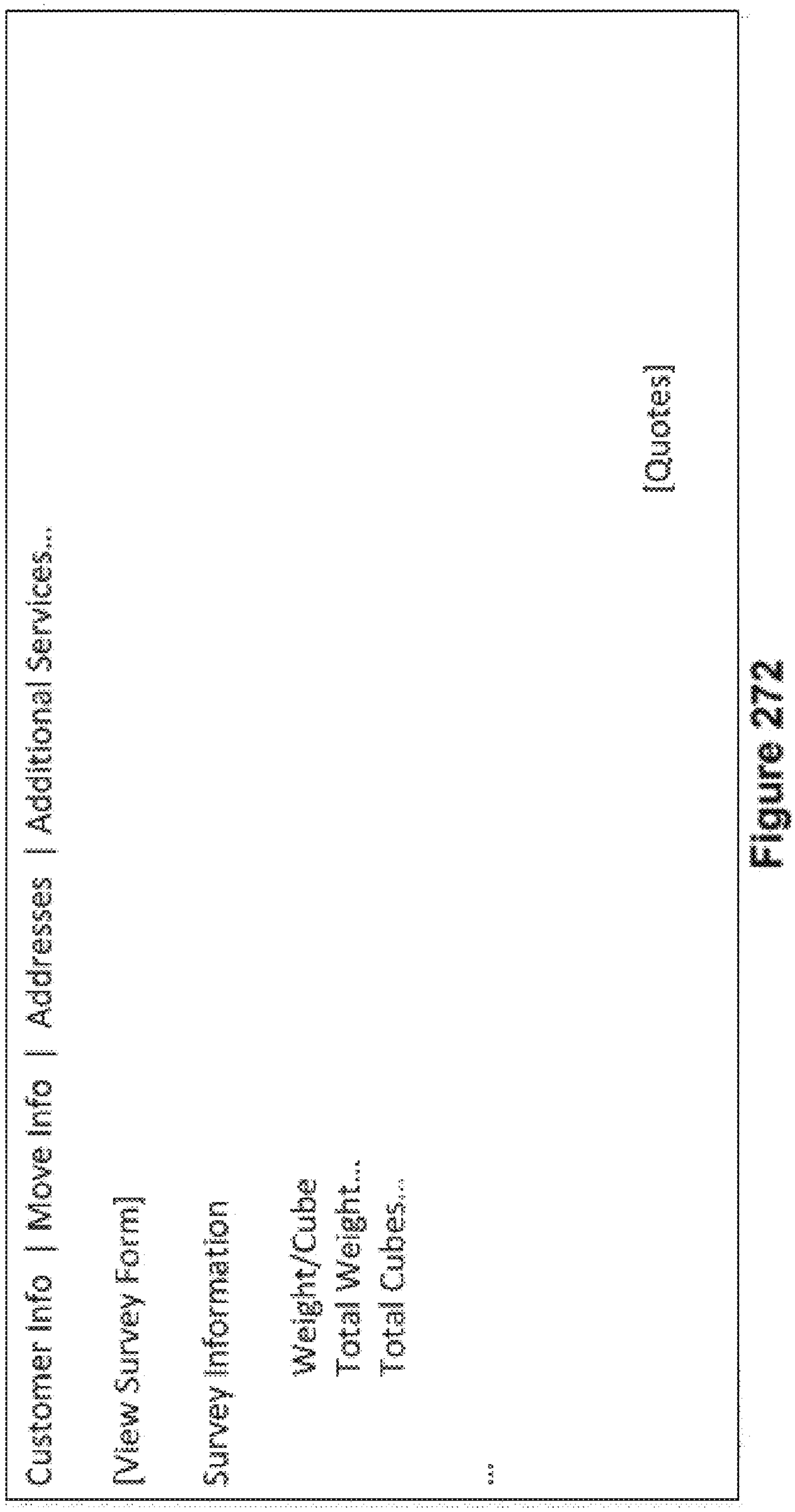

As the booker, once an OA survey has been performed, it can be viewed from the OA Survey Tab within the opportunity (see FIG. 272). The name and contact information of the person who performed the survey is displayed on the screen.

As the booker, you can now create a quote to attach this survey. Create a quote following normal processes.

Figure 273:
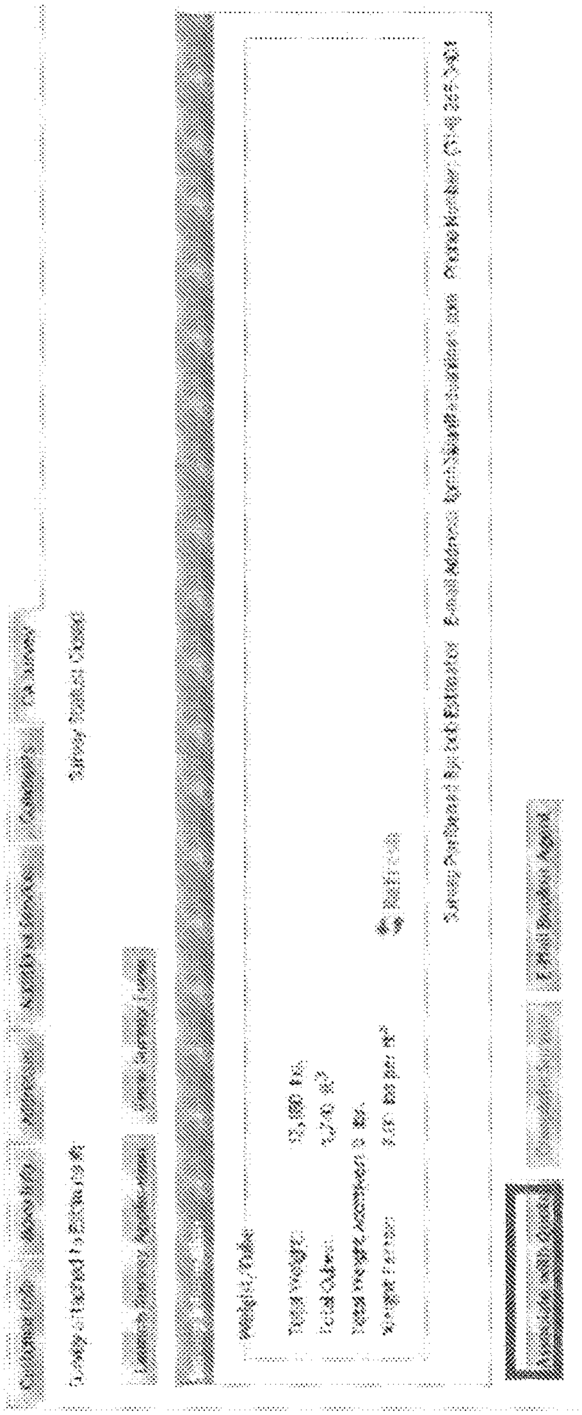

The Associate with Quote button displays on the OA Survey screen (see FIG. 273). Click the Associate with Quote button after you have created a quote and assigned an estimate number on the Move Information screen.

Figure 274:
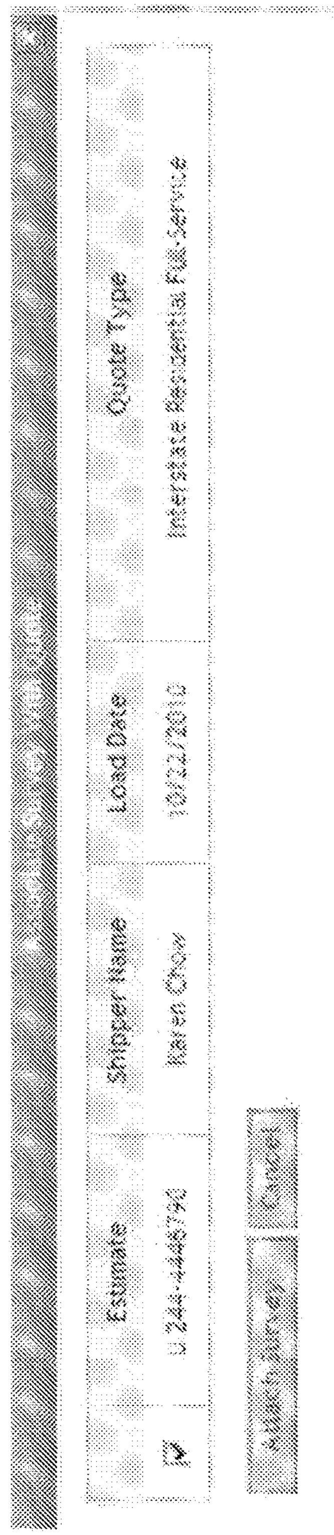

Select the quote that you created. Click the Attach Survey button to copy the survey into the selected quote (see FIG. 274). Continue with the normal rating process, entering accessorials, valuation, etc. When you calculate estimate totals on the Summary screen, the Order for Service and other documents are available for you to provide to the customer.

Process Steps to Follow when Just the OA Uses Quotes-to-go

Figure 275:
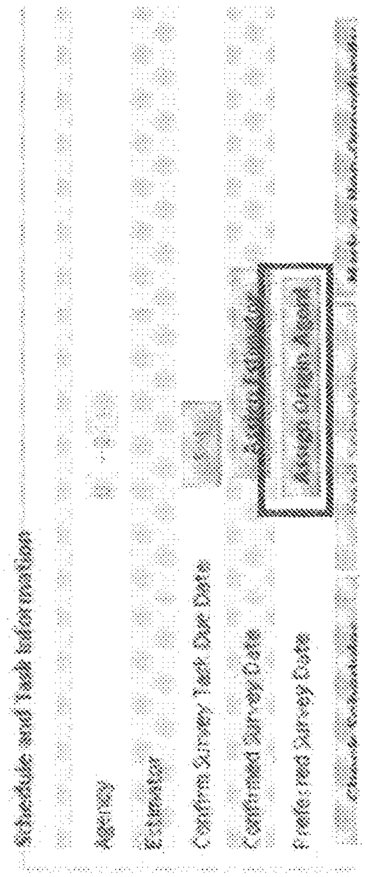

If you, as a Quotes-To-Go Origin Agency, receive an OA request from a Booker that does not use Quotes-To-Go, create the opportunity and assign yourself as the OA (see FIG. 275).

Figure 276:
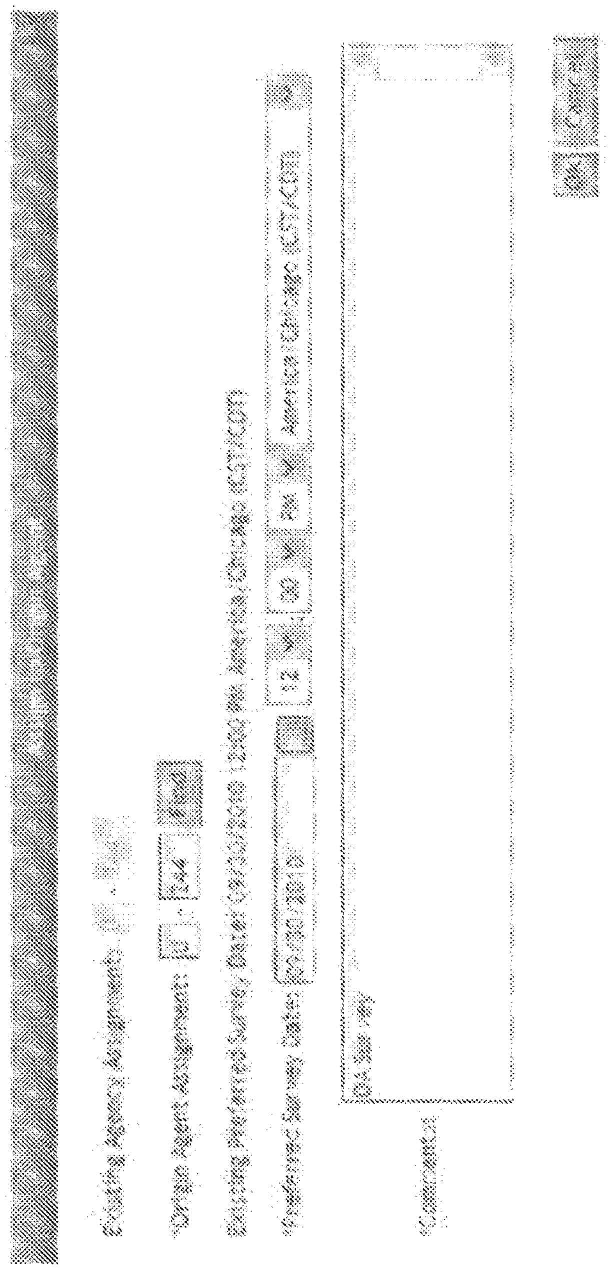

Complete the screen and click OK (see FIG. 276).

Figure 277:
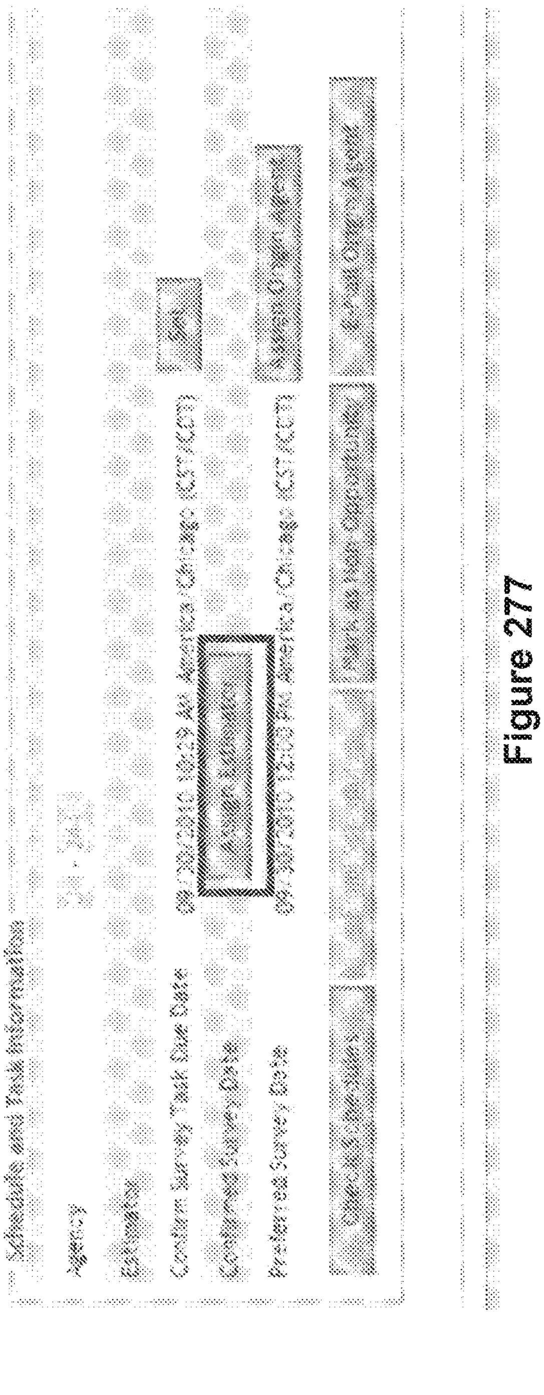
Figure 278:
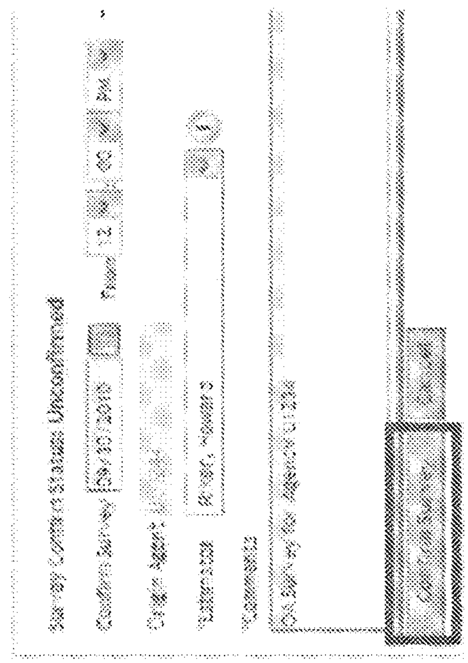

Assign the estimator who will perform the OA survey (see FIGS. 277 and 278).

Figure 279:
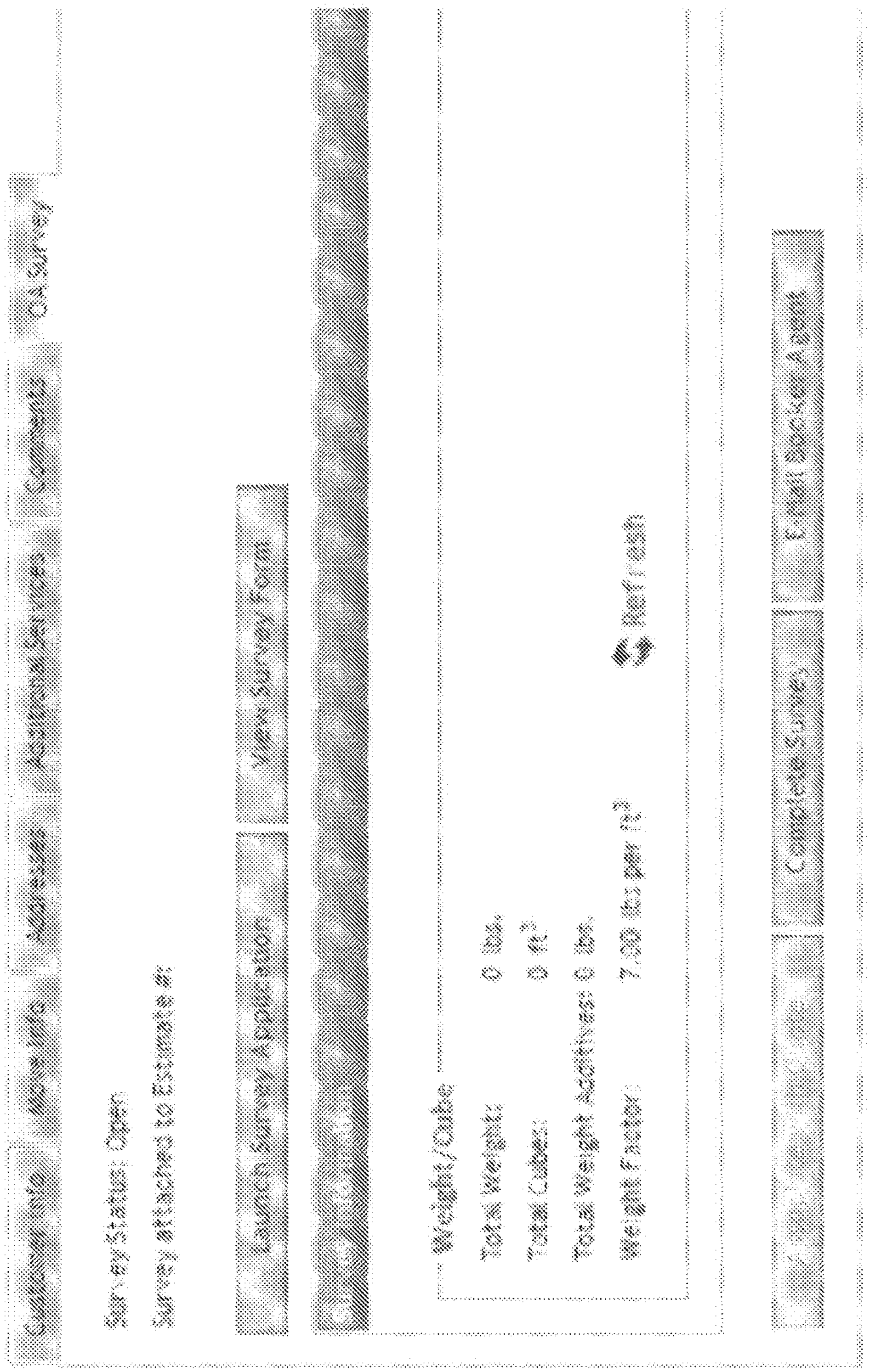

The Estimator accesses the opportunity from the task list or calendar and launches the survey from the OA survey tab (see FIG. 279). This allows the survey to be performed without creating a quote or using an estimate number.

The survey is performed following normal Quotes-To-Go processes. When the survey is complete, go back to the OA survey tab in the opportunity and click the View Survey Form.

Figure 280:
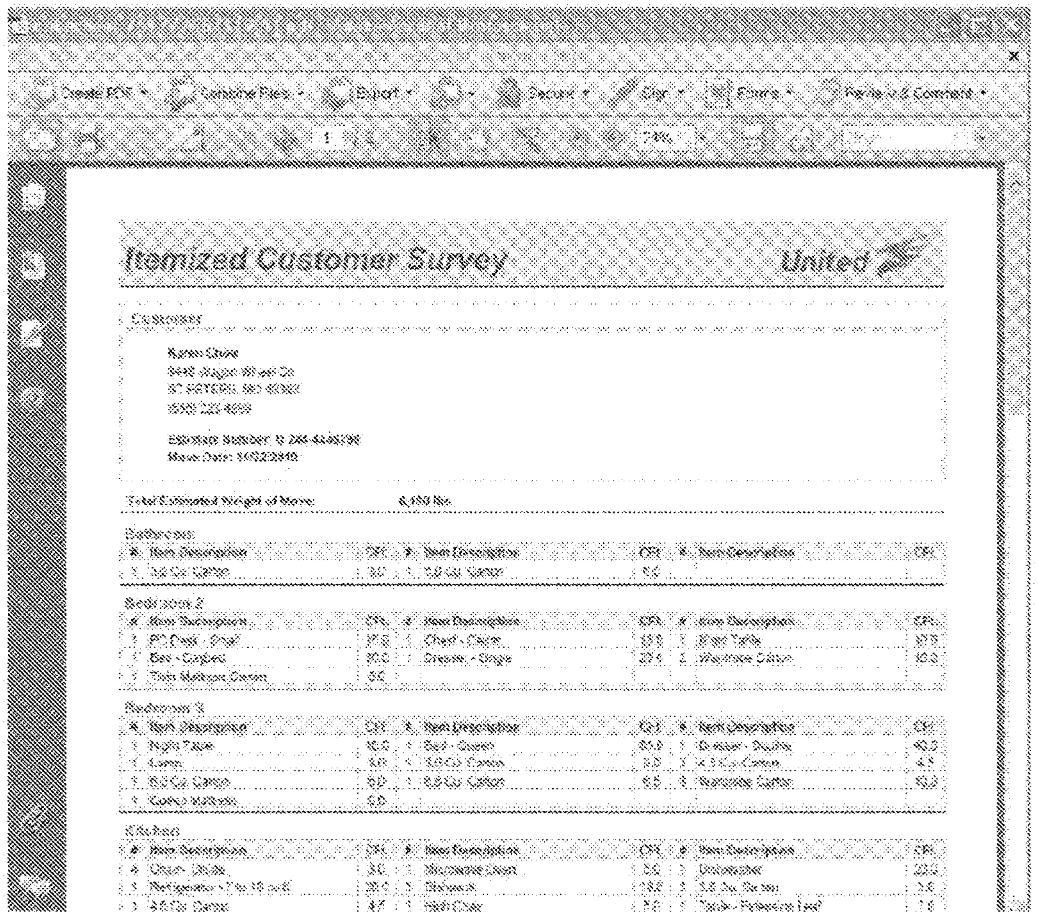

You can use the File/Save option to save the survey to your PC and e-mail it as an attachment, or you can print and fax the document to the Booker who does not use Quotes-To-Go (see FIG. 280).

Feedback—Vote and Track Enhancements

Figure 281:
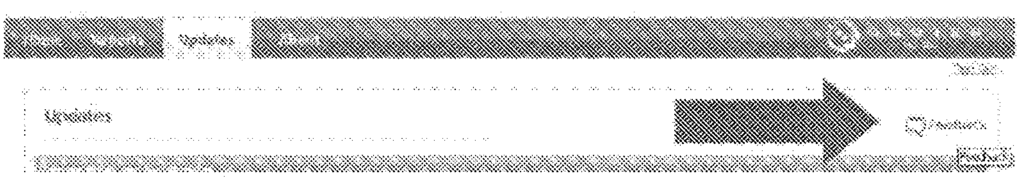

In order to more effectively collect, prioritize, and track the status of feedback, a feedback button is available on the Updates page of Quotes-To-Go (see FIG. 281). This button is available for any agent user and allows you to enter items you would like to see enhanced and/or changed about Quotes-To-Go. Each agency user receives 10 votes to enter their own enhancements and to vote for other agent's enhancements.

In addition, entering feedback in this method allows you to receive responses from the Quotes-To-Go team and update notifications as your enhancement is placed into the release schedule.

To use, click the feedback link on the Updates screen.

Please note: The feedback button should only be used for new enhancements.

APPENDIX E

Setup Guide

Outline

Overview
  How to use this Manual
  What is covered in this manual
System Requirements
  Maximizing Screen Usage
Logging into Quotes-To-Go
  Logging In
  Exiting the System
  Type of Access
Setting Up
  Using My Info to Customize the Application
Cross-Rep Signatures for Survey and E-Mail Overview How to Use this Manual This manual serves as a reference guide to help you get up and running in the Quotes-To-Go system.

What is Covered in this Manual

This manual covers basic setup information for the Quotes-To-Go system, which includes:

- System Requirements
- Logging into and Exiting Quotes-To-Go
- Setting Up and Customizing the Application Three additional manuals provide details by role for specific audiences. They include:

- User Guide for Estimators—This manual shows the Salesperson how to create different types of quotes.
- User Guide for Agency Lead Coordinators—This manual shows the ALC how to assign and manage opportunities, set agency busy time on the Quotes-To-Go calendar, access reports, create OA surveys, and register orders.
- User Guide for Rate Administrators—This manual shows the person assigned the EstimateAgentRatesAdmin role how to enter, update and maintain your agency's local and intrastate rates.

System Requirements

Quotes-To-Go requires the use of Google's Chrome browser for optimal performance when working with the survey. Please refer to the Installation Instructions on The U at Sales and Marketing/Quotes-To-Go. Do not set the Google Chrome browser as your default browser. Instead, follow the steps in the installation instructions to save a shortcut to your desktop, and then always launch Quotes-To-Go from the desktop icon.

JavaScript must be enabled on your browser (typically a default setting). Adobe Acrobat Reader is used to view forms (typically installed as part of your web browser).

Quotes-To-Go can be used from any computer and does not require a touch screen with a stylus. However, the usability of the application for in-home estimating is greatly enhanced with this type of device. Users who are not in the customer's home and wish to run reports, set appointments, or view quotes can use any machine with an Internet connection.

Quotes-To-Go is intended to be viewed with a minimum screen resolution of 1024×476; however, higher resolutions, such as 1024×768, will enhance the user experience.

Printing is handled through the MS Windows or Operating system device. There are no special printer requirements for Quotes-To-Go beyond the installation of a print driver on the device. See your specific printer documentation for details.

Maximizing Screen Usage

It is recommended that the Quotes-To-Go application be viewed in full screen mode. To enter full screen mode, press the F11 key on your keyboard.

Logging into Quotes-to-go

Logging in

Figure 282:
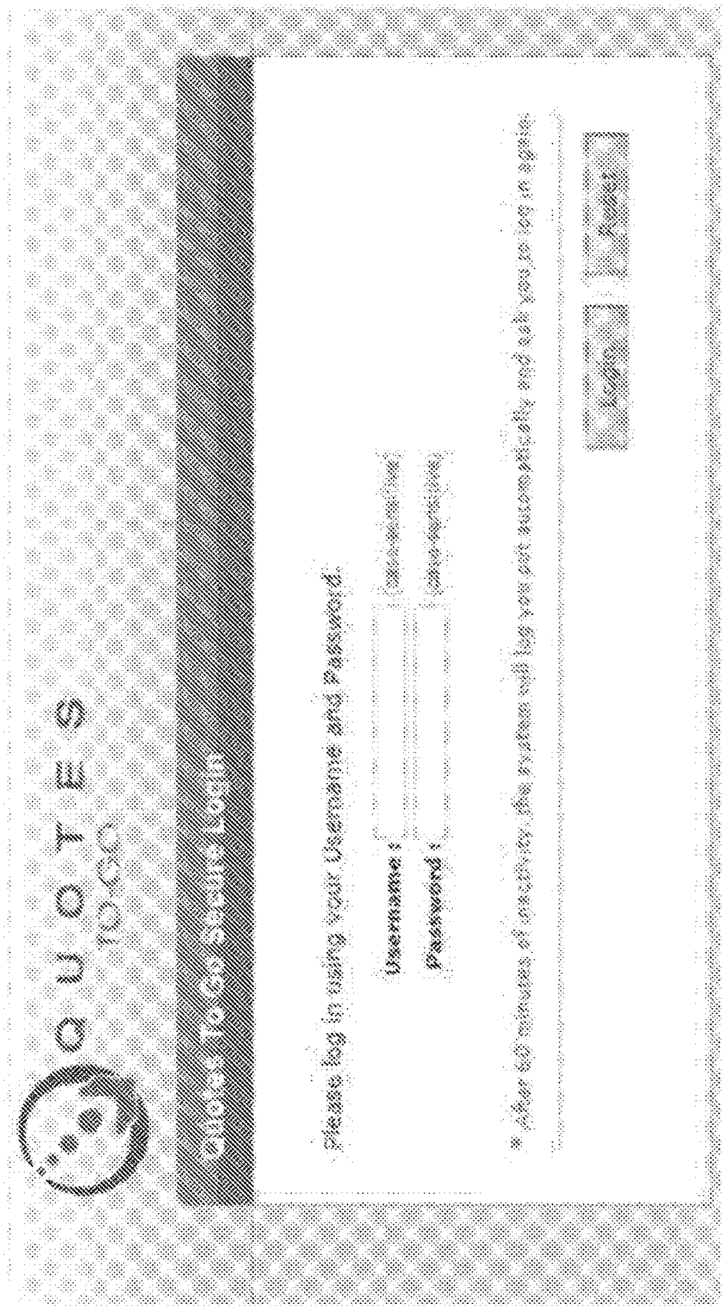
FIGS. 282-315 show exemplary screenshots for a system as described in Appendix E.

If you are connected to the Internet, Quotes-To-Go (see FIG. 282) can be accessed by visiting https://quotes.unigroupinc.com.

Use the same individual user id and password assigned to you by your agency security administrator to access "The U" to access Quotes-To-Go.

Figure 283:
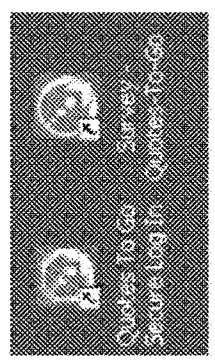

Use the desktop shortcut you created when following the Google Chrome installation instructions to access Quotes-To-Go or the Offline Survey (see FIG. 283).

To protect the security of our customers' information, you are automatically logged out after 60 minutes of inactivity and are required to log back in.

Exiting the System

Figure 284:
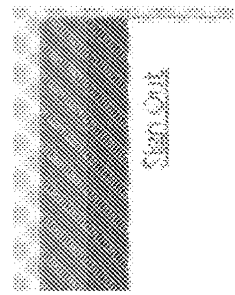

To exit the system, click on the Sign Out link in the upper right-hand corner of the screen to logout of Quotes-To-Go (see FIG. 284).

Types of Access

There are three agency access levels for Quotes-To-Go which are assigned by your agency security administrator (ASA). The access levels include:

- EstimateAgentAdmin—(Agency Lead Coordinator) This user can:
  - View all estimators' calendars within their agency.
  - Customize screens to receive leads assigned to their agency by the Home Office (Leads, Affinity Partnerships, etc.)
  - Send and receive Origin Agent survey requests to/from other agencies
  - Update quotes entered into the system by estimators within their agency family
- EstimateSalesRep—(Also known as the Estimator or Salesperson) This user can:
  - Access only the opportunities assigned to them.
- EstimateAgentRatesAdmin—(Also known as the Rates Administrator) This user can:
  - Enter and modify local and intrastate rates for a given location(s). Local and intrastate quotes do not function without entry of these rates from an Agent Rate Administrator.

Setting Up

Using My Info to Customize the Application

Figure 285:
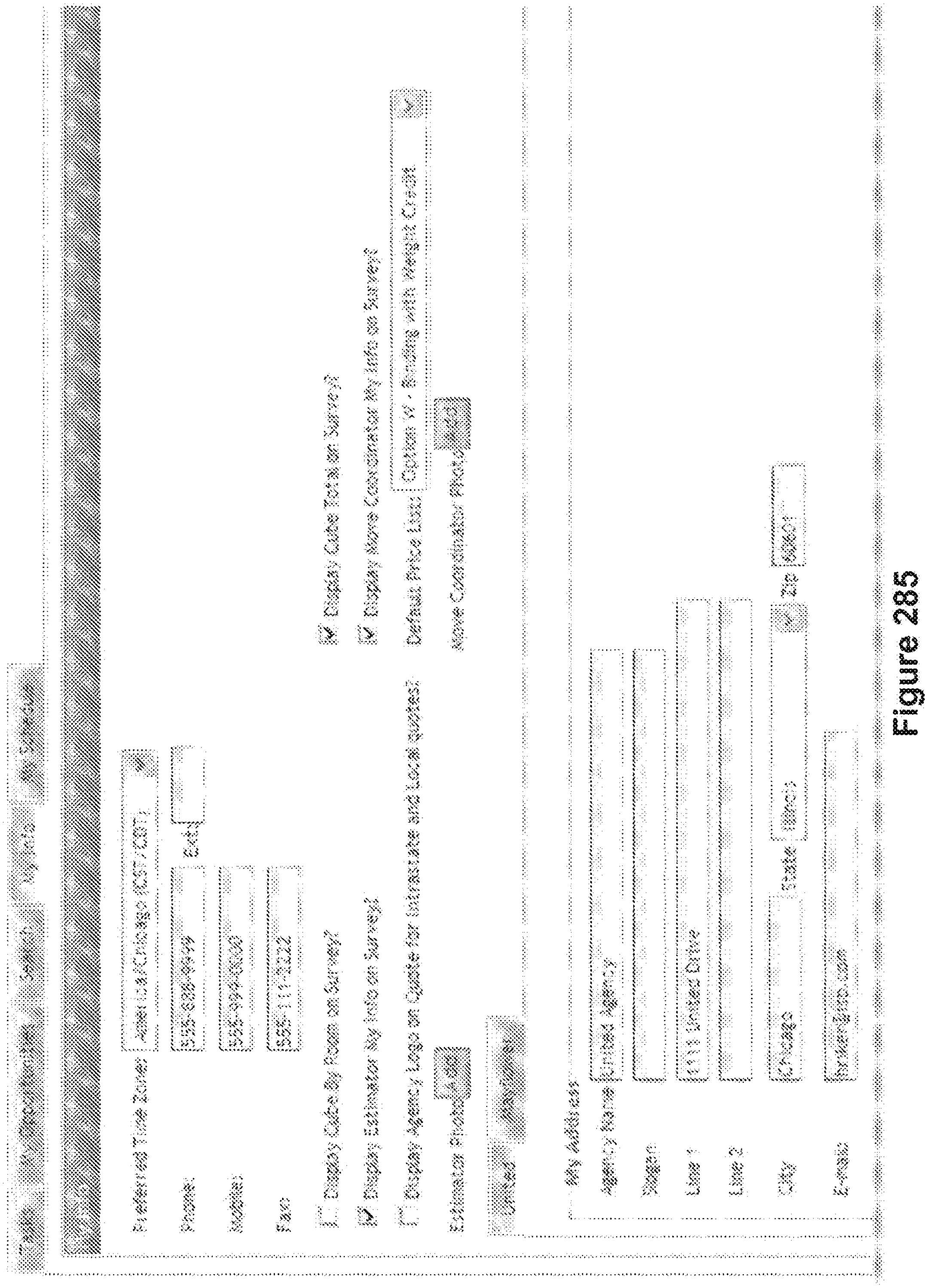

The My Info tab on the home page allows several customizations to be made (see FIG. 285). Use this section to:

- Set the time zone of your agency
- Display your contact information to be printed on all surveys Click the appropriate Display Cube check box if you want cubic feet to print on the survey.

To display a photo or logo on the cube sheet, click the Display Estimator My Info on Survey? and/or Display Move Coordinator My Info on Survey? Check box(es), then click the Add Photo button.

Figure 286:
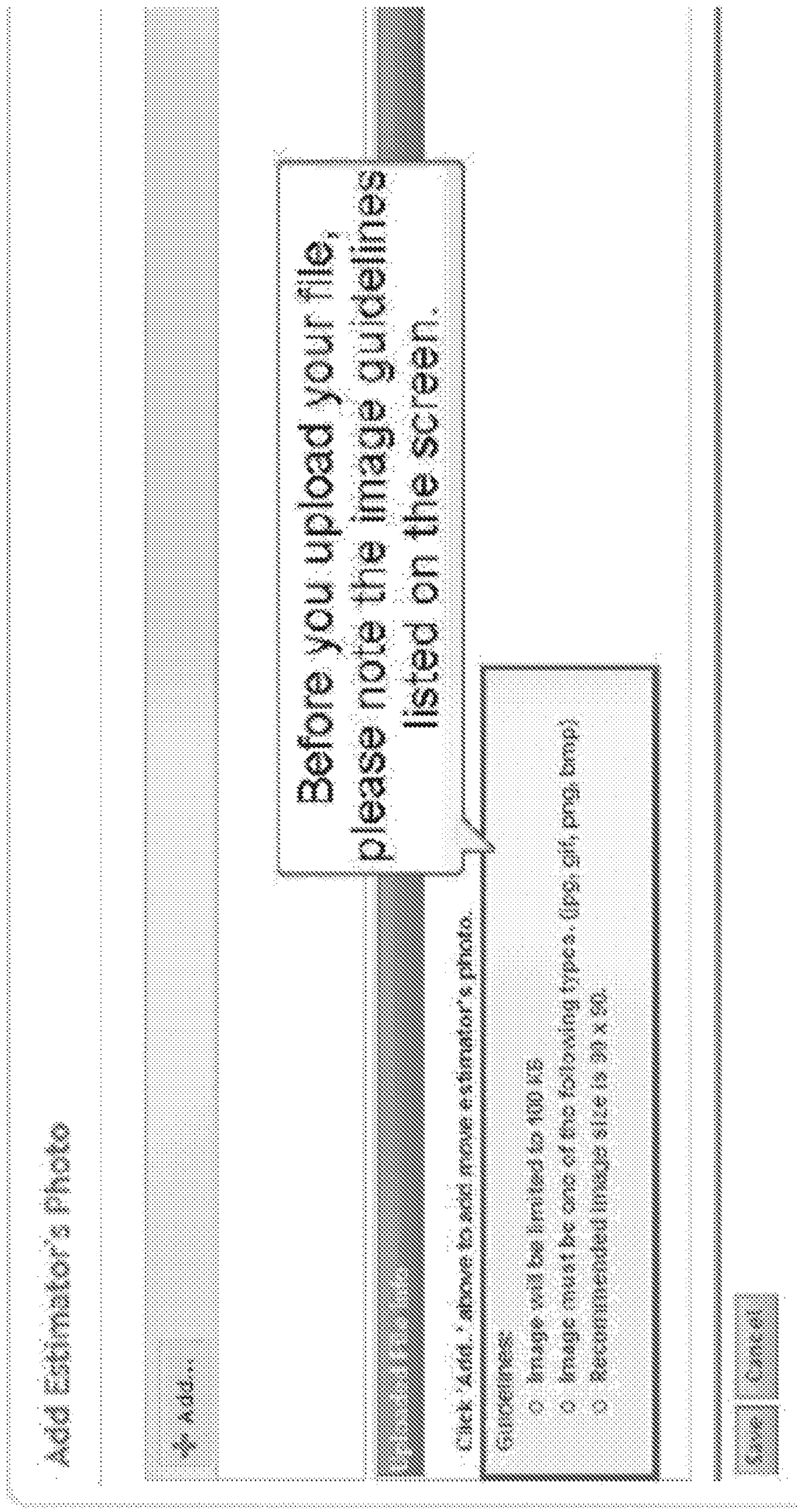

Follow the image guidelines listed on the screen (see FIG. 286), then use the Add . . . button to browse for the photo or logo on your computer. Once the upload is complete, click Save.

Figure 287:
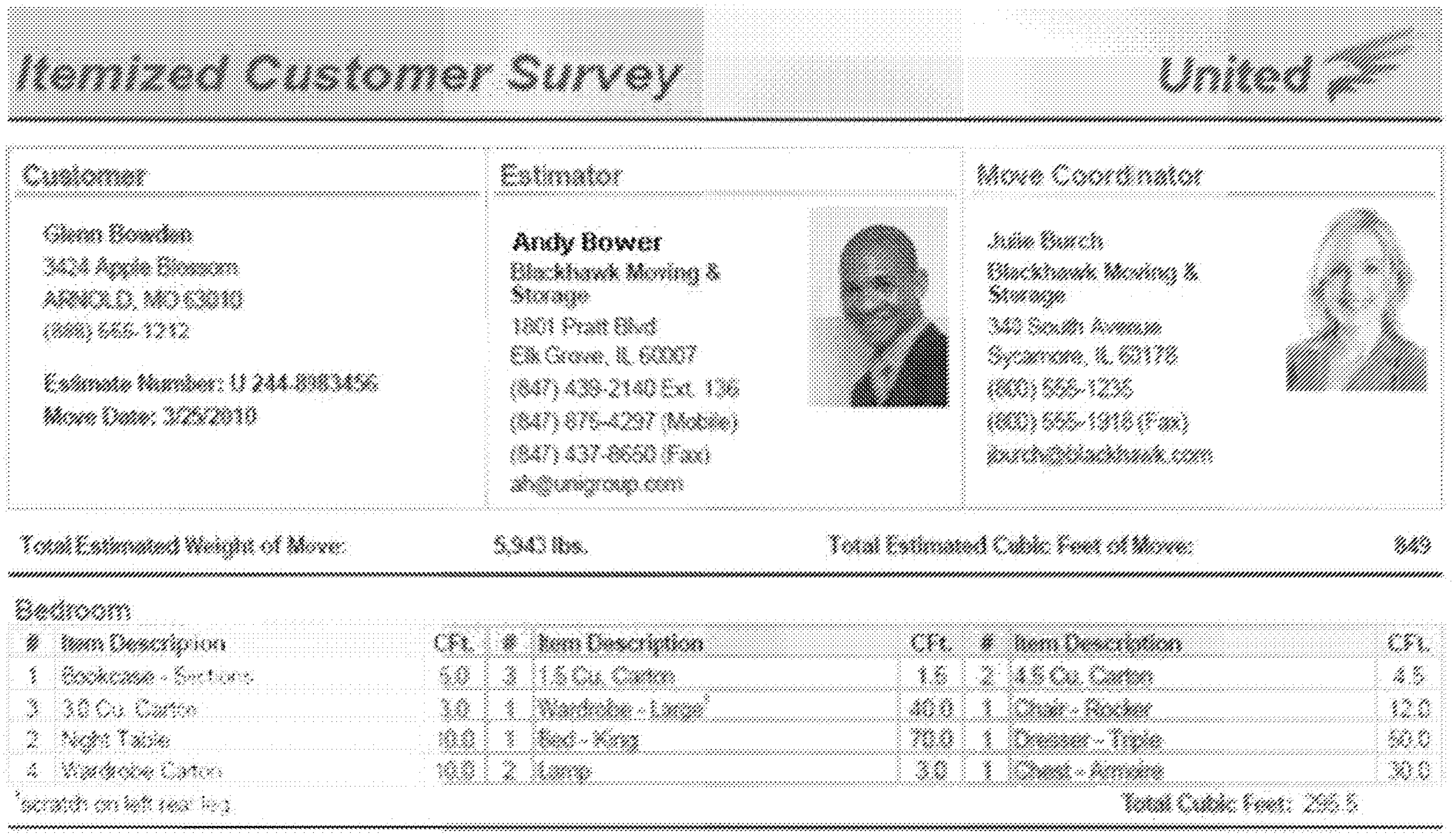

You can upload a photo for either or both the Estimator and Move Coordinator. Photos display on the cube sheet after the quote is finalized (see FIG. 287).

Figure 288:
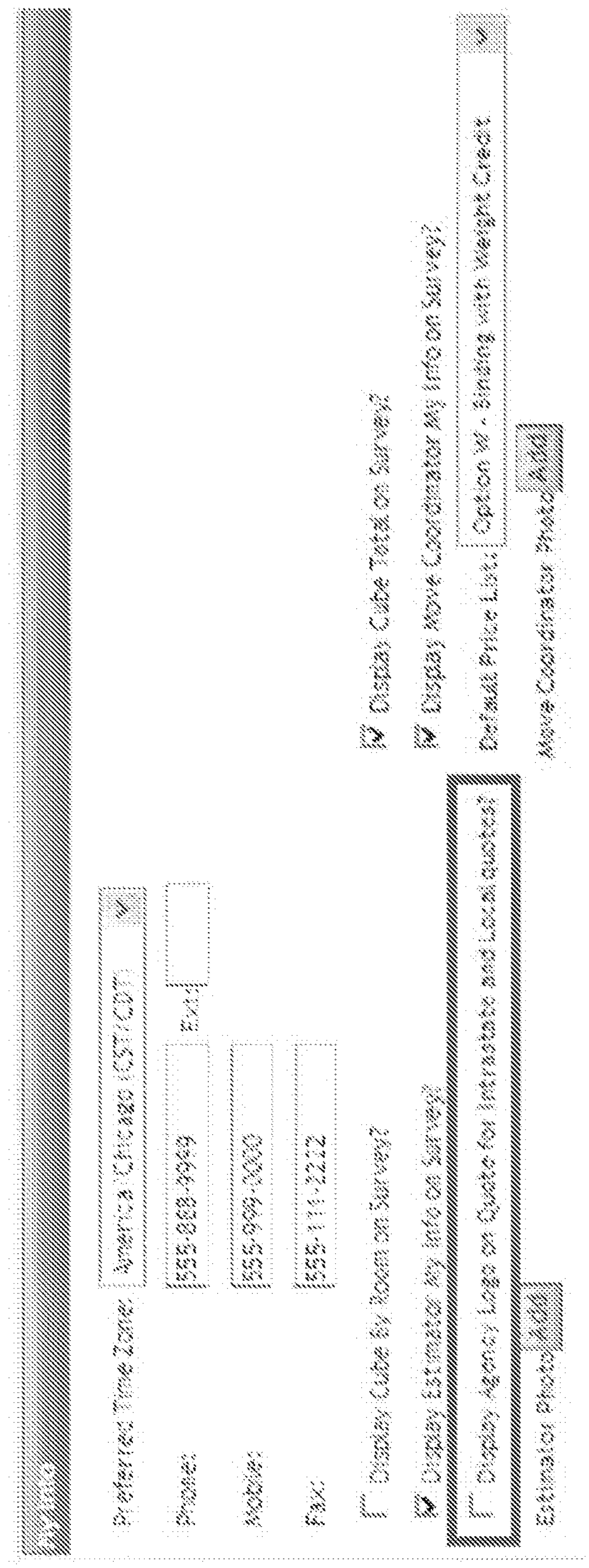

If you'd like to print your agency logo on local and intrastate quotes, select the check box (see FIG. 288). Your Agency Lead Coordinator must upload the logo to the system, so make sure they have the logo available for use in Quotes-To-Go.

Select the interstate price list that you use most often to be the default display for every quote. Selections include Option A, Option W or Option NW.

Cross-Rep Signatures for Survey and E-Mail

Figure 289:
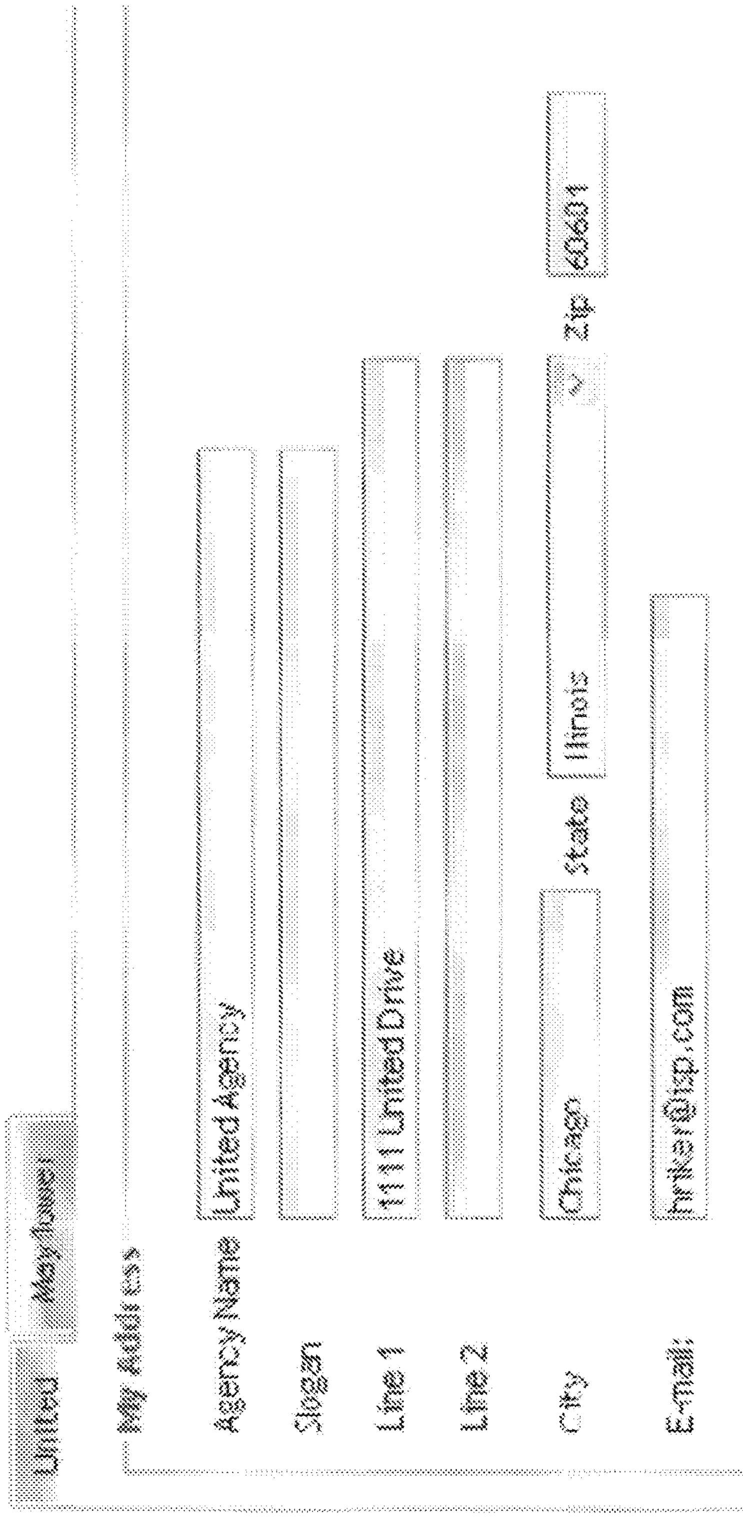

If your user ID is setup to have access as a cross-rep (you have authority for both United and Mayflower locations), you can setup a separate signature and estimator e-mail address for each brand. Select the appropriate tab on the My Info screen to enter the information for each brand location (see FIG. 289). This signature is used on both the Printed Survey, and on e-mails sent to the customer from Quotes-To-Go.

You can change the Estimator's e-mail address in the My Address area of the United and/or Mayflower tabs.

Figure 290:
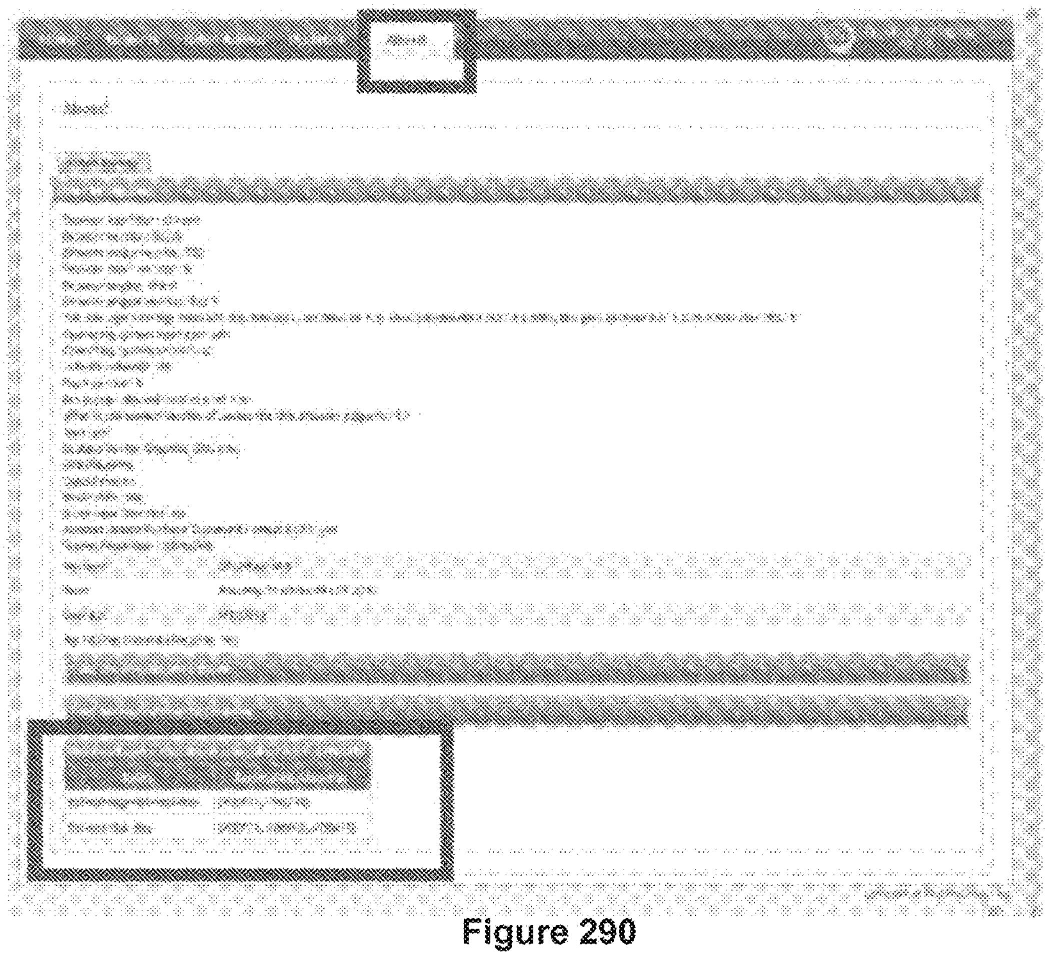

If you do not see this option, ensure that your ID is setup for both a United and Mayflower location. Visit the About tab and click on Other Information blue bar to verify your role and agency assignments at the bottom of the screen (see FIG. 290). Your Agency Security Administrator can make any assignment changes, as needed.

General Program Questions

As an Agency Lead Center Coordinator, why do I now see the Quotes-To-Go logo, and new features?

Why doesn't the customer seem to recognize my Agency name when I call to confirm the appointment that the Customer Care Center set?

What is the difference between the EstimateAgentLeadsCoordinator and the EstimateAgentAdmin roles?

What role should my Move Coordinator be assigned if some of our sales people use Quotes-To-Go and some do not?

When the Customer Care Center assigns my agency as a lead, can I be notified by e-mail?

Am I being forced into using this? OR Are my existing devices still supported?

Is there integration to other agency software (such as existing agency calendaring, or move management)?

How do I get the latest software updates to download on my office PC or tablet?

How can I change the magnification of the Survey screen? The text is very small.

Why do I have to login again after 60 minutes of inactivity?

Where can I find the latest updates to Quotes-To-Go documentation?

How can I request new features or changes in Quotes-To-Go?

Installation and Configuration Questions

Which tablet should I buy?

Can you tell me what kind of printer I can use?

Can two sales reps share a tablet?

Do Apple's iPad or iPhone work with Quotes-To-Go?

I noticed that the installation instructions suggest Google Chrome. Why? Should I make Chrome as default browser for all of my work?

Are there plans to support other browsers?

Process Questions

Setup

How can I assign from a list of estimators? I only see my name in the assignment list.

Can I add a lead source that is unique to my agency to keep track of our direct marketing efforts?

Opportunities

Can I send surveys to Origin Agents at other locations?

Do OA Surveys that went through Quotes-To-Go affect my agency's closing ratio?

How do I remove opportunities from the home page?

Can I enter a zip code and let the system pull up the city and state?

I am entering a valid city/state combination in the opportunity address tab, but the system is giving me an invalid combination error. How can I get it to accept my entry?

Quotes

Has the registration process changed?

How do I put in my own custom language on my local and intrastate quotes?

Where do I see the accumulated weight while performing the survey?

Can I search for a quote instead of an opportunity?

Where in Quotes-To-Go do you indicate what we will unpack if it is not a full unpack?

I can't find a carton for a Grandmother Clock.

Once the order is registered, where can I find the Order for Service number in Quotes-To-Go?

Is there a way to add a pre-set comment to an article in the survey?

Can I make the same change to multiple items in the survey at one time?

I selected a shuttle for over 25 miles, but the pricing does not appear to be right.

Rating

When I try to enter a local quote, why do I receive an error "No Rates found in selected range."?

Can I add intrastate rates? How about rates for more than one state?

Are International rates included? Are Military rates included?

Do I need connectivity to get a price to the customer?

If I performed an interstate survey offline using the Survey shortcut on my desktop, once I am able to get online, can I use the Launch Survey button in Quotes-To-Go to access the survey to upload it for rating?

Can I enter 400N style local rates?

Calendar

How does the calendar work with the Home Office Lead Center?

Why is it recommended that I enter all leads as new opportunities in Quotes-To-Go and assign an estimator using the Quotes-To-Go calendar?

How can I see the whole agency view or a specific estimator view of the calendar?

How can I inform the salesperson of an appointment I scheduled?

Paperwork

Can I upload Photos to my Survey?

Must I finalize the quote to print forms?

Can I change a finalized estimate then re-send eAcceptance?

If I use the Return to Draft button in Quotes-To-Go when an order has been registered for that estimate, does it automatically change RORD?

Explain the difference in paperwork processes between traditional white paper forms and eAcceptance.

Can I have the customer just sign the one page estimate to initiate the move process?

34B34BWhat kind of documents can be eAccepted?

In the eAcceptance forms I don't see the Additional Price List of services that could be encountered at destination. Do we need to get that signed?

Can I display my agency logo on my local quotes?

Reporting

Where are the reports?

How can I view my agency's closing ratio statistics?

How can I obtain a better understanding of my closing ratio statistics?

Questions?

General Program Questions

As an Agency Lead Center Coordinator, why do I now see the Quotes-To-Go logo, and new features?

Quotes-To-Go is a new online estimating platform available from the Home Office. The process for your leads has not changed. Please log on to The U and refer to the -Fact Sheet- and -User Manuals- for information about Quotes-To-Go. Please contact -Marilyn Hoffman- for more details on the program.

Why doesn't the customer seem to recognize my Agency name when I call to confirm the appointment that the Customer Care Center set?

Be sure to emphasize the United or Mayflower brand names. The customer is not familiar with individual agency names at this stage of the process.

What is the difference between the EstimateAgentLeadsCoordinator and the EstimateAgentAdmin roles?

The EstimateAgentLeadsCoordinator role is assigned to an agency move coordinator who manages leads for an agency that is NOT currently using the Quotes-To-Go application to enter and rate surveys to provide customer estimates.

The EstimateAgentAdmin role is assigned to an agency move coordinator who manages leads for an agency that DOES use the Quotes-To-Go application to enter and rate surveys to provide customer estimates.

Only ONE of these roles should be assigned to users in your agency.

What role should my Move Coordinator be assigned if some of our sales people use Quotes-To-Go and some do not?

Assign the Lead Coordinator the EstimateAgentAdmin role. Have your ASA assign the Quotes-To-Go Estimate-SalesRep role to all estimators, including those who do not use Quotes-To-Go so the coordinator can assign leads received from the Home Office Customer Care Center and select the appropriate sales person from a drop down window. The coordinator should use the Email Schedule button to provide the estimator with the lead information.

When the Customer Care Center assigns my agency a lead, can I be notified by e-mail?

Figure 291:
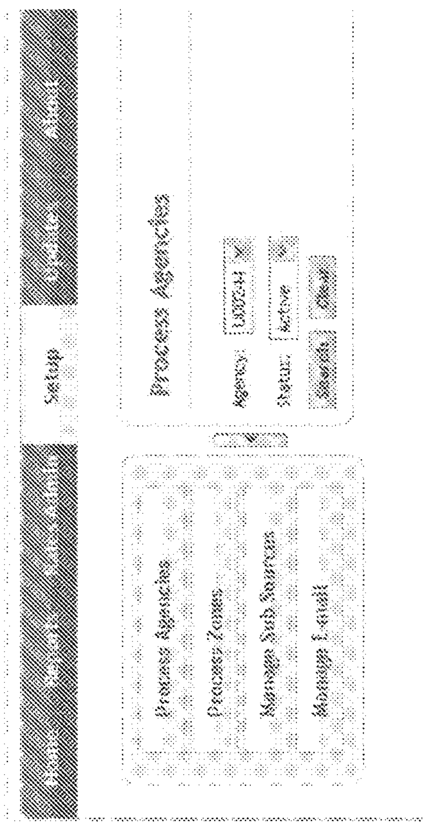

Yes. Agency Lead Coordinators can use the Setup tab to enter a notification e-mail address. Select the Manage E-mail button (see FIG. 291).

Am I being forced into using this? OR Are my existing devices still supported?

The use of Quotes-To-Go is entirely voluntary at this time. We understand that you have a history with your existing solution and want to leverage your investment in it. If you feel the tool is not right for you now, please check back regularly. We are frequently updating the product throughout 2010, based on our early adopter's feedback. We believe the promise of real-time, accurate quotes using a free tool may compel you to make the change.

Is there integration to other agency software (such as existing agency calendaring, or move management)?

Interstate quotes are saved to the mainframe PRIC system. Once a survey has been uploaded to obtain pricing, use the Download Estimate button on the Quotes-To-Go Summary screen. This button performs the same option that is currently available in the mainframe PRIC system under Option 1 SEND RATING INFO.

How do I get the latest software updates to download on my office PC or tablet?

Figure 292:
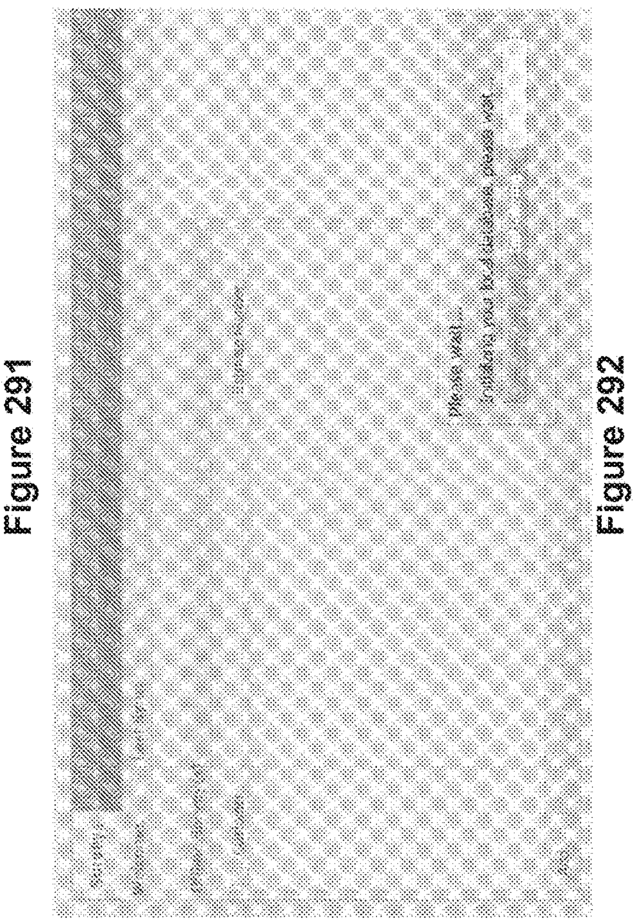

The latest software updates AUTOMATICALLY download to you whenever the updates are released. You no longer have to worry about managing release downloads! When a release includes changes to the survey you will notice that the survey tool automatically downloads upon first access. Please allow the entire download process to complete. This may take a couple of minutes (see FIG. 292).

How can I change the magnification of the Survey screen? The text is very small.

You can use the Ctrl and the + key to enlarge the size of the survey screen. Ctrl/− reduces the screen magnification. These keys also work to increase/decrease the magnification within a PDF document.

Ctrl/− Ctrl/+

Why do I have to login again after 60 minutes of inactivity?

Because our customers' information is private, their data must be treated with security and sensitivity. Therefore, after 60 minutes of no activity (stylus selections), the system automatically logs out.

Where can find the latest updates to Quotes-To-Go documentation?

Check the Quotes-To-Go Web page on The U: -Sales & Marketing/Quotes-To-Go- for the most recently updated version of all the Quotes-To-Go manuals. The Update Dates lets you easily see what's new!

How can I request new features or changes in Quotes-To-Go?

Click the Updates tab in Quotes-To-Go to access the Feedback icon in the upper right hand corner of the screen. Use your votes to enter your own ideas, or add priority to existing ideas to help the development team find out what features are most important to the agency family.

Installation and Configuration Questions

Which Tablet should I Buy?

No specific tablet is recommended. Both minimum and recommended configurations are available from The U on the latest Quotes-To-Go Fact Sheet. Also, you can find independent reviews of several tablet PCs at -http://www.tabletpereview.com/-. Some brands to check out are: Asus T91, HP 7240, HP Elite, Dell Latitude XT2, and Fujitsu Lifebook T4310.

Tablets come in a variety of weights and screen sizes, allowing you to select what works best for you. Check with your IT department for your agency's requirements. Our team is always working to make the minimum requirements as broad as possible in order to give you the flexibility to find a device that best suits your sales staff.

Can you tell me what kind of printer I can use?

Any portable printer will work. We know agents who like the HP760 and the Canon iP90.

Can two sales reps share a tablet?

No, the Quotes-To-Go profile only recognizes one user ID per tablet.

Do Apple's iPad or iPhone work with Quotes-To-Go?

Not at this time. Quotes-To-Go requires a full instance of Google's Chrome Browser. Throughout 2010, the team is working toward the goal of increasing the number of devices that can access Quotes-To-Go. As the iPad and other new devices are introduced into the market, they will be evaluated regarding Quotes-To-Go accessibility.

I noticed that the installation instructions suggest Google Chrome. Why? Should I make Chrome as default browser for all of my work?

Chrome is an internet browser similar to Internet Explorer, Firefox, or Safari. Chrome is recommended for two reasons:

1. Its speed in processing applications gives a superior experience.

2. The Offline Survey for in-home estimating leverages components built-in to Chrome.

These components are not as well supported for other browsers' current versions.

We do not recommend that you set Chrome as your default browser if you use applications such as HOD for Mainframe access, or TransDocs. These applications may not work properly in the Chrome browser.

We suggest that you create shortcuts on your desktop to both the Survey application and the Estimating Tool using Chrome. Use Internet Explorer to access other applications.

Are there plans to support other browsers?

It is technically possible to run Quotes-To-Go in other browsers. However, in other browsers, such as Internet Explorer 7.0, the installation is more complex. There is a significant performance degradation of the survey tool due to the way the browser processes JavaScript.

The technologies used in Quotes-To-Go are part of the HTML 5.0 specification. As browsers begin to come into compliance with that specification and improve performance, other browsers may be supported. For now, Chrome is selected as the browser that provides the best performance.

Process Questions

Setup

How can I assign from a list of estimators? I only see my name in the assignment list.

Figure 293:
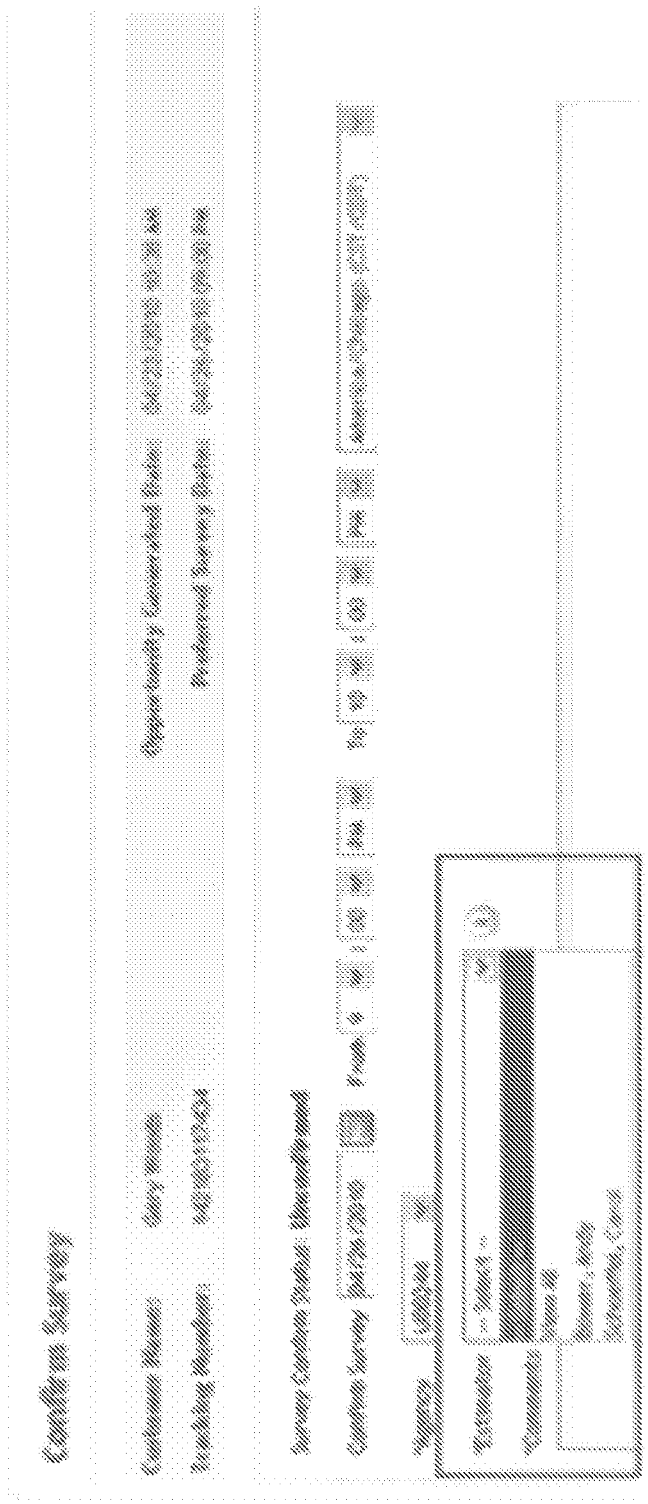
Figure 294:
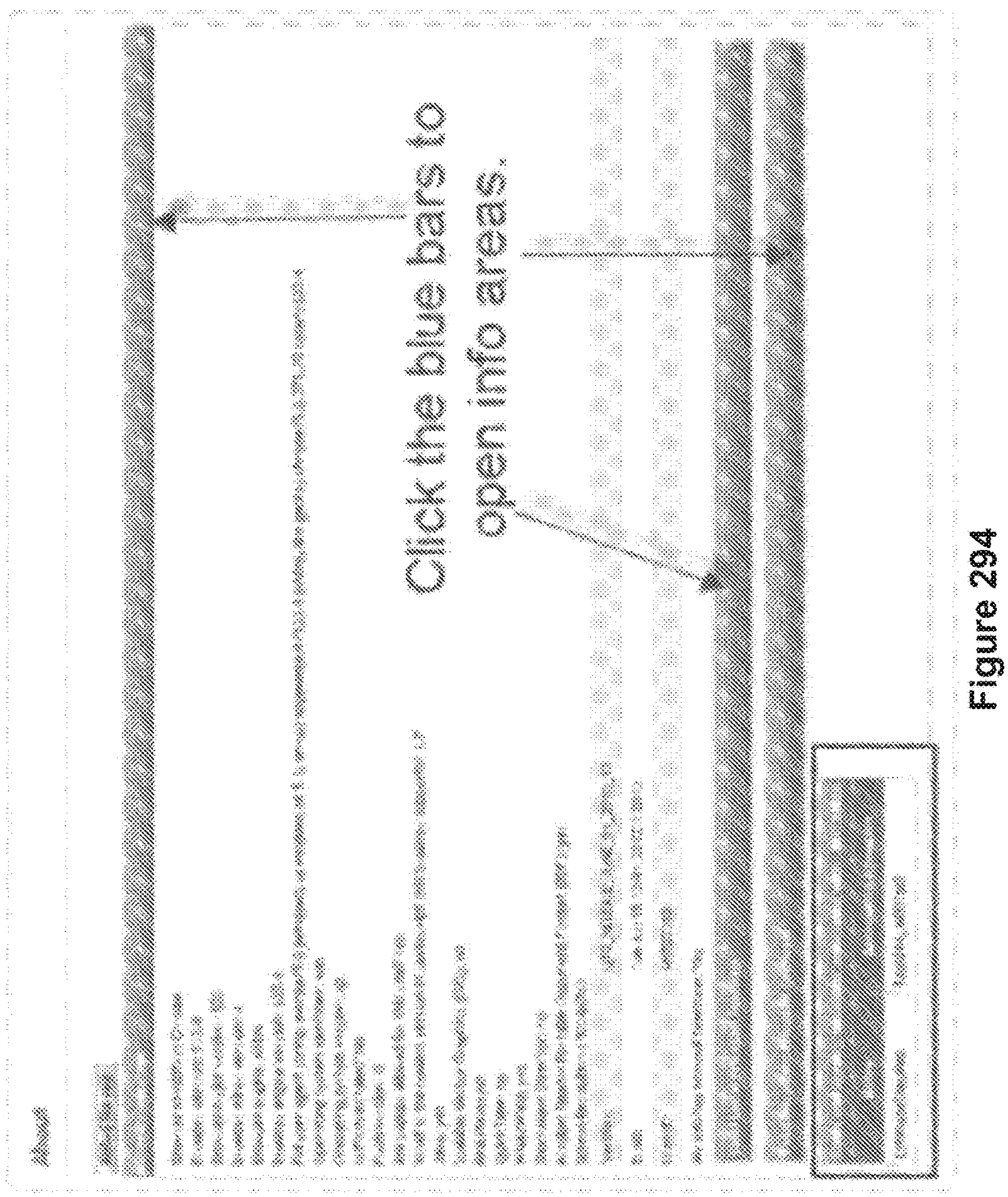

Your Agency Security Administrator must assign you the role EstimateAgentAdmin. Visit the About page near the top of the screen and click on Other Information to see your assigned roles and agency locations (see FIGS. 293 and 294). Contact your ASA if role or location changes are required.

Can I add a lead source that is unique to my agency to keep track of our direct marketing efforts?

Figure 295:
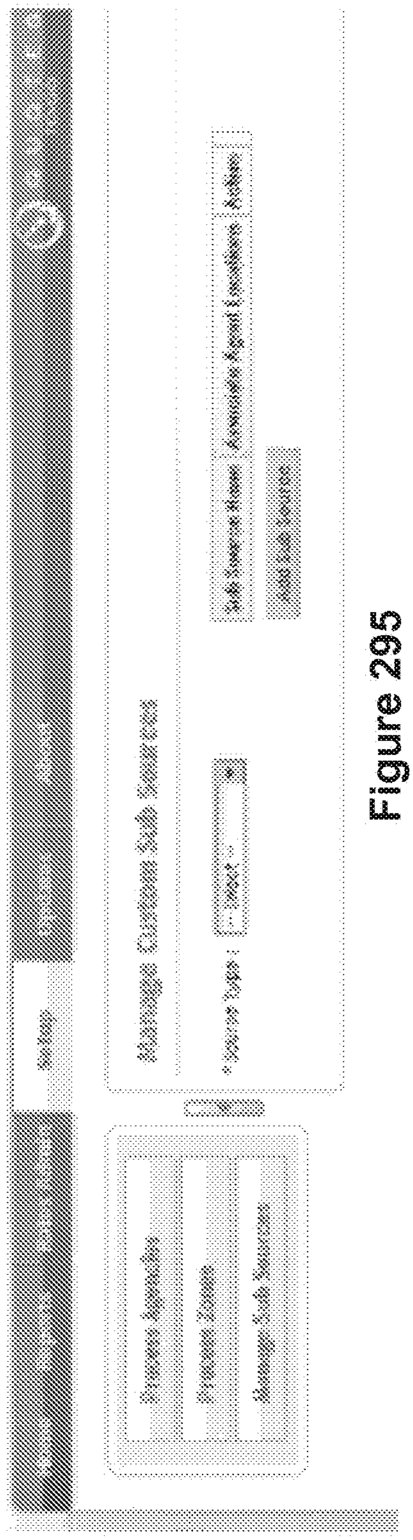
Figure 296:
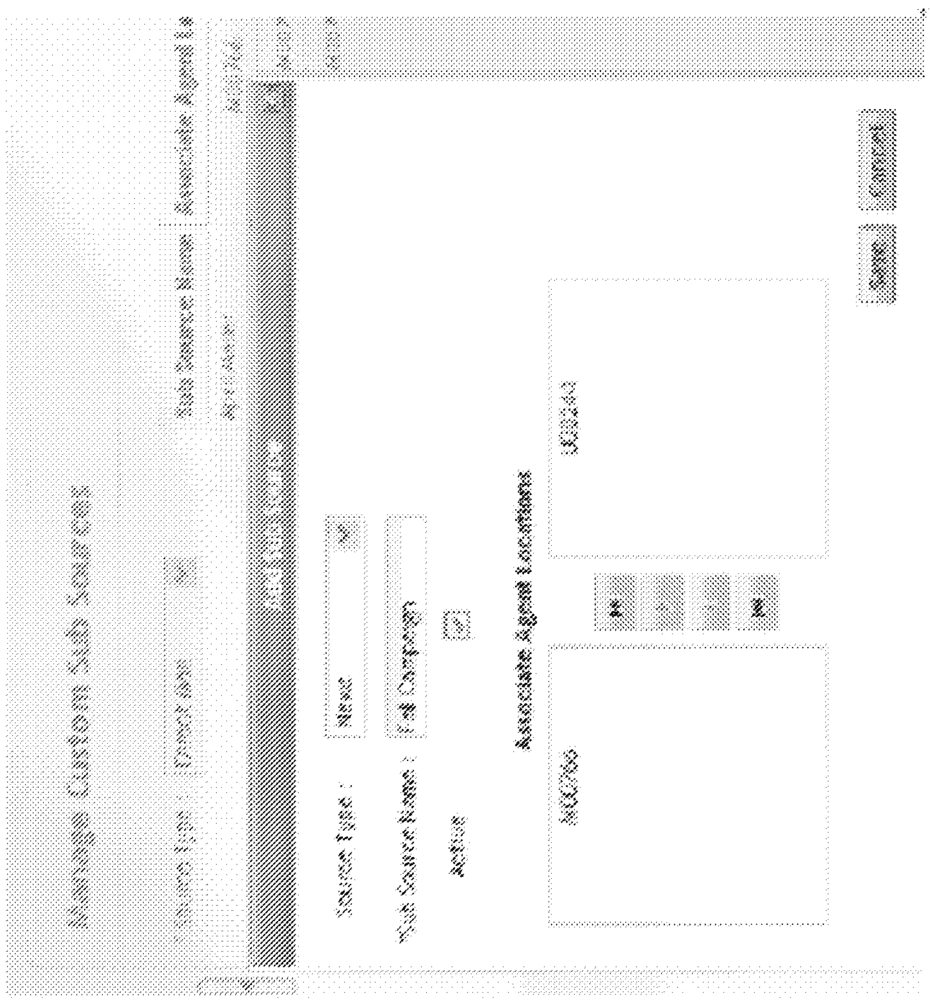

Your Agency Lead Coordinator can create custom Sub-Sources for your agency to track this at a more detailed level (see FIGS. 295 and 296).

Opportunities

Can I send surveys to Origin Agents at other locations?

Yes, use Quotes-To-Go to facilitate the OA survey process for any quote type. Read about how to do this in both the ALC and Estimator manuals.

Do OA Surveys that went through Quotes-To-Go affect my agency's closing ratio?

No, only leads that initiated from the Home Office Customer Care Center are counted toward the closing ratio.

How do I remove opportunities from the home page?

There are two ways to remove an opportunity. Mark it as a 'Non Opportunity', or register the order in the mainframe system RORD. Either removes the opportunity from the Quotes-To-Go homepage. For local and intrastate quotes, there is a button entitled Mark as Registered which changes the status.

Can I enter a zip code and let the system pull up the city and state?

Figure 297:
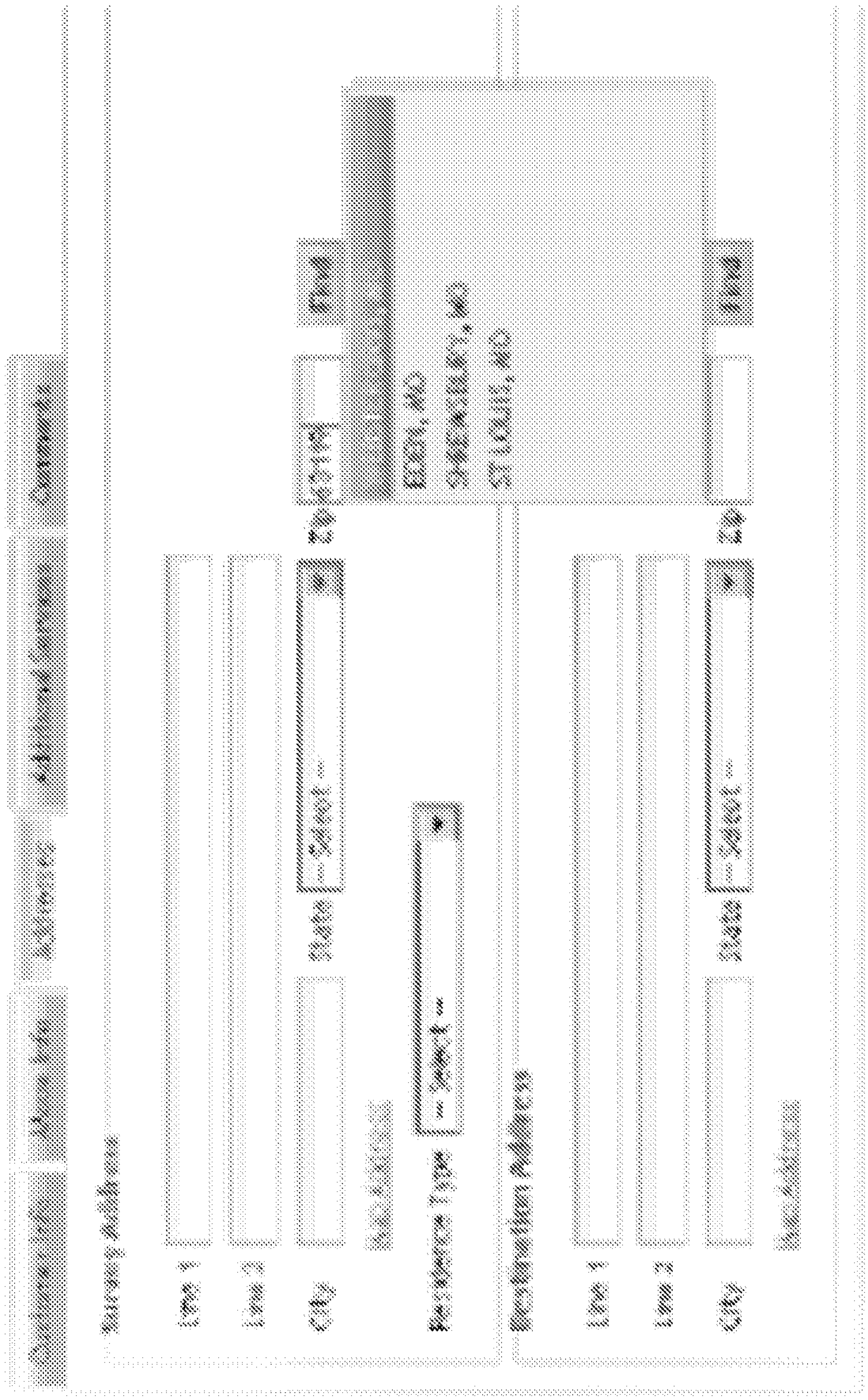

Yes. Automatic look up of the city and state based on zip code is available on the Address screen in the opportunity. Select the city name from the pop up box to populate the City/State fields (see FIG. 297).

I am entering a valid city/state combination in the opportunity address tab, but the system is giving me an invalid combination error. How can I get it to accept my entry?

Figure 298:
Figure 299:
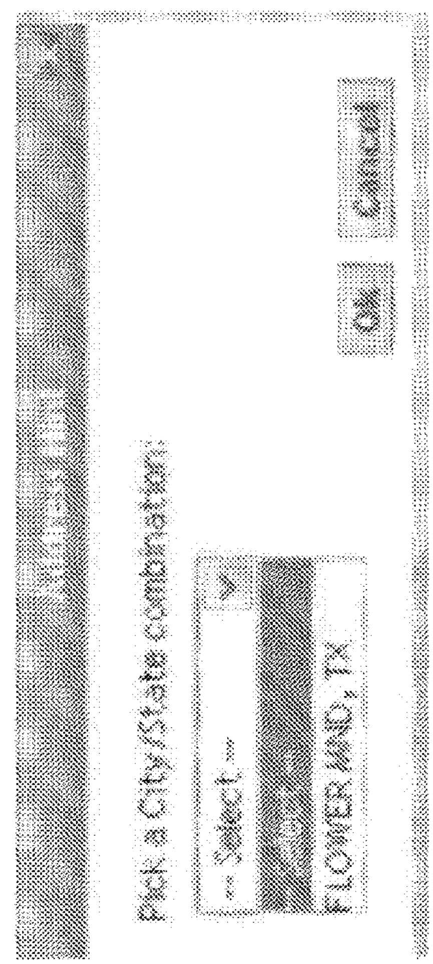

Milemaker requires specific abbreviations for certain city names. Select the Click here for suggestions link to select the abbreviated city name from a drop down list (see FIGS. 298 and 299).

Quotes

Has the registration process changed?

No. Quotes-To-Go has not changed the registration process. Access RORD and enter both the order and estimate numbers and then proceed with normal registration processes.

How do I put in my own custom language on my local and intrastate quotes?

Use the Misc Settings option when setting up your local rates. See the -Administration Rates Guide-.

Where do I see the accumulated weight while performing the survey?

Figure 300:
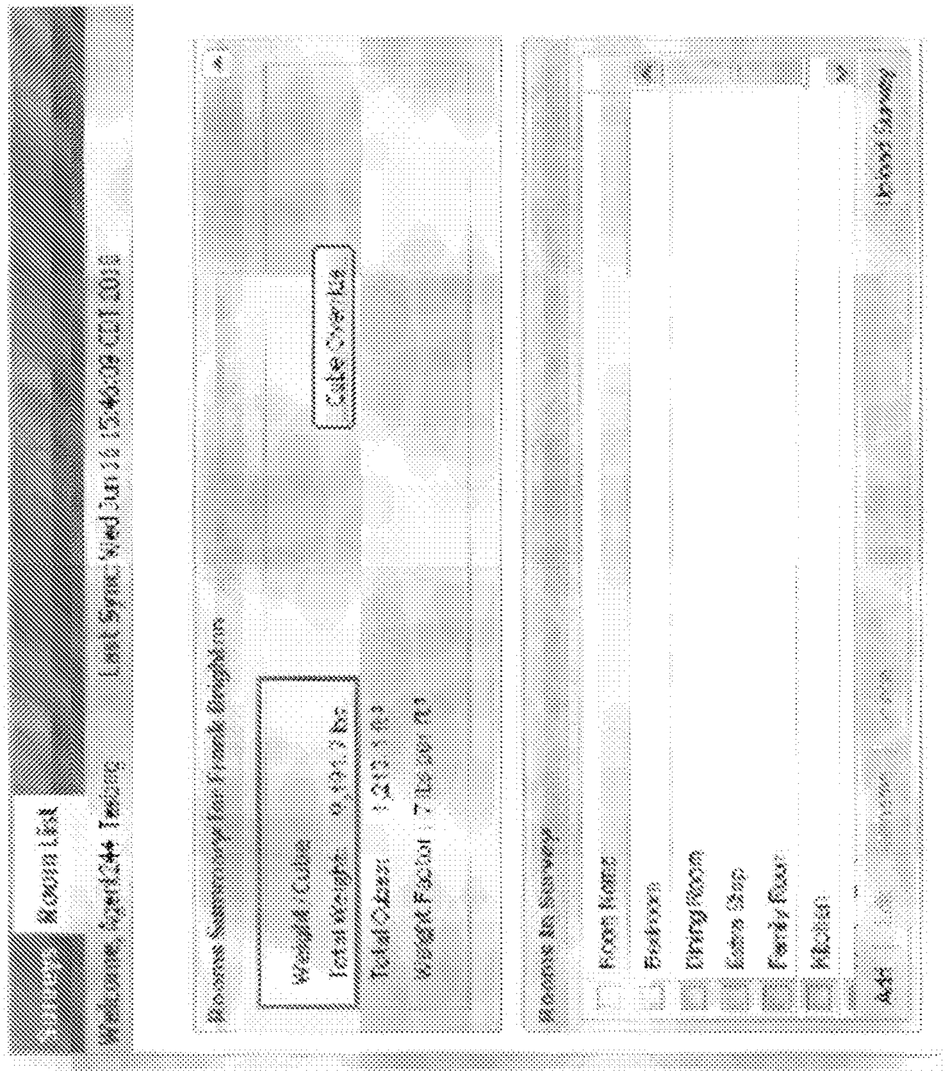

Click the Room List tab (see FIG. 300).

Can I search for a quote instead of an opportunity?

Figure 301:
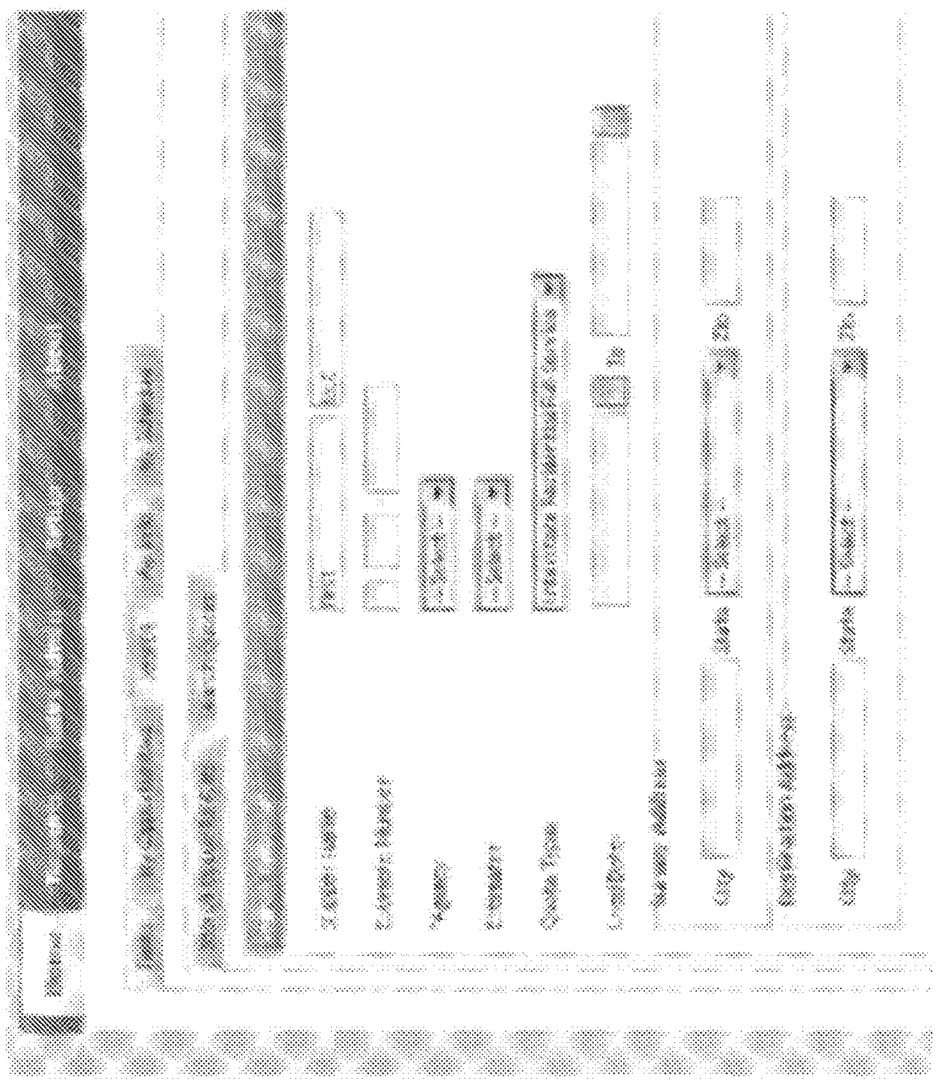

Yes, click Search and then select the Search Quotes tab to search by estimate number or load date (see FIG. 301).

Where in Quotes-To-Go do you indicate what we will unpack if it is not a full unpack?

Figure 302:
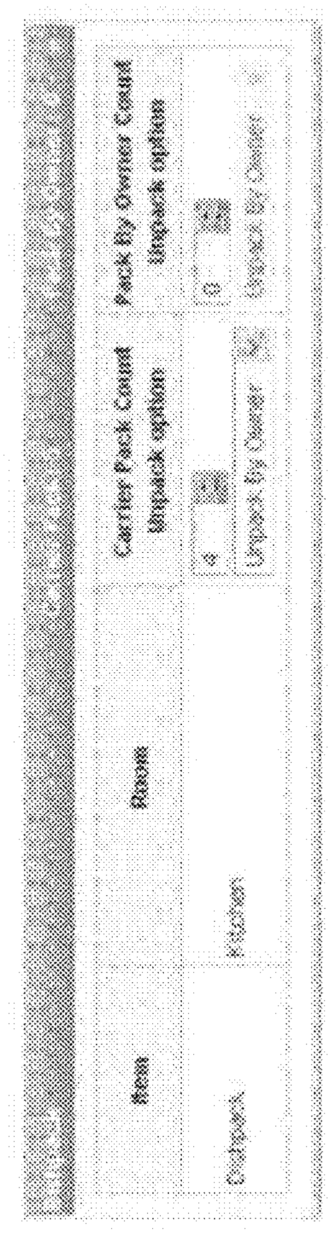

You can make this indication in the survey for an individual item by using the More . . . icon. Or, from the Summary screen, select Packing Options, select the blue bar of the carton category and change the number of Carrier Pack/Pack By Owner unpack option items (see FIG. 302).

I can't find a carton for a Grandmother Clock.

Select the Heavy Duty Carton.

Once the order is registered, where can I find the Order for Service number in Quotes-To-Go?

Figure 303:
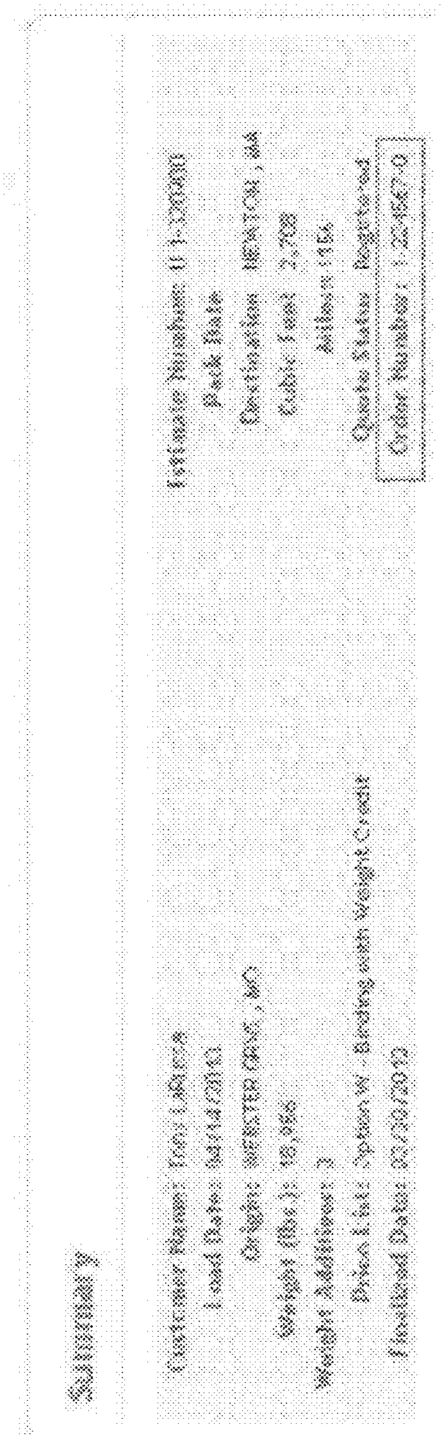

Access the quote, either from within the opportunity, or by using the Search Quotes tab. Select Summary from the left hand menu. The order number is listed at the top of the screen (see FIG. 303).

Is there a way to add a pre-set comment to an article in the survey?

Figure 304:
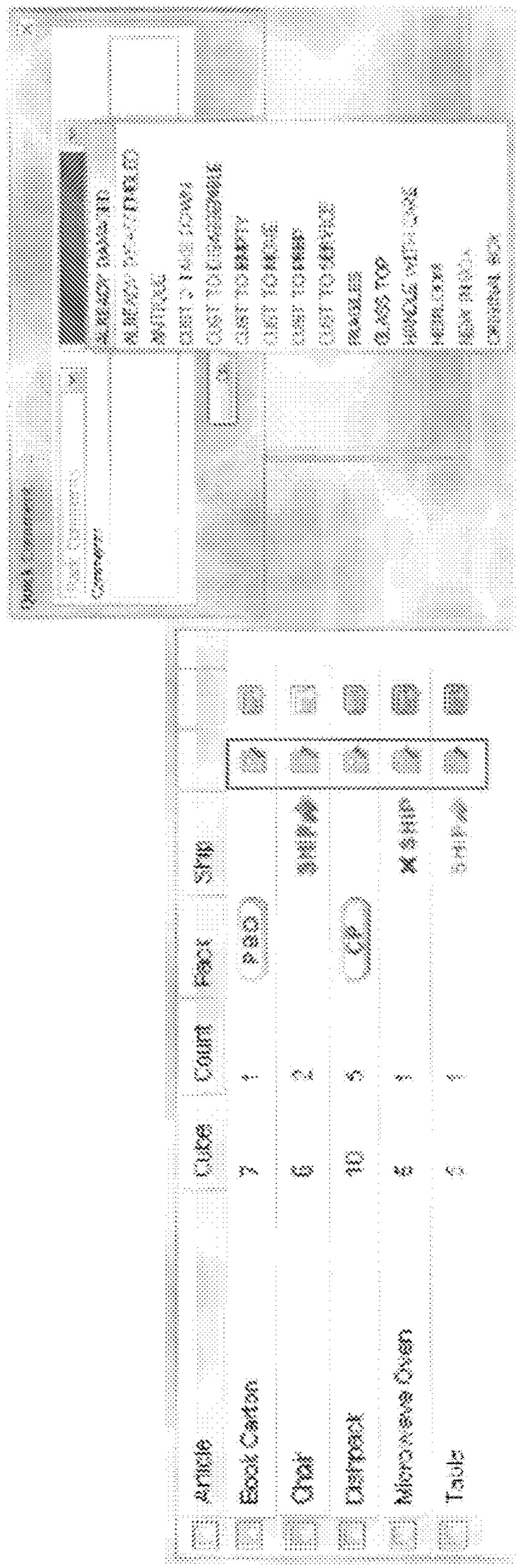

Yes, use the Quick Comment icon to select a comment from the drop-down list (see FIG. 304).

Can I make the same change to multiple items in the survey at one time?

Figure 305:
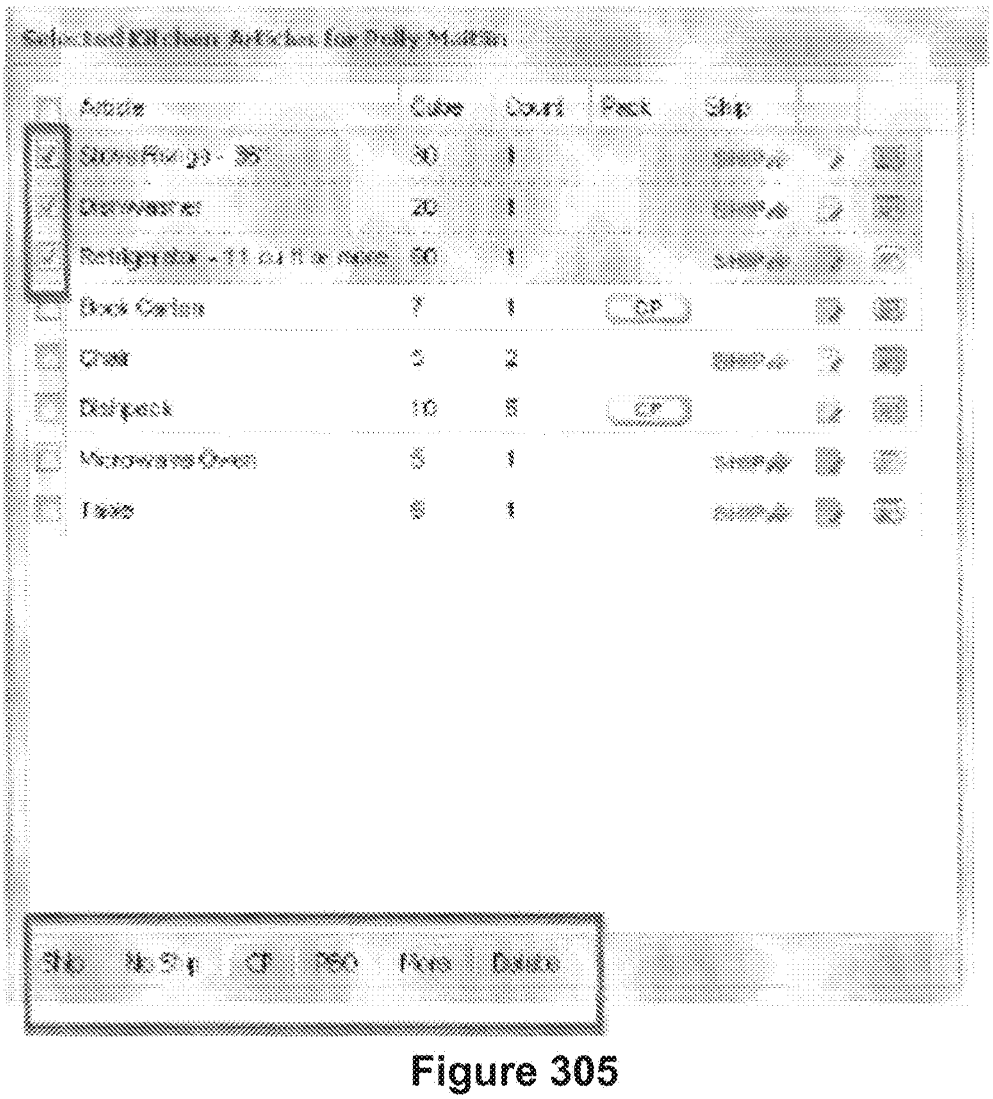

Yes. Select the check box next to all the items to be updated and click an option at the BOTTOM of the screen (see FIG. 305). All selected items are updated.

I selected a shuttle for over 25 miles, but the pricing does not appear to be right.

Figure 306:
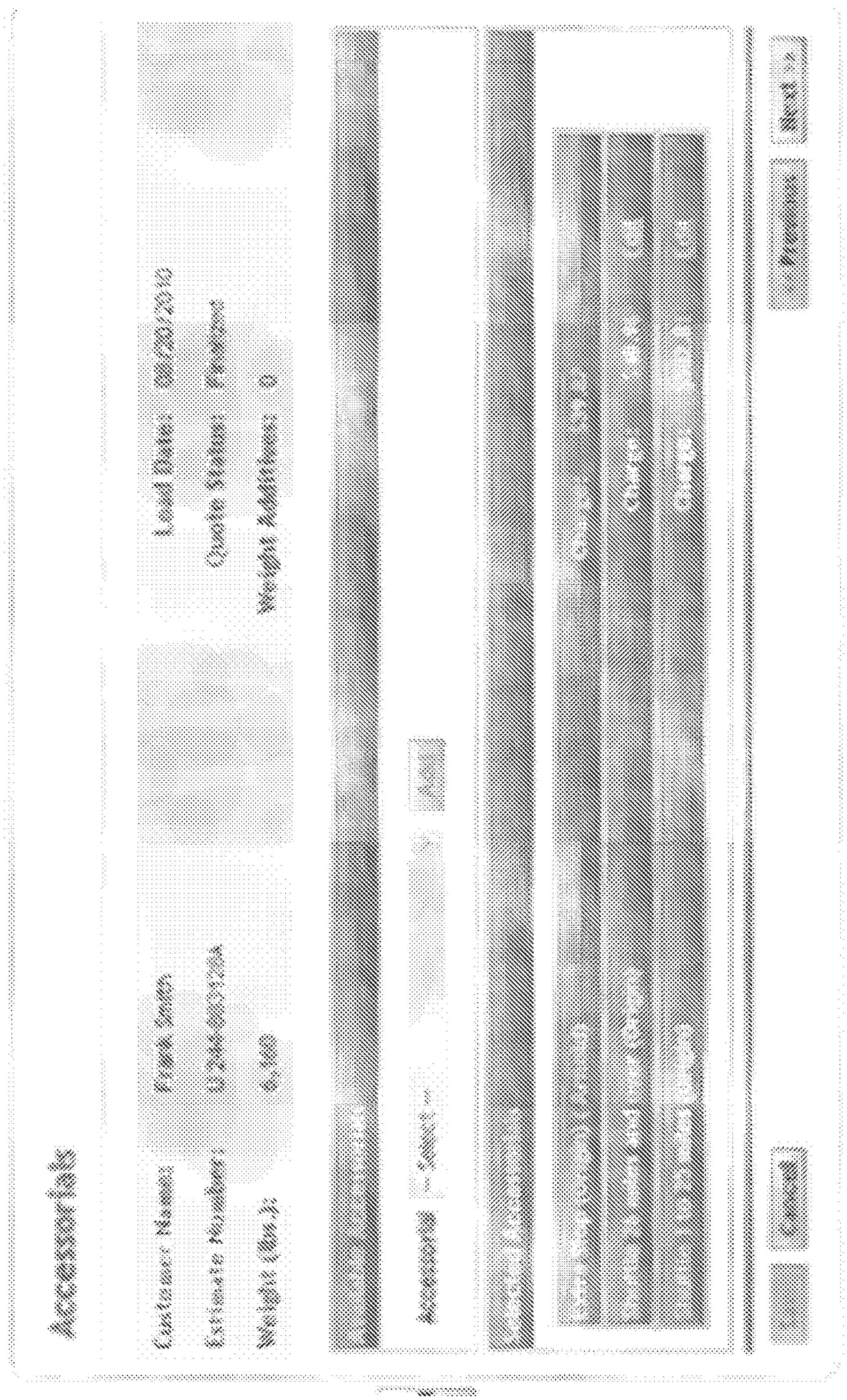

You must first select the 1-25 mile shuttle to calculate the base charge (see FIG. 306). Anything over 25 miles is calculated by additionally selecting the 26 and over option.

Rating

When I try to enter a local quote, why do I receive an error "No Rates found in selected range."?

Figure 307:
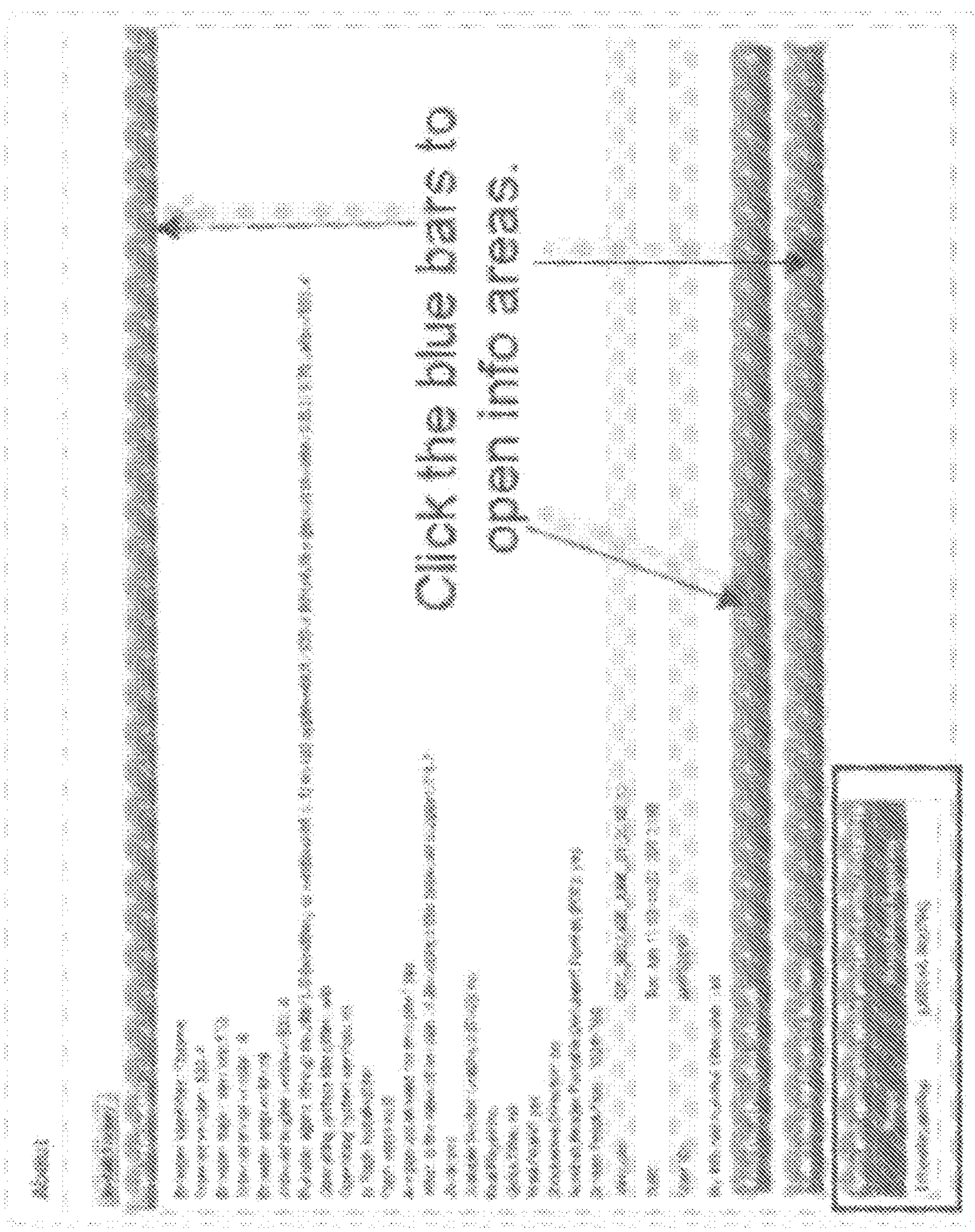

Ensure that someone at your agency has the role AgentRatesAdmin and has setup local rates for your agency. Visit the About page near the top of the screen and click on Other Information to see your assigned roles and agency locations (see FIG. 307). Contact your ASA if role or location changes are required.

Can I add intrastate rates? How about rates for more than one state?

Figure 308:
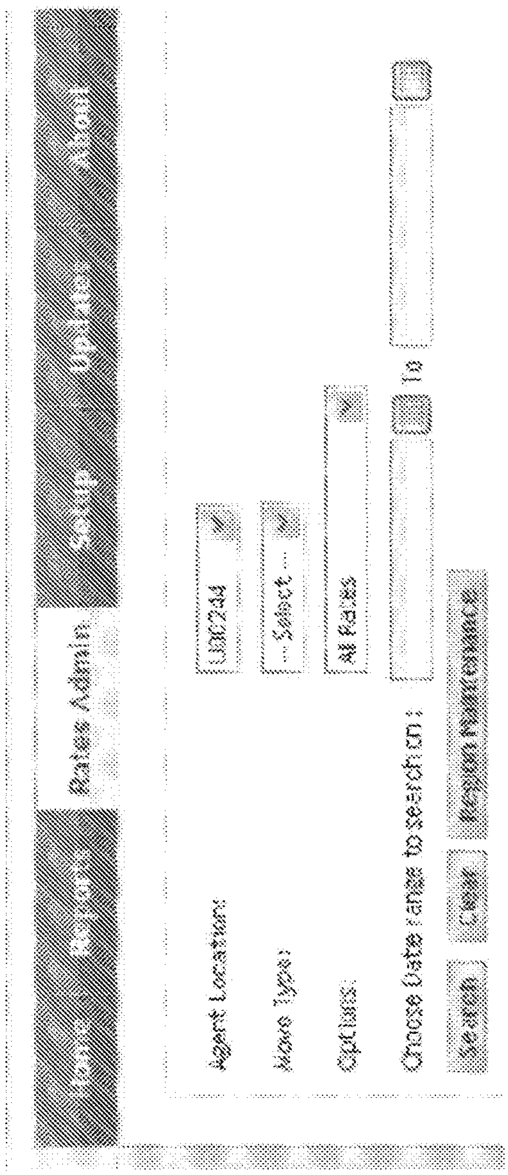

Yes, if you have the EstimateRatesAdmin role you can enter intrastate rates by region for multiple states from the Rates Admin tab (see FIG. 308).

Are International rates included? Are Military rates included?

Not at this time. International and Military rates are being considered as future improvements, depending upon the adoption of the tool.

Do I need connectivity to get a price to the customer?

Yes. In order to get the benefits of real-time pricing, there are no rates stored on the local device. You can perform the survey without an internet connection using the survey tool, but access to the paperwork and rates require connectivity. If you are unable to obtain a wireless connection within the home, you can use the e-Mail functionality to send the quote to the customer once you are in an area with a signal.

If I performed an interstate survey offline using the Survey shortcut on my desktop, once I am able to get online, can I use the Launch Survey button in Quotes-To-Go to access the survey to upload it for rating?

Figure 309:
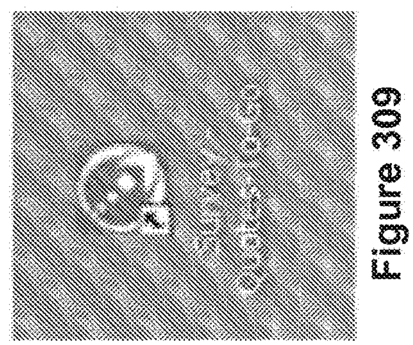
Figure 310:
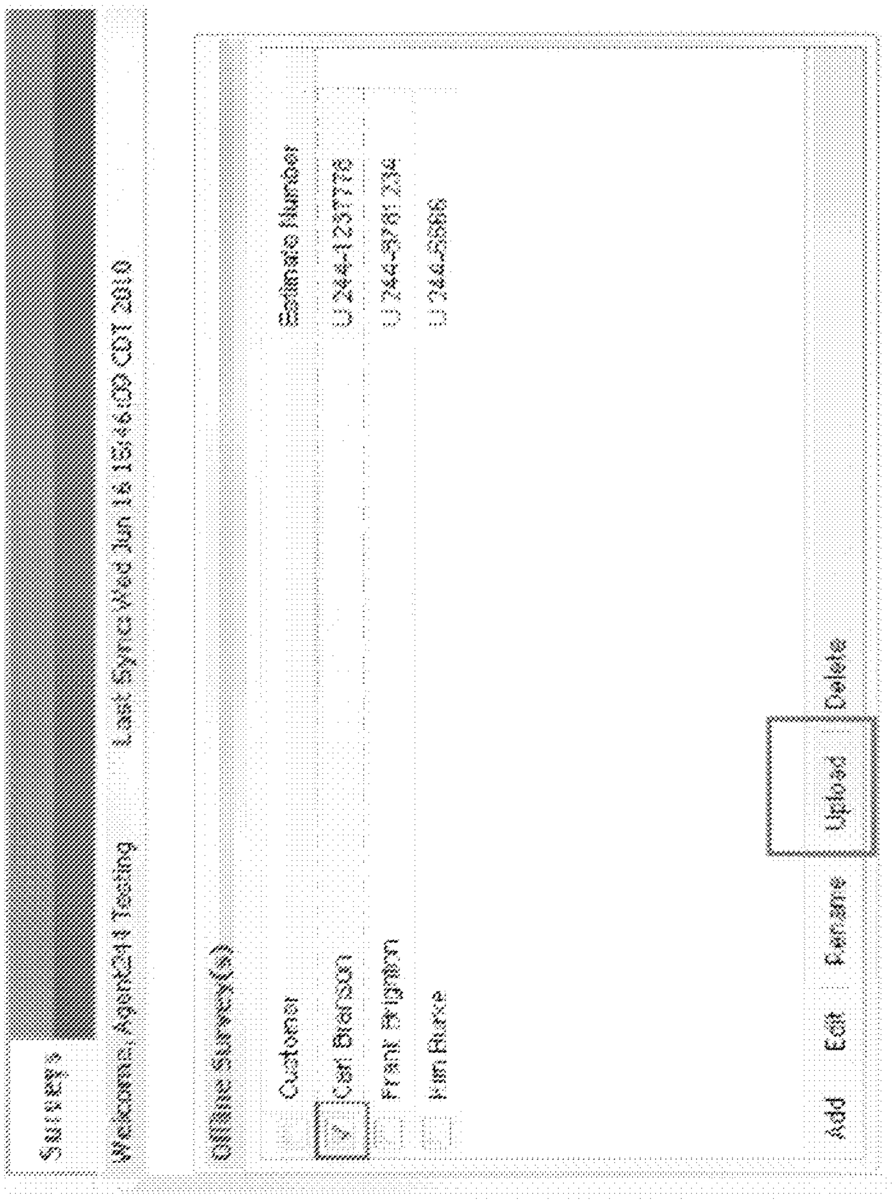

The recommended best practice is that once you have Internet access and are ready to upload for rating purposes, open the Opportunity in Quotes-To-Go and begin the quote process in the My Quotes screen, if it was not previously started there. Note: The Estimate number entered here MUST match the Estimate number used in the Survey. When you reach the Survey screen, do NOT use the Launch Survey Application button. Open the Survey shortcut from your desktop (see FIG. 309) to access the offline survey screen. Select the survey you are ready to upload for pricing and click Upload from the Offline Surveys screen (see FIG. 310).

Can I enter 400N style local rates?

Flexibility has been added to the local rates set up tables. Your EstimateRatesAdmin can set pricing by regions, choose from multiple transportation rate methods, and more.

Calendar

How does the calendar work with the Home Office Lead Center?

The calendar that you see on the My Schedule tab is also visible to the Home Office. Any appointments that you set or 'busy time' that you block off in the Quotes-To-Go calendar informs the Home Office that you are not available for appointments at those times. Watch a recorded Webinar about the calendar in UniGroup University. Select Catalog/Moving Industry Specific/Quotes-To-Go.

Why is it recommended that I enter all leads as new opportunities in Quotes-To-Go and assign an estimator using the Quotes-To-Go calendar?

Using the Quotes-To-Go calendar to manage all lead activity provides visibility to the Customer Care Center for all agent activity. Your use of the calendar helps the Customer Care Center to avoid booking appointments when your sales team is unavailable.

How can I see the whole agency view or a specific estimator view of the calendar?

Figure 311:
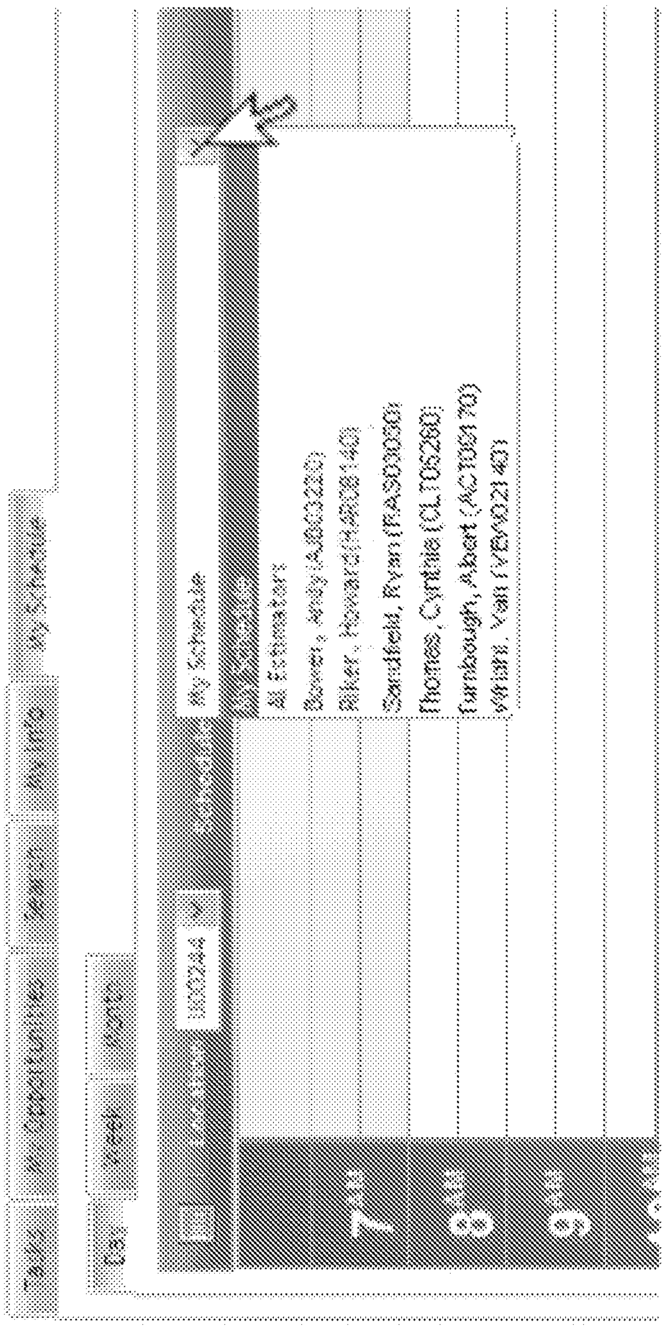

If you are an EstimateAgentAdmin, you can select All Estimators from the Schedule drop down to view the agency calendar. Select an Estimator by name to view his or her calendar (see FIG. 311).

How can I inform the salesperson of an appointment I scheduled?

Figure 312:
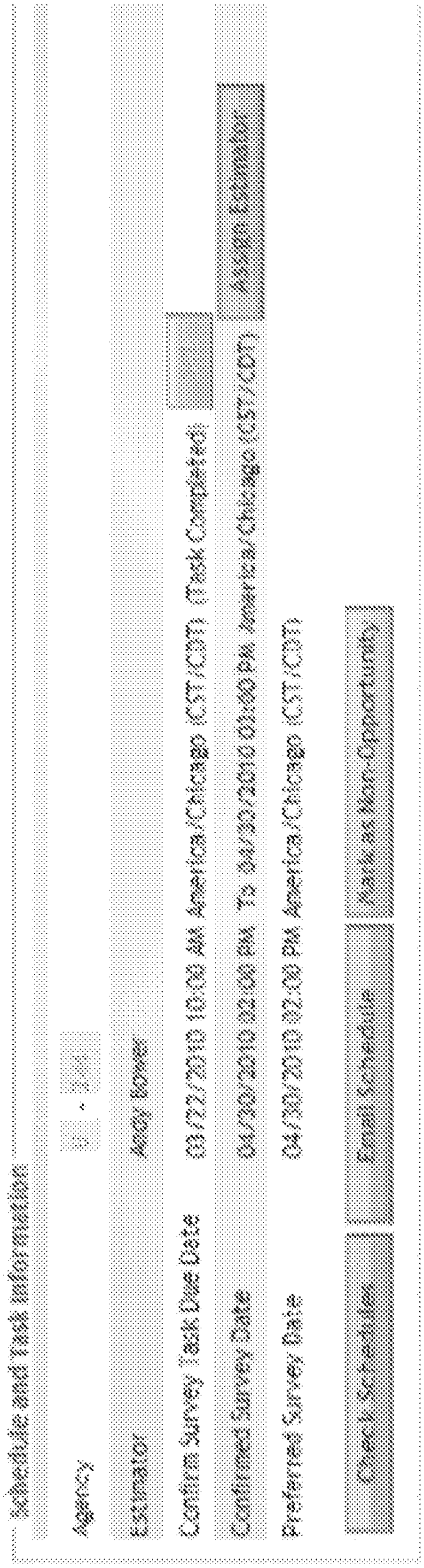

Use the Email Schedule button to send the appointment details to the Estimator's e-mail address (see FIG. 312).

Paperwork

Can I upload Photos to my Survey?

There is currently no way to upload them into Quotes-To-Go for inclusion on the survey. However, if you are using a PC, you can upload them using a digital camera, and the digital camera software. In addition, some tablets include a camera for ease of use. To add a photo to the Cube sheet, use the My Info tab.

Must I finalize the quote to print forms?

No, once you have calculated the rates on the Quotes-To-Go Summary page, the forms are available for printing or emailing. Before the registration process is started, you must finalize the quote.

Can I change a finalized estimate then re-send eAcceptance?

Yes, an estimate can be changed after it has been Finalized, sent for eAcceptance, or Registered. To change the estimate, visit the summary page and click the Return to Draft button. Any existing eAcceptance is automatically cancelled, whether it has been accepted by the customer or not. Make your changes, finalize again, and then send the eAcceptance paperwork for customer approval.

If I use the Return to Draft button in Quotes-To-Go when an order has been registered for that estimate, does it automatically change RORD?

No, Quotes-To-Go does not automatically update the order in RORD. You must make the changes there. For Interstate orders, once you update RORD the estimate is returned to a Registered status. For Local and Intrastate quotes, use the Mark as Registered button on the Summary screen in Quotes-To-Go to return the quote to registered status after changes have been made.

Explain the difference in paperwork processes between traditional white paper forms and eAcceptance.

Traditional

If you gather customer signatures using the traditional white paper method, the customer signs the one page Estimate and the six page Estimate/Order for Service. After the order is registered, the customer signs the four page Bill of Lading.

eAcceptance

If you use eAcceptance for customer approvals, the customer electronically 'signs' the one page Estimate and the combined Estimate Order for Service/Bill of Lading. Then the order is registered, and BOL signatures are not gathered again since the BOL was pre-approved by the customer.

Can I have the customer just sign the one page estimate to initiate the move process?

Figure 313:
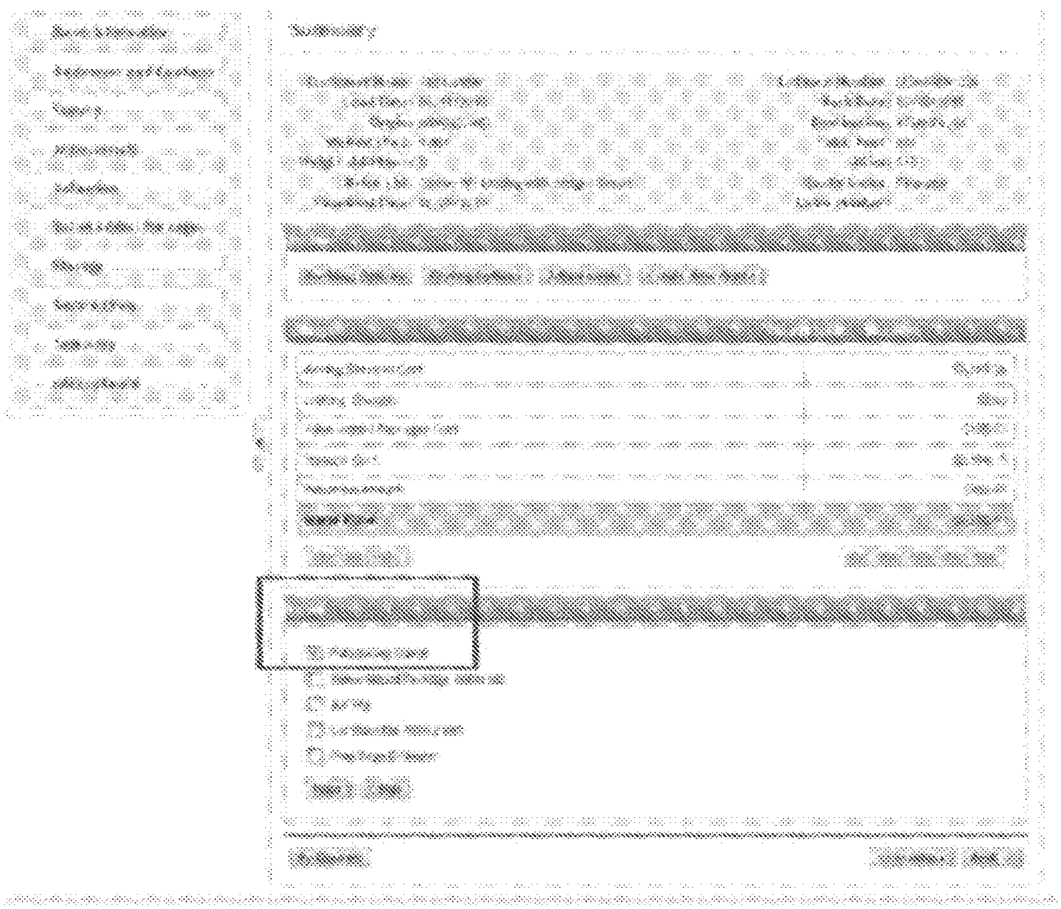

No, the one page estimate is just a quote. The combined Estimate/Order for Service (Full/Bond quote (see FIG. 313)) must also be presented to your customer to initiate the move process.

What kind of documents can be eAccepted?

Figure 314:
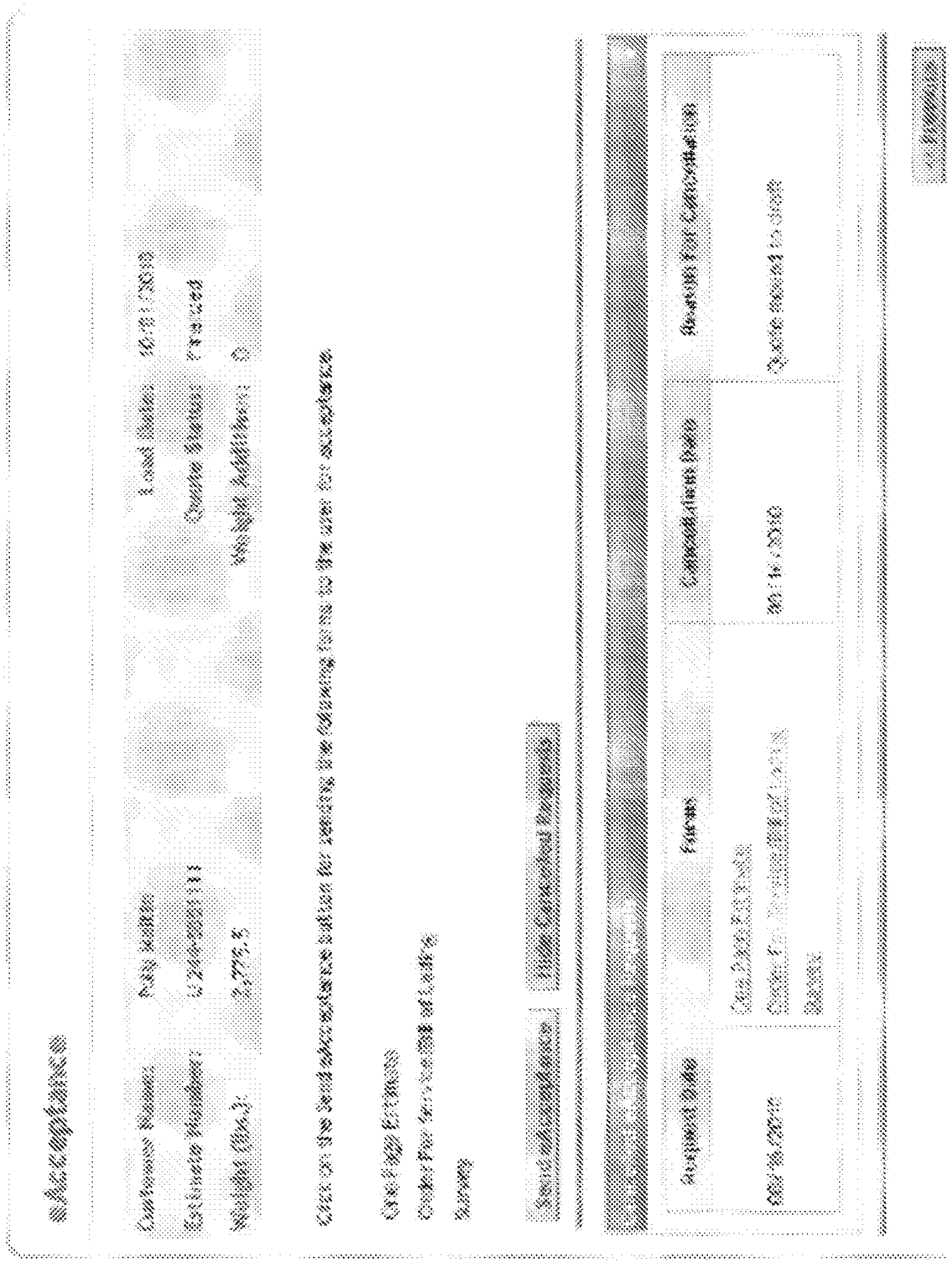

Once the quote is finalized, the residential order can be eAccepted. Currently the one page Estimate, the combined Order for Service/Bill of Lading, and the Survey are sent for the customer's approval (see FIG. 314).

In the eAcceptance forms I don't see the Additional Price List of services that could be encountered at destination. Do we need to get that signed?

The Additional Services Price form no longer requires the customer's signature, but you should provide it to the customer. Print just page 5 of the Order for Service form and give it to the customer along with the cube sheet and the one-page estimate while you are in the home. Or you can email it to the customer separately from the eAcceptance process. We are working to eventually include this document in the eAcceptance forms package.

Can I display my agency logo on my local quotes?

Yes, the ALC clicks Set Up/Manage Agency Logo to upload a logo to the system. Then each estimator must go to My Info and select the check box to display the logo on the form.

Reporting

Where are the reports?

Select the Reports tab to access the following reports:

Opportunities by Source Summary and Detail

Sales Forecast

Sales Lost Business

Sales Revenue Report

Appointment Report

All Quote Download Report

How can I view my agency's closing ratio statistics?

Figure 315:
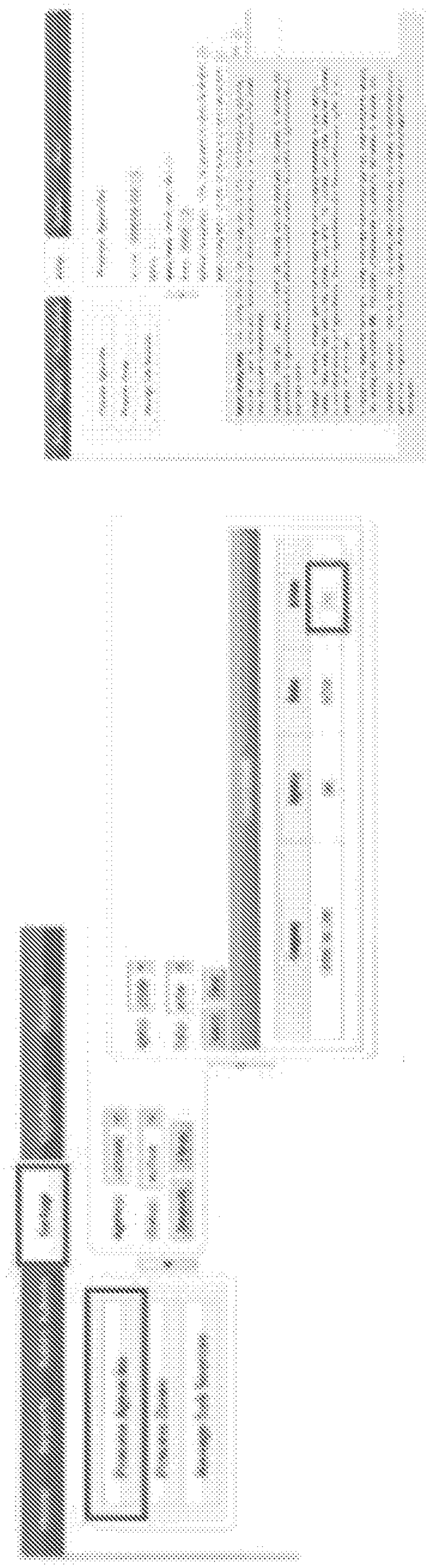

If you are an EstimateAgentAdmin, click the Setup tab, and then select Process Agencies. Select your agency location from the drop down list, and then click Search. Click the View link to display the statistics (see FIG. 315).

How can I obtain a better understanding of my closing ratio statistics?

Roll your mouse over the information icon to view definitions and/or calculations related to closing ratios.

What is claimed is:

1. An apparatus for providing integrated management of quotes for move transactions, the apparatus comprising:

one or more processors configured for communication over a network with a plurality of communication devices; and one or more non-transient memories operatively coupled to at least one of the one or more processors and storing instructions, which when executed by the at least one or more processors cause the at least one or more processors to:

manage a plurality of moving industry quote workflows, each moving industry quote workflow corresponding to a move transaction, wherein at least one of the workflows comprises interrelated tasks that are to be performed by a plurality of entities that are geographically remote relative to each other;

cause at least one of the one or more memories to store data relating to the move transactions in at least one data structure including a plurality of rate data structures for governing a pricing to be applied to the move transactions;

update the at least one data structures based on the interactions of the entities; and dynamically adjust a pricing of at least one of the rate data structures based on move transaction data by changing a rate in a rate data structure stored in memory based on a time period equal to an amount of time between a current time and an anticipated move date, and a capacity of a moving company associated with that rate data structure to fill services.

2. The apparatus of claim 1 wherein the rate is increased when the time period is below a specified threshold and the capacity is below a specified threshold.

3. The apparatus of claim 1 wherein the rate is decreased when the time period is below a specified threshold and the capacity is above a specified threshold.

4. The apparatus of claim 1, wherein the rate is changed based on the following equation:

$$\text{Adjusted Price}=\text{Base Price}\times\alpha\text{BM}\times\beta/(\lambda-t)QO$$

Wherein;

BM=booked moves,

QO=capacity, and the variables $\alpha$, $\beta$, and $(\lambda-t)$ are chosen such that a multiplier of less than 1 is applied to the base price in situations where the time is deemed short between the present time and the anticipated move date and where booked moves (BM) are low in relation to capacity (QO) and a multiplier of greater than 1 is applied to the base price in situations where the time is deemed short between the present time and the anticipated move data and where BM is high in relation to QO.

5. The apparatus as recited in claim 1, wherein the moving industry quote workflows include a plurality of workflow types, each workflow type comprising an associated plurality of interrelated tasks for different aspects of managing a moving industry quote workflow.

6. The apparatus of claim 5, wherein the instructions further cause the at least one of the one or more processors to:

create data for a plurality of different graphical user interfaces (GUIs), each of the GUIs corresponding to interaction with at least one of the entities to manage the interrelated tasks applicable to that at least one entity; and populate each of the GUIs with data applicable to the interrelated tasks for that at least one entity.

7. The apparatus of claim 1, wherein pricing is dynamically adjusted separately for rate data structures associated with a plurality of different moving companies.

8. A computer implemented method, accomplished by one or more processors, for providing integrated management of quotes for move transactions, the method comprising:

managing, by at least one of the one or more processors, a plurality of moving industry quote workflows, each moving industry quote workflow corresponding to a move transaction, wherein at least one of the workflows comprises interrelated tasks that are to be performed by a plurality of entities that are geographically remote relative to each other;

storing in a memory, by at least one of the one or more processors, data relating to the move transactions in at least one data structure including a plurality of rate data structures for governing a pricing to be applied to the move transactions;

updating, by at least one of the one or more processors, the at least one data structures based on the interactions of the entities; and dynamically adjusting, by at least one of the one or more processors, a pricing of at least one of the rate data structures based on move transaction data by changing a rate in a rate data structure stored in memory based on a time period equal to an amount of time between a current time and an anticipated move date, and a capacity of a moving company associated with that rate data structure to fill services.

9. The method of claim 8 wherein the rate is increased when the time period is below a specified threshold and the capacity is below a specified threshold.

10. The method of claim 8 wherein the rate is decreased when the time period is below a specified threshold and the capacity is above a specified threshold.

11. The method of claim 8, wherein the rate is changed based on the following equation:

$$\text{Adjusted Price}=\text{Base Price}\times\alpha BM\times\beta/(\lambda-t)QO$$

Wherein;

BM=booked moves,

QO=capacity, and the variables α, β, and (λ−t) are chosen such that a multiplier of less than 1 is applied to the base price in situations where the time is deemed short between the present time and the anticipated move date and where booked moves (BM) are low in relation to capacity (QO) and a multiplier of greater than 1 is applied to the base price in situations where the time is deemed short between the present time and the anticipated move data and where BM is high in relation to QO.

12. The method as recited in claim 8, wherein the moving industry quote workflows include a plurality of workflow types, each workflow type comprising an associated plurality of interrelated tasks for different aspects of managing a moving industry quote workflow.

13. The method of claim 12, wherein the instructions further cause the at least one of the one or more processors to:

create data for a plurality of different graphical user interfaces (GUIs), each of the GUIs corresponding to interaction with at least one of the entities to manage the interrelated tasks applicable to that at least one entity; and populate each of the GUIs with data applicable to the interrelated tasks for that at least one entity.

14. The method of in claim 8, wherein pricing is dynamically adjusted separately for rate data structures associated with a plurality of different moving companies.

* * * * *